US009334371B2

(12) United States Patent
Nakamura et al.

(10) Patent No.: US 9,334,371 B2
(45) Date of Patent: May 10, 2016

(54) COMPOSITION AND POLYMER

(75) Inventors: Akitake Nakamura, Tokyo (JP); Takeshi Endo, Iizuka (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 128 days.

(21) Appl. No.: 14/117,291

(22) PCT Filed: Jul. 18, 2012

(86) PCT No.: PCT/JP2012/068235
§ 371 (c)(1), (2), (4) Date: Dec. 3, 2013

(87) PCT Pub. No.: WO2013/015174
PCT Pub. Date: Jan. 31, 2013

(65) Prior Publication Data

US 2014/0121293 A1 May 1, 2014

(30) Foreign Application Priority Data

Jul. 22, 2011 (JP) ................................ P2011-161207
Aug. 25, 2011 (JP) ................................ P2011-184027
Sep. 26, 2011 (JP) ................................ P2011-209486

(51) Int. Cl.
*C08F 2/46* (2006.01)
*C08G 61/04* (2006.01)
*C08G 75/08* (2006.01)

(52) U.S. Cl.
CPC ...................................... *C08G 75/08* (2013.01)

(58) Field of Classification Search
CPC ........................................................ C08G 75/08
USPC ........................................... 522/168, 1; 520/1
See application file for complete search history.

(56) References Cited

U.S. PATENT DOCUMENTS

| | | | |
|---|---|---|---|
| 4,596,644 | A | 6/1986 | Banks et al. |
| 6,528,595 | B1 | 3/2003 | Ikawa et al. |
| 2008/0249268 | A1 | 10/2008 | Rath et al. |
| 2010/0130661 | A1 | 5/2010 | Takeuchi et al. |

FOREIGN PATENT DOCUMENTS

| | | | |
|---|---|---|---|
| CN | 101287770 | A | 10/2008 |
| CN | 101675082 | A | 3/2010 |
| EP | 2014700 | A1 | 1/2009 |
| GB | 977341 | B | 12/1964 |
| JP | S61-43603 | A | 3/1986 |
| JP | 2001-288177 | A | 10/2001 |
| JP | 2001-294592 | A | 10/2001 |
| JP | 2001-296402 | A | 10/2001 |
| JP | 2004-510000 | A | 4/2004 |
| JP | 2004-154664 | A | 6/2004 |
| JP | 2005-528513 | A | 9/2005 |
| JP | 2005-298587 | A | 10/2005 |
| JP | 2006-176716 | A | 7/2006 |
| JP | 2009-185198 | * | 8/2009 |
| JP | 2009-185198 | A | 8/2009 |
| JP | 2011-063776 | A | 3/2011 |
| TW | 200904888 | A | 2/2009 |
| WO | 00/46317 | A1 | 8/2000 |

OTHER PUBLICATIONS

Takeuchi et al, Aug. 20, 2009, JP 2009-185198 Machine Translation.*
Office Action issued in counterpart Taiwanese Patent Application No. 101126222 dated Mar. 17, 2014.
International Search Report issued in corresponding International Patent Application No. PCT/JP2012/068235 dated Oct. 23, 2012.
Aida et al., "Zinc N-Substituted Porphyrins as Novel Initiators for the Living and Immortal Polymerizations of Episulfide," Macromolecules, 23: 3887-3892 (1990).
Nicol et al., "A New Initiator System for the Living Thiiranes Ring-Opening Polymerization: A Way toward Star-Shaped Polythiiranes," Macromolecules, 32: 4485-4487 (1999).
Wragg, "Metal Thiolates as Initiators for the Polymerisation of Alkylene Sulphides," Journal of the Chemical Society, C: 2087-2092 (1969).
International Preliminary Report on Patentability issued in corresponding International Patent Application No. PCT/JP2012/068235 dated Feb. 6, 2014.
The extended European Search Report issued in the counterpart European Patent Application No. 12816968.7 dated Aug. 10, 2015.

* cited by examiner

*Primary Examiner* — Ling Choi
*Assistant Examiner* — Jessica E Whiteley
(74) *Attorney, Agent, or Firm* — Morgan, Lewis & Bockius LLP

(57) ABSTRACT

Disclosed is a composition comprising (A) at least one compound selected from the group consisting of an ether compound having two or more ether groups, a trivalent phosphorus compound, and a ketone compound, (B) a boron trihalide, and (C) an episulfide compound.

20 Claims, No Drawings

COMPOSITION AND POLYMER

TECHNICAL FIELD

The present invention relates to a composition comprising an episulfide compound and a polymer obtained from the composition.

BACKGROUND ART

Episulfide compounds are used in a wide range of fields such as starting compounds for plastics, adhesives, drugs, insecticides, and herbicides.

Plastics formed by polymerizing the episulfide compounds have the properties of a high refractive index, a high Abbe's number, high heat resistance, and high strength and as such, have been used particularly in recent years as materials having better performance than ever in the field of optical materials.

The episulfide compounds are highly polymerizable and as such, are used as excellent fast curing adhesives compared with epoxy compounds conventionally generally used as adhesives.

Examples of one of methods for polymerizing the episulfide compounds include methods using polymerization catalysts, and some methods have been proposed so far.

For example, a method using a trivalent organic phosphorus compound, an amino group-containing organic compound, or a salt thereof has been proposed in Patent Literature 1. Moreover, a method using various onium salts as energy line-sensitive cationic polymerization initiators has been proposed in Patent Literature 2. Furthermore, a method using a zinc-porphyrin complex, a method using a salt of a thiol compound and 1,8-diazabicyclo[5.4.0]undec-7-ene, and a method using a metal thiolate compound having zinc or cadmium as a central metal have been proposed in Non Patent Literature 1, Non Patent Literature 2, and Non Patent Literature 3, respectively.

CITATION LIST

Patent Literature

Patent Literature 1: Japanese Patent Application Laid-Open No. 2001-288177

Patent Literature 2: Japanese Patent Application Laid-Open No. 2011-063776

Non Patent Literature

Non Patent Literature 1: Macromolecules 1990, 23, 3887-3892.

Non Patent Literature 2: Macromolecules 1999, 32, 4485-4487.

Non Patent Literature 3: J. Chem. Soc. C 1969, 2087-2092.

SUMMARY OF INVENTION

Technical Problem

However, the trivalent organic phosphorus compound described in Patent Literature 1 reacts with an episulfide group to cause desulfurization reaction, so that the desired polymer may not be obtained. Moreover, the amino group-containing organic compound may be of low stability as a composition under atmospheric temperature conditions where a composition with an episulfide compound can be prepared most easily, because the reaction with an episulfide group occurs rapidly. Furthermore, the reaction with an episulfide group occurs rapidly, whereby a side reaction may occur. Moreover, the salt thereof contains halide anions, and the anions may cause a side reaction and become responsible for inhibiting the desired polymerization.

Since the onium salt described in Patent Literature 2 is a complicated molecule designed to have a structure that absorbs a particular energy line and requires multi-stage steps for its production, there is a tendency of becoming an expensive compound. Therefore, a composition of the onium salt and an episulfide compound has a tendency that cost inevitably gets higher.

The zinc-porphyrin complex described in Non Patent Literature 1 may be of low stability as a composition under atmospheric temperature conditions where a composition with an episulfide compound can be prepared most easily, because the reaction with an episulfide group occurs rapidly. Furthermore, the reaction with an episulfide group occurs rapidly, whereby a side reaction may occur. Moreover, since methods for synthesizing a porphyrin compound and its complex are complicated and require multi-stage steps for their production, there is a tendency of becoming an expensive compound. Therefore, a composition containing the zinc-porphyrin complex has a tendency that cost inevitably gets higher. Furthermore, the zinc-porphyrin complex contains a zinc atom and offers a relatively disadvantageous composition from the viewpoint of reduction in environmental load, which has gathered attention in recent years.

The salt of a thiol compound and 1,8-diazabicyclo[5.4.0]undec-7-ene described in Non Patent Literature 2 is an inexpensive and easily preparable salt and as such, is a useful polymerization catalyst. However, this salt may be of low stability as a composition under atmospheric temperature conditions where a composition with an episulfide compound can be prepared most easily, because the reaction with an episulfide group occurs rapidly. Furthermore, this salt may cause a side reaction because the reaction with an episulfide group occurs rapidly.

The metal thiolate compound described in Non Patent Literature 3 may be of low stability as a composition under room temperature conditions where a composition with an episulfide compound can be prepared most easily, because the reaction with an episulfide group occurs rapidly. Furthermore, this metal thiolate compound may cause a side reaction because the reaction with an episulfide group occurs rapidly. Moreover, there is the possibility that decomposition reaction occurs from a metal-sulfur bond present in a polymer, and there is a tendency that the weather resistance of the polymer is reduced. In addition, the polymerization catalyst contains a metal and offers a relatively disadvantageous composition from the viewpoint of reduction in environmental load, which has gathered attention in recent years.

Accordingly, the present invention has been made in consideration of the circumstances described above, and an object thereof is to provide a composition that is excellent in stability at room temperature while having sufficiently high polymerizability with a few side reactions during polymerization, and a polymer obtained from the composition.

Solution to Problem

The present invention relates to the followings:

[1]

A composition comprising:

(A) at least one compound selected from the group consisting of an ether compound having two or more ether groups, a trivalent phosphorus compound and a ketone compound, (B) a boron trihalide, and (C) an episulfide compound.

[2]

The composition according to [1], wherein the number of ether groups in the ether compound is 2 to 8.

[3]

The composition according to [1], wherein the number of carbon atoms in the ether compound is 3 to 50.

[4]

The composition according to [1], wherein the trivalent phosphorus compound is a compound represented by the following formula (1):

(1)

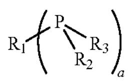

wherein a represents a number of 1 or more, $R_1$ represents a linear, branched or cyclic aliphatic hydrocarbon group having 1 to 33 carbon atoms, a substituted or unsubstituted aromatic hydrocarbon group, or a substituted or unsubstituted metallocenyl group, $R_2$ and $R_3$ each independently represent a linear, branched or cyclic aliphatic hydrocarbon group having 1 to 33 carbon atoms or a substituted or unsubstituted aromatic hydrocarbon group, $R_1$ and $R_2$, $R_1$ and $R_3$, or $R_2$ and $R_3$ may be linked together, and in the case where a is 2 or more, a plurality of $R_2$ and $R_3$ groups present may be the same or different and the $R_2$ groups or the $R_3$ groups may be linked together.

[5]

The composition according to [4], wherein in the formula (1), a is 1, all of $R_1$, $R_2$, and $R_3$ are aromatic hydrocarbon groups, and at least one of $R_1$, $R_2$, and $R_3$ is a substituted aromatic hydrocarbon group.

The composition according to [4], wherein the number of carbon atoms in the trivalent phosphorus compound is 4 to 52.

[7]

The composition according to [4], wherein in the formula (1), a is 1 to 4.

[8]

The composition according to [1], wherein the ketone compound is a compound represented by the following formula (2), (3) or (4):

(2)

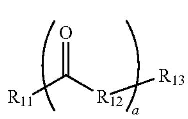

(3)

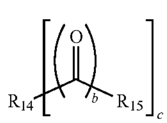

(4)

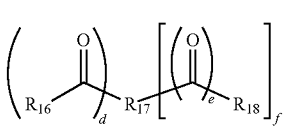

wherein a, c, d, and f each independently represent a number of 1 or more, b and e each independently represent a number of 2 or more, $R_{11}$ and $R_{12}$ each independently represent a linear, branched, or cyclic aliphatic hydrocarbon group having 1 to 20 carbon atoms or a substituted or unsubstituted aromatic hydrocarbon group, $R_{13}$ represents a hydrogen atom, a linear, branched or cyclic aliphatic having 1 to 20 carbon atoms, or a substituted or unsubstituted aromatic hydrocarbon group, $R_{11}$, $R_{12}$, and $R_{13}$ may be linked to each other, $R_{14}$ and $R_{15}$ each independently represent a linear, branched or cyclic aliphatic hydrocarbon group having 1 to 20 carbon atoms or a substituted or unsubstituted aromatic hydrocarbon group, the $R_{15}$ groups may be the same or different, $R_{14}$, $R_{15}$, and the $R_{15}$ groups may be linked to each other, $R_{16}$, $R_{17}$, and $R_{18}$ each independently represent a linear, branched, or cyclic aliphatic hydrocarbon group having 1 to 20 carbon atoms or a substituted or unsubstituted aromatic hydrocarbon group, the $R_{16}$ groups and the $R_{18}$ groups may be the same or different, and $R_{16}$, $R_{17}$, or $R_{18}$ and $R_{16}$ or $R_{18}$ may be linked to each other.

[9]

The composition according to [8], wherein when a in the formula (2) is 2, the number of carbon atoms between two ketone groups is 2 to 20.

[10]

The composition according to [8], wherein the number of carbon atoms in the ketone compound is 3 to 31.

[11]

The composition according to [8], wherein the number of ketone group(s) in the ketone compound is 1 to 8.

[12]

The composition according to [1], wherein the at least one compound (A) selected from the group consisting of an ether compound having two or more ether groups, a trivalent phosphorus compound and a ketone compound, and at least a portion of the boron trihalide (B) form a complex.

[13]

The composition according to [1], wherein an index α which is expressed in the following formula (5) and represents a ratio between the at least one compound (A) selected from the group consisting of an ether compound having two or more ether groups, a trivalent phosphorus compound and a ketone compound, and the boron trihalide (B) is 1 to 1000:

$$\text{Index } \alpha=(\alpha e+\alpha p+\alpha k)/\alpha b \quad (5)$$

αe: molar number (mol) of ether groups in the ether compound

αp: molar number (mol) of trivalent phosphorus atom(s) contained in the trivalent phosphorus compound αk: molar number (mol) of ketone group(s) in the ketone compound αb: molar number (mol) of the boron trihalide.

[14]

The composition according to [13], wherein αp/αb is 10 or less.

[15]

The composition according to [1], wherein the boron trihalide is at least one selected from the group consisting of boron trifluoride, boron trichloride, and boron tribromide.

[16]

The composition according to [1], wherein the episulfide compound is a compound having only a 3-membered cyclic thioether structure as a polymerizable functional group.

[17]

The composition according to [1], wherein a ratio between a molar number (mol) of the boron trihalide and a molar number (mol) of episulfide group(s) contained in the episulfide compound is 1:10 to 1:100000.

[18]

The composition according to [1], wherein an episulfide equivalent of the episulfide compound is 65 to 700 g/mol.

[19]

The composition according to [1], wherein the episulfide compound has a partial structure represented by the following formula (6), (7), (8) or (9):

(6)

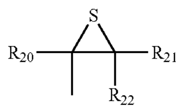

(7)

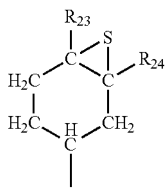

(8)

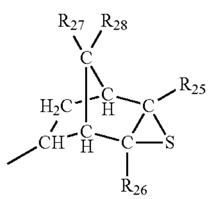

(9)

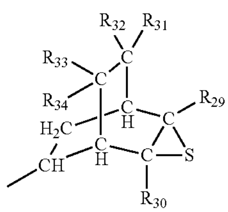

wherein $R_{20}$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, $R_{32}$, $R_{33}$, and $R_{34}$ each independently represent a hydrogen atom, a linear, branched, or cyclic aliphatic hydrocarbon group having 1 to 20 carbon atoms, or a substituted or unsubstituted aromatic hydrocarbon group.

[20]

A polymer formed by polymerizing the episulfide compound in the composition according to [1].

[21]

A method for producing a polymer, comprising polymerizing the episulfide compound in the composition according to [1] by heating and/or energy line irradiation.

[22]

A polymer formed by polymerizing an episulfide compound in an episulfide compound-containing composition, wherein a content of a vinyl bond is 2% by mass or less with respect to a total mass of the polymer.

[23]

A polymer formed by polymerizing an episulfide compound in an episulfide compound-containing composition, wherein a content of a boron atom is 1 to 6500 ppm with respect to a total mass of the polymer.

[24]

A polymer formed by polymerizing an episulfide compound in an episulfide compound-containing composition, wherein a content of a phosphorus atom is 1 to 14000 ppm with respect to a total mass of the polymer.

Effects of Invention

According to the present invention, a composition that is excellent in stability at room temperature while having sufficiently high polymerizability with a few side reactions during polymerization, and a polymer obtained from the composition can be provided.

DESCRIPTION OF EMBODIMENTS

Hereinafter, a mode for carrying out the present invention (hereinafter, referred to as the "present embodiment") will be described in detail. However, the present invention is not limited to the present embodiment below and can be carried out with various modifications made without departing from the spirit thereof.

[Composition]

The composition according to the present embodiment contains (A) at least one compound selected from the group consisting of an ether compound having two or more ether groups (hereinafter, referred to as a "component (A-1)" in some cases), a trivalent phosphorus compound (hereinafter, referred to as a "component (A-2)" in some cases), and a ketone compound (hereinafter, referred to as a "component (A-3)" in some cases), (B) a boron trihalide (hereinafter, referred to as a "component (B)" in some cases), and (C) an episulfide compound (hereinafter, referred to as a "component (C)" in some cases). Hereinafter, the components (A), (B), and (C) and other components contained in the composition will be described in detail.

(Component (A-1): Ether Compound Having Two or More Ether Groups)

The component (A-1) of the present embodiment is an ether compound having two or more ether groups. As the component (A-1), one ether compound having two or more ether groups may be used alone, or a plurality of ether compounds each having two or more ether groups may be used in combination.

It is preferable that the number of ether groups in the ether compound (A-1) should be 2 or more because there is a tendency that the polymerization of the episulfide compound (C) can be further suppressed in preparing the composition under room temperature, resulting in the further improved stability of the composition. It is more preferable that the number of ether groups should be 3 or more because there is a tendency that the alteration of a complex formed by the ether compound (A-1) and at least a portion of the boron trihalide (B) can be further suppressed when preparing the composition under atmosphere, resulting in the further improved stability of the composition. From a similar viewpoint, it is further preferable that the number of ether groups should be 4 or more.

It is preferable that the number of ether groups in the ether compound (A-1) should be 20 or less because of easy availability and because there is a tendency that cost as a composition can be further reduced, resulting in better economy. From a similar viewpoint, it is more preferable that the number of ether groups should be 10 or less. It is further preferable that the number of ether groups should be 8 or less because there is a tendency that residues of undissolved matter can be further reduced when preparing the composition, so that a composition with better homogeneity is obtained. It is particularly preferable that the number of ether groups should be 6 or less because there is a tendency that the polymerizability of the composition can be improved.

It is preferable that the number of carbon atoms in the ether compound (A-1) should be 3 or more because there is a tendency that a side reaction can be further suppressed during polymerizing the episulfide compound (C). It is more preferable that the number of carbon atoms should be 4 or more because there is a tendency that the vapor pressure of the ether compound (A-1) becomes higher and handleability becomes much better. From a similar viewpoint, it is further preferable that the number of carbon atoms should be 6 or more.

It is preferable that the number of carbon atoms in the ether compound (A-1) should be 50 or less because of easy availability and because there is a tendency that cost as a composition can be further reduced, resulting in better economy. From a similar viewpoint, it is more preferable that the number of carbon atoms should be 30 or less. It is further preferable that the number of carbon atoms should be 24 or less because there is a tendency that residues of undissolved matter can be further reduced when preparing the composition, so that a composition with better homogeneity is obtained. From a similar viewpoint, it is particularly preferable that the number of carbon atoms should be 12 or less.

Although the structure of the ether compound (A-1) may be any of linear, branched, and cyclic structures, it is preferable to be a linear or cyclic structure because there is a tendency that the bonding strength of the ether compound (A-1) with the boron trihalide (B) becomes better, whereby the polymerization of the episulfide compound (C) can be further suppressed when preparing the composition, resulting in the further improved stability of the composition. From a similar viewpoint, it is more preferable that the ether compound (A-1) should have a cyclic structure.

Specific examples of the ether compound (A-1) include linear ether compounds, branched ether compounds, and cyclic ether compounds each having two or more ether groups. These may be used alone, or a plurality thereof may be used in combination.

(Linear Ether Compound Containing Two or More Ether Groups)

Examples of the linear ether compound having two or more ether groups (hereinafter, referred to as a "linear ether compound") include ones represented by the following formula (10):

$$R_{40}-O-[(CH_2)_{m_1}-O]_{n_1}-R_{41} \quad (10)$$

In the formula, $R_{40}$ and $R_{41}$ each independently represent a linear aliphatic or aromatic hydrocarbon group. $m_1$ represents a number of 1 or more, and 1 to 20 are preferable. $n_1$ represents a number of 1 or more, and 1 to 9 are preferable.

Among the compounds represented by the above formula (10), at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

formaldehyde dimethyl acetal, ethylene glycol dimethyl ether, ethylene glycol diethyl ether, ethylene glycol dipropyl ether, ethylene glycol dibutyl ether, ethylene glycol dipentyl ether, ethylene glycol dihexyl ether, ethylene glycol dibenzyl ether, dimethoxypropane, diethoxypropane, dipropoxypropane, dibutoxypropane, dimethoxyphenyl propane, dimethoxybutane, diethoxybutane, dipropoxybutane, dibutoxybutane, dimethoxyphenyl butane, dimethoxypentane, diethoxypentane, dipropoxypentane, dibutoxypentane, dimethoxyphenyl pentane, dimethoxyhexane, diethoxyhexane, dipropoxyhexane, dibutoxyhexane, dimethoxyphenyl hexane, dimethoxyheptane, diethoxyheptane, dipropoxyheptane, dibutoxyheptane, dimethoxyphenyl heptane, dimethoxyoctane, diethoxyoctane, dipropoxyoctane, dibutoxyoctane, dimethoxyphenyl octane, diethylene glycol dimethyl ether, diethylene glycol diethyl ether, diethylene glycol dipropyl ether, diethylene glycol dibutyl ether, diethylene glycol dipentyl ether, diethylene glycol dihexyl ether, triethylene glycol dimethyl ether, triethylene glycol diethyl ether, triethylene glycol dipropyl ether, triethylene glycol dibutyl ether, tetraethylene glycol dimethyl ether, tetraethylene glycol diethyl ether, tetraethylene glycol dipropyl ether, tetraethylene glycol dibutyl ether, polyethylene glycol dimethyl ether, polyethylene glycol diethyl ether, polyethylene glycol dipropyl ether, polyethylene glycol dibutyl ether, polyethylene glycol dipentyl ether, polyethylene glycol dihexyl ether, trioxaundecane, trioxamidecane, trioxaheptadecane, trioxapentadecane, tetraoxadodecane, tetraoxatetradecane, tetraoxahexadecane, 1,14-bis(2-naphthyloxy)-3,6,9,12-tetraoxatetradecane, polytrimethylene ether glycol dimethyl ether, polytrimethylene ether glycol diethyl ether, polytrimethylene ether glycol dipropyl ether, polytrimethylene ether glycol dibutyl ether, polytetramethylene ether glycol dimethyl ether, polytetramethylene ether glycol diethyl ether, polytetramethylene ether glycol dipropyl ether, polytetramethylene ether glycol dibutyl ether.

More preferably, the linear ether compound is at least one compound selected from the following group:

ethylene glycol dimethyl ether, ethylene glycol diethyl ether, ethylene glycol dibutyl ether, ethylene glycol dihexyl ether, dimethoxypropane, diethoxypropane, dibutoxypropane, dimethoxybutane, diethoxybutane, dibutoxybutane, dimethoxyhexane, diethoxyhexane, dibutoxyhexane, diethylene glycol dimethyl ether, diethylene glycol, diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, trioxaundecane, trioxamidecane.

Further preferably, the linear ether compound is at least one compound selected from the following group:

ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, and triethylene glycol dibutyl ether.

(Branched Ether Compound Containing Two or More Ether Groups)

Examples of the branched ether compound having two or more ether groups (hereinafter, referred to as a "branched ether compound") include ones represented by the following formula (11):

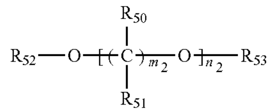

(11)

In the formula, $R_{50}$ represents a hydrogen atom or a linear, branched, or cyclic aliphatic or substituted or unsubstituted aromatic hydrocarbon group. $R_{51}$, $R_{52}$, and $R_{53}$ each independently represent a linear, branched, or cyclic hydrocarbon group, and carbon atoms forming a branched structure may be linked together through an aliphatic or substituted or unsubstituted aromatic hydrocarbon. $m_2$ represents a number of 1 or more, and 1 to 20 are preferable; and $n_2$ represents a number of 1 or more, and 1 to 9 are preferable.

Among the compounds represented by the above formula (11), at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

propylene glycol dimethyl ether, propylene glycol diethyl ether, propylene glycol dipropyl ether, propylene glycol dibutyl ether, propylene glycol dipentyl ether, propylene glycol dihexyl ether, propylene glycol dimethoxyphenyl ether, polypropylene glycol dimethyl ether, polypropylene glycol diethyl ether, polypropylene glycol dipropyl ether, polypropylene glycol dibutyl ether, polypropylene glycol dipentyl ether, polypropylene glycol dihexyl ether, polypropylene glycol dimethoxyphenyl ether, methyl dioxahexane, methyl dioxaheptane, methyl dioxaoctane, methyl dioxanonane, methyl dioxadecane, methyl dioxaundecane, methyl dioxadodecane, methyl dioxamidecane, methyl dioxatetradecane, methyl dioxapentadecane, methyl dioxahexadecane, dimethyl dioxahexane, dimethyl dioxaheptane, dimethyl dioxaoctane, dimethyl dioxanonane, dimethyl dioxadecane, dimethyl dioxaundecane, dimethyl dioxadodecane, dimethyl dioxamidecane, dimethyl dioxatetradecane, dimethyl dioxapentadecane, dimethyl dioxahexadecane, trimethyl dioxahexane, trimethyl dioxaheptane, trimethyl dioxaoctane, trimethyl dioxanonane, trimethyl dioxadecane, trimethyl dioxaundecane, trimethyl dioxadodecane, trimethyl dioxamidecane, trimethyl dioxatetradecane, trimethyl dioxapentadecane, trimethyl dioxahexadecane, ethyl dioxahexane, ethyl dioxaheptane, ethyl dioxaoctane, ethyl dioxanonane, ethyl dioxadecane, ethyl dioxaundecane, ethyl dioxadodecane, ethyl dioxamidecane, ethyl dioxatetradecane, ethyl dioxapentadecane, ethyl dioxahexadecane, diethyl dioxahexane, diethyl dioxaheptane, diethyl dioxaoctane, diethyl dioxanonane, diethyl dioxadecane, diethyl dioxaundecane, diethyl dioxadodecane, diethyl dioxamidecane, diethyl dioxatetradecane, diethyl dioxapentadecane, diethyl dioxahexadecane, triethyl dioxahexane, triethyl dioxaheptane, triethyl dioxaoctane, triethyl dioxanonane, triethyl dioxadecane, triethyl dioxaundecane, triethyl dioxadodecane, triethyl dioxamidecane, triethyl dioxatetradecane, triethyl dioxapentadecane, triethyl dioxahexadecane, propyl dioxahexane, propyl dioxaheptane, propyl dioxaoctane, propyl dioxanonane, propyl dioxadecane, propyl dioxaundecane, propyl dioxadodecane, propyl dioxamidecane, propyl dioxatetradecane, propyl dioxapentadecane, propyl dioxahexadecane, dipropyl dioxahexane, dipropyl dioxaheptane, dipropyl dioxaoctane, dipropyl dioxanonane, dipropyl dioxadecane, dipropyl dioxaundecane, dipropyl dioxadodecane, dipropyl dioxamidecane, dipropyl dioxatetradecane, dipropyl dioxapentadecane, dipropyl dioxahexadecane, tripropyl dioxahexane, tripropyl dioxaheptane, tripropyl dioxaoctane, tripropyl dioxanonane, tripropyl dioxadecane, tripropyl dioxaundecane, tripropyl dioxadodecane, tripropyl dioxamidecane, tripropyl dioxatetradecane, tripropyl dioxapentadecane, tripropyl dioxahexadecane, butyl dioxahexane, butyl dioxaheptane, butyl dioxaoctane, butyl dioxanonane, butyl dioxadecane, butyl dioxaundecane, butyl dioxadodecane, butyl dioxamidecane, butyl dioxatetradecane, butyl dioxapentadecane, butyl dioxahexadecane, dibutyl dioxahexane, dibutyl dioxaheptane, dibutyl dioxaoctane, dibutyl dioxanonane, dibutyl dioxadecane, dibutyl dioxaundecane, dibutyl dioxadodecane, dibutyl dioxamidecane, dibutyl dioxatetradecane, dibutyl dioxapentadecane, dibutyl dioxahexadecane, tributyl dioxahexane, tributyl dioxaheptane, tributyl dioxaoctane, tributyl dioxanonane, tributyl dioxadecane, tributyl dioxaundecane, tributyl dioxadodecane, tributyl dioxamidecane, tributyl dioxatetradecane, tributyl dioxapentadecane, tributyl dioxahexadecane, methyl trioxanonane, methyl trioxadecane, methyl trioxaundecane, methyl trioxadodecane, methyl trioxamidecane, methyl trioxatetradecane, methyl trioxapentadecane, methyl trioxahexadecane, dimethyl trioxanonane, dimethyl trioxadecane, dimethyl trioxaundecane, dimethyl trioxadodecane, dimethyl trioxamidecane, dimethyl trioxatetradecane, dimethyl trioxapentadecane, dimethyl trioxahexadecane, trimethyl trioxanonane, trimethyl trioxadecane, trimethyl trioxaundecane trimethyl trioxadodecane, trimethyl trioxamidecane, trimethyl trioxatetradecane, trimethyl trioxapentadecane, trimethyl trioxahexadecane, ethyl trioxanonane, ethyl trioxadecane, ethyl trioxaundecane, ethyl trioxadodecane, ethyl trioxamidecane, ethyl trioxatetradecane, ethyl trioxapentadecane, ethyl trioxahexadecane, diethyl trioxanonane, diethyl trioxadecane, diethyl trioxaundecane, diethyl trioxadodecane, diethyl trioxamidecane, diethyl trioxatetradecane, diethyl trioxapentadecane, diethyl trioxahexadecane, triethyl trioxanonane, triethyl trioxadecane, triethyl trioxaundecane, triethyl trioxadodecane, triethyl trioxamidecane, triethyl trioxatetradecane, triethyl trioxapentadecane, triethyl trioxahexadecane, propyl trioxanonane, propyl trioxadecane, propyl trioxaundecane, propyl trioxadodecane, propyl trioxamidecane, propyl trioxatetradecane, propyl trioxapentadecane, propyl trioxahexadecane, dipropyl trioxanonane, dipropyl trioxadecane, dipropyl trioxaundecane, dipropyl trioxadodecane, dipropyl trioxamidecane, dipropyl trioxatetradecane, dipropyl trioxapentadecane, dipropyl trioxahexadecane, tripropyl trioxanonane, tripropyl trioxadecane, tripropyl trioxaundecane, tripropyl trioxadodecane, tripropyl trioxamidecane, tripropyl trioxatetradecane, tripropyl trioxapentadecane, tripropyl trioxahexadecane, butyl trioxanonane, butyl trioxadecane, butyl trioxaundecane, butyl trioxadodecane, butyl trioxamidecane, butyl trioxatetradecane, butyl trioxapentadecane, butyl trioxahexadecane, dibutyl trioxanonane, dibutyl trioxadecane, dibutyl trioxaundecane, dibutyl trioxadodecane, dibutyl trioxamidecane, dibutyl trioxatetradecane, dibutyl trioxapentadecane, dibutyl trioxahexadecane, tributyl trioxanonane, tributyl trioxadecane, tributyl trioxaundecane, tributyl trioxadodecane, tributyl trioxamidecane, tributyl trioxatetradecane, tributyl trioxapentadecane, tributyl trioxahexadecane, methyl tetraoxadodecane, methyl tetraoxamidecane, methyl tetraoxatetradecane, methyl tetraoxapentadecane, methyl tetraoxahexadecane, dimethyl tetraoxadodecane, dimethyl tetraoxamidecane, dimethyl tetraoxatetradecane, dimethyl tetraoxapentadecane, dimethyl tetraoxahexadecane, trimethyl tetraoxadodecane, trimethyl tetraoxamidecane, trimethyl tetraoxatetradecane, trimethyl tetraoxapentadecane, trimethyl tetraoxahexadecane, ethyl tetraoxadodecane, ethyl tetraoxamidecane, ethyl tetraoxatetradecane, ethyl tetraoxapentadecane, ethyl tetraoxahexadecane, diethyl tetraoxadodecane, diethyl tetraoxamidecane, diethyl tetraoxatetradecane, diethyl tetraoxapentadecane, diethyl tetraoxahexadecane, triethyl tetraoxadodecane, triethyl tetraoxamidecane, triethyl tetraoxatetradecane, triethyl tetraoxapentadecane, triethyl tetraoxahexadecane, propyl tetraoxadodecane, propyl tetraoxamidecane, propyl tetraoxatetradecane, propyl tetraoxapentadecane, propyl tetraoxahexadecane, dipropyl tetraoxadodecane, dipropyl tetraoxamidecane, dipropyl tetraoxatetradecane, dipropyl tetraoxapentadecane, dipropyl tetraoxahexadecane, tripropyl tetraoxadodecane, tripropyl tetraoxamidecane, tripropyl tetraoxatetradecane, tripropyl tetraoxapentadecane, tripropyl tetraoxahexadecane, butyl tetraoxadodecane, butyl tetraoxamidecane, butyl tetraoxatetradecane, butyl tetraoxapentadecane, butyl tetraoxahexadecane, dibutyl tetraoxadodecane, dibutyl tetraoxamidecane, dibutyl tetraoxatetradecane, dibutyl tetraoxapentadecane, dibutyl tetraoxahexadecane, tributyl tetraoxadodecane, tributyl tetraoxamidecane, tributyl tetraoxatetradecane, tributyl tetraoxapentadecane, tributyl tetraoxahexadecane.

More preferably, the branched ether compound is at least one compound selected from the following group:

propylene glycol dimethyl ether, propylene glycol diethyl ether, propylene glycol dibutyl ether, polypropylene glycol dimethyl ether, polypropylene glycol diethyl ether, polypropylene glycol dibutyl ether, methyl dioxahexane, methyl dioxaheptane, methyl dioxaoctane, methyl dioxanonane, methyl dioxadecane, methyl dioxaundecane, methyl dioxadodecane, methyl dioxamidecane, methyl dioxatetradecane, methyl dioxapentadecane, methyl dioxahexadecane, dimethyl dioxahexane, dimethyl dioxaheptane, dimethyl dioxaoctane, dimethyl dioxanonane, dimethyl dioxadecane, dimethyl dioxaundecane, dimethyl dioxadodecane, dimethyl dioxamidecane, dimethyl dioxatetradecane, dimethyl dioxapentadecane, dimethyl dioxahexadecane, ethyl dioxadecane, ethyl dioxaundecane, ethyl dioxadodecane, ethyl dioxamidecane, ethyl dioxatetradecane, ethyl dioxapentadecane, ethyl dioxahexadecane, diethyl dioxahexane, diethyl dioxaheptane, diethyl dioxaoctane, diethyl dioxanonane, diethyl dioxadecane, diethyl dioxaundecane, diethyl dioxadodecane, diethyl dioxamidecane, diethyl dioxatetradecane, diethyl dioxapentadecane, diethyl dioxahexadecane, methyl trioxanonane, methyl trioxadecane, methyl trioxaundecane, methyl trioxadodecane, methyl trioxamidecane, methyl trioxatetradecane, methyl trioxapentadecane, methyl trioxahexadecane, dimethyl trioxanonane, dimethyl trioxadecane, dimethyl trioxaundecane, dimethyl trioxadodecane, dimethyl trioxamidecane, dimethyl trioxatetradecane, dimethyl trioxapentadecane, dimethyl trioxahexadecane, ethyl trioxanonane, ethyl trioxadecane, ethyl trioxaundecane, ethyl trioxadodecane, ethyl trioxamidecane, ethyl trioxatetradecane, ethyl trioxapentadecane, ethyl trioxahexadecane, diethyl trioxanonane, diethyl trioxadecane, diethyl trioxaundecane, diethyl trioxadodecane, diethyl trioxamidecane, diethyl trioxatetradecane, diethyl trioxapentadecane, diethyl trioxahexadecane, methyl tetraoxadodecane, methyl tetraoxamidecane, methyl tetraoxatetradecane, methyl tetraoxapentadecane, methyl tetraoxahexadecane, dimethyl tetraoxadodecane, dimethyl tetraoxamidecane, dimethyl tetraoxatetradecane, dimethyl tetraoxapentadecane, dimethyl tetraoxahexadecane, ethyl tetraoxadodecane, ethyl tetraoxamidecane, ethyl tetraoxatetradecane, ethyl tetraoxapentadecane, ethyl tetraoxahexadecane, diethyl tetraoxadodecane, diethyl tetraoxamidecane, diethyl tetraoxatetradecane, diethyl tetraoxapentadecane, diethyl tetraoxahexadecane.

Further preferably, the branched ether compound is at least one compound selected from the following group:

propylene glycol dimethyl ether, propylene glycol diethyl ether, propylene glycol dibutyl ether, methyldioxahexane, methyldioxaheptane, methyldioxaoctane, methyldioxanonane, methyldioxadecane, methyltrioxanonane, methyltrioxadecane, and methyltetraoxatetradecane.

(Cyclic Ether Compound Containing Two or More Ether Groups)

Examples of the cyclic ether compound having two or more ether groups (hereinafter, referred to as a "cyclic ether compound") include ones represented by the following formula (12):

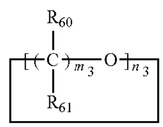

(12)

In the above formula (12), $R_{60}$ and $R_{61}$ each represent a hydrogen atom or a linear, branched, or cyclic aliphatic or substituted or unsubstituted aromatic hydrocarbon group. Moreover, carbon atoms forming a cyclic structure may be linked together through an aliphatic or aromatic hydrocarbon. $m_3$ represents a number of 1 or more, and 1 to 20 are preferable. $n_3$ represents a number of 2 or more, and 2 to 10 are preferable.

Among the compounds represented by the above formula (12), at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

1,3-dioxolane, 1,3-dioxane, 1,4-dioxane, methyl-1,3-dioxane, dimethyl-1,3-dioxane, trimethyl-1,3-dioxane, tetramethyl-1,3-dioxane, pentamethyl-1,3-dioxane, hexamethyl-1,3-dioxane, heptamethyl-1,3-dioxane, octamethyl-1,3-dioxane, ethyl-1,3-dioxane, diethyl-1,3-dioxane, triethyl-1,3-dioxane, tetraethyl-1,3-dioxane, pentaethyl-1,3-dioxane, hexaethyl-1,3-dioxane, heptaethyl-1,3-dioxane, octaethyl-1,3-dioxane, propyl-1,3-dioxane, dipropyl-1,3-dioxane, tripropyl-1,3-dioxane, tetrapropyl-1,3-dioxane, pentapropyl-1,3-dioxane, hexapropyl-1,3-dioxane, heptapropyl-1,3-dioxane, octapropyl-1,3-dioxane, butyl-1,3-dioxane, dibutyl-1,3-dioxane, tributyl-1,3-dioxane, tetrabutyl-1,3-dioxane, pentabutyl-1,3-dioxane, hexabutyl-1,3-dioxane, heptabutyl-1,3-dioxane, octabutyl-1,3-dioxane, methyl-1,4-dioxane, dimethyl-1,4-dioxane, trimethyl-1,4-dioxane, tetramethyl-1,4-dioxane, pentamethyl-1,4-dioxane, hexamethyl-1,4-dioxane, heptamethyl-1,4-dioxane, octamethyl-1,4-dioxane, ethyl-1,4-dioxane, diethyl-1,4-dioxane, triethyl-1,4-dioxane, tetraethyl-1,4-dioxane, pentaethyl-1,4-dioxane, hexaethyl-1,4-dioxane, heptaethyl-1,4-dioxane, octaethyl-1,4-dioxane, propyl-1,4-dioxane, dipropyl-1,4-dioxane, tripropyl-1,4-dioxane, tetrapropyl-1,4-dioxane, pentapropyl-1,4-dioxane, hexapropyl-1,4-dioxane, heptapropyl-1,4-dioxane, octapropyl-1,4-dioxane, butyl-1,4-dioxane, dibutyl-1,4-dioxane, tributyl-1,4-dioxane, tetrabutyl-1,4-dioxane, pentabutyl-1,4-dioxane, hexabutyl-1,4-dioxane, heptabutyl-1,4-dioxane, octabutyl-1,4-dioxane, trioxane, dioxacycloheptane, trioxacycloheptane, dioxacyclooctane, trioxacyclooctane, tetraoxacyclooctane, dioxacyclononane, trioxacyclononane, tetraoxacyclononane, dioxacyclodecane, trioxacyclodecane, tetraoxacyclodecane, pentaoxacyclodecane, 12-crown-4, benzo-12-crown-4, dibenzo-12-crown-4, naphtho-12-crown-4, dinaphtho-12-crown-4, 2,2'-binaphthyl-12-crown4,15-crown-5, benzo-15-crown-5, dibenzo-15-crown-5, naphtho-15-crown-5, dinaphtho-15-crown-5, 2,3-naphtho-15-crown-5,18-crown-6, benzo-18-crown-6, dibenzo-18-crown-6, naphtho-18-crown-6, dinaphtho-18-crown-6, dicyclohexano-18-crown-6,24-crown-8, benzo-24-crown-8, dibenzo-24-crown-8, naphtho-24-crown-8, dinaphtho-24-crown-8, dicyclohexano-24-crown-8,30-crown-10, benzo-30-crown-10, dibenzo-30-crown-10, naphtho-30-crown-10, dinaphtho-30-crown-10, dicyclohexano-30-crown-10.

More preferably, the cyclic ether compound is at least one compound selected from the following group:

1,3-dioxane, 1,4-dioxane, methyl-1,3-dioxane, dimethyl-1,3-dioxane, tetramethyl-1,3-dioxane, ethyl-1,3-dioxane, diethyl-1,3-dioxane, tetraethyl-1,3-dioxane, methyl-1,4-dioxane, dimethyl-1,4-dioxane, tetramethyl-1,4-dioxane, ethyl-1,4-dioxane, diethyl-1,4-dioxane, tetraethyl-1,4-dioxane, dioxacycloheptane, trioxacycloheptane, dioxacyclooctane, trioxacyclooctane, tetraoxacyclooctane, dioxacyclononane, trioxacyclononane, tetraoxacyclononane, dioxacyclodecane, 12-crown-4, benzo-12-crown-4,15-crown-5, benzo-15-crown-5,18-crown-6, benzo-18-crown-6.

Further preferably, the cyclic ether compound is at least one compound selected from the following group:

1,3-dioxane, 1,4-dioxane, 12-crown-4, benzo-12-crown-4, 15-crown-5, and 18-crown-6.

(Component (A-2): Trivalent Phosphorus Compound)

The component (A-2) of the present embodiment is a compound containing a trivalent phosphorus atom in the molecule. As the component (A-2), one trivalent phosphorus compound may be used alone, or a plurality of trivalent phosphorus compounds may be used in combination.

It is preferable that the trivalent phosphorus compound (A-2) should be a compound represented by the following formula (1) because there is a tendency that the polymerization of the episulfide compound (C) can be further suppressed, resulting in the further improved stability of the composition and/or there is a tendency that a side reaction can be further suppressed during polymerizing the episulfide compound (C):

(1)

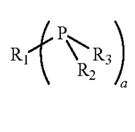

In the formula, a represents a number of 1 or more.

$R_1$ represents a linear, branched, or cyclic aliphatic hydrocarbon group having 1 to 33 carbon atoms, a substituted or unsubstituted aromatic hydrocarbon group, or a substituted or unsubstituted metallocenyl group.

$R_2$ and $R_3$ each independently represent a linear, branched, or cyclic aliphatic hydrocarbon group having 1 to 33 carbon atoms or a substituted or unsubstituted aromatic hydrocarbon group.

$R_1$ and $R_2$, $R_1$ and $R_3$, or $R_2$ and $R_3$ may be linked together.

In the case where a is 2 or more, a plurality of $R_2$ and $R_3$ groups present may be the same or different.

The $R_2$ groups or the $R_3$ groups may be linked together.

Specific examples of $R_1$, $R_2$, and $R_3$ in the above formula (1) in the case where $R_1$, $R_2$, and $R_3$ are not linked include the followings:

aliphatic hydrocarbon groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, henicosanyl, docosanyl, tricosanyl, tetracosanyl, pentacosanyl, hexacosanyl, heptacosanyl, octacosanyl, nonacosanyl, triacontanyl, hentriacontanyl, and dotriacontanyl (these groups may be linear, branched, or cyclic); aromatic hydrocarbon groups such as substituted or unsubstituted phenyl, naphthyl, and anthracenyl; and metallocenyl groups such as substituted or unsubstituted ferrocenyl, vanadocenyl, chromocenyl, cobaltocenyl, nickelocenyl, zirconocenyl, titanocenyl, ruthenocenyl, and hafnocenyl.

Specific examples of $R_1$, $R_2$, and $R_3$ in the formula (1) in the case where $R_1$ and $R_2$, $R_1$ and $R_3$, $R_2$ and $R_3$, the $R_2$ groups, or the $R_3$ groups are linked together include the followings:

aliphatic hydrocarbon groups such as methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, icosanylene, henicosanylene, docosanylene, tricosanylene, tetracosanylene, pentacosanylene, hexacosanylene, heptacosanylene, octacosanylene, nonacosanylene, triacontanylene, hentriacontanylene, and dotriacontanylene (these groups may be linear, branched, or cyclic); and aromatic hydrocarbon groups such as substituted or unsubstituted phenylene, naphthylene, and anthracenylene.

In the case where in the above formula (1), a is 1 and all of $R_1$, $R_2$, and $R_3$ are aromatic hydrocarbon groups, it is preferable that at least one of $R_1$, $R_2$, and $R_3$ should be a substituted aromatic hydrocarbon group because there is a tendency that the polymerization of the episulfide compound (C) can be further suppressed, resulting in the further improved stability of the composition and/or there is a tendency that a side reaction can be further suppressed during polymerizing the episulfide compound (C). From a similar viewpoint, it is more preferable that two or more of $R_1$, $R_2$, and $R_3$ should be substituted aromatic hydrocarbon groups. It is further preferable that all of $R_1$, $R_2$, and $R_3$ should be substituted aromatic hydrocarbon groups because of easy availability and because there is a tendency that cost as a composition can be further reduced, resulting in better economy.

A substituent constituting the substituted aromatic hydrocarbon group is not particularly limited and may be any of electron-donating groups (examples thereof include OR groups, OCOR groups, $NR_2$ groups, NHCOR groups, and alkyl groups, and R represents an aliphatic hydrocarbon group or an aromatic hydrocarbon group) and electron-withdrawing groups (examples thereof include a $CF_3$ group, a $CCl_3$ group, a $NO_2$ group, a CN group, a CHO group, COR groups, $CO_2R$ groups, $SO_2R$ groups, and $SO_3R$ groups; in this context, R represents an aliphatic hydrocarbon group or an aromatic hydrocarbon group).

The case where the substituent constituting the substituted aromatic hydrocarbon group is an electron-donating group is more preferable because there is a tendency that the polymerization of the episulfide compound (C) can be further suppressed, resulting in the further improved stability of the composition. The case where the substituent constituting the substituted aromatic hydrocarbon group is an electron-withdrawing group is more preferable because there is a tendency that a side reaction can be further suppressed during polymerizing the episulfide compound (C).

The number of substituents constituting the substituted aromatic hydrocarbon group is 1 or more. It is more preferable that the number of substituents should be 2 or more because there is a tendency that the polymerization of the episulfide compound (C) can be further suppressed, resulting in the further improved stability of the composition and/or there is a tendency that a side reaction can be further suppressed during polymerizing the episulfide compound (C).

It is preferable that the number of substituents constituting the substituted aromatic hydrocarbon group should be 9 or less because there is a tendency that residues of undissolved matter can be further reduced when preparing the composition, so that a composition with better homogeneity is obtained. It is more preferable that the number of substituents should be 5 or less because of easy availability and because there is a tendency that cost as a composition can be further reduced, resulting in better economy. From a similar viewpoint, it is further preferable that the number of substituents should be 3 or less.

It is preferable that the number of carbon atoms contained in the trivalent phosphorus compound (A-2) should be 3 or more because there is a tendency that a side reaction can be further suppressed during polymerizing the episulfide compound (C). It is more preferable that the number of carbon atoms should be 4 or more because there is a tendency that the polymerization of the episulfide compound (C) can be further suppressed when preparing the composition under room temperature, resulting in the further improved stability of the composition. It is further preferable that the number of carbon atoms should be 6 or more because there is a tendency that the vapor pressure of the trivalent phosphorus compound (A-2) becomes higher and handleability becomes much better. From a similar viewpoint, it is particularly preferable that the number of carbon atoms should be 9 or more.

It is preferable that the number of carbon atoms contained in the trivalent phosphorus compound (A-2) should be 52 or less because of easy availability and because there is a tendency that cost as a composition can be further reduced, resulting in better economy. From a similar viewpoint, it is more preferable that the number of carbon atoms should be 34 or less. It is further preferable that the number of carbon atoms should be 28 or less because there is a tendency that residues of undissolved matter can be further reduced when preparing the composition, so that a composition with better homogeneity is obtained. From a similar viewpoint, it is particularly preferable that the number of carbon atoms should be 24 or less.

It is preferable that the number of trivalent phosphorus atom(s) contained in the trivalent phosphorus compound (A-2) should be 1 or more because there is a tendency that the polymerization of the episulfide compound (C) can be further suppressed when preparing the composition under room temperature, resulting in the further improved stability of the composition. From a similar viewpoint, it is more preferable that the number of trivalent phosphorus atom(s) should be 2 or more.

It is preferable that the number of trivalent phosphorus atom(s) contained in the trivalent phosphorus compound (A-2) should be 8 or less because of easy availability and because there is a tendency that cost as a composition can be further reduced, resulting in excellent economy. From a similar viewpoint, it is more preferable that the number of phosphorus atom(s) should be 4 or less. It is further preferable that the number of trivalent phosphorus atom(s) should be 3 or less because there is a tendency that residues of undissolved matter can be further reduced when preparing the composition, so that a composition excellent in homogeneity is obtained.

Specific examples of the component (A-2) include trivalent phosphorus compounds each having one trivalent phosphorus atom, trivalent phosphorus compounds each having two trivalent phosphorus atoms, and trivalent phosphorus compounds each having three or more trivalent phosphorus atoms. These may be used alone, or a plurality thereof may be used in combination.

(Trivalent Phosphorus Compound Having One Trivalent Phosphorus Atom)

The trivalent phosphorus compound having one trivalent phosphorus atom is not particularly limited as long as being a compound containing one trivalent phosphorus atom, and specific examples thereof include compounds represented by the above formula (1) wherein a is 1.

Among the trivalent phosphorus compounds each having one trivalent phosphorus atom, at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

trimethyl phosphine, triethyl phosphine, tri-n-propyl phosphine, triisopropyl phosphine, tricyclopropyl phosphine, tri(methyl cyclopropyl)phosphine, tri-n-butyl phosphine, triisobutyl phosphine, tri-sec-butyl phosphine, tri-tert-butyl phosphine, tricyclobutyl phosphine, tri(methyl cyclobutyl) phosphine, trimethyl butyl phosphine, tri(dimethyl butyl) phosphine, tri(ethyl butyl)phosphine, tri(diethyl butyl)phosphine, tripentyl phosphine, tricyclopentyl phosphine, tri(methyl cyclopentyl)phosphine, tri(methylpentyl)phosphine, tri(dimethyl pentyl)phosphine, tri(ethyl pentyl)phosphine, tri(diethyl pentyl)phosphine, trihexyl phosphine, tricyclohexyl phosphine, tri(methylcyclohexyl)phosphine, tri(methylhexyl)phosphine, tri(dimethyl hexyl)phosphine, tri(ethylhexyl) phosphine, tri(diethyl pentyl)phosphine, triheptyl phosphine, tricycloheptyl phosphine, tri(methyl cycloheptyl)phosphine, tri(methylheptyl)phosphine, tri(dimethyl heptyl)phosphine, tri(ethyl heptyl)phosphine, tri(diethyl heptyl)phosphine, trioctyl phosphine, tricyclooctyl phosphine, tri(methyl cyclooctyl)phosphine, tri(methyl octyl)phosphine, tri(dimethyl octyl)phosphine, tri(ethyl octyl)phosphine, tri(diethyl octyl) phosphine, trinonyl phosphine, tricyclononyl phosphine, tri(methyl cyclononyl)phosphine, tri(methyl nonyl)phosphine, tri(dimethyl nonyl)phosphine, tri(ethyl nonyl)phosphine, tri(diethyl nonyl)phosphine, tridecyl phosphine, tricyclodecyl phosphine, tri(methyl cyclodecyl)phosphine, tri(methyl decyl)phosphine, tri(dimethyl decyl)phosphine, tri(ethyl decyl)phosphine, tri(diethyl decyl)phosphine, triundecyl phosphine, tri(methyl undecyl)phosphine, tri(ethyl undecyl) phosphine, tridodecyl phosphine, tri(methyl dodecyl)phosphine, tri(ethyl dodecyl)phosphine, tritridecyl phosphine, tri(methyl tridecyl)phosphine, tri (ethyl tridecyl)phosphine, tritetradecyl phosphine, tri(methyl tetradecyl)phosphine, tri(ethyl tetradecyl)phosphine, tripentadecyl phosphine, tri(methyl pentadecyl)phosphine, tri (ethyl pentadecyl)phosphine, trihexadecyl phosphine, tri(methyl hexadecyl)phosphine, tri(ethyl hexadecyl)phosphine, triheptadecyl phosphine, tri(methyl heptadecyl)phosphine, tri(ethyl heptadecyl)phosphine, trioctadecyl phosphine, tri (methyl octadecyl)phosphine, tri(ethyl octadecyl)phosphine, trinonadecyl phosphine, tri(methyl nonadecyl)phosphine, tri (ethyl nonadecyl)phosphine, triicosanyl phosphine, triheni-cosanyl phosphine, tridocosanyl phosphine, tritricosanyl phosphine, tritetracosanyl phosphine, tripentacosanyl phosphine, trihexacosanyl phosphine, triheptacosanyl phosphine, trioctacosanyl phosphine, trinonacosanyl phosphine, tritriacontanyl phosphine, triphenyl phosphine, tri(methylphenyl) phosphine, tri(ethylphenyl)phosphine, tri(propyl phenyl) phosphine, tri(butylphenyl)phosphine, tri(methoxyphenyl) phosphine, tri(dimethyl aminophenyl)phosphine, tri (trifluoromethylphenyl)phosphine, tri(nitrophenyl) phosphine, tri(cyanophenyl)phosphine, tri(acetyl phenyl) phosphine, tri(fluorophenyl)phosphine, tri(dimethylphenyl) phosphine, tri(diethyl phenyl)phosphine, tri(dipropyl) phenylphosphine, tri(dibutylphenyl)phosphine, tri (dimethoxyphenyl)phosphine, tri[bis(dimethylamino) phenyl]phosphine, tri[bis(trifluoromethyl)phenyl] phosphine, tri(dinitrophenyl)phosphine, tri(dicyanophenyl) phosphine, tri(diacetyl phenyl)phosphine, tri (difluorophenyl)phosphine, tri(trimethylphenyl)phosphine, tri(triethyl phenyl)phosphine, tri(tripropyl phenyl)phosphine, tri(tributylphenyl)phosphine, tri(trimethoxyphenyl) phosphine, tri[tris(dimethylamino)phenyl]phosphine, tri[tris (trifluoromethyl)phenyl]phosphine, tri(trinitrophenyl) phosphine, tri(tricyanophenyl)phosphine, tri(triacetyl phenyl)phosphine, tri(pentafluorophenyl)phosphine, tribenzyl phosphine, trinaphthyl phosphine, tri(methyl naphthyl) phosphine, tri(ethyl naphthyl)phosphine, tri(propyl naphthyl)phosphine, tri(butyl naphthyl)phosphine, trianthracenyl phosphine;

diethyl methyl phosphine, dipropyl methyl phosphine, dibutyl methyl phosphine, dipentyl methyl phosphine, dihexyl methyl phosphine, dicyclohexyl methyl phosphine, dioctyl methyl phosphine, diphenyl methyl phosphine, di(methylphenyl)methyl phosphine, di(butylphenyl)methyl phosphine, di(dimethylphenyl)methyl phosphine, di(dipropyl)methylphenyl phosphine, di(dibutylphenyl)methyl phosphine, di(trimethylphenyl)methyl phosphine, di(tributylphenyl)methyl phosphine, dinaphthyl methyl phosphine, dimethyl ethyl phosphine, dipropyl ethyl phosphine, dibutyl ethyl phosphine, dipentyl ethyl phosphine, dihexyl ethyl phosphine, dicyclohexyl ethyl phosphine, dioctyl ethyl phosphine, diphenyl ethyl phosphine, di(methylphenyl)ethyl phosphine, di(butylphenyl)ethyl phosphine, di(dimethylphenyl)ethyl phosphine, di(dibutylphenyl)ethyl phosphine, di(trimethylphenyl)ethyl phosphine, di(tributylphenyl)ethyl phosphine, dinaphthyl ethyl phosphine, dimethyl propyl phosphine, diethyl propyl phosphine, dibutyl propyl phosphine, dipentyl propyl phosphine, dihexyl propyl phosphine, dicyclohexyl propyl phosphine, dioctyl propyl phosphine, diphenyl propyl phosphine, di(methylphenyl)propyl phosphine, di(butylphenyl)propyl phosphine, di(dimethylphenyl)propyl phosphine, di(dibutylphenyl)propyl phosphine, di(trimethylphenyl)propyl phosphine, di(tributylphenyl)propyl phosphine, dinaphthyl propyl phosphine, dimethyl butyl phosphine, diethyl butyl phosphine, dipropyl butyl phosphine, dipentyl butyl phosphine, dihexyl butyl phosphine, dicyclohexyl butyl phosphine, dioctyl butyl phosphine, diphenyl butyl phosphine, di(methylphenyl)butyl phosphine, di(butylphenyl)butyl phosphine, di(dimethylphenyl)butyl phosphine, di(dibutylphenyl)butyl phosphine, di(trimethylphenyl)butyl phosphine, di(tributylphenyl)butyl phosphine, dinaphthyl butyl phosphine, dimethyl pentyl phosphine, diethyl pentyl phosphine, dipropyl pentyl phosphine, dibutyl pentyl phosphine, dihexyl pentyl phosphine, dicyclohexyl pentyl phosphine, dioctyl pentyl phosphine, diphenyl pentyl phosphine, di(methylphenyl)pentyl phosphine, di(butylphenyl)pentyl phosphine, di(dimethylphenyl)pentyl phosphine, di(dibutylphenyl)pentyl phosphine, di(trimethylphenyl)pentyl phosphine, di(tributylphenyl)pentyl phosphine, dinaphthyl pentyl phosphine, dimethyl hexyl phosphine, diethyl hexyl phosphine, dipropyl hexyl phosphine, dibutyl hexyl phosphine, dipentyl hexyl phosphine, dicyclohexyl hexyl phosphine, dioctyl hexyl phosphine, diphenyl hexyl phosphine, di(methylphenyl) hexyl phosphine, di(butylphenyl)hexyl phosphine, di(dimethylphenyl)hexyl phosphine, di(dibutylphenyl)hexyl phosphine, di(trimethylphenyl)hexyl phosphine, di(tributylphenyl)hexyl phosphine, dinaphthyl hexyl phosphine, dimethyl cyclohexyl phosphine, diethyl cyclohexyl phosphine, dipropyl cyclohexyl phosphine, dibutyl cyclohexyl phosphine, dipentyl cyclohexyl phosphine, dihexyl cyclohexyl phosphine, dioctyl cyclohexyl phosphine, diphenyl cyclohexyl phosphine, di(methylphenyl)cyclohexyl phosphine, di(butylphenyl)cyclohexyl phosphine, di(dimethylphenyl)cyclohexyl phosphine, di(dibutylphenyl)cyclohexyl phosphine, di(trimethylphenyl)cyclohexyl phosphine, di(tributylphenyl)cyclohexyl phosphine, dinaphthyl cyclohexyl phosphine, dimethyl octyl phosphine, diethyl octyl phosphine, dipropyl octyl phosphine, diisopropyl octyl phosphine, dibutyl octyl phosphine, dipentyl octyl phosphine, dihexyl octyl phosphine, dicyclohexyl octyl phosphine, diphenyl octyl phosphine, di(methylphenyl)octyl phosphine, di(butylphenyl)octyl phosphine, di(dimethylphenyl)octyl phosphine, di(dibutylphenyl)octyl phosphine, di(trimethylphenyl)octyl phosphine, di(tributylphenyl)octyl phosphine, dinaphthyl octyl phosphine, dimethylphenyl phosphine, diethyl phenyl phosphine, dipropyl phenyl phosphine, dicyclopropyl phenyl phosphine, dibutylphenyl phosphine, dipentyl phenyl phosphine, dihexyl phenyl phosphine, dicyclohexyl phenyl phosphine, dioctyl phenyl phosphine, di(methylphenyl)phenylphosphine, di(propyl phenyl)phenylphosphine, di(butylphenyl)phenylphosphine, di(methoxyphenyl)phenylphosphine, bis[(dimethylamino)phenyl]phenylphosphine, bis[(trifluoromethyl)phenyl]phenylphosphine, di(nitrophenyl)phenylphosphine, di(cyanophenyl)phenylphosphine, di(acetyl phenyl)phenylphosphine, di(pentafluorophenyl)phenylphosphine, di(dimethylphenyl)phenylphosphine, di(dipropyl phenyl) phenylphosphine, di(dibutylphenyl)phenylphosphine, di(dimethoxyphenyl)phenylphosphine, di[bis(dimethylamino)phenyl]phenylphosphine, di[bis(trifluoromethyl) phenyl]phenylphosphine, bis(dinitrophenyl)phenylphosphine, bis(dicyanophenyl)phenylphosphine, bis(diacetyl phenyl)phenylphosphine, di(trimethylphenyl)phenylphosphine, di(tripropyl phenyl)phenylphosphine, di(tributylphenyl)phenylphosphine, di(trimethoxyphenyl)phenylphosphine, di[tris(dimethylamino)phenyl]phenylphosphine, di[tris(trifluoromethyl)phenyl]phenylphosphine, bis(trinitrophenyl)phenylphosphine, bis(tricyanophenyl)phenylphosphine, bis(triacetyl phenyl)phenylphosphine, (methylphenyl) dimethyl phosphine, (methylphenyl)diethyl phosphine, (methylphenyl)dipropyl phosphine, (methylphenyl)dicyclopropyl phosphine, (methylphenyl)dibutyl phosphine, (methylphenyl)dipentyl phosphine, (methylphenyl)dihexyl phosphine, (methylphenyl)dicyclohexyl phosphine, (methylphenyl)dioctyl phosphine, (methylphenyl)diphenyl phosphine, (methylphenyl)di(propyl phenyl)phosphine, (methylphenyl)di(butylphenyl)phosphine, (methylphenyl)di(dimethylphenyl)phosphine, (methylphenyl)di(dipropyl phenyl)phosphine, (methylphenyl)di(dibutylphenyl)phosphine, (methylphenyl)di(trimethylphenyl)phosphine, (methylphenyl)di(tripropyl phenyl)phosphine, (methylphenyl)di(tributylphenyl)phosphine, (methoxyphenyl)diphenyl phosphine, (dimethylamino)phenyl diphenyl phosphine, (trifluoromethyl)phenyl diphenyl phosphine, (nitrophenyl)diphenyl phosphine, (cyanophenyl)diphenyl phosphine, (acetyl phenyl) diphenyl phosphine, (pentafluorophenyl)diphenyl phosphine, (dimethoxyphenyl)diphenyl phosphine, [bis(dimethylamino)phenyl]diphenyl phosphine, [bis(trifluoromethyl)phenyl]diphenyl phosphine, (dinitrophenyl)diphenyl phosphine, (dicyanophenyl)diphenyl phosphine, (diacetyl phenyl)diphenyl phosphine, (trimethoxyphenyl) diphenyl phosphine, [tris(dimethylamino)phenyl]diphenyl phosphine, [tris(trifluoromethyl)phenyl]diphenyl phosphine, (trinitrophenyl)diphenyl phosphine, (tricyanophenyl)diphenyl phosphine, (triacetyl phenyl)diphenyl phosphine, di(methoxyphenyl)(methylphenyl)phosphine, bis[(dimethylamino)phenyl](methylphenyl)phosphine, bis[(trifluoromethyl)phenyl](methylphenyl)phosphine, di(nitrophenyl)methylphenyl phosphine, di(cyanophenyl)(methylphenyl) phosphine, di(acetyl phenyl)(methylphenyl)phosphine, di(pentafluorophenyl)(methylphenyl)phosphine, di(dimethoxyphenyl)(methylphenyl)phosphine, di[bis(dimethylamino)phenyl](methylphenyl)phosphine, di[bis(trifluoromethyl)phenyl](methylphenyl)phosphine, bis(dinitrophenyl)(methylphenyl)phosphine, bis(dicyanophenyl)(methylphenyl)phosphine, bis(diacetyl phenyl)(methylphenyl)phosphine, di(trimethoxyphenyl)(methylphenyl)phosphine, di[tris(dimethylamino)phenyl](methylphenyl)phosphine, di[tris(trifluoromethyl)phenyl](methylphenyl)phosphine, bis(trinitrophenyl)(methylphenyl)phosphine, bis(tricyanophenyl)(methylphenyl)phosphine, bis(triacetyl phenyl)(methylphenyl)phosphine, (dimethylphenyl)dimethyl phosphine, (dimethylphenyl)diethyl phosphine, (dimethylphenyl)dipropyl phosphine, (dimethylphenyl)dicyclopropyl phosphine, (dimethylphenyl)dibutyl phosphine, (dimethylphenyl)dipentyl phosphine, (dimethylphenyl)dihexyl phosphine, (dimethylphenyl)dicyclohexyl phosphine, (dimethylphenyl)dioctyl phosphine, (dimethylphenyl)diphenyl phosphine, (dimethylphenyl)di(methylphenyl)phosphine, (dimethylphenyl)di(propyl phenyl)phosphine, (dimethylphenyl)di(butylphenyl)phosphine, (dimethylphenyl)di(dimethylphenyl)phosphine, (dimethylphenyl)di(dipropyl phenyl) phosphine, (dimethylphenyl)di(dibutylphenyl)phosphine, (dimethylphenyl)di(trimethylphenyl)phosphine, (dimethylphenyl)di(tripropyl phenyl)phosphine, (dimethylphenyl)di(tributylphenyl)phosphine, di(methoxyphenyl)(dimethylphenyl)phosphine, bis[(dimethylamino)phenyl](dimethylphenyl)phosphine, bis[(trifluoromethyl)phenyl](dimethylphenyl)phosphine, di(nitrophenyl)(dimethylphenyl)phosphine, di(cyanophenyl)(dimethylphenyl)phosphine, di(acetyl phenyl)(dimethylphenyl)phosphine, di(pentafluorophenyl)(dimethylphenyl)phosphine, di(dimethoxyphenyl)(dimethylphenyl)phosphine, di[bis(dimethylamino)phenyl](dimethylphenyl)phosphine, di[bis(trifluoromethyl)phenyl](dimethylphenyl)phosphine, bis(dinitrophenyl)(dimethylphenyl)phosphine, bis(dicyanophenyl)(dimethylphenyl)phosphine, bis(diacetyl phenyl)(dimethylphenyl)phosphine, di(trimethoxyphenyl)(dimethylphenyl)phosphine, di[tris(dimethylamino)phenyl](dimethylphenyl)phosphine, di[tris(trifluoromethyl)phenyl](dimethylphenyl)phosphine, bis(trinitrophenyl)(dimethylphenyl)phosphine, bis(tricyanophenyl)(dimethylphenyl)phosphine, bis(triacetyl phenyl)(dimethylphenyl)phosphine, (trimethylphenyl)dimethyl phosphine, (trimethylphenyl)diethyl phosphine, (trimethylphenyl)dipropyl phosphine, (trimethylphenyl)dicyclopropyl phosphine, (trimethylphenyl)dibutyl phosphine, (trimethylphenyl)dipentyl phosphine, (trimethylphenyl)dihexyl phosphine, (trimethylphenyl)dicyclohexyl phosphine, (trimethylphenyl)dioctyl phosphine, (trimethylphenyl) diphenyl phosphine, (trimethylphenyl)di(methylphenyl) phosphine, (trimethylphenyl)di(propyl phenyl)phosphine, (trimethylphenyl)di(butylphenyl)phosphine, (trimethylphenyl)di(dimethylphenyl)phosphine, (trimethylphenyl)di(dipropyl phenyl)phosphine, (trimethylphenyl)di(dibutylphenyl)phosphine, (trimethylphenyl)di(tripropyl phenyl) phosphine, (trimethylphenyl)di(tributylphenyl)phosphine, di(methoxyphenyl)(trimethylphenyl)phosphine, bis[(dimethylamino)phenyl](trimethylphenyl)phosphine, bis[(trifluoromethyl)phenyl](trimethylphenyl)phosphine, di(nitrophenyl)(trimethylphenyl)phosphine, di(cyanophenyl)(trimethylphenyl)phosphine, di(acetyl phenyl)(trimethylphenyl)phosphine, di(pentafluorophenyl)(trimethylphenyl)phosphine, di(dimethoxyphenyl)(trimethylphenyl)phosphine, di[bis(dimethylamino)phenyl](trimethylphenyl)phosphine, di[bis(trifluoromethyl)phenyl](trimethylphenyl)phosphine, bis(dinitrophenyl)(trimethylphenyl)phosphine, bis(dicyanophenyl)(trimethylphenyl)phosphine, bis(diacetyl phenyl)(trimethylphenyl)phosphine, di(trimethoxyphenyl)(trimethylphenyl)phosphine, di[tris(dimethylamino)phenyl](trimethylphenyl)phosphine, di[tris(trifluoromethyl)phenyl](trimethylphenyl)phosphine, bis(trinitrophenyl)(trimethylphenyl)phosphine, bis(tricyanophenyl)(trimethylphenyl)phosphine, bis(triacetyl phenyl)(trimethylphenyl)phosphine, (tripropyl phenyl)dimethyl phosphine, (tripropyl phenyl) diethyl phosphine, (tripropyl phenyl)dipropyl phosphine, (tripropyl phenyl)dicyclopropyl phosphine, (tripropyl phenyl)dibutyl phosphine, (tripropyl phenyl)dipentyl phosphine, (tripropyl phenyl)dihexyl phosphine, (tripropyl phenyl)dicyclohexyl phosphine, (tripropyl phenyl)dioctyl phosphine, (tripropyl phenyl)diphenyl phosphine, (tripropyl phenyl)di(methylphenyl)phosphine, (tripropyl phenyl)di(propyl phenyl)phosphine, (tripropyl phenyl)di(butylphenyl)phosphine, (tripropyl phenyl)di(dimethylphenyl)phosphine, (tripropyl phenyl)di(dipropyl phenyl)phosphine, (tripropyl phenyl)di(dibutylphenyl)phosphine, (tripropyl phenyl)di(trimethylphenyl)phosphine, (tripropyl phenyl)di(tributylphenyl) phosphine, (tributylphenyl)dimethyl phosphine, (tributylphenyl)diethyl phosphine, (tributylphenyl)dipropyl phosphine, (tributylphenyl)dicyclopropyl phosphine, (tributylphenyl)dibutyl phosphine, (tributylphenyl)dipentyl phosphine, (tributylphenyl)dihexyl phosphine, (tributylphenyl)dicyclohexyl phosphine, (tributylphenyl)dioctyl phosphine, (tributylphenyl)diphenyl phosphine, (tributylphenyl)di(methylphenyl)phosphine, (tributylphenyl)di(propyl phenyl) phosphine, (tributylphenyl)di(butylphenyl)phosphine, (tributylphenyl)di(dimethylphenyl)phosphine, (tributylphenyl)di(dipropyl phenyl)phosphine, (tributylphenyl)di(dibutylphenyl)phosphine, (tributylphenyl)di(trimethylphenyl) phosphine, (tributylphenyl)di(tripropyl phenyl)phosphine, dimethyl naphthyl phosphine, diethyl naphthyl phosphine, dipropyl naphthyl phosphine, dicyclopropyl naphthyl phosphine, dibutyl naphthyl phosphine, dipentyl naphthyl phosphine, dihexyl naphthyl phosphine, dicyclohexyl naphthyl phosphine, dioctyl naphthyl phosphine, diphenyl naphthyl phosphine, di(methylphenyl)naphthyl phosphine, di(propyl phenyl)naphthyl phosphine, di(butylphenyl)naphthyl phosphine, di(dimethylphenyl)naphthyl phosphine, di(dipropyl phenyl)naphthyl phosphine, di(dibutylphenyl)naphthyl phosphine, di(trimethylphenyl)naphthyl phosphine, di(tripropyl phenyl)naphthyl phosphine, di(tributylphenyl) naphthyl phosphine, methyl ethyl propyl phosphine, methyl ethyl butyl phosphine, methyl ethyl pentyl phosphine, methyl ethyl pentyl phosphine, methyl ethyl hexyl phosphine, methyl ethyl cyclohexyl phosphine, methyl ethyl octyl phosphine, methyl ethyl phenyl phosphine, methylethyl(methylphenyl)phosphine, methylethyl(propyl phenyl)phosphine, methylethyl(butylphenyl)phosphine, methylethyl(dimethylphenyl)phosphine, methyl ethyl(dipropyl phenyl)phosphine, methylethyl(dibutylphenyl)phosphine, methylethyl(trimethylphenyl)phosphine, methylethyl(tripropyl phenyl) phosphine, methylethyl(tributylphenyl)phosphine, methyl ethyl naphthyl phosphine, methyl hexyl cyclohexyl phosphine, methyl hexyl octyl phosphine, methyl hexyl phenyl phosphine, methylhexyl(methylphenyl)phosphine, methylhexyl(butylphenyl)phosphine, methylhexyl(dimethylphenyl)phosphine, methylhexyl(dibutylphenyl)phosphine, methylhexyl(trimethylphenyl)phosphine, methylhexyl (tributylphenyl)phosphine, methyl cyclohexyl octyl phosphine, methyl cyclohexyl phenyl phosphine, methylcyclohexyl(methylphenyl)phosphine, methylcyclohexyl (butylphenyl)phosphine, methylcyclohexyl(dimethylphenyl) phosphine, methylcyclohexyl(dibutylphenyl)phosphine, methylcyclohexyl(trimethylphenyl)phosphine, methylcyclohexyl(tributylphenyl)phosphine, methyl cyclohexyl naphthyl phosphine, methylphenyl(methylphenyl)phosphine, methylphenyl (butylphenyl)phosphine, methylphenyl(dimethylphenyl) phosphine, methylphenyl(dibutylphenyl)phosphine, methylphenyl(trimethylphenyl)phosphine, methylphenyl (tributylphenyl)phosphine, methylphenyl naphthyl phosphine, methyl(dimethylphenyl)(dibutylphenyl)phosphine, methyl(dimethylphenyl)(trimethylphenyl)phosphine, methyl(dimethylphenyl)(tributylphenyl)phosphine, methyl (dimethylphenyl)anthracenyl phosphine, methyl(trimethylphenyl)(tributylphenyl)phosphine, butyl ethyl pentyl phosphine, butyl ethyl hexyl phosphine, butyl ethyl cyclohexyl phosphine, butyl ethyl octyl phosphine, butyl ethyl phenyl phosphine, butyl ethyl(methylphenyl)phosphine, butyl ethyl (butylphenyl)phosphine, butyl ethyl(dimethylphenyl)phosphine, butyl ethyl(dibutylphenyl)phosphine, butyl ethyl(trimethylphenyl)phosphine, butyl ethyl(tributylphenyl) phosphine, butyl ethyl naphthyl phosphine, ethyl hexyl cyclohexyl phosphine, ethyl hexyl octyl phosphine, ethyl hexyl phenyl phosphine, ethylhexyl(methylphenyl)phosphine, ethylhexyl(butylphenyl)phosphine, ethylhexyl(dimethylphenyl)phosphine, ethylhexyl(dibutylphenyl)phosphine, ethylhexyl(trimethylphenyl)phosphine, ethylhexyl (tributylphenyl)phosphine, ethyl hexyl naphthyl phosphine, ethyl cyclohexyl octyl phosphine, ethyl cyclohexyl phenyl phosphine, ethyl cyclohexyl(methylphenyl)phosphine, ethyl cyclohexyl(butylphenyl)phosphine, ethyl cyclohexyl(dimethylphenyl)phosphine, ethyl cyclohexyl(dibutylphenyl) phosphine, ethyl cyclohexyl(trimethylphenyl)phosphine, ethyl cyclohexyl(tributylphenyl)phosphine, ethylphenyl(methylphenyl)phosphine, ethylphenyl(butylphenyl)phosphine, ethylphenyl(dimethylphenyl)phosphine, ethylphenyl (dibutylphenyl)phosphine, ethylphenyl(trimethylphenyl) phosphine, ethylphenyl(tributylphenyl)phosphine, ethyl phenyl naphthyl phosphine, ethyl(methylphenyl)(butylphenyl)phosphine, ethyl(methylphenyl)(dimethylphenyl)phosphine, ethyl(methylphenyl)(dibutylphenyl)phosphine, ethyl (methylphenyl)(trimethylphenyl)phosphine, ethyl (methylphenyl)(tributylphenyl)phosphine, ethyl (dimethylphenyl)(dibutylphenyl)phosphine, ethyl (dimethylphenyl)(trimethylphenyl)phosphine, ethyl (dimethylphenyl)(tributylphenyl)phosphine, ethyl(trimethylphenyl)(tributylphenyl)phosphine, propyl hexyl cyclohexyl phosphine, propyl hexyl octyl phosphine, propyl hexyl phenyl phosphine, propyl hexyl(methylphenyl) phosphine, propyl hexyl(butylphenyl)phosphine, propyl hexyl(dimethylphenyl)phosphine, propyl hexyl(dibutylphenyl)phosphine, propyl hexyl(trimethylphenyl)phosphine, propyl hexyl(tributylphenyl)phosphine, propyl cyclohexyl octyl phosphine, propyl cyclohexyl phenyl phosphine, propyl cyclohexyl(methylphenyl)phosphine, propyl cyclohexyl(butylphenyl)phosphine, propyl cyclohexyl(dimethylphenyl) phosphine, propyl cyclohexyl(dibutylphenyl)phosphine, propyl cyclohexyl(trimethylphenyl)phosphine, propyl cyclohexyl(tributylphenyl)phosphine, propyl(methylphenyl) (dimethylphenyl)phosphine, propyl(methylphenyl)(dibutylphenyl)phosphine, propyl(methylphenyl)(trimethylphenyl)phosphine, propyl(methylphenyl)(tributylphenyl) phosphine, propyl(dimethylphenyl)(dibutylphenyl) phosphine, propyl(dimethylphenyl)(trimethylphenyl) phosphine, propyl(dimethylphenyl)(tributylphenyl) phosphine, propyl(trimethylphenyl)(tributylphenyl) phosphine, butyl hexyl cyclohexyl phosphine, butyl hexyl octyl phosphine, butyl hexyl phenyl phosphine, butyl hexyl (methylphenyl)phosphine, butyl hexyl(butylphenyl)phosphine, butyl hexyl(dimethylphenyl)phosphine, butyl hexyl (dibutylphenyl)phosphine, butyl hexyl(trimethylphenyl) phosphine, butyl hexyl(tributylphenyl)phosphine, butyl cyclohexyl octyl phosphine, butyl cyclohexyl phenyl phosphine, butyl cyclohexyl(methylphenyl)phosphine, butyl cyclohexyl(butylphenyl)phosphine, butyl cyclohexyl(dimethylphenyl)phosphine, butyl cyclohexyl(dibutylphenyl) phosphine, butyl cyclohexyl(trimethylphenyl)phosphine, butyl cyclohexyl(tributylphenyl)phosphine, butyl cyclohexyl naphthyl phosphine, butylphenyl(methylphenyl)phosphine, butylphenyl(butylphenyl)phosphine, butylphenyl(dimethylphenyl)phosphine, butylphenyl(dibutylphenyl)phosphine, butylphenyl(trimethylphenyl)phosphine, butylphenyl(tributylphenyl) phosphine, butyl(methylphenyl)(butylphenyl)phosphine, butyl(methylphenyl)(dimethylphenyl)phosphine, butyl(methylphenyl)(dibutylphenyl)phosphine, butyl(methylphenyl) (trimethylphenyl)phosphine, butyl(methylphenyl)(tributylphenyl)phosphine, butyl(methylphenyl)anthracenyl phosphine, butyl(dimethylphenyl)(dibutylphenyl)phosphine, butyl(dimethylphenyl)(trimethylphenyl)phosphine, butyl(dimethylphenyl)(tributylphenyl)phosphine, butyl(trimethylphenyl)(tributylphenyl)phosphine, pentyl hexyl octyl phosphine, pentyl hexyl phenyl phosphine, pentyl hexyl(methylphenyl)phosphine, pentyl hexyl(butylphenyl)phosphine, pentyl hexyl(dimethylphenyl)phosphine, pentyl hexyl (dibutylphenyl)phosphine, pentyl hexyl(trimethylphenyl) phosphine, pentyl hexyl(tributylphenyl)phosphine, pentyl cyclohexyl octyl phosphine, pentyl cyclohexyl phenyl phosphine, pentyl cyclohexyl(methylphenyl)phosphine, pentyl cyclohexyl(butylphenyl)phosphine, pentyl cyclohexyl(dimethylphenyl)phosphine, pentyl cyclohexyl(dibutylphenyl) phosphine, pentyl cyclohexyl(trimethylphenyl)phosphine, pentyl cyclohexyl(tributylphenyl)phosphine, pentyl phenyl (methylphenyl)phosphine, pentyl phenyl(butylphenyl)phosphine, pentyl phenyl(dimethylphenyl)phosphine, pentyl phenyl(dibutylphenyl)phosphine, pentyl phenyl (trimethylphenyl)phosphine, pentyl phenyl(tributylphenyl) phosphine, pentyl phenyl naphthyl phosphine, pentyl (methylphenyl)(butylphenyl)phosphine, pentyl (methylphenyl)(dimethylphenyl)phosphine, pentyl (methylphenyl)(dibutylphenyl)phosphine, pentyl (methylphenyl)(trimethylphenyl)phosphine, pentyl (methylphenyl)(tributylphenyl)phosphine, pentyl(dimethylphenyl)(dibutylphenyl)phosphine, pentyl (dimethylphenyl)(trimethylphenyl)phosphine, pentyl(dimethylphenyl)(tributylphenyl)phosphine, pentyl(trimethylphenyl)(tributylphenyl)phosphine, hexyl cyclohexyl octyl phosphine, hexyl cyclohexyl phenyl phosphine, hexyl cyclohexyl(methylphenyl)phosphine, hexyl cyclohexyl(butylphenyl)phosphine, hexyl cyclohexyl(dimethylphenyl)phosphine, hexyl cyclohexyl(dibutylphenyl)phosphine, hexyl cyclohexyl(trimethylphenyl)phosphine, hexyl cyclohexyl (tributylphenyl)phosphine, hexyl phenyl(methylphenyl) phosphine, hexyl phenyl(butylphenyl)phosphine, hexyl phenyl(dimethylphenyl)phosphine, hexyl phenyl(dibutylphenyl) phosphine, hexyl phenyl(trimethylphenyl)phosphine, hexyl phenyl(tributylphenyl)phosphine, hexyl phenyl naphthyl phosphine, hexyl(methylphenyl)(butylphenyl)phosphine, hexyl(methylphenyl)(dimethylphenyl)phosphine, hexyl(methylphenyl)(dibutylphenyl)phosphine, hexyl(methylphenyl) (trimethylphenyl)phosphine, hexyl(methylphenyl)(tributylphenyl)phosphine, hexyl(dimethylphenyl)(dibutylphenyl) phosphine, hexyl(dimethylphenyl)(trimethylphenyl) phosphine, hexyl(dimethylphenyl)(tributylphenyl) phosphine, hexyl(trimethylphenyl)(tributylphenyl) phosphine, cyclohexyl phenyl(methylphenyl)phosphine, cyclohexyl phenyl(butylphenyl)phosphine, cyclohexyl phenyl(dimethylphenyl)phosphine, cyclohexyl phenyl(dibutylphenyl)phosphine, cyclohexyl phenyl(trimethylphenyl) phosphine, cyclohexyl phenyl(tributylphenyl)phosphine, cyclohexyl phenyl naphthyl phosphine, cyclohexyl(methylphenyl)(butylphenyl)phosphine, cyclohexyl(methylphenyl)(dimethylphenyl)phosphine, cyclohexyl(methylphenyl) (dibutylphenyl)phosphine, cyclohexyl(methylphenyl) (trimethylphenyl)phosphine, cyclohexyl(methylphenyl) (tributylphenyl)phosphine, cyclohexyl(dimethylphenyl) (dibutylphenyl)phosphine, cyclohexyl(dimethylphenyl) (trimethylphenyl)phosphine, cyclohexyl(dimethylphenyl) (tributylphenyl)phosphine, cyclohexyl(trimethylphenyl) (tributylphenyl)phosphine, octyl phenyl(methylphenyl)phosphine, octyl phenyl(butylphenyl)phosphine, octyl phenyl(dimethylphenyl)phosphine, octyl phenyl(dibutylphenyl)phosphine, octyl phenyl (trimethylphenyl)phosphine, octyl phenyl(tributylphenyl) phosphine, octyl phenyl naphthyl phosphine, octyl (methylphenyl)(butylphenyl)phosphine, octyl (methylphenyl)(dimethylphenyl)phosphine, octyl (methylphenyl)(dibutylphenyl)phosphine, octyl (methylphenyl)(trimethylphenyl)phosphine, octyl (methylphenyl)(tributylphenyl)phosphine, octyl (dimethylphenyl)(dibutylphenyl)phosphine, octyl (dimethylphenyl)(trimethylphenyl)phosphine, octyl (dimethylphenyl)(tributylphenyl)phosphine, octyl (trimethylphenyl)(tributylphenyl)phosphine, octyl (tributylphenyl)anthracenyl phosphine, phenyl (methylphenyl)(propyl phenyl)phosphine, phenyl (methylphenyl)(butylphenyl)phosphine, phenyl (methylphenyl)(dimethylphenyl)phosphine, phenyl (methylphenyl)(dipropyl phenyl)phosphine, phenyl (methylphenyl)(dibutylphenyl)phosphine, phenyl (methylphenyl)(trimethylphenyl)phosphine, phenyl (methylphenyl)(tripropyl phenyl)phosphine, phenyl (methylphenyl)(tributylphenyl)phosphine, phenyl (methylphenyl)benzyl phosphine, phenyl(methylphenyl) naphthyl phosphine, phenyl(dimethylphenyl)(dipropyl phenyl)phosphine, phenyl(dimethylphenyl)(trimethylphenyl)phosphine, phenyl(dimethylphenyl)(tripropyl phenyl) phosphine, phenyl(dimethylphenyl)(tributylphenyl)phosphine, phenyl(trimethylphenyl)(tripropyl phenyl)phosphine, phenyl(trimethylphenyl)(tributylphenyl)phosphine, phenyl (trimethylphenyl)benzyl phosphine, phenyl(trimethylphenyl)naphthyl phosphine, phenyl(tripropyl phenyl)(tributylphenyl)phosphine, (methylphenyl)(dimethylphenyl)(dipropyl phenyl)phosphine, (methylphenyl)(dimethylphenyl)(dibutylphenyl) phosphine, (methylphenyl)(dimethylphenyl)(trimethylphenyl)phosphine, (methylphenyl)(dimethylphenyl)(tripropyl phenyl)phosphine, (methylphenyl)(dimethylphenyl)(tributylphenyl)phosphine, (methylphenyl)(trimethylphenyl) (tripropyl phenyl)phosphine, (methylphenyl)(trimethylphenyl)(tributylphenyl)phosphine, (methylphenyl) (trimethylphenyl)naphthyl phosphine, (methylphenyl (tripropyl phenyl)(tributylphenyl)phosphine, (dimethylphenyl)(trimethylphenyl)(tripropyl phenyl)phosphine, (dimethylphenyl)(trimethylphenyl)(tributylphenyl) phosphine, (dimethylphenyl)(trimethylphenyl)benzyl phosphine, (dimethylphenyl)(trimethylphenyl)naphthyl phosphine, (dimethylphenyl)(tripropyl phenyl)(tributylphenyl)phosphine, (trimethylphenyl)(tripropyl phenyl)(tributylphenyl)phosphine, adamantyl dimethyl phosphine, adamantyl diethyl phosphine, adamantyl dipropyl phosphine, adamantyl dicyclopropyl phosphine, adamantyl dibutyl phosphine, adamantyl dipentyl phosphine, adamantyl dihexyl phosphine, adamantyl dicyclohexyl phosphine, adamantyl dioctyl phosphine, adamantyl diphenyl phosphine, adamantyl di(methylphenyl) phosphine, adamantyl di(butylphenyl)phosphine, adamantyl di(dimethylphenyl)phosphine, adamantyl di(dibutylphenyl) phosphine, adamantyl di(trimethylphenyl)phosphine, adamantyl di(tributylphenyl)phosphine, adamantyl dibenzyl phosphine, adamantyl dinaphthyl phosphine, diadamantyl methyl phosphine, diadamantyl ethyl phosphine, diadamantyl propyl phosphine, diadamantyl cyclopropyl phosphine, diadamantyl butyl phosphine, diadamantyl pentyl phosphine, diadamantyl hexyl phosphine, diadamantyl cyclohexyl phosphine, diadamantyl octyl phosphine, diadamantyl phenyl phosphine, diadamantyl(methylphenyl)phosphine, diadamantyl(butylphenyl)phosphine, diadamantyl(dimethylphenyl)phosphine, diadamantyl(dibutylphenyl)phosphine, diadamantyl(trimethylphenyl)phosphine, diadamantyl(tributylphenyl)phosphine, diadamantyl benzyl phosphine, diadamantyl naphthyl phosphine, triadamantyl phosphine, 2-[di (tert-butyl)phosphino]-1,1'-biphenyl, 2-(dicyclohexyl phosphino)-1,1'-biphenyl, 2-(dicyclohexyl phosphino)-2'-methyl-1,1'-biphenyl, 1-methyl-2,5-dimethyl phospholane(1-methyl-2,5-dimethyl phospholane), 1-ethyl-2,5-dimethyl phospholane, 1-propyl-2,5-dimethyl phospholane, 1-butyl-2,5-dimethyl phospholane, 1-pentyl-2,5-dimethyl phospholane, 1-hexyl-2,5-dimethyl phospholane, 1-cyclohexyl-2,5-dimethyl phospholane, 1-octyl-2,5-dimethyl phospholane, 1-phenyl-2,5-dimethyl phospholane, 1-methylphenyl-2,5-dimethyl phospholane, 1-butylphenyl-2,5-dimethyl phospholane, 1-dimethylphenyl-2,5-dimethyl phospholane, 1-dibutylphenyl-2,5-dimethyl phospholane, 1-trimethylphenyl-2,5-dimethyl phospholane, 1-tributylphenyl-2,5-dimethyl phospholane, 1-benzyl-2,5-dimethyl phospholane, 1-methyl-2,5- diethyl phospholane, 1-ethyl-2,5-diethyl phospholane, 1-propyl-2,5-diethyl phospholane, 1-butyl-2,5-diethyl phospholane, 1-pentyl-2,5-diethyl phospholane, 1-hexyl, 1-cyclohexyl-2,5-diethyl phospholane, 1-octyl-2,5-diethyl phospholane, 1-phenyl-2,5-diethyl phospholane, 1-methylphenyl-2,5-diethyl phospholane, 1-butylphenyl-2,5-diethyl phospholane, 1-dimethylphenyl-2,5-diethyl phospholane, 1-dibutylphenyl-2,5-diethyl phospholane, 1-trimethylphenyl-2,5-diethyl phospholane, 1-tributylphenyl-2,5-diethyl phospholane, 1-benzyl-2,5-diethyl phospholane, 1-methyl-2,5-dipropyl phospholane, 1-ethyl-2,5-dipropyl phospholane, 1-propyl-2,5-dipropyl phospholane, 1-butyl-2,5-dipropyl phospholane, 1-pentyl-2,5-dipropyl phospholane, 1-hexyl-2,5-dipropyl phospholane, 1-cyclohexyl-2,5-dipropyl phospholane, 1-octyl-2,5-dipropyl phospholane, 1-phenyl-2,5-dipropyl phospholane, 1-methylphenyl-2,5-dipropyl phospholane, 1-butylphenyl-2,5-dipropyl phospholane, 1-dimethylphenyl-2,5-dipropyl phospholane, 1-dibutylphenyl-2,5-dipropyl phospholane, 1-trimethylphenyl-2,5-dipropyl phospholane, 1-tributylphenyl-2,5-dipropyl phospholane, 1-benzyl-2,5-dipropyl phospholane, 1-methyl-2,5-dibutyl phospholane, 1-ethyl-2,5-dibutyl phospholane, 1-propyl-2,5-dibutyl phospholane, 1-butyl-2,5-dibutyl phospholane, 1-pentyl-2,5-dibutyl phospholane, 1-hexyl-2,5-dibutyl phospholane, 1-cyclohexyl-2,5-dibutyl phospholane, 1-octyl-2,5-dibutyl phospholane, 1-phenyl-2,5-dibutyl phospholane, 1-methylphenyl-2,5-dibutyl phospholane, 1-butylphenyl-2,5-dibutyl phospholane, 1-dimethylphenyl-2,5-dibutyl phospholane, 1-dibutylphenyl-2,5-dibutyl phospholane, 1-trimethylphenyl-2,5-dibutyl phospholane, 1-tributylphenyl-2,5-dibutyl phospholane, 1-benzyl-2,5-dibutyl phospholane, 1-methyl-2,5-dihexyl phospholane, 1-ethyl-2,5-dihexyl phospholane, 1-propyl-2,5-dihexyl phospholane, 1-cyclopropyl-2,5-dihexyl phospholane, 1-butyl-2,5-dihexyl phospholane, 1-pentyl-2,5-dihexyl phospholane, 1-hexyl-2,5-dihexyl phospholane, 1-cyclohexyl-2,5-dihexyl phospholane, 1-octyl-2,5-dihexyl phospholane, 1-phenyl-2,5-dihexyl phospholane, 1-methylphenyl-2,5-dihexyl phospholane, 1-butylphenyl-2,5-dihexyl phospholane, 1-dimethylphenyl-2,5-dihexyl phospholane, 1-dibutylphenyl-2,5-dihexyl phospholane, 1-trimethylphenyl-2,5-dihexyl phospholane, 1-tributylphenyl-2,5-dihexyl phospholane, 1-benzyl-2,5-dihexyl phospholane, 1-methyl-2,5-dicyclohexyl phospholane, 1-ethyl-2,5-dicyclohexyl phospholane, 1-propyl-2,5-dicyclohexyl phospholane, 1-cyclopropyl-2,5-dicyclohexyl phospholane, 1-butyl-2,5-dicyclohexyl phospholane, 1-pentyl-2,5-dicyclohexyl phospholane, 1-hexyl-2,5-dicyclohexyl phospholane, 1-cyclohexyl-2,5-dicyclohexyl phospholane, 1-octyl-2,5-dicyclohexyl phospholane, 1-phenyl-2,5-dicyclohexyl phospholane, 1-methylphenyl-2,5-dicyclohexyl phospholane, 1-butylphenyl-2,5-dicyclohexyl phospholane, 1-dimethylphenyl-2,5-dicyclohexyl phospholane, 1-dibutylphenyl-2,5-dicyclohexyl phospholane, 1-trimethylphenyl-2,5-dicyclohexyl phospholane, 1-tributylphenyl-2,5-dicyclohexyl phospholane, 1-benzyl-2,5-dicyclohexyl phospholane, 1-methyl-2,5-diphenyl phospholane, 1-ethyl-2,5-diphenyl phospholane, 1-propyl-2,5-diphenyl phospholane, 1-cyclopropyl-2,5-diphenyl phospholane, 1-butyl-2,5-diphenyl phospholane, 1-pentyl-2,5-diphenyl phospholane, 1-hexyl-2,5-diphenyl phospholane, 1-cyclohexyl-2,5-diphenyl phospholane, 1-octyl-2,5-diphenyl phospholane, 1-phenyl-2,5-diphenyl phospholane, 1-methyl phenyl-2,5-diphenyl phospholane, 1-butylphenyl-2,5-diphenyl phospholane, 1-dimethyl phenyl-2,5-diphenyl phospholane, 1-dibutyl phenyl-2,5-diphenyl phospholane, 1-trimethyl phenyl-2,5-diphenyl phospholane, 1-tributyl phenyl-2,5-diphenyl phospholane, 1-benzyl-2,5-diphenyl phospholane, 1-methyl-2,5-di(methyl phenyl)phospholane, 1-ethyl-2,5-di(methyl phenyl)phospholane, 1-propyl-2,5-di(methyl phenyl)phospholane, 1-butyl-2,5-di(methyl phenyl)phospholane, 1-pentyl-2,5-di(methyl phenyl)phospholane, 1-hexyl-2,5-di(methyl phenyl)phospholane, 1-cyclohexyl-2,5-di(methyl phenyl)phospholane, 1-octyl-2,5-di(methyl phenyl)phospholane, 1-phenyl-2,5-di(methyl phenyl)phospholane, 1-methyl phenyl-2,5-di(methyl phenyl) phospholane, 1-butylphenyl-2,5-di(methyl phenyl) phospholane, 1-dimethyl phenyl-2,5-di(methyl phenyl) phospholane, 1-dibutyl phenyl-2,5-di(methyl phenyl) phospholane, 1-trimethyl phenyl-2,5-di(methyl phenyl) phospholane, 1-tributyl phenyl-2,5-di(methyl phenyl) phospholane, 1-benzyl-2,5-di(methyl phenyl)phospholane, 1-methyl-2,5-di(methoxyphenyl)phospholane, 1-methyl-2,5-di(dimethylamino)phenyl phospholane, 1-methyl-2,5-di (trifluoromethyl)phenyl phospholane, 1-methyl-2,5-di(nitrophenyl)phospholane, 1-methyl-2,5-di(cyanophenyl) phospholane, 1-methyl-2,5-di(acetyl phenyl)phospholane, 1-methyl-2,5-di(pentafluorophenyl)phospholane, phosphatolan.

More preferably, the trivalent phosphorus compound having one trivalent phosphorus atom is at least one compound selected from the following group:

trimethyl phosphine, triethyl phosphine, tri-n-propyl phosphine, triisopropyl phosphine, tricyclopropyl phosphine, tri-n-butyl phosphine, triisobutyl phosphine, tri-sec-butyl phosphine, tri-tert-butyl phosphine, tricyclobutyl phosphine, tripentyl phosphine, tricyclopentyl phosphine, trihexyl phosphine, tricyclohexyl phosphine, triheptyl phosphine, tricycloheptyl phosphine, trioctyl phosphine, tricyclooctyl phosphine, triphenyl phosphine, tri(methyl phenyl)phosphine, tri (methoxyphenyl)phosphine, tri(dimethyl aminophenyl) phosphine, tri(trifluoromethyl phenyl)phosphine, tri (fluorophenyl)phosphine, tri(dimethyl phenyl)phosphine, tri (dimethoxyphenyl)phosphine, tri[bis(dimethylamino) phenyl]phosphine, tri[bis(trifluoromethyl)phenyl] phosphine, tri(difluorophenyl)phosphine, tri(trimethyl phenyl)phosphine, tri(trimethoxyphenyl)phosphine, tri[tris (dimethylamino)phenyl]phosphine, tri[tris(trifluoromethyl) phenyl]phosphine, tri(pentafluorophenyl)phosphine, tribenzyl phosphine, diethyl methyl phosphine, dipropyl methyl phosphine, dibutyl methyl phosphine, dihexyl methyl phosphine, dicyclohexyl methyl phosphine, diphenyl methyl phosphine, dimethyl ethyl phosphine, dipropyl ethyl phosphine, dibutyl ethyl phosphine, dihexyl ethyl phosphine, dicyclohexyl ethyl phosphine, diphenyl ethyl phosphine, dimethyl propyl phosphine, diethyl propyl phosphine, dibutyl propyl phosphine, dihexyl propyl phosphine, dicyclohexyl propyl phosphine, diphenyl propyl phosphine, dimethyl butyl phosphine, diethyl butyl phosphine, dipropyl butyl phosphine, dipentyl butyl phosphine, dihexyl butyl phosphine, dicyclohexyl butyl phosphine, diphenyl butyl phosphine, dibutyl pentyl phosphine, dicyclohexyl pentyl phosphine, diphenyl pentyl phosphine, diethyl cyclohexyl phosphine, dibutyl cyclohexyl phosphine, diphenyl cyclohexyl phosphine, dimethyl phenyl phosphine, diethyl phenyl phosphine, dipropyl phenyl phosphine, dibutyl phenyl phosphine, dihexyl phenyl phosphine, dicyclohexyl phenyl phosphine, dioctyl phenyl phosphine, di(methyl phenyl)phenylphosphine, di(methoxyphenyl)phenylphosphine, bis[(dimethylamino)phenyl]phenylphosphine, bis[(trifluoromethyl)phenyl]phenylphosphine, di(nitrophenyl)phenylphosphine, di(cyanophenyl)phenylphosphine, di(acetyl phenyl)phenylphosphine, di(pentafluorophenyl)phenylphosphine, di(trimethoxyphenyl)phenylphosphine, di[tris(dimethylamino) phenyl]phenylphosphine, di[tris(trifluoromethyl)phenyl] phenylphosphine, bis(trinitrophenyl)phenylphosphine, bis (tricyanophenyl)phenylphosphine, bis(triacetyl phenyl) phenylphosphine, (methoxyphenyl)diphenyl phosphine, (methyl phenyl)diphenyl phosphine, (methoxyphenyl)diphenyl phosphine, (dimethylamino)phenyl diphenyl phosphine, (trifluoromethyl)phenyl diphenyl phosphine, (nitrophenyl) diphenyl phosphine, (cyanophenyl)diphenyl phosphine, (acetyl phenyl)diphenyl phosphine, (pentafluorophenyl) diphenyl phosphine, (trimethoxyphenyl)diphenyl phosphine, [tris(dimethylamino)phenyl]diphenyl phosphine, [tris(trifluoromethyl)phenyl]diphenyl phosphine, (trinitrophenyl) diphenyl phosphine, (tricyanophenyl)diphenyl phosphine, (triacetyl phenyl)diphenyl phosphine, diadamantyl butyl phosphine, diadamantyl benzyl phosphine, 2-[di(tert-butyl) phosphino]-1,1'-biphenyl, 2-(dicyclohexyl phosphino)-1,1'-biphenyl, 2-(dicyclohexyl phosphino)-2'-methyl-1,1'-biphenyl, Further preferably, the trivalent phosphorus compound having one trivalent phosphorus atom is at least one compound selected from the following group:

triethyl phosphine, tri-n-propyl phosphine, triisopropyl phosphine, tri-n-butyl phosphine, triisobutyl phosphine, tri-tert-butyl phosphine, tricyclopentyl phosphine, tricyclohexyl phosphine, trioctyl phosphine, tri(methyl phenyl)phosphine, tri(methoxyphenyl)phosphine, tri(trifluoromethyl phenyl) phosphine, tri(fluorophenyl)phosphine, tri(dimethyl phenyl) phosphine, tri(dimethoxyphenyl)phosphine, tri[bis(trifluoromethyl)phenyl]phosphine, tri(pentafluorophenyl) phosphine, dibutyl methyl phosphine, dicyclohexyl ethyl phosphine, dipropyl butyl phosphine, dicyclohexyl butyl phosphine, dibutyl pentyl phosphine, dibutyl cyclohexyl phosphine, dicyclohexyl phenyl phosphine, 2-(dicyclohexyl phosphino)-1,1'-biphenyl, 2-(dicyclohexyl phosphino)-2'-methyl-1,1'-biphenyl.

(Trivalent Phosphorus Compound Having Two Trivalent Phosphorus Atoms)

The trivalent phosphorus compound having two trivalent phosphorus atoms is not particularly limited as long as being a compound containing two trivalent phosphorus atoms, and specific examples thereof include ones represented by the above formula (1) wherein a is 2.

Among the trivalent phosphorus compounds each having two trivalent phosphorus atoms, at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

bis(dimethyl phosphino)methane, bis(diethyl phosphino) methane, bis(dipropyl phosphino)methane, bis(dibutyl phosphino)methane, bis(dipentyl phosphino)methane, bis(dihexyl phosphino)methane, bis(dicyclohexyl phosphino) methane, bis(diheptyl phosphino)methane, bis(dioctyl phosphino)methane, bis(diphenyl phosphino)methane, bis[di (methyl phenyl)phosphino]methane, bis[di(butylphenyl) phosphino]methane, bis[di(dimethyl phenyl)phosphino] methane, bis[di(dibutyl phenyl)phosphino]methane, bis[di (trimethyl phenyl)phosphino]methane, bis[di(tributyl phenyl)phosphino]methane, bis(dibenzyl phosphino)methane, bis(dinaphthyl phosphino)methane, bis[di(methoxyphenyl)phosphino]methane, bis{di[(dimethylamino)phenyl] phosphino}methane, bis{di[(trifluoromethyl)phenyl] phosphino}methane, bis[di(nitrophenyl)phosphino] methane, bis[di(cyanophenyl)phosphino]methane, bis[di (acetyl phenyl)phosphino]methane, bis[di (pentafluorophenyl)phosphino]methane, bis[di (dimethoxyphenyl)phosphino]methane, bis{di[di (trifluoromethyl)phenyl]phosphino}methane, bis[di (trimethoxyphenyl)phosphino]methane, bis{di[tri (trifluoromethyl)phenyl]phosphino}methane, bis(dimethyl phosphino)ethane, bis(diethyl phosphino)ethane, bis(dipropyl phosphino)ethane, bis(dibutyl phosphino)ethane, bis(dicyclobutyl phosphino)ethane, bis(dipentyl phosphino) ethane, bis(dihexyl phosphino)ethane, bis(dicyclohexyl phosphino)ethane, bis(diheptyl phosphino)ethane, bis(dioctyl phosphino)ethane, bis(diphenyl phosphino)ethane, bis [di(methyl phenyl)phosphino]ethane, bis[di(butylphenyl) phosphino]ethane, bis[di(dimethyl phenyl)phosphino] ethane, bis[di(dibutyl phenyl)phosphino]ethane, bis[di (trimethyl phenyl)phosphino]ethane, bis[di(tributyl phenyl) phosphino]ethane, bis(dibenzyl phosphino)ethane, bis (dinaphthyl phosphino)ethane, bis[di(methoxyphenyl) phosphino]ethane, bis{di[(dimethylamino)phenyl] phosphino}ethane, bis{di[(trifluoromethyl)phenyl] phosphino}ethane, bis[di(nitrophenyl)phosphino]ethane, bis [di(cyanophenyl)phosphino]ethane, bis[di(acetyl phenyl) phosphino]ethane, bis[di(pentafluorophenyl)phosphino] ethane, bis[di(dimethoxyphenyl)phosphino]ethane, bis{di[di (trifluoromethyl)phenyl]phosphino}ethane, bis[di (trimethoxyphenyl)phosphino]ethane, bis{di[tri (trifluoromethyl)phenyl]phosphino}ethane, bis(dimethyl phosphino)propane, bis(diethyl phosphino) propane, bis(dipropyl phosphino)propane, bis(dibutyl phosphino)propane, bis(dicyclobutyl phosphino)propane, bis(dipentyl phosphino)propane, bis(dihexyl phosphino)propane, bis(dicyclohexyl phosphino)propane, bis(diheptyl phosphino)propane, bis(dioctyl phosphino)propane, bis(diphenyl phosphino)propane, bis[di(methyl phenyl)phosphino]propane, bis[di(butylphenyl)phosphino]propane, bis[di(dimethyl phenyl)phosphino]propane, bis[di(dibutyl phenyl) phosphino]propane, bis[di(trimethyl phenyl)phosphino] propane, bis[di(tributyl phenyl)phosphino]propane, bis (dibenzyl phosphino)propane, bis(dinaphthyl phosphino) propane, bis[di(methoxyphenyl)phosphino]propane, bis{di [(dimethylamino)phenyl]phosphino}propane, bis{di [(trifluoromethyl)phenyl]phosphino}propane, bis[di (nitrophenyl)phosphino]propane, bis[di(cyanophenyl) phosphino]propane, bis[di(acetyl phenyl)phosphino] propane, bis[di(pentafluorophenyl)phosphino]propane, bis[di (dimethoxyphenyl)phosphino]propane, bis{di[di(trifluoromethyl)phenyl]phosphino}propane, bis[di(trimethoxyphenyl)phosphino]propane, bis{di[tri(trifluoromethyl) phenyl]phosphino}propane, bis(dimethyl phosphino)butane, bis(diethyl phosphino)butane, bis(dipropyl phosphino)butane, bis(dibutyl phosphino)butane, bis(dicyclobutyl phosphino)butane, bis(dipentyl phosphino)butane, bis(dihexyl phosphino)butane, bis(dicyclohexyl phosphino)butane, bis (diheptyl phosphino)butane, bis(dioctyl phosphino)butane, bis(diphenyl phosphino)butane, bis[di(methyl phenyl)phosphino]butane, bis[di(butylphenyl)phosphino]butane, bis[di (dimethyl phenyl)phosphino]butane, bis[di(dibutyl phenyl) phosphino]butane, bis[di(trimethyl phenyl)phosphino] butane, bis[di(tributyl phenyl)phosphino]butane, bis (dibenzyl phosphino)butane, bis(dinaphthyl phosphino) butane, bis[di(methoxyphenyl)phosphino]butane, bis{di

[(dimethylamino)phenyl]phosphino}butane, bis{di[(trifluoromethyl)phenyl]phosphino}butane, bis[di(nitrophenyl)phosphino]butane, bis[di(cyanophenyl)phosphino]butane, bis[di(acetyl phenyl)phosphino]butane, bis[di(pentafluorophenyl)phosphino]butane, bis[di(dimethoxyphenyl)phosphino]butane, bis{di[di(trifluoromethyl)phenyl]phosphino}butane, bis[di(trimethoxyphenyl)phosphino]butane, bis{di[tri(trifluoromethyl)phenyl]phosphino}butane, bis(dimethyl phosphino)pentane, bis(diethyl phosphino)pentane, bis(dipropyl phosphino)pentane, bis(dibutyl phosphino)pentane, bis(dicyclobutyl phosphino)pentane, bis(dipentyl phosphino)pentane, bis(dihexyl phosphino)pentane, bis(dicyclohexyl phosphino)pentane, bis(diheptyl phosphino)pentane, bis(dioctyl phosphino)pentane, bis(diphenyl phosphino)pentane, bis[di(methyl phenyl)phosphino]pentane, bis[di(butylphenyl)phosphino]pentane, bis[di(dimethyl phenyl)phosphino]pentane, bis[di(dibutyl phenyl)phosphino]pentane, bis[di(trimethyl phenyl)phosphino]pentane, bis[di(tributyl phenyl)phosphino]pentane, bis(dibenzyl phosphino)pentane, bis(dinaphthyl phosphino)pentane, bis(dimethyl phosphino)cyclopentane, bis(diethyl phosphino)cyclopentane, bis(dipropyl phosphino)cyclopentane, bis(dibutyl phosphino)cyclopentane, bis(dicyclobutyl phosphino)cyclopentane, bis(dipentyl phosphino)cyclopentane, bis(dihexyl phosphino)cyclopentane, bis(dicyclohexyl phosphino)cyclopentane, bis(diheptyl phosphino)cyclopentane, bis(dioctyl phosphino)cyclopentane, bis(diphenyl phosphino)cyclopentane, bis[di(methyl phenyl)phosphino]cyclopentane, bis[di(butylphenyl)phosphino]cyclopentane, bis[di(dimethyl phenyl)phosphino]cyclopentane, bis[di(dibutyl phenyl)phosphino]cyclopentane, bis[di(trimethyl phenyl)phosphino]cyclopentane, bis[di(tributyl phenyl)phosphino]cyclopentane, bis(dibenzyl phosphino)cyclopentane, bis(dinaphthyl phosphino)cyclopentane, bis(dimethyl phosphino)hexane, bis(diethyl phosphino)hexane, bis(dipropyl phosphino)hexane, bis(dibutyl phosphino)hexane, bis(dicyclobutyl phosphino)hexane, bis(dipentyl phosphino)hexane, bis(dihexyl phosphino)hexane, bis(dicyclohexyl phosphino)hexane, bis(diheptyl phosphino)hexane, bis(dioctyl phosphino)hexane, bis(diphenyl phosphino)hexane, bis[di(methyl phenyl)phosphino]hexane, bis[di(butylphenyl)phosphino]hexane, bis[di(dimethyl phenyl)phosphino]hexane, bis[di(dibutyl phenyl)phosphino]hexane, bis[di(trimethyl phenyl)phosphino]hexane, bis[di(tributyl phenyl)phosphino]hexane, bis(dibenzyl phosphino)hexane, bis(dinaphthyl phosphino)hexane, bis(dimethyl phosphino)cyclohexane, bis(diethyl phosphino)cyclohexane, bis(dipropyl phosphino)cyclohexane, bis(dibutyl phosphino)cyclohexane, bis(dicyclobutyl phosphino)cyclohexane, bis(dipentyl phosphino)cyclohexane, bis(dihexyl phosphino)cyclohexane, bis(dicyclohexyl phosphino)cyclohexane, bis(diheptyl phosphino)cyclohexane, bis(dioctyl phosphino)cyclohexane, bis(diphenyl phosphino)cyclohexane, bis[di(methyl phenyl)phosphino]cyclohexane, bis[di(butylphenyl)phosphino]cyclohexane, bis[di(dimethyl phenyl)phosphino]cyclohexane, bis[di(dibutyl phenyl)phosphino]cyclohexane, bis[di(trimethyl phenyl)phosphino]cyclohexane, bis[di(tributyl phenyl)phosphino]cyclohexane, bis(dibenzyl phosphino)cyclohexane, bis(dinaphthyl phosphino)cyclohexane, bis(dimethyl phosphino)octane, bis(diethyl phosphino)octane, bis(dipropyl phosphino)octane, bis(dibutyl phosphino)octane, bis(dicyclobutyl phosphino)octane, bis(dipentyl phosphino)octane, bis(dihexyl phosphino)octane, bis(dicyclohexyl phosphino)octane, bis(diheptyl phosphino)octane, bis(dioctyl phosphino)octane, bis(diphenyl phosphino)octane, bis[di(methyl phenyl)phosphino]octane, bis[di(butylphenyl)phosphino]octane, bis[di(dimethyl phenyl)phosphino]octane, bis[di(dibutyl phenyl)phosphino]octane, bis[di(trimethyl phenyl)phosphino]octane, bis[di(tributyl phenyl)phosphino]octane, bis(dibenzyl phosphino)octane, bis(dinaphthyl phosphino)octane, bis(dimethyl phosphino)benzene, bis(diethyl phosphino)benzene, bis(dipropyl phosphino)benzene, bis(dibutyl phosphino)benzene, bis(dicyclobutyl phosphino)benzene, bis(dipentyl phosphino)benzene, bis(dihexyl phosphino)benzene, bis(dicyclohexyl phosphino)benzene, bis(diheptyl phosphino)benzene, bis(dioctyl phosphino)benzene, bis(diphenyl phosphino)benzene, bis[di(methyl phenyl)phosphino]benzene, bis[di(butylphenyl)phosphino]benzene, bis[di(dimethyl phenyl)phosphino]benzene, bis[di(dibutyl phenyl)phosphino]benzene, bis[di(trimethyl phenyl)phosphino]benzene, bis[di(tributyl phenyl)phosphino]benzene, bis(dibenzyl phosphino)benzene, bis(dinaphthyl phosphino)benzene, bis[di(methoxyphenyl)phosphino]benzene, bis{di[(dimethylamino)phenyl]phosphino}benzene, bis{di[(trifluoromethyl)phenyl]phosphino}benzene, bis[di(nitrophenyl)phosphino]benzene, bis[di(cyanophenyl)phosphino]benzene, bis[di(acetyl phenyl)phosphino]benzene, bis[di(pentafluorophenyl)phosphino]benzene, bis[di(dimethoxyphenyl)phosphino]benzene, bis{di[di(trifluoromethyl)phenyl]phosphino}benzene, bis[di(trimethoxyphenyl)phosphino]benzene, bis{di[tri(trifluoromethyl)phenyl]phosphino}benzene, bis(dimethyl phosphino)naphthalene, bis(diethyl phosphino)naphthalene, bis(dipropyl phosphino)naphthalene, bis(dibutyl phosphino)naphthalene, bis(dicyclobutyl phosphino)naphthalene, bis(dipentyl phosphino)naphthalene, bis(dihexyl phosphino)naphthalene, bis(dicyclohexyl phosphino)naphthalene, bis(diheptyl phosphino)naphthalene, bis(dioctyl phosphino)naphthalene, bis(diphenyl phosphino)naphthalene, bis[di(methyl phenyl)phosphino]naphthalene, bis[di(butylphenyl)phosphino]naphthalene, bis[di(dimethyl phenyl)phosphino]naphthalene, bis[di(dibutyl phenyl)phosphino]naphthalene, bis[di(trimethyl phenyl)phosphino]naphthalene, bis[di(tributyl phenyl)phosphino]naphthalene, bis(dibenzyl phosphino)naphthalene, bis(dinaphthyl phosphino)naphthalene, bis(dimethyl phosphino)ferrocene, bis(diethyl phosphino)ferrocene, bis(dipropyl phosphino)ferrocene, bis(dibutyl phosphino)ferrocene, bis(dipentyl phosphino)ferrocene, bis(dihexyl phosphino)ferrocene, bis(dicyclohexyl phosphino)ferrocene, bis(diheptyl phosphino)ferrocene, bis(dioctyl phosphino)ferrocene, bis(diphenyl phosphino)ferrocene, bis[di(methyl phenyl)phosphino]ferrocene, bis[di(butylphenyl)phosphino]ferrocene, bis[di(dimethyl phenyl)phosphino]ferrocene, bis[di(dibutyl phenyl)phosphino]ferrocene, bis[di(trimethyl phenyl)phosphino]ferrocene, bis[di(tributyl phenyl)phosphino]ferrocene, bis(dibenzyl phosphino)ferrocene, bis(dinaphthyl phosphino)ferrocene, bis[di(methoxyphenyl)phosphino]ferrocene, bis{di[(dimethylamino)phenyl]phosphino}ferrocene, bis{di[(trifluoromethyl)phenyl]phosphino}ferrocene, bis[di(nitrophenyl)phosphino]ferrocene, bis[di(cyanophenyl)phosphino]ferrocene, bis[di(acetyl phenyl)phosphino]ferrocene, bis[di(pentafluorophenyl)phosphino]ferrocene, bis[di(dimethoxyphenyl)phosphino]ferrocene, bis{di[di(trifluoromethyl)phenyl]phosphino}ferrocene, bis[di(trimethoxyphenyl)phosphino]ferrocene, bis{di[tri(trifluoromethyl)phenyl]phosphino}ferrocene, bis(dimethyl phosphino)vanadinocene, bis(diethyl phosphino)vanadinocene, bis(dipropyl phosphino)vanadinocene, bis(dibutyl phosphino)vanadinocene, bis(dipentyl phosphino)vanadinocene, bis(dihexyl phosphino)vanadinocene, bis (dicyclohexyl phosphino)vanadinocene, bis(diheptyl phosphino)vanadinocene, bis(dioctyl phosphino)vanadinocene, bis(dicyclooctyl phosphino)vanadinocene, bis(diphenyl phosphino)vanadinocene, bis[di(methyl phenyl)phosphino] vanadinocene, bis[di(butylphenyl)phosphino]vanadinocene, bis[di(dimethyl phenyl)phosphino]vanadinocene, bis[di (dibutyl phenyl)phosphino]vanadinocene, bis[di(trimethyl phenyl)phosphino]vanadinocene, bis[di(tributyl phenyl) phosphino]vanadinocene, bis(dibenzyl phosphino)vanadinocene, bis(dinaphthyl phosphino)vanadinocene, bis(dimethyl phosphino)chromocene, bis(diethyl phosphino) chromocene, bis(dipropyl phosphino)chromocene, bis (dibutyl phosphino)chromocene, bis(dipentyl phosphino) chromocene, bis(dihexyl phosphino)chromocene, bis (dicyclohexyl phosphino)chromocene, bis(diheptyl phosphino)chromocene, bis(dioctyl phosphino)chromocene, bis(dicyclooctyl phosphino)chromocene, bis(diphenyl phosphino)chromocene, bis[di(methyl phenyl)phosphino]chromocene, bis[di(butylphenyl)phosphino]chromocene, bis[di (dimethyl phenyl)phosphino]chromocene, bis[di(dibutyl phenyl)phosphino]chromocene, bis[di(trimethyl phenyl) phosphino]chromocene, bis[di(tributyl phenyl)phosphino] chromocene, bis(dibenzyl phosphino)chromocene, bis(dinaphthyl phosphino)chromocene, bis(dimethyl phosphino) cobaltocene, bis(diethyl phosphino)cobaltocene, bis (dipropyl phosphino)cobaltocene, bis(dibutyl phosphino) cobaltocene, bis(dipentyl phosphino)cobaltocene, bis (dihexyl phosphino)cobaltocene, bis(dicyclohexyl phosphino)cobaltocene, bis(diheptyl phosphino)cobaltocene, bis(dioctyl phosphino)cobaltocene, bis(diphenyl phosphino)cobaltocene, bis[di(methyl phenyl)phosphino] cobaltocene, bis[di(butylphenyl)phosphino]cobaltocene, bis [di(dimethyl phenyl)phosphino]cobaltocene, bis[di(dibutyl phenyl)phosphino]cobaltocene, bis[di(trimethyl phenyl) phosphino]cobaltocene, bis[di(tributyl phenyl)phosphino] cobaltocene, bis(dibenzyl phosphino)cobaltocene, bis(dinaphthyl phosphino)cobaltocene, bis(dimethyl phosphino)nickelocene, bis(diethyl phosphino)nickelocene, bis(dipropyl phosphino)nickelocene, bis (dibutyl phosphino)nickelocene, bis(dipentyl phosphino)nickelocene, bis(dihexyl phosphino)nickelocene, bis (dicyclohexyl phosphino)nickelocene, bis(diheptyl phosphino)nickelocene, bis(dioctyl phosphino)nickelocene, bis(diphenyl phosphino)nickelocene, bis[di(methyl phenyl) phosphino]nickelocene, bis[di(butylphenyl)phosphino]nickelocene, bis[di(dimethyl phenyl)phosphino]nickelocene, bis [di(dibutyl phenyl)phosphino]nickelocene, bis[di(trimethyl phenyl)phosphino]nickelocene, bis[di(tributyl phenyl)phosphino]nickelocene, bis(dibenzyl phosphino)nickelocene, bis (dinaphthyl phosphino)nickelocene, bis(dimethyl phosphino)zirconocene, bis(diethyl phosphino)zirconocene, bis (dipropyl phosphino)zirconocene, bis(dibutyl phosphino) zirconocene, bis(dipentyl phosphino)zirconocene, bis (dihexyl phosphino)zirconocene, bis(dicyclohexyl phosphino)zirconocene, bis(diheptyl phosphino)zirconocene, bis(dioctyl phosphino)zirconocene, bis(diphenyl phosphino)zirconocene, bis[di(methyl phenyl)phosphino] zirconocene, bis[di(butylphenyl)phosphino]zirconocene, bis [di(dimethyl phenyl)phosphino]zirconocene, bis[di(dibutyl phenyl)phosphino]zirconocene, bis[di(trimethyl phenyl) phosphino]zirconocene, bis[di(tributyl phenyl)phosphino] zirconocene, bis(dibenzyl phosphino)zirconocene, bis(dinaphthyl phosphino)zirconocene, bis(dimethyl phosphino) titanocene, bis(diethyl phosphino)titanocene, bis(dipropyl phosphino)titanocene, bis(dibutyl phosphino)titanocene, bis (dipentyl phosphino)titanocene, bis(dihexyl phosphino)titanocene, bis(dicyclohexyl phosphino)titanocene, bis(diheptyl phosphino)titanocene, bis(dioctyl phosphino)titanocene, bis(diphenyl phosphino)titanocene, bis[di(methyl phenyl) phosphino]titanocene, bis[di(butylphenyl)phosphino]titanocene, bis[di(dimethyl phenyl)phosphino]titanocene, bis [di(dibutyl phenyl)phosphino]titanocene, bis[di(trimethyl phenyl)phosphino]titanocene, bis[di(tributyl phenyl)phosphino]titanocene, bis(dibenzyl phosphino)titanocene, bis(dinaphthyl phosphino)titanocene, bis(dimethyl phosphino)ruthenocene, bis(diethyl phosphino)ruthenocene, bis(dipropyl phosphino)ruthenocene, bis (dibutyl phosphino)ruthenocene, bis(dipentyl phosphino)ruthenocene, bis(dihexyl phosphino)ruthenocene, bis (dicyclohexyl phosphino)ruthenocene, bis(diheptyl phosphino)ruthenocene, bis(dioctyl phosphino)ruthenocene, bis(diphenyl phosphino)ruthenocene, bis[di(methyl phenyl) phosphino]ruthenocene, bis[di(butylphenyl)phosphino]ruthenocene, bis[di(dimethyl phenyl)phosphino]ruthenocene, bis[di(dibutyl phenyl)phosphino]ruthenocene, bis[di(trimethyl phenyl)phosphino]ruthenocene, bis[di(tributyl phenyl) phosphino]ruthenocene, bis(dibenzyl phosphino)ruthenocene, bis(dinaphthyl phosphino)ruthenocene, bis (dimethyl phosphino)hafnocene, bis(diethyl phosphino) hafnocene, bis(dipropyl phosphino)hafnocene, bis(dibutyl phosphino)hafnocene, bis(dipentyl phosphino)hafnocene, bis(dihexyl phosphino)hafnocene, bis(dicyclohexyl phosphino)hafnocene, bis(diheptyl phosphino)hafnocene, bis(dioctyl phosphino)hafnocene, bis(diphenyl phosphino) hafnocene, bis[di(methyl phenyl)phosphino]hafnocene, bis [di(butylphenyl)phosphino]hafnocene, bis[di(dimethyl phenyl)phosphino]hafnocene, bis[di(dibutyl phenyl)phosphino]hafnocene, bis[di(trimethyl phenyl)phosphino] hafnocene, bis[di(tributyl phenyl)phosphino]hafnocene, bis (dibenzyl phosphino)hafnocene, bis(dinaphthyl phosphino) hafnocene, 2,2'-bis(dimethyl phosphino)-1,1'-biphenyl, 2,2'-bis(diethyl phosphino)-1,1'-biphenyl, 2,2'-bis(dipropyl phosphino)-1,1'-biphenyl, 2,2'-bis(dibutyl phosphino)-1,1'-biphenyl, 2,2'-bis(dipentyl phosphino)-1,1'-biphenyl, 2,2'-bis (dihexyl phosphino)-1,1'-biphenyl, 2,2'-bis(dicyclohexyl phosphino)-1,1'-biphenyl, 2,2'-bis(diheptyl phosphino)-1,1'-biphenyl, 2,2'-bis(dioctyl phosphino)-1,1'-biphenyl, 2,2'-bis (diphenyl phosphino)-1,1'-biphenyl, 2,2'-bis[di(methyl phenyl)phosphino]-1,1'-biphenyl, 2,2'-1,1'-biphenyl, 2,2'-bis[di (dimethyl phenyl)phosphino]-1,1'-biphenyl, 2,2'-bis[di (dibutyl phenyl)phosphino]-1,1'-biphenyl, 2,2'-bis[di (trimethyl phenyl)phosphino]-1,1'-biphenyl, 2,2'-bis[di (tributyl phenyl)phosphino]-1,1'-biphenyl, 2,2'-bis(dibenzyl phosphino)-1,1'-biphenyl, 2,2'-bis(dinaphthyl phosphino)-1, 1'-biphenyl, 2,2'-bis[di(methoxyphenyl)phosphino]-1,1'-biphenyl, 2,2'-bis{di[(dimethylamino)phenyl]phosphino}-1, 1'-biphenyl, 2,2'-bis{di[(trifluoromethyl)phenyl] phosphino}-1,1'-biphenyl, 2,2'-bis[di(nitrophenyl) phosphino]-1,1'-biphenyl, 2,2'-bis[di(cyanophenyl) phosphino]-1,1'-biphenyl, 2,2'-bis[di(acetyl phenyl) phosphino]-1,1'-biphenyl, 2,2'-bis[di(pentafluorophenyl) phosphino]-1,1'-biphenyl, 2,2'-bis[di(dimethoxyphenyl) phosphino]-1,1'-biphenyl, 2,2'-bis{di[di(trifluoromethyl) phenyl]phosphino}-1,1'-biphenyl, 2,2'-bis[tri (dimethoxyphenyl)phosphino]-1,1'-biphenyl, 2,2'-bis{tri[di (trifluoromethyl)phenyl]phosphino}-1,1'-biphenyl, 2,2'-bis (dimethyl phosphino)-1,1'-binaphthyl, 2,2'-bis(diethyl phosphino)-1,1'-binaphthyl, 2,2'-bis(dipropyl phosphino)-1, 1'-binaphthyl, 2,2'-bis(dibutyl phosphino)-1,1'-binaphthyl, 2,2'-bis(dipentyl phosphino)-1,1'-binaphthyl, 2,2'-bis(dihexyl phosphino)-1,1'-binaphthyl, 2,2'-bis(dicyclohexyl phosphino)-1,1'-binaphthyl, 2,2'-bis(diheptyl phosphino)-1, 1'-binaphthyl, 2,2'-bis(dioctyl phosphino)-1,1'-binaphthyl, 2,2'-bis(diphenyl phosphino)-1,1'-binaphthyl, 2,2'-bis[di(methyl phenyl)phosphino]-1,1'-binaphthyl, 2,2'-bis[di(butylphenyl)phosphino]-1,1'-binaphthyl, 2,2'-bis[di(dimethyl phenyl)phosphino]-1,1'-binaphthyl, 2,2'-bis[di(dibutyl phenyl)phosphino]-1,1'-binaphthyl, 2,2'-bis[di(trimethyl phenyl)phosphino]-1,1'-binaphthyl, 2,2'-bis[di(tributyl phenyl)phosphino]-1,1'-binaphthyl, 2,2'-bis(dibenzyl phosphino)-1,1'-binaphthyl, 2,2'-bis(dinaphthyl phosphino)-1,1'-binaphthyl, 2,2'-bis[di(methoxyphenyl)phosphino]-1,1'-binaphthyl, 2,2'-bis{di[(dimethylamino)phenyl]phosphino}-1,1'-binaphthyl, 2,2'-bis{di[(trifluoromethyl)phenyl]phosphino}-1,1'-binaphthyl, 2,2'-bis[di(nitrophenyl)phosphino]-1,1'-binaphthyl, 2,2'-bis[di(cyanophenyl)phosphino]-1,1'-binaphthyl, 2,2'-bis[di(acetyl phenyl)phosphino]-1,1'-binaphthyl, 2,2'-bis[di(pentafluorophenyl)phosphino]-1,1'-binaphthyl, 2,2'-bis[di(dimethoxyphenyl)phosphino]-1,1'-binaphthyl, 2,2'-bis{di[di(trifluoromethyl)phenyl]phosphino}-1,1'-binaphthyl, 2,2'-bis[tri(dimethoxyphenyl)phosphino]-1,1'-binaphthyl, 2,2'-bis{tri[di(trifluoromethyl)phenyl]phosphino}-1,1'-binaphthyl, bis(phospholano)methane(bis(phospholano)methane), bis(phospholano)ethane, bis(phospholano)propane, bis(phospholano)butane, bis(phospholano)pentane, bis(phospholano)hexane, bis(phospholano)cyclohexane, bis(phospholano)heptane, bis(phospholano)octane, bis(phospholano)benzene, bis(phospholano)naphthalene, bis(phospholano)ferrocene, bis(phospholano)titanocene, bis(phospholano)chromocene, bis(phospholano)cobaltocene, bis(phospholano)nickelocene, bis(phospholano)zirconocene, bis(phospholano)ruthenocene, bis(phospholano)hafnocene, bis(dimethyl phospholano)methane, bis(dimethyl phospholano)ethane, bis(dimethyl phospholano)propane, bis(dimethyl phospholano)butane, bis(dimethyl phospholano)pentane, bis(dimethyl phospholano)hexane, bis(dimethyl phospholano)cyclohexane, bis(dimethyl phospholano)heptane, bis(dimethyl phospholano)octane, bis(dimethyl phospholano)benzene, bis(dimethyl phospholano)naphthalene, bis(dimethyl phospholano)ferrocene, bis(dimethyl phospholano)titanocene, bis(dimethyl phospholano)chromocene, bis(dimethyl phospholano)cobaltocene, bis(dimethyl phospholano)nickelocene, bis(dimethyl phospholano)zirconocene, bis(dimethyl phospholano)ruthenocene, bis(dimethyl phospholano)hafnocene, bis(diethyl phospholano)methane, bis(diethyl phospholano)ethane, bis(diethyl phospholano)propane, bis(diethyl phospholano)butane, bis(diethyl phospholano)pentane, bis(diethyl phospholano)hexane, bis(diethyl phospholano)cyclohexane, bis(diethyl phospholano)heptane, bis(diethyl phospholano)octane, bis(diethyl phospholano)benzene, bis(diethyl phospholano)naphthalene, bis(diethyl phospholano)ferrocene, bis(diethyl phospholano)titanocene, bis(diethyl phospholano)chromocene, bis(diethyl phospholano)cobaltocene, bis(diethyl phospholano)nickelocene, bis(diethyl phospholano)zirconocene, bis(diethyl phospholano)ruthenocene, bis(diethyl phospholano)hafnocene, bis(dipropyl phospholano)methane, bis(dipropyl phospholano)ethane, bis(dipropyl phospholano)propane, bis(dipropyl phospholano)butane, bis(dipropyl phospholano)pentane, bis(dipropyl phospholano)hexane, bis(dipropyl phospholano)cyclohexane, bis(dipropyl phospholano)heptane, bis(dipropyl phospholano)octane, bis(dipropyl phospholano)benzene, bis(dipropyl phospholano)naphthalene, bis(dipropyl phospholano)ferrocene, bis(dipropyl phospholano)titanocene, bis(dipropyl phospholano)chromocene, bis(dipropyl phospholano)cobaltocene, bis(dipropyl phospholano)nickelocene, bis(dipropyl phospholano)zirconocene, bis(dipropyl phospholano)ruthenocene, bis(dipropyl phospholano)hafnocene, bis(dibutyl phospholano)methane, bis(dibutyl phospholano)ethane, bis(dibutyl phospholano)propane, bis(dibutyl phospholano)butane, bis(dibutyl phospholano)pentane, bis(dibutyl phospholano)hexane, bis(dibutyl phospholano)cyclohexane, bis(dibutyl phospholano)heptane, bis(dibutyl phospholano)octane, bis(dibutyl phospholano)benzene, bis(dibutyl phospholano)naphthalene, bis(dibutyl phospholano)ferrocene, bis(dibutyl phospholano)titanocene, bis(dibutyl phospholano)chromocene, bis(dibutyl phospholano)cobaltocene, bis(dibutyl phospholano)nickelocene, bis(dibutyl phospholano)zirconocene, bis(dibutyl phospholano)ruthenocene, bis(dibutyl phospholano)hafnocene, bis(dipentyl phospholano)methane, bis(dipentyl phospholano)ethane, bis(dipentyl phospholano)propane, bis(dipentyl phospholano)butane, bis(dipentyl phospholano)pentane, bis(dipentyl phospholano)hexane, bis(dipentyl phospholano)cyclohexane, bis(dipentyl phospholano)heptane, bis(dipentyl phospholano)octane, bis(dipentyl phospholano)benzene, bis(dipentyl phospholano)naphthalene, bis(dipentyl phospholano)ferrocene, bis(dipentyl phospholano)titanocene, bis(dipentyl phospholano)chromocene, bis(dipentyl phospholano)cobaltocene, bis(dipentyl phospholano)nickelocene, bis(dipentyl phospholano)zirconocene, bis(dipentyl phospholano)ruthenocene, bis(dipentyl phospholano)hafnocene, bis(dicyclopentyl phospholano)methane, bis(dicyclopentyl phospholano)ethane, bis(dicyclopentyl phospholano)propane, bis(dicyclopentyl phospholano)butane, bis(dicyclopentyl phospholano)pentane, bis(dicyclopentyl phospholano)hexane, bis(dicyclopentyl phospholano)cyclohexane, bis(dicyclopentyl phospholano)heptane, bis(dicyclopentyl phospholano)octane, bis(dicyclopentyl phospholano)benzene, bis(dicyclopentyl phospholano)naphthalene, bis(dicyclopentyl phospholano)ferrocene, bis(dicyclopentyl phospholano)titanocene, bis(dicyclopentyl phospholano)chromocene, bis(dicyclopentyl phospholano)cobaltocene, bis(dicyclopentyl phospholano)nickelocene, bis(dicyclopentyl phospholano)zirconocene, bis(dicyclopentyl phospholano)ruthenocene, bis(dicyclopentyl phospholano)hafnocene, bis(dihexyl phospholano)methane, bis(dihexyl phospholano)ethane, bis(dihexyl phospholano)propane, bis(dihexyl phospholano)butane, bis(dihexyl phospholano)pentane, bis(dihexyl phospholano)hexane, bis(dihexyl phospholano)cyclohexane, bis(dihexyl phospholano)heptane, bis(dihexyl phospholano)octane, bis(dihexyl phospholano)benzene, bis(dihexyl phospholano)naphthalene, bis(dihexyl phospholano)ferrocene, bis(dihexyl phospholano)titanocene, bis(dihexyl phospholano)chromocene, bis(dihexyl phospholano)cobaltocene, bis(dihexyl phospholano)nickelocene, bis(dihexyl phospholano)zirconocene, bis(dihexyl phospholano)ruthenocene, bis(dihexyl phospholano)hafnocene, bis(dicyclohexyl phospholano)methane, bis(dicyclohexyl phospholano)ethane, bis(dicyclohexyl phospholano)propane, bis(dicyclohexyl phospholano)butane, bis(dicyclohexyl phospholano)pentane, bis(dicyclohexyl phospholano)cyclopentane, bis(dicyclohexyl phospholano)hexane, bis(dicyclohexyl phospholano)cyclohexane, bis(dicyclohexyl phospholano)heptane, bis(dicyclohexyl phospholano)octane, bis(dicyclohexyl phospholano)benzene, bis(dicyclohexyl phospholano)naphthalene, bis(dicyclohexyl phospholano)ferrocene, bis(dicyclohexyl phospholano)titanocene, bis(dicyclohexyl phospholano)chromocene, bis(dicyclohexyl phospholano)cobaltocene, bis(dicyclohexyl phospholano)nickelocene, bis(dicyclohexyl phospholano)zirconocene, bis(dicyclohexyl phospholano)ruthenocene, bis(dicyclohexyl phospholano)hafnocene, bis(diphenyl phospholano)methane, bis(diphenyl phospholano)ethane, bis(diphenyl phospholano)propane, bis (diphenyl phospholano)butane, bis(diphenyl phospholano) pentane, bis(diphenyl phospholano)hexane, bis(diphenyl phospholano)cyclohexane, bis(diphenyl phospholano)heptane, bis(diphenyl phospholano)octane, bis(diphenyl phospholano)benzene, bis(diphenyl phospholano)naphthalene, bis(diphenyl phospholano)ferrocene, bis(diphenyl phospholano)titanocene, bis(diphenyl phospholano)chromocene, bis (diphenyl phospholano)cobaltocene, bis(diphenyl phospholano)nickelocene, bis(diphenyl phospholano)zirconocene, bis (diphenyl phospholano)ruthenocene, bis(diphenyl phospholano)hafnocene, bis(dinaphthyl phospholano)methane, bis(dinaphthyl phospholano)ethane, bis(dinaphthyl phospholano)propane, bis(dinaphthyl phospholano)butane, bis(dinaphthyl phospholano)pentane, bis(dinaphthyl phospholano)hexane, bis(dinaphthyl phospholano)cyclohexane, bis(dinaphthyl phospholano)heptane, bis(dinaphthyl phospholano)octane, bis(dinaphthyl phospholano)benzene, bis (dinaphthyl phospholano)naphthalene, bis(dinaphthyl phospholano)ferrocene, bis(dinaphthyl phospholano)titanocene, bis(dinaphthyl phospholano)chromocene, bis(dinaphthyl phospholano)cobaltocene, bis(dinaphthyl phospholano) nickelocene, bis(dinaphthyl phospholano)zirconocene, bis (dinaphthyl phospholano)ruthenocene, bis(dinaphthyl phospholano)hafnocene, 1,1'-methyl-2,2'-diphospholane, 1,1'-ethyl-2,2'-diphospholane, 1,1'-propyl-2,2'-diphospholane, 1,1'-butyl-2,2'-diphospholane, 1,1'-pentyl-2,2'-diphospholane, 1,1'-cyclopentyl-2,2'-diphospholane, 1,1'-hexyl-2,2'-diphospholane, 1,1'-cyclohexyl-2,2'-diphospholane, 1,1'-octyl-2,2'-diphospholane, 1,1'-phenyl-2,2'-diphospholane, 1,1'-methyl phenyl-2,2'-diphospholane, 1,1'-dimethyl phenyl-2,2'-diphospholane, 1,1'-trimethyl phenyl-2,2'-diphospholane, 1,1'-butylphenyl-2,2'-diphospholane, 1,1'-dibutyl phenyl-2,2'-diphospholane, 1,1'-tributyl phenyl-2,2'-diphospholane, 1,1'-methoxyphenyl-2,2'-diphospholane, 1,1'-dimethyl aminophenyl-2,2'-diphospholane, 1,1'-trifluoromethyl phenyl-2,2'-diphospholane, 1,1'-nitrophenyl-2,2'-diphospholane, 1,1'-cyanophenyl-2,2'-diphospholane, 1,1'-acetyl phenyl-2,2'-diphospholane, 1,1'-pentafluorophenyl-2,2'-diphospholane, 1,1'-dimethoxyphenyl-2,2'-diphospholane, 1,1'-di(trifluoromethyl)phenyl-2,2'-diphospholane, 1,1'-trimethoxyphenyl-2,2'-diphospholane, 1,1'-tri(trifluoromethyl)phenyl-2,2'-diphospholane.

More preferably, the trivalent phosphorus compound having two trivalent phosphorus atoms is at least one compound selected from the following group:

bis(dimethyl phosphino)methane, bis(diethyl phosphino) methane, bis(dibutyl phosphino)methane, bis(dicyclohexyl phosphino)methane, bis(diphenyl phosphino)methane, bis[di (methyl phenyl)phosphino]methane, bis(dimethyl phosphino)ethane, bis(diethyl phosphino)ethane, bis(dibutyl phosphino)ethane, bis(dicyclohexyl phosphino)ethane, bis (diphenyl phosphino)ethane, bis(dimethyl phosphino) propane, bis(diethyl phosphino)propane, bis(dibutyl phosphino)propane, bis(dicyclohexyl phosphino)propane, bis(diphenyl phosphino)propane, bis(dimethyl phosphino) butane, bis(diethyl phosphino)butane, bis(dibutyl phosphino) butane, bis(dicyclohexyl phosphino)butane, bis(diphenyl phosphino)butane, bis(dimethyl phosphino)cyclohexane, bis (diethyl phosphino)cyclohexane, bis(dibutyl phosphino)cyclohexane, bis(dicyclohexyl phosphino)cyclohexane, bis (diphenyl phosphino)cyclohexane, bis(dimethyl phosphino) ferrocene, bis(diethyl phosphino)ferrocene, bis(dipropyl phosphino)ferrocene, bis(dibutyl phosphino)ferrocene, bis (dicyclohexyl phosphino)ferrocene, bis(diphenyl phosphino) ferrocene, 2,2'-bis(dimethyl phosphino)-1,1'-biphenyl, 2,2'-bis(diethyl phosphino)-1,1'-biphenyl, 2,2'-bis(dibutyl phosphino)-1,1'-biphenyl, 2,2'-bis(dicyclohexyl phosphino)-1,1'-biphenyl, 2,2'-bis(diphenyl phosphino)-1,1'-biphenyl, 2,2'-bis(dimethyl phosphino)-1,1'-binaphthyl, 2,2'-bis(diethyl phosphino)-1,1'-binaphthyl, 2,2'-bis(dibutyl phosphino)-1,1'-binaphthyl, 2,2'-bis(dicyclohexyl phosphino)-1,1'-binaphthyl, 2,2'-bis(diphenyl phosphino)-1,1'-binaphthyl, 2,2'-bis[di(methyl phenyl)phosphino]-1,1'-binaphthyl, 2,2'-bis[di(dimethyl phenyl)phosphino]-1,1'-binaphthyl, 2,2'-bis [di(trimethyl phenyl)phosphino]-1,1'-binaphthyl, bis(dimethyl phospholano)methane, bis(dimethyl phospholano)ethane, bis(dimethyl phospholano)propane, bis (dimethyl phospholano)butane, bis(dimethyl phospholano) cyclohexane, bis(dimethyl phospholano)benzene, bis (dimethyl phospholano)ferrocene, bis(diethyl phospholano) methane, bis(diethyl phospholano)ethane, bis(diethyl phospholano)propane, bis(diethyl phospholano)butane, bis (diethyl phospholano)cyclohexane, bis(diethyl phospholano) benzene, bis(diethyl phospholano)ferrocene, bis(dipropyl phospholano)methane, bis(dipropyl phospholano)ethane, bis (dipropyl phospholano)propane, bis(dipropyl phospholano) butane, bis(dipropyl phospholano)cyclohexane, bis(dipropyl phospholano)benzene, bis(dipropyl phospholano)ferrocene, bis(dibutyl phospholano)methane, bis(dibutyl phospholano) ethane, bis(dibutyl phospholano)propane, bis(dibutyl phospholano)butane, bis(dibutyl phospholano)cyclohexane, bis (dibutyl phospholano)benzene, bis(dibutyl phospholano) ferrocene, bis(dicyclohexyl phospholano)methane, bis (dicyclohexyl phospholano)ethane, bis(dicyclohexyl phospholano)propane, bis(dicyclohexyl phospholano)butane, bis(dicyclohexyl phospholano)cyclohexane, bis(dicyclohexyl phospholano)benzene, bis(dicyclohexyl phospholano)ferrocene, 1,1'-methyl-2,2'-diphospholane, 1,1'-ethyl-2,2'-diphospholane, 1,1'-butyl-2,2'-diphospholane, 1,1'-cyclohexyl-2,2'-diphospholane.

Further preferably, the trivalent phosphorus compound having two trivalent phosphorus atoms is at least one compound selected from the following group:

bis(dicyclohexyl phosphino)methane, bis(dimethyl phosphino)ethane, bis(diethyl phosphino)ethane, bis(dicyclohexyl phosphino)ethane, bis(diphenyl phosphino)ethane, bis (dicyclohexyl phosphino)propane, bis(diphenyl phosphino) propane, bis(diphenyl phosphino)cyclohexane, bis(dipropyl phosphino)ferrocene, bis(dibutyl phosphino)ferrocene, bis (dicyclohexyl phosphino)ferrocene, bis(diphenyl phosphino) ferrocene, bis(dimethyl phospholano)ethane, bis(dimethyl phospholano)ferrocene, bis(diethyl phospholano)ethane, bis (diethyl phospholano)benzene, bis(dipropyl phospholano)ethane, bis(dipropyl phospholano)benzene, bis(dipropyl phospholano)ferrocene, 1,1'-butyl-2,2'-di phospholane.

(Trivalent Phosphorus Compound Having Three or More Trivalent Phosphorus Atoms)

The trivalent phosphorus compound having three or more trivalent phosphorus atoms is not particularly limited as long as being a compound containing three or more trivalent phosphorus atoms, and specific examples thereof include ones represented by the above formula (1) wherein a is 3 or more.

Among the trivalent phosphorus compounds each having three or more trivalent phosphorus atoms, at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

bis(dimethyl phosphinomethyl)methyl phosphine, bis(diethyl phosphinomethyl)ethyl phosphine, bis(dipropyl phosphinomethyl)propyl phosphine, bis(dibutyl phosphinomethyl)butyl phosphine, bis(dihexyl phosphinomethyl)hexyl phosphine, bis(dicyclohexyl phosphinomethyl)cyclohexyl phosphine, bis(diphenyl phosphinomethyl)phenylphosphine, bis(dimethyl phosphinoethyl)methyl phosphine, bis(diethyl phosphinoethyl)ethyl phosphine, bis(dipropyl phosphinoethyl)propyl phosphine, bis(dibutyl phosphinoethyl)butyl phosphine, bis(dihexyl phosphinoethyl)hexyl phosphine, bis(dicyclohexyl phosphinoethyl)cyclohexyl phosphine, bis (diphenyl phosphinoethyl)phenylphosphine, bis(dimethyl phosphinopropyl)methyl phosphine, bis(diethyl phosphinopropyl)ethyl phosphine, bis(dipropyl phosphinopropyl)propyl phosphine, bis(dibutyl phosphinopropyl)butyl phosphine, bis(dihexyl phosphinopropyl)hexyl phosphine, bis (dicyclohexyl phosphinopropyl)cyclohexyl phosphine, bis (diphenyl phosphinopropyl)phenylphosphine, bis(dimethyl phosphinobutyl)methyl phosphine, bis(diethyl phosphinobutyl)ethyl phosphine, bis(dipropyl phosphinobutyl)propyl phosphine, bis(dibutyl phosphinobutyl)butyl phosphine, bis (dihexyl phosphinobutyl)hexyl phosphine, bis(dicyclohexyl phosphinobutyl)cyclohexyl phosphine, bis(diphenyl phosphinobutyl)phenylphosphine, bis(dimethyl phosphinohexyl) methyl phosphine, bis(diethyl phosphinohexyl)ethyl phosphine, bis(dipropyl phosphinohexyl)propyl phosphine, bis (dibutyl phosphinohexyl)butyl phosphine, bis(dihexyl phosphinohexyl)hexyl phosphine, bis(dicyclohexyl phosphinohexyl)cyclohexyl phosphine, bis(diphenyl phosphinohexyl)phenylphosphine, bis(dimethyl phosphinocyclohexyl)methyl phosphine, bis (diethyl phosphinocyclohexyl)ethyl phosphine, bis(dipropyl phosphinocyclohexyl)propyl phosphine, bis(dibutyl phosphinocyclohexyl)butyl phosphine bis(dihexyl phosphinocyclohexyl)hexyl phosphine, bis(dicyclohexyl phosphinocyclohexyl)cyclohexyl phosphine, bis(diphenyl phosphinocyclohexyl)phenylphosphine, tris(dimethyl phosphino)propane, tris(diethyl phosphino)propane, tris(dipropyl phosphino)propane, tris(dibutyl phosphino)propane, tris(dihexyl phosphino)propane, tris(dicyclohexyl phosphino)propane, tris(diphenyl phosphino)propane, tris[di(methyl phenyl)phosphino]propane, tris[di(butylphenyl)phosphino] propane, tris[di(dimethyl phenyl)phosphino]propane, tris[di (dibutyl phenyl)phosphino]propane, tris[di(trimethyl phenyl)phosphino]propane, tris[di(tributyl phenyl)phosphino]propane, tris(dimethyl phosphino)butane, tris(diethyl phosphino)butane, tris(dipropyl phosphino)butane, tris(dibutyl phosphino)butane, tris(dihexyl phosphino)butane, tris(dicyclohexyl phosphino)butane, tris(diphenyl phosphino)butane, tris[di(methyl phenyl)phosphino]butane, tris[di (butylphenyl)phosphino]butane, tris[di(dimethyl phenyl) phosphino]butane, tris[di(dibutyl phenyl)phosphino]butane, tris[di(trimethyl phenyl)phosphino]butane, tris[di(tributyl phenyl)phosphino]butane, tris(dimethyl phosphino)hexane, tris(diethyl phosphino)hexane, tris(dipropyl phosphino)hexane, tris(dibutyl phosphino)hexane, tris(dihexyl phosphino) hexane, tris(dicyclohexyl phosphino)hexane, tris(diphenyl phosphino)hexane, tris[di(methyl phenyl)phosphino]hexane, tris[di(butylphenyl)phosphino]hexane, tris[di(dimethyl phenyl)phosphino]hexane, tris[di(dibutyl phenyl)phosphino] hexane, tris[di(trimethyl phenyl)phosphino]hexane, tris[di (tributyl phenyl)phosphino]hexane, tris(dimethyl phosphino)cyclohexane, tris(diethyl phosphino)cyclohexane, tris(dipropyl phosphino)cyclohexane, tris(dibutyl phosphino)cyclohexane, tris(dihexyl phosphino) cyclohexane, tris(dicyclohexyl phosphino)cyclohexane, tris (diphenyl phosphino)cyclohexane, tris[di(methyl phenyl) phosphino]cyclohexane, tris[di(butylphenyl)phosphino] cyclohexane, tris[di(dimethyl phenyl)phosphino] cyclohexane, tris[di(dibutyl phenyl)phosphino]cyclohexane, tris[di(trimethyl phenyl)phosphino]cyclohexane, tris[di (tributyl phenyl)phosphino]cyclohexane, tris(dimethyl phosphinomethyl)phosphine, tris(diethyl phosphinomethyl)phosphine, tris(dipropyl phosphinomethyl)phosphine, tris(dibutyl phosphinomethyl)phosphine, tris(dihexyl phosphinomethyl) phosphine, tris(dicyclohexyl phosphinomethyl)phosphine, tris(diphenyl phosphinomethyl)phosphine, tris(dimethyl phosphinoethyl)phosphine, tris(diethyl phosphinoethyl) phosphine, tris(dipropyl phosphinoethyl)phosphine, tris (dibutyl phosphinoethyl)phosphine, tris(dihexyl phosphinoethyl)phosphine, tris(dicyclohexyl phosphinoethyl) phosphine, tris(diphenyl phosphinoethyl)phosphine, tris (dimethyl phosphinopropyl)phosphine, tris(diethyl phosphinopropyl)phosphine, tris(dipropyl phosphinopropyl) phosphine, tris(dibutyl phosphinopropyl)phosphine, tris(dihexyl phosphinopropyl)phosphine, tris(dicyclohexyl phosphinopropyl)phosphine, tris(diphenyl phosphinopropyl) phosphine, tris(dimethyl phosphinobutyl)phosphine, tris (diethyl phosphinobutyl)phosphine, tris(dipropyl phosphinobutyl)phosphine, tris(dibutyl phosphinobutyl) phosphine, tris(dihexyl phosphinobutyl)phosphine, tris(dicyclohexyl phosphinobutyl)phosphine, tris(diphenyl phosphinobutyl)phosphine, tris(dimethyl phosphinohexyl) phosphine, tris(diethyl phosphinohexyl)phosphine, tris (dipropyl phosphinohexyl)phosphine, tris(dibutyl phosphinohexyl)phosphine, tris(dihexyl phosphinohexyl) phosphine, tris(dicyclohexyl phosphinohexyl)phosphine, tris (diphenyl phosphinohexyl)phosphine, tris(dimethyl phosphinocyclohexyl)phosphine, tris(diethyl phosphinocyclohexyl)phosphine, tris(dipropyl phosphinocyclohexyl)phosphine, tris(dibutyl phosphinocyclohexyl)phosphine, tris(dihexyl phosphinocyclohexyl) phosphine, tris(dicyclohexyl phosphinocyclohexyl) phosphine, tris(diphenyl phosphinocyclohexyl)phosphine, tetrakis(dimethyl phosphino)butane, tetrakis(diethyl phosphino)butane, tetrakis(dipropyl phosphino)butane, tetrakis (dibutyl phosphino)butane, tetrakis(dihexyl phosphino)butane, tetrakis(dicyclohexyl phosphino)butane, tetrakis (diphenyl phosphino)butane, tetrakis[di(methyl phenyl) phosphino]butane, tetrakis[di(butylphenyl)phosphino] butane, tetrakis[di(dimethyl phenyl)phosphino]butane, tetrakis[di(dibutyl phenyl)phosphino]butane, tetrakis[di(trimethyl phenyl)phosphino]butane, tetrakis[di(tributyl phenyl)phosphino]butane, tetrakis(dimethyl phosphino)hexane, tetrakis(diethyl phosphino)hexane, tetrakis(dipropyl phosphino)hexane, tetrakis(dibutyl phosphino)hexane, tetrakis (dihexyl phosphino)hexane, tetrakis(dicyclohexyl phosphino)hexane, tetrakis(diphenyl phosphino)hexane, tetrakis[di (methyl phenyl)phosphino]hexane, tetrakis[di(butylphenyl) phosphino]hexane, tetrakis[di(dimethyl phenyl)phosphino] hexane, tetrakis[di(dibutyl phenyl)phosphino]hexane, tetrakis[di(trimethyl phenyl)phosphino]hexane, tetrakis[di (tributyl phenyl)phosphino]hexane, tetrakis(dimethyl phosphino)cyclohexane, tetrakis(diethyl phosphino)cyclohexane, tetrakis(dipropyl phosphino)cyclohexane, tetrakis(dibutyl phosphino)cyclohexane, tetrakis(dihexyl phosphino)cyclohexane, tetrakis(dicyclohexyl phosphino)cyclohexane, tetrakis(diphenyl phosphino)cyclohexane, tetrakis[di(methyl phenyl)phosphino]cyclohexane, tetrakis[di(butylphenyl) phosphino]cyclohexane, tetrakis[di(dimethyl phenyl)phosphino]cyclohexane, tetrakis[di(dibutyl phenyl)phosphino]

cyclohexane, tetrakis[di(trimethyl phenyl)phosphino]cyclohexane, tetrakis[di(tributyl phenyl)phosphino]cyclohexane.

More preferably, the trivalent phosphorus compound having three or more trivalent phosphorus atoms is at least one compound selected from the following group:

bis(dimethyl phosphinoethyl)methyl phosphine, bis(diethyl phosphinoethyl)ethyl phosphine, bis(dipropyl phosphinoethyl)propyl phosphine, bis(dibutyl phosphinoethyl)butyl phosphine, bis(dihexyl phosphinoethyl)hexyl phosphine, bis(dicyclohexyl phosphinoethyl)cyclohexyl phosphine, bis(diphenyl phosphinoethyl)phenylphosphine, bis(dimethyl phosphinopropyl)methyl phosphine, bis(diethyl phosphinopropyl)ethyl phosphine, bis(dipropyl phosphinopropyl)propyl phosphine, bis(dibutyl phosphinopropyl)butyl phosphine, bis(dihexyl phosphinopropyl)hexyl phosphine, bis(dicyclohexyl phosphinopropyl)cyclohexyl phosphine, bis(diphenyl phosphinopropyl)phenylphosphine, bis(dimethyl phosphinobutyl)methyl phosphine, bis(diethyl phosphinobutyl)ethyl phosphine, bis(dipropyl phosphinobutyl)propyl phosphine, bis(dibutyl phosphinobutyl)butyl phosphine, bis(dihexyl phosphinobutyl)hexyl phosphine, bis(dicyclohexyl phosphinobutyl)cyclohexyl phosphine, bis(diphenyl phosphinobutyl)phenylphosphine, tris(dimethyl phosphinomethyl)phosphine, tris(diethyl phosphinomethyl)phosphine, tris(dipropyl phosphinomethyl)phosphine, tris(dibutyl phosphinomethyl)phosphine, tris(dihexyl phosphinomethyl)phosphine, tris(dicyclohexyl phosphinomethyl)phosphine, tris(diphenyl phosphinomethyl)phosphine, tris(dimethyl phosphinoethyl)phosphine, tris(diethyl phosphinoethyl)phosphine, tris(dipropyl phosphinoethyl)phosphine, tris(dibutyl phosphinoethyl)phosphine, tris(dihexyl phosphinoethyl)phosphine, tris(dicyclohexyl phosphinoethyl)phosphine, tris(diphenyl phosphinoethyl)phosphine, tris(dimethyl phosphinopropyl)phosphine, tris(diethyl phosphinopropyl)phosphine, tris(dipropyl phosphinopropyl)phosphine, tris(dibutyl phosphinopropyl)phosphine, tris(dihexyl phosphinopropyl)phosphine, tris(dicyclohexyl phosphinopropyl)phosphine, tris(diphenyl phosphinopropyl)phosphine, tris(dimethyl phosphinobutyl)phosphine, tris(diethyl phosphinobutyl)phosphine, tris(dipropyl phosphinobutyl)phosphine, tris(dibutyl phosphinobutyl)phosphine, tris(dihexyl phosphinobutyl)phosphine, tris(dicyclohexyl phosphinobutyl)phosphine, tris(diphenyl phosphinobutyl)phosphine.

Further preferably, the trivalent phosphorus compound having three or more trivalent phosphorus atoms is at least one compound selected from the following group:

bis(diethyl phosphinoethyl)ethyl phosphine, bis(dipropyl phosphinoethyl)propyl phosphine, bis(dibutyl phosphinoethyl)butyl phosphine, bis(dicyclohexyl phosphinoethyl)cyclohexyl phosphine, bis(diphenyl phosphinoethyl)phenylphosphine, tris(diethyl phosphinoethyl)phosphine, tris(dipropyl phosphinoethyl)phosphine, tris(dibutyl phosphinoethyl)phosphine, tris(dicyclohexyl phosphinoethyl)phosphine, tris(diphenyl phosphinoethyl)phosphine.

(Component (A-3): Ketone Compound)

The component (A-3) of the present embodiment is a ketone compound containing one or more ketone group(s) in the molecule. As the component (A-3), one ketone compound may be used alone, or a plurality of ketone compounds may be used in combination.

It is preferable that the ketone compound (A-3) should be a compound represented by the following formula (2), (3), or (4) because there is a tendency that the polymerization of the episulfide compound (C) can be further suppressed, resulting in the further improved stability of the composition and/or there is a tendency that a side reaction can be further suppressed during polymerizing the episulfide compound (C):

(2)

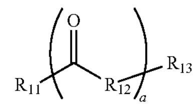

(3)

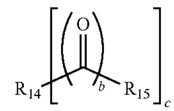

(4)

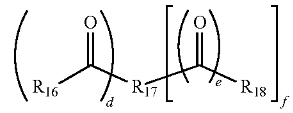

In the formula, a, c, d, and f each independently represent a number of 1 or more, and b and e each independently represent a number of 2 or more.

$R_{11}$ and $R_{12}$ each independently represent a linear, branched, or cyclic aliphatic hydrocarbon group having 1 to 20 carbon atoms or a substituted or unsubstituted aromatic hydrocarbon group.

$R_{13}$ represents hydrogen, a linear, branched, or cyclic aliphatic having 1 to 20 carbon atoms, or a substituted or unsubstituted aromatic hydrocarbon group.

$R_{11}$, $R_{12}$, and $R_{13}$ may be linked to each other.

$R_{14}$ and $R_{15}$ each independently represent a linear, branched, or cyclic aliphatic hydrocarbon group having 1 to 20 carbon atoms or a substituted or unsubstituted aromatic hydrocarbon group.

The $R_{15}$ groups may be the same or different.

$R_{14}$, $R_{15}$, and the $R_{15}$ groups may be linked to each other.

$R_{16}$, $R_{17}$, and $R_{18}$ each independently represent a linear, branched, or cyclic aliphatic hydrocarbon group having 1 to 20 carbon atoms or a substituted or unsubstituted aromatic hydrocarbon group.

The $R_{16}$ groups and the $R_{18}$ groups may be the same or different.

$R_{16}$, $R_{17}$, or $R_{18}$ and $R_{16}$ or $R_{18}$ may be linked to each other.

The above formula (3) represents the case where in the above formula (2), a is 2 or more and $R_{12}$ is absent.

The case where in the formula (2), a is 1, $R_{11}$ is $CH_3$, $R_{12}$ is $CH_2$, and $R_{13}$ is H gives acetone. Moreover, the case where in the formula (2), a is 2, $R_{11}$ is $CH_3$, $R_{12}$ is $CH_2CH_2$, and $R_{13}$ is H gives 2,5-heptanedione. Furthermore, the case where in the formula (2), a is 3, $R_{11}$ is $CH_3$, $R_{12}$ is $CH_2$, and $R_{13}$ is H gives 2,4,6-heptanetrione.

The case where in the formula (3), b is 2, c is 1, $R_{14}$ is $CH_3$, and $R_{15}$ is $CH_3$ gives 2,3-butanedione.

It is preferable that the number of carbon atoms in the ketone compound (A-3) should be 3 or more because there is a tendency that a side reaction can be further suppressed during polymerizing the episulfide compound (C) and/or there is a tendency that the polymerization of the episulfide compound (C) can be further suppressed when preparing the composition under room temperature, resulting in the further improved stability of the composition. It is more preferable that the number of carbon atoms should be 4 or more because there is a tendency that vapor pressure gets higher and handleability becomes better. From a similar viewpoint, it is further preferable that the number of carbon atoms should be 6 or more.

It is preferable that the number of carbon atoms in the ketone compound (A-3) should be 31 or less because of easy availability and because there is a tendency that cost as a composition can be further reduced, resulting in excellent economy. From a similar viewpoint, it is preferable that the number of carbon atoms should be 20 or less. It is further preferable that the number of carbon atoms should be 14 or less because there is a tendency that residues of undissolved matter can be further reduced when preparing the composition, so that a composition with better homogeneity is obtained. From a similar viewpoint, it is particularly preferable that the number of carbon atoms should be 12 or less.

It is preferable that the number of ketone group(s) in the ketone compound (A-3) should be 1 or more because there is a tendency that the polymerization of the episulfide compound (C) can be further suppressed when preparing the composition under room temperature, resulting in the further improved stability of the composition. From a similar viewpoint, it is more preferable that the number of ketone group(s) should be 2 or more.

It is preferable that the number of ketone group(s) in the ketone compound (A-3) should be 8 or less because of easy availability and because there is a tendency that cost as a composition can be further reduced, resulting in excellent economy. From a similar viewpoint, it is more preferable that the number of ketone group(s) should be 6 or less. It is further preferable that the number of ketone group(s) should be 4 or less because there is a tendency that residues of undissolved matter can be further reduced when preparing the composition, so that a composition excellent in homogeneity is obtained. From a similar viewpoint, it is particularly preferable that the number of ketone group(s) should be 3 or less.

Specific examples of the ketone compound (A) include monofunctional ketone compounds, bifunctional ketone compounds, polyfunctional ketone compounds, and polyketone compounds. These may be used alone, or a plurality thereof may be used in combination.

(Monofunctional Ketone Compound)

The monofunctional ketone compound according to the present embodiment is not particularly limited as long as being a compound having one ketone group.

Among the monofunctional ketone compounds, at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

acetone, 2-butanone, methyl butanone, dimethyl butanone, 2-pentanone, 3-pentanone, methyl pentanone, dimethyl pentanone, 2-hexanone, 3-hexanone, methyl hexanone, ethyl hexanone, dimethyl hexanone, propyl hexanone, isopropyl hexanone, ethyl methyl hexanone, ethyl dimethyl hexanone, 2-heptanone, 3-heptanone, 4-heptanone, methyl heptanone, ethyl heptanone, dimethyl heptanone, propyl heptanone, isopropyl heptanone, ethyl methyl heptanone, 2-octanone, 3-octanone, 4-octanone, methyl octanone, ethyl octanone, dimethyl octanone, 2-nonanone, 3-nonanone, 4-nonanone, 5-nonanone, methyl nonanone, 2-decanone, 3-decanone, 4-decanone, 5-decanone, 2-undecanone, 3-undecanone, 4-undecanone, 5-undecanone, 6-undecanone, 2-dodecanone, 3-dodecanone, 4-dodecanone, 5-dodecanone, 6-dodecanone, 2-tridecanone, 3-tridecanone, 4-tridecanone, 5-tridecanone, 6-tridecanone, 7-tridecanone, diethyl tridecanone, 2-tetradecanone, 3-tetradecanone, 4-tetradecanone, 5-tetradecanone, 6-tetradecanone, 7-tetradecanone, 1-[1,1'-biphenyl]-4-yl-2-cyclohexane ethanone, 1-(4'-methyl[1,1'-biphenyl]-4-yl)-1-octadecanone, acetophenone, methyl acetophenone, ethylacetophenone, propiophenone, methylpropiophenone, ethylpropiophenone, butyrophenone, methyl butyrophenone, ethyl butyrophenone, isobutyrophenone, methyl isobutyrophenone, ethyl isobutyrophenone, tert-butyl phenyl ketone, tert-butyl-methyl phenyl ketone, tert-butyl-ethyl phenyl ketone, sec-butyl phenyl ketone, sec-butyl-methyl phenyl ketone, sec-butyl-ethyl phenyl ketone, valerophenone, methyl valerophenone, ethyl valerophenone, isopentyl phenyl ketone, isopentyl(methyl phenyl)ketone, isopentyl(ethylphenyl)ketone, neopentyl phenyl ketone, neopentyl(methyl phenyl)ketone, neopentyl(ethylphenyl)ketone, hexanophenone, methyl hexanophenone, ethyl hexanophenone, heptanophenone, methyl heptanophenone, ethyl heptanophenone, octanophenone, methyl octanophenone, ethyl octanophenone, nonanophenone, methyl nonanophenone, ethyl nonanophenone, decanophenone, methyl decanophenone, ethyl decanophenone, undecaphenone, methyl undecanophenone, ethyl undecanophenone, dodecanophenone, methyl dodecanophenone, ethyl dodecanophenone acetonaphthone, methyl acetonaphthone, propionaphthone, methyl propionaphthone, tert-butyl naphthyl ketone, tert-butyl-(methyl naphthyl)ketone, sec-butyl naphthyl ketone, sec-butyl-(methyl naphthyl) ketone, isobutyronaphthone, methyl isobutyronaphthone, butyronaphthone, methyl butyronaphthone, valeronaphthone, methyl valeronaphthone, isopentyl naphthyl ketone, isopentyl(methyl naphthyl)ketone, neopentyl naphthyl ketone, neopentyl(methyl naphthyl)ketone, hexanonaphthone, methyl hexanonaphthone, heptanonaphthone, methyl heptanonaphthone, octanonaphthone, methyl octanonaphthone, nonanonaphthone, methyl nonanonaphthone, decanonaphthone, methyl decanonaphthone, undecanaphthone, methyl undecanonaphthone, dodecanaphthone, methyl dodecanonaphthone, naphthyl phenylketone, acetylphenanthrene, acetylanthracene, acetylpyrene, benzo[a]fluorenone, 4H-cyclopenta[def]phenanthren-4-one, 5-acetyl-1,2-dihydroacenaphthylene, 3,3,5,5,8,8-pentamethyl octahydro-2(1H)-naphthalenone, cyclopropanone, methyl cyclopropanone, dimethyl cyclopropanone, trimethyl cyclopropanone, tetramethyl cyclopropanone, ethyl cyclopropanone, diethyl cyclopropanone, triethyl cyclopropanone, tetraethyl cyclopropanone, phenyl cyclopropanone, diphenyl cyclopropanone, triphenyl cyclopropanone, tetraphenyl cyclopropanone, ethyl methyl cyclopropanone, diethyl methyl cyclopropanone, tetraethyl cyclopropanone, diethyl dimethyl cyclopropanone, cyclobutanone, methyl cyclobutanone, ethyl cyclobutanone, phenyl cyclobutanone, dimethyl cyclobutanone, trimethyl cyclobutanone, tetramethyl cyclobutanone, pentamethyl cyclobutanone, hexamethyl cyclobutanone, diethyl cyclobutanone, triethyl cyclobutanone, triethyl cyclobutanone, tetraethyl cyclobutanone, pentaethyl cyclobutanone, hexaethyl cyclobutanone, diphenyl cyclobutanone, triphenyl cyclobutanone, tetraphenyl cyclobutanone, pentaphenyl cyclobutanone, hexaphenyl cyclobutanone, cyclopentanone, methyl cyclopentanone, ethyl cyclopentanone, phenyl cyclopentanone, dimethyl cyclopentanone, trimethyl cyclopentanone, tetramethyl cyclopentanone, pentamethyl cyclopentanone, hexamethyl cyclopentanone, heptamethyl cyclopentanone, diethyl cyclopentanone, triethyl cyclopentanone, tetraethyl cyclopentanone, pentaethyl cyclopentanone, hexaethyl cyclopentanone, heptaethyl cyclopentanone, octaethyl cyclopentanone, diphenyl cyclopentanone, triphenyl cyclopentanone, tetraphenyl cyclopentanone, pentaphenyl cyclopentanone, hexaphenyl cyclopentanone, heptaphenyl cyclopentanone, octaphenyl cyclopentanone, cyclohexanone, methylcyclohexanone, dimethyl cyclohexanone, trimethyl cyclohexanone, tetramethyl cyclohexanone, pentamethyl cyclohexanone, hexamethyl cyclohexanone, heptamethyl cyclohexanone, octamethyl cyclohexanone, nonamethyl cyclohexanone, decamethyl cyclohexanone, ethyl cyclohexanone, diethyl cyclohexanone, triethyl cyclohexanone, tetraethyl cyclohexanone, pentaethyl cyclohexanone, hexaethyl cyclohexanone, heptaethyl cyclohexanone, octaethyl cyclohexanone, nonaethyl cyclohexanone, decaethyl cyclohexanone, phenylcyclohexanone, diphenyl cyclohexanone, triphenyl cyclohexanone, tetraphenyl cyclohexanone, pentaphenyl cyclohexanone, hexaphenyl cyclohexanone, heptaphenyl cyclohexanone, octaphenyl cyclohexanone, nonaphenyl cyclohexanone, decaphenyl cyclohexanone, cycloheptanone, propyl cyclohexanone, butyl cyclohexanone, pentyl cyclohexanone, hexyl cyclohexanone, methyl cycloheptanone, dimethyl cycloheptanone, ethyl cycloheptanone, diethyl cycloheptanone, phenyl cycloheptanone, diphenyl cycloheptanone, cyclooctanone, methyl cyclooctanone, dimethyl cyclooctanone, ethyl cyclooctanone, diethyl cyclooctanone, phenyl cyclooctanone, diphenyl cyclooctanone, cyclononanone, methyl cyclononanone, dimethyl cyclononanone, ethyl cyclononanone, diethyl cyclononanone, phenyl cyclononanone, diphenyl cyclononanone, cyclodecanone, methyl cyclodecanone, dimethyl cyclodecanone, ethyl cyclodecanone, diethyl cyclodecanone, phenyl cyclodecanone, diphenyl cyclodecanone, cycloundecanone, cyclododecanone, cyclotridecanone, cyclotetradecanone, decaron, adamantanone, adamantyl methyl ketone, norbornanone, bicyclo[2.2.2.]octan-1-one.

More preferably, the monofunctional ketone compound is at least one compound selected from the following group:

acetone, 2-butanone, methyl butanone, dimethyl butanone, 2-pentanone, 3-pentanone, methyl pentanone, 2-hexanone, 3-hexanone, 2-heptanone, 3-heptanone, 4-heptanone, 2-octanone, 3-octanone, 4-octanone, 2-nonanone, 3-nonanone, 4-nonanone, 5-nonanone, 2-decanone, 3-decanone, 4-decanone, 5-decanone, 2-undecanone, 3-undecanone, 4-undecanone, 5-undecanone, 6-undecanone, 2-dodecanone, 3-dodecanone, 4-dodecanone, 5-dodecanone, 6-dodecanone, 2-tridecanone, 3-tridecanone, 4-tridecanone, 5-tridecanone, 6-tridecanone, 7-tridecanone, diethyl tridecanone, 2-tetradecanone, 3-tetradecanone, 4-tetradecanone, 5-tetradecanone, 6-tetradecanone, 7-tetradecanone, 1-[1,1'-biphenyl]-4-yl-2-cyclohexane ethanone, 1-(4'-methyl[1,1'-biphenyl]-4-yl)-1-octadecanone, acetophenone, propiophenone, butyrophenone, isobutyrophenone, tert-butyl phenyl ketone, valerophenone, isopentyl phenyl ketone, neopentyl phenyl ketone, hexanophenone, heptanophenone, octanophenone, nonanophenone, decanophenone, undecaphenone, dodecanophenone, acetonaphthone, propionaphthone, tert-butyl naphthyl ketone, sec-butyl naphthyl ketone, isobutyronaphthone, butyronaphthone, valeronaphthone, isopentyl naphthyl ketone, neopentyl naphthyl ketone, hexanonaphthone, heptanonaphthone, octanonaphthone, naphthyl phenylketone, acetylphenanthrene, acetylanthracene, benzo[a]fluorenone, 4H-cyclopenta[def]phenanthren-4-one, 5-acetyl-1,2-dihydroacenaphthylene, 3,3,5,5,8,8-pentamethyl octahydro-2(1H)-naphthalenone, cyclopropanone, cyclobutanone, cyclopentanone, cyclohexanone, cycloheptanone, butyl cyclohexanone, cyclooctanone, cyclononanone, cyclodecanone, cycloundecanone, cyclododecanone, cyclotridecanone, cyclotetradecanone, decaron, adamantanone, adamantyl methyl ketone, norbornanone, bicyclo[2.2.2.]octan-1-one.

Further preferably, the monofunctional ketone compound is at least one compound selected from the following group:

dimethyl butanone, methyl pentanone, 2-hexanone, 3-hexanone, 3-heptanone, 2-octanone, 3-octanone, 2-nonanone, 3-nonanone, 5-nonanone, 2-decanone, 2-undecanone, 6-undecanone, 2-dodecanone, 5-dodecanone, 2-tridecanone, 7-tridecanone, diethyl tridecanone, acetophenone, propiophenone, butyrophenone, isobutyrophenone, tert-butyl phenyl ketone, valerophenone, isopentyl phenyl ketone, neopentyl phenyl ketone, hexanophenone, heptanophenone, octanophenone, nonanophenone, decanophenone, undecaphenone, dodecanophenone, acetonaphthone, naphthyl phenylketone, acetylphenanthrene, cyclohexanone, butyl cyclohexanone, cyclooctanone, cyclononanone, cyclodecanone, cyclododecanone, bicyclo[2.2.2.]octan-1-one.

(Bifunctional Ketone Compound)

The bifunctional ketone compound according to the present embodiment is not particularly limited as long as being a compound having two ketone groups in which the ketone groups are not adjacent.

Among the bifunctional ketone compounds, at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

2,4-pentanedione, methyl-2,4-pentanedione, dimethyl-2,4-pentanedione, ethyl-2,4-pentanedione, diethyl-2,4-pentanedione, ethyl methyl-2,4-pentanedione, 2,4-hexanedione, methyl-2,4-hexanedione, dimethyl-2,4-hexanedione, ethyl-2,4-hexanedione, diethyl-2,4-hexanedione, ethyl methyl-2,4-hexanedione, ethyl dimethyl-2,4-hexanedione, diethyl methyl-2,4-hexanedione, diethyl dimethyl-2,4-hexanedione, 2,5-hexanedione, methyl-2,5-hexanedione, ethyl-2,5-hexanedione, dimethyl-2,5-hexanedione, ethyl methyl-2,5-hexanedione, diethyl-2,5-hexanedione, trimethyl-2,5-hexanedione, ethyl dimethyl-2,5-hexanedione, diethyl methyl-2,5-hexanedione, triethyl-2,5-hexanedione, tetramethyl-2,5-hexanedione, ethyl trimethyl-2,5-hexanedione, diethyl dimethyl-2,5-hexanedione, triethyl methyl-2,5-hexanedione, tetraethyl-2,5-hexanedione, 2,4-heptane dione, 2,5-heptane dione, 2,6-heptane dione, 3,5-heptane dione, dimethyl-2,4-heptane dione, ethyl methyl-2,4-heptane dione, diethyl-2,4-heptane dione, dimethyl-2,5-heptane dione, ethyl methyl-2,5-heptane dione, diethyl-2,5-heptane dione, methyl-3,5-heptane dione, ethyl-3,5-heptane dione, dimethyl-3,5-heptane dione, ethyl methyl-3,5-heptane dione, diethyl-3,5-heptane dione, 2,4-octane dione, methyl-2,4-octane dione, ethyl-2,4-octane dione, dimethyl-2,4-octane dione, ethyl methyl-2,4-octane dione, diethyl-2,4-octane dione, 2,5-octane dione, methyl-2,5-octane dione, dimethyl-2,5-octane dione, ethyl methyl-2,5-octane dione, diethyl-2,5-octane dione, 2,6-octane dione, methyl-2,6-octane dione, ethyl-2,6-octane dione, dimethyl-2,6-octane dione, ethyl methyl-2,6-octane dione, diethyl-2,6-octane dione, 2,7-octane dione, methyl-2,7-octane dione, ethyl-2,7-octane dione, dimethyl-2,7-octane dione, ethyl methyl-2,7-octane dione, diethyl-2,7-octane dione, 3,5-octane dione, methyl-3,5-octane dione, ethyl-3,5-octane dione, dimethyl-3,5-octane dione, ethyl methyl-3,5-octane dione, diethyl-3,5-octane dione, 3,6-octane dione, methyl-3,6-octane dione, ethyl-3,6-octane dione, dimethyl-3,6-octane dione, ethyl methyl-3,6-octane dione, diethyl-3,6-octane dione, 2,4-nonane dione, 2,5-nonane dione, 2,6-nonane dione, 2,7-nonane dione, 2,8-nonane dione, 3,5-nonane dione, 3,6-nonane dione, 3,7-nonane dione, 3,8-nonane dione, 4,6-nonane dione, 4,7-nonane dione, 2,4-decane dione, 2,5-decane dione, 2,6-decane dione, 2,7-decane dione, 2,8-decane dione, 2,9-decane dione, 3,5-decane dione, 3,6-decane dione, 3,7-decane dione, 3,8-decane dione, 4,6-decane dione, 4,7-decane dione, 2,4-undecane dione, 2,5-undecane dione, 2,6-undecane dione, 2,7-undecane dione, 2,8-undecane dione, 2,9-undecane dione, 2,10-undecane dione, 3,5-undecane dione, 3,6-undecane dione, 3,7-undecane dione, 3,8-undecane dione, 3,9-undecane dione, 4,6-undecane dione, 4,7-undecane dione, 4,8-undecane dione, 5,7-undecane dione, 1,3-cyclobutane dione, methyl-1,3-cyclobutane dione, dimethyl-1,3-cyclobutane dione, trimethyl-1,3-cyclobutane dione, tetramethyl cyclobutane dione, ethyl methyl-1,3-cyclobutane dione, diethyl methyl-1,3-cyclobutane dione, triethyl methyl-1,3-cyclobutane dione, ethyl-1,3-cyclobutane dione, diethyl-1,3-cyclobutane dione, triethyl-1,3-cyclobutane dione, tetraethyl-1,3-cyclobutane dione, 1,3-cyclopentanedione, methyl-1,3-cyclopentanedione, ethyl-1,3-cyclopentanedione, dimethyl-1,3-cyclopentanedione, ethyl-2-methyl-1,3-cyclopentanedione, ethyl methyl-1,3-cyclopentanedione, diethyl-1,3-cyclopentanedione, trimethyl-1,3-cyclopentanedione, tetramethyl-1,3-cyclopentanedione, pentamethyl-1,3-cyclopentanedione, hexamethyl-1,3-cyclopentanedione, triethyl-1,3-cyclopentanedione, tetraethyl-1,3-cyclopentanedione, pentaethyl-1,3-cyclopentanedione, hexaethyl-1,3-cyclopentanedione, 1,3-cyclohexanedione, methyl-1,3-cyclohexanedione, ethyl-1,3-cyclohexanedione, dimethyl-1,3-cyclohexanedione, ethyl methyl-1,3-cyclohexanedione, diethyl-1,3-cyclohexanedione, trimethyl-1,3-cyclohexanedione, tetramethyl-1,3-cyclohexanedione, pentamethyl-1,3-cyclohexanedione, hexamethyl-1,3-cyclohexanedione, heptamethyl-1,3-cyclohexanedione, octamethyl-1,3-cyclohexanedione, triethyl-1,3-cyclohexanedione, tetraethyl-1,3-cyclohexanedione, pentaethyl-1,3-cyclohexanedione, hexaethyl-1,3-cyclohexanedione, heptaethyl-1,3-cyclohexanedione, octaethyl-1,3-cyclohexanedione, 1,4-cyclohexanedione, methyl-1,4-cyclohexanedione, ethyl-1,4-cyclohexanedione, dimethyl-1,4-cyclohexanedione, ethyl methyl-1,4-cyclohexanedione, diethyl-1,4-cyclohexanedione, trimethyl-1,4-cyclohexanedione, tetramethyl-1,4-cyclohexanedione, pentamethyl-1,4-cyclohexanedione, hexamethyl-1,4-cyclohexanedione, heptamethyl-1,4-cyclohexanedione, octamethyl-1,4-cyclohexanedione, triethyl-1,4-cyclohexanedione, tetraethyl-1,4-cyclohexanedione, pentaethyl-1,4-cyclohexanedione, hexaethyl-1,4-cyclohexanedione, heptaethyl-1,4-cyclohexanedione, octaethyl-1,4-cyclohexanedione, 1,3-cycloheptane dione, methyl-1,3-cycloheptane dione, ethyl-1,3-cycloheptane dione, dimethyl-1,3-cycloheptane dione, ethyl-2-methyl-1,3-cycloheptane dione, ethyl methyl-1,3-cycloheptane dione, diethyl-1,3-cycloheptane dione, 1,4-cycloheptane dione, methyl-1,4-cycloheptane dione, ethyl-1,4-cycloheptane dione, dimethyl-1,4-cycloheptane dione, ethyl methyl-1,4-cycloheptane dione, diethyl-1,4-cycloheptane dione, 1,3-cyclooctane dione, methyl-1,3-cyclooctane dione, ethyl-1,3-cyclooctane dione, dimethyl-1,3-cyclooctane dione, ethyl methyl-1,3-cyclooctane dione, diethyl-1,3-cyclooctane dione, 1,4-cyclooctane dione, methyl-1,4-cyclooctane dione, ethyl-1,4-cyclooctane dione, dimethyl-1,4-cyclooctane dione, ethyl methyl-1,4-cyclooctane dione, diethyl-1,4-cyclooctane dione, 1,5-cyclooctane dione, methyl-1,5-cyclooctane dione, ethyl-1,5-cyclooctane dione, dimethyl-1,5-cyclooctane dione, ethyl methyl-1,5-cyclooctane dione, diethyl-1,5-cyclooctane dione, 1,3-cyclononane dione, methyl-1,3-cyclononane dione, ethyl-1,3-cyclononane dione, 1,4-cyclononane dione, methyl-1,4-cyclononane dione, ethyl-1,4-cyclononane dione, 1,5-cyclononane dione, methyl-1,5-cyclononane dione, ethyl-1,5-cyclononane dione, 1,3-cyclodecane dione, methyl-1,3-cyclodecane dione, ethyl-1,3-cyclodecane dione, 1,4-cyclodecane dione, methyl-1,4-cyclodecane dione, ethyl-1,4-cyclodecane dione, 1,5-cyclodecane dione, methyl-1,5-cyclodecane dione, 1,6-cyclodecane dione, methyl-1,6-cyclodecane dione, ethyl-1,6-cyclodecane dione, 1,3-cycloundecane dione, 1,4-cycloundecane dione, 1,5-cycloundecane dione, 1,6-cycloundecane dione, 1,3-cyclododecane dione, 1,4-cyclododecane dione, 1,5-cyclododecane dione, 1,6-cyclododecane dione, 1,7-cyclododecane dione, 1,3-cyclotridecane dione, 1,4-cyclotridecane dione, 1,5-cyclotridecane dione, 1,6-cyclotridecane dione, 1,7-cyclotridecane dione, 1,3-cyclotetradecane dione, 1,4-cyclotetradecane dione, 1,5-cyclotetradecane dione, 1,6-cyclotetradecane dione, 1,7-cyclotetradecane dione 1,8-cyclotetradecane dione, 1-[4-(4-propionyl benzyl)phenyl-1-propanone, 2-benzoyl cyclohexanone, 3-benzoyl cyclohexanone, 4-benzoyl cyclohexanone, bicyclo[2,2,1]heptan-2,5-dione, bicyclo[2,2,1]heptan-2,6-dione, bicyclo[2,2,1]heptan-2,7-dione, bicyclo[2,2,2]octan-2,5-dione, bicyclo[2,2,2]octan-2,6-dione, octahydro-1,3-naphthalene dione, octahydro-1,4-naphthalene dione, octahydro-1,5-naphthalene dione, octahydro-1,6-naphthalene dione, octahydro-1,7-naphthalene dione, octahydro-1,8-naphthalene dione, 2-acetyl cyclopropanone, 2-acetyl-cyclopentanone, 3-acetyl-cyclopentanone, 2-acetyl cyclohexanone, 3-acetyl cyclohexanone, 4-acetyl cyclohexanone, diphenyl-1,6-hexanedione.

More preferably, the bifunctional ketone compound is at least one compound selected from the following group:

2,4-pentanedione, methyl-2,4-pentanedione, 2,4-hexanedione, 2,5-hexanedione, 2,4-heptane dione, 2,5-heptane dione, 2,6-heptane dione, 3,5-heptane dione, 2,4-octane dione, 2,5-octane dione, 2,6-octane dione, 2,7-octane dione, 3,5-octane dione, 3,6-octane dione, 2,4-nonane dione, 2,5-nonane dione, 2,6-nonane dione, 2,7-nonane dione, 2,8-nonane dione, 3,5-nonane dione, 3,6-nonane dione, 3,7-nonane dione, 3,8-nonane dione, 4,6-nonane dione, 4,7-nonane dione, 2,4-decane dione, 2,5-decane dione, 2,6-decane dione, 2,7-decane dione, 2,8-decane dione, 2,9-decane dione, 3,5-decane dione, 3,6-decane dione, 3,7-decane dione, 3,8-decane dione, 4,6-decane dione, 4,7-decane dione, 2,4-undecane dione, 2,5-undecane dione, 2,6-undecane dione, 2,7-undecane dione, 2,8-undecane dione, 2,9-undecane dione, 2,10-undecane dione, 3,5-undecane dione, 3,6-undecane dione, 3,7-undecane dione, 3,8-undecane dione, 3,9-undecane dione, 4,6-undecane dione, 4,7-undecane dione, 4,8-undecane dione, 5,7-undecane dione, 1,3-cyclobutane dione, tetramethyl cyclobutane dione, 1,3-cyclopentanedione, 1,3-cyclohexanedione, 1,4-cyclohexanedione, 1,3-cycloheptane dione, 1,4-cycloheptane dione, 1,3-cyclooctane dione, 1,4-cyclooctane dione, 1,5-cyclooctane dione, 1,3-cyclononane dione, 1,4-cyclononane dione, 1,5-cyclononane dione, 1,6-cyclodecane dione, 1,3-cycloundecane dione, 1,4-cycloundecane dione, 1,5-cycloundecane dione, 1,6-cycloundecane dione, 1,3-cyclododecane dione, 1,4-cyclododecane dione, 1,5-cyclododecane dione, 1,6-cyclododecane dione, 1,7-cyclododecane dione, 1-[4-(4-propionyl benzyl)phenyl-1-propanone, 2-benzoyl cyclohexanone, 3-benzoyl cyclohexanone, 4-benzoyl cyclohexanone, bicyclo[2,2,1]heptan-2,5-dione, bicyclo[2,2,1]heptan-2,6-dione, bicyclo[2,2,1]heptan-2,7-dione, octahydro-1,3-naphthalene dione, octahydro-1,4-naphthalene dione, octahydro-1,5-naphthalene dione, octahydro-1,6-naphthalene dione, octahydro-1,7-naphthalene dione, octahydro-1,8-naphthalene dione, 2-acetyl-cyclopentanone, 2-acetyl cyclohexanone, diphenyl-1,6-hexanedione.

Further preferably, the bifunctional ketone compound is at least one compound selected from the following group:

2,5-hexanedione, 3,9-undecane dione, 1,4-cyclohexanedione, 1,4-cyclooctane dione, bicyclo[2,2,1]heptan-2,5-dione, octahydro-1,4-naphthalene dione, octahydro-1,5-naphthalene dione, diphenyl-1,6-hexanedione.

(Polyfunctional Ketone Compound)

The polyfunctional ketone compound according to the present embodiment is not particularly limited as long as being a compound having three or more ketone groups in which the ketone groups are not adjacent.

Among the polyfunctional ketone compounds, at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

2,4,6-heptane trione, 2,4,6-octane trione, 2,5,7-octane trione, 1,5-diphenyl-1,3,5-pentane trione, 1,6-diphenyl-1,3,5-hexane trione, 1,3,6-hexane trione, 1,6-diphenyl-1,3,6-hexane trione, 1,7-diphenyl-1,3,5-heptane trione, 1,7-diphenyl-1,3,6-heptane trione, 1,7-diphenyl-1,4,6-heptane trione, 1,7-diphenyl-2,4,6-heptane trione, 1,7-diphenyl-1,3,5,7-heptane tetrone, 1,8-diphenyl-1,3,5-octane trione, 1,3,6-octane trione, 1,8-diphenyl-1,3,6-octane trione, 1,3,7octane trione, 1,8-diphenyl-1,3,7-octane trione, 1,3,8-octane trione, 1,8-diphenyl-1,3,8-octane trione, 1,8-diphenyl-1,4,6-octane trione, 1,4,7-octane trione, 1,8-diphenyl-1,4,7-octane trione, 1,4,8-octane trione, 1,8-diphenyl-1,4,8-octane trione, 1,8-diphenyl-1,5,7-octane trione, 1,5,8-octane trione, 1,8-diphenyl-1,5,8-octane trione, 1,8-diphenyl-1,6,8-octane trione, 1,8-diphenyl-2,4,6-octane trione, 2,4,7-octane trione, 1,8-diphenyl-2,4,7-octane trione, 1,8-diphenyl-1,3,4,7-octane tetrone, 1,8-diphenyl-1,3,4,8-octane tetrone, 1,8-diphenyl-1,3,5,7-octane tetrone, 1,8-diphenyl-1,3,5,8-octane tetrone, 1,8-diphenyl-1,4,6,8-octane tetrone, 1,5-dinaphthyl-1,3,5-pentane trione, 1,6-dinaphthyl-1,3,5-hexane trione, 1,6-dinaphthyl-1,3,6-hexane trione, 1,7-dinaphthyl-1,3,5-heptane trione, 1,7-dinaphthyl-1,3,6-heptane trione, 1,7-dinaphthyl-1,3,7-heptane trione, 1,7-dinaphthyl-1,4,6-heptane trione, 1,7-dinaphthyl-1,4,7-heptane trione, 1,7-dinaphthyl-1,5,7-heptane trione, 1,7-dinaphthyl-2,4,6-heptane trione, 1,7-dinaphthyl-1,3,5,7-heptane tetrone, 1,8-dinaphthyl-1,3,5-octane trione, 1,8-dinaphthyl-1,3,6-octane trione, 1,8-dinaphthyl-1,3,7octane trione, 1,8-dinaphthyl-1,3,8-octane trione, 1,8-dinaphthyl-1,4,6-octane trione, 1,8-dinaphthyl-1,4,7-octane trione, 1,8-dinaphthyl-1,4,8-octane trione, 1,8-dinaphthyl-1,5,7-octane trione, 1,8-dinaphthyl-1,5,8-octane trione, 1,8-dinaphthyl-1,6,8-octane trione, 1,8-dinaphthyl-2,4,6-octane trione, 1,8-dinaphthyl-2,4,7-octane trione, 1,8-dinaphthyl-1,3,5,7-octane tetrone, 1,8-dinaphthyl-1,3,5,8-octane tetrone, 1,8-dinaphthyl-1,4,6,8-octane tetrone, 1,8-dinaphthyl-2,4,5,7-octane tetrone, 1,3,5-cyclohexane trione, methyl-1,3,5-cyclohexane trione, ethyl-1,3,5-cyclohexane trione, dimethyl-1,3,5-cyclohexane trione, ethyl methyl-1,3,5-cyclohexane trione, diethyl-1,3,5-cyclohexane trione, trimethyl-1,3,5-cyclohexane trione, tetramethyl-1,3,5-cyclohexane trione, pentamethyl-1,3,5-cyclohexane trione, hexamethyl-1,3,5-cyclohexane trione, 1,3,5-cycloheptane trione, methyl-1,3,5-cycloheptane trione, ethyl-1,3,5-cycloheptane trione, 1,3,5-cyclooctane trione, methyl-1,3,5-cyclooctane trione, ethyl-1,3,5-cyclooctane trione, 1,3,6-cyclooctane trione, methyl-1,3,6-cyclooctane trione, ethyl-1,3,6-cyclooctane trione, acetyl-2,4-pentanedione, diacetyl-2,4-pentanedione, acetyl-2,4-hexanedione, diacetyl-2,4-hexanedione, acetyl-2,5-hexanedione, diacetyl-2,5-hexanedione, triacetyl-2,5-hexanedione, tetraacetyl-2,5-hexanedione, acetyl-2,4-heptane dione, diacetyl-2,4-heptane dione, acetyl-2,5-heptane dione, diacetyl-2,5-heptane dione, triacetyl-2,5-heptane dione, tetraacetyl-2,5-heptane dione, acetyl-2,6-heptane dione, diacetyl-2,6-heptane dione, triacetyl-2,6-heptane dione, tetraacetyl-2,6-heptane dione, pentaacetyl-2,6-heptane dione, hexaacetyl-2,6-heptane dione, acetyl-3,5-heptane dione, diacetyl-3,5-heptane dione, acetyl-2,4-octane dione, diacetyl-2,4-octane dione, acetyl-2,5-octane dione, diacetyl-2,5-octane dione, triacetyl-2,5-octane dione, tetraacetyl-2,5-octane dione, acetyl-2,6-octane dione, diacetyl-2,6-octane dione, triacetyl-2,6-octane dione, tetraacetyl-2,6-octane dione, pentaacetyl-2,6-octane dione, 2,6-octane dione, acetyl-2,7-octane dione, diacetyl-2,7-octane dione, triacetyl-2,7-octane dione, tetraacetyl-2,7-octane dione, pentaacetyl-2,7-octane dione, hexaacetyl-2,7-octane dione, heptaacetyl-2,7-octane dione, acetyl-3,5-octane dione, diacetyl-3,5-octane dione, triacetyl-3,6-octane dione, tetraacetyl-3,6-octane dione, diacetyl cyclopropanone, triacetyl cyclopropanone, tetraacetyl cyclopropanone, acetyl-1,3-cyclobutane dione, diacetyl-1,3-cyclobutane dione, triacetyl-2,4-cyclobutane dione, tetraacetyl-1,3-cyclobutane dione, diacetyl cyclopentanone, triacetyl cyclopentanone, tetraacetyl cyclopentanone, pentaacetyl cyclopentanone, hexaacetyl cyclopentanone, heptaacetyl cyclopentanone, octaacetyl cyclopentanone, acetyl-1,3-cyclopentanedione, diacetyl-1,3-cyclopentanedione, triacetyl-1,3-cyclopentanedione, tetraacetyl-1,3-cyclopentanedione, pentaacetyl-1,3-cyclopentanedione, hexaacetyl-1,3-cyclopentanedione, diacetyl cyclohexanone, triacetyl cyclohexanone, tetraacetyl cyclohexanone, pentaacetyl cyclohexanone, hexaacetyl cyclohexanone, heptaacetyl cyclohexanone, octaacetyl cyclohexanone, dibenzoyl cyclohexanone, acetyl-1,3-cyclohexanedione, diacetyl-1,3-cyclohexanedione, triacetyl-1,3-cyclohexanedione, tetraacetyl-1,3-cyclohexanedione, pentaacetyl-1,3-cyclohexanedione, hexaacetyl-1,3-cyclohexanedione, acetyl-1,4-cyclohexanedione, diacetyl-1,4-cyclohexanedione, triacetyl-1,4-cyclohexanedione, tetraacetyl-1,4-cyclohexanedione, pentaacetyl-1,4-cyclohexanedione, hexaacetyl-1,4-cyclohexanedione, acetyl-1,3,5-cyclohexane trione, diacetyl-1,3,5-cyclohexane trione, triacetyl-1,3,5-cyclohexane trione, tetraacetyl-1,3,5-cyclohexane trione, pentaacetyl-1,3,5-cyclohexane trione, hexaacetyl-1,3,5-cyclohexane trione.

More preferably, the polyfunctional ketone compound is at least one compound selected from the following group:

2,4,6-heptane trione, 2,4,6-octane trione, 1,5-diphenyl-1,3,5-pentane trione, 1,6-diphenyl-1,3,5-hexane trione, 1,3,6-hexane trione, 1,6-diphenyl-1,3,6-hexane trione, 1,7-diphenyl-1,3,5,7-heptane tetrone, 1,5-dinaphthyl-1,3,5-pentane trione, 1,6-dinaphthyl-1,3,5-hexane trione, 1,6-dinaphthyl-1,3,6-hexane trione, 1,7-dinaphthyl-1,3,5,7-heptane tetrone, 1,3,5-cyclohexane trione, methyl-1,3,5-cyclohexane trione, ethyl-1,3,5-cyclohexane trione, dimethyl-1,3,5-cyclohexane trione, ethyl methyl-1,3,5-cyclohexane trione, diethyl-1,3,5-cyclohexane trione, trimethyl-1,3,5-cyclohexane trione, tetramethyl-1,3,5-cyclohexane trione, pentamethyl-1,3,5-cyclohexane trione, hexamethyl-1,3,5-cyclohexane trione, 1,3,5-cycloheptane trione, 1,3,5-cyclooctane trione, 1,3,6-cyclooctane trione, acetyl-2,4-pentanedione, diacetyl-2,4-pentanedione, acetyl-2,4-hexanedione, diacetyl-2,4-hexanedione, acetyl-2,5-hexanedione, diacetyl-2,5-hexanedione, triacetyl-2,5-hexanedione, tetraacetyl-2,5-hexanedione, diacetyl cyclohexanone, triacetyl cyclohexanone, tetraacetyl cyclohexanone, dibenzoyl cyclohexanone, acetyl-1,3-cyclohexanedione, diacetyl-1,3-cyclohexanedione, acetyl-1,4-cyclohexanedione, diacetyl-1,4-cyclohexanedione, acetyl-1,3,5-cyclohexane trione, diacetyl-1,3,5-cyclohexane trione.

Further preferably, the polyfunctional ketone compound is at least one compound selected from the following group:

2,4,6-heptane trione, 1,5-diphenyl-1,3,5-pentane trione, 1,7-diphenyl-1,3,5,7-heptane tetrone, 1,3,5-cyclohexane trione, methyl-1,3,5-cyclohexane trione, dimethyl-1,3,5-cyclohexane trione, trimethyl-1,3,5-cyclohexane trione, tetramethyl-1,3,5-cyclohexane trione, pentamethyl-1,3,5-cyclohexane trione, hexamethyl-1,3,5-cyclohexane trione, acetyl-2,4-pentanedione, diacetyl-2,4-pentanedione, acetyl-2,5-hexanedione, diacetyl-2,5-hexanedione, diacetyl-cyclohexanone, dibenzoyl cyclohexanone, acetyl-1,3-cyclohexanedione, acetyl-1,4-cyclohexanedione, acetyl-1,3,5-cyclohexane trione.

(Polyketone Compound)

The polyketone compound according to the present embodiment is not particularly limited as long as being a compound having two or more ketone groups and having a structure in which the ketone groups are adjacent.

Among the polyketone compounds, at least one compound selected from the following group is preferable because of easy availability, because there is a tendency that cost as a composition can be further reduced, resulting in better economy, and because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C):

2,3-butanedione, 2,3-pentanedione, 2,3-hexanedione, methyl-2,3-hexanedione, ethyl-2,3-hexanedione, dimethyl-2,3-hexanedione, 3,4-hexanedione, 2,3-heptane dione, 3,4-heptane dione, methyl-2,3-heptane dione, ethyl-2,3-heptane dione, dimethyl-2,3-heptane dione, ethyl methyl-2,3-heptane dione, diethyl-2,3-heptane dione, methyl-3,4-heptane dione, dimethyl-3,4-heptane dione, ethyl methyl-3,4-heptane dione, ethyl-3,4-heptane dione, diethyl-3,4-heptane dione, 2,3-octane dione, methyl-2,3-octane dione, ethyl-2,3-octane dione, dimethyl-2,3-octane dione, ethyl methyl-2,3-octane dione, diethyl-2,3-octane dione, 3,4-octane dione, methyl-3,4-octane dione, ethyl-3,4-octane dione, dimethyl-3,4-octane dione, ethyl methyl-3,4-octane dione, diethyl-3,4-octane dione, 4,5-octane dione, methyl-4,5-octane dione, ethyl-4,5-octane dione, dimethyl-4,5-octane dione, ethyl methyl-4,5-octane dione, diethyl-4,5-octane dione, 2,3-nonane dione, 3,4-nonane dione, 4,5-nonane dione, 2,3-decane dione, 3,4-decane dione, 4,5-decane dione, 5,6-decane dione, 1,2-cyclobutane dione, methyl-1,2-cyclobutane dione, dimethyl-1,2-cyclobutane dione, trimethyl-1,2-cyclobutane dione, tetramethyl-1,2-cyclobutane dione, ethyl-1,2-cyclobutane dione, diethyl-1,2-cyclobutane dione, triethyl-1,2-cyclobutane dione, tetraethyl-1,2-cyclobutane dione, ethyl methyl-1,2-cyclobutane dione, diethyl methyl-1,2-cyclobutane dione, triethyl methyl-1,2-cyclobutane dione, 1,2-cyclopentanedione, methyl-1,2-cyclopentanedione, ethyl-1,2-cyclopentanedione, dimethyl-1,2-cyclopentanedione, ethyl methyl-1,2-cyclopentanedione, diethyl-1,2-cyclopentanedione, trimethyl-1,2-cyclopentanedione, diethyl methyl-1,2-cyclopentanedione, triethyl-1,2-cyclopentanedione, tetramethyl-1,2-cyclopentanedione, pentamethyl-1,2-cyclopentanedione, hexamethyl-1,2-cyclopentanedione, tetraethyl-1,2-cyclopentanedione, pentaethyl-1,2-cyclopentanedione, hexaethyl-1,2-cyclopentanedione, 1,2-cyclohexanedione, methyl-1,2-cyclohexanedione, ethyl-1,2-cyclohexanedione, dimethyl-1,2-cyclohexanedione, ethyl methyl-1,2-cyclohexanedione, diethyl-1,2-cyclohexanedione, trimethyl-1,2-cyclohexanedione, tetramethyl-1,2-cyclohexanedione, heptamethyl-1,2-cyclohexanedione, hexamethyl-1,2-cyclohexanedione, heptamethyl-1,2-cyclohexanedione, octamethyl-1,2-cyclohexanedione, triethyl-1,2-cyclohexanedione, tetraethyl-1,2-cyclohexanedione, heptaethyl-1,2-cyclohexanedione, hexaethyl-1,2-cyclohexanedione, heptaethyl-1,2-cyclohexanedione, octaethyl-1,2-cyclohexanedione, 1,2-cycloheptane dione, methyl-1,2-cycloheptane dione, ethyl-1,2-cycloheptane dione, dimethyl-1,2-cycloheptane dione, ethyl methyl-1,2-cycloheptane dione, diethyl-1,2-cycloheptane dione, 1,2-cyclooctane dione, methyl-1,2-cyclooctane dione, ethyl-1,2-cyclooctane dione, dimethyl-1,2-cyclooctane dione, ethyl methyl-1,2-cyclooctane dione, diethyl-1,2-cyclooctane dione, 1,2-cyclononane dione, methyl-1,2-cyclononane dione, ethyl-1,2-cyclononane dione, 1,2-cyclodecane dione, methyl-1,2-cyclodecane dione, ethyl-1,2-cyclodecane dione, 1,2-cycloundecane dione, 1,2-cyclododecane dione, 1,2-cyclotridecane dione, 1,2-cyclotetradecane dione, bicyclo[2,2,1]heptan-2,3-dione, bicyclo[2,2,2]octan-2,3-dione, octahydro-1,2-naphthalene dione, 2,3,4-pentane trione, 2,3,4-hexane trione, 2,3,5-hexane trione, 2,3,4,5-hexane tetrone, 2,3,4-heptane trione, 2,3,5-heptane trione, 2,3,6-heptane trione, 2,4,5-heptane trione, 2,5,6-heptane trione, 3,4,5-heptane trione, 2,3,4,5-heptane tetrone, 2,3,4,6-heptane tetrone, 2,3,4,5,6-heptane pentone, 2,3,4-octane trione, 2,3,5-octane trione, 2,3,6-octane trione, 2,3,7-octane trione, 2,4,5-octane trione, 2,4,7-octane trione, 2,5,6-octane trione, 3,4,5-octane trione, 3,4,6-octane trione, 3,5,6-octane trione, diphenyl-1,2,3-propane trione, diphenyl-1,2,3-butane trione, diphenyl-1,2,4-butane trione, diphenyl-1,2,3,4-butane tetrone, diphenyl-1,2,3-pentane trione, diphenyl-1,2,4-pentane trione, diphenyl-1,2,5-pentane trione, diphenyl-2,3,4-pentane trione, diphenyl-1,2,3,4-pentane tetrone, diphenyl-1,2,3,5-pentane tetrone, diphenyl-1,2,3,4,5-pentane pentone, diphenyl-1,2,3-hexane trione, diphenyl-1,2,4-hexane trione, diphenyl-1,2,5-hexane trione, diphenyl-1,2,6-hexane trione, diphenyl-1,3,4-hexane trione, diphenyl-1,4,5-hexane trione, diphenyl-2,3,4-hexane trione, diphenyl-2,3,5-hexane trione, diphenyl-1,2,3,4-hexane tetrone, diphenyl-1,2,3,5-hexane tetrone, diphenyl-1,2,3,6-hexane tetrone, diphenyl-2,3,4,5-hexane tetrone, diphenyl-1,2,3,4,5-hexane pentone, diphenyl-1,2,3,4,6-hexane pentone, diphenyl-1,2,3,4,5,6-hexane hexone, diphenyl-1,2,3-heptane trione, diphenyl-1,2,4-heptane trione, diphenyl-1,2,5-heptane trione, diphenyl-1,2,6-heptane trione, diphenyl-1,3,4-heptane trione, diphenyl-1,4,5-heptane trione, diphenyl-1,5,6-heptane trione, diphenyl-1,2,7-heptane trione, diphenyl-2,3,4-heptane trione, -diphenyl-2,3,5-heptane trione, diphenyl-2,3,6-heptane trione, diphenyl-2,3,7-heptane trione, diphenyl-2,4,5-heptane trione, diphenyl-2,5,6-heptane trione, diphenyl-3,4,5-heptane trione, diphenyl-1,2,3,4-heptane tetrone, diphenyl-1,2,3,5-heptane tetrone, diphenyl-1,2,3,6-heptane tetrone, diphenyl-1,2,3,7-heptane tetrone, diphenyl-2,3,4,5-heptane tetrone, diphenyl-2,3,4,6-heptane tetrone, diphenyl-1,2,3-octane trione, diphenyl-1,2,4-octane trione, diphenyl-1,2,5-octane trione, diphenyl-1,2,6-octane trione, diphenyl-1,2,7-octane trione, diphenyl-1,2,8-octane trione, diphenyl-1,3,4-octane trione, diphenyl-1,4,5-octane trione, diphenyl-1,5,6-octane trione, diphenyl-1,6,7-octane trione, diphenyl-2,3,4-octane trione, diphenyl-2,3,5-octane trione, diphenyl-2,3,6-octane trione, diphenyl-2,3,7-octane trione, diphenyl-2,4,5-octane trione, diphenyl-2,5,6-octane trione, diphenyl-3,4,5-octane trione, diphenyl-3,4,6-octane trione, diphenyl-1,2,3,4-octane tetrone, diphenyl-1,2,3,5-octane tetrone, diphenyl-1,2,3,6-octane tetrone, diphenyl-1,2,3,7-octane tetrone, diphenyl-1,2,3,8-octane tetrone, diphenyl-1,3,4,5-octane tetrone, diphenyl-1,3,4,6-octane tetrone, diphenyl-1,3,5,6-octane tetrone, diphenyl-1,4,5,6-octane tetrone, diphenyl-1,4,5,7-octane tetrone, diphenyl-1,4,5,8-octane tetrone, diphenyl-1,4,6,7-octane tetrone, diphenyl-1,5,6,7-octane tetrone, diphenyl-1,5,6,8-octane tetrone, diphenyl-2,3,4,5-octane tetrone, diphenyl-2,3,4,6-octane tetrone, diphenyl-2,3,4,7-octane tetrone, diphenyl-2,4,5,6-octane tetrone, diphenyl-2,4,5,7-octane tetrone, diphenyl-3,4,5,6-octane tetrone, dinaphthyl-1,2,3-propane trione, dinaphthyl-1,2,3-butane trione, dinaphthyl-1,2,4-butane trione, dinaphthyl-1,2,3,4-butane tetrone, dinaphthyl-1,2,3-pentane trione, dinaphthyl-1,2,4-pentane trione, dinaphthyl-1,2,5-pentane trione, dinaphthyl-1,3,4-pentane trione, dinaphthyl-2,3,4-pentane trione, dinaphthyl-1,2,3,4-pentane tetrone, dinaphthyl-1,2,3,5-pentane tetrone, dinaphthyl-1,2,3,4,5-pentane pentone, dinaphthyl-1,2,3-hexane trione, dinaphthyl-1,2,4-hexane trione, dinaphthyl-1,2,5-hexane trione, dinaphthyl-1,2,6-hexane trione, dinaphthyl-1,3,4-hexane trione, dinaphthyl-1,4,5-hexane trione, dinaphthyl-1,4,5-hexane trione, dinaphthyl-2,3,4-hexane trione, dinaphthyl-2,3,5-hexane trione, dinaphthyl-2,4,5-hexane trione, dinaphthyl-1,2,3,4-hexane tetrone, dinaphthyl-1,2,3,5-hexane tetrone, dinaphthyl-1,2,3,6-hexane tetrone, dinaphthyl-2,3,4,5-hexane tetrone, dinaphthyl-1,2,3,4,5-hexane pentone, dinaphthyl-1,2,3,4,6-hexane pentone, dinaphthyl-1,2,3,4,5,6-hexane hexone, dinaphthyl-1,2,3-heptane trione, dinaphthyl-1,2,4-heptane trione, dinaphthyl-1,2,5-heptane trione, dinaphthyl-1,2,6-heptane trione, dinaphthyl-1,2,7-heptane trione, dinaphthyl-1,3,4-heptane trione, dinaphthyl-1,4,5-heptane trione, dinaphthyl-1,5,6-heptane trione, dinaphthyl-2,3,4-heptane trione, dinaphthyl-2,3,5-heptane trione, dinaphthyl-2,3,6-heptane trione, dinaphthyl-2,3,7-heptane trione, dinaphthyl-2,4,5-heptane trione, dinaphthyl-3,4,5-heptane trione, dinaphthyl-1,2,3,4-heptane tetrone, dinaphthyl-1,2,3,5-heptane tetrone, dinaphthyl-1,2,3,6-heptane tetrone, dinaphthyl-1,2,3,7-heptane tetrone, dinaphthyl-1,3,4,5-heptane tetrone, dinaphthyl-1,3,4,6-heptane tetrone, dinaphthyl-1,3,4,7-heptane tetrone, dinaphthyl-1,3,5,6-heptane tetrone, dinaphthyl-1,4,5,6-heptane tetrone, dinaphthyl-2,4,5,6-heptane tetrone, dinaphthyl-2,3,4,5-heptane tetrone, dinaphthyl-2,3,4,6-heptane tetrone, dinaphthyl-1,2,3-octane trione, dinaphthyl-1,2,4-octane trione, dinaphthyl-1,2,5-octane trione, dinaphthyl-1,2,6-octane trione, dinaphthyl-1,2,7-octane trione, dinaphthyl-1,2,8-octane trione, dinaphthyl-1,3,4-octane trione, dinaphthyl-1,4,5-octane trione, dinaphthyl-1,5,6-octane trione, dinaphthyl-1,6,7-octane trione, dinaphthyl-2,3,4-octane trione, dinaphthyl-2,3,5-octane trione, dinaphthyl-2,3,6-octane trione, dinaphthyl-2,3,7-octane trione, dinaphthyl-2,4,5-octane trione, dinaphthyl-2,5,6-octane trione, dinaphthyl-3,4,5-octane trione, dinaphthyl-3,4,6-octane trione, dinaphthyl-1,2,3,4-octane tetrone, dinaphthyl-1,2,3,5-octane tetrone, dinaphthyl-1,2,3,6-octane tetrone, dinaphthyl-1,2,3,7-octane tetrone, dinaphthyl-1,2,3,8-octane tetrone, dinaphthyl-1,3,4,5-octane tetrone, dinaphthyl-1,3,4,6-octane tetrone, dinaphthyl-1,3,4,7-octane tetrone, dinaphthyl-1,3,4,8-octane tetrone, dinaphthyl-1,3,5,6-octane tetrone, dinaphthyl-1,4,5,6-octane tetrone, dinaphthyl-1,4,5,7-octane tetrone, dinaphthyl-1,4,5,8-octane tetrone, dinaphthyl-1,4,6,7-octane tetrone, dinaphthyl-1,5,6,7-octane tetrone, dinaphthyl-1,5,6,8-octane tetrone, dinaphthyl-2,3,4,5-octane tetrone, dinaphthyl-2,3,4,6-octane tetrone, dinaphthyl-2,3,4,7-octane tetrone, dinaphthyl-2,4,5,6-octane tetrone, dinaphthyl-3,4,5,6-octane tetrone, 1,2,3-cyclobutane trione, 1,2,3-cyclopentane trione, methyl-1,2,3-cyclopentane trione, ethyl-1,2,3-cyclopentane trione, dimethyl-1,2,3-cyclopentane trione, ethyl methyl-1,2,3-cyclopentane trione, diethyl-1,2,3-cyclopentane trione, trimethyl-1,2,3-cyclopentane trione, tetramethyl-1,2,3-cyclopentane trione, triethyl-1,2,3-cyclopentane trione, tetraethyl-1,2,3-cyclopentane trione, 1,2,4-cyclopentane trione, methyl-1,2,4-cyclopentane trione, ethyl-1,2,4-cyclopentane trione, dimethyl-1,2,4-cyclopentane trione, ethyl methyl-1,2,4-cyclopentane trione, diethyl-1,2,4-cyclopentane trione, trimethyl-1,2,4-cyclopentane trione, tetramethyl-1,2,4-cyclopentane trione, triethyl-1,2,4-cyclopentane trione, tetraethyl-1,2,4-cyclopentane trione, butyl-1,2,4-cyclopentane trione, 1,2,3,4-cyclopentane tetrone, methyl-1,2,3,4-cyclopentane tetrone, ethyl-1,2,3,4-cyclopentane tetrone, dimethyl-1,2,3,4-cyclopentane tetrone, ethyl methyl-1,2,3,4-cyclopentane tetrone, diethyl-1,2,3,4-cyclopentane tetrone, 1,2,3-cyclohexane trione, methyl-1,2,3-cyclohexane trione, ethyl-1,2,3-cyclohexane trione, dimethyl-1,2,3-cyclohexane trione, ethyl methyl-1,2,3-cyclohexane trione, diethyl-1,2,3-cyclohexane trione, trimethyl-1,2,3-cyclohexane trione, triethyl-1,2,3-cyclohexane trione, tetramethyl-1,2,3-cyclohexane trione, pentamethyl-1,2,3-cyclohexane trione, hexamethyl-1,2,3-cyclohexane trione, tetraethyl-1,2,3-cyclohexane trione, pentaethyl-1,2,3-cyclohexane trione, hexaethyl-1,2,3-cyclohexane trione, 1,2,4-cyclohexane trione, methyl-1,2,4-cyclohexane trione, ethyl-1,2,4-cyclohexane trione, dimethyl-1,2,4-cyclohexane trione, ethyl methyl-1,2,4-cyclohexane trione, diethyl-1,2,4-cyclohexane trione, trimethyl-1,2,4-cyclohexane trione, tetramethyl-1,2,4-cyclohexane trione, pentamethyl-1,2,4-cyclohexane trione, hexamethyl-1,2,4-cyclohexane trione, triethyl-1,2,4-cyclohexane trione, tetraethyl-1,2,4-cyclohexane trione, pentaethyl-1,2,4-cyclohexane trione, hexaethyl-1,2,4-cyclohexane trione, 1,2,3,4-cyclohexane tetrone, 1,2,3,5-cyclohexane tetrone, 1,2,4,5-cyclohexane tetrone, 1,2,3-cycloheptane trione, methyl-1,2,3-cycloheptane trione, ethyl-1,2,3-cycloheptane trione, 1,2,4-cycloheptane trione, methyl-1,2,4-cycloheptane trione, ethyl-1,2,4-cycloheptane trione, 1,2,5-cycloheptane trione, methyl-1,2,5-cycloheptane trione, ethyl-1,2,5-cycloheptane trione, 1,2,3-cyclooctane trione, methyl-1,2,3-cyclooctane trione, ethyl-1,2,3-cyclooctane trione, 1,2,4-cyclooctane trione, methyl-1,2,4-cyclooctane trione, ethyl-1,2,4-cyclooctane trione, 1,2,5-cyclooctane trione, methyl-1,2,5-cyclooctane trione, ethyl-1,2,5-cyclooctane trione, acetyl-1,2-cyclobutane dione, diacetyl-1,2-cyclobutane dione, acetyl-1,2-cyclopentanedione, diacetyl-1,2-cyclopentanedione, triacetyl-1,2-cyclopentanedione, tetraacetyl-1,2-cyclopentanedione, pentaacetyl-1,2-cyclopentanedione, hexaacetyl-1,2-cyclopentanedione, acetyl-1,2,3-cyclopentane trione, diacetyl-1,2,3-cyclopentane trione, triacetyl-1,2,3-cyclopentane trione, tetraacetyl-1,2,3-cyclopentane trione, acetyl-1,2,4-cyclopentane trione, diacetyl-1,2,4-cyclopentane trione, triacetyl-1,2,4-cyclopentane trione, tetraacetyl-1,2,4-cyclopentane trione, acetyl-1,2-cyclohexanedione, diacetyl-1,2-cyclohexanedione, triacetyl-1,2-cyclohexanedione, tetraacetyl-1,2-cyclohexanedione, pentaacetyl-1,2-cyclohexanedione, hexaacetyl-1,2-cyclohexanedione, acetyl-1,2,3-cyclohexane trione, diacetyl-1,2,3-cyclohexane trione, triacetyl-1,2,3-cyclohexane trione, tetraacetyl-1,2,3-cyclohexane trione, pentaacetyl-1,2,3-cyclohexane trione, hexaacetyl-1,2,3-cyclohexane trione, acetyl-1,2,4-cyclohexane trione, diacetyl-1,2,4-cyclohexane trione, triacetyl-1,2,4-cyclohexane trione, tetraacetyl-1,2,4-cyclohexane trione, pentaacetyl-1,2,4-cyclohexane trione, hexaacetyl-1,2,4-cyclohexane trione, acetyl-1,2-cyclohexanedione, 4,5-pyrene dione, 5,6-chrysene dione.

More preferably, the polyketone compound is at least one compound selected from the following group:

2,3-butanedione, 2,3-pentanedione, 2,3-hexanedione, 3,4-hexanedione, 2,3-heptane dione, 3,4-heptane dione, 2,3-octane dione, 3,4-octane dione, 4,5-octane dione, 2,3-nonane dione, 3,4-nonane dione, 4,5-nonane dione, 2,3-decane dione, 3,4-decane dione, 4,5-decane dione, 5,6-decane dione, 1,2-cyclobutane dione, 1,2-cyclopentanedione, methyl-1,2-cyclopentanedione, dimethyl-1,2-cyclopentanedione, 1,2-cyclohexanedione, methyl-1,2-cyclohexanedione, dimethyl-1,2-cyclohexanedione, 1,2-cycloheptane dione, 1,2-cyclooctane dione, 1,2-cyclononane dione, 1,2-cyclodecane dione, 1,2-cycloundecane dione, 1,2-cyclododecane dione, bicyclo[2,2,1]heptan-2,3-dione, bicyclo[2,2,2]octan-2,3-dione, octahydro-1,2-naphthalene dione, 2,3,4-pentane trione, 2,3,4-hexane trione, 2,3,5-hexane trione, 2,3,4,5-hexane tetrone, 2,3,4-heptane trione, 2,3,5-heptane trione, 2,3,6-heptane trione, 2,4,5-heptane trione, 2,5,6-heptane trione, 3,4,5-heptane trione, 2,3,4,5-heptane tetrone, 2,3,4,6-heptane tetrone, 2,3,4,5,6-heptane pentone, 2,3,4-octane trione, 2,3,5-octane trione, 2,3,6-octane trione, 2,3,7-octane trione, 2,4,5-octane trione, 2,4,7-octane trione, 2,5,6-octane trione, 3,4,5-octane trione, 3,4,6-octane trione, 3,5,6-octane trione, diphenyl-1,2,3-propane trione, diphenyl-1,2,3-butane trione, diphenyl-1,2,4-butane trione, diphenyl-1,2,3,4-butane tetrone, diphenyl-1,2,3-pentane trione, diphenyl-1,2,4-pentane trione, diphenyl-1,2,5-pentane trione, diphenyl-2,3,4-pentane trione, diphenyl-1,2,3-hexane trione, diphenyl-1,2,4-hexane trione, diphenyl-1,2,5-hexane trione, diphenyl-1,2,6-hexane trione, diphenyl-1,3,4-hexane trione, diphenyl-1,4,5-hexane trione, diphenyl-2,3,4-hexane trione, diphenyl-2,3,5-hexane trione, 1,2,4-cyclopentane trione, methyl-1,2,4-cyclopentane trione, dimethyl-1,2,4-cyclopentane trione, butyl-1,2,4-cyclopentane trione, 1,2,3-cyclohexane trione, 1,2,4-cyclohexane trione, 1,2,3,4-cyclohexane tetrone, 1,2,3,5-cyclohexane tetrone, 1,2,4,5-cyclohexane tetrone, 1,2,3-cycloheptane trione, 1,2,4-cycloheptane trione, 1,2,5-cycloheptane trione, 1,2,3-cyclooctane trione, 1,2,4-cyclooctane trione, 1,2,5-cyclooctane trione, acetyl-1,2-cyclobutane dione, diacetyl-1,2-cyclobutane dione, acetyl-1,2-cyclopentanedione, diacetyl-1,2-cyclopentanedione, acetyl-1,2,3-cyclopentane trione, diacetyl-1,2,3-cyclopentane trione, acetyl-1,2,4-cyclopentane trione, diacetyl-1,2,4-cyclopentane trione, acetyl-1,2-cyclohexanedione, diacetyl-1,2-cyclohexanedione, acetyl-1,2,3-cyclohexane trione, diacetyl-1,2,3-cyclohexane trione, acetyl-1,2,4-cyclohexane trione, diacetyl-1,2,4-cyclohexane trione, acetyl-1,2-cyclohexanedione, 4,5-pyrene dione, 5,6-chrysene dione.

Further preferably, the polyketone compound is at least one compound selected from the following group:

2,3-butanedione, 2,3-pentanedione, 2,3-hexanedione, 3,4-hexanedione, 2,3-heptane dione, 3,4-heptane dione, 2,3-octane dione, 1,2-cyclobutane dione, 1,2-cyclopentanedione, methyl-1,2-cyclopentanedione, 1,2-cyclohexanedione, methyl-1,2-cyclohexanedione, 1,2-cyclooctane dione, 1,2-cyclodecane dione, 2,3,4-pentane trione, diphenyl-1,2,3-propane trione, diphenyl-1,2,4-pentane trione, 1,2,4-cyclopentane trione, methyl-1,2,4-cyclopentane trione, butyl-1,2,4-cyclopentane trione, 1,2,3-cyclohexane trione, acetyl-1,2-cyclopentanedione, acetyl-1,2,4-cyclopentane trione, acetyl-1,2-cyclohexanedione, acetyl-1,2,3-cyclohexane trione, 4,5-pyrene dione, 5,6-chrysene dione.

(Component (B): Boron Trihalide)

The boron trihalide (B) of the present embodiment is a compound composed of three halogen atoms and one boron atom.

Specific examples of the boron trihalide (B) include boron trifluoride, boron trichloride, boron tribromide, and boron triiodide. These may be used alone, or a plurality of them may be used in combination.

It is preferable that the boron trihalide (B) should be boron trifluoride, boron trichloride, or boron tribromide because there is a tendency that Lewis acidity is reduced and handleability becomes better. It is more preferable to be boron trifluoride or boron trichloride because there is a tendency that the bonding strength of the at least one compound (A) selected from the group consisting of an ether compound having two or more ether groups, a trivalent phosphorus compound, and a ketone compound with the boron trihalide (B) becomes better, whereby the polymerization of the episulfide compound (C) can be further suppressed when preparing the composition, resulting in the further improved stability of the composition. From a similar viewpoint, boron trifluoride is further preferable.

It is preferable that the at least one compound (A) selected from the group consisting of an ether compound having two or more ether groups, a trivalent phosphorus compound, and a ketone compound and at least a portion of the boron trihalide (B) should form a compound (complex) via a coordinate bond because there is a tendency that the polymerization of the episulfide compound (C) can be further suppressed when preparing the composition under room temperature, resulting in the further improved stability of the composition and/or there is a tendency that a side reaction can be further suppressed during polymerizing the episulfide compound (C). From a similar viewpoint, it is more preferable that all the boron trihalides (B) contained in the composition should form a compound (complex) with the at least one compound (A) selected from the group consisting of an ether compound having two or more ether groups, a trivalent phosphorus compound, and a ketone compound via a coordinate bond.

(Component (C): Episulfide Compound)

The component (C) of the present embodiment is a compound having at least one or more 3-membered cyclic thioether structure(s) as a polymerizable functional group. As the component (C), one episulfide compound may be used alone, or a plurality of episulfide compounds may be used in combination.

The polymerizable functional group refers to a substituent that can offer an intermonomeric bond when monomers are linked via a bond to form a polymer.

The component (C) may have only the 3-membered cyclic thioether structure as a polymerizable functional group or may have a polymerizable functional group generally used together with the 3-membered cyclic thioether structure.

The polymerizable functional group generally used is not particularly limited, but is selected from, for example, cyclic thioether structures, lactone structures, cyclic carbonate structures and their sulfur-containing analogous structures, cyclic acetal structures and their sulfur-containing analogous structures, cyclic amine structures, cyclic imino ether structure, lactam structure, cyclic thiourea structures, cyclic phosphinate structures, cyclic phosphonite structures, cyclic phosphite structures, vinyl structures, allyl structures, (meth) acrylic structures, and cycloalkane structures.

The episulfide compound having the 3-membered cyclic thioether structure and the polymerizable functional group generally used as polymerizable functional groups may have polymerizable functional groups differing in polymerization conditions. Therefore, the episulfide compound can be used as effective means for applications that require steps of polymerizing at least one polymerizable functional group to prepare a half polymer, performing processing in such a way that the half polymer is molded, then further performing polymerization to prepare a complete polymer, thereby obtaining the desired physical properties.

For the episulfide compound (C), it is preferable to have only the 3-membered cyclic thioether structure as a polymerizable functional group or to have the 3-membered cyclic thioether structure as a polymerizable functional group and have at least one or more structure(s) selected from the group consisting of lactone structures, cyclic carbonate structures and their sulfur-containing analogous structures, cyclic acetal structures and their sulfur-containing analogous structures, cyclic amine structures, cyclic imino ether structures, lactam structures, cyclic thiourea structures, cyclic phosphinate structures, cyclic phosphonite structures, and cyclic phosphite structures as a polymerizable functional group.

Among these, a compound having only the 3-membered cyclic thioether structure as a polymerizable functional group or having the 3-membered cyclic thioether structure as a polymerizable functional group and having at least one or more structure(s) selected from the group consisting of 4-membered, 6-membered, and 7-membered cyclic lactone structures, 5-membered and 6-membered cyclic carbonate structures and their sulfur-containing analogous structures, 5-membered cyclic acetal structures and their sulfur-containing analogous structures, 3-membered and 4-membered cyclic amine structures, 5-membered and 6-membered cyclic imino ether structures, 4-membered, 7-membered, and 8-membered cyclic lactam structures, 5-membered and 6-membered cyclic thiourea structures, cyclic phosphinate structures, cyclic phosphonite structures, and cyclic phosphite structures as a polymerizable functional group is more preferable because there is a tendency that residues of a polymerizable functional group are reduced. Furthermore, a compound having only the 3-membered cyclic thioether structure as a polymerizable functional group is particularly preferable because there is a tendency that the control of polymerizability is easier, whereby residues of a polymerizable functional group can be reduced, and there is a tendency that multi-stage polymerization steps are not necessary, whereby cost as a polymer can be reduced, resulting in excellent economy.

It is preferable that the episulfide equivalent (WPT, g/mol) of the component (C) should be 65 or more because there is a tendency that the vapor pressure in the normal state of the episulfide compound is high and handleability gets easier. It is more preferable that the episulfide equivalent should be 85 or more because there is a tendency that a side reaction during polymerization can be further suppressed. From a similar viewpoint, it is further preferable that the episulfide equivalent should be 100 or more.

It is preferable that the episulfide equivalent (WPT, g/mol) of the component (C) should be 700 or less because there is a tendency that residues of an episulfide group can be reduced during polymerizing the composition. It is more preferable that the episulfide equivalent should be 600 or less because there is a tendency that the heat resistance of a cured product formed from the episulfide compound becomes better. From a similar viewpoint, it is further preferable that the episulfide equivalent should be 500 or less.

Although the component (C) is not particularly limited as long as being a compound having the 3-membered cyclic thioether structure as a polymerizable functional group, it is preferable to have a partial structure represented by the following formula (6), (7), (8), or (9) because of easy obtainment and because there is a tendency that cost for the composition is reduced, resulting in excellent economy. Moreover, it is more preferable to have a partial structure represented by the following formula (6) or (7) because there is a tendency that stability as a composition becomes much better. Furthermore, it is particularly preferable to have a partial structure represented by the formula (6) because there is a tendency that a side reaction can be further suppressed during polymerizing the composition.

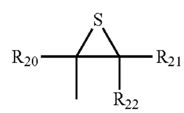

(6)

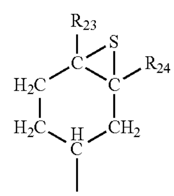

(7)

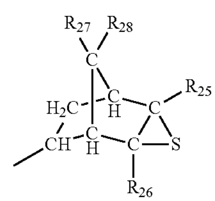

(8)

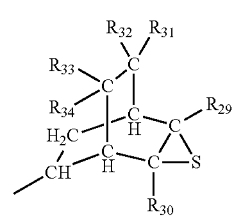

(9)

In the formula, $R_{20}$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, $R_{32}$, $R_{33}$, and $R_{34}$ each independently represent a hydrogen atom, a linear, branched, or cyclic aliphatic hydrocarbon group having 1 to 20 carbon atoms, or a substituted or unsubstituted aromatic hydrocarbon group.

Specific examples of the component (C) include monofunctional episulfide compounds, polyfunctional episulfide compounds which are thioglycidyl etherified products of polyphenol compounds, alicyclic episulfide compounds, polyfunctional episulfide compounds which are thioglycidyl etherified products of various novolac compounds, nuclear hydrogenated products of aromatic episulfide compounds, heterocyclic episulfide compounds, thioglycidyl ester-based episulfide compounds, thioglycidylamine-based episulfide compounds, and episulfide compounds in which halogenated phenols are thioglycidylated, (sulfur-containing) polyfunctional aliphatic episulfide compounds, silicone compounds having an episulfide group in the molecule, and episulfide compounds containing different types of polymerizable functional groups. These may be used alone, or a plurality thereof may be used in combination.

(Monofunctional Episulfide Compound)

The monofunctional episulfide compound is not particularly limited as long as being a compound having one 3-membered cyclic thioether structure and can be specifically selected from ethylene sulfide, propylene sulfide, 1-butene sulfide, 2-butene sulfide, butadiene sulfide, butadiene dithioepoxide, cyclobutene sulfide, 1,3-cyclobutadiene dithioepoxide, 1-pentene sulfide, 2-pentene sulfide, 1,3-pentadiene dithioepoxide, 1,4-pentadiene dithioepoxide, 2-methyl-2-butene sulfide, 2-methyl-3-butene sulfide, cyclopentene sulfide, 1,3-cyclopentadiene dithioepoxide, 1-methyl-cyclobutene sulfide, 3-methyl-1-cyclobutene sulfide, 1-hexene sulfide, 2-hexene sulfide, 3-hexene sulfide, 1,3-hexadiene dithioepoxide, 1,4-hexadiene dithioepoxide, 1,5-hexadiene dithioepoxide, 1,3,5-hexatriene trithioepoxide, cyclohexene sulfide, 1,3-cyclohexadiene dithioepoxide, 1,3,5-cyclohexatriene trithioepoxide, 1-methyl-cyclopentene sulfide, 3-methyl-cyclopentene sulfide, 1-methyl-1,3-cyclopentadiene dithioepoxide, 2-methyl-1,3-cyclopentadiene dithioepoxide, 5-methyl-1,3-cyclopentadiene dithioepoxide, 3,4-dimethyl-cyclobutene sulfide, 2,3-dimethyl-cyclobutene sulfide, 1,2-dimethyl-cyclobutene sulfide, 1,2-dimethyl-1,3-cyclobutadiene dithioepoxide, 2,3-dimethyl-1,3-cyclobutadiene dithioepoxide, 3,3-dimethyl-1,2-thioepoxybutane, 1-heptene sulfide, 2-heptene sulfide, 3-heptene sulfide, 1,3-heptadiene dithioepoxide, 1,4-heptadiene dithioepoxide, 1,5-heptadiene dithioepoxide, 1,5-heptadiene dithioepoxide, 1,6-heptadiene dithioepoxide, 1,3,5-heptatriene trithioepoxide, 1,3,6-heptatriene trithioepoxide, 1,4,6-heptatriene trithioepoxide, cycloheptene sulfide, 1-methyl-cyclohexene sulfide, 3-methyl-cyclohexene sulfide, 4-methyl-cyclohexene sulfide, 1-methyl-1,3-cyclohexadiene dithioepoxide, 1-methyl-1,4-hexadiene dithioepoxide, 1-methyl-1,3,5-hexatriene trithioepoxide, 1,2-thioepoxy-5-hexene, 1,2-thioepoxy-4-vinylcyclohexene, 2-norbornene sulfide, 7-methyl-2-norbornene sulfide, 7,7-dimethyl-2-norbornene sulfide, 2-methyl-2-norbornene sulfide, 2,3-dimethyl-2-norbornene sulfide, 2,7-dimethyl-2-norbornene sulfide, 2,7,7-trimethyl-2-norbornene sulfide, 2,3-thioepoxy-bicyclo[2,2,2]octane, 2,3-thioepoxy-2-methyl-bicyclo[2,2,2]octane, 2,3-thioepoxy-2,3-dimethyl-bicyclo[2,2,2]octane, 2,3-thioepoxy-2,5-dimethyl-bicyclo[2,2,2]octane, 2,3-thioepoxy-2,6-dimethyl-bicyclo[2,2,2]octane, 2,3-thioepoxy-2,3,5-trimethyl-bicyclo[2,2,2]octane, 2,3-thioepoxy-2,5,6-trimethyl-bicyclo[2,2,2]octane, 2,3-thioepoxy-2,3,5,6-tetramethyl-bicyclo[2,2,2]octane, dioctyl thioepoxyhexahydrophthalate, di-2-ethylhexyl thioepoxyhexahydrophthalate, stibene sulfide, phenyl thioglycidyl ether, 3-(2,2,3,3-tetrafluoropropoxy)-1,2-thioepoxypropane, pinene sulfide, isoprene monosulfide, 1,2-thioepoxyethylbenzene, naphthyl thioglycidyl ether, 3-(2-biphenyloxy)-1,2-thioepoxypropane, allyl thioglycidyl ether, 1,1-diphenyl-ethylene sulfide, thioglycidyl (meth) acrylate, thioglycidyl butyrate, iodomethylthiirane, 4-(2,3-thioepoxypropyl)morpholine, thioglycidyl methyl ether, 2-phenyl-propylene sulfide, 2,3-thioepoxypropyl-furfuryl ether, 2,3,4,5,6-pentafluorostyrene sulfide, ethyl-3-phenylthioglycidate, limonene sulfide, thioepoxysuccinic acid, 3-thioglycidoxypropyltrimethoxysilane, (3-thioglycidoxypropyl)pentamethyldisiloxane, 3-thioglycidoxypropyl(methyl)dimethoxysilane, 3-thioglycidoxypropyl(methyl)diethoxysilane, 3-thioglycidoxypropyl(methyl)dibutoxysilane, 2-(3,4-thioepoxycyclohexyl)ethyl(methyl)dimethoxysilane, 2-(3,4-thioepoxycyclohexyl)ethyl(phenyl)diethoxysilane, 2,3-thioepoxypropyl(methyl)dimethoxysilane, 2,3-thioepoxypropyl(phenyl)dimethoxysilane, 3-thioglycidoxypropyltrimethoxysilane, 3-thioglycidoxypropyltriethoxysilane, 3-thioglycidoxypropyltributoxysilane, 2-(3,4-thioepoxycyclohexyl)ethyltrimethoxysilane, 2-(3,4-thioepoxycyclohexyl)ethyltriethoxysilane, 2,3-thioepoxypropyltrimethoxysilane, and 2,3-thioepoxypropyltriethoxysilane.

Among those described above, it is preferable that the monofunctional episulfide compound should be at least one compound selected from the following group because vapor pressure in the normal state is high, handleability is easy, and there is a tendency that stability as a composition becomes much better, and there is a tendency that a side reaction during polymerization can be further suppressed:

ethylene sulfide, propylene sulfide, 1-butene sulfide, 2-butene sulfide, butadiene sulfide, butadiene dithioepoxide, cyclobutene sulfide, 1,3-cyclobutadiene dithioepoxide, 1-pentene sulfide, 2-pentene sulfide, 1,3-pentadiene dithioepoxide, 1,4-pentadiene dithioepoxide, 2-methyl-2-butene sulfide, 2-methyl-3-butene sulfide, cyclopentene sulfide, 1,3-cyclopentadiene dithioepoxide, 1-methyl-cyclobutene sulfide, 3-methyl-1-cyclobutene sulfide, 1-hexene sulfide, 2-hexene sulfide, 3-hexene sulfide, 1,3-hexadiene dithioepoxide, 1,4-hexadiene dithioepoxide, 1,5-hexadiene dithioepoxide, 1,3,5-hexatriene trithioepoxide, cyclohexene sulfide, 1,3-cyclohexadiene dithioepoxide, 1,3,5-cyclohexatriene trithioepoxide, 1-methyl-cyclopentene sulfide, 3-methyl-cyclopentene sulfide, 1-methyl-1,3-cyclopentadiene dithioepoxide, 2-methyl-1,3-cyclopentadiene dithioepoxide, 5-methyl-1,3-cyclopentadiene dithioepoxide, 3,4-dimethyl-cyclobutene sulfide, 2,3-dimethyl-cyclobutene sulfide, 1,2-dimethyl-cyclobutene sulfide, 1,2-dimethyl-1,3-cyclobutadiene dithioepoxide, 2,3-dimethyl-1,3-cyclobutadiene dithioepoxide, 3,3-dimethyl-1,2-thioepoxybutane, 1-heptene sulfide, 2-heptene sulfide, 3-heptene sulfide, 1,3-heptadiene dithioepoxide, 1,4-heptadiene dithioepoxide, 1,5-heptadiene dithioepoxide, 1,5-heptadiene dithioepoxide, 1,6-heptadiene dithioepoxide, 1,3,5-heptatriene trithioepoxide, 1,3,6-heptatriene trithioepoxide, 1,4,6-heptatriene trithioepoxide, cycloheptene sulfide, 1-methyl-cyclohexene sulfide, 3-methyl-cyclohexene sulfide, 4-methyl-cyclohexene sulfide, 1-methyl-1,3-cyclohexadiene dithioepoxide, 1-methyl-1,4-hexadiene dithioepoxide, 1-methyl-1,3,5-hexatriene trithioepoxide, 1,2-thioepoxy-5-hexene, 1,2-thioepoxy-4-vinylcyclohexene, dioctyl thioepoxyhexahydrophthalate, di-2-ethylhexyl thioepoxyhexahydrophthalate, stibene sulfide, phenyl thioglycidyl ether, 3-(2,2,3,3-tetrafluoropropoxy)-1,2-thioepoxypropane, pinene sulfide, isoprene monosulfide, 1,2-thioepoxyethylbenzene, naphthyl thioglycidyl ether, 3-(2-biphenyloxy)-1,2-thioepoxypropane, allyl thioglycidyl ether, 1,1-diphenyl-ethylene sulfide oxide, thioglycidyl (meth) acrylate, thioglycidyl butyrate, iodomethylthiirane, 4-(2,3-thioepoxypropyl)morpholine, thioglycidyl methyl ether, 2-phenyl-propylene sulfide, 2,3-thioepoxypropyl-furfuryl ether, 2,3,4,5,6-pentafluorostyrene sulfide, ethyl-3-phenylthioglycidate, limonene sulfide, thioepoxysuccinic acid, 3-thioglycidoxypropyltrimethoxysilane, (3-thioglycidoxypropyl)pentamethyldisiloxane, 3-thioglycidoxypropyl(methyl)dimethoxysilane, 3-thioglycidoxypropyl(methyl)diethoxysilane, 3-thioglycidoxypropyl(methyl)dibutoxysilane, 2-(3,4-thioepoxycyclohexyl)ethyl(methyl)dimethoxysilane, 2-(3,4-thioepoxycyclohexyl)ethyl(phenyl)diethoxysilane, 2,3-thioepoxypropyl(methyl)dimethoxysilane, 2,3-thioepoxypropyl(phenyl)dimethoxysilane, 3-thioglycidoxypropyltrimethoxysilane, 3-thioglycidoxypropyltriethoxysilane, 3-thioglycidoxypropyltributoxysilane, 2-(3,4-thioepoxycyclohexyl)ethyltrimethoxysilane, 2-(3,4-thioepoxycyclohexyl)ethyltriethoxysilane, 2,3-thioepoxypropyltrimethoxysilane, and 2,3-thioepoxypropyltriethoxysilane.

Further preferably, the monofunctional episulfide compound is at least one compound selected from the following group:

propylene sulfide, 1-butene sulfide, 2-butene sulfide, butadiene sulfide, butadiene dithioepoxide, 1-pentene sulfide, 2-pentene sulfide, 1,3-pentadiene dithioepoxide, 1,4-pentadiene dithioepoxide, 2-methyl-2-butene sulfide, 2-methyl-3-butene sulfide, cyclopentene sulfide, 1-methyl-cyclobutene sulfide, 3-methyl-1-cyclobutene sulfide, 1-hexene sulfide, 2-hexene sulfide, 3-hexene sulfide, 1,3-hexadiene dithioepoxide, 1,4-hexadiene dithioepoxide, 1,5-hexadiene dithioepoxide, 1,3,5-hexatriene trithioepoxide, cyclohexene sulfide, 1,3-cyclohexadiene dithioepoxide, 1-methyl-cyclopentene sulfide, 3-methyl-cyclopentene sulfide, 2-heptene sulfide, 3-heptene sulfide, 1,3-heptadiene dithioepoxide, 1,4-heptadiene dithioepoxide, 1,5-heptadiene dithioepoxide, 1,5-heptadiene dithioepoxide, 1,6-heptadiene dithioepoxide, 1-methyl-cyclohexene sulfide, 3-methyl-cyclohexene sulfide, 4-methyl-cyclohexene sulfide, 1,2-thioepoxy-5-hexene, 1,2-thioepoxy-4-vinylcyclohexene, stibene sulfide, phenyl thioglycidyl ether, 3-(2,2,3,3-tetrafluoropropoxy)-1,2-thioepoxypropane, pinene sulfide, isoprene monosulfide, 1,2-thioepoxyethylbenzene, naphthyl thioglycidyl ether, 3-(2-biphenyloxy)-1,2-thioepoxypropane, allyl thioglycidyl ether, 1,1-diphenyl-ethylene sulfide, thioglycidyl (meth)acrylate, thioglycidyl butyrate, iodomethylthiirane, 4-(2,3-thioepoxypropyl)morpholine, thioglycidyl methyl ether, 2-phenylpropylene sulfide, 2,3-thioepoxypropyl-furfuryl ether, 2,3,4,5,6-pentafluorostyrene sulfide, ethyl-3-phenylthioglycidate, limonene sulfide, thioepoxysuccinic acid, 3-thioglycidoxypropyltrimethoxysilane, (3-thioglycidoxypropyl)pentamethyldisiloxane, 3-thioglycidoxypropyl(methyl)dimethoxysilane, 3-thioglycidoxypropyl(methyl)diethoxysilane, 3-thioglycidoxypropyl(methyl)dibutoxysilane, 2-(3,4-thioepoxycyclohexyl)ethyl(methyl)dimethoxysilane, 2-(3,4-thioepoxycyclohexyl)ethyl(phenyl)diethoxysilane, 2,3-thioepoxypropyl(methyl)dimethoxysilane, 2,3-thioepoxypropyl(phenyl)dimethoxysilane, 3-thioglycidoxypropyltrimethoxysilane, 3-thioglycidoxypropyltriethoxysilane, 3-thioglycidoxypropyltributoxysilane, 2-(3,4-thioepoxycyclohexyl)ethyltrimethoxysilane, 2-(3,4-thioepoxycyclohexyl)ethyltriethoxysilane, 2,3-thioepoxypropyltrimethoxysilane, and 2,3-thioepoxypropyltriethoxysilane.

(Polyfunctional Episulfide Compound)

The polyfunctional episulfide compound which is a thioglycidyl etherified product of a polyphenol compound is not particularly limited and can be specifically selected from bisphenol A, bisphenol F, bisphenol S, 4,4'-biphenol, tetramethyl bisphenol A, dimethyl bisphenol A, tetramethyl bisphenol F, dimethyl bisphenol F, tetramethyl bisphenol S, dimethyl bisphenol S, tetramethyl-4,4'-biphenol, dimethyl-4,4'-biphenylphenol, 1-(4-hydroxyphenyl)-2-[4-(1,1-bis-(4-hydroxyphenyl)ethyl)phenyl]propane, 2,2'-methylene-bis(4-methyl-6-t-butylphenol), 4,4'-butylidene-bis(3-methyl-6-t-butylphenol), trishydroxyphenylmethane, resorcinol, hydroquinone, 2,6-di(t-butyl)hydroquinone, pyrogallol, phenols having diisopropylidene skeletons, phenols having fluorene skeletons such as 1,1-di(4-hydroxyphenyl)fluorene, and thioglycidyl etherified products of polyphenol compounds such as phenolated polybutadiene.

Among those described above, polyfunctional episulfide compounds which are thioglycidyl etherified products of phenols having bisphenol A skeletons or bisphenol F skeletons are preferable because production is easy and cost as a composition is reduced, resulting in excellent economy.

Typical examples of the polyfunctional episulfide compounds which are thioglycidyl etherified products of phenols having a bisphenol skeleton are shown below.

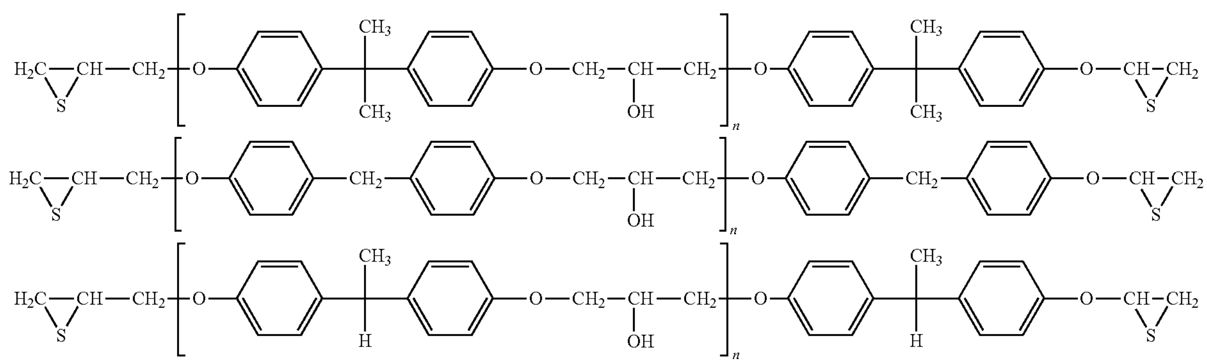

In the formula, n represents a number of 1 or more.

(Alicyclic Episulfide Compound)

The alicyclic episulfide compound is not particularly limited as long as being an episulfide compound having an alicyclic episulfide structure and can be selected from episulfide compounds having, for example, a cyclohexene sulfide group, a tricyclodecene sulfide group, or a cyclopentene sulfide group.

Specific examples of the alicyclic episulfide compound include 3,4-thioepoxycyclohexenylmethyl-3',4'-thioepoxycyclohexenecarboxylate, 3,4-thioepoxycyclohexylmethyl-3',4'-thioepoxycyclohexanecarboxylate, 3,4-thioepoxycyclohexyloctyl-3,4-thioepoxycyclohexanecarboxylate, 2-(3,4-thioepoxycyclohexyl-5,5-spiro-3,4-thioepoxy)cyclohexane-meta-dioxane, bis(3,4-thioepoxycyclohexylmethyl)adipate, vinylcyclohexene disulfide, bis(3,4-thioepoxy-6-methylcyclohexylmethyl)adipate, 3,4-thioepoxy-6-methylcyclohexyl-3,4-thioepoxy-6-methylcyclohexane carboxylate, methylenebis(3,4-thioepoxycyclohexane), dicyclopentadiene dithioepoxide, ethylene glycol di(3,4-thioepoxycyclohexylmethyl)ether, ethylenebis(3,4-thioepoxycyclohexanecarboxylate), and 1,2,8,9-dithioepoxylimonene. Other examples of the polyfunctional alicyclic episulfide compound include 1,2-epoxy-4-(2-thiiranyl)cyclohexene or 1,2-thioepoxy-4-(2-thiiranyl)cyclohexene adducts of 2,2-bis(hydroxymethyl)-1-butanol.

Typical examples of the alicyclic episulfide compound are shown below.

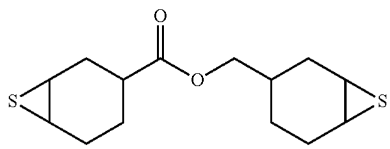

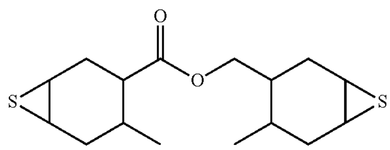

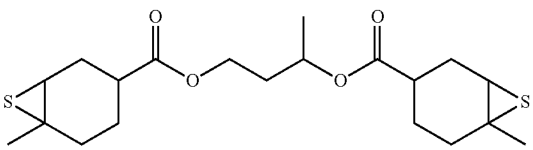

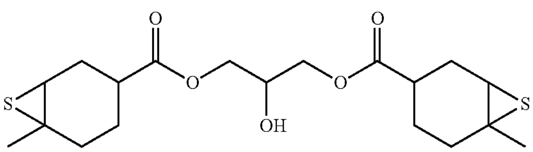

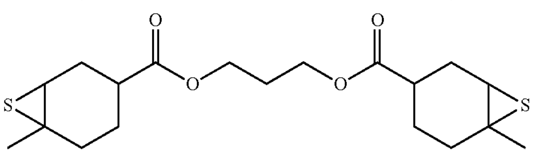

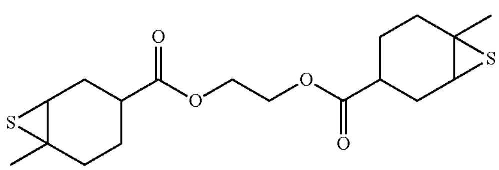

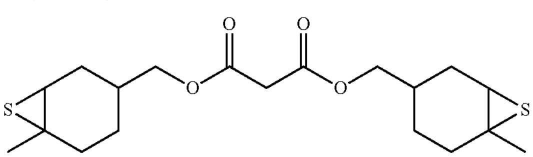

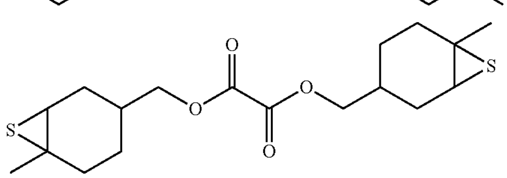

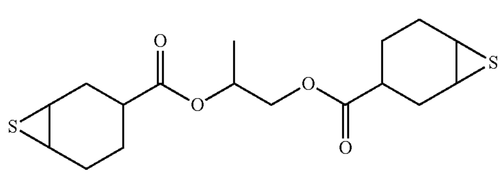

-continued

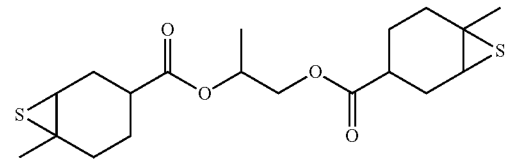

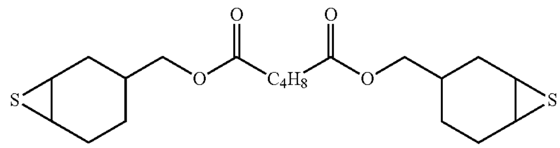

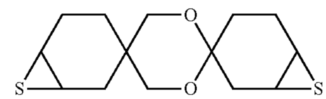

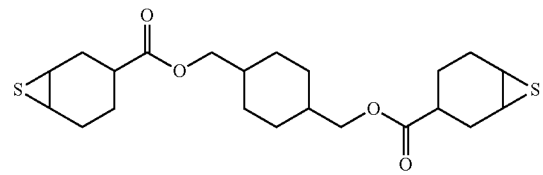

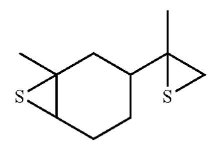

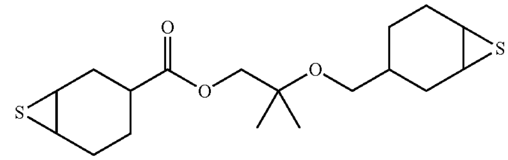

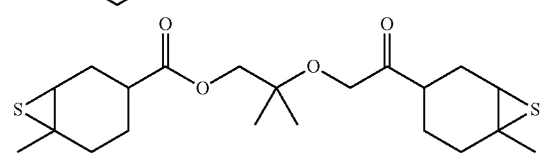

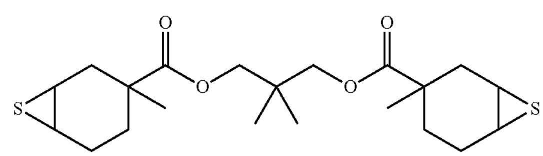

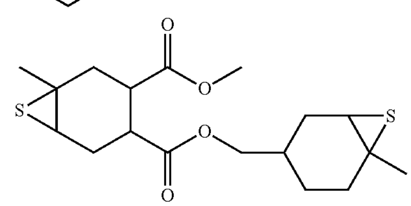

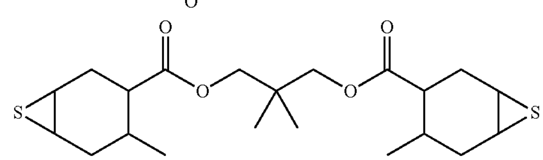

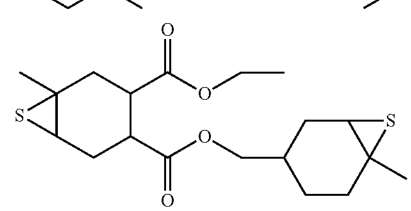

-continued

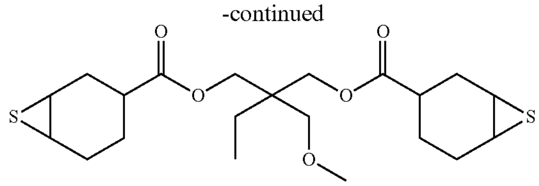

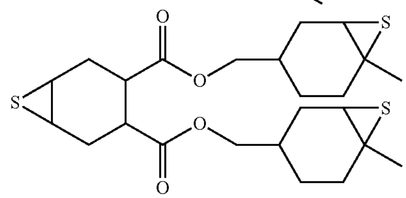

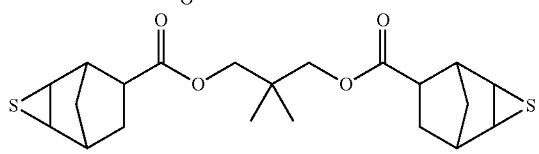

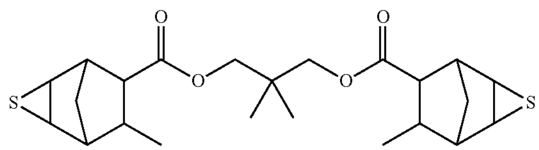

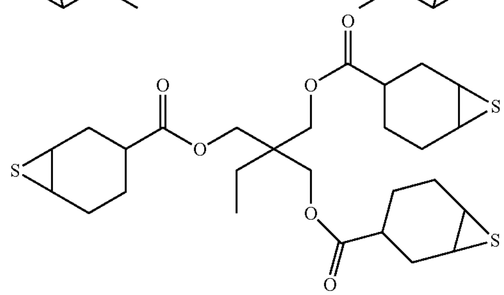

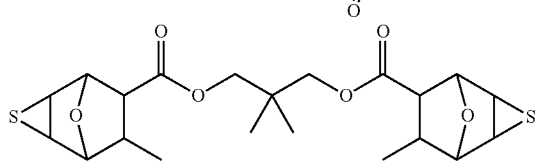

(Polyfunctional Episulfide Compound which is Thioglycidyl Etherified Product of Novolac Compound)

The polyfunctional episulfide compound which is a thioglycidyl etherified product of a novolac compound is not particularly limited and can be selected from, for example, thioglycidyl etherified products of various novolac compounds such as novolac compounds whose starting materials are various phenols such as phenol, cresols, ethylphenols, butylphenols, octylphenols, bisphenol A, bisphenol F, bisphenol S, and naphthols, xylylene skeleton-containing phenol novolac compounds, dicyclopentadiene skeleton-containing phenol novolac compounds, biphenyl skeleton-containing phenol novolac compounds, and fluorene skeleton-containing phenol novolac compounds.

Among those described above, thioglycidyl etherified products of novolac compounds whose starting materials are phenol or cresols, or the like are preferable because production is easy and cost as a composition is reduced, resulting in excellent economy.

A typical example of the polyfunctional episulfide compound which is a thioglycidyl etherified product of a novolac compound is shown below.

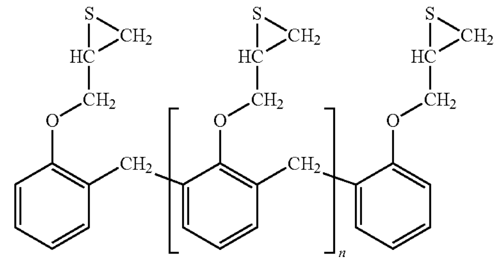

In the formula, n represents a number of 1 or more.

(Nuclear Hydrogenated Product of Aromatic Episulfide Compound)

The nuclear hydrogenated product of an aromatic episulfide compound is not particularly limited and can be selected from, for example, thioglycidyl etherified products of phenol compounds (bisphenol A, bisphenol F, bisphenol S, 4,4'-biphenol, etc.), ones in which the aromatic rings of various phenols (phenol, cresols, ethylphenols, butylphenols, octylphenols, bisphenol A, bisphenol F, bisphenol S, naphthols, etc.) are nuclear hydrogenated, and nuclear hydrogenated products of thioglycidyl etherified products of novolac compounds.

(Heterocyclic Episulfide Compound)

The heterocyclic episulfide compound is not particularly limited and can be selected from, for example, heterocyclic episulfide compounds having heterocyclic rings such as an isocyanuric ring and a hydantoin ring.

(Thioglycidyl Ester-Based Episulfide Compound)

The thioglycidyl ester-based episulfide compound is not particularly limited and can be selected from, for example, episulfide compounds induced from carboxylic acid compounds, such as hexahydrophthalic acid diglycidyl ester and tetrahydrophthalic acid diglycidyl ester.

(Thioglycidylamine-Based Episulfide Compound)

The thioglycidylamine-based episulfide compound is not particularly limited and can be selected from, for example, episulfide compounds in which amines such as aniline, toluidine, p-phenylenediamine, m-phenylenediamine, diaminodiphenylmethane derivatives, and diaminomethylbenzene derivatives are thioglycidylated.

(Episulfide Compound in which Halogenated Phenol is Thioglycidylated)

The episulfide compound in which a halogenated phenol is thioglycidylated is not particularly limited and can be selected from, for example, episulfide compounds in which halogenated phenols such as brominated bisphenol A, brominated bisphenol F, brominated bisphenol S, brominated phenol novolac, brominated cresol novolac, chlorinated bisphenol S, and chlorinated bisphenol A are thioglycidyl etherified.

((Sulfur-Containing) Polyfunctional Aliphatic Episulfide Compound)

The (sulfur-containing) polyfunctional aliphatic episulfide compound is not particularly limited and can be specifically selected from 1,1-bis(epithioethyl)methane, 1-(epithioethyl)-1-(β-epithiopropyl)methane, 1,1-bis(β-epithiopropyl)methane, 1-(epithioethyl)-1-(β-epithiopropyl)ethane, 1,2-bis(β-epithiopropyl ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutyl thio)ethane, 1-(epithioethyl)-2-[2-(γ-epithiobutyl thio)ethylthio]ethane, tetrakis(β-epithiopropyl)methane, 1,1,1-tris(β-epithiopropyl)

propane, 1,3-bis(β-epithiopropyl)-1-(β-epithiopropyl)-2-thiapropane, 1,5-bis(β-epithiopropyl)-2,4-bis(β-epithiopropyl)-3-thiapentane, 1,3 or 1,4-bis(epithioethyl) cyclohexane, 1,3 or 1,4-bis(β-epithiopropyl)cyclohexane, 2,5-bis(epithioethyl)-1,4-dithiane, 2,5-bis(β-epithiopropyl)-1,4-dithiane, 4-epithioethyl-1,2-cyclohexene sulfide, 2,2-bis [4-(epithioethyl)cyclohexyl]propane, 2,2-bis[4-β(3-epithiopropyl)cyclohexyl]propane, bis[4-(epithioethyl) cyclohexyl]methane, bis[4-(β-epithiopropyl)cyclohexyl] methane, bis[4-(β-epithiopropyl)cyclohexyl]sulfide, bis[4-(epithioethyl)cyclohexyl]sulfide, bis(β-epithiopropyl)ether, bis(β-epithiopropyl oxy)methane, 1,2-bis(β-epithiopropyl oxy)ethane, 1,3-bis(β-epithiopropyl oxy)propane, 1,2-bis(β-epithiopropyl oxy)propane, 1-(β-epithiopropyl oxy)-2-(β-epithiopropyl oxymethyl)propane, 1,4-bis(β-epithiopropyl oxy)butane, 1,3-bis(β-epithiopropyl oxy)butane, 1-(β-epithiopropyl oxy)-3-(β-epithiopropyl oxymethyl)butane, 1,5-bis (β-epithiopropyl oxy)pentane, 1-(β-epithiopropyl oxy)-4-(β-epithiopropyl oxymethyl)pentane, 1,6-bis(β-epithiopropyl oxy)hexane, 1-(β-epithiopropyl oxy)-5-(β-epithiopropyl oxymethyl)hexane, 1-(β-epithiopropyl oxy)-2-[(2-β-epithiopropyl oxyethyl)oxy]ethane, 1-(β-epithiopropyl oxy)-2-[[2-(2-(β-epithiopropyl oxyethyl)oxyethyl]oxy]ethane, tetrakis (β-epithiopropyl oxymethyl)methane, 1,1,1-tris(β-epithiopropyl oxymethyl)propane, 1,5-bis(β-epithiopropyl oxy)-2-(β-epithiopropyl oxymethyl)-3-thiapentane, 1,5-bis (β-epithiopropyl oxy)-2,4-bis(β-epithiopropyl oxymethyl)-3-thiapentane;

1-(β-epithiopropyl oxy)-2,2-bis(β-epithiopropyl oxymethyl)-4-thiahexane, 1,5,6-tris(β-epithiopropyl oxy)-4-(β-epithiopropyl oxymethyl)-3-thiahexane, 1,8-bis(β-epithiopropyl oxy)-4-(β-epithiopropyl oxymethyl)-3,6-dithiaoctane, 1,8-bis(β-epithiopropyl oxy)-4,5-bis(β-epithiopropyl oxymethyl)-3,6-dithiaoctane, 1,8-bis(β-epithiopropyl oxy)-4,4-bis(β-epithiopropyl oxymethyl)-3,6-dithiaoctane, 1,8-bis(β-epithiopropyl oxy)-2,4,5-tris(β-epithiopropyl oxymethyl)-3,6-dithiaoctane, 1,8-bis(β-epithiopropyl oxy)-2,5-bis(β-epithiopropyl oxymethyl)-3,6-dithiaoctane, 1,9-bis(β-epithiopropyl oxy)-5-(β-epithiopropyl oxymethyl)-5-[(2-β-epithiopropyl oxyethyl) oxymethyl]-3,7-dithianonane, 1,10-bis(β-epithiopropyl oxy)-5,6-bis[(2-β-epithiopropyl oxyethyl)oxy]-3,6,9-trithiadecane, 1,11-bis(β-epithiopropyl oxy)-4,8-bis(β-epithiopropyl oxymethyl)-3,6,9-trithiaundecane, 1,11-bis(β-epithiopropyl oxy)-5,7-bis(β-epithiopropyl oxymethyl)-3,6,9-trithiaundecane, 1,11-bis(β-epithiopropyl oxy)-5,7-[(2-β-epithiopropyl oxyethyl)oxymethyl]-3,6,9-trithiaundecane, 1,11-bis(β-epithiopropyl oxy)-4,7-bis(β-epithiopropyl oxymethyl)-3,6,9-trithiaundecane, 1,3 or 1,4-bis(β-epithiopropyl oxy)cyclohexane, 1, 3 or 1,4-bis(β-epithiopropyl oxymethyl)cyclohexane, bis[4-(β-epithiopropyl oxy)cyclohexyl]methane, 2,2-bis[4-(β-epithiopropyl oxy)cyclohexyl] propane, bis[4-(β-epithiopropyl oxy)cyclohexyl]sulfide, 2,5-bis(β-epithiopropyl oxymethyl)-1,4-dithiane, 2,5-bis(β-epithiopropyl oxyethyl oxymethyl)-1,4-dithiane, bis(β-epithiopropyl)sulfide, bis(β-epithiopropyl)disulfide, bis(β-epithiopropyl)trisulfide, bis(β-epithiopropyl thio)methane, bis(β-epithiopropyl dithio)methane, bis(β-epithiopropyl dithio)ethane, bis(β-epithiopropyl dithioethyl)sulfide, bis(β-epithiopropyl dithioethyl)disulfide, 1,2-bis(β-epithiopropyl thio)ethane, 1,3-bis(β-epithiopropyl thio)propane, 1,2-bis(β-epithiopropyl thio)propane, 1-(β-epithiopropyl thio)-2-(β-epithiopropyl thiomethyl)propane, 1,4-bis(β-epithiopropyl thio)butane, 1,3-bis(β-epithiopropyl thio)butane, 1-(β-epithiopropyl thio)-3-(β-epithiopropyl thiomethyl)butane, 1,5-bis(β-epithiopropyl thio)pentane, 1-(β-epithiopropyl thio)-4-(β-epithiopropyl thiomethyl)pentane, 1,6-bis(β-epithiopropyl thio)hexane, 1-(β-epithiopropyl thio)-5-(β-epithiopropyl thiomethyl)hexane, 1-(β-epithiopropyl thio)-2-[(2-β-epithiopropyl thioethyl)thio]ethane, 1-(β-epithiopropyl thio)-2-[[2-β-(β-epithiopropyl thioethyl) thioethyl]thio]ethane tetrakis(β-epithiopropyl thiomethyl) methane, tetrakis(β-epithiopropyl dithiomethyl)methane, 1,1,1-tris(β-epithiopropyl thiomethyl)propane, 1,2,3-tris(β-epithiopropyl dithio)propane, 1,5-bis(β-epithiopropyl thio)-2-(β-epithiopropyl thiomethyl)-3-thiapentane, 1,5-bis(β-epithiopropyl thio)-2,4-bis(β-epithiopropyl thiomethyl)-3-thiapentane, 1,6-bis(β-epithiopropyl dithiomethyl)-2-(β-epithiopropyl dithioethyl thio)-4-thiahexane, 1-(β-epithiopropyl thio)-2,2-bis(β-epithiopropyl thiomethyl)-4-thiahexane, 1,5,6-tris(β-epithiopropyl thio)-4-(β-epithiopropyl thiomethyl)-3-thiahexane, 1,8-bis(β-epithiopropyl thio)-4-(β-epithiopropyl thiomethyl)-3,6-dithiaoctane, 1,8-bis(β-epithiopropyl thio)-4,5-bis(β-epithiopropyl thiomethyl)-3,6-dithiaoctane, 1,8-bis(β-epithiopropyl thio)-4,4-bis(β-epithiopropyl thiomethyl)-3,6-dithiaoctane, 1,8-bis(β-epithiopropyl thio)-2,4,5-tris(β-epithiopropyl thiomethyl)-3,6-dithiaoctane, 1,8-bis(β-epithiopropyl thio)-2,5-bis(β-epithiopropyl thiomethyl)-3,6-dithiaoctane, 1,9-bis(β-epithiopropyl thio)-5-(β-epithiopropyl thiomethyl)-5-[(2-β-epithiopropyl thioethyl) thiomethyl]-3,7-dithianonane, 1,10-bis(β-epithiopropyl thio)-5,6-bis[(2-β-epithiopropyl thioethyl)thio]-3,6,9-trithiadecane, 1,11-bis(β-epithiopropyl thio)-4,8-bis(β-epithiopropyl thiomethyl)-3,6,9-trithiaundecane, 1,11-bis(β-epithiopropyl thio)-5,7-bis(β-epithiopropyl thiomethyl)-3,6,9-trithiaundecane, 1,11-bis(β-epithiopropyl thio)-5,7-[(2-β-epithiopropyl thioethyl)thiomethyl]-3,6,9-trithiaundecane, 1,11-bis(β-epithiopropyl thio)-4,7-bis(β-epithiopropyl thiomethyl)-3,6,9-trithiaundecane, tetra[2-(β-epithiopropyl thio)acetyl methyl]methane, 1,1,1-tri[2-(β-epithiopropyl thio)acetyl methyl]propane, tetra[2-(β-epithiopropyl thiomethyl)acetyl methyl]methane, 1,1,1-tri[2-(β-epithiopropyl thiomethyl)acetyl methyl]propane, 1,3 or 1,4-bis(β-epithiopropyl thio)cyclohexane, 1, 3 or 1,4-bis(β-epithiopropyl thiomethyl)cyclohexane, 2,5-bis(β-epithiopropyl thiomethyl)-1,4-dithiane, 2,5-bis(β-epithiopropyl dithiomethyl)-1,4-dithiane, 2,5-bis(β-epithiopropyl thioethyl thiomethyl)-1,4-dithiane, bis[4-(β-epithiopropyl thio)cyclohexyl]methane, 2,2-bis[4-(β-epithiopropyl thio)cyclohexyl]propane, bis[4-(β-epithiopropyl thio)cyclohexyl]sulfide, 2,2-bis[4-(β-epithiopropyl thio)cyclohexyl]propane, bis[4-(β-epithiopropyl thio)cyclohexyl]sulfide.

Among those described above, for the (sulfur-containing) polyfunctional aliphatic episulfide compound, it is preferable to be at least one compound selected from the following group because production is easy, whereby cost as a composition can be reduced, resulting in excellent economy:

bis(β-epithiopropyl oxy)methane, 1,2-bis(β-epithiopropyl oxy)ethane, 1,3-bis(β-epithiopropyl oxy)propane, 1,2-bis(β-epithiopropyl oxy)propane, 1-(β-epithiopropyl oxy)-2-β3-epithiopropyl oxymethyl)propane, 1,4-bis(β-epithiopropyl oxy)butane, 1,3-bis(β-epithiopropyl oxy)butane, 1-(β-epithiopropyl oxy)-3-(β-epithiopropyl oxymethyl)butane, 1,6-bis (β-epithiopropyl oxy)hexane, 1-(β-epithiopropyl oxy)-5-(β-epithiopropyl oxymethyl)hexane, 1-(β-epithiopropyl oxy)-2-[[2-(2-β-epithiopropyl oxyethyl)oxy]ethane, 1-(β-epithiopropyl oxy)-2-[[2-(2-[(3-epithiopropyl oxyethyl) oxyethyl]oxy]ethane, tetrakis(β-epithiopropyl oxymethyl) methane, 1,1,1-tris(β-epithiopropyl oxymethyl)propane, 1-(β-epithiopropyl oxy)-2,2-bis(β-epithiopropyl oxymethyl)-4-thiahexane, 1,5,6-tris(β-epithiopropyl oxy)-4-(β-epithiopropyl oxymethyl)-3-thiahexane, 1,8-bis(β-epithiopropyl oxy)-4-(β-epithiopropyl oxymethyl)-3,6-dithiaoctane, 1,8-bis(β-epithiopropyl oxy)-4,5-bis(β-epithiopropyl oxymethyl)-3,6-dithiaoctane, 1,8-bis(β-epithiopropyl oxy)-4,4-bis(β-epithiopropyl oxymethyl)-3,6-dithiaoctane, 1,8-bis(β-epithiopropyl oxy)-2,4,5-tris(β-epithiopropyl oxymethyl)-3,6-dithiaoctane, 1,8-bis(β-epithiopropyl oxy)-2,5-bis(β-epithiopropyl oxymethyl)-3,6-dithiaoctane, 1,3 or 1,4-bis(β-epithiopropyl oxy)cyclohexane, 1, 3 or 1,4-bis(β-epithiopropyl oxymethyl)cyclohexane, bis[4-(β-epithiopropyl oxy)cyclohexyl]methane, 2,2-bis[4-(β-epithiopropyl oxy)cyclohexyl]propane, bis[4-(β-epithiopropyl oxy)cyclohexyl]sulfide, 2,5-bis(β-epithiopropyl oxymethyl)-1,4-dithiane, 2,5-bis(β-epithiopropyl oxyethyl oxymethyl)-1,4-dithiane, bis(β-epithiopropyl)sulfide, bis(β-epithiopropyl)disulfide, bis(β-epithiopropyl thio)methane, bis(β-epithiopropyl dithio)methane, bis(β-epithiopropyl dithio)ethane, bis(β-epithiopropyl dithioethyl)sulfide, bis(β-epithiopropyl dithioethyl)disulfide, 1,2-bis(β-epithiopropyl thio)ethane, 1,3-bis(β-epithiopropyl thio)propane, 1,2-bis(β-epithiopropyl thio)propane, 1-(β-epithiopropyl thio)-2-(β-epithiopropyl thiomethyl)propane, 1,4-bis(β-epithiopropyl thio)butane, 1,3-bis(β-epithiopropyl thio)butane, 1-(β-epithiopropyl thio)-3-(β-epithiopropyl thiomethyl)butane, 1,6-bis(β-epithiopropyl thio)hexane, 1-(β-epithiopropyl thio)-5-(β-epithiopropyl thiomethyl)hexane, 1-(β-epithiopropyl thio)-2-[(2-β-epithiopropyl thioethyl)thio]ethane, 1-(β-epithiopropyl thio)-2-[[2-(2-β-epithiopropyl thioethyl)thioethyl]thio]ethane tetrakis(β-epithiopropyl thiomethyl)methane, tetrakis(β-epithiopropyl dithiomethyl)methane, 1,1,1-tris(β-epithiopropyl thiomethyl)propane, 1,2,3-tris(β-epithiopropyl dithio)propane, 1,6-bis(β-epithiopropyl dithiomethyl)-2-(β-epithiopropyl dithioethyl thio)-4-thiahexane, 1-(β-epithiopropyl thio)-2,2-bis(β-epithiopropyl thiomethyl)-4-thiahexane, 1,5,6-tris(β-epithiopropyl thio)-4-(β-epithiopropyl thiomethyl)-3-thiahexane, 1,8-bis(β-epithiopropyl thio)-4-(β-epithiopropyl thiomethyl)-3,6-dithiaoctane, 1,8-bis(β-epithiopropyl thio)-4,5-bis(β-epithiopropyl thiomethyl)-3,6-dithiaoctane, 1,8-bis(β-epithiopropyl thio)-4,4-bis(β-epithiopropyl thiomethyl)-3,6-dithiaoctane, 1,8-bis(β-epithiopropyl thio)-2,4,5-tris(β-epithiopropyl thiomethyl)-3,6-dithiaoctane, 1,8-bis(β-epithiopropyl thio)-2,5-bis(β-epithiopropyl thiomethyl)-3,6-dithiaoctane, tetra[2-(β-epithiopropyl thio)acetyl methyl]methane, 1,1,1-tri[2-(β-epithiopropyl thio)acetyl methyl]propane, tetra[2-(β-epithiopropyl thiomethyl)acetyl methyl]methane, 1,1,1-tri[2-(β-epithiopropyl thiomethyl)acetyl methyl]propane, 1,3 or 1,4-bis(β-epithiopropyl thio)cyclohexane, 1, 3 or 1,4-bis(β-epithiopropyl thiomethyl)cyclohexane, 2,5-bis(β-epithiopropyl thiomethyl)-1,4-dithiane, 2,5-bis(β-epithiopropyl dithiomethyl)-1,4-dithiane, 2,5-bis(β-epithiopropyl thioethyl thiomethyl)-1,4-dithiane, bis[4-(β-epithiopropyl thio)cyclohexyl]methane, 2,2-bis[4-(β-epithiopropyl thio)cyclohexyl]propane, bis[4-(β-epithiopropyl thio)cyclohexyl]sulfide, 2,2-bis[4-(β-epithiopropyl thio)cyclohexyl]propane, bis[4-(β-epithiopropyl thio)cyclohexyl]sulfide.

(Silicone Compound Having Episulfide Group in Molecule)

The silicone compound having an episulfide group in the molecule is not particularly limited and can be selected from, for example, compounds represented by the following formula (13):

$$(R_{70}R_{71}R_{72}SiO_{1/2})_a(R_{73}R_{74}SiO_{2/2})_b(R_{75}SiO_{3/2})_c(SiO_{4/2})_d \quad (13)$$

In the formula (13), each of a, b, c, and d is a numeric value that satisfies a+b+c+d=1.0 and is 0≤a/(a+b+c+d)≤1, 0≤b/(a+b+c+d)≤1, 0≤c/(a+b+c+d)≤1, and 0≤d/(a+b+c+d)<1. At least one of $R_{70}$ to $R_{75}$ represents a group containing an episulfide group, and the remaining groups of $R_{70}$ to $R_{75}$ each represent a linear or branched hydrocarbon group having 1 to 8 carbon atoms or a group in which the hydrocarbon group is fluorinated. These may be the same as or different from each other.

(Episulfide Compound Containing Different Types of Polymerizable Functional Groups)

The episulfide compound containing different types of polymerizable functional groups is not particularly limited and can be selected from, for example, compounds represented by the following formula (14):

$$[X{-}(R_{80})_m]_o{-}R_{81}{-}[(R_{82})_n{-}Y]_p \quad (14)$$

In the above formula (14), $R_{80}$ to $R_{82}$ each represent a substituted or unsubstituted linear, branched, or cyclic aliphatic or aromatic hydrocarbon group which may be thiated. m, n, o and p each independently represent a number of 1 or more. X represents an episulfide group. Y represents a structure selected from cyclic thioether structures, lactone structures, cyclic carbonate structures and their sulfur-containing analogous structures, cyclic acetal structures and their sulfur-containing analogous structures, cyclic amine structures, cyclic imino ether structures, lactam structures, cyclic thiourea structures, cyclic phosphinate structures, cyclic phosphonite structures, cyclic phosphite structures, vinyl structures, allyl structures, (meth)acrylic structures, and cycloalkane structures in the case of representing a single type of polymerizable functional group. Y represents at least two types of structures selected from the group described above in the case of representing a plurality of polymerizable functional groups.

The mixing ratio between the at least one compound (A) selected from the group consisting of an ether compound having two or more ether groups, a trivalent phosphorus compound, and a ketone compound and the boron trihalide (B) can be represented by an index α calculated according to the following formula (5):

$$\text{Index } \alpha=(\alpha e+\alpha p+\alpha k)/\alpha b \quad (5)$$

αe: molar number (mol) of ether groups in the ether compound (A-1)

αp: molar number (mol) of trivalent phosphorus atom(s) contained in the trivalent phosphorus compound (A-2)

αk: molar number (mol) of ketone group(s) in the ketone compound (A-3)

αb: molar number (mol) of the boron trihalide (B)

It is preferable that the index α should be 1 or more because all the boron trihalides (B) contained in the composition form a compound (complex) with the at least one compound (A) selected from the group consisting of an ether compound having two or more ether groups, a trivalent phosphorus compound, and a ketone compound via a coordinate bond and because there is a tendency that the polymerization of the episulfide compound (C) can be further suppressed when preparing the composition under room temperature, resulting in the improved stability of the composition. From a similar viewpoint, it is more preferable that the index α should be 1.5 or more.

In the case where there is the possibility that the compound of the at least one compound (A) selected from the group consisting of an ether compound having two or more ether groups, a trivalent phosphorus compound, and a ketone compound and the boron trihalide (B) via a coordinate bond is altered, it is preferable that the index α should be 2 or more in order to enhance the stability of the compound.

It is preferable that the index α should be 1000 or less because there is a tendency that residues of an episulfide group contained in the episulfide compound (C) can be further reduced during polymerizing the composition. It is more preferable that the index α should be 500 or less because there is a tendency that, in the case of requiring the steps of polymerizing the composition and removing the at least one compound (A) selected from the group consisting of an ether compound having two or more ether groups, a trivalent phosphorus compound, and a ketone compound contained in the obtained polymer, cost necessary for the steps can be further reduced, resulting in better economy. From a similar viewpoint, it is further preferable that the index α should be 100 or less.

In the case where the at least one compound (A) selected from the group consisting of an ether compound having two or more ether groups, a trivalent phosphorus compound, and a ketone compound is only the ether compound (A-1), the above formula (5) is represented by an index α2 of the formula (15):

$$\text{Index } \alpha 2 = \alpha e/\alpha b \tag{15}$$

αe: molar number (mol) of ether groups in the ether compound (A-1)

αb: molar number (mol) of the boron trihalide (B)

It is preferable that the index α2 should be 1 or more because all the boron trihalides (B) contained in the composition form a compound with the ether compound (A-1) having two or more ether groups via a coordinate bond and because there is a tendency that the polymerization of the episulfide compound (C) can be further suppressed when preparing the composition under room temperature, resulting in the further improved stability of the composition. From a similar viewpoint, it is more preferable that the index α2 should be 1.5 or more.

In the case where there is the possibility that the compound of the ether compound (A-1) having two or more ether groups and the boron trihalide (B) via a coordinate bond is altered, it is preferable that the index α2 should be 2 or more in order to enhance the stability of the compound.

It is preferable that the index α2 should be 1000 or less because there is a tendency that residues of an episulfide group contained in the episulfide compound (C) can be further reduced during polymerizing the composition. It is more preferable that the index α2 should be 500 or less because there is a tendency that, in the case of requiring the steps of polymerizing the composition and removing the ether compound (A-1) having two or more ether groups contained in the obtained polymer, cost necessary for the steps can be further reduced, resulting in better economy. From a similar viewpoint, it is further preferable that the index α2 should be 100 or less.

In the case where the at least one compound (A) selected from the group consisting of an ether compound having two or more ether groups, a trivalent phosphorus compound, and a ketone compound is only the trivalent phosphorus compound (A-2), the above formula (5) is represented by an index α3 of the formula (16):

$$\text{Index } \alpha 3 = \alpha e/\alpha b \tag{16}$$

αp: molar number (mol) of trivalent phosphorus atom(s) contained in the trivalent phosphorus compound (A-2)

αb: molar number (mol) of the boron trihalide (B)

It is preferable that the index α3 should be 1 or more because all the boron trihalides (B) contained in the composition form a compound with the trivalent phosphorus compound (A-2) via a coordinate bond and because there is a tendency that the polymerization of the episulfide compound (C) can be further suppressed when preparing the composition under room temperature, resulting in the further improved stability of the composition.

In the case where there is the possibility that the compound of the trivalent phosphorus compound (A-2) and the boron trihalide (B) via a coordinate bond is altered, it is preferable that the index α3 should be 1.2 or more in order to enhance the stability of the compound. From a similar viewpoint, it is more preferable that the index α3 should be 1.5 or more.

It is preferable that the index α3 should be 10 or less because there is a tendency that a side reaction can be further suppressed during polymerizing the episulfide compound (C). It is more preferable that the index α3 should be 5 or less because there is a tendency that, in the case of requiring the steps of polymerizing the composition and removing the trivalent phosphorus compound (A-2) contained in the obtained polymer, cost necessary for the steps can be further reduced, resulting in better economy. From a similar viewpoint, it is further preferable that the index α3 should be 2 or less.

In the case where the at least one compound (A) selected from the group consisting of an ether compound having two or more ether groups, a trivalent phosphorus compound, and a ketone compound is only the ketone compound (A-3), the above formula (5) is represented by an index α4 of the formula (17):

$$\text{Index } \alpha 4 = \alpha k/\alpha b \tag{17}$$

αk: molar number (mol) of ketone group(s) in the ketone compound (A-3)

αb: molar number (mol) of the boron trihalide (B)

It is preferable that the index α4 should be 1 or more because all the boron trihalides (B) contained in the composition form a compound with the ketone compound (A-2) via a coordinate bond and because there is a tendency that the polymerization of the episulfide compound (C) can be further suppressed when preparing the composition under room temperature, resulting in the further improved stability of the composition. From a similar viewpoint, it is more preferable that the index α4 should be 1.5 or more.

In the case where there is the possibility that the compound of the ketone compound (A-3) and the boron trihalide (B) via a coordinate bond is altered, it is preferable that the index α4 should be 2 or more in order to enhance the stability of the compound.

It is preferable that the index α4 should be 1000 or less because there is a tendency that residues of an episulfide group contained in the episulfide compound (C) can be further reduced during polymerizing the composition. It is more preferable that the index α4 should be 500 or less because there is a tendency that, in the case of requiring the steps of polymerizing the composition and removing the ketone compound (A-3) contained in the obtained polymer, cost necessary for the steps can be further reduced, resulting in better economy. From a similar viewpoint, it is further preferable that the index α4 should be 100 or less.

As for the mixing ratio between the boron trihalide (B) and the episulfide compound (C), it is preferable that the ratio between the molar number (mol) of the (B) and the molar number (mol) of episulfide group(s) contained in the (C) should be 1:10 to 1:100000.

Given the molar number (mol) of (B) to be 1, it is preferable that the molar number (mol) of episulfide group(s) contained in (C) should be 10 or more because there is a tendency that the polymerization of the episulfide compound (C) can be further suppressed when preparing the composition under room temperature, resulting in the further improved stability of the composition. Given the molar number (mol) of (B) to be 1, it is more preferable that the molar number (mol) of episulfide group(s) contained in (C) should be 20 or more because there is a tendency that a side reaction can be further suppressed during polymerizing the episulfide compound (C). From a similar viewpoint, given the molar number (mol) of (B) to be 1, it is further preferable that the molar number (mol) of episulfide group(s) contained in (C) should be 50 or more.

Given the molar number (mol) of (B) to be 1, it may be preferable that the molar number (mol) of episulfide group(s) contained in (C) should be 50 or more because the transparency of the obtained transparent polymer is maintained over a long period, depending on the combination of the at least one compound (A) selected from the group consisting of an ether compound having two or more ether groups, a trivalent phosphorus compound, and a ketone compound, the boron trihalide (B), and the episulfide compound (C). From a similar viewpoint, given the molar number (mol) of (B) to be 1, it is more preferable that the molar number (mol) of episulfide group(s) contained in (C) should be 100 or more, with 200 or more being further preferable.

Given the molar number (mol) of (B) to be 1, it is preferable that the molar number (mol) of episulfide group(s) contained in (C) should be 100000 or less because there is a tendency that residues of an episulfide group contained in the episulfide compound (C) can be further reduced during polymerizing the composition. Given the molar number (mol) of (B) to be 1, it is more preferable that the molar number (mol) of episulfide group(s) contained in (C) should be 20000 or less because there is a tendency that a side reaction can be further suppressed during polymerizing the episulfide compound (C). From a similar viewpoint, given the molar number (mol) of (B) to be 1, it is further preferable that the molar number (mol) of episulfide group(s) contained in (C) should be 10000 or less.

The mixing ratio between the boron trihalide (B) and the episulfide compound (C) can also be represented by the following formula (18):

$$\text{Index } \beta = \alpha b / \alpha t \times 100 \quad (18)$$

αb: molar number (mol) of the boron trihalide (B)

αt: molar number (mol) of episulfide group(s) contained in the episulfide compound (C)

When the ratio between the molar number (mol) of the boron trihalide (B) and the molar number (mol) of episulfide group(s) contained in the episulfide compound (C) is 1:10, index β=10.

When the ratio between the molar number (mol) of the boron trihalide (B) and the molar number (mol) of episulfide group(s) contained in the episulfide compound (C) is 1:20, index β=5.

When the ratio between the molar number (mol) of the boron trihalide (B) and the molar number (mol) of episulfide group(s) contained in the episulfide compound (C) is 1:50, index β=2.

When the ratio between the molar number (mol) of the boron trihalide (B) and the molar number (mol) of episulfide group(s) contained in the episulfide compound (C) is 1:100, index β=1.

When the ratio between the molar number (mol) of the boron trihalide (B) and the molar number (mol) of episulfide group(s) contained in the episulfide compound (C) is 1:200, index β=0.5.

When the ratio between the molar number (mol) of the boron trihalide (B) and the molar number (mol) of episulfide group(s) contained in the episulfide compound (C) is 1:100000, index β=0.001.

When the ratio between the molar number (mol) of the boron trihalide (B) and the molar number (mol) of episulfide group(s) contained in the episulfide compound (C) is 1:20000, index β=0.005.

When the ratio between the molar number (mol) of the boron trihalide (B) and the molar number (mol) of episulfide group(s) contained in the episulfide compound (C) is 1:10000, index β=0.01.

Although a method for preparing the composition is not particularly limited as long as being a method generally used, examples thereof include a method of simultaneously adding the at least one compound (A) selected from the group consisting of an ether compound having two or more ether groups, a trivalent phosphorus compound, and a ketone compound, the boron trihalide (B), and the episulfide compound (C), and a method of mixing two components arbitrarily selected from among (A), (B), and (C) and then adding the mixture to the remaining component or adding the remaining component thereto. Among these, a method of preparing a mixture containing (A) and (B) and then adding it to (C) or adding (C) thereto is preferable because there is a tendency that the composition can be stably prepared and stability as a composition is also excellent.

Although a method for preparing the mixture containing (A) and (B) is not particularly limited as long as being a method generally used, examples thereof include a method of directly reacting (A) and (B), and a method of reacting (A) and a compound containing (B). Among these, a method of reacting (A) and a compound containing (B) is more preferable because there is a tendency that the handleability of the compound containing (B) becomes better, so that the preparation of the composition gets easier.

The temperature for preparing the mixture containing the at least one compound (A) selected from the group consisting of an ether compound having two or more ether groups, a trivalent phosphorus compound, and a ketone compound and the boron trihalide (B) is not particularly limited, and it is preferable to be −80 to 100° C., though the preparation is performed at a generally available temperature. The temperature for preparing the mixture does not have to be constant and may be changed at some midpoint.

It is preferable that the temperature for preparing the mixture should be −80° C. or higher because there is a tendency that time necessary for coordinate bond formation between (A) and (B) can be further shortened. From a similar viewpoint, it is more preferable that the temperature for preparing the mixture should be −60° C. or higher.

In the case where there is the possibility that, depending on the selection of a starting material, the starting material freezes, so that the formation of the compound consisting of (A) and (B) via a coordinate bond is inhibited, it is preferable to set the temperature for preparing the mixture to the freezing point or higher of the starting material in order to suppress the freezing.

In the case where the compound consisting of (A) and (B) via a coordinate bond is unstable, it is preferable to set the temperature for preparing the mixture to 100° C. or lower. From a similar viewpoint, it is more preferable that the temperature for preparing the mixture should be 80° C. or lower.

In the case where there is the possibility that, depending on the selection of a starting material, the starting material volatilizes, so that the mixing ratio between (A) and (B) falls outside the desired ratio, it is preferable to set the temperature for preparing the mixture to the boiling point or lower of the starting material in order to suppress the volatilization. It is also effective means to set the pressure for preparing the mixture to the desired pressure equal to or higher than atmospheric pressure, thereby suppressing the volatilization of the starting material.

Although the atmosphere for preparing the mixture containing the at least one compound (A) selected from the group consisting of an ether compound having two or more ether groups, a trivalent phosphorus compound, and a ketone compound and the boron trihalide (B) is not particularly limited as long as being an atmosphere generally used, an air atmosphere, a nitrogen atmosphere, or an argon atmosphere, or the like is usually used. Among these, a nitrogen atmosphere and an argon atmosphere are preferable because there is a tendency that (B) can be stably handled. Moreover, a nitrogen atmosphere is further preferable because there is a tendency of resulting in excellent economy.

The pressure for preparing the mixture containing the at least one compound (A) selected from the group consisting of an ether compound having two or more ether groups, a trivalent phosphorus compound, and a ketone compound and the boron trihalide (B) is not particularly limited, and the reaction is usually performed under atmospheric pressure. However, in the case where the vapor pressure in the normal state of (A) is low and there is the possibility that (A) volatilizes during the reaction, it is effective means to perform pressurization at an atmospheric pressure or higher.

In the case where (A) is solid when preparing the mixture containing the at least one compound (A) selected from the group consisting of an ether compound having two or more ether groups, a trivalent phosphorus compound, and a ketone compound and the boron trihalide (B), it may become effective means to use a compound capable of dissolving (A) because a homogeneous mixture is easily obtained.

Although the compound capable of dissolving the at least one compound (A) selected from the group consisting of an ether compound having two or more ether groups, a trivalent phosphorus compound, and a ketone compound is not particularly limited as long as being one generally used, specific examples thereof include: saturated hydrocarbon compounds such as n-pentane, n-hexane, isohexane, n-heptane, n-octane, isooctane, n-nonane, n-decane, cyclopentane, cyclohexane, cycloheptane, and cyclooctane; aromatic hydrocarbon compounds such as benzene, toluene, xylene, ethylbenzene, diethylbenzene, isopropylbenzene, naphthalene, tetralin, and biphenyl; halogenated hydrocarbon compounds such as methylene chloride, chloroform, carbon tetrachloride, ethylene chloride, trichloroethane, tetrachloroethane, pentachloroethane, hexachloroethane, dichloroethylene, trichloroethylene, tetrachloroethylene, dichloropropane, trichloropropane, isopropyl chloride, butyl chloride, hexyl chloride, chlorobenzene, dichlorobenzene, trichlorobenzene, chlorotoluene, and chloronaphthalene; alcohols such as methanol, ethanol, propanol, isopropanol, butanol, isobutanol, pentanol, hexanol, heptanol, octanol, nonanol, decanol, undecanol, dodecanol, cyclohexanol, and benzyl alcohol; ketones such as acetone, methyl acetone, ethyl methyl ketone, methyl propyl ketone, methyl butyl ketone, methyl isobutyl ketone, methyl hexyl ketone, diethyl ketone, ethyl butyl ketone, dipropyl ketone, diisobutyl ketone, and cyclohexanone; and esters such as ethyl acetate, propyl acetate, butyl acetate, isobutyl acetate, pentyl acetate, hexyl acetate, octyl acetate, cyclohexyl acetate, methyl propionate, ethyl propionate, butyl propionate, methyl benzoate, ethyl benzoate, propyl benzoate, butyl benzoate, and benzyl benzoate. These compounds may be used alone, or a plurality thereof may be used in combination.

Among these, saturated hydrocarbon compounds such as n-pentane, n-hexane, isohexane, n-heptane, n-octane, isooctane, n-nonane, n-decane, cyclopentane, cyclohexane, cycloheptane, and cyclooctane, and halogenated hydrocarbon compounds such as methylene chloride, chloroform, carbon tetrachloride, ethylene chloride, trichloroethane, tetrachloroethane, pentachloroethane, hexachloroethane, dichloroethylene, trichloroethylene, tetrachloroethylene, dichloropropane, trichloropropane, isopropyl chloride, butyl chloride, hexyl chloride, chlorobenzene, dichlorobenzene, trichlorobenzene, chlorotoluene, and chloronaphthalene are preferable because there is a tendency that stability is high against the boron trihalide (B) and the mixture can be stably prepared.

When preparing the mixture containing the at least one compound (A) selected from the group consisting of an ether compound having two or more ether groups, a trivalent phosphorus compound, and a ketone compound and the boron trihalide (B), ones other than the desired compound may be contained in the mixture by using the compound capable of dissolving (A) or the compound containing (B). In such a case, the desired compound can be obtained as a distillate or as a distillation residue by performing distillation. The distillation temperature and the distillation pressure are appropriately set depending on the boiling point of the compound to be separated by distillation.

It is preferable that the distillation temperature should be 100° C. or lower, it is more preferable to be 80° C. or lower, and it is further preferable to be 60° C. or lower. There is the case where the decomposition of the compound consisting of (A) and (B) via a coordinate bond can be suppressed by setting the distillation temperature to 100° C. or lower. From a similar viewpoint, 80° C. or lower is more preferable, with 60° C. or lower being further preferable. The distillation temperature does not have to be constant and may be changed at some midpoint.

Although the distillation pressure is appropriately set depending on the distillation temperature, it is preferable to be a pressure lower than atmospheric pressure in the case where the distillation temperature exceeds 100° C. The distillation pressure does not have to be constant and may be changed at some midpoint.

The temperature for preparing the composition comprising the at least one compound (A) selected from the group consisting of an ether compound having two or more ether groups, a trivalent phosphorus compound, and a ketone compound, the boron trihalide (B), and the episulfide compound (C) is not particularly limited, and it is preferable to be −80 to 100° C., though the preparation is performed at a generally available temperature. The temperature for preparing the composition does not have to be constant and may be changed at some midpoint.

In the case where there is the possibility that a starting material freezes when preparing the composition comprising (A), (B), and (C), it is preferable that the temperature for preparing the composition should be −80° C. or higher because there is a tendency that a homogeneous composition is obtained more easily by suppressing the freezing of the starting material or reducing the viscosity of the starting material. From a similar viewpoint, it is more preferable that the temperature for preparing the composition should be −40° C. or higher. It is further preferable that the temperature for preparing the composition should be −20° C. or higher because there is a tendency that the necessity to use a large-size cooling installation is reduced, whereby cost for producing the composition can be reduced. From a similar viewpoint, it is particularly preferable to be 0° C. or higher.

It is preferable that the temperature for preparing the composition should be 100° C. or lower because there is a tendency that the polymerization of the episulfide compound (C) can be further suppressed when preparing the composition comprising (A), (B), and (C) and a homogeneous composition is obtained more easily. From a similar viewpoint, it is more preferable that the temperature for preparing the composition should be 80° C. or lower. It is further preferable that the temperature for preparing the composition should be 60° C. or lower because there is a tendency that the polymerization of the episulfide compound (C) can be further suppressed, resulting in the further improved stability of the composition. From a similar viewpoint, it is particularly preferable to be 40° C. or lower.

Although the atmosphere for preparing the composition comprising (A), (B), and (C) is not particularly limited as long as being an atmosphere generally used, an air atmosphere, a nitrogen atmosphere, or an argon atmosphere, or the like is usually used. Among these, a nitrogen atmosphere and an argon atmosphere are preferable because there is a tendency that the stability of the boron trihalide (B) contained in the composition becomes better. Moreover, a nitrogen atmosphere is further preferable because there is a tendency of resulting in excellent economy.

The pressure for preparing the composition comprising (A), (B), and (C) is not particularly limited, and the preparation is usually performed under atmospheric pressure. However, in the case where the vapor pressure in the normal state of a compound contained in the composition is low and there is the possibility of volatilizing, it is effective means to perform pressurization at an atmospheric pressure or higher.

In the case where solid matter is present in the contained compounds when preparing the composition comprising (A), (B), and (C) or in the case where the mixture containing the at least one compound (A) selected from the group consisting of an ether compound having two or more ether groups, a trivalent phosphorus compound, and a ketone compound and the boron trihalide (B) is solid, it may become effective means to use a solubilizing compound because a homogeneous composition is easily obtained.

The solubilizing compound described herein means a compound capable of dissolving solid ones among the compounds contained in the composition and, in the case where the mixture containing the at least one compound (A) selected from the group consisting of an ether compound having two or more ether groups, a trivalent phosphorus compound, and a ketone compound and the boron trihalide (B) is solid, capable of dissolving it.

Although the solubilizing compound is not particularly limited as long as being one generally used, specific examples thereof include: saturated hydrocarbon compounds such as n-pentane, n-hexane, isohexane, n-heptane, n-octane, isooctane, n-nonane, n-decane, cyclopentane, cyclohexane, cycloheptane, and cyclooctane; aromatic hydrocarbon compounds such as benzene, toluene, xylene, ethylbenzene, diethylbenzene, isopropylbenzene, naphthalene, tetralin, and biphenyl; halogenated hydrocarbon compounds such as methylene chloride, chloroform, carbon tetrachloride, ethylene chloride, trichloroethane, tetrachloroethane, pentachloroethane, hexachloroethane, dichloroethylene, trichloroethylene, tetrachloroethylene, dichloropropane, trichloropropane, isopropyl chloride, butyl chloride, hexyl chloride, chlorobenzene, dichlorobenzene, trichlorobenzene, chlorotoluene, and chloronaphthalene; alcohols such as methanol, ethanol, propanol, isopropanol, butanol, isobutanol, pentanol, hexanol, heptanol, octanol, nonanol, decanol, undecanol, dodecanol, cyclohexanol, and benzyl alcohol; ketones such as acetone, methyl acetone, ethyl methyl ketone, methyl propyl ketone, methyl butyl ketone, methyl isobutyl ketone, methyl hexyl ketone, diethyl ketone, ethyl butyl ketone, dipropyl ketone, diisobutyl ketone, and cyclohexanone; and esters such as ethyl acetate, propyl acetate, butyl acetate, isobutyl acetate, pentyl acetate, hexyl acetate, octyl acetate, cyclohexyl acetate, methyl propionate, ethyl propionate, butyl propionate, methyl benzoate, ethyl benzoate, propyl benzoate, butyl benzoate, and benzyl benzoate. The compounds described above may be used alone, or a plurality thereof may be used in combination.

Among these, saturated hydrocarbon compounds such as n-pentane, n-hexane, isohexane, n-heptane, n-octane, isooctane, n-nonane, n-decane, cyclopentane, cyclohexane, cycloheptane, and cyclooctane, and halogenated hydrocarbon compounds such as methylene chloride, chloroform, carbon tetrachloride, ethylene chloride, trichloroethane, tetrachloroethane, pentachloroethane, hexachloroethane, dichloroethylene, trichloroethylene, tetrachloroethylene, dichloropropane, trichloropropane, isopropyl chloride, butyl chloride, hexyl chloride, chlorobenzene, dichlorobenzene, trichlorobenzene, chlorotoluene, and chloronaphthalene are preferable because there is a tendency that stability is high against the boron trihalide (B) and the composition comprising (A), (B), and (C) can be stably prepared.

When preparing the composition comprising (A), (B), and (C), ones other than the desired compound may be contained in the composition by using the solubilizing compound. In such a case, a method of removing the solubilizing compound by vacuum distillation may become effective means.

It is preferable that the vacuum distillation temperature should be 40° C. or lower because there is a tendency that the polymerization of the episulfide compound (C) can be further suppressed, resulting in the further improved stability of the composition comprising (A), (B), and (C). From a similar viewpoint, one that is more preferred is 35° C. or lower, with 25° C. or lower being further preferable. The vacuum distillation pressure is appropriately set depending on the vacuum distillation temperature. The vacuum distillation temperature or the vacuum distillation pressure does not have to be constant and may be changed at some midpoint.

Although a method for obtaining a polymer from the composition comprising (A), (B), and (C) is not particularly limited as long as being a general method, a method of promoting polymerization by heating the composition and/or a method of promoting polymerization by energy line irradiation are preferably used. Among these, a method of promoting polymerization by heating is a more preferable method because utilization in various situations is easy and there is a tendency of being excellent in versatility. Moreover, in the case where the episulfide compound contained in the composition has two or more polymerizable functional groups, a cured product can be obtained by a similar method.

Although the polymerization temperature when promoting polymerization by heating to obtain a polymer is not particularly limited, it is preferable to be −80 to 160° C. The polymerization temperature does not have to be constant and may be changed at some midpoint.

It is preferable that the polymerization temperature should be 160° C. or lower because there is a tendency that the possibility that the obtained polymer is colored due to polymerization heat generated during polymerizing the episulfide compound (C) can be reduced. 140° C. or lower is more preferable because there is a tendency that a side reaction can be further suppressed during polymerizing the episulfide compound (C). From a similar viewpoint, it is further preferable that the polymerization temperature should be 120° C. or lower, and it is particularly preferable to be 100° C. or lower.

In the case where there is the possibility that the polymerization of the episulfide compound (C) is inhibited by the freezing of the component (A), (B), or (C) present in the composition, the compound consisting of the components (A) and (B) via a coordinate bond, or the like, it is preferable that the polymerization temperature should be set to −80° C. or higher. It is more preferable that the polymerization temperature should be −40° C. or higher because there is a tendency that the necessity to use a large-size cooling installation is reduced, whereby cost for producing the polymer can be reduced. From a similar viewpoint, it is further preferable to be 0° C. or higher. It is preferable that the polymerization temperature should be 40° C. or higher because there is a tendency that the mobility of the polymer end of the polymer becomes higher, whereby the polymerization time of the episulfide compound (C) can be further shortened. From a similar viewpoint, it is more preferable that the polymerization temperature should be 50° C. or higher, with 70° C. or higher being further preferable.

Although the polymerization atmosphere when promoting polymerization by heating to obtain a polymer is not particularly limited as long as being an atmosphere generally used, an air atmosphere, a nitrogen atmosphere, or an argon atmosphere, or the like is usually used. Among these, a nitrogen atmosphere and an argon atmosphere are preferable because there is a tendency that the desired bond can be formed during polymerization. Moreover, a nitrogen atmosphere is further preferable because there is a tendency of resulting in excellent economy.

The polymerization pressure when promoting polymerization by heating to obtain a polymer is not particularly limited, and the reaction is usually performed under atmospheric pressure. However, in the case of using a compound whose vapor pressure in the normal state is low and which has the possibility of volatilizing as a component contained in the composition, it is effective means to perform pressurization at an atmospheric pressure or higher.

In the case where the composition comprising (A), (B), and (C) is highly viscous or solid, it becomes effective means to reduce the viscosity of the composition with a nonreactive compound and obtain a polymer provided with the desired molding.

Although the nonreactive compound is not particularly limited as long as being one generally used, specific examples thereof include: saturated hydrocarbon compounds such as n-pentane, n-hexane, isohexane, n-heptane, n-octane, isooctane, n-nonane, n-decane, cyclopentane, cyclohexane, cycloheptane, and cyclooctane; aromatic hydrocarbon compounds such as benzene, toluene, xylene, ethylbenzene, diethylbenzene, isopropylbenzene, naphthalene, tetralin, and biphenyl; halogenated hydrocarbon compounds such as methylene chloride, chloroform, carbon tetrachloride, ethylene chloride, trichloroethane, tetrachloroethane, pentachloroethane, hexachloroethane, dichloroethylene, trichloroethylene, tetrachloroethylene, dichloropropane, trichloropropane, isopropyl chloride, butyl chloride, hexyl chloride, chlorobenzene, dichlorobenzene, trichlorobenzene, chlorotoluene, and chloronaphthalene; ketones such as acetone, methyl acetone, ethyl methyl ketone, methyl propyl ketone, methyl butyl ketone, methyl isobutyl ketone, methyl hexyl ketone, diethyl ketone, ethyl butyl ketone, dipropyl ketone, diisobutyl ketone, and cyclohexanone; and esters such as ethyl acetate, propyl acetate, butyl acetate, isobutyl acetate, pentyl acetate, hexyl acetate, octyl acetate, cyclohexyl acetate, methyl propionate, ethyl propionate, butyl propionate, methyl benzoate, ethyl benzoate, propyl benzoate, butyl benzoate, and benzyl benzoate. The compounds described above may be used alone, or a plurality thereof may be used in combination.

Among these, saturated hydrocarbon compounds such as n-pentane, n-hexane, isohexane, n-heptane, n-octane, isooctane, n-nonane, n-decane, cyclopentane, cyclohexane, cycloheptane, and cyclooctane, and halogenated hydrocarbon compounds such as methylene chloride, chloroform, carbon tetrachloride, ethylene chloride, trichloroethane, tetrachloroethane, pentachloroethane, hexachloroethane, dichloroethylene, trichloroethylene, tetrachloroethylene, dichloropropane, trichloropropane, isopropyl chloride, butyl chloride, hexyl chloride, chlorobenzene, dichlorobenzene, trichlorobenzene, chlorotoluene, and chloronaphthalene are preferable because there is a tendency that stability is high against the boron trihalide (B) and the composition can be stably prepared.

When promoting polymerization by heating to obtain a polymer, it may become effective means to add any of the following compounds (1) to (11) as a thermal polymerization promoter for the purpose of accelerating the polymerization reaction or for the purpose of easily promoting the polymerization of an additional polymerizable functional group in the case of using a compound having the additional polymerizable functional group other than the 3-membered cyclic thioether structure in addition to the 3-membered cyclic thioether structure as the episulfide compound (C) contained in the composition.

(1) Primary amines such as ethylamine, n-propylamine, sec-propylamine, n-butyl amine, sec-butyl amine, i-butyl amine, tert-butyl amine, pentylamine, hexyl amine, heptylamine, octyl amine, decyl amine, lauryl amine, myristyl amine, 1,2-dimethylhexylamine, 3-pentylamine, 2-ethylhexylamine, allyl amine, aminoethanol, 1-aminopropanol, 2-aminopropanol, aminobutanol, aminopentanol, aminohexanol, 3-ethoxypropylamine, 3-propoxypropyl amine, 3-isopropoxypropylamine, 3-butoxypropylamine, 3-isobutoxypropyl amine, 3-(2-ethyl hexyloxy)propylamine, aminocyclopentane, aminocyclohexane, aminonorbornene, aminomethyl cyclohexane, aminobenzene, benzylamine, phenethyl amine, α-phenylethylamine, naphthylamine and furfurylamine;

primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl)ether, 1,2-bis-(3-aminopropoxy)ethane, 1,3-bis-(3-aminopropoxy)-2,2'-dimethylpropane, aminoethylethanolamine, 1,2-bisaminocyclohexane, 1,3-bisaminocyclohexane, 1,4-bisaminocyclohexane, 1,3-bisaminomethylcyclohexane, 1,4-bisaminomethylcyclohexane, 1,3-bisaminoethylcyclohexane, 1,4-bisaminoethylcyclohexane, 1,3-bisaminopropylcyclohexane, 1,4-bisaminopropylcyclohexane, hydrogenated 4,4'-diaminodiphenylmethane, 2-aminopiperidine, 4-aminopiperidine, 2-aminomethylpiperidine, 4-aminomethylpiperidine, 2-aminoethylpiperidine, 4-aminoethylpiperidine, N-aminoethylpiperidine, N-aminopropylpiperidine, N-amino ethylmorpholine, N-aminopropylmorpholine, isophoronediamine, menthanediamine, 1,4-bisaminopropylpiperazine, o-phenylenediamine, m-phenylenediamine, p-phenylenediamine, 2,4-tolylenediamine, 2,6-tolylenediamine, 2,4-toluenediamine, m-aminobenzylamine, 4-chloro-o-phenylenediamine, tetrachlorop-xylylenediamine, 4-methoxy-6-methyl-m-phenylenediamine, m-xylylenediamine, p-xylylenediamine, 1,5-naphthalenediamine, 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenylsulfone, 4,4'-diaminoditolylsulfone, methylenebis(o-chloroaniline), 3,9-bis(3-aminopropyl)2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperazine, N-aminopropylpiperazine, 1,4-bis(aminoethylpiperazine), 1,4-bis(aminopropylpiperazine), 2,6-diaminopyridine, and bis(3,4-diaminophenyl)sulfone;

secondary amines such as diethyl amine, dipropyl amine, di-n-butyl amine, di-sec-butyl amine, diisobutyl amine, di-n-pentylamine, di-3-pentylamine, dihexyl amine, octyl amine, di(2-ethylhexyl)amine, methylhexylamine, diallyl amine, pyrrolidine, piperidine, 2-picoline, 3-picoline, 4-picoline, 2,4-lupetidine, 2,6-lupetidine, 3,5-lupetidine, diphenyl amine, N-methylaniline, N-ethylaniline, dibenzylamine, methylbenzylamine, dinaphthyl amine, pyrrole, indoline, indole and morpholine;

secondary polyamines such as N,N'-dimethyl ethylene diamine, N,N'-dimethyl-1,2-diaminopropane, N,N'-dimethyl-1,3-diaminopropane, N,N-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethyl ethylene diamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane and tetramethyl guanidine;

tertiary amines such as trimethyl amine, triethyl amine, tri-n-propylamine, tri-iso-propylamine, tri-1,2-dimethylpropylamine, tri-3-methoxypropylamine, tri-n-butyl amine, tri-iso-butyl amine, tri-sec-butyl amine, tri-pentylamine, tri-3-pentylamine, tri-n-hexyl amine, tri-n-octyl amine, tri-2-ethylhexylamine, tri-dodecylamine, tri-lauryl amine, dicyclohexyl ethyl amine, cyclohexyl diethyl amine, tri-cyclohexylamine, N,N-dimethylhexylamine, N-methyl dihexyl amine, N,N-dimethylcyclohexylamine, N-methyl dicyclohexyl amine, N,N-diethyl ethanol amine, N,N-dimethyl ethanol amine, N-ethyl diethanol amine, triethanol amine, tribenzylamine, N,N-dimethylbenzylamine, diethyl benzylamine, triphenyl amine, N,N-dimethylamino-p-cresol, N,N-dimethylaminomethylphenol, 2-(N,N-dimethyl aminomethyl) phenol, N,N-dimethylaniline, N,N-diethylaniline, pyridine, quinoline, N-methylmorpholine, N-methyl piperidine and 2-(2-dimethyl aminoethoxy)-4-methyl-1,3,2-dioxabornane;

tertiary polyamines such as tetramethyl ethylene diamine, pyrazine, N,N'-dimethylpiperazine, N,N'-bis((2-hydroxy) propyl)piperazine, hexamethylene tetramine, N,N,N',N'-tetramethyl-1,3-butane amine, 2-dimethylamino-2-hydroxypropane, diethylamino ethanol, N,N,N-tris(3-dimethyl aminopropyl)amine, 2,4,6-tris(N,N-dimethyl aminomethyl) phenol and heptamethyl isobiguanide;

various imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cyanoethyl)-2-undecylimidazole, N-(2'-cyanoethyl)-2-phenylimidazole, 3,3-bis-(2-ethyl-4-methylimidazolyl)methane, adducts of alkylimidazoles and isocyanuric acid, and condensates of alkylimidazoles and formaldehyde; and amidines such as 1,8-diazabicyclo(5,4,0)undecene-7 and 1,5-diazabicyclo(4,3,0)nonene-5, 6-dibutylamino-1,8-diazabicyclo(5,4,0)undecene-7.

(2) Complexes of the amines of (1) with borane and boron trifluoride.

(3) Phosphines such as trimethylphosphine, triethylphosphine, tri-iso-propylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, tris(4-methylphenyl)phosphine, dimethylphenylphosphine, diethylphenylphosphine, dicyclohexylphenylphosphine, ethyldiphenylphosphine, diphenylcyclohexylphosphine, and chlorodiphenylphosphine.

(4) Quaternary ammonium salts such as tetramethyl ammonium chloride, tetramethyl ammonium bromide, tetramethyl ammonium acetate, tetraethyl ammonium chloride, tetraethyl ammonium bromide, tetraethyl ammonium acetate, tetra-n-butyl ammonium fluoride, tetra-n-butyl ammonium chloride, tetra-n-butyl ammonium bromide, tetra-n-butyl ammonium iodide, tetra-n-butyl ammonium acetate, tetra-n-butyl ammonium borohydride, tetra-n-butyl ammonium hexafluorophosphite, tetra-n-butyl ammonium hydrogen sulfite, tetra-n-butyl ammonium tetrafluoroborate, tetra-n-butyl ammonium tetraphenyl borate, tetra-n-butyl ammonium paratoluene sulfonate, tetra-n-hexyl ammonium chloride, tetra-n-hexyl ammonium bromide, tetra-n-hexyl ammonium acetate, tetra-n-octyl ammonium chloride, tetra-n-octyl ammonium bromide, tetra-n-octyl ammonium acetate, trimethyl-n-octyl ammonium chloride, trimethyl benzyl ammonium chloride, trimethyl benzyl ammonium bromide, triethyl-n-octyl ammonium chloride, triethyl benzyl ammonium chloride, triethyl benzyl ammonium bromide, tri-n-butyl-n-octyl ammonium chloride, tri-n-butyl benzyl ammonium fluoride, tri-n-butyl benzyl ammonium chloride, tri-n-butyl benzyl ammonium bromide, tri-n-butyl benzyl ammonium iodide, methyl triphenyl ammonium chloride, methyl triphenyl ammonium bromide, ethyl triphenyl ammonium chloride, ethyl triphenyl ammonium bromide, n-butyl triphenyl ammonium chloride, n-butyl triphenyl ammonium bromide, 1-methylpyridinium bromide, 1-ethyl pyridinium bromide, 1-n-butyl pyridinium bromide, 1-n-hexyl pyridinium bromide, 1-n-octyl pyridinium bromide, 1-n-dodecyl pyridinium bromide, 1-n-phenyl pyridinium bromide, 1-methyl picolinium bromide, 1-ethyl picolinium bromide, 1-n-butyl picolinium bromide, 1-n-hexyl picolinium bromide, 1-n-octyl picolinium bromide, 1-n-dodecyl picolinium bromide and 1-n-phenyl picolinium bromide.

(5) Phosphonium salts such as tetramethyl phosphonium chloride, tetramethyl phosphonium bromide, tetraethyl phosphonium chloride, tetraethyl phosphonium bromide, tetra-n-butyl phosphonium chloride, tetra-n-butyl phosphonium bromide, tetra-n-butyl phosphonium iodide, tetra-n-hexyl phosphonium bromide, tetra-n-octyl phosphonium bromide, methyl triphenyl phosphonium bromide, methyl triphenyl phosphonium iodide, ethyl triphenyl phosphonium bromide, ethyl triphenyl phosphonium iodide, n-butyl triphenyl phosphonium bromide, n-butyl triphenyl phosphonium iodide, n-hexyl triphenyl phosphonium bromide, n-octyl triphenyl phosphonium bromide, tetraphenyl phosphonium bromide, tetrakishydroxymethyl phosphonium chloride, tetrakishydroxymethyl phosphonium bromide, tetrakishydroxyethyl phosphonium chloride and tetrakishydroxybutyl phosphonium chloride.

(6) Sulfonium salts such as trimethyl sulfonium bromide, triethyl sulfonium bromide, tri-n-butyl sulfonium chloride, tri-n-butyl sulfonium bromide, tri-n-butyl sulfonium iodide, tri-n-butyl sulfonium tetrafluorobohrate, tri-n-hexyl sulfonium bromide, tri-n-octyl sulfonium bromide, triphenyl sulfonium chloride, triphenyl sulfonium bromide and triphenyl sulfonium iodide.

(7) Iodonium salts such as diphenyliodonium chloride, diphenyliodonium bromide, and diphenyliodonium iodide.

(8) Mineral acids such as hydrochloric acid, sulfuric acid, nitric acid, phosphoric acid, and carbonic acid, and their half esters.

(9) Lewis acids typified by boron trifluoride and etherate of boron trifluoride.

(10) Organic acids and their half esters.

(11) Silicic acid and tetrafluoroboric acid.

These compounds may be used alone, or a plurality thereof may be used in combination.

The polymerization by energy line irradiation is a method of forming a polymer by irradiation with an energy line (lights such as ultraviolet rays, near ultraviolet rays, visible light, near infrared rays, and infrared rays, and electron beam, etc.). Although the type of the energy line is not particularly limited, one that is preferred is a light, with ultraviolet rays being more preferable.

The generation source of the energy line is not particularly limited, and examples thereof include various light sources such as low-pressure mercury lamps, medium-pressure mercury lamps, high-pressure mercury lamps, ultrahigh-pressure mercury lamps, UV lamps, xenon lamps, carbon arc lamps, metal halide lamps, fluorescent lamps, tungsten lamps, argon ion lasers, helium-cadmium lasers, helium-neon lasers, krypton ion lasers, various semiconductor lasers, YAG lasers, excimer lasers, light-emitting diodes, CRT light sources, plasma light sources, and electron beam irradiators.

In performing polymerization by energy line irradiation, it may become effective means to add any of the following compounds as a photopolymerization promoter in order to accelerate the polymerization:

benzoins and benzoin alkyl ethers (benzoin, benzil, benzoin methyl ether, and benzoin isopropyl ether), acetophenones (acetophenone, 2,2-dimethoxy-2-phenylacetophenone, 2,2-diethoxy-2-phenylacetophenone, 1,1-dichloroacetophenone, 1-hydroxycyclohexyl phenyl ketone, 2-methyl-1-(4-(methylthio)phenyl)-2-morpholino-propan-1-one, and N,N-dimethylaminoacetophenone, etc.), anthraquinones (2-methylanthraquinone, 2-ethylanthraquinone, 2-tert-butylanthraquinone, 1-chloroanthraquinone, 2-amylanthraquinone, and 2-aminoanthraquinone, etc.), thioxanthones (2,4-dimethylthioxanthone, 2,4-diethylthioxanthone, 2-chlorothioxanthone, and 2,4-diisopropylthioxanthone, etc.), ketals (acetophenone dimethyl ketal and benzyl dimethyl ketal, etc.), benzophenones (benzophenone, methylbenzophenone, 4,4'-dichlorobenzophenone, and 4,4'-bisdiethylaminobenzophenone, etc.), xanthones, benzoic acid esters (ethyl 4-dimethylaminobenzoate and 2-(dimethylamino) ethyl benzoate, etc.), amines (triethylamine and triethanolamine, etc.), iodonium salt compounds, sulfonium salt compounds, ammonium salt compounds, phosphonium salt compounds, arsonium salt compounds, stibonium salt compounds, oxonium salt compounds, selenonium salt compounds, and stannonium salt compounds. These may be used alone, or a plurality thereof may be used in combination.

A chain transfer agent (D) may be further contained in the composition comprising (A), (B), and (C). By using the chain transfer agent (D), the obtained polymer and cured product have a tendency that volatilized matter during being preserved for a long period under high temperature is further reduced and void formation during molding by melt processing or the pollution or corrosion of a metal member in the vicinity of the polymer or cured product can be further suppressed.

Although the chain transfer agent (D) is not particularly limited as long as being one generally used, it is preferable to be at least one compound selected from the group consisting of cyclic ester compounds, cyclic carbonate compounds, cyclic siloxane compounds, and hydroxy group-containing compounds. These may be used alone, or a plurality thereof may be used in combination. It is more preferable that the chain transfer agent (D) should be at least one compound selected from the group consisting of cyclic ester compounds, cyclic carbonate compounds, and hydroxy group-containing compounds because the transparency of the obtained polymer may be reduced, depending on the selection of the episulfide compound (C). It is further preferable that the chain transfer agent (D) should be a hydroxy group-containing compound because there is a tendency that the polymerization time of the episulfide compound (C) can be further shortened.

(Cyclic Ester Compound)

The cyclic ester compound is not particularly limited as long as being a compound having an ester group in a cyclic structure and can be specifically selected from ethano-2-lactone, propano-2-lactone, propano-3-lactone, butano-2-lactone, butano-3-lactone, butano-4-lactone, 3-methyl-butano-4-lactone, pentano-2-lactone, pentano-3-lactone, pentano-4-lactone, pentano-5-lactone, 4-methyl-pentano-4-lactone, hexano-2-lactone, hexano-3-lactone, hexano-4-lactone, hexano-5-lactone, hexano-6-lactone, heptano-2-lactone, heptano-3-lactone, heptano-4-lactone, heptano-5-lactone, heptano-6-lactone, heptano-7-lactone, octano-2-lactone, octano-3-lactone, octano-4-lactone, octano-5-lactone, octano-6-lactone, octano-7-lactone, octano-8-lactone, nonano-2-lactone, nonano-3-lactone, nonano-4-lactone, nonano-5-lactone, nonano-6-lactone, nonano-7-lactone, nonano-8-lactone, nonano-9-lactone, decano-2-lactone, decano-3-lactone, decano-4-lactone, decano-5-lactone, decano-6-lactone, decano-7-lactone, decano-8-lactone, decano-9-lactone, decano-10-lactone, undecano-2-lactone, undecano-3-lactone, undecano-4-lactone, undecano-5-lactone, undecano-6-lactone, undecano-7-lactone, undecano-8-lactone, undecano-9-lactone, undecano-10-lactone, undecano-11-lactone, dodecano-2-lactone, dodecano-3-lactone, dodecano-4-lactone, dodecano-5-lactone, dodecano-6-lactone, dodecano-7-lactone, dodecano-8-lactone, dodecano-9-lactone, dodecano-10-lactone, dodecano-11-lactone, dodecano-12-lactone, tridecano-2-lactone, tridecano-3-lactone, tridecano-4-lactone, tridecano-5-lactone, tridecano-6-lactone, tridecano-7-lactone, tridecano-8-lactone, tridecano-9-lactone, tridecano-10-lactone, tridecano-11-lactone, tridecano-12-lactone, tridecano-13-lactone, tetradecano-2-lactone, tetradecano-3-lactone, tetradecano-4-lactone, tetradecano-5-lactone, tetradecano-6-lactone, tetradecano-7-lactone, tetradecano-8-lactone, tetradecano-9-lactone, tetradecano-10-lactone, tetradecano-11-lactone, tetradecano-12-lactone, tetradecano-13-lactone, tetradecano-14-lactone, pentadecano-2-lactone, pentadecano-3-lactone, pentadecano-4-lactone, pentadecano-5-lactone, pentadecano-6-lactone, pentadecano-7-lactone, pentadecano-8-lactone, pentadecano-9-lactone, pentadecano-10-lactone, pentadecano-11-lactone, pentadecano-12-lactone, pentadecano-13-lactone, pentadecano-14-lactone, pentadecano-15-lactone, hexadecano-2-lactone, hexadecano-3-lactone, hexadecano-4-lactone, hexadecano-5-lactone, hexadecano-6-lactone, hexadecano-7-lactone, hexadecano-8-lactone, hexadecano-9-lactone, hexadecano-10-lactone, hexadecano-11-lactone, hexadecano-12-lactone, hexadecano-13-lactone, hexadecano-14-lactone, hexadecano-15-lactone, hexadecano-16-lactone.

Among those described above, it is preferable that the cyclic ester compound should be at least one compound selected from the following group because there is a tendency that residues of the chain transfer agent (D) in the polymer or cured product are suppressed and/or increase in the polymerization time of the episulfide compound (C) is suppressed:

butano-4-lactone, pentano-4-lactone, pentano-5-lactone, hexano-4-lactone, hexano-6-lactone, heptano-4-lactone, heptano-7-lactone, octano-4-lactone, octano-8-lactone, decano-10-lactone, dodecano-12-lactone, tetradecano-14-lactone, hexadecano-16-lactone.

One that is further preferred is at least one compound selected from the following group: butano-4-lactone, pentano-4-lactone, and hexano-4-lactone.

(Cyclic Carbonate Compound)

The cyclic carbonate compound is not particularly limited as long as being a compound having a carbonate group in a cyclic structure and can be specifically selected from ethylene carbonate, propylene carbonate, butylene carbonate, pentylene carbonate, hexylene carbonate, heptylene carbonate, octylene carbonate, nonylene carbonate, decylene carbonate, undecylene carbonate, dodecylene carbonate, tridecylene carbonate, tetradecylene carbonate, pentadecylene carbonate, hexadecylene carbonate, propyl-1,3-dioxolan-2-one, butyl-1,3-dioxolan-2-one, pentyl-1,3-dioxolan-2-one, hexyl-1,3-dioxolan-2-one, cyclohexyl-1,3-dioxolan-2-one, 1,3-dioxan-2-one, methyl-1,3-dioxan-2-one, dimethyl-1,3-dioxan-2-one, ethyl-1,3-dioxan-2-one, propyl-1,3-dioxan-2-one, butyl-1,3-dioxan-2-one, pentyl-1,3-dioxan-2-one, hexyl-1,3-dioxan-2-one, cyclohexyl-1,3-dioxan-2-one.

Among those described above, it is preferable that the cyclic carbonate compound should be at least one compound selected from the following group because there is a tendency that residues of the chain transfer agent (D) in the polymer or cured product are suppressed and/or increase in the polymerization time of the episulfide compound (C) is suppressed:

ethylene carbonate, propylene carbonate, butylene carbonate, pentylene carbonate, hexylene carbonate, propyl-1,3-dioxolan-2-one, butyl-1,3-dioxolan-2-one, 1,3-dioxan-2-one, dimethyl-1,3-dioxan-2-one, ethyl-1,3-dioxan-2-one, propyl-1,3-dioxan-2-one, butyl-1,3-dioxan-2-one.

One that is further preferred is at least one compound selected from the following group: ethylene carbonate, propylene carbonate, butylene carbonate, 1,3-dioxan-2-one, and dimethyl-1,3-dioxan-2-one.

(Cyclic Siloxane Compound)

The cyclic siloxane compound is not particularly limited as long as being a compound in which a cyclic structure is formed through a siloxane bond and can be specifically selected from trimethyl cyclotrisiloxane, triethyl cyclotrisiloxane, tripropyl cyclotrisiloxane, tributyl cyclotrisiloxane, tripentyl cyclotrisiloxane, trihexyl cyclotrisiloxane, triheptyl cyclotrisiloxane, trioctyl cyclotrisiloxane, trinonyl cyclotrisiloxane, tridecyl cyclotrisiloxane, triphenyl cyclotrisiloxane, hexamethyl cyclotrisiloxane, hexaethyl cyclotrisiloxane, hexapropyl cyclotrisiloxane, hexabutyl cyclotrisiloxane, hexapentyl cyclotrisiloxane, hexahexyl cyclotrisiloxane, hexaheptyl cyclotrisiloxane, hexaoctyl cyclotrisiloxane, hexanonyl cyclotrisiloxane, hexadecyl cyclotrisiloxane, hexaphenyl cyclotrisiloxane, trimethyl triphenyl cyclotrisiloxane, tetramethyl cyclotetrasiloxane, tetraethyl cyclotetrasiloxane, tetrapropyl cyclotetrasiloxane, tetrabutyl cyclotetrasiloxane, tetrapentyl cyclotetrasiloxane, tetrahexyl cyclotetrasiloxane, tetraheptyl cyclotetrasiloxane, tetraoctyl cyclotetrasiloxane, tetranonyl cyclotetrasiloxane, tetradecyl cyclotetrasiloxane, tetraphenyl cyclotetrasiloxane, octamethyl cyclotetrasiloxane, octaethyl cyclotetrasiloxane, octapropyl cyclotetrasiloxane, octabutyl cyclotetrasiloxane, octapentyl cyclotetrasiloxane, octahexyl cyclotetrasiloxane, octaheptyl cyclotetrasiloxane, octaoctyl cyclotetrasiloxane, octanonyl cyclotetrasiloxane, octadecyl cyclotetrasiloxane, octaphenyl cyclotetrasiloxane, tetramethyl tetraphenyl cyclotetrasiloxane, pentamethyl cyclopentasiloxane, pentaethyl cyclopentasiloxane, pentapropyl cyclopentasiloxane, pentabutyl cyclopentasiloxane, pentapentyl cyclopentasiloxane, pentahexyl cyclopentasiloxane, pentaheptyl cyclopentasiloxane, pentaoctyl cyclopentasiloxane, pentanonyl cyclopentasiloxane, pentadecyl cyclopentasiloxane, pentaphenyl cyclopentasiloxane, decamethyl cyclopentasiloxane, decaethyl cyclopentasiloxane, decapropyl cyclopentasiloxane, decabutyl cyclopentasiloxane, decapentyl cyclopentasiloxane, decahexyl cyclopentasiloxane, decaheptyl cyclopentasiloxane, decaoctyl cyclopentasiloxane, decanonyl cyclopentasiloxane, decadecyl cyclopentasiloxane, decaphenyl cyclopentasiloxane, pentamethyl pentaphenyl cyclopentasiloxane.

Among those described above, it is preferable that the cyclic siloxane compound should be at least one compound selected from the following group because there is a tendency that residues of the chain transfer agent (D) in the polymer or cured product are suppressed and/or increase in the polymerization time of the episulfide compound (C) is suppressed:

hexamethyl cyclotrisiloxane, hexaethyl cyclotrisiloxane, hexapropyl cyclotrisiloxane, hexabutyl cyclotrisiloxane, hexapentyl cyclotrisiloxane, hexahexyl cyclotrisiloxane, trimethyl triphenyl cyclotrisiloxane, octamethyl cyclotetrasiloxane, octaethyl cyclotetrasiloxane, octapropyl cyclotetrasiloxane, octabutyl cyclotetrasiloxane, octapentyl cyclotetrasiloxane, octahexyl cyclotetrasiloxane, tetramethyl tetraphenyl cyclotetrasiloxane, decamethyl cyclopentasiloxane, decaethyl cyclopentasiloxane, decapropyl cyclopentasiloxane, decabutyl cyclopentasiloxane, decapentyl cyclopentasiloxane, decahexyl cyclopentasiloxane, pentamethyl pentaphenyl cyclopentasiloxane.

One that is further preferred is at least one compound selected from the following group: hexamethylcyclotrisiloxane, octamethylcyclotetrasiloxane, and decamethylcyclopentasiloxane.

(Hydroxy Group-Containing Compound)

The hydroxy group-containing compound is not particularly limited as long as being a compound having a hydroxy group in a structure and can be specifically selected from methanol, ethanol, 1-propanol, 2-propanol, cyclopropanol, methyl cyclopropanol, dimethyl cyclopropanol, ethyl cyclopropanol, propyl cyclopropanol, butyl cyclopropanol, 1-butanol, 2-butanol, tert-butanol, cyclobutanol, methyl cyclobutanol, dimethyl cyclobutanol, ethyl cyclobutanol, propyl cyclobutanol, butyl cyclobutanol, 1-pentanol, 2-pentanol, 3-pentanol, cyclopentanol, methyl cyclopentanol, dimethyl cyclopentanol, ethyl cyclopentanol, propyl cyclopentanol, butyl cyclopentanol, methyl-1-butanol, methyl-2-butanol, dimethyl-1-butanol, dimethyl-2-butanol, ethyl-1-butanol, ethyl-2-butanol, 1-hexanol, 2-hexanol, 3-hexanol, cyclohexanol, methylcyclohexanol, dimethylcyclohexanol, ethylcyclohexanol, propyl cyclohexanol, butyl cyclohexanol, methyl-1-pentanol, methyl-2-pentanol, methyl-3-pentanol, dimethyl-1-pentanol, dimethyl-2-pentanol, dimethyl-3-pentanol, ethyl-1-pentanol, ethyl-2-pentanol, ethyl-3-pentanol, 1-heptanol, 2-heptanol, 3-heptanol, cycloheptanol, methyl cycloheptanol, dimethyl cycloheptanol, ethyl cycloheptanol, methyl-1-hexanol, methyl-2-hexanol, methyl-3-hexanol, dimethyl-1-hexanol, dimethyl-2-hexanol, ethyl-1-hexanol, ethyl-2-hexanol, ethyl-3-hexanol, 1-octanol, 2-octanol, 3-octanol, 4-octanol, cyclooctanol, methyl cyclooctanol, dimethyl cyclooctanol, ethyl cyclooctanol, nonanol, cyclononanol, decanol, cyclodecanol, undecanol, dodecanol, tridecanol, tetradecanol, pentadecanol, hexadecanol, ethylene glycol, 1,2-propanediol, 1,3-propanediol, methyl propane diol, dimethyl propane diol, cyclopropane diol, 1,2-butanediol, 1,3-butanediol, 1,4-butanediol, 2,3-butanediol, methyl butane diol, dimethyl butane diol, cyclobutane diol, methyl cyclobutane diol, dimethyl cyclobutane diol, ethyl cyclobutane diol, propyl cyclobutane diol, butyl cyclobutane diol, 1,2-pentanediol, 1,3-pentanediol, 1,4-pentanediol, 1,5-pentanediol, methyl pentane diol, dimethyl pentane diol, cyclopentanediol, methyl cyclopentane diol, dimethyl cyclopentane diol, ethyl cyclopentane diol, propyl cyclopentane diol, butyl cyclopentane diol, 1,2-hexanediol, 1,3-hexanediol, 1,4-hexanediol, 1,5-hexanediol, 1,6-hexanediol, methyl hexane diol, dimethyl hexane diol, cyclohexanediol, methyl cyclohexane diol, dimethyl cyclohexane diol, ethyl cyclohexane diol, propyl cyclohexane diol, butyl cyclohexane diol, 1,2-heptanediol, 1,3-heptanediol, 1,4-heptanediol, 1,5-heptanediol, 1,6-heptanediol, 1,7-heptanediol, cycloheptane diol, methyl cycloheptane diol, dimethyl cycloheptane diol, 1,2-octanediol, 1,3-octanediol, 1,4-octanediol, 1,5-octanediol, 1,6-octanediol, 1,7-octanediol, 1,8-octanediol, cyclooctanediol, methyl cyclooctane diol, dimethyl cyclooctane diol, nonanediol, cyclononane diol, decanediol, cyclodecane diol, undecane diol, dodecanediol, tridecane diol, tetradecanediol, pentadecanediol, hexadecanediol, glycerol, erythritol, xylitol, mannitol, volemitol, glucose, sucrose, diethylene glycol, triethylene glycol, tetraethylene glycol, pentaethylene glycol, hexaethylene glycol, octaethylene glycol, dodecaethylene glycol, methylal, PEG200, PEG300, PEG400, PEG600, PEG1000, PEG1500, PEG1540, PEG4000, PEG6000, polycarbonate diol, polyester-8-hydroxy-1-acetylene bis-MPA dendron generation 3 (product name, manufactured by Sigma-Aldrich Corp.), polyester-16-hydroxy-1-acetylene bis-MPA dendron generation 4 (product name, manufactured by Sigma-Aldrich Corp.), polyester-32-hydroxy-1-acetylene bis-MPA dendron generation 5 (product name, manufactured by Sigma-Aldrich Corp.), polyester-8-hydroxy-1-carboxyl bis-MPA dendron generation 3 (product name, manufactured by Sigma-Aldrich Corp.), polyester-16-hydroxy-1-carboxyl bis-MPA dendron generation 4 (product name, manufactured by Sigma-Aldrich Corp.), polyester-32-hydroxy-1-carboxyl bis-MPA dendron generation 5 (product name, manufactured by Sigma-Aldrich Corp.), hyperbranched bis-MPA polyester-16-hydroxyl, generation 2 (product name, manufactured by Sigma-Aldrich Corp.), and hyperbranched bis-MPA polyester-32-hydroxyl, generation 3 (product name, manufactured by Sigma-Aldrich Corp.).

Among those described above, it is preferable that the hydroxy group-containing compound should be at least one compound selected from the following group because there is a tendency that residues of the chain transfer agent (D) in the polymer or cured product are suppressed and/or increase in the polymerization time of the episulfide compound (C) is suppressed:

methanol, ethanol, 1-propanol, 2-propanol, 1-butanol, 2-butanol, 1-pentanol, 2-pentanol, 3-pentanol, cyclopentanol, 1-hexanol, 2-hexanol, 3-hexanol, cyclohexanol, ethylene glycol, 1,2-propanediol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, cyclopentanediol, 1,2-hexanediol, 1,3-hexanediol, 1,4-hexanediol, 1,5-hexanediol, 1,6-hexanediol, cyclohexanediol, glycerol, methylal.

One that is further preferred is at least one compound selected from the following group:

2-propanol, 2-butanol, 2-pentanol, 3-pentanol, cyclopentanol, 2-hexanol, 3-hexanol, cyclohexanol, ethylene glycol, 1,2-propanediol, 1,3-propanediol, 1,2-butanediol, 1,3-butanediol, 1,4-butanediol, 2,3-butanediol, methylal.

As for the mixing ratio between the chain transfer agent (D) and the episulfide compound (C), it is preferable that the ratio between the molar number (mol) of the (D) and the molar number (mol) of episulfide group(s) contained in the (C) should be 1:10 to 1:10000.

Given the molar number (mol) of the chain transfer agent (D) to be 1, it is preferable that the molar number (mol) of episulfide group(s) contained in (C) should be 10 or more because there is a tendency that residues of the chain transfer agent (D) in the polymer or cured product are suppressed and volatilized matter is further reduced while the polymer and cured product obtained by polymerizing the episulfide compound (C) are preserved for a long period under high temperature. Given the molar number (mol) of the chain transfer agent (D) to be 1, it is more preferable that the molar number (mol) of episulfide group(s) contained in (C) should be 20 or more because there is a tendency that the mechanical strength of the cured product formed from the episulfide compound (C) becomes better. From a similar viewpoint, given the molar number (mol) of the chain transfer agent (D) to be 1, it is further preferable that the molar number (mol) of episulfide group(s) contained in (C) should be 50 or more.

Given the molar number (mol) of the chain transfer agent (D) to be 1, it is preferable that the molar number (mol) of episulfide group(s) contained in (C) should be 10000 or less because there is a tendency that volatilized matter is further reduced while the polymer and cured product obtained by polymerizing the episulfide compound (C) are preserved for a long period under high temperature. From a similar viewpoint, given the molar number (mol) of the chain transfer agent (D) to be 1, it is more preferable that the molar number (mol) of episulfide group(s) contained in (C) should be 2000 or less, with 1000 or less being further preferable. Although the reason is uncertain why the chain transfer agent (D) is further contained in the composition comprising (A), (B), and (C), whereby there is a tendency that volatilized matter is reduced while the obtained polymer and cured product are preserved for a long period under high temperature, there may be the possibility that the depolymerization of the polymer and cured product is suppressed by the chain transfer agent (D).

The mixing ratio between the chain transfer agent (D) and the episulfide compound (C) can also be represented by the following formula (19):

$$\text{Index } \gamma=\alpha d/\alpha t\times 100 \quad (19)$$

αd: molar number (mol) of the chain transfer agent
αt: molar number (mol) of episulfide group(s) contained in the episulfide compound (C)

When the ratio between the molar number (mol) of the chain transfer agent (D) and the molar number (mol) of episulfide group(s) contained in the episulfide compound (C) is 1:10, index γ=10.

When the ratio between the molar number (mol) of the chain transfer agent (D) and the molar number (mol) of episulfide group(s) contained in the episulfide compound (C) is 1:20, index γ=5.

When the ratio between the molar number (mol) of the chain transfer agent (D) and the molar number (mol) of episulfide group(s) contained in the episulfide compound (C) is 1:50, index γ=2.

When the ratio between the molar number (mol) of the chain transfer agent (D) and the molar number (mol) of episulfide group(s) contained in the episulfide compound (C) is 1:10000, index γ=0.01.

When the ratio between the molar number (mol) of the chain transfer agent (D) and the molar number (mol) of episulfide group(s) contained in the episulfide compound (C) is 1:2000, index γ=0.05.

When the ratio between the molar number (mol) of the chain transfer agent (D) and the molar number (mol) of episulfide group(s) contained in the episulfide compound (C) is 1:1000, index γ=0.1.

Although a method for preparing the composition comprising (A), (B), (C), and (D) is not particularly limited as long as being a method generally used, examples thereof include a method of simultaneously adding (A), (B), (C), and (D), and a method of mixing at least two components arbitrarily selected from among (A), (B), (C), and (D) and then adding the mixture to the remaining component(s) and/or adding the remaining component(s) thereto. Among these, a method of preparing a mixture containing (A) and (B) and then adding it to the remaining components (C) and (D) and/or adding the remaining components thereto is preferable because there is a tendency that the composition can be stably prepared and stability as a composition is also excellent.

The polymer and cured product obtained by polymerizing the composition can appropriately contain various organic resins, inorganic fillers, colorants, leveling agents, lubricants, surfactants, silicone-based compounds, reactive diluents, nonreactive diluents, antioxidants, and light stabilizers, etc. according to the purpose. In addition, the polymer or cured product may be supplemented with substances supplied as general additives for resins (plasticizers, flame retardants, stabilizers, antistatic agents, impact modifiers, foaming agents, antimicrobial/fungicidal agents, conductive fillers, antifog additives, cross-linking agents, etc.).

The organic resins are not particularly limited, and examples thereof include acrylic resins, polyester resins, and polyimide resins.

Examples of the inorganic fillers include silicas (crushed fused silica, crushed crystalline silica, spherical silica, fumed silica, colloidal silica, and precipitated silica, etc.), silicon carbide, silicon nitride, boron nitride, calcium carbonate, magnesium carbonate, barium sulfate, calcium sulfate, mica, talc, clay, aluminum oxide, magnesium oxide, zirconium oxide, titanium oxide, aluminum hydroxide, magnesium hydroxide, calcium silicate, aluminum silicate, lithium aluminum silicate, zirconium silicate, barium titanate, glass fiber, carbon fiber, and molybdenum disulfide. Among these, silicas, calcium carbonate, aluminum oxide, zirconium oxide, titanium oxide, aluminum hydroxide, calcium silicate, and barium titanate are preferable, and furthermore, silicas are more preferable in consideration of the physical properties of the cured product. These inorganic fillers may be used alone or in combination of a plurality thereof.

The colorant is not particularly limited as long as being a substance used for the purpose of coloring and can be selected from, for example, phthalocyanine, azo, disazo, quinacridone, anthraquinone, flavanthrone, perinone, perylene, dioxazine, condensed azo, and azomethine-based various organic dyes, and inorganic pigments such as titanium oxide, lead sulfate, chrome yellow, zinc yellow, chrome vermilion, iron red, cobalt purple, iron blue, ultramarine, carbon black, chrome green, chromium oxide, and cobalt green. These colorants may be used alone or in combination of a plurality thereof.

The leveling agent is not particularly limited and can be selected from, for example, oligomers of molecular weights 4000 to 12000 formed from acrylates such as ethyl acrylate, butyl acrylate, and 2-ethylhexyl acrylate, epoxidized soybean fatty acid, epoxidized abietyl alcohol, hydrogenated castor oil, and titanium-based coupling agents. These leveling agents may be used alone or in combination of a plurality thereof.

The lubricant is not particularly limited and can be selected from: hydrocarbon-based lubricants such as paraffin wax, microwax, and polyethylene wax; higher fatty acid-based lubricants such as lauric acid, myristic acid, palmitic acid, stearic acid, arachidic acid, and behenic acid; higher fatty acid amide-based lubricants such as stearylamide, palmitylamide, oleylamide, methylenebisstearamide, and ethylenebisstearamide; higher fatty acid ester-based lubricants such as hydrogenated castor oil, butyl stearate, ethylene glycol monostearate, and pentaerythritol (mono-, di-, tri-, or tetra-) stearate; alcohol-based lubricants such as cetyl alcohol, stearyl alcohol, polyethylene glycol, and polyglycerol; metallic soaps which are salts of metals such as magnesium, calcium, cadmium, barium, zinc, and lead of lauric acid, myristic acid, palmitic acid, stearic acid, arachidic acid, behenic acid, ricinoleic acid, and naphthenic acid, etc.; and natural waxes such as carnauba wax, candelilla wax, beeswax, and montan wax. These lubricants may be used alone or in combination of a plurality thereof.

The surfactants refer to amphoteric substances having a hydrophobic group that does not have affinity for a solvent and a philic group (usually, a hydrophilic group) that has affinity for a solvent in the molecule. The types of the surfactants are not particularly limited, and examples thereof include silicon-based surfactants and fluorine-based surfactants. The surfactants may be used alone or in combination of a plurality thereof.

The silicone-based compounds are not particularly limited, and examples thereof include silicone resins, silicone condensates, silicone partial condensates, silicone oil, silane coupling agents, silicone oil, and polysiloxane. The silicone compounds may be modified by introducing organic groups both ends, either end, or side chains thereof. A method for modifying the silicone-based compounds is not particularly limited, and examples thereof include amino modification, epoxy modification, alicyclic epoxy modification, carbinol modification, methacrylic modification, polyether modification, mercapto modification, carboxyl modification, phenol modification, silanol modification, polyether modification, polyether•methoxy modification, and diol modification.

The reactive diluent is not particularly limited and can be selected from, for example, alkyl glycidyl ether, monoglycidyl ether of alkylphenol, neopentyl glycol diglycidyl ether, 1,6-hexanediol diglycidyl ether, alkanoic acid glycidyl ester, ethylene glycol diglycidyl ether, and propylene glycol diglycidyl ether.

The nonreactive diluent is not particularly limited and can be selected from, for example, high-boiling solvents such as benzyl alcohol, butyl diglycol, and propylene glycol monomethyl ether.

The antioxidant is not particularly limited, but can be selected from, for example, phenol-based antioxidants, phosphorus-based antioxidants, sulfur-based antioxidants, and amine-based antioxidants. These may be used alone, or a plurality thereof may be used in combination. Specific examples of the antioxidant include the following ones (1) to (4):

(1) Phenol-based antioxidants: for example, the following alkylphenols, hydroquinones, thioalkyls or thioaryls, bisphenols, benzyl compounds, triazines, esters of β-(3,5-di-tert-butyl-4-hydroxyphenyl)propionic acid and monohydric or polyhydric alcohols, esters of β-(5-tert-butyl-4-hydroxy-3-methylphenyl)propionic acid and monohydric or polyhydric alcohols, esters of β-(3,5-dicyclohexyl-4-hydroxyphenyl) propionic acid and monohydric Or polyhydric alcohols, esters of 3,5-di-tert-butyl-4-hydroxyphenylacetic acid and monohydric or polyhydric alcohols, amides of β-(3,5-di-tert-butyl-4-hydroxyphenyl)propionic acid, and vitamins.

(1-1) Alkylphenols: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols having linear or branched side chains (for example, 2,6-di-nonyl-4-methylphenol), 2,4-dimethyl-6-(1'-methylundecan-1'-yl)phenol, 2,4-dimethyl-6-(1'-methylheptadecan-1'-yl)phenol, 2,4-dimethyl-6-(1'-methyltridecan-1'-yl)phenol and their mixtures, 4-hydroxylauranilide, 4-hydroxystearanilide, and octyl N-(3,5-di-tert-butyl-4-hydroxyphenyl)carbamate.

(1-2) Hydroquinones: 2,6-di-tert-butyl-4-methoxyphenol, 2,5-di-tert-butyl hydroquinone, 2,5-di-tert-amyl hydroquinone, 2,6-diphenyl-4-octadecyl oxyphenol, 2,6-di-tert-butyl hydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate.

(1-3) Thioalkyls or thioaryls: 2,4-dioctyl thiomethyl-6-tert-butylphenol, 2,4-dioctyl thiomethyl-6-methylphenol, 2,4-dioctyl thiomethyl-6-ethylphenol, 2,6-di-dodecyl thiomethyl-4-nonylphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amyl phenol) and 4,4'-bis(2,6-dimethyl-4-hydroxyphenyl)disulfide.

(1-4) Bisphenols: 2,2'-methylene bis(6-tert-butyl-4-methylphenol), 2,2'-methylene bis(6-tert-butyl-4-ethylphenol), 2,2'-methylene bis[4-methyl-6-(α-methylcyclohexyl)phenol], 2,2'-methylene bis(4-methyl-6-cyclohexylphenol), 2,2'-methylene bis(6-nonyl-4-methylphenol), 2,2'-methylene bis(4,6-di-tert-butylphenol), 2,2'-ethylidene bis(4,6-di-tert-butylphenol), 2,2'-ethylidene bis(6-tert-butyl-4-isobutylphenol), 2,2'-methylene bis[6-(α-methylbenzyl)-4-nonylphenol], 2,2'-methylene bis[6-(α,α-dimethylbenzyl)-4-nonylphenol], 4,4'-methylene bis(2,6-di-tert-butylphenol), 4,4'-methylene bis(6-tert-butyl-2-methylphenol), 1,1-bis(5-tert-butyl-4-hydroxy-2-methyl phenyl)butane, 2,6-bis(3-tert-butyl-5-methyl-2-hydroxybenzyl)-4-methylphenol, 1,1,3-tris(5-tert-butyl-4-hydroxy-2-methyl phenyl)butane, 1,1-bis(5-tert-butyl-4-hydroxy-2-methyl phenyl)-3-n-dodecyl mercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methyl phenyl] terephthalate, 1,1-bis(3,5-dimethyl-2-hydroxyphenyl) butane, 2,2-bis(3,5-di-tert-butyl-4-hydroxyphenyl)propane, 2,2-bis(5-tert-butyl-4-hydroxy-2-methyl phenyl)-4-n-dodecyl mercaptobutane and 1,1,5,5-tetra(5-tert-butyl-4-hydroxy-2-methyl phenyl)pentane.

(1-5) Benzyl compounds: 3,5,3',5'-tetra-tert-butyl-4,4'-dihydroxydibenzyl ether, octadecyl-4-hydroxy-3,5-dimethyl benzyl mercaptoacetate, tridecyl-4-hydroxy-3,5-di-tert-butyl benzyl mercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl-3,5-di-tert-butyl-4-hydroxybenzyl mercaptoacetate, dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecyl mercaptoethyl-2,2-bis(3,5-di-tert-butyl-4-hydroxybenzyl)malonate, bis[4-(1,1,3,3-tetramethyl butyl)phenyl]-2,2-bis(3,5-di-tert-butyl-4-hydroxybenzyl)malonate, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene and 2,4,6-tris(3,5-di-tert-butyl-4-hydroxybenzyl)phenol.

(1-6) Triazines: 2,4-bis(octyl mercapto)-6-(3,5-di-tert-butyl-4-hydroxyanilino)-1,3,5-triazine, 2-octyl mercapto-4,6-bis(3,5-di-tert-butyl-4-hydroxyanilino)-1,3,5-triazine, 2-octyl mercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenyl ethyl)-1,3,5-triazine, 1,3,5-tris(3,5-di-tert-butyl-4-hydroxyphenyl propionyl)-hexahydro-1,3,5-triazine and 1,3,5-tris(3,5-dicyclohexyl-4-hydroxybenzyl)isocyanurate.

(1-7) Esters of β-(3,5-di-tert-butyl-4-hydroxyphenyl)propionic acid and monohydric or polyhydric alcohols: esters of β-(3,5-di-tert-butyl-4-hydroxyphenyl)propionic acid and monohydric or polyhydric alcohols selected from methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2.2.2]octane, etc.

(1-8) Esters of β-(5-tert-butyl-4-hydroxy-3-methylphenyl) propionic acid and monohydric or polyhydric alcohols: esters of β-(5-tert-butyl-4-hydroxy-3-methylphenyl)propionic acid and monohydric or polyhydric alcohols selected from methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and 3,9-bis[2-{3-(3-tert-butyl-4-hydroxy-5-methylphenyl)propionyloxy}-1,1-dimethylethyl]-2,4,8,10-tetraoxaspiro[5.5]undecane, etc.

(1-9) Esters of β-(3,5-dicyclohexyl-4-hydroxyphenyl)propionic acid and monohydric or polyhydric alcohols: esters of β-(3,5-dicyclohexyl-4-hydroxyphenyl)propionic acid and monohydric or polyhydric alcohols selected from methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2.2.2]octane, etc.

(1-10) Esters of 3,5-di-tert-butyl-4-hydroxyphenylacetic acid and monohydric or polyhydric alcohols: esters of 3,5-di-tert-butyl-4-hydroxyphenylacetic acid and monohydric or polyhydric alcohols selected from methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2.2.2]octane.

(1-11) Amides of β-(3,5-di-tert-butyl-4-hydroxyphenyl) propionic acid: N,N'-bis(3,5-di-tert-butyl-4-hydroxyphenylpropionyl)hexamethylenediamide, N,N'-bis(3,5-di-tert-butyl-4-hydroxyphenylpropionyl)trimethylendiamide, N,N-bis(3,5-di-tert-butyl-4-hydroxyphenylpropionyl)hydrazide, and N,N'-bis[2-(3-[3,5-di-tert-butyl-4-hydroxyphenyl]propionyloxy)ethyl]oxamide.

(1-12) Vitamins: α-tocopherol, β-tocopherol, γ-tocopherol, δ-tocopherol and their mixtures, tocotrienol, and ascorbic acid.

(2) Phosphorus-based antioxidants: the following phosphonates, phosphites, and oxaphosphaphenanthrenes.

(2-1) Phosphonates: dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, tetrakis(2,4-di-tert-butylphenyl)-4,4'-biphenylene diphosphonate, and calcium salt of monoethyl ester of 3,5-di-tert-butyl-4-hydroxybenzylphosphonic acid.

(2-2) Phosphites: trioctylphosphite, trilaurylphosphite, tridecylphosphite, octyldiphenylphosphite, tris(2,4-di-tert-butylphenyl)phosphite, triphenylphosphite, tris(butoxyethyl) phosphite, tris(nonylphenyl)phosphite, distearyl pentaerythritol diphosphite, tetra(tridecyl)-1,1,3-tris(2-methyl-5-tert-butyl-4-hydroxyphenyl)butaned iphosphite, tetra(C12 to C15 mixed alkyl)-4,4'-isopropylidenediphenyldiphosphite, tetra(tridecyl)-4,4'-butylidenebis(3-methyl-6-tert-butylphenol) diphosphite, tris(3,5-di-tert-butyl-4-hydroxyphenyl)phosphite, tris(mono and di mixed nonylphenyl)phosphite, hydrogenated 4,4'-isopropylidenediphenol polyphosphite, bis(octylphenyl)-bis[4,4'-butylidenebis(3-methyl-6-tert-butylphenol)]-1,6-hexanedioldiphosphite, phenyl-4,4'-isopropylidenediphenol-pentaerythritol diphosphite, bis(2,4-di-tert-butylphenyl)pentaerythritol diphosphite, bis(2,6-di-tert-butyl-4-methylphenyl)pentaerythritol diphosphite, tris[4,4'-isopropylidenebis(2-tert-butylphenol)]phosphite, phenyldiisodecylphosphite, di(nonylphenyl)pentaerythritol diphosphite), tris(1,3-di-stearoyloxyisopropyl)phosphite, and 4,4'-isopropylidenebis(2-tert-butylphenol)-di(nonylphenyl)phosphite.

(2-3) Oxaphosphaphenanthrenes: 9,10-dihydro-9-oxa-10-phosphaphenanthrene-10-oxide, 8-chloro-9,10-dihydro-9-oxa-10-phosphaphenanthrene-10-oxide, and 8-t-butyl-9,10-dihydro-9-oxa-10-phosphaphenanthrene-10-oxide.

(3) Sulfur-based antioxidants: the following dialkyl thiopropionates, esters of octylthiopropionic acid and polyhydric alcohols, esters of laurylthiopropionic acid and polyhydric alcohols, and esters of stearylthiopropionic acid and polyhydric alcohols.

(3-1) Dialkyl thiopropionates: dilauryl thiodipropionate, dimyristyl thiodipropionate, and distearyl thiodipropionate.

(3-2) Esters of octylthiopropionic acid and polyhydric alcohols: esters of octylthiopropionic acid and polyhydric alcohols selected from glycerin, trimethylolethane, trimethylolpropane, pentaerythritol, and trishydroxyethyl isocyanurate, etc.

(3-3) Esters of laurylthiopropionic acid and polyhydric alcohols: esters of laurylthiopropionic acid and glycerin, trimethylolethane, trimethylolpropane, pentaerythritol, and trishydroxyethyl isocyanurate.

(3-4) Esters of stearylthiopropionic acid and polyhydric alcohols: esters of stearylthiopropionic acid and polyhydric alcohols selected from glycerin, trimethylolethane, trimethylolpropane, pentaerythritol, and trishydroxyethyl isocyanurate, etc.

(4) Amine-based antioxidants: N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine (for example, p,p'-di-tert-octyldiphenylamine), 4-n-butylaminophenol, 4-butyrylaminophenol, 4-nonanoylaminophenol, 4-dodecanoylaminophenol, 4-octadecanoylaminophenol, bis(4-methoxyphenyl)-amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, mixtures of mono- and di-alkylated tert-butyl-/tert-octyldiphenylamines, mixtures of mono- and di-alkylated nonyldiphenylamines, mixtures of mono- and di-alkylated dodecyldiphenylamines, mixtures of mono- and di-alkylated isopropyl/isohexyldiphenylamines, mixtures of mono- and di-alkylated tert-butyldiphenylamines, 2,3-dihydro-3,3-dimethyl-4H-1,4-benzothiazine, phenothiazine, mixtures of mono- and di-alkylated tert-butyl/tert-octylphenothiazines, mixtures of mono- and di-alkylated tert-octylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one, and, 2,2,6,6-tetramethylpiperidin-4-ol.

The light stabilizer is not particularly limited, but can be selected from UV absorbers such as triazole-based, benzophenone-based, ester-based, acrylate-based, nickel-based, triazine-based, and oxamide-based, and hindered amine-based light stabilizers. These may be used alone, or a plurality thereof may be used in combination. Specific examples of the light stabilizer include the following ones (1) to (8):

(1) Triazoles: 2-(2'-hydroxy-5'-(1,1,3,3-tetramethylbutyl) phenyl)benzotriazole, 2-(2'-hydroxy-4'-octyloxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenyl)benzo triazole, 2,2'-methylenebis[4-(1,1,3,3-tetramethylbutyl)-6-benzotriazol-2-ylphenol], transesterification products of 2-[3'-tert-butyl-5'-(2-methoxycarbonylethyl)-2'-hydroxyphenyl]-2H-benzotriazole and polyethylene glycol 300, triazole compounds represented by the following formula (18), and 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

$$R\text{-}[\!-CH_2—CH_2—COO—CH_2—CH_2—]_2 \qquad (20)$$

In the above formula (20), R is 3'-tert-butyl-4'-hydroxy-5'-2H-benzotriazol-2-ylphenyl.

(2) Benzophenone-based: 4-decyloxy, 4-benzyloxy, 4,2',4'-trihydroxy, and 2'-hydroxy-4,4'-dimethoxy derivatives.

(3) Ester-based: 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl 3,5-di-tert-butyl-4-hydroxybenzoate.

(4) Acrylate-based: ethyl-α-cyano-β,β-diphenyl acrylate, isooctyl-α-cyano-β,β-diphenyl acrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-(β-carbomethoxy-β-cyanovinyl)-2-methylindoline.

(5) Nickel-based: 1:1 or 1:2 complexes that have or do not have additional ligands such as n-butylamine, triethanolamine, and N-cyclohexyldiethanolamine (for example, nickel complexes of 2,2'-thiobis[4-(1,1,3,3-tetramethylbutyl)phenol]), nickel dibutyl dithiocarbamate, nickel salts of monoalkyl esters (for example, methyl or ethyl ester) of 4-hydroxy-3,5-di-tert-butylbenzylphosphoric acid, nickel complexes of ketoximes (for example, nickel complexes of 2-hydroxy-4-methylphenylundecylketoxime), and nickel complexes of 1-phenyl-4-lauroyl-5-hydroxypyrazole that has or does not have additional ligands.

(6) Triazine-based: 2,4,6-tris(2-hydroxy-4-octyl oxyphenyl)-1,3,5-triazine, 2-(2,4-dihydroxyphenyl)-4,6-bis(2,4-dimethyl phenyl)-1,3,5-triazine, 2,4-bis(2-hydroxy-4-propyl oxyphenyl)-6-(2,4-dimethyl phenyl)-1,3,5-triazine, 2-(2-hydroxy-4-octyl oxyphenyl)-4,6-bis(4-methyl phenyl)-1,3,5-triazine, 2-(2-hydroxy-4-dodecyl oxyphenyl)-4,6-bis(2,4-dimethyl phenyl)-1,3,5-triazine, 2-(2-hydroxy-4-tridecyl oxyphenyl)-4,6-bis(2,4-dimethyl phenyl)-1,3,5-triazine, 2-[2-hydroxy-4-(2-hydroxy-3-butyl oxypropoxy)phenyl]-4,6-bis(2,4-dimethyl)-1,3,5-triazine, 2-[2-hydroxy-4-(2-hydroxy-3-octyl oxypropyl oxy)phenyl]-4,6-bis(2,4-dimethyl)-1,3,5-triazine, 2-[2-hydroxy-4-(2-hydroxy-3-dodecyl oxypropoxy)phenyl]-4,6-bis(2,4-dimethyl phenyl)-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine and 2-{2-hydroxy-4-[3-(2-ethylhexyl-1-oxy)-2-hydroxypropyl oxy]phenyl}-4,6-bis(2,4-dimethyl phenyl)-1,3,5-triazine.

(7) Oxamide-based: 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and mixtures of this and 2-ethoxy-2'-ethyl-5,4'-di-tert-butoxanilide, mixtures of o- and p-methoxy-disubstituted oxanilides, and mixtures of o- and p-ethoxy-disubstituted oxanilides.

(8) Hindered amine-based:

bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, condensates of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine;

condensates of 2-chloro-4,6-bis(4-n-butylamino-2,2,6,6-tetramethylpiperidyl)-1,3,5-triazine and 1,2-bis(3-aminopropylamino)ethane, condensates of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, 5-(2-ethylhexanoyl)-oxymethyl-3,3,5-trimethyl-2-morpholinone, 1-(2-hydroxy-2-methylpropyl)-4-octadecanoyloxy-2,2,6,6-tetramethylpiperidine, 1,3,5-tris(N-cyclohexyl-N-(2,2,6,6-tetramethylpiperazin-3-on-4-yl)amino)-s-triazine, 1,3,5-tris (N-cyclohexyl-N-(1,2,2,6,6-pentamethylpiperazin-3-on-4-yl)amino)-s-triazine, reaction products of 2,4-bis[(1-cyclohexyloxy-2,2,6,6-piperidin-4-yl)butylamino]-6-chloro-s-triazine and N,N'-bis(3-aminopropyl) ethylenediamine), mixtures of 4-hexadecyloxy- and 4-stearyloxy-2,2,6,6-tetramethylpiperidines;

condensates of N,N'-bis(2,2,6,6-tetramethyl-4-piperidyl) hexamethylenediamine and 4-cyclohexylamino-2,6-dichloro-1,3,5-triazine, condensates of 1,2-bis(3-aminopropylamino)ethane and 2,4,6-trichloro-1,3,5-triazine additionally with 4-butylamino-2,2,6,6-tetramethylpiperidine, condensates of 1,6-hexanediamine and 2,4,6-trichloro-1,3,5-triazine additionally with N,N-dibutylamine and 4-butylamino-2,2,6,6-tetramethylpiperidine, N-(2,2,6,6-tetramethyl-4-piperidyl)-n-dodecylsuccinimide, N-(1,2,2,6, 6-pentamethyl-4-piperidyl)-n-dodecylsuccinimide, 2-undecyl-7,7,9,9-tetramethyl-1-oxa-3,8-diaza-4-oxo-spiro [4,5]decane; 5-(2-ethylhexanoyl)oxymethyl-3,3,5-trimethyl-2-morpholinone, reaction products of 7,7,9,9-tetramethyl-2-cycloundecyl-1-oxa-3,8-diaza-4-oxospiro-[4,5] decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxymethylene malonic acid and 1,2,2,6,6-pentamethyl-4-hydroxypiperidine, poly[methylpropyl-3-oxy-4-(2,2,6,6-tetramethyl-4-piperidyl)]siloxane, and reaction products of maleic anhydride $\alpha$-olefin copolymers and 2,2,6,6-tetramethyl-4-aminopiperidine or 1,2,2,6,6-pentamethyl-4-aminopiperidine.

It is preferable that the amount of a vinyl bond contained in the polymer or cured product formed by polymerizing the episulfide compound in the composition should be 2% by mass or less with respect to the total mass of the polymer or cured product because there is a tendency that discoloration during being preserved for a long period under high temperature is suppressed. From a similar viewpoint, it is more preferable that the content of a vinyl bond should be 1% by mass or less, with 0.5% by mass or less being further preferable.

It is preferable that the amount of a vinyl bond contained in the polymer or cured product formed by polymerizing the episulfide compound should be 0.01% by mass or more with respect to the total mass of the polymer or cured product because there is a tendency that time necessary for polymerization can be shortened and the production cost of the polymer or cured product can be suppressed. From a similar viewpoint, it is more preferable that the content of a vinyl bond should be 0.05% by mass or more, with 0.07% by mass or more being further preferable.

It is preferable that the content of a boron atom contained in the polymer or cured product formed by polymerizing the episulfide compound in the composition should be 6500 ppm or less with respect to the total mass of the polymer or cured product because there is a tendency that volatilized matter during being preserved for a long period under high temperature is reduced and void formation during molding by melt processing or the pollution or corrosion of a metal member in the vicinity of the polymer or cured product can be suppressed. From a similar viewpoint, it is more preferable that the content of a boron atom should be 3500 ppm or less, with 1500 ppm or less being further preferable. Although the reason is uncertain why the content of a boron atom contained in the polymer or cured product formed by polymerizing the episulfide compound is 6500 ppm or less, whereby volatilized matter during being preserved for a long period under high temperature is reduced, there may be the possibility that the compound containing a boron atom volatilizes or the decomposition reaction of the polymer or cured product is promoted by the compound containing a boron atom.

It is preferable that the content of a boron atom contained in the polymer or cured product formed by polymerizing the episulfide compound in the composition should be 1 ppm or more with respect to the total mass of the polymer or cured product because there is a tendency that volatilized matter during being preserved for a long period under high temperature is reduced and void formation during molding by melt processing or the pollution or corrosion of a metal member in the vicinity of the polymer or cured product can be suppressed. From a similar viewpoint, it is more preferable that the content of a boron atom should be 5 ppm or more, with 10 ppm or more being further preferable. Although the reason is uncertain why the content of a boron atom contained in the polymer or cured product prepared by polymerizing the episulfide compound is 1 ppm or more, whereby volatilized matter during being preserved for a long period under high temperature is reduced, there may be the possibility that the compound containing a boron atom reacts with the polymer end of an episulfide group to construct a cross-link structure, thereby suppressing the decomposition reaction of the polymer or cured product.

It is preferable that the content of a phosphorus atom contained in the polymer or cured product formed by polymerizing the episulfide compound in the composition should be 14000 ppm or less with respect to the total mass of the polymer or cured product because there is a tendency that discoloration during being exposed to a light similar to sunlight for a long period is suppressed. From a similar viewpoint, it is more preferable that the content of a boron atom should be 8500 ppm or less, with 3500 ppm or less being further preferable and 2000 ppm or less being particularly preferable. Although the reason is uncertain why the content of a phosphorus atom contained in the polymer or cured product prepared by polymerizing the episulfide compound is 14000 ppm or less, whereby there is a tendency that discoloration during being exposed to a light similar to sunlight for a long period is suppressed, there may be the possibility that phosphorus radicals formed by the light bind to each other, whereby unstable compounds are formed, so that the polymer or cured product is altered.

It is preferable that the content of a phosphorus atom contained in the polymer or cured product prepared by polymerizing the episulfide compound should be 1 ppm or more with respect to the total mass of the polymer or cured product because there is a tendency that discoloration during being exposed to a light similar to sunlight for a long period is suppressed. From a similar viewpoint, it is more preferable that the content of a phosphorus atom should be 5 ppm or more, with 10 ppm or more being further preferable. Although the reason is uncertain why the content of a phosphorus atom contained in the polymer or cured product prepared by polymerizing the episulfide compound is 1 ppm or more, whereby there is a tendency that discoloration during being exposed to a light similar to sunlight for a long period is suppressed, there may be the possibility that the compound containing a phosphorus atom captures radicals formed in the polymer or cured product by the light.

The applications of the composition and the polymer or cured product formed by polymerizing the composition are not particularly limited, and they can be used as, for example, electronic materials (casting and circuit units of insulators, interchange transformers, switching devices, etc., packages for various types of components, peripheral materials for IC/LED/semiconductor [sealants, lens materials, substrate materials, die bond materials, chip coating materials, laminate plates, optical fibers, optical waveguides, optical filters, adhesives for electronic components, coating materials, sealing materials, insulating materials, photoresists, encapsulation materials, potting materials, light transmissive layers or interlayer insulating layers for optical disks, light guide plates, antireflection films, etc.], rotating machine coils for power generators, motors, etc., winding impregnation, printed circuit boards, laminate plates, insulating boards, medium-sized insulators, coils, connectors, terminals, various types of cases, electric components, etc.), paints (corrosion-resistant paints, maintenance, ship coating, corrosion-resistant linings, primers for automobiles/home electric appliances, drink/beer cans, exterior lacquers, extruded tube coating, general corrosion-proof coating, maintenance coating, lacquers for wooden products, electrodeposition primers for automobiles, other industrial electrodeposition coatings, interior lacquers for drink/beer cans, coil coating, internal coating for drums/cans, acid-proof linings, wire enamels, insulating paints, primers for automobiles, decorative and anti-proof coating for various types of metallic products, internal and external coating of pipes, insulating coating of electric components, etc.), composite materials (pipes/tanks for chemical plants, aircraft materials, automobile members, various types of sports goods, carbon fiber composite materials, aramid fiber composite materials, etc.), civil engineering and construction materials (floor materials, pavement materials, membranes, anti-slip and thin surfacing, concrete joints/raising, anchor installation and bonding, precast concrete connection, tile bonding, repair of cracks in concrete structures, base grouting/leveling, corrosion-proof/waterproof coating of water and sewerage facilities, corrosion-resistant multilayer linings for tanks, corrosion-proof coating of iron structures, mastic coating of the exterior walls of architectural structures, etc.), adhesives (adhesives for materials of the same type or different types such as metals/glass/ceramics/cement concrete/wood/plastics, adhesives for assembly of automobiles/railroad vehicles/aircrafts, etc., adhesives for composite panel manufacturing for prehab, etc.: including one-component types, two-component types, and sheet types), aircraft/automobile/plastic molding tooling (press types, resin types such as stretched dies and matched dies, molds for vacuum molding/blow molding, master models, patterns for castings, multilayer tooling, various types of tools for examination, etc.), modifiers/stabilizers (resin processing of fibers, stabilizers for polyvinyl chloride, adhesives for synthetic rubbers, etc.), and rubber modifiers (vulcanizing agent, vulcanization promoters, etc.).

Examples of the lens materials include lenses for optical instruments, lenses for automobile lamps, optical lenses, lenses for pickup of CD/DVD, etc., and lenses for projectors.

The applications of the LED sealants are not particularly limited, and they can be developed to wide fields such as displays, electronic display boards, traffic lights, display backlights (organic EL displays, cellular phones, mobile PC, etc.), automobile interior or exterior lightings, illuminations, lighting equipment, and flashlights.

EXAMPLES

Hereinafter, Examples specifically describing the present embodiment will be illustrated. The present invention is not limited to Examples below unless departing from the spirit thereof.

<Detection of Complex Contained in Boron Trihalide-Ether Compound, Boron Trihalide-Trivalent Phosphorus Compound, Boron Trihalide-Ketone Compound, Boron Trihalide-Ether Compound, Trivalent Phosphorus Compound, or Ketone Compound: $^{11}$B-NMR Measurement>

The $^{11}$B-NMR measurement was performed by procedures below. Although the detection of a complex contained in the boron trihalide-ether compound will be taken as an example in the description below, the detection was similarly carried out for the boron trihalide-trivalent phosphorus compound, the boron trihalide-ketone compound, the boron trihalide-ether compound, the trivalent phosphorus compound, and the ketone compound.

(1) 10 mg of trimethoxyborane (manufactured by Wako Pure Chemical Industries, Ltd.) was weighed into a sample bottle, and chloroform-d (manufactured by Wako Pure Chemical Industries, Ltd.) was added to adjust the whole amount to 1 g.

(2) 10 mg of a boron trihalide compound used in preparing the boron trihalide-ether compound was weighed into a sample bottle, and chloroform-d (manufactured by Wako Pure Chemical Industries, Ltd.) was added to adjust the whole amount to 1 g.

(3) 10 mg of the prepared boron trihalide-ether compound was weighed into a sample bottle, and chloroform-d (manufactured by Wako Pure Chemical Industries, Ltd.) was added to adjust the whole amount to 1 g.

(4) The solution of (2) was transferred to a special NMR tube (for example, "N-502B" manufactured by Nihon Seimitsu Kagaku Co., Ltd.) insertable into an NMR tube of 5 mmϕ in diameter.

(5) The solution of (1) was transferred to an NMR tube of 5 mmϕ in diameter, to which the special NMR tube of (4) was then inserted, and $^{11}$B-NMR was measured under the following conditions:

Fourier transform nuclear magnetic resonance apparatus: "α-400 model" manufactured by JEOL Ltd.

Nuclide: $^{11}$B

Number of average: 1000

(6) The solution of (3) was transferred to a special NMR tube (for example, "N-502B" manufactured by Nihon Seimitsu Kagaku Co., Ltd.) insertable into an NMR tube of 5 mmϕ in diameter.

(7) The solution of (1) was transferred to an NMR tube of 5 mmϕ in diameter, to which the special NMR tube of (6) was then inserted, and $^{11}$B-NMR was measured by a method similar to (5) above.

(8) In the measurement results obtained in (5) and (7) above, it was judged that a complex was formed in the prepared boron trihalide-ether compound in the case where the peak of trimethoxyborane was defined as 18 ppm and a peak different from a peak obtained in (5) was detected in a peak obtained in (7).

<Calculation of Episulfide Equivalent (WPT): $^{1}$H-NMR Measurement>

The $^{1}$H-NMR measurement was performed by procedures below.

(1) 10 mg of a sample and 20 mg of an internal standard were weighed into a sample bottle, and further, chloroform-d (manufactured by Wako Pure Chemical Industries, Ltd.) was added to adjust the whole amount to 1 g.

Internal standard: 1,1,2,2-tetrabromoethane (manufactured by Tokyo Chemical Industry Co., Ltd.; hereinafter, referred to as "TBE")

(2) The solution of (1) was transferred to an NMR tube of 5 mmϕ in diameter, and $^{1}$H-NMR was measured under the following conditions:

Fourier transform nuclear magnetic resonance apparatus: "α-400 model" manufactured by JEOL Ltd.

Nuclide: $^{1}$H

Number of average: 200

From the measurement results, the episulfide equivalent was calculated by procedures below.

(3) The area value of an episulfide group-derived peak was calculated from $^{1}$H-NMR charts.

In this context, the episulfide group-derived peak refers to a peak derived from one hydrogen atom on hydrocarbon constituting an episulfide group. A peak that does not overlap with a peak derived from hydrogen other than hydrogen derived from an episulfide group constituting the episulfide compound is appropriately selected.

(4) The area value of an internal standard-derived peak was calculated from $^{1}$H-NMR charts.

(5) The area values calculated in (3) and (4) above were substituted into the following formula to determine an episulfide equivalent (g/mol):

$$\text{Episulfide equivalent (g/mol)}=(\text{SAMG}/\text{EPIA})\times(\text{TBEM}/\text{TBEG})\times(\text{TBEA}/2)$$

EPIA: area value of the episulfide group-derived peak
TBEA: area value of peaks derived from two hydrogen atoms of TBE
TBEG: weight (g) of TBE used in preparing the solution for performing the $^{1}$H-NMR measurement (in the present Example, 20 mg)
TBEM: molecular weight of TBE
SAMG: weight (g) of the sample used in preparing the solution for performing the $^{1}$H-NMR measurement (in the present Example, 10 mg)

In the case where hydrogen atoms on hydrocarbon constituting an episulfide group in the episulfide compound contained in the sample are observed as identical peaks in the measurement of $^{1}$H-NMR, calculation becomes possible by chanting the procedure of (5) as follows:

(5-2) The area values calculated in (3) and (4) above were substituted into the following formula to determine an episulfide equivalent (g/mol):

$$\text{Episulfide equivalent (g/mol)}=\text{SAMG}\times(\text{The number of hydrogen atoms constituting episulfide group-derived peaks}/\text{EPIA})\times(\text{TBEM}/\text{TBEG})\times(\text{TBEA}/2)$$

<Calculation of Mixing Index α>

The mixing index α was calculated according to the following formula (5):

$$\text{Index } \alpha=(\alpha e+\alpha p+\alpha k)/\alpha b \quad (5)$$

wherein
αe: molar number (mol) of ether groups in the ether compound (A-1)
αp: molar number (mol) of trivalent phosphorus atom(s) contained in the trivalent phosphorus compound (A-2)
αk: molar number (mol) of ketone group(s) in the ketone compound (A-3)
αb: molar number (mol) of the boron trihalide (B)

<Calculation of Mixing Index β>

The mixing index β was calculated according to the following formula (18):

$$\text{Index } \beta=\alpha b/\alpha t\times 100 \quad (18)$$

wherein
αb: molar number (mol) of the boron trihalide (B) at: molar number (mol) of episulfide group(s) contained in the episulfide compound (C)

<Calculation of Rate of Episulfide Group Reaction (Hereinafter, Referred to as an "EA Method"): $^{1}$H-NMR Measurement>

The $^{1}$H-NMR measurement was performed by procedures below.

(1) 10 mg of a sample and 20 mg of an internal standard were weighed into a sample bottle, and further, chloroform-d (manufactured by Wako Pure Chemical Industries, Ltd.) was added to adjust the whole amount to 1 g.

Internal standard: 1,1,2,2-tetrabromoethane (manufactured by Tokyo Chemical Industry Co., Ltd.; hereinafter, referred to as "TBE")

(2) The solution of (1) was transferred to an NMR tube of 5 mmϕ in diameter, and $^{1}$H-NMR was measured under the following conditions:

Fourier transform nuclear magnetic resonance apparatus: "α-400 model" manufactured by JEOL Ltd.
Nuclide: $^{1}$H
Number of average: 200

From the measurement results, the rate of episulfide group reaction was calculated by procedures below.

(3) The area value of an episulfide group-derived peak was calculated from $^{1}$H-NMR charts.

In this context, the episulfide group-derived peak refers to a peak derived from one hydrogen atom on hydrocarbon constituting an episulfide group. A peak that does not overlap with a peak derived from hydrogen other than hydrogen derived from an episulfide group constituting the episulfide compound is appropriately selected.

(4) The area value of an internal standard-derived peak was calculated from $^{1}$H-NMR charts.

(5) The area values calculated in (3) and (4) above were substituted into the following formula to determine the rate (%) of episulfide group reaction:

$$\text{Rate (\%) of episulfide group reaction}=100-\text{EPIA}\times(\text{TBEG}/\text{TBEM})\times(2/\text{TBEA})\times(\text{REAG}/\text{SAMG})\times(\text{WPT}/\text{EPIG})\times 100$$

EPIA: area value of the episulfide group-derived peak
TBEA: area value of peaks derived from two hydrogen atoms of TBE
EPIG: weight (g) of the episulfide compound used in preparing the polymerizable composition
WPT: episulfide equivalent (g/mol) of the episulfide compound used in preparing the polymerizable composition
REAG: weight (g) of the polymerizable composition
TBEG: weight (g) of TBE used in preparing the solution for performing the $^{1}$H-NMR measurement (in the present Example, 20 mg)
TBEM: molecular weight of 1BE
SAMG: weight (g) of the sample used in preparing the solution for performing the $^{1}$H-NMR measurement (in the present Example, 10 mg)

In the case where hydrogen atoms on hydrocarbon constituting an episulfide group in the episulfide compound contained in the sample are observed as identical peaks in the measurement of $^{1}$H-NMR, calculation becomes possible by changing the procedure of (5) as follows:

(5-2) The area values calculated in (3) and (4) above were substituted into the following formula to determine the rate (%) of episulfide group reaction:

$$\text{Rate (\%) of episulfide group reaction}=100-\{\text{EPIA}/(\text{The number of hydrogen atoms constituting episulfide group-derived peaks})\}\times(\text{TBEG}/\text{TBEM})\times(2/\text{TBEA})\times(\text{REAG}/\text{SAMG})\times(\text{WPT}/\text{EPIG})\times 100$$

<Calculation of Rate of Episulfide Group Reaction (Hereinafter, Referred to as an "EB Method"): FT-IR Measurement>

In the case where a sample is not dissolved in chloroform-d in the EA method, the rate of episulfide group reaction is calculated by the EB method.

The FT-IR measurement was performed by procedures below.

(1) 2 mg of a sample and 100 mg of potassium bromide (manufactured by Sigma-Aldrich Corp., IR grade) were weighed into a mortar made of agate and pulverized until becoming uniform using a pestle made of agate.

(2) 50 mg of the sample of (1) was molded into a disk shape in a tableting machine.

(3) The molded product of (2) was placed in a tablet sample holder, and the FT-IR measurement was performed under the following conditions:

Fourier transform infrared spectrometer: "Nicolet 6700 model" manufactured by Thermo Fisher Scientific K.K.
Resolution: 4 $cm^{-1}$
Measurement method: Transmission method
Number of average: 128

From the measurement results, the rate of episulfide group reaction was calculated by procedures below.

(4) The area value of an episulfide group-derived peak was calculated from FT-IR charts.

In this context, the episulfide group-derived peak refers to a peak derived from oscillation between atoms constituting an episulfide group. A peak that does not overlap with a peak derived from oscillation between atoms other than a peak derived from an episulfide group in the compound contained in the sample is appropriately selected.

(5) The area value calculated in (4) was substituted into the following formula to determine the rate (%) of episulfide group reaction:

$$\text{Rate (\%) of episulfide group reaction} = 100 - RIRA/SIRA \times 100$$

RIRA: episulfide group-derived peak area in FT-IR charts obtained as a result of measuring the sample
SIRA: episulfide group-derived peak area in FT-IR charts obtained as a result of measuring the episulfide compound before polymerization used in preparing the sample <Calculation of Rate of Vinyl Group Formation: $^{1}$H-NMR Measurement>

The $^{1}$H-NMR measurement was performed by procedures below.

(1) 10 mg of a sample and 20 mg of an internal standard were weighed into a sample bottle, and further, chloroform-d (manufactured by Wako Pure Chemical Industries, Ltd.) was added to adjust the whole amount to 1 g.

Internal standard: 1,1,2,2-tetrabromoethane (manufactured by Tokyo Chemical Industry Co., Ltd.; hereinafter, referred to as "TBE")

(2) The solution of (1) was transferred to an NMR tube of 5 mmϕ in diameter, and $^{1}$H-NMR was measured under the following conditions:

Fourier transform nuclear magnetic resonance apparatus: "α-400 model" manufactured by JEOL Ltd.
Nuclide: $^{1}$H
Number of average: 200

From the measurement results, the rate of vinyl group formation was calculated by procedures below.

(3) The area value of a vinyl group-derived peak was calculated from $^{1}$H-NMR charts.

In this context, the vinyl group-derived peak refers to a peak derived from one hydrogen atom on hydrocarbon constituting a vinyl group. A peak that does not overlap with a peak derived from hydrogen that is hydrogen constituting a compound contained in the sample and is other than hydrogen derived from a vinyl group is appropriately selected.

(4) The area value of an internal standard-derived peak was calculated from $^{1}$H-NMR charts.

(5) The area values calculated in (3) and (4) above were substituted into the following formula to determine an episulfide equivalent (g/mol):

$$\text{Rate (\%) of vinyl group formation} = VINA \times (TBEG/TBEM) \times (2/TBEA) \times (REAG/SAMG) \times (WPT/EPIG) \times 100$$

VINA: area value of the vinyl group-derived peak
TBEA: area value of peaks derived from two hydrogen atoms of TEB
EPIG: weight (g) of the episulfide compound used in preparing the polymerizable composition
WPT: episulfide equivalent (g/mol) of the episulfide compound used in preparing the polymerizable composition
REAG: weight (g) of the polymerizable composition
TBEG: weight (g) of TBE used in preparing the solution for performing the $^{1}$H-NMR measurement (in the present Example, 20 mg)
TBEM: molecular weight of TBE
SAMG: weight (g) of the sample used in preparing the solution for performing the $^{1}$H-NMR measurement (in the present Example, 10 mg)

In the case where hydrogen atoms on hydrocarbon constituting a vinyl group are observed as identical peaks in the measurement of $^{1}$H-NMR, calculation becomes possible by changing the procedure of (5) as follows:

(5-2) The area values calculated in (3) and (4) above were substituted into the following formula to determine the rate (%) of vinyl group formation:

$$\text{Rate (\%) of vinyl group formation} = \{VINA/(\text{The number of hydrogen atoms constituting vinyl group-derived peaks})\} \times (TBEG/TBEM) \times (2/TBEA) \times (REAG/SAMG) \times (WPT/EPIG) \times 100$$

<Stability Evaluation A>

A portion of the prepared polymerizable composition was put in an incubator set to 20° C. and preserved for 1 hour, and then, the rate of episulfide group reaction was calculated by the EA method.

The stability was judged as being good ("A") in the case where the rate of episulfide group reaction was 10% or less, judged as being excellent ("AA") in the case of 5% or less, and judged as being poor ("C") in the case other than these.

<Stability Evaluation B>

In the case where a polymerizable composition was not completely dissolved in chloroform-d in the stability evaluation A, the rate of episulfide group reaction was calculated by the EB method.

The stability was judged as being good ("A") in the case where the rate of episulfide group reaction was 10% or less, judged as being excellent ("AA") in the case of 5% or less, and judged as being poor ("C") in the case other than these.

<Polymerizability Evaluation A>

The rate of episulfide group reaction of the obtained polymer was calculated by the EA method.

The polymerizability was judged as being good ("A") in the case where the rate of episulfide group reaction was 90% or more, judged as being excellent ("AA") in the case of 95% or more, and judged as being poor ("C") in the case other than these.

<Polymerizability Evaluation B>

In the case where a polymer was not completely dissolved in chloroform-d in the polymerizability evaluation A, the rate of episulfide group reaction was calculated by the EB method.

The polymerizability was judged as being good ("A") in the case where the rate of episulfide group reaction was 90% or more, judged as being excellent ("AA") in the case of 95% or more, and judged as being poor ("C") in the case other than these.

<Side Reactivity Evaluation A>

The rate of vinyl group formation of the prepared polymer was calculated.

The side reactivity was judged as being good ("A") in the case where the rate of vinyl group formation was 5% or less, judged as being excellent ("AA") in the case of 2% or less, and judged as being poor ("C") in the case other than these.

<Side Reactivity Evaluation B>

In the case where a polymer was not completely dissolved in chloroform-d in the side reactivity evaluation A, evaluation was carried out by the following method:

(1) A sample for evaluation was prepared into a powdery sample in a freezing pulverizer.
(2) The powdery sample of (1) was transferred to an NMR tube of 4 mmφ in diameter, and solid $^{13}$C-NMR was measured under the following conditions:
Fourier transform nuclear magnetic resonance apparatus: "ECA 700 model" manufactured by JEOL Ltd.
Nuclide: $^{13}$C
Number of average: 16,000
Measurement method: CP/MAS method
MAS: 10,000 Hz
(3) From the measurement results, the side reactivity was judged as being excellent ("AA") in the case where a vinyl group-derived peak was not observed, and judged as being poor ("C") in the case where it was observed.

<Overall Assessment>

The case of being judged as being excellent in all evaluations of stability evaluation, polymerizability evaluation, and side reactivity evaluation and the case of being judged as being good in at least one evaluation and judged as being excellent or good in the other evaluation (s) were regarded as being accepted (("AA" or "A") as overall assessment. All other cases were regarded as being rejected ("C").

The starting materials used in Production Examples, Examples, and Comparative Examples are shown in (1) to (214) below.

(Epoxy Compound)

(1) Epoxy compound B: ethylene oxide (manufactured by Sigma-Aldrich Corp.; hereinafter, referred to as "EO")
Epoxy equivalent (WPE): 44 g/eq.
(2) Epoxy compound C: propylene oxide (manufactured by Wako Pure Chemical Industries, Ltd.; hereinafter, referred to as "PO")
Epoxy equivalent (WPE): 58 g/eq.
(3) Epoxy compound D: 1,2-epoxybutane (manufactured by Tokyo Chemical Industry Co., Ltd.; hereinafter, referred to as "12EB")
Epoxy equivalent (WPE): 72 g/eq.
(4) Epoxy compound E: 1,2-epoxypentane (manufactured by Tokyo Chemical Industry Co., Ltd.; hereinafter, referred to as "12EP")
Epoxy equivalent (WPE): 86 g/eq.
(5) Epoxy compound F: 1,2-epoxyhexane (manufactured by Tokyo Chemical Industry Co., Ltd.; hereinafter, referred to as "12EH")
Epoxy equivalent (WPE): 100 g/eq.
(6) Epoxy compound G: 1,2-epoxyheptane (manufactured by Tokyo Chemical Industry Co., Ltd.; hereinafter, referred to as "12EHP")
Epoxy equivalent (WPE): 114 g/eq.
(7) Epoxy compound H: 1,2-epoxyoctane (manufactured by Wako Pure Chemical Industries, Ltd.; hereinafter, referred to as "12EO")
Epoxy equivalent (WPE): 128 g/eq.
(8) Epoxy compound I: 1,2-epoxydecane (manufactured by Wako Pure Chemical Industries, Ltd.; hereinafter, referred to as "12ED")
Epoxy equivalent (WPE): 156 g/eq.
(9) Epoxy compound J: 1,2-epoxydodecane (manufactured by Wako Pure Chemical Industries, Ltd.; hereinafter, referred to as "12EDD")
Epoxy equivalent (WPE): 184 g/eq.
(10) Epoxy compound K: 1,2-epoxytetradecane (manufactured by Wako Pure Chemical Industries, Ltd.; hereinafter, referred to as "12ETD")
Epoxy equivalent (WPE): 212 g/eq.
(11) Epoxy compound L: 1,2-epoxyhexadecane (manufactured by Tokyo Chemical Industry Co., Ltd.; hereinafter, referred to as "12EHD")
Epoxy equivalent (WPE): 240 g/eq.
(12) Epoxy compound M: 1,2-epoxyoctadecane (manufactured by Tokyo Chemical Industry Co., Ltd.; hereinafter, referred to as "12EOD")
Epoxy equivalent (WPE): 268 g/eq.
(13) Epoxy compound N: 1,2-epoxyeicosane (manufactured by Tokyo Chemical Industry Co., Ltd.; hereinafter, referred to as "12EEC")
Epoxy equivalent (WPE): 297 g/eq.
(14) Epoxy compound A: phenyl glycidyl ether (manufactured by Wako Pure Chemical Industries, Ltd.; hereinafter, referred to as "PGE")
Epoxy equivalent (WPE): 150 g/eq.
(15) Epoxy compound O: bisphenol A-type epoxy compound (hereinafter, referred to as "Bis-A-1")
Trade name: "AER" manufactured by Asahi Kasei Epoxy Co., Ltd.
Epoxy equivalent (WPE): 189 g/eq.
(16) Epoxy compound P: hydrogenated bisphenol A-type epoxy compound (hereinafter, referred to as "hydrogenated Bis-A")
Trade name: "YX8000" manufactured by Japan Epoxy Resins Co., Ltd.
Epoxy equivalent (WPE): 205 g/eq.
(17) Epoxy compound Q: bisphenol A-type epoxy compound (hereinafter, referred to as "Bis-A-2")
Trade name: "AER" manufactured by Asahi Kasei Epoxy Co., Ltd.
Epoxy equivalent (WPE): 480 g/eq.
(18) Epoxy compound R: bisphenol A-type epoxy compound (hereinafter, referred to as "Bis-A-3")
Trade name: "AER" manufactured by Asahi Kasei Epoxy Co., Ltd.
Epoxy equivalent (WPE): 560 g/eq.
(19) Epoxy compound S: bisphenol A-type epoxy compound (hereinafter, referred to as "Bis-A-4")
Trade name: "AER" manufactured by Asahi Kasei Epoxy Co., Ltd.
Epoxy equivalent (WPE): 650 g/eq.
(20) Epoxy compound T: cyclopentene oxide (manufactured by Sigma-Aldrich Corp.; hereinafter, referred to as "C5O")
Epoxy equivalent (WPE): 84 g/eq.
(21) Epoxy compound U: cyclohexene oxide (manufactured by Sigma-Aldrich Corp.; hereinafter, referred to as "C6O")
Epoxy equivalent (WPE): 98 g/eq.
(22) Epoxy compound V: cycloheptene oxide (manufactured by Sigma-Aldrich Corp.; hereinafter, referred to as "C7O")
Epoxy equivalent (WPE): 112 g/eq.
(23) Epoxy compound W: cyclooctene oxide (manufactured by Sigma-Aldrich Corp.; hereinafter, referred to as "C8O")
Epoxy equivalent (WPE): 126 g/eq.
(24) Epoxy compound X: alicyclic epoxy compound (hereinafter, referred to as "CEL")
Trade name: Daicel Corp., "Celloxide 2021P"
Epoxy equivalent (WPE): 131 g/eq.
(25) Epoxy compound Y: bis(2,3-epoxypropyl)disulfide (hereinafter, referred to as "BEDS")
BEDS was synthesized according to a method described in Japanese Patent Application Laid-Open No. 2002-194083.
Epoxy equivalent (WPE): 91 g/eq.

(26) Epoxy compound Z: 1,3-bis(3-glycidoxypropyl)-1,1,3,3-tetramethyldisiloxane (hereinafter, referred to as "BGTD")

Trade name: Shin-Etsu Chemical Co., Ltd., "LS-7970"

Epoxy equivalent (WPE): 182 g/eq.

(27) Epoxy compound AA: bis[2-(3,4-epoxycyclohexyl)ethyl]tetramethyldisiloxane (hereinafter, referred to as "BCD")

Trade name: Gelest, Inc., "SIB 1092.0"

Epoxy equivalent (WPE): 192 g/eq.

(28) Epoxy compound AB: 1,3,5,7-tetra-(3-glycidoxypropyl)tetramethylcyclotetrasiloxane (hereinafter, referred to as "TGCS")

TGCS was synthesized according to a method described in Euro. Polym. J. 2010, 46, 1545.

Epoxy equivalent (WPE): 174 g/eq.

(29) Epoxy compound AC: 1,3,5,7-tetra-[2-(3,4-epoxycyclohexylethyl)]tetramethylcyclotetrasiloxane (hereinafter, referred to as "TCCS")

TCCS was synthesized according to a method described in Japanese Patent Application Laid-Open No. 2000-103859.

Epoxy equivalent (WPE): 184 g/eq.

(30) Epoxy compound AD: butadiene monooxide (manufactured by Wako Pure Chemical Industries, Ltd.; hereinafter, referred to as "BDMO")

Epoxy equivalent (WPE): 70 g/eq.

(31) Epoxy compound AE: 1,2-epoxy-5-hexene (manufactured by Wako Pure Chemical Industries, Ltd.; hereinafter, referred to as "EPHE")

Epoxy equivalent (WPE): 98 g/eq.

(32) Epoxy compound AF: allyl glycidyl ether (manufactured by Wako Pure Chemical Industries, Ltd.; hereinafter, referred to as "AGE")

Epoxy equivalent (WPE): 114 g/eq.

(33) Epoxy compound AG: 1,2-epoxy-4-vinylcyclohexane (manufactured by Sigma-Aldrich Corp.; hereinafter, referred to as "EVCH")

Epoxy equivalent (WPE): 124 g/eq.

(34) Epoxy compound AH: glycidyl methacrylate (manufactured by Wako Pure Chemical Industries, Ltd.; hereinafter, referred to as "GLMT")

Epoxy equivalent: 142 g/eq.

(Thiating Agent)

(35) Thiating agent: thiourea (manufactured by Wako Pure Chemical Industries, Ltd.; hereinafter, referred to as "TU")

(Hydroxy Group Compound)

(36) Hydroxy group compound A: 1,2-propylene glycol (manufactured by Wako Pure Chemical Industries, Ltd.; hereinafter, referred to as "12PG")

(37) Hydroxy group compound B: 1,3-propylene glycol (manufactured by Wako Pure Chemical Industries, Ltd.; hereinafter, referred to as "13PG")

(38) Polyvalent hydroxy group compound C: 1,2-butanediol (manufactured by Wako Pure Chemical Industries, Ltd.; hereinafter, referred to as "12BD")

(39) Polyvalent hydroxy group compound D: 1,3-butanediol (manufactured by Wako Pure Chemical Industries, Ltd.; hereinafter, referred to as "13BD")

(Ether Compound)

(40) Ether compound A: formaldehyde dimethyl acetal (manufactured by Sigma-Aldrich Corp.; hereinafter, referred to as "MECA")

(41) Ether compound B: 1,3-dioxane (manufactured by Sigma-Aldrich Corp.; hereinafter, referred to as "MECB")

(42) Ether compound C: 1,4-dioxane (manufactured by Sigma-Aldrich Corp.; hereinafter, referred to as "MECC")

(43) Ether compound D: 1,2-dimethoxyethane (manufactured by Sigma-Aldrich Corp.; hereinafter, referred to as "MECD")

(44) Ether compound E: 1,2-diethoxyethane (manufactured by Sigma-Aldrich Corp.; hereinafter, referred to as "MECE")

(45) Ether compound F: diethylene glycol dimethyl ether (manufactured by Sigma-Aldrich Corp.; hereinafter, referred to as "MECF")

(46) Ether compound G: diethylene glycol diethyl ether (manufactured by Sigma-Aldrich Corp.; hereinafter, referred to as "MECG")

(47) Ether compound H: 1,2-bis(2-methoxyethoxy)ethane (manufactured by Wako Pure Chemical Industries, Ltd.; hereinafter, referred to as "MECH")

(48) Ether compound I: 2,2-diethyl-1,4-dioxane (manufactured by Sigma-Aldrich Corp.; hereinafter, referred to as "MECI")

(49) Ether compound J: 12-crown-4 (manufactured by Sigma-Aldrich Corp.; hereinafter, referred to as "MECJ")

(50) Ether compound K: ethylene glycol dibutyl ether (manufactured by Wako Pure Chemical Industries, Ltd.; hereinafter, referred to as "MECK")

(51) Ether compound L: bis[2-(2-methoxyethoxy)ethyl]ether (manufactured by Wako Pure Chemical Industries, Ltd.; hereinafter, referred to as "MECL")

(52) Ether compound M: 2-(tetrahydrofurfuryloxy)tetrahydropyran (manufactured by Wako Pure Chemical Industries, Ltd.; hereinafter, referred to as "MECM")

(53) Ether compound N: 15-crown-5 (manufactured by Sigma-Aldrich Corp.; hereinafter, referred to as "MECN")

(54) Ether compound O: bis(2-butoxyethyl)ether (manufactured by Wako Pure Chemical Industries, Ltd.; hereinafter, referred to as "MECO")

(55) Ether compound P: benzo-12-crown-4 (manufactured by Wako Pure Chemical Industries, Ltd.; hereinafter, referred to as "MECP")

(56) Ether compound Q: 18-crown-6 (manufactured by Sigma-Aldrich Corp.; hereinafter, referred to as "MECQ")

(57) Ether compound R: benzo-15-crown-5 (manufactured by Wako Pure Chemical Industries, Ltd.; hereinafter, referred to as "MECR")

(58) Ether compound S: benzo-18-crown-6 (manufactured by Sigma-Aldrich Corp.; hereinafter, referred to as "MECS")

(59) Ether compound T: 2,3-naphtho-15-crown-5 (manufactured by Wako Pure Chemical Industries, Ltd.; hereinafter, referred to as "MECT")

(60) Ether compound U: dicyclohexano-18-crown-6 (manufactured by Wako Pure Chemical Industries, Ltd.; hereinafter, referred to as "MECU")

(61) Ether compound V: dibenzo-24-crown-8 (manufactured by Sigma-Aldrich Corp.; hereinafter, referred to as "MECV")

(62) Ether compound W: dicyclohexano-24-crown-8 (manufactured by Wako Pure Chemical Industries, Ltd.; hereinafter, referred to as "MECW")

(63) Ether compound X: dibenzo-30-crown-10 (manufactured by Sigma-Aldrich Corp.; hereinafter, referred to as "MECX")

(64) Ether compound Y: 1,14-bis(2-naphthyloxy)-3,6,9,12-tetraoxatetradecane (manufactured by Sigma-Aldrich Corp.; hereinafter, referred to as "MECY")

(65) Ether compound Z: 2,2'-binaphthyl-14-crown-4 (manufactured by Wako Pure Chemical Industries, Ltd.; hereinafter, referred to as "MECZ")

(Trivalent Phosphorus Compound)

(66) Trivalent phosphorus compound A: trimethylphosphine (manufactured by Sigma-Aldrich Corp.; hereinafter, referred to as "3PCA")

(67) Trivalent phosphorus compound B: ethyldimethylphosphine (hereinafter, referred to as "3PCB")

3PCB was synthesized according to a method described in Inorganica Chemica Acta 1980, 41, 161-164.

(68) Trivalent phosphorus compound C: diethylmethylphosphine (hereinafter, referred to as "3PCC")

3PCC was synthesized according to a method described in Inorganica Chemica Acta 1980, 41, 161-164.

(69) Trivalent phosphorus compound D: triethylphosphine (manufactured by Sigma-Aldrich Corp.; hereinafter, referred to as "3PCD")

(70) Trivalent phosphorus compound E: tri-n-propylphosphine (manufactured by Sigma-Aldrich Corp.; hereinafter, referred to as "3PCE")

(71) Trivalent phosphorus compound F: triisopropylphosphine (manufactured by Sigma-Aldrich Corp.; hereinafter, referred to as "3PCF")

(72) Trivalent phosphorus compound G: di-tert-butylmethylphosphine (manufactured by Sigma-Aldrich Corp.; hereinafter, referred to as "3PCG")

(73) Trivalent phosphorus compound H: tert-butyl-di-1-propylphosphine (manufactured by Sigma-Aldrich Corp.; hereinafter, referred to as "3PCH")

(74) Trivalent phosphorus compound I: tri-n-butylphosphine (manufactured by Sigma-Aldrich Corp.; hereinafter, referred to as "3PCI")

(75) Trivalent phosphorus compound J: triisobutylphosphine (manufactured by Sigma-Aldrich Corp.; hereinafter, referred to as "3PCJ")

(76) Trivalent phosphorus compound K: tri-tert-butylphosphine (manufactured by Sigma-Aldrich Corp.; hereinafter, referred to as "3PCK")

(77) Trivalent phosphorus compound L: di-tert-butylneopentylphosphine (manufactured by Sigma-Aldrich Corp.; hereinafter, referred to as "3PCL")

(78) Trivalent phosphorus compound M: di-tert-butyl-cyclohexylphosphine (manufactured by Sigma-Aldrich Corp.; hereinafter, referred to as "3PCM")

(79) Trivalent phosphorus compound N: dicyclohexylethylphosphine (manufactured by Sigma-Aldrich Corp.; hereinafter, referred to as "3PCN")

(80) Trivalent phosphorus compound O: tricyclopentylphosphine (manufactured by Sigma-Aldrich Corp.; hereinafter, referred to as "3PCO")

(81) Trivalent phosphorus compound P: tert-butyl-dicyclohexylphosphine (manufactured by Sigma-Aldrich Corp.; hereinafter, referred to as "3PCP")

(82) Trivalent phosphorus compound Q: tricyclohexylphosphine (manufactured by Wako Pure Chemical Industries, Ltd.; hereinafter, referred to as "3PCQ")

(83) Trivalent phosphorus compound R: tri-n-octylphosphine (manufactured by Sigma-Aldrich Corp.; hereinafter, referred to as "3PCR")

(84) Trivalent phosphorus compound S: di(1-adamantyl)butylphosphine (manufactured by Sigma-Aldrich Corp.; hereinafter, referred to as "3PCS")

(85) Trivalent phosphorus compound T: triphenylphosphine (manufactured by Sigma-Aldrich Corp.; hereinafter, referred to as "3PCT")

(86) Trivalent phosphorus compound U: diphenyl(p-tolyl) phosphine (manufactured by Wako Pure Chemical Industries, Ltd.; hereinafter, referred to as "3PCU")

(87) Trivalent phosphorus compound V: diphenyl(o-methoxyphenyl)phosphine (manufactured by Wako Pure Chemical Industries, Ltd.; hereinafter, referred to as "3PCV")

(88) Trivalent phosphorus compound W: 4-(dimethylaminophenyl)diphenylphosphine (manufactured by Sigma-Aldrich Corp.; hereinafter, referred to as "3PCW")

(89) Trivalent phosphorus compound X: pentafluorophenyldiphenylphosphine (manufactured by Wako Pure Chemical Industries, Ltd.; hereinafter, referred to as "3PCX")

(90) Trivalent phosphorus compound Y: bis(o-methoxyphenyl)phenylphosphine (manufactured by Wako Pure Chemical Industries, Ltd.; hereinafter, referred to as "3PCY")

(91) Trivalent phosphorus compound Z: bis(pentafluorophenyl)phenylphosphine (manufactured by Wako Pure Chemical Industries, Ltd.; hereinafter, referred to as "3PCZ")

(92) Trivalent phosphorus compound AA: tri-o-tolylphosphine (manufactured by Wako Pure Chemical Industries, Ltd.; hereinafter, referred to as "3PCAA")

(93) Trivalent phosphorus compound AB: tri-m-tolylphosphine (manufactured by Wako Pure Chemical Industries, Ltd.; hereinafter, referred to as "3PCAB")

(94) Trivalent phosphorus compound AC: tri-p-tolylphosphine (manufactured by Wako Pure Chemical Industries, Ltd.; hereinafter, referred to as "3PCAC")

(95) Trivalent phosphorus compound AD: tris(o-methoxyphenyl)phosphine (manufactured by Wako Pure Chemical Industries, Ltd.; hereinafter, referred to as "3PCAD")

(96) Trivalent phosphorus compound AE: tris(p-methoxyphenyl)phosphine (manufactured by Wako Pure Chemical Industries, Ltd.; hereinafter, referred to as "3PCAE")

(97) Trivalent phosphorus compound AF: tris(2,4-dimethylphenyl)phosphine (manufactured by Sigma-Aldrich Corp.; hereinafter, referred to as "3PCAF")

(98) Trivalent phosphorus compound AG: tri(2,5-xylyl)phosphine (manufactured by Wako Pure Chemical Industries, Ltd.; hereinafter, referred to as "3PCAG")

(99) Trivalent phosphorus compound AH: tri(3,5-xylyl)phosphine (manufactured by Wako Pure Chemical Industries, Ltd.; hereinafter, referred to as "3PCAH")

(100) Trivalent phosphorus compound AI: tris(2,6-dimethoxyphenyl)phosphine (manufactured by Sigma-Aldrich Corp.; hereinafter, referred to as "3PCAI")

(101) Trivalent phosphorus compound AJ: tris(2,4,6-trimethylphenyl)phosphine (manufactured by Sigma-Aldrich Corp.; hereinafter, referred to as "3PCAJ")

(102) Trivalent phosphorus compound AK: tris(2,4,6-trimethoxyphenyl)phosphine (manufactured by Sigma-Aldrich Corp.; hereinafter, referred to as "3PCAK")

(103) Trivalent phosphorus compound AL: tris(3-fluorophenyl)phosphine (manufactured by Wako Pure Chemical Industries, Ltd.; hereinafter, referred to as "3PCAL")

(104) Trivalent phosphorus compound AM: tris(p-fluorophenyl)phosphine (manufactured by Wako Pure Chemical Industries, Ltd.; hereinafter, referred to as "3PCAM")

(105) Trivalent phosphorus compound AN: tris(pentafluorophenyl)phosphine (manufactured by Wako Pure Chemical Industries, Ltd.; hereinafter, referred to as "3PCAN")

(106) Trivalent phosphorus compound AO: tris(4-trifluoromethylphenyl)phosphine (manufactured by Sigma-Aldrich Corp.; hereinafter, referred to as "3PCAO")

(107) Trivalent phosphorus compound AP: tris[3,5-bis(trifluoromethyl)phenyl]phosphine (manufactured by Sigma-Aldrich Corp.; hereinafter, referred to as "3PCAP")

(108) Trivalent phosphorus compound AQ: cyclohexyldiphenylphosphine (manufactured by Sigma-Aldrich Corp.; hereinafter, referred to as "3PCAQ")

(109) Trivalent phosphorus compound AR: dicyclohexylphenylphosphine (manufactured by Sigma-Aldrich Corp.; hereinafter, referred to as "3PCAR")

(110) Trivalent phosphorus compound AS: 2-[di(tert-butyl)phosphino]-1,1'-biphenyl (manufactured by Sigma-Aldrich Corp.; hereinafter, referred to as "3PCAS")

(111) Trivalent phosphorus compound AT: 2-(dicyclohexylphosphino)-1,1'-biphenyl (manufactured by Sigma-Aldrich Corp.; hereinafter, referred to as "3PCAT")

(112) Trivalent phosphorus compound AU: 1,2-bis(dimethylphosphino)ethane (manufactured by Sigma-Aldrich Corp.; hereinafter, referred to as "3PCAU")

(113) Trivalent phosphorus compound AV: 1,2-bis(diethylphosphino)ethane (manufactured by Sigma-Aldrich Corp.; hereinafter, referred to as "3PCAV")

(114) Trivalent phosphorus compound AW: dicyclohexyl[(dicyclohexylphosphino)methyl]phosphine (manufactured by Sigma-Aldrich Corp.; hereinafter, referred to as "3PCAW")

(115) Trivalent phosphorus compound AX: 1,2-bis(dicyclohexylphosphino)ethane (manufactured by Sigma-Aldrich Corp.; hereinafter, referred to as "3PCAX")

(116) Trivalent phosphorus compound AY: 1,3-bis(dicyclohexylphosphino)propane (manufactured by Sigma-Aldrich Corp.; hereinafter, referred to as "3PCAY")

(117) Trivalent phosphorus compound AZ: 1,4-bis(dicyclohexylphosphino)butane (manufactured by Sigma-Aldrich Corp.; hereinafter, referred to as "3PCAZ")

(118) Trivalent phosphorus compound BA: 1,2-bis(2,5-dimethylphosphorano)ethane (manufactured by Sigma-Aldrich Corp.; hereinafter, referred to as "3PCBA")

(119) Trivalent phosphorus compound BB: 1,1'-tert-butyl-2,2'-diphosphorane (manufactured by Sigma-Aldrich Corp.; hereinafter, referred to as "3PCBB")

(120) Trivalent phosphorus compound BC: 1-{2-[2,5-diethyl-1-phosphoranyl]ethyl}-2,5-diethylphosphorane (manufactured by Sigma-Aldrich Corp.; hereinafter, referred to as "3PCBC")

(121) Trivalent phosphorus compound BD: 1-{2-[2,5-diisopropyl-1-phosphoranyl]ethyl}-2,5-diisopropylphosphorane (manufactured by Sigma-Aldrich Corp.; hereinafter, referred to as "3PCBD")

(122) Trivalent phosphorus compound BE: 1,2-bis(diphenylphosphino)ethane (manufactured by Sigma-Aldrich Corp.; hereinafter, referred to as "3PCBE")

(123) Trivalent phosphorus compound BF: 1,3-bis(diphenylphosphino)propane (manufactured by Sigma-Aldrich Corp.; hereinafter, referred to as "3PCBF")

(124) Trivalent phosphorus compound BG: 1,4-bis(diphenylphosphino)butane (manufactured by Sigma-Aldrich Corp.; hereinafter, referred to as "3PCBG")

(125) Trivalent phosphorus compound BH: 2,2'-bis(diphenylphosphino)-1,1'-binaphthyl (manufactured by Sigma-Aldrich Corp.; hereinafter, referred to as "3PCBH")

(126) Trivalent phosphorus compound BI: 2,2'-bis[di(3,5-xylyl)phosphino]-1,1'-binaphthyl (2,2'-bis[di(3,5-dimethylphenyl)phosphino]-1,1'-binaphthyl) (manufactured by Sigma-Aldrich Corp.; hereinafter, referred to as "3PCBI")

(127) Trivalent phosphorus compound BJ: 1,1'-bis(diisopropylphosphino)ferrocene (manufactured by Tokyo Chemical Industry Co., Ltd.; hereinafter, referred to as "3PCBJ")

(128) Trivalent phosphorus compound BK: 1,1'-bis(di-tert-butylphosphino)ferrocene (manufactured by Tokyo Chemical Industry Co., Ltd.; hereinafter, referred to as "3PCBK")

(129) Trivalent phosphorus compound BL: 1,1'-bis(diphenylphosphino)ferrocene (manufactured by Sigma-Aldrich Corp.; hereinafter, referred to as "3PCBL")

(130) Trivalent phosphorus compound BM: 1,1'-bis[2,5-dimethylphosphorano]ferrocene (manufactured by Sigma-Aldrich Corp.; hereinafter, referred to as "3PCBM")

(131) Trivalent phosphorus compound BN: bis(2-diphenylphosphinoethyl)phenylphosphine (manufactured by Sigma-Aldrich Corp.; hereinafter, referred to as "3PCBN")

(132) Trivalent phosphorus compound BO: tris[2-(diphenylphosphino)ethyl]phosphine (manufactured by Sigma-Aldrich Corp.; hereinafter, referred to as "3PCBO")

(Ketone Compound)

(133) Ketone compound A: acetone (manufactured by Sigma-Aldrich Corp.; hereinafter, referred to as "MKCA")

(134) Ketone compound B: 2-butanone (manufactured by Sigma-Aldrich Corp.; hereinafter, referred to as "MKCB")

(135) Ketone compound C: cyclobutanone (manufactured by Sigma-Aldrich Corp.; hereinafter, referred to as "MKCC")

(136) Ketone compound D: 3-pentanone (manufactured by Sigma-Aldrich Corp.; hereinafter, referred to as "MKCD")

(137) Ketone compound E: 3-methyl-2-butanone (manufactured by Sigma-Aldrich Corp.; hereinafter, referred to as "MKCE")

(138) Ketone compound F: cyclopentanone (manufactured by Sigma-Aldrich Corp.; hereinafter, referred to as "MKCF")

(139) Ketone compound G: 3-hexanone (manufactured by Sigma-Aldrich Corp.; hereinafter, referred to as "MKCG")

(140) Ketone compound H: 3,3-dimethyl-2-butanone (manufactured by Sigma-Aldrich Corp.; hereinafter, referred to as "MKCH")

(141) Ketone compound I: 3-methyl-2-pentanone (manufactured by Sigma-Aldrich Corp.; hereinafter, referred to as "MKCI")

(142) Ketone compound J: cyclohexanone (manufactured by Sigma-Aldrich Corp.; hereinafter, referred to as "MKCJ")

(143) Ketone compound K: 3-heptanone (manufactured by Sigma-Aldrich Corp.; hereinafter, referred to as "MKCK")

(144) Ketone compound L: 3-octanone (manufactured by Sigma-Aldrich Corp.; hereinafter, referred to as "MKCL")

(145) Ketone compound M: cyclooctanone (manufactured by Sigma-Aldrich Corp.; hereinafter, referred to as "MKCM")

(146) Ketone compound N: 5-nonanone (manufactured by Sigma-Aldrich Corp.; hereinafter, referred to as "MKCN")

(147) Ketone compound O: cyclononanone (manufactured by Sigma-Aldrich Corp.; hereinafter, referred to as "MKCO")

(148) Ketone compound P: 2-decanone (manufactured by Sigma-Aldrich Corp.; hereinafter, referred to as "MKCP")

(149) Ketone compound Q: cyclodecanone (manufactured by Sigma-Aldrich Corp.; hereinafter, referred to as "MKCQ")

(150) Ketone compound R: 2-undecanone (manufactured by Sigma-Aldrich Corp.; hereinafter, referred to as "MKCR")

(151) Ketone compound S: 3-dodecanone (manufactured by Sigma-Aldrich Corp.; hereinafter, referred to as "MKCS")

(152) Ketone compound T: cyclododecanone (manufactured by Sigma-Aldrich Corp.; hereinafter, referred to as "MKCT")

(153) Ketone compound U: 7-tridecanone (manufactured by Sigma-Aldrich Corp.; hereinafter, referred to as "MKCU")

(154) Ketone compound V: 3-tetradecanone (manufactured by Sigma-Aldrich Corp.; hereinafter, referred to as "MKCV")

(155) Ketone compound W: 1-[1,1'-biphenyl]-4-yl-2-cyclohexane ethanone (manufactured by Sigma-Aldrich Corp.; hereinafter, referred to as "MKCW")

(156) Ketone compound X: 1-(4'-methyl[1,1'-biphenyl]-4-yl)-1-octadecanone (manufactured by Sigma-Aldrich Corp.; hereinafter, referred to as "MKCX")

(157) Ketone compound Y: 2,3-butanedione (manufactured by Sigma-Aldrich Corp.; hereinafter, referred to as "MKCY")

(158) Ketone compound Z: 2,3-pentanedione (manufactured by Sigma-Aldrich Corp.; hereinafter, referred to as "MKCZ")

(159) Ketone compound AA: 2,4-pentanedione (manufactured by Sigma-Aldrich Corp.; hereinafter, referred to as "MKCAA")

(160) Ketone compound AB: 2,3-hexanedione (manufactured by Sigma-Aldrich Corp.; hereinafter, referred to as "MKCAB")

(161) Ketone compound AC: 2,5-hexanedione (manufactured by Sigma-Aldrich Corp.; hereinafter, referred to as "MKCAC")

(162) Ketone compound AD: 1,2-cyclohexanedione (manufactured by Sigma-Aldrich Corp.; hereinafter, referred to as "MKCAD")

(163) Ketone compound AE: 1,3-cyclohexanedione (manufactured by Sigma-Aldrich Corp.; hereinafter, referred to as "MKCAE")

(164) Ketone compound AF: 1,4-cyclohexanedione (manufactured by Sigma-Aldrich Corp.; hereinafter, referred to as "MKCAF")

(165) Ketone compound AG: 3-methyl-1,2-cyclopentanedione (manufactured by Sigma-Aldrich Corp.; hereinafter, referred to as "MKCAG")

(166) Ketone compound AH: 2,3-heptanedione (manufactured by Sigma-Aldrich Corp.; hereinafter, referred to as "MKCAH")

(167) Ketone compound AI: bicyclo[2,2,1]heptane-2,5-dione (manufactured by Sigma-Aldrich Corp.; hereinafter, referred to as "MKCAI")

(168) Ketone compound AJ: 1,4-cyclooctanedione (manufactured by Sigma-Aldrich Corp.; hereinafter, referred to as "MKCAJ")

(169) Ketone compound AK: octahydro-1,5-naphthalenedione (manufactured by Sigma-Aldrich Corp.; hereinafter, referred to as "MKCAK")

(170) Ketone compound AL: 1,2-cyclodecanedione (manufactured by Sigma-Aldrich Corp.; hereinafter, referred to as "MKCAL")

(171) Ketone compound AM: 3,9-undecanedione (manufactured by Sigma-Aldrich Corp.; hereinafter, referred to as "MKCAM")

(172) Ketone compound AN: 1,2-cyclododecanedione (manufactured by Sigma-Aldrich Corp.; hereinafter, referred to as "MKCAN")

(173) Ketone compound AO: 1,6-diphenyl-1,6-hexanedione (manufactured by Sigma-Aldrich Corp.; hereinafter, referred to as "MKCAO")

(174) Ketone compound AP: 2-acetyl-1,3-cyclopentanedione (manufactured by Sigma-Aldrich Corp.; hereinafter, referred to as "MKCAP")

(175) Ketone compound AQ: 1,3-diphenyl-1,2,3-propanetrione (manufactured by Sigma-Aldrich Corp.; hereinafter, referred to as "MKCAQ")

(176) Ketone compound AR: 2,6-dibenzoylcyclohexanone (manufactured by Sigma-Aldrich Corp.; hereinafter, referred to as "MKCAR")

(177) Ketone compound AS: 3,4-diacetyl-2,5-hexanedione (manufactured by Sigma-Aldrich Corp.; hereinafter, referred to as "MKCAS")

(Boron Trihalide Compound)

(178) Boron trihalide compound A: boron trifluoride-dimethyl ether complex (manufactured by Wako Pure Chemical Industries, Ltd.; hereinafter, referred to as "BF3DME")

(179) Boron trihalide compound B: boron trifluoride-diethyl ether complex (manufactured by Wako Pure Chemical Industries, Ltd.; hereinafter, referred to as "BF3DEE")

(180) Boron trihalide compound C: boron trifluoride-dibutyl ether complex (manufactured by Sigma-Aldrich Corp.; hereinafter, referred to as "BF3 DBE")

(181) Boron trihalide compound D: boron trifluoride-tert-butyl methyl ether complex (manufactured by Sigma-Aldrich Corp.; hereinafter, referred to as "BF3TBME")

(182) Boron trihalide compound E: boron trifluoride-tetrahydrofuran complex (manufactured by Sigma-Aldrich Corp.; hereinafter, referred to as "BF3THF")

(183) Boron trihalide compound F: boron trifluoride-methyl sulfide complex (manufactured by Sigma-Aldrich Corp.; hereinafter, referred to as "BF3DMS")

(184) Boron trihalide compound G: boron trifluoride-methanol complex (manufactured by Tokyo Chemical Industry Co., Ltd.; hereinafter, referred to as "BF3MNOL")

(185) Boron trihalide compound H: boron trifluoride-propanol complex (manufactured by Sigma-Aldrich Corp.; hereinafter, referred to as "BF3PNOL")

(186) Boron trihalide compound I: boron trifluoride-acetic acid complex (manufactured by Sigma-Aldrich Corp.; hereinafter, referred to as "BF3ACOH")

(187) Boron trihalide compound J: boron trifluoride-phenol complex (manufactured by Sigma-Aldrich Corp.; hereinafter, referred to as "BF3PHNOL")

(188) Boron trihalide compound K: boron trifluoride-ethylamine complex (manufactured by Sigma-Aldrich Corp.; hereinafter, referred to as "BF3MEA")

(189) Boron trihalide compound L: boron trifluoride-piperidine complex (manufactured by Tokyo Chemical Industry Co., Ltd.; hereinafter, referred to as "BF3PPD")

(190) Boron trihalide compound M: boron trichloride (1.0 mol/L dichloromethane solution) (manufactured by Sigma-Aldrich Corp.; hereinafter, referred to as "BCl3DCM")

(191) Boron trihalide compound N: boron tribromide (1.0 mol/L dichloromethane solution) (manufactured by Sigma-Aldrich Corp.; hereinafter, referred to as "BBr3DCM")

(Thermal Polymerization Promoter)

(192) Phosphonium salt compound: tetra-n-butylphosphonium bromide (manufactured by Wako Pure Chemical Industries, Ltd.; hereinafter, referred to as "TBPB")

(193) Amine compound A: tributylamine (manufactured by Wako Pure Chemical Industries, Ltd.; hereinafter, referred to as "TBA")

(194) Amine compound B: N,N-dimethylcyclohexylamine (manufactured by Wako Pure Chemical Industries, Ltd.; hereinafter, referred to as "DMCHA")

(195) Amine compound C: N,N-diethylethanolamine (manufactured by Wako Pure Chemical Industries, Ltd.; hereinafter, referred to as "DEENA")

(196) Sulfonium salt compound A: trade name "SI-25" (manufactured by Sanshin Chemical Industry Co., Ltd.; hereinafter, referred to as "S25")

(197) Sulfonium salt compound B: trade name "SI-60" (manufactured by Sanshin Chemical Industry Co., Ltd.; hereinafter, referred to as "S60")

(198) Sulfonium salt compound C: trade name "SI-100" (manufactured by Sanshin Chemical Industry Co., Ltd.; hereinafter, referred to as "S100")

(199) Sulfonium salt compound D: trade name "SI-150" (manufactured by Sanshin Chemical Industry Co., Ltd.; hereinafter, referred to as "S150")

(200) Sulfonium salt compound E: trade name "SI-180" (manufactured by Sanshin Chemical Industry Co., Ltd.; hereinafter, referred to as "S180")

(Additive Compound)

(201) Additive compound A: dichloromethane (manufactured by Wako Pure Chemical Industries, Ltd.; hereinafter, referred to as "DCM")

(202) Additive compound B: diethyl ether (manufactured by Wako Pure Chemical Industries, Ltd.; hereinafter, referred to as "DEE")

(Chain Transfer Agent)

(203) Chain transfer agent A: 1-butanol (manufactured by Wako Pure Chemical Industries, Ltd.; hereinafter, referred to as "CTRA")

(204) Chain transfer agent B: 2-butanol (manufactured by Wako Pure Chemical Industries, Ltd.; hereinafter, referred to as "CTRB")

(205) Chain transfer agent C: ethylene glycol (manufactured by Wako Pure Chemical Industries, Ltd.; hereinafter, referred to as "CTRC")

(206) Chain transfer agent D: 1,2-propanediol (manufactured by Wako Pure Chemical Industries, Ltd.; hereinafter, referred to as "CTRD")

(207) Chain transfer agent E: 2,3-butanediol (manufactured by Wako Pure Chemical Industries, Ltd.; hereinafter, referred to as "CTRE")

(208) Chain transfer agent F: butano-4-lactone (manufactured by Wako Pure Chemical Industries, Ltd.; hereinafter, referred to as "CTRF")

(209) Chain transfer agent G: pentano-4-lactone (manufactured by Sigma-Aldrich Corp.; hereinafter, referred to as "CTRG")

(210) Chain transfer agent H: ethylene carbonate (manufactured by Wako Pure Chemical Industries, Ltd.; hereinafter, referred to as "CTRH")

(211) Chain transfer agent I: propylene carbonate (manufactured by Sigma-Aldrich Corp.; hereinafter, referred to as "CTRI")

(212) Chain transfer agent J: 1,3-dioxan-2-one (manufactured by Sigma-Aldrich Corp.; hereinafter, referred to as "CTRJ")

(213) Chain transfer agent K: hexamethylcyclotrisiloxane (manufactured by Shin-Etsu Chemical Co., Ltd.; hereinafter, referred to as "CTRK")

(214) Chain transfer agent L: octamethylcyclotetrasiloxane (manufactured by Shin-Etsu Chemical Co., Ltd.; hereinafter, referred to as "CTRL")

Production Example 1

Production of Episulfide Compound

The episulfide compound was produced according to procedures below.

(1) Preparation: A water bath equipped with an immersion cooling and heating unit containing water and a stirring bar, or an oil bath containing oil and a stirring bar was placed on a magnetic stirrer and set to a predetermined temperature.

(2) Each starting material was put in a flask charged with a stirring bar according to the compositional ratio of Table 1 and mixed and stirred to prepare a homogeneous reaction solution in which a thiating agent was dissolved.

(3) Reaction was performed according to the reaction temperature and reaction time of Table 2.

(4) The reaction solution was left standing until the temperature became room temperature.

(5) Diethyl ether (manufactured by Wako Pure Chemical Industries, Ltd.) and ultrapure water (manufactured by Wako Pure Chemical Industries, Ltd.) were added to the reaction solution and mixed and stirred, then stirring was stopped, the reaction solution was left standing until the diethyl ether layer and the ultrapure water layer were separated, and the diethyl ether layer was recovered.

(6) Saturated saline was added to the diethyl ether layer obtained in (5) above, and mixed and stirred. Then, stirring was stopped, the reaction solution was left standing until the diethyl ether layer and the saturated saline layer were separated, and only the diethyl ether layer was recovered.

(7) Anhydrous magnesium sulfate (manufactured by Wako Pure Chemical Industries, Ltd.) was added to the diethyl ether layer obtained in (6) above, and mixed and stirred, and the anhydrous magnesium sulfate was removed by filtration to obtain a diethyl ether layer.

(8) Low-boiling compounds (including diethyl ether) contained in the diethyl ether layer obtained in (7) above were distilled off using a rotary evaporator to obtain a reaction product containing the episulfide compound.

(9) The reaction product obtained in (8) above was purified by the following method (A) or (B):

(A) With reference to methods illustrated in Shin Jikken Kagaku Koza (Lecture of New Experimental Chemistry in English) (Maruzen Co., Ltd.) and Kagaku Jikken Manual (Chemical Experiment Manual in English) (Gihodo Shuppan Co., Ltd.), the episulfide compound was purified by distillation.

(B) With reference to methods illustrated in Shin Jikken Kagaku Koza (Lecture of New Experimental Chemistry in English) (Maruzen Co., Ltd.) and Kagaku Jikken Manual (Chemical Experiment Manual in English) (Gihodo Shuppan Co., Ltd.), the episulfide compound was purified by performing separation by column chromatography and distilling off the eluent used.

As conditions for column chromatography, silica gel 60N (spherical, neutral) (manufactured by Kanto Chemical Co., Inc.) was used as a stationary phase, and a mixed solvent in which the content of ethyl acetate was gradually increased starting at n-hexane was used as a eluent.

In the present Production Example, purification was performed by the method (A).

(10) The WPT of the episulfide compound obtained in (9) above was calculated.

Production Examples 2 to 34

Episulfide compounds were produced by a method similar to Production Example 1 except that the compositional ratio of Table 1 and the reaction temperature, reaction time, purification method of Table 2 were used.

Example 1

Preparation of Boron Trihalide-Ether Compound (1) Preparation: A water bath equipped with an immersion cooling and heating unit was placed on a magnetic stirrer, and water and a stirring bar were put therein. The immersion cooling and heating unit was activated, and the temperature of water was set to 20° C.

(2) A reaction container filled with nitrogen gas was placed in the water bath of (1), and each starting material was added to the reaction container according to the compositional ratio of Table 3 and stirred for 1 hour.

(3) A vacuum distillation apparatus was attached to the reaction container, and the pressure was gradually reduced, finally reduced to 2 kPa, and maintained for 4 hours.

(4) Analysis by $^{11}$B-NMR was conducted using the reaction solution obtained in (3) above to thereby confirm that a complex was formed.

The boron trihalide-ether compound (hereinafter, referred to as "BF3-MECA") was prepared by performing the procedures of (1) to (4).

<Preparation and Polymerization of Polymerizable Composition>

(5) Preparation was performed by procedures similar to (1) above.

(6) A reaction container filled with nitrogen gas was placed in the water bath of (5), and each starting material was added to the reaction container according to the compositional ratio of Table 3 and stirred to thereby prepare a polymerizable composition.

(7) The polymerizable composition prepared in (6) above was polymerized according to the polymerization conditions of Table 4 to thereby obtain a polymer.

Examples 2 to 360

Polymerizable compositions were prepared and polymers were obtained by a method similar to Example 1 except that the compositional ratios and polymerization conditions of Tables 3 to 32 were used.

In Examples 29 to 35, 47 to 50, 57 to 61, 148 to 154, 166 to 169, 176 to 180, 245 to 251, 263 to 266, 273 to 277, 311 to 317, 329 to 332, and 339 to 343, samples for polymerizability evaluation and side reactivity evaluation were prepared in sealed pressure-resistant bottles in order to perform the evaluations.

The evaluation results of the polymerizable compositions prepared in Examples 1 to 360 are shown in Tables 7, 8, 15, 16, 17, 24, 25, 31, and 32.

Comparative Examples 1 to 56

The polymerizable compositions of Comparative Examples 1 to 56 were prepared by a method similar to Example 1 above according to the composition of Tables 33 and 34, and polymers were obtained according to the polymerization conditions of Tables 35 and 36. In Comparative Examples 23 to 29, 41 to 44, and 51 to 55, samples for polymerizability evaluation and side reactivity evaluation were prepared in sealed pressure-resistant bottles in order to perform the evaluations. The evaluation results of the polymerizable compositions prepared in Comparative Examples 1 to 56 are shown in Tables 35 and 36.

TABLE 1

| | Epoxy compound | | Thiating agent | | Hydroxy group compound | |
|---|---|---|---|---|---|---|
| | Name | % by mass | Name | % by mass | Name | % by mass |
| Production Example 1 | EO | 3 | TU | 9 | 12PD | 89 |
| Production Example 2 | PO | 8 | TU | 20 | 12BD | 72 |
| Production Example 3 | 12EB | 9 | TU | 18 | 13PG | 73 |
| Production Example 4 | 12EP | 11 | TU | 19 | 12BD | 70 |
| Production Example 5 | 12EH | 13 | TU | 20 | 12PG | 68 |
| Production Example 6 | 12EHP | 14 | TU | 19 | 12BD | 67 |
| Production Example 7 | 12EO | 16 | TU | 18 | 12BD | 66 |
| Production Example 8 | 12ED | 18 | TU | 18 | 12BD | 64 |
| Production Example 9 | 12EDD | 21 | TU | 17 | 12BD | 62 |
| Production Example 10 | 12ETD | 23 | TU | 17 | 12BD | 60 |
| Production Example 11 | 12EHD | 26 | TU | 16 | 12BD | 58 |
| Production Example 12 | 12EOD | 28 | TU | 16 | 12BD | 56 |
| Production Example 13 | 12EEC | 30 | TU | 15 | 12BD | 55 |
| Production Example 14 | PGE | 18 | TU | 18 | 12BD | 64 |
| Production Example 15 | Bis-A-1 | 18 | TU | 14 | 13BD | 68 |
| Production Example 16 | Hydrogenated Bis-A | 19 | TU | 14 | 13BD | 67 |
| Production Example 17 | Bis-A-2 | 19 | TU | 6 | 12BD | 75 |
| Production Example 18 | Bis-A-3 | 15 | TU | 4 | 12BD | 81 |
| Production Example 19 | Bis-A-4 | 14 | TU | 3 | 12BD | 83 |
| Production Example 20 | C5O | 11 | TU | 20 | 12BD | 70 |
| Production Example 21 | C6O | 12 | TU | 19 | 12BD | 68 |
| Production Example 22 | C7O | 14 | TU | 19 | 12BD | 67 |
| Production Example 23 | C8O | 15 | TU | 19 | 12BD | 66 |
| Production Example 24 | CEL | 16 | TU | 18 | 12BD | 66 |
| Production Example 25 | BEDS | 12 | TU | 19 | 12BD | 69 |
| Production Example 26 | BGTD | 21 | TU | 17 | 12BD | 62 |
| Production Example 27 | BCTD | 22 | TU | 17 | 12BD | 61 |
| Production Example 28 | TGCS | 20 | TU | 17 | 12BD | 62 |
| Production Example 29 | TCCS | 21 | TU | 17 | 12BD | 62 |
| Production Example 30 | BDMO | 9 | TU | 20 | 12BD | 71 |
| Production Example 31 | EPHE | 12 | TU | 19 | 12BD | 68 |
| Production Example 32 | AGE | 14 | TU | 19 | 12BD | 67 |
| Production Example 33 | EVCH | 15 | TU | 19 | 12BD | 66 |
| Production Example 34 | GLMT | 17 | TU | 18 | 12BD | 65 |

TABLE 2

| | WPE (g/eq) | Reaction temperature (° C.) | Reaction time (HR) | Purification method | Product Name | WPT (g/eq) |
|---|---|---|---|---|---|---|
| Production Example 1 | 44 | 0 | 6 | A | EPI-1 | 60 |
| Production Example 2 | 58 | 20 | 6 | A | EPI-2 | 74 |
| Production Example 3 | 72 | 20 | 2 | A | EPI-3 | 88 |
| Production Example 4 | 86 | 20 | 3 | A | EPI-4 | 102 |
| Production Example 5 | 100 | 20 | 3 | A | EPI-5 | 116 |

TABLE 2-continued

| | WPE (g/eq) | Reaction temper-ature (° C.) | Reaction time (HR) | Purifica-tion method | Product Name | WPT (g/eq) |
|---|---|---|---|---|---|---|
| Production Example 6 | 114 | 20 | 2 | A | EPI-6 | 130 |
| Production Example 7 | 128 | 20 | 1 | B | EPI-7 | 144 |
| Production Example 8 | 156 | 20 | 3 | B | EPI-8 | 172 |
| Production Example 9 | 184 | 20 | 2 | B | EPI-9 | 200 |
| Production Example 10 | 212 | 20 | 2 | B | EPI-10 | 228 |
| Production Example 11 | 240 | 20 | 4 | B | EPI-11 | 256 |
| Production Example 12 | 268 | 20 | 2 | B | EPI-12 | 285 |
| Production Example 13 | 297 | 20 | 3 | B | EPI-13 | 313 |
| Production Example 14 | 150 | 20 | 2 | A | EPI-14 | 166 |
| Production Example 15 | 189 | 20 | 2 | B | EPI-15 | 205 |
| Production Example 16 | 205 | 20 | 4 | B | EPI-16 | 221 |
| Production Example 17 | 480 | 60 | 6 | B | EPI-17 | 498 |
| Production Example 18 | 560 | 80 | 5 | B | EPI-18 | 578 |
| Production Example 19 | 650 | 80 | 6 | B | EPI-19 | 671 |
| Production Example 20 | 84 | 20 | 12 | A | EPI-20 | 100 |

TABLE 2-continued

| | WPE (g/eq) | Reaction temper-ature (° C.) | Reaction time (HR) | Purifica-tion method | Product Name | WPT (g/eq) |
|---|---|---|---|---|---|---|
| Production Example 21 | 98 | 20 | 8 | A | EPI-21 | 114 |
| Production Example 22 | 112 | 20 | 18 | A | EPI-22 | 128 |
| Production Example 23 | 126 | 20 | 22 | A | EPI-23 | 142 |
| Production Example 24 | 131 | 20 | 15 | B | EPI-24 | 147 |
| Production Example 25 | 91 | 20 | 2 | B | EPI-25 | 107 |
| Production Example 26 | 181 | 20 | 1 | B | EPI-26 | 197 |
| Production Example 27 | 191 | 20 | 15 | B | EPI-27 | 207 |
| Production Example 28 | 174 | 20 | 1 | B | EPI-28 | 190 |
| Production Example 29 | 184 | 20 | 18 | B | EPI-29 | 200 |
| Production Example 30 | 70 | 20 | 4 | A | EPI-30 | 86 |
| Production Example 31 | 98 | 20 | 2 | A | EPI-31 | 114 |
| Production Example 32 | 114 | 20 | 1 | A | EPI-32 | 130 |
| Production Example 33 | 124 | 20 | 20 | A | EPI-33 | 140 |
| Production Example 34 | 142 | 20 | 2 | A | EPI-34 | 158 |

TABLE 3

| | Ether compound | | Boron trihalide compound | | Additive compound | | Boron trihalide-ether compound |
|---|---|---|---|---|---|---|---|
| | Name | % by mass | Name | % by mass | Name | % by mass | Name |
| Example 1 | MECA | 21 | BF3DEE | 79 | — | — | BF3-MECA |
| Example 2 | MECB | 24 | BF3DEE | 76 | — | — | BF3-MECB |
| Example 3 | MECC | 24 | BF3DEE | 76 | — | — | BF3-MECC-1 |
| Example 4 | MECD | 24 | BF3DEE | 76 | — | — | BF3-MECD |
| Example 5 | MECE | 29 | BF3DEE | 71 | — | — | BF3-MECE |
| Example 6 | MECF | 24 | BF3DEE | 76 | — | — | BF3-MECF |
| Example 7 | MECG | 28 | BF3DEE | 72 | — | — | BF3-MECG |
| Example 8 | MECH | 24 | BF3DEE | 76 | — | — | BF3-MECH |
| Example 9 | MECI | 34 | BF3DEE | 66 | — | — | BF3-MECI |
| Example 10 | MECJ | 24 | BF3DEE | 76 | — | — | BF3-MECJ |
| Example 11 | MECK | 38 | BF3DEE | 62 | — | — | BF3-MECK |
| Example 12 | MECL | 28 | BF3DEE | 72 | — | — | BF3-MECL |
| Example 13 | MECM | 30 | BF3DEE | 70 | — | — | BF3-MECM |
| Example 14 | MECN | 24 | BF3DEE | 76 | — | — | BF3-MECN |
| Example 15 | MECO | 34 | BF3DEE | 66 | — | — | BF3-MECO |
| Example 16 | MECP | 18 | BF3DEE | 46 | DCM | 36 | BF3-MECP |
| Example 17 | MECQ | 16 | BF3DEE | 52 | DCM | 32 | BF3-MECQ |
| Example 18 | MECR | 18 | BF3DEE | 47 | DCM | 35 | BF3-MECR |
| Example 19 | MECS | 17 | BF3DEE | 48 | DCM | 35 | BF3-MECS |
| Example 20 | MECT | 19 | BF3DEE | 43 | DCM | 38 | BF3-MECT |
| Example 21 | MECU | 19 | BF3DEE | 43 | DCM | 38 | BF3-MECU |
| Example 22 | MECV | 18 | BF3DEE | 46 | DCM | 36 | BF3-MECV |
| Example 23 | MECW | 18 | BF3DEE | 45 | DCM | 37 | BF3-MECW |
| Example 24 | MECX | 18 | BF3DEE | 47 | DCM | 35 | BF3-MECX |
| Example 25 | MECY | 21 | BF3DEE | 37 | DCM | 42 | BF3-MECY |
| Example 26 | MECZ | 24 | BF3DEE | 29 | DCM | 47 | BF3-MECZ |
| Example 27 | MECC | 3 | BCl3DCM | 97 | — | — | BCl3-MECC |
| Example 28 | MECC | 3 | BBr3DCM | 97 | — | — | BBr3-MECC |
| Example 29 | MECC | 24 | BF3DEE | 76 | — | — | BF3-MECC-1 |
| Example 30 | MECC | 24 | BF3DEE | 76 | — | — | BF3-MECC-1 |
| Example 31 | MECC | 24 | BF3DEE | 76 | — | — | BF3-MECC-1 |
| Example 32 | MECC | 24 | BF3DEE | 76 | — | — | BF3-MECC-1 |
| Example 33 | MECC | 24 | BF3DEE | 76 | — | — | BF3-MECC-1 |
| Example 34 | MECC | 24 | BF3DEE | 76 | — | — | BF3-MECC-1 |
| Example 35 | MECC | 24 | BF3DEE | 76 | — | — | BF3-MECC-1 |

TABLE 3-continued

| | Ether compound Name | Ether compound % by mass | Boron trihalide compound Name | Boron trihalide compound % by mass | Additive compound Name | Additive compound % by mass | Boron trihalide-ether compound Name |
|---|---|---|---|---|---|---|---|
| Example 36 | MECC | 24 | BF3DEE | 76 | — | — | BF3-MECC-1 |
| Example 37 | MECC | 24 | BF3DEE | 76 | — | — | BF3-MECC-1 |
| Example 38 | MECC | 24 | BF3DEE | 76 | — | — | BF3-MECC-1 |
| Example 39 | MECC | 24 | BF3DEE | 76 | — | — | BF3-MECC-1 |
| Example 40 | MECC | 24 | BF3DEE | 76 | — | — | BF3-MECC-1 |

TABLE 4

| | Ether compound Name | Ether compound % by mass | Boron trihalide compound Name | Boron trihalide compound % by mass | Additive compound Name | Additive compound % by mass | Boron trihalide-ether compound Name |
|---|---|---|---|---|---|---|---|
| Example 41 | MECC | 24 | BF3DEE | 76 | — | — | BF3-MECC-1 |
| Example 42 | MECC | 24 | BF3DEE | 76 | — | — | BF3-MECC-1 |
| Example 43 | MECC | 24 | BF3DEE | 76 | — | — | BF3-MECC-1 |
| Example 44 | MECC | 24 | BF3DEE | 76 | — | — | BF3-MECC-1 |
| Example 45 | MECC | 24 | BF3DEE | 76 | — | — | BF3-MECC-1 |
| Example 46 | MECC | 24 | BF3DEE | 76 | — | — | BF3-MECC-1 |
| Example 47 | MECC | 24 | BF3DEE | 76 | — | — | BF3-MECC-1 |
| Example 48 | MECC | 24 | BF3DEE | 76 | — | — | BF3-MECC-1 |
| Example 49 | MECC | 24 | BF3DEE | 76 | — | — | BF3-MECC-1 |
| Example 50 | MECC | 24 | BF3DEE | 76 | — | — | BF3-MECC-1 |
| Example 51 | MECC | 24 | BF3DEE | 76 | — | — | BF3-MECC-1 |
| Example 52 | MECC | 24 | BF3DEE | 76 | — | — | BF3-MECC-1 |
| Example 53 | MECC | 24 | BF3DEE | 76 | — | — | BF3-MECC-1 |
| Example 54 | MECC | 24 | BF3DEE | 76 | — | — | BF3-MECC-1 |
| Example 55 | MECC | 24 | BF3DEE | 76 | — | — | BF3-MECC-1 |
| Example 56 | MECC | 24 | BF3DEE | 76 | — | — | BF3-MECC-1 |
| Example 57 | MECC | 24 | BF3DEE | 76 | — | — | BF3-MECC-1 |
| Example 58 | MECC | 24 | BF3DEE | 76 | — | — | BF3-MECC-1 |
| Example 59 | MECC | 24 | BF3DEE | 76 | — | — | BF3-MECC-1 |
| Example 60 | MECC | 24 | BF3DEE | 76 | — | — | BF3-MECC-1 |
| Example 61 | MECC | 24 | BF3DEE | 76 | — | — | BF3-MECC-1 |
| Example 62 | MECC | 99.7 | BF3DEE | 0.3 | — | — | BF3-MECC-2 |
| Example 63 | MECC | 99 | BF3DEE | 1 | — | — | BF3-MECC-3 |
| Example 64 | MECC | 97 | BF3DEE | 3 | — | — | BF3-MECC-4 |
| Example 65 | MECC | 32 | BF3DEE | 68 | — | — | BF3-MECC-5 |
| Example 66 | MECC | 38 | BF3DEE | 62 | — | — | BF3-MECC-6 |
| Example 67 | MECC | 24 | BF3DEE | 76 | — | — | BF3-MECC-1 |
| Example 68 | MECC | 24 | BF3DEE | 76 | — | — | BF3-MECC-1 |
| Example 69 | MECC | 24 | BF3DEE | 76 | — | — | BF3-MECC-1 |
| Example 70 | MECC | 24 | BF3DEE | 76 | — | — | BF3-MECC-1 |
| Example 71 | MECC | 24 | BF3DEE | 76 | — | — | BF3-MECC-1 |
| Example 72 | MECC | 24 | BF3DEE | 76 | — | — | BF3-MECC-1 |
| Example 73 | MECC | 24 | BF3DEE | 76 | — | — | BF3-MECC-1 |
| Example 74 | MECC | 24 | BF3DEE | 76 | — | — | BF3-MECC-1 |
| Example 75 | MECC | 24 | BF3DEE | 76 | — | — | BF3-MECC-1 |
| Example 76 | MECC | 24 | BF3DEE | 76 | — | — | BF3-MECC-1 |
| Example 77 | MECC | 24 | BF3DEE | 76 | — | — | BF3-MECC-1 |
| Example 78 | MECC | 24 | BF3DEE | 76 | — | — | BF3-MECC-1 |

TABLE 5

| | Boron trihalide-ether compound Name | Boron trihalide-ether compound % by mass | Episulfide compound Name | Episulfide compound % by mass | Additive compound Name | Additive compound % by mass |
|---|---|---|---|---|---|---|
| Example 1 | BF3-MECA | 0.01 | EPI-14 | 99.99 | — | — |
| Example 2 | BF3-MECB | 0.01 | EPI-14 | 99.99 | — | — |
| Example 3 | BF3-MECC-1 | 0.01 | EPI-14 | 99.99 | — | — |
| Example 4 | BF3-MECD | 0.01 | EPI-14 | 99.99 | — | — |
| Example 5 | BF3-MECE | 0.01 | EPI-14 | 99.99 | — | — |
| Example 6 | BF3-MECF | 0.01 | EPI-14 | 99.99 | — | — |
| Example 7 | BF3-MECG | 0.01 | EPI-14 | 99.99 | — | — |
| Example 8 | BF3-MECH | 0.01 | EPI-14 | 99.99 | — | — |
| Example 9 | BF3-MECI | 0.01 | EPI-14 | 99.99 | — | — |
| Example 10 | BF3-MECJ | 0.01 | EPI-14 | 99.99 | — | — |

TABLE 5-continued

| | Boron trihalide-ether compound Name | Boron trihalide-ether compound % by mass | Episulfide compound Name | Episulfide compound % by mass | Additive compound Name | Additive compound % by mass |
|---|---|---|---|---|---|---|
| Example 11 | BF3-MECK | 0.01 | EPI-14 | 99.99 | — | — |
| Example 12 | BF3-MECL | 0.01 | EPI-14 | 99.99 | — | — |
| Example 13 | BF3-MECM | 0.01 | EPI-14 | 99.99 | — | — |
| Example 14 | BF3-MECN | 0.01 | EPI-14 | 99.99 | — | — |
| Example 15 | BF3-MECO | 0.01 | EPI-14 | 99.99 | — | — |
| Example 16 | BF3-MECP | 0.01 | EPI-14 | 99.93 | DCM | 0.07 |
| Example 17 | BF3-MECQ | 0.01 | EPI-14 | 99.93 | DCM | 0.06 |
| Example 18 | BF3-MECR | 0.01 | EPI-14 | 99.93 | DCM | 0.07 |
| Example 19 | BF3-MECS | 0.01 | EPI-14 | 99.93 | DCM | 0.06 |
| Example 20 | BF3-MECT | 0.01 | EPI-14 | 99.92 | DCM | 0.07 |

TABLE 5-continued

| | Boron trihalide-ether compound | | Episulfide compound | | Additive compound | |
|---|---|---|---|---|---|---|
| | Name | % by mass | Name | % by mass | Name | % by mass |
| Example 21 | BF3-MECU | 0.01 | EPI-14 | 99.92 | DCM | 0.07 |
| Example 22 | BF3-MECV | 0.01 | EPI-14 | 99.93 | DCM | 0.07 |
| Example 23 | BF3-MECW | 0.01 | EPI-14 | 99.92 | DCM | 0.07 |
| Example 24 | BF3-MECX | 0.01 | EPI-14 | 99.93 | DCM | 0.07 |
| Example 25 | BF3-MECY | 0.01 | EPI-14 | 99.91 | DCM | 0.08 |
| Example 26 | BF3-MECZ | 0.01 | EPI-14 | 99.89 | DCM | 0.10 |
| Example 27 | BCl3-MECC | 0.01 | EPI-14 | 99.99 | — | — |
| Example 28 | BBr3-MECC | 0.02 | EPI-14 | 99.98 | — | — |
| Example 29 | BF3-MECC-1 | 0.02 | EPI-1 | 99.98 | — | — |
| Example 30 | BF3-MECC-1 | 0.02 | EPI-2 | 99.98 | — | — |
| Example 31 | BF3-MECC-1 | 0.01 | EPI-3 | 99.99 | — | — |
| Example 32 | BF3-MECC-1 | 0.01 | EPI-4 | 99.99 | — | — |
| Example 33 | BF3-MECC-1 | 0.01 | EPI-5 | 99.99 | — | — |
| Example 34 | BF3-MECC-1 | 0.01 | EPI-6 | 99.99 | — | — |
| Example 35 | BF3-MECC-1 | 0.01 | EPI-7 | 99.99 | — | — |
| Example 36 | BF3-MECC-1 | 0.01 | EPI-8 | 99.99 | — | — |
| Example 37 | BF3-MECC-1 | 0.01 | EPI-9 | 99.99 | — | — |
| Example 38 | BF3-MECC-1 | 0.005 | EPI-10 | 99.995 | — | — |
| Example 39 | BF3-MECC-1 | 0.004 | EPI-11 | 99.996 | — | — |
| Example 40 | BF3-MECC-1 | 0.004 | EPI-12 | 99.996 | — | — |

TABLE 6

| | Boron trihalide-ether compound | | Episulfide compound | | Additive compound | |
|---|---|---|---|---|---|---|
| | Name | % by mass | Name | % by mass | Name | % by mass |
| Example 41 | BF3-MECC-1 | 0.004 | EPI-13 | 99.996 | — | — |
| Example 42 | BF3-MECC-1 | 0.1 | EPI-15 | 49.9 | DCM | 49.9 |
| Example 43 | BF3-MECC-1 | 0.3 | EPI-16 | 99.7 | — | — |
| Example 44 | BF3-MECC-1 | 0.06 | EPI-17 | 49.97 | DCM | 49.97 |

TABLE 6-continued

| | Boron trihalide-ether compound | | Episulfide compound | | Additive compound | |
|---|---|---|---|---|---|---|
| | Name | % by mass | Name | % by mass | Name | % by mass |
| Example 45 | BF3-MECC-1 | 0.05 | EPI-18 | 49.98 | DCM | 49.98 |
| Example 46 | BF3-MECC-1 | 0.04 | EPI-19 | 49.98 | DCM | 49.98 |
| Example 47 | BF3-MECC-1 | 0.01 | EPI-20 | 99.99 | — | — |
| Example 48 | BF3-MECC-1 | 0.01 | EPI-21 | 99.99 | — | — |
| Example 49 | BF3-MECC-1 | 0.01 | EPI-22 | 99.99 | — | — |
| Example 50 | BF3-MECC-1 | 0.01 | EPI-23 | 99.99 | — | — |
| Example 51 | BF3-MECC-1 | 0.4 | EPI-24 | 99.6 | — | — |
| Example 52 | BF3-MECC-1 | 0.5 | EPI-25 | 99.5 | — | — |
| Example 53 | BF3-MECC-1 | 0.3 | EPI-26 | 99.7 | — | — |
| Example 54 | BF3-MECC-1 | 0.3 | EPI-27 | 99.7 | — | — |
| Example 55 | BF3-MECC-1 | 0.3 | EPI-28 | 99.7 | — | — |
| Example 56 | BF3-MECC-1 | 0.3 | EPI-29 | 99.7 | — | — |
| Example 57 | BF3-MECC-1 | 0.01 | EPI-30 | 99.99 | — | — |
| Example 58 | BF3-MECC-1 | 0.01 | EPI-31 | 99.99 | — | — |
| Example 59 | BF3-MECC-1 | 0.01 | EPI-32 | 99.99 | — | — |
| Example 60 | BF3-MECC-1 | 0.01 | EPI-33 | 99.99 | — | — |
| Example 61 | BF3-MECC-1 | 0.01 | EPI-34 | 99.99 | — | — |
| Example 62 | BF3-MECC-2 | 5 | EPI-14 | 95 | — | — |
| Example 63 | BF3-MECC-3 | 3 | EPI-14 | 97 | — | — |
| Example 64 | BF3-MECC-4 | 0.5 | EPI-14 | 99.5 | — | — |
| Example 65 | BF3-MECC-5 | 0.01 | EPI-14 | 99.99 | — | — |
| Example 66 | BF3-MECC-6 | 0.01 | EPI-14 | 99.99 | — | — |
| Example 67 | BF3-MECC-1 | 0.003 | EPI-14 | 99.997 | — | — |
| Example 68 | BF3-MECC-1 | 0.001 | EPI-14 | 99.999 | — | — |
| Example 69 | BF3-MECC-1 | 6 | EPI-14 | 94 | — | — |
| Example 70 | BF3-MECC-1 | 3 | EPI-14 | 97 | — | — |
| Example 71 | BF3-MECC-1 | 1 | EPI-14 | 99 | — | — |
| Example 72 | BF3-MECC-1 | 0.7 | EPI-14 | 99.3 | — | — |
| Example 73 | BF3-MECC-1 | 0.3 | EPI-14 | 99.7 | — | — |
| Example 74 | BF3-MECC-1 | 0.07 | EPI-14 | 99.93 | — | — |
| Example 75 | BF3-MECC-1 | 0.01 | EPI-14 | 99.99 | — | — |
| Example 76 | BF3-MECC-1 | 0.01 | EPI-14 | 99.99 | — | — |
| Example 77 | BF3-MECC-1 | 0.01 | EPI-14 | 99.99 | — | — |
| Example 78 | BF3-MECC-1 | 0.01 | EPI-14 | 99.99 | — | — |

TABLE 7

| | WPT | α2 | β | Polymerization condition | | Stability evaluation A | | Stability evaluation B | | Polymerizability A | | Polymerizability B | | Side reactivity A | | Side reactivity B | Overall |
|---|---|---|---|---|---|---|---|---|---|---|---|---|---|---|---|---|---|
| | (g/mol) | | | (° C.) | (hr) | (%) | Judgment | (%) | Judgment | (%) | Judgment | (%) | Judgment | (%) | Judgment | Judgment | assessment |
| Example 1 | 166 | 1 | 0.01 | 70 | 2 | 9 | A | — | — | 98 | AA | — | — | 5 | A | — | A |
| Example 2 | 166 | 1 | 0.01 | 70 | 2 | 4 | AA | — | — | 98 | AA | — | — | 2 | AA | — | AA |
| Example 3 | 166 | 1 | 0.01 | 70 | 2 | 2 | AA | — | — | 98 | AA | — | — | 1 | AA | — | AA |
| Example 4 | 166 | 1 | 0.01 | 70 | 2 | 7 | A | — | — | 99 | AA | — | — | 2 | AA | — | A |
| Example 5 | 166 | 1 | 0.01 | 70 | 2 | 4 | AA | — | — | 99 | AA | — | — | 2 | AA | — | AA |
| Example 6 | 166 | 1 | 0.01 | 70 | 2 | 3 | AA | — | — | 98 | AA | — | — | 1 | AA | — | AA |
| Example 7 | 166 | 1 | 0.01 | 70 | 2 | 3 | AA | — | — | 99 | AA | — | — | 1 | AA | — | AA |
| Example 8 | 166 | 1 | 0.01 | 70 | 2 | 2 | AA | — | — | 95 | AA | — | — | 1 | AA | — | AA |
| Example 9 | 166 | 1 | 0.01 | 70 | 2 | 3 | AA | — | — | 98 | AA | — | — | 1 | AA | — | AA |
| Example 10 | 166 | 1 | 0.01 | 70 | 2 | 1 | AA | — | — | 95 | AA | — | — | 2 | AA | — | AA |
| Example 11 | 166 | 1 | 0.01 | 70 | 2 | 3 | AA | — | — | 98 | AA | — | — | 1 | AA | — | AA |
| Example 12 | 166 | 1 | 0.01 | 70 | 2 | 2 | AA | — | — | 95 | AA | — | — | 1 | AA | — | AA |
| Example 13 | 166 | 1 | 0.01 | 70 | 2 | 3 | AA | — | — | 96 | AA | — | — | 1 | AA | — | AA |
| Example 14 | 166 | 1 | 0.01 | 70 | 2 | 1 | AA | — | — | 94 | A | — | — | 2 | AA | — | AA |
| Example 15 | 166 | 1 | 0.01 | 70 | 2 | 3 | AA | — | — | 96 | AA | — | — | 1 | AA | — | AA |
| Example 16 | 166 | 1 | 0.01 | 70 | 2 | 1 | AA | — | — | 95 | AA | — | — | 2 | AA | — | AA |
| Example 17 | 166 | 1 | 0.01 | 70 | 2 | 1 | AA | — | — | 93 | A | — | — | 2 | AA | — | AA |
| Example 18 | 166 | 1 | 0.01 | 70 | 2 | 1 | AA | — | — | 94 | A | — | — | 3 | A | — | A |
| Example 19 | 166 | 1 | 0.01 | 70 | 2 | 1 | AA | — | — | 93 | A | — | — | 3 | A | — | A |
| Example 20 | 166 | 1 | 0.01 | 70 | 2 | 1 | AA | — | — | 94 | A | — | — | 3 | A | — | A |
| Example 21 | 166 | 1 | 0.01 | 70 | 2 | 1 | AA | — | — | 93 | A | — | — | 4 | A | — | A |
| Example 22 | 166 | 1 | 0.01 | 70 | 2 | 0 | AA | — | — | 91 | A | — | — | 4 | A | — | A |
| Example 23 | 166 | 1 | 0.01 | 70 | 2 | 0 | AA | — | — | 91 | A | — | — | 4 | A | — | A |
| Example 24 | 166 | 1 | 0.01 | 70 | 2 | 0 | AA | — | — | 90 | A | — | — | 5 | A | — | A |
| Example 25 | 166 | 1 | 0.01 | 70 | 2 | 1 | AA | — | — | 93 | A | — | — | 4 | A | — | A |
| Example 26 | 166 | 1 | 0.01 | 70 | 2 | 2 | AA | — | — | 95 | AA | — | — | 4 | A | — | A |

TABLE 7-continued

| | WPT (g/mol) | α2 | β | Polymerization condition (° C.) | Polymerization condition (hr) | Stability evaluation A (%) | Stability evaluation A Judg-ment | Stability evaluation B (%) | Stability evaluation B Judg-ment | Polymeriz-ability A (%) | Polymeriz-ability A Judg-ment | Polymeriz-ability B (%) | Polymeriz-ability B Judg-ment | Side reac-tivity A (%) | Side reac-tivity A Judg-ment | Side reac-tivity B Judg-ment | Overall assess-ment |
|---|---|---|---|---|---|---|---|---|---|---|---|---|---|---|---|---|---|
| Example 27 | 166 | 1 | 0.01 | 70 | 2 | 6 | A | — | — | 100 | AA | — | — | 3 | A | — | A |
| Example 28 | 166 | 1 | 0.01 | 70 | 2 | 9 | A | — | — | 100 | AA | — | — | 5 | A | — | A |
| Example 29 | 60 | 1 | 0.01 | 70 | 2 | 9 | A | — | — | 92 | A | — | — | 4 | A | — | A |
| Example 30 | 74 | 1 | 0.01 | 70 | 2 | 7 | A | — | — | 94 | A | — | — | 3 | A | — | A |
| Example 31 | 88 | 1 | 0.01 | 70 | 2 | 5 | AA | — | — | 95 | AA | — | — | 3 | A | — | A |
| Example 32 | 102 | 1 | 0.01 | 70 | 2 | 3 | AA | — | — | 96 | AA | — | — | 2 | AA | — | AA |
| Example 33 | 116 | 1 | 0.01 | 70 | 2 | 2 | AA | — | — | 97 | AA | — | — | 2 | AA | — | AA |
| Example 34 | 130 | 1 | 0.01 | 70 | 2 | 2 | AA | — | — | 98 | AA | — | — | 1 | AA | — | AA |
| Example 35 | 144 | 1 | 0.01 | 70 | 2 | 1 | AA | — | — | 99 | AA | — | — | 2 | AA | — | AA |
| Example 36 | 172 | 1 | 0.01 | 70 | 2 | 2 | AA | — | — | 98 | AA | — | — | 1 | AA | — | AA |
| Example 37 | 200 | 1 | 0.01 | 80 | 2 | 2 | AA | — | — | 98 | AA | — | — | 1 | AA | — | AA |
| Example 38 | 228 | 1 | 0.01 | 80 | 2 | 2 | AA | — | — | 99 | AA | — | — | 2 | AA | — | AA |
| Example 39 | 256 | 1 | 0.01 | 80 | 2 | 2 | AA | — | — | 98 | AA | — | — | 2 | AA | — | AA |
| Example 40 | 285 | 1 | 0.01 | 80 | 2 | 2 | AA | — | — | 98 | AA | — | — | 2 | AA | — | AA |

<Judgment> AA: Excellent, A: Good, C: Poor, <Overall assessment> AA, A: Accepted, C: Rejected

TABLE 8

| | WPT (g/mol) | α2 | β | Polymerization condition (° C.) | Polymerization condition (hr) | Stability evaluation A (%) | Stability evaluation A Judg-ment | Stability evaluation B (%) | Stability evaluation B Judg-ment | Polymeriz-ability A (%) | Polymeriz-ability A Judg-ment | Polymeriz-ability B (%) | Polymeriz-ability B Judg-ment | Side reac-tivity A (%) | Side reac-tivity A Judg-ment | Side reac-tivity B Judg-ment | Overall assess-ment |
|---|---|---|---|---|---|---|---|---|---|---|---|---|---|---|---|---|---|
| Example 41 | 313 | 1 | 0.01 | 80 | 2 | 2 | AA | — | — | 98 | AA | — | — | 2 | AA | — | AA |
| Example 42 | 205 | 1 | 0.5 | 100 | 4 | 2 | AA | — | — | — | — | 99 | AA | — | — | AA | AA |
| Example 43 | 221 | 1 | 0.5 | 100 | 4 | 2 | AA | — | — | — | — | 99 | AA | — | — | AA | AA |
| Example 44 | 498 | 1 | 0.5 | 100 | 4 | 3 | AA | — | — | — | — | 96 | AA | — | — | AA | AA |
| Example 45 | 578 | 1 | 0.5 | 100 | 4 | 2 | AA | — | — | — | — | 94 | A | — | — | AA | A |
| Example 46 | 671 | 1 | 0.5 | 100 | 4 | 3 | AA | — | — | — | — | 90 | A | — | — | AA | A |
| Example 47 | 100 | 1 | 0.01 | 70 | 2 | 9 | A | — | — | 100 | AA | — | — | 5 | A | — | A |
| Example 48 | 114 | 1 | 0.01 | 70 | 2 | 6 | A | — | — | 100 | AA | — | — | 2 | AA | — | A |
| Example 49 | 128 | 1 | 0.01 | 70 | 2 | 6 | A | — | — | 100 | AA | — | — | 3 | A | — | A |
| Example 50 | 142 | 1 | 0.01 | 70 | 2 | 7 | A | — | — | 100 | AA | — | — | 3 | A | — | A |
| Example 51 | 147 | 1 | 0.5 | 100 | 4 | 6 | A | — | — | — | — | 100 | AA | — | — | AA | A |
| Example 52 | 107 | 1 | 0.5 | 100 | 4 | 2 | AA | — | — | — | — | 98 | AA | — | — | AA | AA |
| Example 53 | 197 | 1 | 0.5 | 100 | 4 | 3 | AA | — | — | — | — | 99 | AA | — | — | AA | AA |
| Example 54 | 207 | 1 | 0.5 | 100 | 4 | 7 | A | — | — | — | — | 100 | AA | — | — | AA | A |
| Example 55 | 190 | 1 | 0.5 | 100 | 4 | 2 | AA | — | — | — | — | 99 | AA | — | — | AA | AA |
| Example 56 | 200 | 1 | 0.5 | 100 | 4 | 7 | A | — | — | — | — | 100 | AA | — | — | AA | A |
| Example 57 | 86 | 1 | 0.01 | 70 | 2 | 5 | AA | — | — | 98 | AA | — | — | 3 | A | — | A |
| Example 58 | 114 | 1 | 0.01 | 70 | 2 | 3 | AA | — | — | 99 | AA | — | — | 2 | AA | — | AA |
| Example 59 | 130 | 1 | 0.01 | 70 | 2 | 2 | AA | — | — | 99 | AA | — | — | 2 | AA | — | AA |
| Example 60 | 140 | 1 | 0.01 | 70 | 2 | 2 | AA | — | — | 98 | AA | — | — | 1 | AA | — | AA |
| Example 61 | 158 | 1 | 0.01 | 70 | 2 | 2 | AA | — | — | 99 | AA | — | — | 2 | AA | — | AA |
| Example 62 | 166 | 1000 | 0.01 | 70 | 2 | 1 | AA | — | — | 90 | A | — | — | 0 | AA | — | A |
| Example 63 | 166 | 500 | 0.01 | 70 | 2 | 1 | AA | — | — | 93 | A | — | — | 0 | AA | — | A |
| Example 64 | 166 | 100 | 0.01 | 70 | 2 | 1 | AA | — | — | 95 | AA | — | — | 1 | AA | — | AA |
| Example 65 | 166 | 1.5 | 0.01 | 70 | 2 | 1 | AA | — | — | 98 | AA | — | — | 1 | AA | — | AA |
| Example 66 | 166 | 2 | 0.01 | 70 | 2 | 1 | AA | — | — | 98 | AA | — | — | 1 | AA | — | AA |
| Example 67 | 166 | 1 | 0.005 | 70 | 2 | 1 | AA | — | — | 94 | A | — | — | 1 | AA | — | A |
| Example 68 | 166 | 1 | 0.001 | 70 | 2 | 0 | AA | — | — | 91 | A | — | — | 1 | AA | — | A |
| Example 69 | 166 | 1 | 10 | 70 | 2 | 9 | A | — | — | 100 | AA | — | — | 5 | A | — | A |
| Example 70 | 166 | 1 | 5 | 70 | 2 | 6 | A | — | — | 100 | AA | — | — | 3 | A | — | A |
| Example 71 | 166 | 1 | 2 | 70 | 2 | 4 | AA | — | — | 100 | AA | — | — | 2 | AA | — | AA |
| Example 72 | 166 | 1 | 1 | 70 | 2 | 2 | AA | — | — | 100 | AA | — | — | 1 | AA | — | AA |
| Example 73 | 166 | 1 | 0.5 | 70 | 2 | 2 | AA | — | — | 99 | AA | — | — | 1 | AA | — | AA |
| Example 74 | 166 | 1 | 0.1 | 70 | 2 | 2 | AA | — | — | 98 | AA | — | — | 1 | AA | — | AA |
| Example 75 | 166 | 1 | 0.01 | 50 | 24 | 2 | AA | — | — | 98 | AA | — | — | 0 | AA | — | AA |
| Example 76 | 166 | 1 | 0.01 | 100 | 0.5 | 2 | AA | — | — | 100 | AA | — | — | 1 | AA | — | AA |
| Example 77 | 166 | 1 | 0.01 | 120 | 0.2 | 2 | AA | — | — | 100 | AA | — | — | 2 | AA | — | AA |
| Example 78 | 166 | 1 | 0.01 | 140 | 0.1 | 2 | AA | — | — | 100 | AA | — | — | 4 | A | — | A |

<Judgment> AA: Excellent, A: Good, C: Poor, <Overall assessment> AA, A: Accepted, C: Rejected

TABLE 9

| | Trivalent phosphorus compound | | Boron trihalide compound | | Additive compound | | Boron trihalide-trivalent phosphorus compound |
|---|---|---|---|---|---|---|---|
| | Name | % by mass | Name | % by mass | Name | % by mass | Name |
| Example 79 | 3PCA | 35 | BF3DEE | 65 | — | — | BF3-3PCA |
| Example 80 | 3PCB | 39 | BF3DEE | 61 | — | — | BF3-3PCB |
| Example 81 | 3PCC | 42 | BF3DEE | 58 | — | — | BF3-3PCC |
| Example 82 | 3PCD | 45 | BF3DEE | 55 | — | — | BF3-3PCD |
| Example 83 | 3PCE | 53 | BF3DEE | 47 | — | — | BF3-3PCE |
| Example 84 | 3PCF | 53 | BF3DEE | 47 | — | — | BF3-3PCF |
| Example 85 | 3PCG | 26 | BF3DEE | 23 | DCM | 51 | BF3-3PCG |
| Example 86 | 3PCH | 26 | BF3DEE | 21 | DCM | 52 | BF3-3PCH |
| Example 87 | 3PCI | 59 | BF3DEE | 41 | — | — | BF3-3PCI |
| Example 88 | 3PCJ | 59 | BF3DEE | 41 | — | — | BF3-3PCJ |
| Example 89 | 3PCK | 27 | BF3DEE | 19 | DCM | 54 | BF3-3PCK |
| Example 90 | 3PCL | 27 | BF3DEE | 18 | DCM | 55 | BF3-3PCL |
| Example 91 | 3PCM | 28 | BF3DEE | 17 | DCM | 55 | BF3-3PCM |
| Example 92 | 3PCN | 61 | BF3DEE | 39 | — | — | BF3-3PCN |
| Example 93 | 3PCO | 63 | BF3DEE | 37 | — | — | BF3-3PCO |
| Example 94 | 3PCP | 28 | BF3DEE | 16 | DCM | 56 | BF3-3PCP |
| Example 95 | 3PCQ | 29 | BF3DEE | 14 | DCM | 57 | BF3-3PCQ |
| Example 96 | 3PCR | 72 | BF3DEE | 28 | — | — | BF3-3PCR-1 |
| Example 97 | 3PCS | 29 | BF3DEE | 12 | DCM | 59 | BF3-3PCS |
| Example 98 | 3PCT | 28 | BF3DEE | 15 | DCM | 56 | BF3-3PCT |
| Example 99 | 3PCU | 28 | BF3DEE | 15 | DCM | 57 | BF3-3PCU |
| Example 100 | 3PCV | 29 | BF3DEE | 14 | DCM | 57 | BF3-3PCV |
| Example 101 | 3PCW | 29 | BF3DEE | 13 | DCM | 58 | BF3-3PCW |
| Example 102 | 3PCX | 29 | BF3DEE | 12 | DCM | 59 | BF3-3PCX |
| Example 103 | 3PCY | 29 | BF3DEE | 13 | DCM | 58 | BF3-3PCY |
| Example 104 | 3PCZ | 30 | BF3DEE | 10 | DCM | 60 | BF3-3PCZ |
| Example 105 | 3PCAA | 29 | BF3DEE | 13 | DCM | 58 | BF3-3PCAA |
| Example 106 | 3PCAB | 29 | BF3DEE | 13 | DCM | 58 | BF3-3PCAB |
| Example 107 | 3PCAC | 29 | BF3DEE | 13 | DCM | 58 | BF3-3PCAC |
| Example 108 | 3PCAD | 29 | BF3DEE | 12 | DCM | 59 | BF3-3PCAD |
| Example 109 | 3PCAE | 29 | BF3DEE | 12 | DCM | 59 | BF3-3PCAE |
| Example 110 | 3PCAF | 29 | BF3DEE | 12 | DCM | 59 | BF3-3PCAF |
| Example 111 | 3PCAG | 29 | BF3DEE | 12 | DCM | 59 | BF3-3PCAG |
| Example 112 | 3PCAH | 29 | BF3DEE | 12 | DCM | 59 | BF3-3PCAH |
| Example 113 | 3PCAI | 30 | BF3DEE | 10 | DCM | 60 | BF3-3PCAI |
| Example 114 | 3PCAJ | 30 | BF3DEE | 11 | DCM | 59 | BF3-3PCAJ |
| Example 115 | 3PCAK | 31 | BF3DEE | 8 | DCM | 61 | BF3-3PCAK |
| Example 116 | 3PCAL | 29 | BF3DEE | 13 | DCM | 58 | BF3-3PCAL |
| Example 117 | 3PCAM | 29 | BF3DEE | 13 | DCM | 58 | BF3-3PCAM |
| Example 118 | 3PCAN | 31 | BF3DEE | 8 | DCM | 61 | BF3-3PCAN |
| Example 119 | 3PCAO | 30 | BF3DEE | 9 | DCM | 61 | BF3-3PCAO |

TABLE 10

| | Trivalent phosphorus compound | | Boron trihalide compound | | Additive compound | | Boron trihalide-trivalent phosphorus compound |
|---|---|---|---|---|---|---|---|
| | Name | % by mass | Name | % by mass | Name | % by mass | Name |
| Example 120 | 3PCAP | 31 | BF3DEE | 7 | DCM | 62 | BF3-3PCAP |
| Example 121 | 3PCAQ | 28 | BF3DEE | 15 | DCM | 57 | BF3-3PCAQ |
| Example 122 | 3PCAR | 28 | BF3DEE | 15 | DCM | 57 | BF3-3PCAR |
| Example 123 | 3PCAS | 29 | BF3DEE | 14 | DCM | 58 | BF3-3PCAS |
| Example 124 | 3PCAT | 29 | BF3DEE | 12 | DCM | 59 | BF3-3PCAT |
| Example 125 | 3PCAU | 35 | BF3DEE | 65 | — | — | BF3-3PCAU |
| Example 126 | 3PCAV | 42 | BF3DEE | 58 | — | — | BF3-3PCAV |
| Example 127 | 3PCAW | 27 | BF3DEE | 19 | DCM | 54 | BF3-3PCAW |
| Example 128 | 3PCAX | 27 | BF3DEE | 18 | DCM | 54 | BF3-3PCAX |
| Example 129 | 3PCAY | 27 | BF3DEE | 18 | DCM | 55 | BF3-3PCAY |
| Example 130 | 3PCAZ | 28 | BF3DEE | 17 | DCM | 55 | BF3-3PCAZ |
| Example 131 | 3PCBA | 24 | BF3DEE | 27 | DCM | 49 | BF3-3PCBA |
| Example 132 | 3PCBB | 25 | BF3DEE | 25 | DCM | 50 | BF3-3PCBB |
| Example 133 | 3PCBC | 26 | BF3DEE | 23 | DCM | 51 | BF3-3PCBC |
| Example 134 | 3PCBD | 27 | BF3DEE | 20 | DCM | 53 | BF3-3PCBD |
| Example 135 | 3PCBE | 27 | BF3DEE | 19 | DCM | 54 | BF3-3PCBE |
| Example 136 | 3PCBF | 27 | BF3DEE | 18 | DCM | 55 | BF3-3PCBF |
| Example 137 | 3PCBG | 28 | BF3DEE | 17 | DCM | 55 | BF3-3PCBG |
| Example 138 | 3PCBH | 29 | BF3DEE | 13 | DCM | 58 | BF3-3PCBH |
| Example 139 | 3PCBI | 30 | BF3DEE | 11 | DCM | 59 | BF3-3PCBI |
| Example 140 | 3PCBJ | 27 | BF3DEE | 18 | DCM | 54 | BF3-3PCBJ |

TABLE 10-continued

| | Trivalent phosphorus compound | | Boron trihalide compound | | Additive compound | | Boron trihalide-trivalent phosphorus compound |
|---|---|---|---|---|---|---|---|
| | Name | % by mass | Name | % by mass | Name | % by mass | Name |
| Example 141 | 3PCBK | 28 | BF3DEE | 17 | DCM | 56 | BF3-3PCBK |
| Example 142 | 3PCBL | 22 | BF3DEE | 11 | DCM | 66 | BF3-3PCBL |
| Example 143 | 3PCBM | 18 | BF3DEE | 12 | DCM | 70 | BF3-3PCBM |
| Example 144 | 3PCBN | 15 | BF3DEE | 12 | DCM | 74 | BF3-3PCBN |
| Example 145 | 3PCBO | 13 | BF3DEE | 11 | DCM | 76 | BF3-3PCBO |
| Example 146 | 3PCR | 22 | BCl3DCM | 78 | — | — | BCl3-3PCR |
| Example 147 | 3PCR | 20 | BBr3DCM | 80 | — | — | BBr3-3PCR |
| Example 148 | 3PCR | 72 | BF3DEE | 28 | — | — | BF3-3PCR-1 |
| Example 149 | 3PCR | 72 | BF3DEE | 28 | — | — | BF3-3PCR-1 |
| Example 150 | 3PCR | 72 | BF3DEE | 28 | — | — | BF3-3PCR-1 |
| Example 151 | 3PCR | 72 | BF3DEE | 28 | — | — | BF3-3PCR-1 |
| Example 152 | 3PCR | 72 | BF3DEE | 28 | — | — | BF3-3PCR-1 |
| Example 153 | 3PCR | 72 | BF3DEE | 28 | — | — | BF3-3PCR-1 |
| Example 154 | 3PCR | 72 | BF3DEE | 28 | — | — | BF3-3PCR-1 |
| Example 155 | 3PCR | 72 | BF3DEE | 28 | — | — | BF3-3PCR-1 |
| Example 156 | 3PCR | 72 | BF3DEE | 28 | — | — | BF3-3PCR-1 |
| Example 157 | 3PCR | 72 | BF3DEE | 28 | — | — | BF3-3PCR-1 |
| Example 158 | 3PCR | 72 | BF3DEE | 28 | — | — | BF3-3PCR-1 |
| Example 159 | 3PCR | 72 | BF3DEE | 28 | — | — | BF3-3PCR-1 |

TABLE 11

| | Trivalent phosphorus compound | | Boron trihalide compound | | Additive compound | | Boron trihalide-trivalent phosphorus compound |
|---|---|---|---|---|---|---|---|
| | Name | % by mass | Name | % by mass | Name | % by mass | Name |
| Example 160 | 3PCR | 72 | BF3DEE | 28 | — | — | BF3-3PCR-1 |
| Example 161 | 3PCR | 72 | BF3DEE | 28 | — | — | BF3-3PCR-1 |
| Example 162 | 3PCR | 72 | BF3DEE | 28 | — | — | BF3-3PCR-1 |
| Example 163 | 3PCR | 72 | BF3DEE | 28 | — | — | BF3-3PCR-1 |
| Example 164 | 3PCR | 72 | BF3DEE | 28 | — | — | BF3-3PCR-1 |
| Example 165 | 3PCR | 72 | BF3DEE | 28 | — | — | BF3-3PCR-1 |
| Example 166 | 3PCR | 72 | BF3DEE | 28 | — | — | BF3-3PCR-1 |
| Example 167 | 3PCR | 72 | BF3DEE | 28 | — | — | BF3-3PCR-1 |
| Example 168 | 3PCR | 72 | BF3DEE | 28 | — | — | BF3-3PCR-1 |
| Example 169 | 3PCR | 72 | BF3DEE | 28 | — | — | BF3-3PCR-1 |
| Example 170 | 3PCR | 72 | BF3DEE | 28 | — | — | BF3-3PCR-1 |
| Example 171 | 3PCR | 72 | BF3DEE | 28 | — | — | BF3-3PCR-1 |
| Example 172 | 3PCR | 72 | BF3DEE | 28 | — | — | BF3-3PCR-1 |
| Example 173 | 3PCR | 72 | BF3DEE | 28 | — | — | BF3-3PCR-1 |
| Example 174 | 3PCR | 72 | BF3DEE | 28 | — | — | BF3-3PCR-1 |
| Example 175 | 3PCR | 72 | BF3DEE | 28 | — | — | BF3-3PCR-1 |
| Example 176 | 3PCR | 72 | BF3DEE | 28 | — | — | BF3-3PCR-1 |
| Example 177 | 3PCR | 72 | BF3DEE | 28 | — | — | BF3-3PCR-1 |
| Example 178 | 3PCR | 72 | BF3DEE | 28 | — | — | BF3-3PCR-1 |
| Example 179 | 3PCR | 72 | BF3DEE | 28 | — | — | BF3-3PCR-1 |
| Example 180 | 3PCR | 72 | BF3DEE | 28 | — | — | BF3-3PCR-1 |
| Example 181 | 3PCR | 96 | BF3DEE | 4 | — | — | BF3-3PCR-2 |
| Example 182 | 3PCR | 93 | BF3DEE | 7 | — | — | BF3-3PCR-3 |
| Example 183 | 3PCR | 84 | BF3DEE | 16 | — | — | BF3-3PCR-4 |
| Example 184 | 3PCR | 76 | BF3DEE | 24 | — | — | BF3-3PCR-5 |
| Example 185 | 3PCR | 80 | BF3DEE | 20 | — | — | BF3-3PCR-6 |
| Example 186 | 3PCR | 72 | BF3DEE | 28 | — | — | BF3-3PCR-1 |
| Example 187 | 3PCR | 72 | BF3DEE | 28 | — | — | BF3-3PCR-1 |
| Example 188 | 3PCR | 72 | BF3DEE | 28 | — | — | BF3-3PCR-1 |
| Example 189 | 3PCR | 72 | BF3DEE | 28 | — | — | BF3-3PCR-1 |
| Example 190 | 3PCR | 72 | BF3DEE | 28 | — | — | BF3-3PCR-1 |
| Example 191 | 3PCR | 72 | BF3DEE | 28 | — | — | BF3-3PCR-1 |
| Example 192 | 3PCR | 72 | BF3DEE | 28 | — | — | BF3-3PCR-1 |
| Example 193 | 3PCR | 72 | BF3DEE | 28 | — | — | BF3-3PCR-1 |
| Example 194 | 3PCR | 72 | BF3DEE | 28 | — | — | BF3-3PCR-1 |
| Example 195 | 3PCR | 72 | BF3DEE | 28 | — | — | BF3-3PCR-1 |
| Example 196 | 3PCR | 72 | BF3DEE | 28 | — | — | BF3-3PCR-1 |
| Example 197 | 3PCR | 72 | BF3DEE | 28 | — | — | BF3-3PCR-1 |

TABLE 12

| | Boron trihalide-trivalent phosphorus compound | | Episulfide compound | | Additive compound | |
|---|---|---|---|---|---|---|
| | Name | % by mass | Name | % by mass | Name | % by mass |
| Example 79 | BF3-3PCA | 0.01 | EPI-14 | 99.99 | — | — |
| Example 80 | BF3-3PCB | 0.01 | EPI-14 | 99.99 | — | — |
| Example 81 | BF3-3PCC | 0.01 | EPI-14 | 99.99 | — | — |
| Example 82 | BF3-3PCD | 0.01 | EPI-14 | 99.99 | — | — |
| Example 83 | BF3-3PCE | 0.01 | EPI-14 | 99.99 | — | — |
| Example 84 | BF3-3PCF | 0.01 | EPI-14 | 99.99 | — | — |
| Example 85 | BF3-3PCG | 0.01 | EPI-14 | 99.86 | DCM | 0.12 |
| Example 86 | BF3-3PCH | 0.01 | EPI-14 | 99.85 | DCM | 0.13 |
| Example 87 | BF3-3PCI | 0.02 | EPI-14 | 99.98 | — | — |
| Example 88 | BF3-3PCJ | 0.02 | EPI-14 | 99.98 | — | — |
| Example 89 | BF3-3PCK | 0.02 | EPI-14 | 99.84 | DCM | 0.15 |
| Example 90 | BF3-3PCL | 0.02 | EPI-14 | 99.83 | DCM | 0.15 |
| Example 91 | BF3-3PCM | 0.02 | EPI-14 | 99.82 | DCM | 0.16 |
| Example 92 | BF3-3PCN | 0.02 | EPI-14 | 99.98 | — | — |
| Example 93 | BF3-3PCO | 0.02 | EPI-14 | 99.98 | — | — |
| Example 94 | BF3-3PCP | 0.02 | EPI-14 | 99.81 | DCM | 0.17 |
| Example 95 | BF3-3PCQ | 0.02 | EPI-14 | 99.79 | DCM | 0.19 |
| Example 96 | BF3-3PCR-1 | 0.03 | EPI-14 | 99.97 | — | — |
| Example 97 | BF3-3PCS | 0.03 | EPI-14 | 99.74 | DCM | 0.23 |
| Example 98 | BF3-3PCT | 0.02 | EPI-14 | 99.80 | DCM | 0.18 |
| Example 99 | BF3-3PCU | 0.02 | EPI-14 | 99.79 | DCM | 0.19 |
| Example 100 | BF3-3PCV | 0.02 | EPI-14 | 99.78 | DCM | 0.19 |
| Example 101 | BF3-3PCW | 0.02 | EPI-14 | 99.78 | DCM | 0.20 |
| Example 102 | BF3-3PCX | 0.03 | EPI-14 | 99.75 | DCM | 0.23 |
| Example 103 | BF3-3PCY | 0.02 | EPI-14 | 99.77 | DCM | 0.21 |
| Example 104 | BF3-3PCZ | 0.03 | EPI-14 | 99.69 | DCM | 0.28 |
| Example 105 | BF3-3PCAA | 0.02 | EPI-14 | 99.78 | DCM | 0.20 |
| Example 106 | BF3-3PCAB | 0.02 | EPI-14 | 99.78 | DCM | 0.20 |
| Example 107 | BF3-3PCAC | 0.02 | EPI-14 | 99.78 | DCM | 0.20 |
| Example 108 | BF3-3PCAD | 0.03 | EPI-14 | 99.75 | DCM | 0.23 |
| Example 109 | BF3-3PCAE | 0.03 | EPI-14 | 99.75 | DCM | 0.23 |
| Example 110 | BF3-3PCAF | 0.02 | EPI-14 | 99.75 | DCM | 0.22 |
| Example 111 | BF3-3PCAG | 0.02 | EPI-14 | 99.75 | DCM | 0.22 |
| Example 112 | BF3-3PCAH | 0.02 | EPI-14 | 99.75 | DCM | 0.22 |
| Example 113 | BF3-3PCAI | 0.03 | EPI-14 | 99.69 | DCM | 0.28 |
| Example 114 | BF3-3PCAJ | 0.03 | EPI-14 | 99.73 | DCM | 0.25 |
| Example 115 | BF3-3PCAK | 0.04 | EPI-14 | 99.64 | DCM | 0.32 |
| Example 116 | BF3-3PCAL | 0.02 | EPI-14 | 99.77 | DCM | 0.21 |
| Example 117 | BF3-3PCAM | 0.02 | EPI-14 | 99.77 | DCM | 0.21 |
| Example 118 | BF3-3PCAN | 0.04 | EPI-14 | 99.64 | DCM | 0.32 |
| Example 119 | BF3-3PCAO | 0.03 | EPI-14 | 99.68 | DCM | 0.29 |

TABLE 13

| | Boron trihalide-trivalent phosphorus compound | | Episulfide compound | | Additive compound | |
|---|---|---|---|---|---|---|
| | Name | % by mass | Name | % by mass | Name | % by mass |
| Example 120 | BF3-3PCAP | 0.04 | EPI-14 | 99.56 | DCM | 0.40 |
| Example 121 | BF3-3PCAQ | 0.02 | EPI-14 | 99.80 | DCM | 0.18 |
| Example 122 | BF3-3PCAR | 0.02 | EPI-14 | 99.79 | DCM | 0.18 |
| Example 123 | BF3-3PCAS | 0.02 | EPI-14 | 99.78 | DCM | 0.20 |
| Example 124 | BF3-3PCAT | 0.03 | EPI-14 | 99.75 | DCM | 0.23 |
| Example 125 | BF3-3PCAU | 0.01 | EPI-14 | 99.99 | — | — |
| Example 126 | BF3-3PCAV | 0.02 | EPI-14 | 99.98 | — | — |
| Example 127 | BF3-3PCAW | 0.03 | EPI-14 | 99.71 | DCM | 0.26 |
| Example 128 | BF3-3PCAX | 0.03 | EPI-14 | 99.71 | DCM | 0.26 |
| Example 129 | BF3-3PCAY | 0.03 | EPI-14 | 99.70 | DCM | 0.27 |
| Example 130 | BF3-3PCAZ | 0.03 | EPI-14 | 99.69 | DCM | 0.28 |
| Example 131 | BF3-3PCBA | 0.02 | EPI-14 | 99.80 | DCM | 0.18 |
| Example 132 | BF3-3PCBB | 0.02 | EPI-14 | 99.79 | DCM | 0.19 |
| Example 133 | BF3-3PCBC | 0.02 | EPI-14 | 99.77 | DCM | 0.21 |
| Example 134 | BF3-3PCBD | 0.03 | EPI-14 | 99.74 | DCM | 0.24 |
| Example 135 | BF3-3PCBE | 0.03 | EPI-14 | 99.72 | DCM | 0.25 |
| Example 136 | BF3-3PCBF | 0.03 | EPI-14 | 99.70 | DCM | 0.27 |
| Example 137 | BF3-3PCBG | 0.03 | EPI-14 | 99.69 | DCM | 0.28 |
| Example 138 | BF3-3PCBH | 0.04 | EPI-14 | 99.59 | DCM | 0.37 |
| Example 139 | BF3-3PCBI | 0.05 | EPI-14 | 99.52 | DCM | 0.43 |
| Example 140 | BF3-3PCBJ | 0.03 | EPI-14 | 99.71 | DCM | 0.26 |
| Example 141 | BF3-3PCBK | 0.03 | EPI-14 | 99.67 | DCM | 0.29 |
| Example 142 | BF3-3PCBL | 0.04 | EPI-14 | 99.63 | DCM | 0.34 |
| Example 143 | BF3-3PCBM | 0.03 | EPI-14 | 99.71 | DCM | 0.26 |
| Example 144 | BF3-3PCBN | 0.04 | EPI-14 | 99.64 | DCM | 0.32 |
| Example 145 | BF3-3PCBO | 0.04 | EPI-14 | 99.56 | DCM | 0.40 |
| Example 146 | BCl3-3PCR | 0.03 | EPI-14 | 99.97 | — | — |
| Example 147 | BBr3-3PCR | 0.04 | EPI-14 | 99.96 | — | — |
| Example 148 | BF3-3PCR-1 | 0.07 | EPI-1 | 99.93 | — | — |
| Example 149 | BF3-3PCR-1 | 0.06 | EPI-2 | 99.94 | — | — |
| Example 150 | BF3-3PCR-1 | 0.05 | EPI-3 | 99.95 | — | — |
| Example 151 | BF3-3PCR-1 | 0.04 | EPI-4 | 99.96 | — | — |
| Example 152 | BF3-3PCR-1 | 0.04 | EPI-5 | 99.96 | — | — |
| Example 153 | BF3-3PCR-1 | 0.03 | EPI-6 | 99.97 | — | — |
| Example 154 | BF3-3PCR-1 | 0.03 | EPI-7 | 99.97 | — | — |
| Example 155 | BF3-3PCR-1 | 0.03 | EPI-8 | 99.97 | — | — |
| Example 156 | BF3-3PCR-1 | 0.02 | EPI-9 | 99.98 | — | — |
| Example 157 | BF3-3PCR-1 | 0.02 | EPI-10 | 99.98 | — | — |
| Example 158 | BF3-3PCR-1 | 0.02 | EPI-11 | 99.98 | — | — |
| Example 159 | BF3-3PCR-1 | 0.02 | EPI-12 | 99.98 | — | — |

TABLE 14

| | Boron trihalide-trivalent phosphorus compound | | Episulfide compound | | Additive compound | |
|---|---|---|---|---|---|---|
| | Name | % by mass | Name | % by mass | Name | % by mass |
| Example 160 | BF3-3PCR-1 | 0.01 | EPI-13 | 99.99 | — | — |
| Example 161 | BF3-3PCR-1 | 0.5 | EPI-15 | 49.7 | DCM | 49.7 |
| Example 162 | BF3-3PCR-1 | 1 | EPI-16 | 99 | — | — |
| Example 163 | BF3-3PCR-1 | 0.2 | EPI-17 | 49.9 | DCM | 49.9 |
| Example 164 | BF3-3PCR-1 | 0.2 | EPI-18 | 49.9 | DCM | 49.9 |
| Example 165 | BF3-3PCR-1 | 0.2 | EPI-19 | 49.9 | DCM | 49.9 |
| Example 166 | BF3-3PCR-1 | 0.04 | EPI-20 | 99.96 | — | — |
| Example 167 | BF3-3PCR-1 | 0.04 | EPI-21 | 99.96 | — | — |
| Example 168 | BF3-3PCR-1 | 0.03 | EPI-22 | 99.97 | — | — |
| Example 169 | BF3-3PCR-1 | 0.03 | EPI-23 | 99.97 | — | — |
| Example 170 | BF3-3PCR-1 | 1.5 | EPI-24 | 98.5 | — | — |
| Example 171 | BF3-3PCR-1 | 2 | EPI-25 | 98 | — | — |
| Example 172 | BF3-3PCR-1 | 1 | EPI-26 | 99 | — | — |
| Example 173 | BF3-3PCR-1 | 1 | EPI-27 | 99 | — | — |
| Example 174 | BF3-3PCR-1 | 1 | EPI-28 | 99 | — | — |
| Example 175 | BF3-3PCR-1 | 1 | EPI-29 | 99 | — | — |
| Example 176 | BF3-3PCR-1 | 0.05 | EPI-30 | 99.95 | — | — |
| Example 177 | BF3-3PCR-1 | 0.04 | EPI-31 | 99.96 | — | — |
| Example 178 | BF3-3PCR-1 | 0.03 | EPI-32 | 99.97 | — | — |
| Example 179 | BF3-3PCR-1 | 0.03 | EPI-33 | 99.97 | — | — |
| Example 180 | BF3-3PCR-1 | 0.03 | EPI-34 | 99.97 | — | — |
| Example 181 | BF3-3PCR-2 | 0.2 | EPI-14 | 99.8 | — | — |
| Example 182 | BF3-3PCR-3 | 0.1 | EPI-14 | 99.9 | — | — |
| Example 183 | BF3-3PCR-4 | 0.05 | EPI-14 | 99.95 | — | — |
| Example 184 | BF3-3PCR-5 | 0.03 | EPI-14 | 99.97 | — | — |
| Example 185 | BF3-3PCR-6 | 0.04 | EPI-14 | 99.96 | — | — |
| Example 186 | BF3-3PCR-1 | 0.01 | EPI-14 | 99.99 | — | — |
| Example 187 | BF3-3PCR-1 | 0.003 | EPI-14 | 99.997 | — | — |
| Example 188 | BF3-3PCR-1 | 21 | EPI-14 | 79 | — | — |
| Example 189 | BF3-3PCR-1 | 12 | EPI-14 | 88 | — | — |
| Example 190 | BF3-3PCR-1 | 5 | EPI-14 | 95 | — | — |
| Example 191 | BF3-3PCR-1 | 3 | EPI-14 | 97 | — | — |
| Example 192 | BF3-3PCR-1 | 1 | EPI-14 | 99 | — | — |
| Example 193 | BF3-3PCR-1 | 0.3 | EPI-14 | 99.7 | — | — |
| Example 194 | BF3-3PCR-1 | 0.03 | EPI-14 | 99.97 | — | — |
| Example 195 | BF3-3PCR-1 | 0.03 | EPI-14 | 99.97 | — | — |
| Example 196 | BF3-3PCR-1 | 0.03 | EPI-14 | 99.97 | — | — |
| Example 197 | BF3-3PCR-1 | 0.03 | EPI-14 | 99.97 | — | — |

TABLE 15

| | WPT | | | Polymerization condition | | Stability evaluation A | | Stability evaluation B | | Polymeriz-ability A | | Polymeriz-ability B | | Side reac-tivity A | | Side reac-tivity B | Overall |
|---|---|---|---|---|---|---|---|---|---|---|---|---|---|---|---|---|---|
| | (g/mol) | α3 | β | (° C.) | (hr) | (%) | Judg-ment | (%) | Judg-ment | (%) | Judg-ment | (%) | Judg-ment | (%) | Judg-ment | Judg-ment | assess-ment |
| Example 79 | 166 | 1 | 0.01 | 70 | 2 | 9 | A | — | — | 95 | AA | — | — | 4 | A | — | A |
| Example 80 | 166 | 1 | 0.01 | 70 | 2 | 8 | A | — | — | 96 | AA | — | — | 2 | AA | — | A |
| Example 81 | 166 | 1 | 0.01 | 70 | 2 | 7 | A | — | — | 97 | AA | — | — | 2 | AA | — | A |
| Example 82 | 166 | 1 | 0.01 | 70 | 2 | 5 | AA | — | — | 98 | AA | — | — | 2 | AA | — | AA |
| Example 83 | 166 | 1 | 0.01 | 70 | 2 | 3 | AA | — | — | 99 | AA | — | — | 2 | AA | — | AA |
| Example 84 | 166 | 1 | 0.01 | 70 | 2 | 3 | AA | — | — | 99 | AA | — | — | 2 | AA | — | AA |
| Example 85 | 166 | 1 | 0.01 | 70 | 2 | 4 | AA | — | — | 100 | AA | — | — | 2 | AA | — | AA |
| Example 86 | 166 | 1 | 0.01 | 70 | 2 | 4 | AA | — | — | 100 | AA | — | — | 2 | AA | — | AA |
| Example 87 | 166 | 1 | 0.01 | 70 | 2 | 2 | AA | — | — | 98 | AA | — | — | 1 | AA | — | AA |
| Example 88 | 166 | 1 | 0.01 | 70 | 2 | 2 | AA | — | — | 98 | AA | — | — | 1 | AA | — | AA |
| Example 89 | 166 | 1 | 0.01 | 70 | 2 | 3 | AA | — | — | 100 | AA | — | — | 2 | AA | — | AA |
| Example 90 | 166 | 1 | 0.01 | 70 | 2 | 3 | AA | — | — | 100 | AA | — | — | 2 | AA | — | AA |
| Example 91 | 166 | 1 | 0.01 | 70 | 2 | 3 | AA | — | — | 100 | AA | — | — | 2 | AA | — | AA |
| Example 92 | 166 | 1 | 0.01 | 70 | 2 | 2 | AA | — | — | 98 | AA | — | — | 1 | AA | — | AA |
| Example 93 | 166 | 1 | 0.01 | 70 | 2 | 2 | AA | — | — | 99 | AA | — | — | 1 | AA | — | AA |
| Example 94 | 166 | 1 | 0.01 | 70 | 2 | 3 | AA | — | — | 100 | AA | — | — | 2 | AA | — | AA |
| Example 95 | 166 | 1 | 0.01 | 70 | 2 | 2 | AA | — | — | 98 | AA | — | — | 2 | AA | — | AA |
| Example 96 | 166 | 1 | 0.01 | 70 | 2 | 1 | AA | — | — | 99 | AA | — | — | 1 | AA | — | AA |
| Example 97 | 166 | 1 | 0.01 | 70 | 2 | 2 | AA | — | — | 98 | AA | — | — | 2 | AA | — | AA |
| Example 98 | 166 | 1 | 0.01 | 70 | 2 | 9 | A | — | — | 95 | AA | — | — | 5 | A | — | A |
| Example 99 | 166 | 1 | 0.01 | 70 | 2 | 8 | A | — | — | 96 | AA | — | — | 5 | A | — | A |
| Example 100 | 166 | 1 | 0.01 | 70 | 2 | 7 | A | — | — | 97 | AA | — | — | 5 | A | — | A |
| Example 101 | 166 | 1 | 0.01 | 70 | 2 | 6 | A | — | — | 98 | AA | — | — | 5 | A | — | A |
| Example 102 | 166 | 1 | 0.01 | 70 | 2 | 8 | A | — | — | 97 | AA | — | — | 3 | A | — | A |
| Example 103 | 166 | 1 | 0.01 | 70 | 2 | 4 | AA | — | — | 98 | AA | — | — | 3 | A | — | A |
| Example 104 | 166 | 1 | 0.01 | 70 | 2 | 6 | A | — | — | 98 | AA | — | — | 2 | AA | — | A |
| Example 105 | 166 | 1 | 0.01 | 70 | 2 | 3 | AA | — | — | 98 | AA | — | — | 2 | AA | — | AA |
| Example 106 | 166 | 1 | 0.01 | 70 | 2 | 2 | AA | — | — | 98 | AA | — | — | 2 | AA | — | AA |
| Example 107 | 166 | 1 | 0.01 | 70 | 2 | 2 | AA | — | — | 97 | AA | — | — | 2 | AA | — | AA |
| Example 108 | 166 | 1 | 0.01 | 70 | 2 | 3 | AA | — | — | 99 | AA | — | — | 2 | AA | — | AA |
| Example 109 | 166 | 1 | 0.01 | 70 | 2 | 2 | AA | — | — | 99 | AA | — | — | 2 | AA | — | AA |
| Example 110 | 166 | 1 | 0.01 | 70 | 2 | 2 | AA | — | — | 98 | AA | — | — | 1 | AA | — | AA |
| Example 111 | 166 | 1 | 0.01 | 70 | 2 | 2 | AA | — | — | 98 | AA | — | — | 1 | AA | — | AA |
| Example 112 | 166 | 1 | 0.01 | 70 | 2 | 2 | AA | — | — | 98 | AA | — | — | 1 | AA | — | AA |
| Example 113 | 166 | 1 | 0.01 | 70 | 2 | 1 | AA | — | — | 99 | AA | — | — | 2 | AA | — | AA |
| Example 114 | 166 | 1 | 0.01 | 70 | 2 | 2 | AA | — | — | 98 | AA | — | — | 1 | AA | — | AA |
| Example 115 | 166 | 1 | 0.01 | 70 | 2 | 1 | AA | — | — | 96 | AA | — | — | 2 | AA | — | AA |
| Example 116 | 166 | 1 | 0.01 | 70 | 2 | 4 | AA | — | — | 95 | AA | — | — | 2 | AA | — | AA |
| Example 117 | 166 | 1 | 0.01 | 70 | 2 | 4 | AA | — | — | 98 | AA | — | — | 2 | AA | — | AA |
| Example 118 | 166 | 1 | 0.01 | 70 | 2 | 2 | AA | — | — | 99 | AA | — | — | 1 | AA | — | AA |
| Example 119 | 166 | 1 | 0.01 | 70 | 2 | 2 | AA | — | — | 99 | AA | — | — | 1 | AA | — | AA |

<Judgment> AA: Excellent, A: Good, C: Poor, <Overall assessment> AA, A: Accepted, C: Rejected

TABLE 16

| | WPT | | | Polymerization condition | | Stability evaluation A | | Stability evaluation B | | Polymeriz-ability A | | Polymeriz-ability B | | Side reac-tivity A | | Side reac-tivity B | Overall |
|---|---|---|---|---|---|---|---|---|---|---|---|---|---|---|---|---|---|
| | (g/mol) | α3 | β | (° C.) | (hr) | (%) | Judg-ment | (%) | Judg-ment | (%) | Judg-ment | (%) | Judg-ment | (%) | Judg-ment | Judg-ment | assess-ment |
| Example 120 | 166 | 1 | 0.01 | 70 | 2 | 2 | AA | — | — | 99 | AA | — | — | 1 | AA | — | AA |
| Example 121 | 166 | 1 | 0.01 | 70 | 2 | 6 | A | — | — | 98 | AA | — | — | 2 | AA | — | A |
| Example 122 | 166 | 1 | 0.01 | 70 | 2 | 4 | AA | — | — | 98 | AA | — | — | 2 | AA | — | AA |
| Example 123 | 166 | 1 | 0.01 | 70 | 2 | 6 | A | — | — | 100 | AA | — | — | 2 | AA | — | A |
| Example 124 | 166 | 1 | 0.01 | 70 | 2 | 4 | AA | — | — | 99 | AA | — | — | 2 | AA | — | AA |
| Example 125 | 166 | 1 | 0.01 | 70 | 2 | 2 | AA | — | — | 95 | AA | — | — | 2 | AA | — | AA |
| Example 126 | 166 | 1 | 0.01 | 70 | 2 | 1 | AA | — | — | 96 | AA | — | — | 1 | AA | — | AA |
| Example 127 | 166 | 1 | 0.01 | 70 | 2 | 1 | AA | — | — | 95 | AA | — | — | 2 | AA | — | AA |
| Example 128 | 166 | 1 | 0.01 | 70 | 2 | 1 | AA | — | — | 95 | AA | — | — | 2 | AA | — | AA |
| Example 129 | 166 | 1 | 0.01 | 70 | 2 | 1 | AA | — | — | 95 | AA | — | — | 2 | AA | — | AA |
| Example 130 | 166 | 1 | 0.01 | 70 | 2 | 1 | AA | — | — | 94 | A | — | — | 3 | A | — | A |
| Example 131 | 166 | 1 | 0.01 | 70 | 2 | 1 | AA | — | — | 98 | AA | — | — | 1 | AA | — | AA |
| Example 132 | 166 | 1 | 0.01 | 70 | 2 | 1 | AA | — | — | 98 | AA | — | — | 1 | AA | — | AA |
| Example 133 | 166 | 1 | 0.01 | 70 | 2 | 1 | AA | — | — | 98 | AA | — | — | 1 | AA | — | AA |
| Example 134 | 166 | 1 | 0.01 | 70 | 2 | 1 | AA | — | — | 98 | AA | — | — | 1 | AA | — | AA |
| Example 135 | 166 | 1 | 0.01 | 70 | 2 | 1 | AA | — | — | 95 | AA | — | — | 2 | AA | — | AA |

TABLE 16-continued

| | WPT (g/mol) | α3 | β | Polymerization condition (° C.) | Polymerization condition (hr) | Stability evaluation A (%) | Stability evaluation A Judgment | Stability evaluation B (%) | Stability evaluation B Judgment | Polymerizability A (%) | Polymerizability A Judgment | Polymerizability B (%) | Polymerizability B Judgment | Side reactivity A (%) | Side reactivity A Judgment | Side reactivity B Judgment | Overall assessment |
|---|---|---|---|---|---|---|---|---|---|---|---|---|---|---|---|---|---|
| Example 136 | 166 | 1 | 0.01 | 70 | 2 | 1 | AA | — | — | 95 | AA | — | — | 2 | AA | — | AA |
| Example 137 | 166 | 1 | 0.01 | 70 | 2 | 1 | AA | — | — | 94 | A | — | — | 3 | A | — | A |
| Example 138 | 166 | 1 | 0.01 | 70 | 2 | 1 | AA | — | — | 93 | A | — | — | 4 | A | — | A |
| Example 139 | 166 | 1 | 0.01 | 70 | 2 | 1 | AA | — | — | 92 | A | — | — | 5 | A | — | A |
| Example 140 | 166 | 1 | 0.01 | 70 | 2 | 1 | AA | — | — | 97 | AA | — | — | 2 | AA | — | AA |
| Example 141 | 166 | 1 | 0.01 | 70 | 2 | 1 | AA | — | — | 95 | AA | — | — | 2 | AA | — | AA |
| Example 142 | 166 | 1 | 0.01 | 70 | 2 | 1 | AA | — | — | 94 | A | — | — | 3 | AA | — | A |
| Example 143 | 166 | 1 | 0.01 | 70 | 2 | 1 | AA | — | — | 97 | AA | — | — | 2 | AA | — | AA |
| Example 144 | 166 | 1 | 0.01 | 70 | 2 | 0 | AA | — | — | 94 | A | — | — | 3 | A | — | A |
| Example 145 | 166 | 1 | 0.01 | 70 | 2 | 0 | AA | — | — | 92 | A | — | — | 4 | A | — | A |
| Example 146 | 166 | 1 | 0.01 | 70 | 2 | 6 | A | — | — | 100 | AA | — | — | 3 | A | — | A |
| Example 147 | 166 | 1 | 0.01 | 70 | 2 | 9 | A | — | — | 100 | AA | — | — | 5 | A | — | A |
| Example 148 | 60 | 1 | 0.01 | 70 | 2 | 9 | A | — | — | 92 | A | — | — | 4 | A | — | A |
| Example 149 | 74 | 1 | 0.01 | 70 | 2 | 7 | A | — | — | 94 | A | — | — | 3 | A | — | A |
| Example 150 | 88 | 1 | 0.01 | 70 | 2 | 5 | AA | — | — | 95 | AA | — | — | 3 | A | — | A |
| Example 151 | 102 | 1 | 0.01 | 70 | 2 | 3 | AA | — | — | 96 | AA | — | — | 2 | AA | — | AA |
| Example 152 | 116 | 1 | 0.01 | 70 | 2 | 2 | AA | — | — | 97 | AA | — | — | 2 | AA | — | AA |
| Example 153 | 130 | 1 | 0.01 | 70 | 2 | 2 | AA | — | — | 98 | AA | — | — | 1 | AA | — | AA |
| Example 154 | 144 | 1 | 0.01 | 70 | 2 | 1 | AA | — | — | 99 | AA | — | — | 1 | AA | — | AA |
| Example 155 | 172 | 1 | 0.01 | 70 | 2 | 1 | AA | — | — | 100 | AA | — | — | 1 | AA | — | AA |
| Example 156 | 200 | 1 | 0.01 | 80 | 2 | 1 | AA | — | — | 100 | AA | — | — | 1 | AA | — | AA |
| Example 157 | 228 | 1 | 0.01 | 80 | 2 | 1 | AA | — | — | 99 | AA | — | — | 1 | AA | — | AA |
| Example 158 | 256 | 1 | 0.01 | 80 | 2 | 1 | AA | — | — | 99 | AA | — | — | 1 | AA | — | AA |
| Example 159 | 285 | 1 | 0.01 | 80 | 2 | 1 | AA | — | — | 100 | AA | — | — | 1 | AA | — | AA |

<Judgment> AA: Excellent, A: Good, C: Poor, <Overall assessent> AA, A: Accepted, C: Rejected

TABLE 17

| | WPT (g/mol) | α3 | β | Polymerization condition (° C.) | Polymerization condition (hr) | Stability evaluation A (%) | Stability evaluation A Judgment | Stability evaluation B (%) | Stability evaluation B Judgment | Polymerizability A (%) | Polymerizability A Judgment | Polymerizability B (%) | Polymerizability B Judgment | Side reactivity A (%) | Side reactivity A Judgment | Side reactivity B Judgment | Overall assessment |
|---|---|---|---|---|---|---|---|---|---|---|---|---|---|---|---|---|---|
| Example 160 | 313 | 1 | 0.01 | 80 | 2 | 1 | AA | — | — | 99 | AA | — | — | 1 | AA | — | AA |
| Example 161 | 205 | 1 | 0.5 | 100 | 4 | 1 | AA | — | — | — | — | 100 | AA | — | — | AA | AA |
| Example 162 | 221 | 1 | 0.5 | 100 | 4 | 1 | AA | — | — | — | — | 100 | AA | — | — | AA | AA |
| Example 163 | 498 | 1 | 0.5 | 100 | 4 | 1 | AA | — | — | — | — | 100 | AA | — | — | AA | AA |
| Example 164 | 578 | 1 | 0.5 | 100 | 4 | 1 | AA | — | — | — | — | 93 | A | — | — | AA | A |
| Example 165 | 671 | 1 | 0.5 | 100 | 4 | 1 | AA | — | — | — | — | 90 | A | — | — | AA | A |
| Example 166 | 100 | 1 | 0.01 | 70 | 2 | 8 | A | — | — | 99 | AA | — | — | 4 | A | — | A |
| Example 167 | 114 | 1 | 0.01 | 70 | 2 | 6 | A | — | — | 100 | AA | — | — | 2 | AA | — | A |
| Example 168 | 128 | 1 | 0.01 | 70 | 2 | 7 | A | — | — | 99 | AA | — | — | 3 | A | — | A |
| Example 169 | 142 | 1 | 0.01 | 70 | 2 | 8 | A | — | — | 99 | AA | — | — | 3 | A | — | A |
| Example 170 | 147 | 1 | 0.5 | 100 | 4 | 6 | A | — | — | — | — | 100 | AA | — | — | AA | A |
| Example 171 | 107 | 1 | 0.5 | 100 | 4 | 1 | AA | — | — | — | — | 98 | AA | — | — | AA | AA |
| Example 172 | 197 | 1 | 0.5 | 100 | 4 | 2 | AA | — | — | — | — | 99 | AA | — | — | AA | AA |
| Example 173 | 207 | 1 | 0.5 | 100 | 4 | 6 | A | — | — | — | — | 100 | AA | — | — | AA | A |
| Example 174 | 190 | 1 | 0.5 | 100 | 4 | 1 | AA | — | — | — | — | 99 | AA | — | — | AA | AA |
| Example 175 | 200 | 1 | 0.5 | 100 | 4 | 6 | A | — | — | — | — | 100 | AA | — | — | AA | A |
| Example 176 | 86 | 1 | 0.01 | 70 | 2 | 5 | AA | — | — | 98 | AA | — | — | 3 | A | — | A |
| Example 177 | 114 | 1 | 0.01 | 70 | 2 | 3 | AA | — | — | 99 | AA | — | — | 2 | AA | — | AA |
| Example 178 | 130 | 1 | 0.01 | 70 | 2 | 2 | AA | — | — | 99 | AA | — | — | 1 | AA | — | AA |
| Example 179 | 140 | 1 | 0.01 | 70 | 2 | 2 | AA | — | — | 98 | AA | — | — | 1 | AA | — | AA |
| Example 180 | 158 | 1 | 0.01 | 70 | 2 | 2 | AA | — | — | 99 | AA | — | — | 2 | AA | — | AA |
| Example 181 | 166 | 10 | 0.01 | 70 | 2 | 9 | A | — | — | 90 | A | — | — | 5 | A | — | A |
| Example 182 | 166 | 5 | 0.01 | 70 | 2 | 6 | A | — | — | 93 | A | — | — | 3 | A | — | A |
| Example 183 | 166 | 2 | 0.01 | 70 | 2 | 1 | AA | — | — | 97 | AA | — | — | 1 | AA | — | AA |
| Example 184 | 166 | 1.2 | 0.01 | 70 | 2 | 1 | AA | — | — | 99 | AA | — | — | 1 | AA | — | AA |
| Example 185 | 166 | 1.5 | 0.01 | 70 | 2 | 0 | AA | — | — | 98 | AA | — | — | 1 | AA | — | AA |
| Example 186 | 166 | 1 | 0.005 | 70 | 2 | 0 | AA | — | — | 91 | A | — | — | 0 | AA | — | A |
| Example 187 | 166 | 1 | 0.001 | 70 | 2 | 0 | AA | — | — | 93 | A | — | — | 0 | AA | — | A |
| Example 188 | 166 | 1 | 10 | 70 | 2 | 7 | A | — | — | 100 | AA | — | — | 4 | A | — | A |
| Example 189 | 166 | 1 | 5 | 70 | 2 | 6 | A | — | — | 100 | AA | — | — | 3 | A | — | A |
| Example 190 | 166 | 1 | 2 | 70 | 2 | 2 | AA | — | — | 100 | AA | — | — | 1 | AA | — | AA |
| Example 191 | 166 | 1 | 1 | 70 | 2 | 2 | AA | — | — | 100 | AA | — | — | 1 | AA | — | AA |
| Example 192 | 166 | 1 | 0.5 | 70 | 2 | 2 | AA | — | — | 100 | AA | — | — | 1 | AA | — | AA |

TABLE 17-continued

| | WPT (g/mol) | α3 | β | Polymerization condition (° C.) | Polymerization condition (hr) | Stability evaluation A (%) | Stability evaluation A Judgment | Stability evaluation B (%) | Stability evaluation B Judgment | Polymerizability A (%) | Polymerizability A Judgment | Polymerizability B (%) | Polymerizability B Judgment | Side reactivity A (%) | Side reactivity A Judgment | Side reactivity B Judgment | Overall assessment |
|---|---|---|---|---|---|---|---|---|---|---|---|---|---|---|---|---|---|
| Example 193 | 166 | 1 | 0.1 | 70 | 2 | 2 | AA | — | — | 100 | AA | — | — | 1 | AA | — | AA |
| Example 194 | 166 | 1 | 0.01 | 50 | 24 | 1 | AA | — | — | 99 | AA | — | — | 0 | AA | — | AA |
| Example 195 | 166 | 1 | 0.01 | 100 | 0.5 | 1 | AA | — | — | 100 | AA | — | — | 1 | AA | — | AA |
| Example 196 | 166 | 1 | 0.01 | 120 | 0.2 | 1 | AA | — | — | 100 | AA | — | — | 2 | AA | — | AA |
| Example 197 | 166 | 1 | 0.01 | 140 | 0.1 | 1 | AA | — | — | 100 | AA | — | — | 4 | A | — | A |

<Judgment> AA: Excellent, A: Good, C: Poor, <Overall assessent> AA, A: Accepted, C: Rejected

TABLE 18

| | Ketone compound Name | Ketone compound % by mass | Boron trihalide compound Name | Boron trihalide compound % by mass | Additive compound Name | Additive compound % by mass | Boron trihalide-ketone compound Name |
|---|---|---|---|---|---|---|---|
| Example 198 | MKCA | 29 | BF3DEE | 71 | — | — | BF3-MKCA |
| Example 199 | MKCB | 34 | BF3DEE | 66 | — | — | BF3-MKCB |
| Example 200 | MKCC | 33 | BF3DEE | 67 | — | — | BF3-MKCC |
| Example 201 | MKCD | 38 | BF3DEE | 62 | — | — | BF3-MKCD |
| Example 202 | MKCE | 38 | BF3DEE | 62 | — | — | BF3-MKCE |
| Example 203 | MKCF | 37 | BF3DEE | 63 | — | — | BF3-MKCF |
| Example 204 | MKCG | 41 | BF3DEE | 59 | — | — | BF3-MKCG |
| Example 205 | MKCH | 41 | BF3DEE | 59 | — | — | BF3-MKCH |
| Example 206 | MKCI | 41 | BF3DEE | 59 | — | — | BF3-MKCI |
| Example 207 | MKCJ | 41 | BF3DEE | 59 | — | — | BF3-MKCJ-1 |
| Example 208 | MKCK | 45 | BF3DEE | 55 | — | — | BF3-MKCK |
| Example 209 | MKCL | 47 | BF3DEE | 53 | — | — | BF3-MKCL |
| Example 210 | MKCM | 24 | BF3DEE | 27 | DCM | 48 | BF3-MKCM |
| Example 211 | MKCN | 50 | BF3DEE | 50 | — | — | BF3-MKCN |
| Example 212 | MKCO | 25 | BF3DEE | 25 | DCM | 50 | BF3-MKCO |
| Example 213 | MKCP | 52 | BF3DEE | 48 | — | — | BF3-MKCP |
| Example 214 | MKCQ | 26 | BF3DEE | 23 | DCM | 51 | BF3-MKCQ |
| Example 215 | MKCR | 26 | BF3DEE | 22 | DCM | 52 | BF3-MKCR |
| Example 216 | MKCS | 27 | BF3DEE | 20 | DCM | 53 | BF3-MKCS |
| Example 217 | MKCT | 26 | BF3DEE | 21 | DCM | 53 | BF3-MKCT |
| Example 218 | MKCU | 27 | BF3DEE | 19 | DCM | 54 | BF3-MKCU |
| Example 219 | MKCV | 27 | BF3DEE | 18 | DCM | 55 | BF3-MKCV |
| Example 220 | MKCW | 28 | BF3DEE | 15 | DCM | 57 | BF3-MKCW |
| Example 221 | MKCX | 30 | BF3DEE | 10 | DCM | 60 | BF3-MKCX |
| Example 222 | MKCY | 23 | BF3DEE | 77 | — | — | BF3-MKCY |
| Example 223 | MKCZ | 26 | BF3DEE | 74 | — | — | BF3-MKCZ |
| Example 224 | MKCAA | 26 | BF3DEE | 74 | — | — | BF3-MKCAA |
| Example 225 | MKCAB | 29 | BF3DEE | 71 | — | — | BF3-MKCAB |
| Example 226 | MKCAC | 29 | BF3DEE | 71 | — | — | BF3-MKCAC |
| Example 227 | MKCAD | 28 | BF3DEE | 72 | — | — | BF3-MKCAD |
| Example 228 | MKCAE | 28 | BF3DEE | 72 | — | — | BF3-MKCAE |
| Example 229 | MKCAF | 28 | BF3DEE | 72 | — | — | BF3-MKCAF |
| Example 230 | MKCAG | 28 | BF3DEE | 72 | — | — | BF3-MKCAG |
| Example 231 | MKCAH | 31 | BF3DEE | 69 | — | — | BF3-MKCAH |
| Example 232 | MKCAI | 19 | BF3DEE | 43 | DCM | 38 | BF3-MKCAI |

TABLE 19

| | Ketone compound Name | Ketone compound % by mass | Boron trihalide compound Name | Boron trihalide compound % by mass | Additive compound Name | Additive compound % by mass | Boron trihalide-ketone compound Name |
|---|---|---|---|---|---|---|---|
| Example 233 | MKCAJ | 20 | BF3DEE | 40 | DCM | 40 | BF3-MKCAJ |
| Example 234 | MKCAK | 21 | BF3DEE | 36 | DCM | 42 | BF3-MKCAK |
| Example 235 | MKCAL | 21 | BF3DEE | 36 | DCM | 43 | BF3-MKCAL |
| Example 236 | MKCAM | 22 | BF3DEE | 34 | DCM | 44 | BF3-MKCAM |
| Example 237 | MKCAN | 22 | BF3DEE | 33 | DCM | 45 | BF3-MKCAN |
| Example 238 | MKCAO | 25 | BF3DEE | 26 | DCM | 49 | BF3-MKCAO |
| Example 239 | MKCAP | 17 | BF3DEE | 50 | DCM | 33 | BF3-MKCAP |
| Example 240 | MKCAQ | 21 | BF3DEE | 37 | DCM | 42 | BF3-MKCAQ |

TABLE 19-continued

| | Ketone compound | | Boron trihalide compound | | Additive compound | | Boron trihalide-ketone compound |
|---|---|---|---|---|---|---|---|
| | Name | % by mass | Name | % by mass | Name | % by mass | Name |
| Example 241 | MKCAR | 23 | BF3DEE | 32 | DCM | 46 | BF3-MKCAR |
| Example 242 | MKCAS | 17 | BF3DEE | 49 | DCM | 34 | BF3-MKCAS |
| Example 243 | MKCJ | 41 | BCl3DCM | 59 | — | — | BCl3-MKCJ |
| Example 244 | MKCJ | 41 | BBr3DCM | 59 | — | — | BBr3-MKCJ |
| Example 245 | MKCJ | 41 | BF3DEE | 59 | — | — | BF3-MKCJ-1 |
| Example 246 | MKCJ | 41 | BF3DEE | 59 | — | — | BF3-MKCJ-1 |
| Example 247 | MKCJ | 41 | BF3DEE | 59 | — | — | BF3-MKCJ-1 |
| Example 248 | MKCJ | 41 | BF3DEE | 59 | — | — | BF3-MKCJ-1 |
| Example 249 | MKCJ | 41 | BF3DEE | 59 | — | — | BF3-MKCJ-1 |
| Example 250 | MKCJ | 41 | BF3DEE | 59 | — | — | BF3-MKCJ-1 |
| Example 251 | MKCJ | 41 | BF3DEE | 59 | — | — | BF3-MKCJ-1 |
| Example 252 | MKCJ | 41 | BF3DEE | 59 | — | — | BF3-MKCJ-1 |
| Example 253 | MKCJ | 41 | BF3DEE | 59 | — | — | BF3-MKCJ-1 |
| Example 254 | MKCJ | 41 | BF3DEE | 59 | — | — | BF3-MKCJ-1 |
| Example 255 | MKCJ | 41 | BF3DEE | 59 | — | — | BF3-MKCJ-1 |
| Example 256 | MKCJ | 41 | BF3DEE | 59 | — | — | BF3-MKCJ-1 |
| Example 257 | MKCJ | 41 | BF3DEE | 59 | — | — | BF3-MKCJ-1 |
| Example 258 | MKCJ | 41 | BF3DEE | 59 | — | — | BF3-MKCJ-1 |
| Example 259 | MKCJ | 41 | BF3DEE | 59 | — | — | BF3-MKCJ-1 |
| Example 260 | MKCJ | 41 | BF3DEE | 59 | — | — | BF3-MKCJ-1 |
| Example 261 | MKCJ | 41 | BF3DEE | 59 | — | — | BF3-MKCJ-1 |
| Example 262 | MKCJ | 41 | BF3DEE | 59 | — | — | BF3-MKCJ-1 |
| Example 263 | MKCJ | 41 | BF3DEE | 59 | — | — | BF3-MKCJ-1 |
| Example 264 | MKCJ | 41 | BF3DEE | 59 | — | — | BF3-MKCJ-1 |
| Example 265 | MKCJ | 41 | BF3DEE | 59 | — | — | BF3-MKCJ-1 |
| Example 266 | MKCJ | 41 | BF3DEE | 59 | — | — | BF3-MKCJ-1 |
| Example 267 | MKCJ | 41 | BF3DEE | 59 | — | — | BF3-MKCJ-1 |

TABLE 20

| | Ketone compound | | Boron trihalide compound | | Additive compound | | Boron trihalide-ketone compound |
|---|---|---|---|---|---|---|---|
| | Name | % by mass | Name | % by mass | Name | % by mass | Name |
| Example 268 | MKCJ | 41 | BF3DEE | 59 | — | — | BF3-MKCJ-1 |
| Example 269 | MKCJ | 41 | BF3DEE | 59 | — | — | BF3-MKCJ-1 |
| Example 270 | MKCJ | 41 | BF3DEE | 59 | — | — | BF3-MKCJ-1 |
| Example 271 | MKCJ | 41 | BF3DEE | 59 | — | — | BF3-MKCJ-1 |
| Example 272 | MKCJ | 41 | BF3DEE | 59 | — | — | BF3-MKCJ-1 |
| Example 273 | MKCJ | 41 | BF3DEE | 59 | — | — | BF3-MKCJ-1 |
| Example 274 | MKCJ | 41 | BF3DEE | 59 | — | — | BF3-MKCJ-1 |
| Example 275 | MKCJ | 41 | BF3DEE | 59 | — | — | BF3-MKCJ-1 |
| Example 276 | MKCJ | 41 | BF3DEE | 59 | — | — | BF3-MKCJ-1 |
| Example 277 | MKCJ | 41 | BF3DEE | 59 | — | — | BF3-MKCJ-1 |
| Example 278 | MKCJ | 99.9 | BF3DEE | 0.1 | — | — | BF3-MKCJ-2 |
| Example 279 | MKCJ | 99.7 | BF3DEE | 0.3 | — | — | BF3-MKCJ-3 |
| Example 280 | MKCJ | 99 | BF3DEE | 1 | — | — | BF3-MKCJ-4 |
| Example 281 | MKCJ | 51 | BF3DEE | 49 | — | — | BF3-MKCJ-5 |
| Example 282 | MKCJ | 58 | BF3DEE | 42 | — | — | BF3-MKCJ-6 |
| Example 283 | MKCJ | 41 | BF3DEE | 59 | — | — | BF3-MKCJ-1 |
| Example 284 | MKCJ | 41 | BF3DEE | 59 | — | — | BF3-MKCJ-1 |
| Example 285 | MKCJ | 41 | BF3DEE | 59 | — | — | BF3-MKCJ-1 |
| Example 286 | MKCJ | 41 | BF3DEE | 59 | — | — | BF3-MKCJ-1 |
| Example 287 | MKCJ | 41 | BF3DEE | 59 | — | — | BF3-MKCJ-1 |
| Example 288 | MKCJ | 41 | BF3DEE | 59 | — | — | BF3-MKCJ-1 |
| Example 289 | MKCJ | 41 | BF3DEE | 59 | — | — | BF3-MKCJ-1 |
| Example 290 | MKCJ | 41 | BF3DEE | 59 | — | — | BF3-MKCJ-1 |
| Example 291 | MKCJ | 41 | BF3DEE | 59 | — | — | BF3-MKCJ-1 |
| Example 292 | MKCJ | 41 | BF3DEE | 59 | — | — | BF3-MKCJ-1 |
| Example 293 | MKCJ | 41 | BF3DEE | 59 | — | — | BF3-MKCJ-1 |
| Example 294 | MKCJ | 41 | BF3DEE | 59 | — | — | BF3-MKCJ-1 |

TABLE 21

| | Boron trihalide-ketone compound | | Episulfide compound | | Additive compound | |
|---|---|---|---|---|---|---|
| | Name | % by mass | Name | % by mass | Name | % by mass |
| Example 198 | BF3-MKCA | 0.01 | EPI-14 | 99.99 | — | — |
| Example 199 | BF3-MKCB | 0.01 | EPI-14 | 99.99 | — | — |
| Example 200 | BF3-MKCC | 0.01 | EPI-14 | 99.99 | — | — |
| Example 201 | BF3-MKCD | 0.01 | EPI-14 | 99.99 | — | — |
| Example 202 | BF3-MKCE | 0.01 | EPI-14 | 99.99 | — | — |
| Example 203 | BF3-MKCF | 0.01 | EPI-14 | 99.99 | — | — |
| Example 204 | BF3-MKCG | 0.01 | EPI-14 | 99.99 | — | — |
| Example 205 | BF3-MKCH | 0.01 | EPI-14 | 99.99 | — | — |
| Example 206 | BF3-MKCI | 0.01 | EPI-14 | 99.99 | — | — |
| Example 207 | BF3-MKCJ-1 | 0.01 | EPI-14 | 99.99 | — | — |
| Example 208 | BF3-MKCK | 0.01 | EPI-14 | 99.99 | — | — |
| Example 209 | BF3-MKCL | 0.01 | EPI-14 | 99.99 | — | — |
| Example 210 | BF3-MKCM | 0.01 | EPI-14 | 99.88 | DCM | 0.10 |
| Example 211 | BF3-MKCN | 0.01 | EPI-14 | 99.99 | — | — |
| Example 212 | BF3-MKCO | 0.01 | EPI-14 | 99.88 | DCM | 0.11 |
| Example 213 | BF3-MKCP | 0.01 | EPI-14 | 99.99 | — | — |
| Example 214 | BF3-MKCQ | 0.01 | EPI-14 | 99.87 | DCM | 0.12 |
| Example 215 | BF3-MKCR | 0.01 | EPI-14 | 99.86 | DCM | 0.13 |
| Example 216 | BF3-MKCS | 0.02 | EPI-14 | 99.85 | DCM | 0.14 |
| Example 217 | BF3-MKCT | 0.02 | EPI-14 | 99.85 | DCM | 0.14 |
| Example 218 | BF3-MKCU | 0.02 | EPI-14 | 99.84 | DCM | 0.14 |
| Example 219 | BF3-MKCV | 0.02 | EPI-14 | 99.83 | DCM | 0.15 |
| Example 220 | BF3-MKCW | 0.02 | EPI-14 | 99.79 | DCM | 0.19 |
| Example 221 | BF3-MKCX | 0.03 | EPI-14 | 99.70 | DCM | 0.27 |
| Example 222 | BF3-MKCY | 0.01 | EPI-14 | 99.99 | — | — |
| Example 223 | BF3-MKCZ | 0.01 | EPI-14 | 99.99 | — | — |
| Example 224 | BF3-MKCAA | 0.01 | EPI-14 | 99.99 | — | — |
| Example 225 | BF3-MKCAB | 0.01 | EPI-14 | 99.99 | — | — |
| Example 226 | BF3-MKCAC | 0.01 | EPI-14 | 99.99 | — | — |
| Example 227 | BF3-MKCAD | 0.01 | EPI-14 | 99.99 | — | — |
| Example 228 | BF3-MKCAE | 0.01 | EPI-14 | 99.99 | — | — |
| Example 229 | BF3-MKCAF | 0.01 | EPI-14 | 99.99 | — | — |
| Example 230 | BF3-MKCAG | 0.01 | EPI-14 | 99.99 | — | — |
| Example 231 | BF3-MKCAH | 0.01 | EPI-14 | 99.99 | — | — |
| Example 232 | BF3-MKCAI | 0.01 | EPI-14 | 99.88 | DCM | 0.10 |

TABLE 22

| | Boron trihalide-ketone compound | | Episulfide compound | | Additive compound | |
|---|---|---|---|---|---|---|
| | Name | % by mass | Name | % by mass | Name | % by mass |
| Example 233 | BF3-MKCAJ | 0.01 | EPI-14 | 99.88 | DCM | 0.11 |
| Example 234 | BF3-MKCAK | 0.01 | EPI-14 | 99.86 | DCM | 0.13 |
| Example 235 | BF3-MKCAL | 0.01 | EPI-14 | 99.86 | DCM | 0.13 |
| Example 236 | BF3-MKCAM | 0.02 | EPI-14 | 99.85 | DCM | 0.14 |
| Example 237 | BF3-MKCAN | 0.02 | EPI-14 | 99.84 | DCM | 0.14 |
| Example 238 | BF3-MKCAO | 0.02 | EPI-14 | 99.80 | DCM | 0.18 |
| Example 239 | BF3-MKCAP | 0.01 | EPI-14 | 99.88 | DCM | 0.11 |
| Example 240 | BF3-MKCAQ | 0.02 | EPI-14 | 99.82 | DCM | 0.17 |
| Example 241 | BF3-MKCAR | 0.02 | EPI-14 | 99.78 | DCM | 0.20 |
| Example 242 | BF3-MKCAS | 0.02 | EPI-14 | 99.84 | DCM | 0.14 |
| Example 243 | BCl3-MKCJ | 0.01 | EPI-14 | 99.99 | — | — |
| Example 244 | BBr3-MKCJ | 0.02 | EPI-14 | 99.98 | — | — |
| Example 245 | BF3-MKCJ-1 | 0.03 | EPI-1 | 99.97 | — | — |
| Example 246 | BF3-MKCJ-1 | 0.02 | EPI-2 | 99.98 | — | — |

TABLE 22-continued

| | Boron trihalide-ketone compound | | Episulfide compound | | Additive compound | |
|---|---|---|---|---|---|---|
| | Name | % by mass | Name | % by mass | Name | % by mass |
| Example 247 | BF3-MKCJ-1 | 0.02 | EPI-3 | 99.98 | — | — |
| Example 248 | BF3-MKCJ-1 | 0.02 | EPI-4 | 99.98 | — | — |
| Example 249 | BF3-MKCJ-1 | 0.01 | EPI-5 | 99.99 | — | — |
| Example 250 | BF3-MKCJ-1 | 0.01 | EPI-6 | 99.99 | — | — |
| Example 251 | BF3-MKCJ-1 | 0.01 | EPI-7 | 99.99 | — | — |
| Example 252 | BF3-MKCJ-1 | 0.01 | EPI-8 | 99.99 | — | — |
| Example 253 | BF3-MKCJ-1 | 0.01 | EPI-9 | 99.99 | — | — |
| Example 254 | BF3-MKCJ-1 | 0.01 | EPI-10 | 99.99 | — | — |
| Example 255 | BF3-MKCJ-1 | 0.01 | EPI-11 | 99.99 | — | — |
| Example 256 | BF3-MKCJ-1 | 0.01 | EPI-12 | 99.99 | — | — |
| Example 257 | BF3-MKCJ-1 | 0.01 | EPI-13 | 99.99 | — | — |
| Example 258 | BF3-MKCJ-1 | 0.2 | EPI-15 | 49.9 | DCM | 49.9 |
| Example 259 | BF3-MKCJ-1 | 0.4 | EPI-16 | 99.6 | — | — |
| Example 260 | BF3-MKCJ-1 | 0.08 | EPI-17 | 49.96 | DCM | 49.96 |
| Example 261 | BF3-MKCJ-1 | 0.07 | EPI-18 | 49.96 | DCM | 49.96 |
| Example 262 | BF3-MKCJ-1 | 0.06 | EPI-19 | 49.97 | DCM | 49.97 |
| Example 263 | BF3-MKCJ-1 | 0.02 | EPI-20 | 99.98 | — | — |
| Example 264 | BF3-MKCJ-1 | 0.01 | EPI-21 | 99.99 | — | — |
| Example 265 | BF3-MKCJ-1 | 0.01 | EPI-22 | 99.99 | — | — |
| Example 266 | BF3-MKCJ-1 | 0.01 | EPI-23 | 99.99 | — | — |
| Example 267 | BF3-MKCJ-1 | 0.6 | EPI-24 | 99.4 | — | — |

TABLE 23

| | Boron trihalide-ketone compound | | Episulfide compound | | Additive compound | |
|---|---|---|---|---|---|---|
| | Name | % by mass | Name | % by mass | Name | % by mass |
| Example 268 | BF3-MKCJ-1 | 0.8 | EPI-25 | 99.2 | — | — |
| Example 269 | BF3-MKCJ-1 | 0.4 | EPI-26 | 99.6 | — | — |
| Example 270 | BF3-MKCJ-1 | 0.4 | EPI-27 | 99.6 | — | — |
| Example 271 | BF3-MKCJ-1 | 0.4 | EPI-28 | 99.6 | — | — |
| Example 272 | BF3-MKCJ-1 | 0.4 | EPI-29 | 99.6 | — | — |
| Example 273 | BF3-MKCJ-1 | 0.02 | EPI-30 | 99.98 | — | — |
| Example 274 | BF3-MKCJ-1 | 0.01 | EPI-31 | 99.99 | — | — |
| Example 275 | BF3-MKCJ-1 | 0.01 | EPI-32 | 99.99 | — | — |
| Example 276 | BF3-MKCJ-1 | 0.01 | EPI-33 | 99.99 | — | — |
| Example 277 | BF3-MKCJ-1 | 0.01 | EPI-34 | 99.99 | — | — |
| Example 278 | BF3-MKCJ-2 | 6 | EPI-14 | 94 | — | — |
| Example 279 | BF3-MKCJ-3 | 3 | EPI-14 | 97 | — | — |
| Example 280 | BF3-MKCJ-4 | 0.6 | EPI-14 | 99.4 | — | — |
| Example 281 | BF3-MKCJ-5 | 0.01 | EPI-14 | 99.99 | — | — |
| Example 282 | BF3-MKCJ-6 | 0.02 | EPI-14 | 99.98 | — | — |
| Example 283 | BF3-MKCJ-1 | 0.005 | EPI-14 | 99.995 | — | — |
| Example 284 | BF3-MKCJ-1 | 0.001 | EPI-14 | 99.999 | — | — |
| Example 285 | BF3-MKCJ-1 | 9 | EPI-14 | 91 | — | — |
| Example 286 | BF3-MKCJ-1 | 5 | EPI-14 | 95 | — | — |
| Example 287 | BF3-MKCJ-1 | 2 | EPI-14 | 98 | — | — |
| Example 288 | BF3-MKCJ-1 | 1 | EPI-14 | 99 | — | — |
| Example 289 | BF3-MKCJ-1 | 0.5 | EPI-14 | 99.5 | — | — |
| Example 290 | BF3-MKCJ-1 | 0.1 | EPI-14 | 99.9 | — | — |
| Example 291 | BF3-MKCJ-1 | 0.01 | EPI-14 | 99.99 | — | — |
| Example 292 | BF3-MKCJ-1 | 0.01 | EPI-14 | 99.99 | — | — |
| Example 293 | BF3-MKCJ-1 | 0.01 | EPI-14 | 99.99 | — | — |
| Example 294 | BF3-MKCJ-1 | 0.01 | EPI-14 | 99.99 | — | — |

TABLE 24

| | WPT | | | Polymerization condition | | Stability evaluation A | | Stability evaluation B | | Polymerizability A | | Polymerizability B | | Side reactivity A | | Side reactivity B | Overall |
|---|---|---|---|---|---|---|---|---|---|---|---|---|---|---|---|---|---|
| | | | | | | | Judgment | | Judgment | | Judgment | | Judgment | | Judgment | Judgment | assessment |
| | (g/mol) | α4 | β | (° C.) | (hr) | (%) | ment | (%) | ment | (%) | ment | (%) | ment | (%) | ment | ment | ment |
| Example 198 | 166 | 1 | 0.01 | 70 | 2 | 9 | A | — | — | 99 | AA | — | — | 4 | A | — | A |
| Example 199 | 166 | 1 | 0.01 | 70 | 2 | 7 | A | — | — | 99 | AA | — | — | 2 | AA | — | A |

TABLE 24-continued

| | WPT | | | Polymerization condition | | Stability evaluation A | | Stability evaluation B | | Polymeriz-ability A | | Polymeriz-ability B | | Side reac-tivity A | | Side reac-tivity B | Overall |
|---|---|---|---|---|---|---|---|---|---|---|---|---|---|---|---|---|---|
| | (g/mol) | α4 | β | (° C.) | (hr) | (%) | Judg-ment | (%) | Judg-ment | (%) | Judg-ment | (%) | Judg-ment | (%) | Judg-ment | Judg-ment | assess-ment |
| Example 200 | 166 | 1 | 0.01 | 70 | 2 | 5 | AA | — | — | 96 | AA | — | — | 3 | A | — | A |
| Example 201 | 166 | 1 | 0.01 | 70 | 2 | 6 | A | — | — | 99 | AA | — | — | 2 | AA | — | A |
| Example 202 | 166 | 1 | 0.01 | 70 | 2 | 6 | A | — | — | 98 | AA | — | — | 2 | AA | — | A |
| Example 203 | 166 | 1 | 0.01 | 70 | 2 | 5 | AA | — | — | 96 | AA | — | — | 3 | A | — | A |
| Example 204 | 166 | 1 | 0.01 | 70 | 2 | 4 | AA | — | — | 99 | AA | — | — | 1 | AA | — | AA |
| Example 205 | 166 | 1 | 0.01 | 70 | 2 | 4 | AA | — | — | 98 | AA | — | — | 1 | AA | — | AA |
| Example 206 | 166 | 1 | 0.01 | 70 | 2 | 4 | AA | — | — | 99 | AA | — | — | 1 | AA | — | AA |
| Example 207 | 166 | 1 | 0.01 | 70 | 2 | 2 | AA | — | — | 96 | AA | — | — | 2 | AA | — | AA |
| Example 208 | 166 | 1 | 0.01 | 70 | 2 | 4 | AA | — | — | 99 | AA | — | — | 1 | AA | — | AA |
| Example 209 | 166 | 1 | 0.01 | 70 | 2 | 4 | AA | — | — | 98 | AA | — | — | 1 | AA | — | AA |
| Example 210 | 166 | 1 | 0.01 | 70 | 2 | 2 | AA | — | — | 96 | AA | — | — | 2 | AA | — | AA |
| Example 211 | 166 | 1 | 0.01 | 70 | 2 | 4 | AA | — | — | 98 | AA | — | — | 1 | AA | — | AA |
| Example 212 | 166 | 1 | 0.01 | 70 | 2 | 2 | AA | — | — | 96 | AA | — | — | 2 | AA | — | AA |
| Example 213 | 166 | 1 | 0.01 | 70 | 2 | 4 | AA | — | — | 99 | AA | — | — | 1 | AA | — | AA |
| Example 214 | 166 | 1 | 0.01 | 70 | 2 | 2 | AA | — | — | 96 | AA | — | — | 2 | AA | — | AA |
| Example 215 | 166 | 1 | 0.01 | 70 | 2 | 4 | AA | — | — | 98 | AA | — | — | 1 | AA | — | AA |
| Example 216 | 166 | 1 | 0.01 | 70 | 2 | 4 | AA | — | — | 98 | AA | — | — | 1 | AA | — | AA |
| Example 217 | 166 | 1 | 0.01 | 70 | 2 | 2 | AA | — | — | 97 | AA | — | — | 2 | AA | — | AA |
| Example 218 | 166 | 1 | 0.01 | 70 | 2 | 4 | AA | — | — | 95 | AA | — | — | 2 | AA | — | AA |
| Example 219 | 166 | 1 | 0.01 | 70 | 2 | 2 | AA | — | — | 93 | A | — | — | 2 | AA | — | A |
| Example 220 | 166 | 1 | 0.01 | 70 | 2 | 2 | AA | — | — | 91 | A | — | — | 3 | A | — | A |
| Example 221 | 166 | 1 | 0.01 | 70 | 2 | 2 | AA | — | — | 90 | A | — | — | 4 | A | — | A |
| Example 222 | 166 | 1 | 0.01 | 70 | 2 | 2 | AA | — | — | 98 | AA | — | — | 2 | AA | — | AA |
| Example 223 | 166 | 1 | 0.01 | 70 | 2 | 2 | AA | — | — | 98 | AA | — | — | 2 | AA | — | AA |
| Example 224 | 166 | 1 | 0.01 | 70 | 2 | 7 | A | — | — | 95 | AA | — | — | 5 | A | — | A |
| Example 225 | 166 | 1 | 0.01 | 70 | 2 | 2 | AA | — | — | 99 | AA | — | — | 2 | AA | — | AA |
| Example 226 | 166 | 1 | 0.01 | 70 | 2 | 2 | AA | — | — | 98 | AA | — | — | 2 | AA | — | AA |
| Example 227 | 166 | 1 | 0.01 | 70 | 2 | 1 | AA | — | — | 99 | AA | — | — | 1 | AA | — | AA |
| Example 228 | 166 | 1 | 0.01 | 70 | 2 | 9 | A | — | — | 91 | A | — | — | 5 | A | — | A |
| Example 229 | 166 | 1 | 0.01 | 70 | 2 | 1 | AA | — | — | 99 | AA | — | — | 1 | AA | — | AA |
| Example 230 | 166 | 1 | 0.01 | 70 | 2 | 1 | AA | — | — | 98 | AA | — | — | 1 | AA | — | AA |
| Example 231 | 166 | 1 | 0.01 | 70 | 2 | 2 | AA | — | — | 98 | AA | — | — | 2 | AA | — | AA |
| Example 232 | 166 | 1 | 0.01 | 70 | 2 | 1 | AA | — | — | 99 | AA | — | — | 1 | AA | — | AA |

<Judgment> AA: Excellent, A: Good, C: Poor, <Overall assessent> AA, A: Accepted, C: Rejected

TABLE 25

| | WPT | | | Polymerization condition | | Stability evaluation A | | Stability evaluation B | | Polymeriz-ability A | | Polymeriz-ability B | | Side reac-tivity A | | Side reac-tivity B | Overall |
|---|---|---|---|---|---|---|---|---|---|---|---|---|---|---|---|---|---|
| | (g/mol) | α4 | β | (° C.) | (hr) | (%) | Judg-ment | (%) | Judg-ment | (%) | Judg-ment | (%) | Judg-ment | (%) | Judg-ment | Judg-ment | assess-ment |
| Example 233 | 166 | 1 | 0.01 | 70 | 2 | 1 | AA | — | — | 99 | AA | — | — | 1 | AA | — | AA |
| Example 234 | 166 | 1 | 0.01 | 70 | 2 | 1 | AA | — | — | 99 | AA | — | — | 1 | AA | — | AA |
| Example 235 | 166 | 1 | 0.01 | 70 | 2 | 1 | AA | — | — | 99 | AA | — | — | 1 | AA | — | AA |
| Example 236 | 166 | 1 | 0.01 | 70 | 2 | 2 | AA | — | — | 98 | AA | — | — | 2 | AA | — | AA |
| Example 237 | 166 | 1 | 0.01 | 70 | 2 | 1 | AA | — | — | 99 | AA | — | — | 1 | AA | — | AA |
| Example 238 | 166 | 1 | 0.01 | 70 | 2 | 1 | AA | — | — | 99 | AA | — | — | 2 | AA | — | AA |
| Example 239 | 166 | 1 | 0.01 | 70 | 2 | 5 | AA | — | — | 95 | AA | — | — | 5 | A | — | A |
| Example 240 | 166 | 1 | 0.01 | 70 | 2 | 1 | AA | — | — | 99 | AA | — | — | 2 | AA | — | AA |
| Example 241 | 166 | 1 | 0.01 | 70 | 2 | 4 | AA | — | — | 95 | AA | — | — | 4 | A | — | A |
| Example 242 | 166 | 1 | 0.01 | 70 | 2 | 2 | AA | — | — | 92 | A | — | — | 4 | A | — | A |
| Example 243 | 166 | 1 | 0.01 | 70 | 2 | 10 | A | — | — | 98 | AA | — | — | 5 | A | — | A |
| Example 244 | 166 | 1 | 0.01 | 70 | 2 | 7 | A | — | — | 98 | AA | — | — | 3 | A | — | A |
| Example 245 | 60 | 1 | 0.01 | 70 | 2 | 8 | A | — | — | 92 | A | — | — | 4 | A | — | A |
| Example 246 | 74 | 1 | 0.01 | 70 | 2 | 6 | A | — | — | 94 | A | — | — | 3 | A | — | A |
| Example 247 | 88 | 1 | 0.01 | 70 | 2 | 4 | AA | — | — | 95 | AA | — | — | 3 | A | — | A |
| Example 248 | 102 | 1 | 0.01 | 70 | 2 | 3 | AA | — | — | 96 | AA | — | — | 2 | AA | — | AA |
| Example 249 | 116 | 1 | 0.01 | 70 | 2 | 2 | AA | — | — | 97 | AA | — | — | 2 | AA | — | AA |
| Example 250 | 130 | 1 | 0.01 | 70 | 2 | 2 | AA | — | — | 98 | AA | — | — | 2 | AA | — | AA |
| Example 251 | 144 | 1 | 0.01 | 70 | 2 | 2 | AA | — | — | 98 | AA | — | — | 2 | AA | — | AA |
| Example 252 | 172 | 1 | 0.01 | 70 | 2 | 3 | AA | — | — | 99 | AA | — | — | 2 | AA | — | AA |
| Example 253 | 200 | 1 | 0.01 | 80 | 2 | 2 | AA | — | — | 98 | AA | — | — | 2 | AA | — | AA |
| Example 254 | 228 | 1 | 0.01 | 80 | 2 | 2 | AA | — | — | 99 | AA | — | — | 2 | AA | — | AA |
| Example 255 | 256 | 1 | 0.01 | 80 | 2 | 3 | AA | — | — | 99 | AA | — | — | 2 | AA | — | AA |
| Example 256 | 285 | 1 | 0.01 | 80 | 2 | 2 | AA | — | — | 98 | AA | — | — | 2 | AA | — | AA |

TABLE 25-continued

| | WPT | | | Polymerization condition | | Stability evaluation A | | Stability evaluation B | | Polymeriz-ability A | | Polymeriz-ability B | | Side reac-tivity A | | Side reac-tivity B | Overall |
|---|---|---|---|---|---|---|---|---|---|---|---|---|---|---|---|---|---|
| | (g/mol) | α4 | β | (° C.) | (hr) | (%) | Judg-ment | (%) | Judg-ment | (%) | Judg-ment | (%) | Judg-ment | (%) | Judg-ment | Judg-ment | assess-ment |
| Example 257 | 313 | 1 | 0.01 | 80 | 2 | 2 | AA | — | — | 99 | AA | — | — | 2 | AA | — | AA |
| Example 258 | 205 | 1 | 0.5 | 100 | 4 | 3 | AA | — | — | — | — | 100 | AA | — | — | AA | AA |
| Example 259 | 221 | 1 | 0.5 | 100 | 4 | 2 | AA | — | — | — | — | 100 | AA | — | — | AA | AA |
| Example 260 | 498 | 1 | 0.5 | 100 | 4 | 2 | AA | — | — | — | — | 100 | AA | — | — | AA | AA |
| Example 261 | 578 | 1 | 0.5 | 100 | 4 | 3 | AA | — | — | — | — | 94 | A | — | — | AA | A |
| Example 262 | 671 | 1 | 0.5 | 100 | 4 | 2 | AA | — | — | — | — | 91 | A | — | — | AA | A |
| Example 263 | 100 | 1 | 0.01 | 70 | 2 | 9 | A | — | — | 99 | AA | — | — | 4 | A | — | A |
| Example 264 | 114 | 1 | 0.01 | 70 | 2 | 6 | A | — | — | 99 | AA | — | — | 2 | AA | — | A |
| Example 265 | 128 | 1 | 0.01 | 70 | 2 | 8 | A | — | — | 99 | AA | — | — | 3 | A | — | A |
| Example 266 | 142 | 1 | 0.01 | 70 | 2 | 9 | A | — | — | 99 | AA | — | — | 3 | A | — | A |
| Example 267 | 147 | 1 | 0.5 | 100 | 4 | 6 | A | — | — | — | — | 100 | AA | — | — | AA | A |

<Judgment> AA: Excellent, A: Good, C: Poor, <Overall assessent> AA, A: Accepted, C: Rejected

TABLE 26

| | WPT | | | Polymerization condition | | Stability evaluation A | | Stability evaluation B | | Polymeriz-ability A | | Polymeriz-ability B | | Side reac-tivity A | | Side reac-tivity B | Overall |
|---|---|---|---|---|---|---|---|---|---|---|---|---|---|---|---|---|---|
| | (g/mol) | α4 | β | (° C.) | (hr) | (%) | Judg-ment | (%) | Judg-ment | (%) | Judg-ment | (%) | Judg-ment | (%) | Judg-ment | Judg-ment | assess-ment |
| Example 268 | 107 | 1 | 0.5 | 100 | 4 | 2 | AA | — | — | — | — | 98 | AA | — | — | AA | AA |
| Example 269 | 197 | 1 | 0.5 | 100 | 4 | 2 | AA | — | — | — | — | 99 | AA | — | — | AA | AA |
| Example 270 | 207 | 1 | 0.5 | 100 | 4 | 7 | A | — | — | — | — | 100 | AA | — | — | AA | A |
| Example 271 | 190 | 1 | 0.5 | 100 | 4 | 2 | AA | — | — | — | — | 99 | AA | — | — | AA | AA |
| Example 272 | 200 | 1 | 0.5 | 100 | 4 | 8 | A | — | — | — | — | 100 | AA | — | — | AA | A |
| Example 273 | 86 | 1 | 0.01 | 70 | 2 | 5 | AA | — | — | 98 | AA | — | — | 3 | A | — | A |
| Example 274 | 114 | 1 | 0.01 | 70 | 2 | 3 | AA | — | — | 99 | AA | — | — | 2 | AA | — | AA |
| Example 275 | 130 | 1 | 0.01 | 70 | 2 | 2 | AA | — | — | 99 | AA | — | — | 2 | AA | — | AA |
| Example 276 | 140 | 1 | 0.01 | 70 | 2 | 2 | AA | — | — | 98 | AA | — | — | 2 | AA | — | AA |
| Example 277 | 158 | 1 | 0.01 | 70 | 2 | 2 | AA | — | — | 99 | AA | — | — | 2 | AA | — | AA |
| Example 278 | 166 | 1000 | 0.01 | 70 | 2 | 0 | AA | — | — | 90 | A | — | — | 1 | AA | — | A |
| Example 279 | 166 | 500 | 0.01 | 70 | 2 | 0 | AA | — | — | 92 | A | — | — | 1 | AA | — | A |
| Example 280 | 166 | 100 | 0.01 | 70 | 2 | 1 | AA | — | — | 96 | AA | — | — | 1 | AA | — | AA |
| Example 281 | 166 | 1.5 | 0.01 | 70 | 2 | 1 | AA | — | — | 96 | AA | — | — | 1 | AA | — | AA |
| Example 282 | 166 | 2 | 0.01 | 70 | 2 | 1 | AA | — | — | 96 | AA | — | — | 1 | AA | — | AA |
| Example 283 | 166 | 1 | 0.005 | 70 | 2 | 1 | AA | — | — | 93 | A | — | — | 2 | AA | — | A |
| Example 284 | 166 | 1 | 0.001 | 70 | 2 | 0 | AA | — | — | 90 | A | — | — | 2 | AA | — | A |
| Example 285 | 166 | 1 | 10 | 70 | 2 | 8 | A | — | — | 100 | AA | — | — | 5 | A | — | A |
| Example 286 | 166 | 1 | 5 | 70 | 2 | 6 | A | — | — | 100 | AA | — | — | 3 | A | — | A |
| Example 287 | 166 | 1 | 2 | 70 | 2 | 3 | AA | — | — | 100 | AA | — | — | 2 | AA | — | AA |
| Example 288 | 166 | 1 | 1 | 70 | 2 | 2 | AA | — | — | 100 | AA | — | — | 2 | AA | — | AA |
| Example 289 | 166 | 1 | 0.5 | 70 | 2 | 2 | AA | — | — | 100 | AA | — | — | 2 | AA | — | AA |
| Example 290 | 166 | 1 | 0.1 | 70 | 2 | 2 | AA | — | — | 99 | AA | — | — | 2 | AA | — | AA |
| Example 291 | 166 | 1 | 0.01 | 50 | 24 | 2 | AA | — | — | 96 | AA | — | — | 0 | AA | — | AA |
| Example 292 | 166 | 1 | 0.01 | 100 | 0.5 | 2 | AA | — | — | 99 | AA | — | — | 2 | AA | — | AA |
| Example 293 | 166 | 1 | 0.01 | 120 | 0.2 | 3 | AA | — | — | 100 | AA | — | — | 3 | A | — | A |
| Example 294 | 166 | 1 | 0.01 | 140 | 0.1 | 4 | AA | — | — | 100 | AA | — | — | 5 | A | — | A |

<Judgment> AA: Excellent, A: Good, C: Poor, <Overall assessent> AA, A: Accepted, C: Rejected

TABLE 27

| | Ether compound | | Trivalent phosphorus compound | | Ketone compound | | Boron trihalide compound | | Additive compound | | Boron trihalide-ether, trivalent phosphorus, ketone compound |
|---|---|---|---|---|---|---|---|---|---|---|---|
| | Name | % by mass | Name | % by mass | Name | % by mass | Name | % by mass | Name | % by mass | Name |
| Example 295 | MECC | 5 | 3PCR | 39 | MKCJ | 10 | BF3DEE | 45 | — | — | BF3-MXA-1 |
| Example 296 | MECC | 19 | 3PCR | 9 | MKCJ | 2 | BF3DEE | 69 | — | — | BF3-MXB |
| Example 297 | MECC | 0 | 3PCR | 69 | MKCJ | 1 | BF3DEE | 29 | — | — | BF3-MXC |
| Example 298 | MECC | 1 | 3PCR | 7 | MKCJ | 35 | BF3DEE | 57 | — | — | BF3-MXD |
| Example 299 | MECC | 6 | 3PCR | 49 | MKCJ | 3 | BF3DEE | 42 | — | — | BF3-MXE |
| Example 300 | MECC | 8 | 3PCR | 15 | MKCJ | 18 | BF3DEE | 58 | — | — | BF3-MXF |

TABLE 27-continued

| | Ether compound | | Trivalent phosphorus compound | | Ketone compound | | Boron trihalide compound | | Additive compound | | Boron trihalide-ether, trivalent phosphorus, ketone compound |
|---|---|---|---|---|---|---|---|---|---|---|---|
| | Name | % by mass | Name | % by mass | Name | % by mass | Name | % by mass | Name | % by mass | Name |
| Example 301 | MECC | 1 | 3PCR | 47 | MKCJ | 12 | BF3DEE | 40 | — | — | BF3-MXG |
| Example 302 | MECC | 6 | 3PCR | 53 | MKCJ | 0 | BF3DEE | 41 | — | — | BF3-MXH |
| Example 303 | MECC | 10 | 3PCR | 0 | MKCJ | 23 | BF3DEE | 67 | — | — | BF3-MXI |
| Example 304 | MECC | 0 | 3PCR | 49 | MKCJ | 13 | BF3DEE | 38 | — | — | BF3-MXJ |
| Example 305 | MECC | 18 | 3PCR | 17 | MKCJ | 0 | BF3DEE | 65 | — | — | BF3-MXK |
| Example 306 | MECC | 1 | 3PCR | 70 | MKCJ | 0 | BF3DEE | 30 | — | — | BF3-MXL |
| Example 307 | MECC | 21 | 3PCR | 0 | MKCJ | 5 | BF3DEE | 74 | — | — | BF3-MXM |
| Example 308 | MECC | 2 | 3PCR | 0 | MKCJ | 38 | BF3DEE | 60 | — | — | BF3-MXN |
| Example 309 | MECC | 0 | 3PCR | 69 | MKCJ | 2 | BF3DEE | 29 | — | — | BF3-MXO |
| Example 310 | MECC | 0 | 3PCR | 14 | MKCJ | 33 | BF3DEE | 53 | — | — | BF3-MXP |
| Example 311 | MECC | 5 | 3PCR | 39 | MKCJ | 10 | BF3DEE | 45 | — | — | BF3-MXA-1 |
| Example 312 | MECC | 5 | 3PCR | 39 | MKCJ | 10 | BF3DEE | 45 | — | — | BF3-MXA-1 |
| Example 313 | MECC | 5 | 3PCR | 39 | MKCJ | 10 | BF3DEE | 45 | — | — | BF3-MXA-1 |
| Example 314 | MECC | 5 | 3PCR | 39 | MKCJ | 10 | BF3DEE | 45 | — | — | BF3-MXA-1 |
| Example 315 | MECC | 5 | 3PCR | 39 | MKCJ | 10 | BF3DEE | 45 | — | — | BF3-MXA-1 |
| Example 316 | MECC | 5 | 3PCR | 39 | MKCJ | 10 | BF3DEE | 45 | — | — | BF3-MXA-1 |
| Example 317 | MECC | 5 | 3PCR | 39 | MKCJ | 10 | BF3DEE | 45 | — | — | BF3-MXA-1 |
| Example 318 | MECC | 5 | 3PCR | 39 | MKCJ | 10 | BF3DEE | 45 | — | — | BF3-MXA-1 |
| Example 319 | MECC | 5 | 3PCR | 39 | MKCJ | 10 | BF3DEE | 45 | — | — | BF3-MXA-1 |
| Example 320 | MECC | 5 | 3PCR | 39 | MKCJ | 10 | BF3DEE | 45 | — | — | BF3-MXA-1 |
| Example 321 | MECC | 5 | 3PCR | 39 | MKCJ | 10 | BF3DEE | 45 | — | — | BF3-MXA-1 |
| Example 322 | MECC | 5 | 3PCR | 39 | MKCJ | 10 | BF3DEE | 45 | — | — | BF3-MXA-1 |
| Example 323 | MECC | 5 | 3PCR | 39 | MKCJ | 10 | BF3DEE | 45 | — | — | BF3-MXA-1 |
| Example 324 | MECC | 5 | 3PCR | 39 | MKCJ | 10 | BF3DEE | 45 | — | — | BF3-MXA-1 |
| Example 325 | MECC | 5 | 3PCR | 39 | MKCJ | 10 | BF3DEE | 45 | — | — | BF3-MXA-1 |
| Example 326 | MECC | 5 | 3PCR | 39 | MKCJ | 10 | BF3DEE | 45 | — | — | BF3-MXA-1 |
| Example 327 | MECC | 5 | 3PCR | 39 | MKCJ | 10 | BF3DEE | 45 | — | — | BF3-MXA-1 |

TABLE 28

| | Ether compound | | Trivalent phosphorus compound | | Ketone compound | | Boron trihalide compound | | Additive compound | | Boron trihalide-ether, trivalent phosphorus, ketone compound |
|---|---|---|---|---|---|---|---|---|---|---|---|
| | Name | % by mass | Name | % by mass | Name | % by mass | Name | % by mass | Name | % by mass | Name |
| Example 328 | MECC | 5 | 3PCR | 39 | MKCJ | 10 | BF3DEE | 45 | — | — | BF3-MXA-1 |
| Example 329 | MECC | 5 | 3PCR | 39 | MKCJ | 10 | BF3DEE | 45 | — | — | BF3-MXA-1 |
| Example 330 | MECC | 5 | 3PCR | 39 | MKCJ | 10 | BF3DEE | 45 | — | — | BF3-MXA-1 |
| Example 331 | MECC | 5 | 3PCR | 39 | MKCJ | 10 | BF3DEE | 45 | — | — | BF3-MXA-1 |
| Example 332 | MECC | 5 | 3PCR | 39 | MKCJ | 10 | BF3DEE | 45 | — | — | BF3-MXA-1 |
| Example 333 | MECC | 5 | 3PCR | 39 | MKCJ | 10 | BF3DEE | 45 | — | — | BF3-MXA-1 |
| Example 334 | MECC | 5 | 3PCR | 39 | MKCJ | 10 | BF3DEE | 45 | — | — | BF3-MXA-1 |
| Example 335 | MECC | 5 | 3PCR | 39 | MKCJ | 10 | BF3DEE | 45 | — | — | BF3-MXA-1 |
| Example 336 | MECC | 5 | 3PCR | 39 | MKCJ | 10 | BF3DEE | 45 | — | — | BF3-MXA-1 |
| Example 337 | MECC | 5 | 3PCR | 39 | MKCJ | 10 | BF3DEE | 45 | — | — | BF3-MXA-1 |
| Example 338 | MECC | 5 | 3PCR | 39 | MKCJ | 10 | BF3DEE | 45 | — | — | BF3-MXA-1 |
| Example 339 | MECC | 5 | 3PCR | 39 | MKCJ | 10 | BF3DEE | 45 | — | — | BF3-MXA-1 |
| Example 340 | MECC | 5 | 3PCR | 39 | MKCJ | 10 | BF3DEE | 45 | — | — | BF3-MXA-1 |
| Example 341 | MECC | 5 | 3PCR | 39 | MKCJ | 10 | BF3DEE | 45 | — | — | BF3-MXA-1 |
| Example 342 | MECC | 5 | 3PCR | 39 | MKCJ | 10 | BF3DEE | 45 | — | — | BF3-MXA-1 |
| Example 343 | MECC | 5 | 3PCR | 39 | MKCJ | 10 | BF3DEE | 45 | — | — | BF3-MXA-1 |
| Example 344 | MECC | 29.4 | 3PCR | 5.0 | MKCJ | 65.4 | BF3DEE | 0.2 | — | — | BF3-MXA-2 |
| Example 345 | MECC | 27.9 | 3PCR | 9.6 | MKCJ | 62.2 | BF3DEE | 0.4 | — | — | BF3-MXA-3 |
| Example 346 | MECC | 19 | 3PCR | 36 | MKCJ | 43 | BF3DEE | 1 | — | — | BF3-MXA-4 |
| Example 347 | MECC | 6 | 3PCR | 47 | MKCJ | 12 | BF3DEE | 36 | — | — | BF3-MXA-5 |
| Example 348 | MECC | 6 | 3PCR | 51 | MKCJ | 14 | BF3DEE | 29 | — | — | BF3-MXA-6 |
| Example 349 | MECC | 5 | 3PCR | 39 | MKCJ | 10 | BF3DEE | 45 | — | — | BF3-MXA-1 |
| Example 350 | MECC | 5 | 3PCR | 39 | MKCJ | 10 | BF3DEE | 45 | — | — | BF3-MXA-1 |
| Example 351 | MECC | 5 | 3PCR | 39 | MKCJ | 10 | BF3DEE | 45 | — | — | BF3-MXA-1 |
| Example 352 | MECC | 5 | 3PCR | 39 | MKCJ | 10 | BF3DEE | 45 | — | — | BF3-MXA-1 |
| Example 353 | MECC | 5 | 3PCR | 39 | MKCJ | 10 | BF3DEE | 45 | — | — | BF3-MXA-1 |
| Example 354 | MECC | 5 | 3PCR | 39 | MKCJ | 10 | BF3DEE | 45 | — | — | BF3-MXA-1 |
| Example 355 | MECC | 5 | 3PCR | 39 | MKCJ | 10 | BF3DEE | 45 | — | — | BF3-MXA-1 |
| Example 356 | MECC | 5 | 3PCR | 39 | MKCJ | 10 | BF3DEE | 45 | — | — | BF3-MXA-1 |
| Example 357 | MECC | 5 | 3PCR | 39 | MKCJ | 10 | BF3DEE | 45 | — | — | BF3-MXA-1 |
| Example 358 | MECC | 5 | 3PCR | 39 | MKCJ | 10 | BF3DEE | 45 | — | — | BF3-MXA-1 |
| Example 359 | MECC | 5 | 3PCR | 39 | MKCJ | 10 | BF3DEE | 45 | — | — | BF3-MXA-1 |
| Example 360 | MECC | 5 | 3PCR | 39 | MKCJ | 10 | BF3DEE | 45 | — | — | BF3-MXA-1 |

TABLE 29

| | Boron trihalide-ether, trivalent phosphorus, ketone compound | | Episulfide compound | | Additive compound | |
|---|---|---|---|---|---|---|
| | Name | % by mass | Name | % by mass | Name | % by mass |
| Example 295 | BF3-MXA-1 | 0.01 | EPI-14 | 99.99 | — | — |
| Example 296 | BF3-MXB | 0.01 | EPI-14 | 99.99 | — | — |
| Example 297 | BF3-MXC | 0.02 | EPI-14 | 99.98 | — | — |
| Example 298 | BF3-MXD | 0.01 | EPI-14 | 99.99 | — | — |
| Example 299 | BF3-MXE | 0.02 | EPI-14 | 99.98 | — | — |
| Example 300 | BF3-MXF | 0.01 | EPI-14 | 99.99 | — | — |
| Example 301 | BF3-MXG | 0.02 | EPI-14 | 99.98 | — | — |
| Example 302 | BF3-MXH | 0.02 | EPI-14 | 99.98 | — | — |
| Example 303 | BF3-MXI | 0.01 | EPI-14 | 99.99 | — | — |
| Example 304 | BF3-MXJ | 0.02 | EPI-14 | 99.98 | — | — |
| Example 305 | BF3-MXK | 0.01 | EPI-14 | 99.99 | — | — |
| Example 306 | BF3-MXL | 0.02 | EPI-14 | 99.98 | — | — |
| Example 307 | BF3-MXM | 0.01 | EPI-14 | 99.99 | — | — |
| Example 308 | BF3-MXN | 0.01 | EPI-14 | 99.99 | — | — |
| Example 309 | BF3-MXO | 0.02 | EPI-14 | 99.98 | — | — |
| Example 310 | BF3-MXP | 0.01 | EPI-14 | 99.99 | — | — |
| Example 311 | BF3-MXA-1 | 0.04 | EPI-1 | 99.96 | — | — |
| Example 312 | BF3-MXA-1 | 0.03 | EPI-2 | 99.97 | — | — |
| Example 313 | BF3-MXA-1 | 0.03 | EPI-3 | 99.97 | — | — |
| Example 314 | BF3-MXA-1 | 0.02 | EPI-4 | 99.98 | — | — |
| Example 315 | BF3-MXA-1 | 0.02 | EPI-5 | 99.98 | — | — |
| Example 316 | BF3-MXA-1 | 0.02 | EPI-6 | 99.98 | — | — |
| Example 317 | BF3-MXA-1 | 0.02 | EPI-7 | 99.98 | — | — |
| Example 318 | BF3-MXA-1 | 0.01 | EPI-8 | 99.99 | — | — |
| Example 319 | BF3-MXA-1 | 0.01 | EPI-9 | 99.99 | — | — |
| Example 320 | BF3-MXA-1 | 0.01 | EPI-10 | 99.99 | — | — |
| Example 321 | BF3-MXA-1 | 0.01 | EPI-11 | 99.99 | — | — |
| Example 322 | BF3-MXA-1 | 0.01 | EPI-12 | 99.99 | — | — |
| Example 323 | BF3-MXA-1 | 0.01 | EPI-13 | 99.99 | — | — |
| Example 324 | BF3-MXA-1 | 0.3 | EPI-15 | 49.9 | DCM | 49.9 |
| Example 325 | BF3-MXA-1 | 0.5 | EPI-16 | 99.5 | — | — |
| Example 326 | BF3-MXA-1 | 0.1 | EPI-17 | 49.9 | DCM | 49.9 |
| Example 327 | BF3-MXA-1 | 0.1 | EPI-18 | 49.9 | DCM | 49.9 |

TABLE 30

| | Boron trihalide-ether, trivalent phosphorus, ketone compound | | Episulfide compound | | Additive compound | |
|---|---|---|---|---|---|---|
| | Name | % by mass | Name | % by mass | Name | % by mass |
| Example 328 | BF3-MXA-1 | 0.09 | EPI-19 | 49.96 | DCM | 50.0 |
| Example 329 | BF3-MXA-1 | 0.02 | EPI-20 | 99.98 | — | — |
| Example 330 | BF3-MXA-1 | 0.02 | EPI-21 | 99.98 | — | — |
| Example 331 | BF3-MXA-1 | 0.02 | EPI-22 | 99.98 | — | — |
| Example 332 | BF3-MXA-1 | 0.02 | EPI-23 | 99.98 | — | — |
| Example 333 | BF3-MXA-1 | 0.8 | EPI-24 | 99.2 | — | — |
| Example 334 | BF3-MXA-1 | 1 | EPI-25 | 99 | — | — |
| Example 335 | BF3-MXA-1 | 0.6 | EPI-26 | 99.4 | — | — |
| Example 336 | BF3-MXA-1 | 0.6 | EPI-27 | 99.4 | — | — |
| Example 337 | BF3-MXA-1 | 0.6 | EPI-28 | 99.4 | — | — |
| Example 338 | BF3-MXA-1 | 0.6 | EPI-29 | 99.4 | — | — |
| Example 339 | BF3-MXA-1 | 0.03 | EPI-30 | 99.97 | — | — |
| Example 340 | BF3-MXA-1 | 0.02 | EPI-31 | 99.98 | — | — |
| Example 341 | BF3-MXA-1 | 0.02 | EPI-32 | 99.98 | — | — |
| Example 342 | BF3-MXA-1 | 0.02 | EPI-33 | 99.98 | — | — |
| Example 343 | BF3-MXA-1 | 0.02 | EPI-34 | 99.98 | — | — |
| Example 344 | BF3-MXA-2 | 4 | EPI-14 | 96 | — | — |
| Example 345 | BF3-MXA-3 | 2 | EPI-14 | 98 | — | — |
| Example 346 | BF3-MXA-4 | 0.6 | EPI-14 | 99.4 | — | — |
| Example 347 | BF3-MXA-5 | 0.02 | EPI-14 | 99.98 | — | — |
| Example 348 | BF3-MXA-6 | 0.02 | EPI-14 | 99.98 | — | — |
| Example 349 | BF3-MXA-1 | 0.01 | EPI-14 | 99.99 | — | — |
| Example 350 | BF3-MXA-1 | 0.001 | EPI-14 | 99.999 | — | — |
| Example 351 | BF3-MXA-1 | 13 | EPI-14 | 87 | — | — |
| Example 352 | BF3-MXA-1 | 7 | EPI-14 | 93 | — | — |
| Example 353 | BF3-MXA-1 | 3 | EPI-14 | 97 | — | — |
| Example 354 | BF3-MXA-1 | 1 | EPI-14 | 99 | — | — |
| Example 355 | BF3-MXA-1 | 0.7 | EPI-14 | 99.3 | — | — |
| Example 356 | BF3-MXA-1 | 0.1 | EPI-14 | 99.9 | — | — |
| Example 357 | BF3-MXA-1 | 0.01 | EPI-14 | 99.99 | — | — |
| Example 358 | BF3-MXA-1 | 0.01 | EPI-14 | 99.99 | — | — |
| Example 359 | BF3-MXA-1 | 0.01 | EPI-14 | 99.99 | — | — |
| Example 360 | BF3-MXA-1 | 0.01 | EPI-14 | 99.99 | — | — |

TABLE 31

| | WPT (g/mol) | α | β | Polymerization condition (° C.) | (hr) | Stability evaluation A (%) | Judgment | Stability evaluation B (%) | Judgment | Polymerizability A (%) | Judgment | Polymerizability B (%) | Judgment | Side reactivity A (%) | Judgment | Side reactivity B Judgment | Overall assessment |
|---|---|---|---|---|---|---|---|---|---|---|---|---|---|---|---|---|---|
| Example 295 | 166 | 1 | 0.01 | 70 | 2 | 1 | AA | — | — | 99 | AA | — | — | 1 | AA | — | AA |
| Example 296 | 166 | 1 | 0.01 | 70 | 2 | 2 | AA | — | — | 98 | AA | — | — | 1 | AA | — | AA |
| Example 297 | 166 | 1 | 0.01 | 70 | 2 | 1 | AA | — | — | 99 | AA | — | — | 1 | AA | — | AA |
| Example 298 | 166 | 1 | 0.01 | 70 | 2 | 2 | AA | — | — | 98 | AA | — | — | 1 | AA | — | AA |
| Example 299 | 166 | 1 | 0.01 | 70 | 2 | 1 | AA | — | — | 99 | AA | — | — | 1 | AA | — | AA |
| Example 300 | 166 | 1 | 0.01 | 70 | 2 | 2 | AA | — | — | 98 | AA | — | — | 1 | AA | — | AA |
| Example 301 | 166 | 1 | 0.01 | 70 | 2 | 1 | AA | — | — | 99 | AA | — | — | 1 | AA | — | AA |
| Example 302 | 166 | 1 | 0.01 | 70 | 2 | 1 | AA | — | — | 99 | AA | — | — | 1 | AA | — | AA |
| Example 303 | 166 | 1 | 0.01 | 70 | 2 | 2 | AA | — | — | 98 | AA | — | — | 1 | AA | — | AA |
| Example 304 | 166 | 1 | 0.01 | 70 | 2 | 1 | AA | — | — | 99 | AA | — | — | 1 | AA | — | AA |
| Example 305 | 166 | 1 | 0.01 | 70 | 2 | 2 | AA | — | — | 98 | AA | — | — | 1 | AA | — | AA |
| Example 306 | 166 | 1 | 0.01 | 70 | 2 | 1 | AA | — | — | 99 | AA | — | — | 1 | AA | — | AA |
| Example 307 | 166 | 1 | 0.01 | 70 | 2 | 2 | AA | — | — | 98 | AA | — | — | 1 | AA | — | AA |
| Example 308 | 166 | 1 | 0.01 | 70 | 2 | 2 | AA | — | — | 98 | AA | — | — | 1 | AA | — | AA |
| Example 309 | 166 | 1 | 0.01 | 70 | 2 | 1 | AA | — | — | 99 | AA | — | — | 1 | AA | — | AA |
| Example 310 | 166 | 1 | 0.01 | 70 | 2 | 2 | AA | — | — | 98 | AA | — | — | 1 | AA | — | AA |
| Example 311 | 60 | 1 | 0.01 | 70 | 2 | 9 | A | — | — | 91 | A | — | — | 4 | A | — | A |
| Example 312 | 74 | 1 | 0.01 | 70 | 2 | 7 | A | — | — | 93 | A | — | — | 3 | A | — | A |
| Example 313 | 88 | 1 | 0.01 | 70 | 2 | 5 | AA | — | — | 96 | AA | — | — | 3 | A | — | A |
| Example 314 | 102 | 1 | 0.01 | 70 | 2 | 3 | AA | — | — | 97 | AA | — | — | 2 | AA | — | AA |
| Example 315 | 116 | 1 | 0.01 | 70 | 2 | 2 | AA | — | — | 98 | AA | — | — | 2 | AA | — | AA |
| Example 316 | 130 | 1 | 0.01 | 70 | 2 | 2 | AA | — | — | 98 | AA | — | — | 1 | AA | — | AA |
| Example 317 | 144 | 1 | 0.01 | 70 | 2 | 1 | AA | — | — | 99 | AA | — | — | 1 | AA | — | AA |
| Example 318 | 172 | 1 | 0.01 | 70 | 2 | 1 | AA | — | — | 100 | AA | — | — | 1 | AA | — | AA |
| Example 319 | 200 | 1 | 0.01 | 70 | 2 | 1 | AA | — | — | 100 | AA | — | — | 1 | AA | — | AA |

TABLE 31-continued

| | WPT | | | Polymerization condition | | Stability evaluation A | | Stability evaluation B | | Polymerizability A | | Polymerizability B | | Side reactivity A | | Side reactivity B | Overall |
|---|---|---|---|---|---|---|---|---|---|---|---|---|---|---|---|---|---|
| | (g/mol) | α | β | (° C.) | (hr) | (%) | Judgment | (%) | Judgment | (%) | Judgment | (%) | Judgment | (%) | Judgment | Judgment | assessment |
| Example 320 | 228 | 1 | 0.01 | 70 | 2 | 1 | AA | — | — | 99 | AA | — | — | 1 | AA | — | AA |
| Example 321 | 256 | 1 | 0.01 | 70 | 2 | 1 | AA | — | — | 99 | AA | — | — | 1 | AA | — | AA |
| Example 322 | 285 | 1 | 0.01 | 70 | 2 | 1 | AA | — | — | 100 | AA | — | — | 1 | AA | — | AA |
| Example 323 | 313 | 1 | 0.01 | 70 | 2 | 1 | AA | — | — | 99 | AA | — | — | 1 | AA | — | AA |
| Example 324 | 205 | 1 | 0.50 | 100 | 4 | 1 | AA | — | — | — | — | 100 | AA | — | — | AA | AA |
| Example 325 | 221 | 1 | 0.50 | 100 | 4 | 1 | AA | — | — | — | — | 100 | AA | — | — | AA | AA |
| Example 326 | 498 | 1 | 0.50 | 100 | 4 | 1 | AA | — | — | — | — | 99 | AA | — | — | AA | AA |
| Example 327 | 578 | 1 | 0.50 | 100 | 4 | 1 | AA | — | — | — | — | 92 | A | — | — | AA | A |

<Judgment> AA: Excellent, A: Good, C: Poor, <Overall assessment> AA, A: Accepted, C: Rejected

TABLE 32

| | WPT | | | Polymerization condition | | Stability evaluation A | | Stability evaluation B | | Polymerizability A | | Polymerizability B | | Side reactivity A | | Side reactivity B | Overall |
|---|---|---|---|---|---|---|---|---|---|---|---|---|---|---|---|---|---|
| | (g/mol) | α | β | (° C.) | (hr) | (%) | Judgment | (%) | Judgment | (%) | Judgment | (%) | Judgment | (%) | Judgment | Judgment | assessment |
| Example 328 | 671 | 1 | 0.50 | 100 | 4 | 1 | AA | — | — | — | — | 90 | A | — | — | AA | A |
| Example 329 | 100 | 1 | 0.01 | 70 | 2 | 7 | A | — | — | 99 | AA | — | — | 4 | A | — | A |
| Example 330 | 114 | 1 | 0.01 | 70 | 2 | 6 | A | — | — | 100 | AA | — | — | 2 | AA | — | A |
| Example 331 | 128 | 1 | 0.01 | 70 | 2 | 8 | A | — | — | 100 | AA | — | — | 3 | A | — | A |
| Example 332 | 142 | 1 | 0.01 | 70 | 2 | 7 | A | — | — | 99 | AA | — | — | 3 | A | — | A |
| Example 333 | 147 | 1 | 0.50 | 100 | 4 | 7 | A | — | — | — | — | 100 | AA | — | — | AA | A |
| Example 334 | 107 | 1 | 0.50 | 100 | 4 | 1 | AA | — | — | — | — | 98 | AA | — | — | AA | AA |
| Example 335 | 197 | 1 | 0.50 | 100 | 4 | 1 | AA | — | — | — | — | 98 | AA | — | — | AA | AA |
| Example 336 | 207 | 1 | 0.50 | 100 | 4 | 6 | A | — | — | — | — | 100 | AA | — | — | AA | A |
| Example 337 | 190 | 1 | 0.50 | 100 | 4 | 2 | AA | — | — | — | — | 99 | AA | — | — | AA | AA |
| Example 338 | 200 | 1 | 0.50 | 100 | 4 | 6 | A | — | — | — | — | 100 | AA | — | — | AA | A |
| Example 339 | 86 | 1 | 0.01 | 70 | 2 | 5 | AA | — | — | 98 | AA | — | — | 4 | A | — | A |
| Example 340 | 114 | 1 | 0.01 | 70 | 2 | 3 | AA | — | — | 99 | AA | — | — | 2 | AA | — | AA |
| Example 341 | 130 | 1 | 0.01 | 70 | 2 | 2 | AA | — | — | 99 | AA | — | — | 1 | AA | — | AA |
| Example 342 | 140 | 1 | 0.01 | 70 | 2 | 2 | AA | — | — | 98 | AA | — | — | 2 | AA | — | AA |
| Example 343 | 158 | 1 | 0.01 | 70 | 2 | 2 | AA | — | — | 99 | AA | — | — | 1 | AA | — | AA |
| Example 344 | 166 | 1000 | 0.01 | 70 | 2 | 9 | A | — | — | 91 | A | — | — | 5 | A | — | A |
| Example 345 | 166 | 500 | 0.01 | 70 | 2 | 7 | A | — | — | 94 | A | — | — | 4 | A | — | A |
| Example 346 | 166 | 100 | 0.01 | 70 | 2 | 1 | AA | — | — | 98 | AA | — | — | 1 | AA | — | AA |
| Example 347 | 166 | 1.5 | 0.01 | 70 | 2 | 1 | AA | — | — | 99 | AA | — | — | 1 | AA | — | AA |
| Example 348 | 166 | 2 | 0.01 | 70 | 2 | 0 | AA | — | — | 98 | AA | — | — | 1 | AA | — | AA |
| Example 349 | 166 | 1 | 0.005 | 70 | 2 | 0 | AA | — | — | 94 | A | — | — | 0 | AA | — | A |
| Example 350 | 166 | 1 | 0.001 | 70 | 2 | 0 | AA | — | — | 92 | A | — | — | 0 | AA | — | A |
| Example 351 | 166 | 1 | 10 | 70 | 2 | 8 | A | — | — | 100 | AA | — | — | 4 | A | — | A |
| Example 352 | 166 | 1 | 5 | 70 | 2 | 6 | A | — | — | 100 | AA | — | — | 3 | A | — | A |
| Example 353 | 166 | 1 | 2 | 70 | 2 | 2 | AA | — | — | 100 | AA | — | — | 1 | AA | — | AA |
| Example 354 | 166 | 1 | 1 | 70 | 2 | 2 | AA | — | — | 100 | AA | — | — | 1 | AA | — | AA |
| Example 355 | 166 | 1 | 0.5 | 70 | 2 | 2 | AA | — | — | 100 | AA | — | — | 1 | AA | — | AA |
| Example 356 | 166 | 1 | 0.1 | 70 | 2 | 1 | AA | — | — | 99 | AA | — | — | 1 | AA | — | AA |
| Example 357 | 166 | 1 | 0.01 | 50 | 24 | 1 | AA | — | — | 99 | AA | — | — | 0 | AA | — | AA |
| Example 358 | 166 | 1 | 0.01 | 100 | 0.5 | 1 | AA | — | — | 100 | AA | — | — | 1 | AA | — | AA |
| Example 359 | 166 | 1 | 0.01 | 120 | 0.2 | 1 | AA | — | — | 100 | AA | — | — | 2 | AA | — | AA |
| Example 360 | 166 | 1 | 0.01 | 140 | 0.1 | 1 | AA | — | — | 100 | AA | — | — | 4 | A | — | A |

<Judgment> AA: Excellent, A: Good, C: Poor, <Overall assessment> AA, A: Accepted, C: Rejected

TABLE 33

| | Thermal polymerization promoter | | Episulfide compound | | Additive compound | |
|---|---|---|---|---|---|---|
| | Name | % by mass | Name | % by mass | Name | % by mass |
| Comparative Example 1 | BF3DME | 0.01 | EPI-14 | 99.99 | — | — |
| Comparative Example 2 | BF3DEE | 0.01 | EPI-14 | 99.99 | — | — |

TABLE 33-continued

| | Thermal polymerization promoter | | Episulfide compound | | Additive compound | |
|---|---|---|---|---|---|---|
| | Name | % by mass | Name | % by mass | Name | % by mass |
| Comparative Example 3 | BF3DBE | 0.01 | EPI-14 | 99.99 | — | — |
| Comparative Example 4 | BF3TBME | 0.01 | EPI-14 | 99.99 | — | — |

TABLE 33-continued

| | Thermal polymerization promoter | | Episulfide compound | | Additive compound | |
|---|---|---|---|---|---|---|
| | Name | % by mass | Name | % by mass | Name | % by mass |
| Comparative Example 5 | BF3THF | 0.01 | EPI-14 | 99.99 | — | — |
| Comparative Example 6 | BF3DMS | 0.01 | EPI-14 | 99.99 | — | — |
| Comparative Example 7 | BF3MNOL | 0.01 | EPI-14 | 99.99 | — | — |
| Comparative Example 8 | BF3PNOL | 0.01 | EPI-14 | 99.99 | — | — |
| Comparative Example 9 | BF3ACOH | 0.01 | EPI-14 | 99.99 | — | — |
| Comparative Example 10 | BF3PHNOL | 0.02 | EPI-14 | 99.98 | — | — |
| Comparative Example 11 | BF3MEA | 0.01 | EPI-14 | 99.99 | — | — |
| Comparative Example 12 | BF3PPD | 0.01 | EPI-14 | 99.99 | — | — |
| Comparative Example 13 | TBPB | 0.02 | EPI-14 | 99.98 | — | — |
| Comparative Example 14 | TBA | 0.01 | EPI-14 | 99.99 | — | — |
| Comparative Example 15 | DMCHA | 0.01 | EPI-14 | 99.99 | — | — |
| Comparative Example 16 | DEENA | 0.01 | EPI-14 | 99.99 | — | — |
| Comparative Example 17 | SI25 | 0.03 | EPI-14 | 99.97 | — | — |
| Comparative Example 18 | SI60 | 0.03 | EPI-14 | 99.97 | — | — |
| Comparative Example 19 | S100 | 0.03 | EPI-14 | 99.97 | — | — |
| Comparative Example 20 | SI150 | 0.03 | EPI-14 | 99.97 | — | — |
| Comparative Example 21 | SI180 | 0.03 | EPI-14 | 99.97 | — | — |
| Comparative Example 22 | BF3DEE | 0.001 | EPI-14 | 99.999 | — | — |
| Comparative Example 23 | BF3DEE | 0.02 | EPI-1 | 99.98 | — | — |
| Comparative Example 24 | BF3DEE | 0.02 | EPI-2 | 99.98 | — | — |
| Comparative Example 25 | BF3DEE | 0.02 | EPI-3 | 99.98 | — | — |
| Comparative Example 26 | BF3DEE | 0.01 | EPI-4 | 99.99 | — | — |
| Comparative Example 27 | BF3DEE | 0.01 | EPI-5 | 99.99 | — | — |
| Comparative Example 28 | BF3DEE | 0.01 | EPI-6 | 99.99 | — | — |

TABLE 34

| | Thermal polymerization promoter | | Episulfide compound | | Additive compound | |
|---|---|---|---|---|---|---|
| | Name | % by mass | Name | % by mass | Name | % by mass |
| Comparative Example 29 | BF3DEE | 0.01 | EPI-7 | 99.99 | — | — |
| Comparative Example 30 | BF3DEE | 0.01 | EPI-8 | 99.99 | — | — |
| Comparative Example 31 | BF3DEE | 0.01 | EPI-9 | 99.99 | — | — |
| Comparative Example 32 | BF3DEE | 0.01 | EPI-10 | 99.99 | — | — |
| Comparative Example 33 | BF3DEE | 0.01 | EPI-11 | 99.99 | — | — |
| Comparative Example 34 | BF3DEE | 0.005 | EPI-12 | 99.995 | — | — |
| Comparative Example 35 | BF3DEE | 0.005 | EPI-13 | 99.995 | — | — |
| Comparative Example 36 | BF3DEE | 0.3 | EPI-15 | 49.8 | DCM | 49.8 |
| Comparative Example 37 | BF3DEE | 0.6 | EPI-16 | 99.4 | — | — |
| Comparative Example 38 | BF3DEE | 0.1 | EPI-17 | 49.9 | DCM | 49.9 |
| Comparative Example 39 | BF3DEE | 0.1 | EPI-18 | 49.9 | DCM | 49.9 |
| Comparative Example 40 | BF3DEE | 0.1 | EPI-19 | 49.9 | DCM | 49.9 |
| Comparative Example 41 | BF3DEE | 0.01 | EPI-20 | 99.99 | — | — |
| Comparative Example 42 | BF3DEE | 0.01 | EPI-21 | 99.99 | — | — |
| Comparative Example 43 | BF3DEE | 0.01 | EPI-22 | 99.99 | — | — |
| Comparative Example 44 | BF3DEE | 0.01 | EPI-23 | 99.99 | — | — |
| Comparative Example 45 | BF3DEE | 1.0 | EPI-24 | 99.0 | — | — |
| Comparative Example 46 | BF3DEE | 1.3 | EPI-25 | 98.7 | — | — |
| Comparative Example 47 | BF3DEE | 0.7 | EPI-26 | 99.3 | — | — |
| Comparative Example 48 | BF3DEE | 0.7 | EPI-27 | 99.3 | — | — |
| Comparative Example 49 | BF3DEE | 0.7 | EPI-28 | 99.3 | — | — |
| Comparative Example 50 | BF3DEE | 0.7 | EPI-29 | 99.3 | — | — |
| Comparative Example 51 | BF3DEE | 0.02 | EPI-30 | 99.98 | — | — |
| Comparative Example 52 | BF3DEE | 0.01 | EPI-31 | 99.99 | — | — |
| Comparative Example 53 | BF3DEE | 0.01 | EPI-32 | 99.99 | — | — |
| Comparative Example 54 | BF3DEE | 0.01 | EPI-33 | 99.99 | — | — |
| Comparative Example 55 | BF3DEE | 0.01 | EPI-34 | 99.99 | — | — |
| Comparative Example 56 | BF3DEE | 0.01 | EPI-14 | 95.73 | DEE | 4.26 |

TABLE 35

| | WPT | | | Polymerization condition | | Stability evaluation A | | Stability evaluation B | | Polymeriz-ability A | | Polymeriz-ability B | | Side reac-tivity A | | Side reac-tivity B | Overall |
|---|---|---|---|---|---|---|---|---|---|---|---|---|---|---|---|---|---|
| | (g/mol) | α | β | (° C.) | (hr) | (%) | Judg-ment | (%) | Judg-ment | (%) | Judg-ment | (%) | Judg-ment | (%) | Judg-ment | Judg-ment | assess-ment |
| Comparative Example 1 | 166 | 1 | 0.01 | — | — | 100 | C | — | — | 100 | AA | — | — | AA | — | — | C |

TABLE 35-continued

| | WPT (g/mol) | α | β | Polymerization condition (° C.) | Polymerization condition (hr) | Stability evaluation A (%) | Stability evaluation A Judgment | Stability evaluation B (%) | Stability evaluation B Judgment | Polymerizability A (%) | Polymerizability A Judgment | Polymerizability B (%) | Polymerizability B Judgment | Side reactivity A (%) | Side reactivity A Judgment | Side reactivity B Judgment | Overall assessment |
|---|---|---|---|---|---|---|---|---|---|---|---|---|---|---|---|---|---|
| Comparative Example 2 | 166 | 1 | 0.01 | — | — | 100 | C | — | — | 100 | AA | — | — | AA | — | — | C |
| Comparative Example 3 | 166 | 1 | 0.01 | — | — | 100 | C | — | — | 100 | AA | — | — | 9 | C | — | C |
| Comparative Example 4 | 166 | 1 | 0.01 | — | — | 100 | C | — | — | 100 | AA | — | — | 6 | C | — | C |
| Comparative Example 5 | 166 | 1 | 0.01 | — | — | 100 | C | — | — | 100 | AA | — | — | 7 | C | — | C |
| Comparative Example 6 | 166 | 1 | 0.01 | — | — | 100 | C | — | — | 100 | AA | — | — | 16 | C | — | C |
| Comparative Example 7 | 166 | 1 | 0.01 | — | — | 100 | C | — | — | 100 | AA | — | — | 8 | C | — | C |
| Comparative Example 8 | 166 | 1 | 0.01 | — | — | 100 | C | — | — | 100 | AA | — | — | 8 | C | — | C |
| Comparative Example 9 | 166 | 1 | 0.01 | — | — | 100 | C | — | — | 100 | AA | — | — | 12 | C | — | C |
| Comparative Example 10 | 166 | 1 | 0.01 | — | — | 100 | C | — | — | 100 | AA | — | — | 11 | C | — | C |
| Comparative Example 11 | 166 | 1 | 0.01 | 70 | 2 | 1 | AA | — | — | 8 | C | — | — | 4 | C | — | C |
| Comparative Example 12 | 166 | 1 | 0.01 | 70 | 2 | 1 | AA | — | — | 2 | C | — | — | 3 | C | — | C |
| Comparative Example 13 | 166 | — | — | 70 | 2 | 1 | AA | — | — | 5 | C | — | — | 3 | C | — | C |
| Comparative Example 14 | 166 | — | — | 70 | 2 | 2 | AA | — | — | 4 | C | — | — | 3 | C | — | C |
| Comparative Example 15 | 166 | — | — | 70 | 2 | 2 | AA | — | — | 6 | C | — | — | 3 | C | — | C |
| Comparative Example 16 | 166 | — | — | 70 | 2 | 2 | AA | — | — | 7 | C | — | — | 3 | C | — | C |
| Comparative Example 17 | 166 | — | — | — | — | 100 | C | — | — | 100 | AA | — | — | 15 | C | — | C |
| Comparative Example 18 | 166 | — | — | — | — | 100 | C | — | — | 100 | AA | — | — | 14 | C | — | C |
| Comparative Example 19 | 166 | — | — | — | — | 100 | C | — | — | 100 | AA | — | — | 14 | C | — | C |
| Comparative Example 20 | 166 | — | — | — | — | 100 | C | — | — | 100 | AA | — | — | 13 | C | — | C |
| Comparative Example 21 | 166 | — | — | — | — | 100 | C | — | — | 100 | AA | — | — | 14 | C | — | C |
| Comparative Example 22 | 166 | 1 | 0.001 | 70 | 2 | 82 | C | — | — | 100 | AA | — | — | 7 | C | — | C |
| Comparative Example 23 | 60 | 1 | 0.01 | — | — | 100 | C | — | — | 100 | AA | — | — | 11 | C | — | C |
| Comparative Example 24 | 74 | 1 | 0.01 | — | — | 100 | C | — | — | 100 | AA | — | — | 10 | C | — | C |
| Comparative Example 25 | 88 | 1 | 0.01 | — | — | 100 | C | — | — | 100 | AA | — | — | 9 | C | — | C |
| Comparative Example 26 | 102 | 1 | 0.01 | — | — | 100 | C | — | — | 100 | AA | — | — | 8 | C | — | C |
| Comparative Example 27 | 116 | 1 | 0.01 | — | — | 100 | C | — | — | 100 | AA | — | — | 7 | C | — | C |
| Comparative Example 28 | 130 | 1 | 0.01 | — | — | 100 | C | — | — | 100 | AA | — | — | 8 | C | — | C |

<Judgment> AA: Excellent, A: Good, C: Poor, <Overall assessment> AA, A: Accepted, C: Rejected

TABLE 36

| | WPT (g/mol) | α | β | Polymerization condition (° C.) | Polymerization condition (hr) | Stability evaluation A (%) | Stability evaluation A Judgment | Stability evaluation B (%) | Stability evaluation B Judgment | Polymerizability A (%) | Polymerizability A Judgment | Polymerizability B (%) | Polymerizability B Judgment | Side reactivity A (%) | Side reactivity A Judgment | Side reactivity B Judgment | Overall assessment |
|---|---|---|---|---|---|---|---|---|---|---|---|---|---|---|---|---|---|
| Comparative Example 29 | 144 | 1 | 0.01 | — | — | 100 | C | — | — | 100 | AA | — | — | 6 | C | — | C |
| Comparative Example 30 | 172 | 1 | 0.01 | — | — | 100 | C | — | — | 100 | AA | — | — | 7 | C | — | C |

TABLE 36-continued

| | WPT | α | β | Polymerization condition | | Stability evaluation A | | Stability evaluation B | | Polymerizability A | | Polymerizability B | | Side reactivity A | | Side reactivity B | Overall |
|---|---|---|---|---|---|---|---|---|---|---|---|---|---|---|---|---|---|
| | (g/mol) | | | (° C.) | (hr) | (%) | Judgment | (%) | Judgment | (%) | Judgment | (%) | Judgment | (%) | Judgment | Judgment | assessment |
| Comparative Example 31 | 200 | 1 | 0.01 | — | — | 100 | C | — | — | 100 | AA | — | — | 8 | C | — | C |
| Comparative Example 32 | 228 | 1 | 0.01 | — | — | 100 | C | — | — | 100 | AA | — | — | 7 | C | — | C |
| Comparative Example 33 | 256 | 1 | 0.01 | — | — | 100 | C | — | — | 100 | AA | — | — | 7 | C | — | C |
| Comparative Example 34 | 285 | 1 | 0.01 | — | — | 100 | C | — | — | 100 | AA | — | — | 8 | C | — | C |
| Comparative Example 35 | 313 | 1 | 0.01 | — | — | 100 | C | — | — | 100 | AA | — | — | 8 | C | — | C |
| Comparative Example 36 | 205 | 1 | 1 | — | — | — | — | 100 | C | — | — | 100 | AA | — | — | C | C |
| Comparative Example 37 | 221 | 1 | 1 | — | — | — | — | 100 | C | — | — | 100 | AA | — | — | C | C |
| Comparative Example 38 | 498 | 1 | 1 | — | — | — | — | 100 | C | — | — | 100 | AA | — | — | C | C |
| Comparative Example 39 | 578 | 1 | 1 | — | — | — | — | 100 | C | — | — | 100 | AA | — | — | C | C |
| Comparative Example 40 | 671 | 1 | 1 | — | — | — | — | 100 | C | — | — | 100 | AA | — | — | C | C |
| Comparative Example 41 | 100 | 1 | 0.01 | — | — | 100 | C | — | — | 100 | AA | — | — | 16 | C | — | C |
| Comparative Example 42 | 114 | 1 | 0.01 | — | — | 100 | C | — | — | 100 | AA | — | — | 15 | C | — | C |
| Comparative Example 43 | 128 | 1 | 0.01 | — | — | 100 | C | — | — | 100 | AA | — | — | 14 | C | — | C |
| Comparative Example 44 | 142 | 1 | 0.01 | — | — | 100 | C | — | — | 100 | AA | — | — | 16 | C | — | C |
| Comparative Example 45 | 147 | 1 | 1 | — | — | — | — | 100 | C | — | — | 100 | AA | — | — | C | C |
| Comparative Example 46 | 107 | 1 | 1 | — | — | — | — | 100 | C | — | — | 100 | AA | — | — | C | C |
| Comparative Example 47 | 197 | 1 | 1 | — | — | — | — | 100 | C | — | — | 100 | AA | — | — | C | C |
| Comparative Example 48 | 207 | 1 | 1 | — | — | — | — | 100 | C | — | — | 100 | AA | — | — | C | C |
| Comparative Example 49 | 190 | 1 | 1 | — | — | — | — | 100 | C | — | — | 100 | AA | — | — | C | C |
| Comparative Example 50 | 200 | 1 | 1 | — | — | — | — | 100 | C | — | — | 100 | AA | — | — | C | C |
| Comparative Example 51 | 86 | 1 | 0.01 | — | — | 100 | C | — | — | 100 | AA | — | — | 8 | C | — | C |
| Comparative Example 52 | 114 | 1 | 0.01 | — | — | 100 | C | — | — | 100 | AA | — | — | 7 | C | — | C |
| Comparative Example 53 | 130 | 1 | 0.01 | — | — | 100 | C | — | — | 100 | AA | — | — | 7 | C | — | C |
| Comparative Example 54 | 140 | 1 | 0.01 | — | — | 100 | C | — | — | 100 | AA | — | — | 8 | C | — | C |
| Comparative Example 55 | 158 | 1 | 0.01 | — | — | 100 | C | — | — | 100 | AA | — | — | 8 | C | — | C |
| Comparative Example 56 | 166 | 1000 | 0.01 | 70 | 2 | 61 | C | — | — | 100 | AA | — | — | 2 | AA | — | C |

<Judgment> AA: Excellent, A: Good, C: Poor, <Overall assessment> AA, A: Accepted, C: Rejected As shown in Tables 1 to 36, it was confirmed that: the composition comprising the at least one compound (A) selected from the group consisting of an ether compound having two or more ether groups, a trivalent phosphorus compound, and a ketone compound, the boron trihalide (B), and the episulfide compound (C) according to the present embodiment was excellent in stability and polymerizability with a few side reactions during polymerizing the polymerizable composition; and a polymer was obtained by polymerizing the polymerizable composition. By contrast, according to Comparative Examples using a polymerizable composition comprising one compound selected from an ether compound having one ether group, a sulfide compound, an alcohol compound, an acidic compound, and nitrogen-containing compound, a boron trihalide, and an episulfide compound, or a publicly known thermal polymerization promoter used in polymerizing an episulfide compound, one that satisfied all of the evaluations of stability, polymerizability, and side reactivity was not confirmed.

Example 361

Preparation of Polymer-Coated Glass Substrate (1) The polymer obtained in Example 71 was dissolved in dichloromethane (manufactured by Wako Pure Chemical Industries, Ltd.) of the same weight thereas to obtain a polymer solution.

In this context, the compound used for dissolving the polymer is not particularly limited and may be one that can dissolve the polymer and can be removed in a later step.

(2) The polymer solution of (1) was added dropwise onto a square quartz glass plate (manufactured by GL Sciences Inc., size: 10 mm×10 mm, thickness: 1 mm) with both surfaces optically polished, and spread at approximately 41 μm using a bar coater (Dai-Ichi Rika Co., Ltd., wire coil number: No. 18).

(3) The quartz glass plate obtained in (2) above was put in a vacuum dryer (manufactured by Tokyo RikaKikai Co., Ltd., VOS-451D; Small Oil Rotary Vacuum Pump GCD-201X manufactured by ULVAC KIKO, Inc. was used as a vacuum pump) and dried at room temperature at 13 Pa for 24 hours.

In this context, the temperature and pressure for drying are not particularly limited, and conditions where volatiles contained in the polymer solution do not rapidly volatilize can be appropriately selected. In the present Example, the pressure was gradually reduced and finally set to 13 kPa.

<Transparency Maintenance Evaluation of Polymer on Glass Substrate>

(4) The total light transmittance of the polymer-coated portion present on the quartz glass plate after the drying was measured using a haze meter (manufactured by Nippon Denshoku Industries Co., Ltd., NDH-5000W) (the total light transmittance obtained here is referred to as "TLT0"). In the present Example, the total light transmittance was 86%.

(5) The quartz glass plate after the drying was put and preserved for 300 days in a thermo-hygrostat (manufactured by Espec Corp., PSL-4J) set to a temperature of 25° C. and a humidity of 60% RH.

(6) The total light transmittance of the polymer-coated portion present on the quartz glass plate obtained in (5) above was measured similarly to (4) above (the total light transmittance obtained here is referred to as "TLT300").

(7) The transparency maintenance was judged as being good ("A") in the case where TLT300 was 80% or more, judged as being excellent ("AA") in the case of 85% or more, and judged as being poor ("C") in the case other than these. In the present Example, the transparency maintenance was judged as being good because TLT300 was 80%.

(8) The rate of transparency maintenance (hereinafter, referred to as "dTLT") was calculated using the following formula:

$$dTLT\ (\%) = TLT300/TLT0 \times 100$$

(9) The transparency maintenance was judged as being good ("A") in the case where the rate of transparency maintenance was 90% or more, judged as being excellent ("AA") in the case of 95% or more, and judged as being poor ("C") in the case other than these. In the present Example, the transparency maintenance was judged as being good because the rate of transparency maintenance was 93%.

(10) The case of being judged as being excellent in the evaluations of (7) and (9) at the same time, and the case of being judged as being good in at least one evaluation and judged as being excellent or good in the other evaluation were regarded as being accepted (("AA" or "A") as overall assessment. All other cases were regarded as being rejected ("C").

In the present Example, overall assessment was judged as being good ("A") because TLT300 was as good ("A") as 80% and dTLT was as good ("A") as 93% and because of being good in both the evaluations.

Examples 362 to 375

Polymer-coated glass substrates were evaluated by a method similar to Example 361 except that the polymers obtained in Examples described in Table 37 were used.

TABLE 37

| | | | | Polymerization condition | | | TLT300 | | dTLT | | Overall |
|---|---|---|---|---|---|---|---|---|---|---|---|
| | Polymer used | α | β | (° C.) | (hr) | TLTO | (%) | Judgment | (%) | Judgment | assessment |
| Example 361 | Example 71 | 1 | 2 | 70 | 2 | 86 | 80 | A | 93 | A | A |
| Example 362 | Example 72 | 1 | 1 | 70 | 2 | 88 | 84 | A | 95 | AA | A |
| Example 363 | Example 73 | 1 | 0.5 | 70 | 2 | 90 | 88 | AA | 98 | AA | AA |
| Example 364 | Example 74 | 1 | 0.1 | 70 | 2 | 90 | 90 | AA | 100 | AA | AA |
| Example 365 | Example 3 | 1 | 0.01 | 70 | 2 | 90 | 90 | AA | 100 | AA | AA |
| Example 366 | Example 190 | 1 | 2 | 70 | 2 | 88 | 83 | A | 94 | A | A |
| Example 367 | Example 191 | 1 | 1 | 70 | 2 | 89 | 86 | AA | 97 | AA | AA |
| Example 368 | Example 192 | 1 | 0.5 | 70 | 2 | 90 | 90 | AA | 100 | AA | AA |
| Example 369 | Example 193 | 1 | 0.1 | 70 | 2 | 90 | 90 | AA | 100 | AA | AA |
| Example 370 | Example 96 | 1 | 0.01 | 70 | 2 | 90 | 90 | AA | 100 | AA | AA |
| Example 371 | Example 287 | 1 | 2 | 70 | 2 | 89 | 84 | A | 94 | A | A |
| Example 372 | Example 288 | 1 | 1 | 70 | 2 | 90 | 86 | AA | 96 | AA | AA |
| Example 373 | Example 289 | 1 | 0.5 | 70 | 2 | 90 | 89 | AA | 99 | AA | AA |
| Example 374 | Example 290 | 1 | 0.1 | 70 | 2 | 90 | 90 | AA | 100 | AA | AA |
| Example 375 | Example 207 | 1 | 0.01 | 70 | 2 | 90 | 90 | AA | 100 | AA | AA |

<Judgment> AA: Excellent, A: Good, C: Poor

As shown in Table 37, it was confirmed that the polymer obtained by polymerizing the composition comprising the at least one compound (A) selected from the group consisting of an ether compound having two or more ether groups, a trivalent phosphorus compound, and a ketone compound, the boron trihalide (B), and the episulfide compound (C) according to the present embodiment had a few changes in transparency even after being stored for a long period.

<Calculation of Content of Vinyl Bond in Polymer (Hereinafter, Referred to as a "VA Method"): $^{1}$H-NMR Measurement>

The content of a vinyl bond in a polymer was calculated by procedures below.

(1) 10 mg of a polymer and 20 mg of an internal standard were weighed into a sample bottle, and further, chloroform-d (manufactured by Wako Pure Chemical Industries, Ltd.) was added to adjust the whole amount to 1 g.

Internal standard: 1,1,2,2-tetrabromoethane (manufactured by Tokyo Chemical Industry Co., Ltd.; hereinafter, referred to as "TBE")

(2) The solution of (1) was transferred to an NMR tube of 4 mmϕ in diameter, and $^{1}$H-NMR was measured under the following conditions: Fourier transform nuclear magnetic resonance apparatus: "ECA 700 model" manufactured by JEOL Ltd.

Nuclide: $^{1}$H

Number of average: 30000

From the measurement results, the content of a vinyl bond in the polymer was calculated by procedures below.

(3) The area value of a vinyl group-derived peak was calculated from $^{1}$H-NMR charts.

In this context, the vinyl group-derived peak refers to a peak derived from one hydrogen atom on hydrocarbon constituting a vinyl group, and a peak that does not overlap with a peak derived from hydrogen other than hydrogen derived from a vinyl group constituting the polymer is appropriately selected.

(4) The area value of an internal standard-derived peak was calculated from $^{1}$H-NMR charts.

(5) The area values calculated in (3) and (4) above were substituted into the following formula to determine the content (%) of a vinyl bond:

Content (%) of a vinyl bond=VINA×(TBEG/TBEM)×(2/TBEA)/×VINM/POLG×100

VINA: area value of the vinyl group-derived peak

VINM: molar number of the vinyl group (in the present Example, 24 which corresponds to C═C bond)

TBEA: area value of peaks derived from two hydrogen atoms of TBE

TBEG: weight (g) of TBE used in preparing the solution for performing the $^{1}$H-NMR measurement (in the present Example, 20 mg)

TBEM: molecular weight of TBE

POLG: weight (g) of the polymer used in preparing the solution for performing the $^{1}$H-NMR measurement (in the present Example, 10 mg)

<Calculation of Content of Vinyl Bond in Polymer (Hereinafter, Referred to as a "VB Method"): $^{13}$C-NMR Measurement>

In the case where a polymer was not dissolved in chloroform-d, the content of a vinyl bond in a polymer was calculated by procedures below.

(1) A mixture of 1 g of a polymer and 0.1 g of an internal standard was prepared into a powder using a freezing pulverizer.

Internal standard: 1,1,1,2,2,2-hexachloroethane (manufactured by Sigma-Aldrich Corp.; hereinafter, referred to as "HCE")

(2) The sample of (1) was transferred to an NMR tube of 4 mmϕ in diameter, and $^{13}$C-NMR was measured under the following conditions: Fourier transform nuclear magnetic resonance apparatus: "ECA 700 model" manufactured by JEOL Ltd.

Nuclide: $^{13}$C

Measurement method: DD/MAS method

Pulse width: 45°

Number of average: 100000

MAS: 10000 Hz

From the measurement results, the content of a vinyl bond in the polymer was calculated by procedures below.

(3) The area value of a vinyl group-derived peak was calculated from $^{13}$C-NMR charts.

In this context, the vinyl group-derived peak refers to a peak derived from carbon constituting a vinyl group, and a peak that does not overlap with a peak derived from carbon other than carbon derived from a vinyl group constituting the polymer is appropriately selected.

(4) The area value of an internal standard-derived peak was calculated from $^{13}$C-NMR charts.

(5) The area values calculated in (3) and (4) above were substituted into the following formula to determine the content (%) of a vinyl bond.

Content (%) of a vinyl bond=VICA×(HCEG/HCEM)×(2/HCEA)/×VICM/POCG×100

VICA: area value of the vinyl group-derived peak

VICM: molar number of the vinyl group (in the present Example, 24 which corresponds to C═C bond)

HCEA: area value of peaks derived from two hydrogen atoms of TBE

HCEG: weight (g) of HCE used in preparing the solution for performing the $^{13}$C-NMR measurement (in the present Example, 0.1 g)

HCEM: molecular weight of HCE POCG: weight (g) of the polymer used in preparing the solution for performing the $^{13}$C-NMR measurement (in the present Example, 1 g)

<Measurement of Contents of Boron and Phosphorus Atoms in Polymer: ICP Measurement>

The ICP measurement was performed by procedures below.

(1) A polymer and nitric acid were put in a container made of Teflon (registered trademark) and dissolved by heating/stirring.

In the case where a polymer was not dissolved in only nitric acid, a mixed solution of nitric acid and hydrofluoric acid was used.

Moreover, in the case where a polymer was not dissolved by only heating, it was irradiated with microwave.

As described above, approaches that can be used in the case where the dissolution of the polymer was difficult were carried out with reference to "ICP Hakko Bunseki (ICP Emission Spectrometry in English)/ICP Shitsuryo Bunseki No Kiso To Jissai (Basics and Practice in Mass Spectrometry in English)—Sochi O Tukaikonasu Tameni (For Making Full Use of Apparatus in English) (manufactured by Ohmsha, Ltd.)" or "Practical Guide to ICP-MS: A Tutorial for Beginners, Second Edition (Practical Spectroscopy) (manufactured by CRC Press, LLC)".

(2) The solution obtained in (1) above was collected into a Teflon (registered trademark) beaker and dried on a hot plate.

(3) A mixed solution of nitric acid and hydrochloric acid was added to the dried product of (2) and dissolved by heating on a hot plate.

(4) Pure water was added to the solution of (3) to prepare a constant volume.

(5) The contents of boron and phosphorus atoms in the polymer were measured using the solution of (4) and an ICP mass spectrometer (manufactured by Agilent Technologies, Inc., "7500cs") or an ICP emission spectrophotometer (manufactured by Agilent Technologies, Inc., "730-ES").

Example 376

Preparation of Boron Trihalide-Ether Compound (BF3-MECC-1)

(1) Preparation: A water bath equipped with an immersion cooling and heating unit was placed on a magnetic stirrer, and water and a stirring bar were put therein. The immersion cooling and heating unit was activated, and the temperature of water was set to 20° C.

(2) A reaction container filled with nitrogen gas was placed in the water bath of (1), and 24% by mass of 1,4-dioxane and 76% by mass of a boron trifluoride-diethyl ether complex were added to the reaction container and stirred for 1 hour.

(3) A vacuum distillation apparatus was attached to the reaction container, and the pressure was gradually reduced, finally reduced to 2 kPa, and maintained for 4 hours.

(4) Analysis by $^{11}$B-NMR was conducted using the one obtained in (3) above to thereby confirm that a complex was formed.

<Preparation and Polymerization of Composition>

(5) Preparation was performed by procedures similar to (1) above.

(6) A reaction container filled with nitrogen gas was placed in the water bath of (5), and each starting material was added to the reaction container according to the compositional ratio of Table 18 and stirred to thereby prepare a composition.

(7) The composition prepared in (6) above was polymerized according to the polymerization conditions of Table 19 to thereby obtain a polymer.

(8) The rate of episulfide group reaction of the polymer obtained in (7) above was measured by the method of Table 19 to confirm that an episulfide group in the starting episulfide compound was polymerized.

(9) The polymer obtained in (8) above was put in a vacuum dryer (manufactured by Tokyo RikaKikai Co., Ltd., VOS-451D, Small Oil Rotary Vacuum Pump GCD-201X manufactured by ULVAC KIKO, Inc. was used as a vacuum pump) and dried at 100° C. at 13 Pa for 24 hours.

In this context, the temperature and pressure for drying are not particularly limited, and conditions where volatiles contained in the polymer do not rapidly volatilize can be appropriately selected. In the present Example, the pressure was gradually reduced and finally set to 13 kPa.

(10) The content of a vinyl group in the polymer obtained in (9) above was measured by the method of Table 19.

<Thermal Discoloration Resistance Evaluation of Polymer: The Case where the Starting Episulfide Compound of the Polymer has One Episulfide Group>

(11) The polymer obtained in (9) above was dissolved in dichloromethane (manufactured by Wako Pure Chemical Industries, Ltd.) of the same weight thereas to obtain a polymer solution.

In this context, the compound used for dissolving the polymer is not particularly limited and may be one that can dissolve the polymer and can be removed in a later step.

(12) The polymer solution of (11) was added dropwise onto a square quartz glass plate (manufactured by GL Sciences Inc., size: 10 mm×10 mm, thickness: 1 mm) with both surfaces optically polished, and spread at approximately 41 μm using a bar coater (Dai-Ichi Rika Co., Ltd., wire coil number: No. 18).

(13) The quartz glass plate obtained in (12) above was put in a vacuum dryer (manufactured by Tokyo RikaKikai Co., Ltd., VOS-451D; Small Oil Rotary Vacuum Pump GCD-201X manufactured by ULVAC KIKO, Inc. was used as a vacuum pump) and dried at room temperature at 13 Pa for 24 hours.

In this context, the temperature and pressure for drying are not particularly limited, and conditions where volatiles contained in the polymer solution do not rapidly volatilize can be appropriately selected. In the present Example, the pressure was gradually reduced and finally set to 13 kPa.

(14) The quartz glass plate after the drying was put and preserved for 1000 hours in an incubator (manufactured by Espec Corp., PVHC-332) set to a temperature of 130° C.

(15) The yellow index (hereinafter, referred to as "YI") of the polymer-coated portion present on the quartz glass plate obtained in (14) above was measured using a spectrophotometric colorimeter (manufactured by Konica Minolta, Inc., CM-3600d).

In the present Example, YI was 1.

(16) The thermal discoloration resistance was judged as being good ("A") in the case where YI was 10 or less, judged as being excellent ("AA") in the case of 5 or less, and judged as being poor ("C") in the case other than these. In the present Example, the thermal discoloration resistance was judged as being excellent because YI was 1.

<Thermal Discoloration Resistance Evaluation of Polymer: The Case where the Starting Episulfide Compound of the Polymer has Two or More Episulfide Groups>

(17) The composition prepared in (6) above was added dropwise onto a square quartz glass plate (manufactured by GL Sciences Inc., size: 10 mm×10 mm, thickness: 1 mm) with both surfaces optically polished, and spread at approximately 41 μm using a bar coater (Dai-Ichi Rika Co., Ltd., wire coil number: No. 18).

(18) The quartz glass plate obtained in (17) above was polymerized according to the polymerization conditions shown in the table to thereby obtain a polymer on the quartz glass plate.

(19) The quartz glass plate obtained in (18) above was put in a vacuum dryer (manufactured by Tokyo RikaKikai Co., Ltd., VOS-451D; Small Oil Rotary Vacuum Pump GCD-201X manufactured by ULVAC KIKO, Inc. was used as a vacuum pump) and dried at 100° C. at 13 Pa for 24 hours.

In this context, the temperature and pressure for drying are not particularly limited, and conditions where volatiles contained in the polymer do not rapidly volatilize can be appropriately selected. In the present Example, the pressure was gradually reduced and finally set to 13 kPa.

(20) The quartz glass plate obtained in (19) above was put and preserved for 1000 hours in an incubator (manufactured by Espec Corp., PVHC-332) set to a temperature of 130° C.

(21) The yellow index (hereinafter, referred to as "YI") of the polymer-coated portion present on the quartz glass plate obtained in (20) above was measured using a spectrophotometric colorimeter (manufactured by Konica Minolta, Inc., CM-3600d).

(22) The thermal discoloration resistance was judged as being good ("A") in the case where YI was 10 or less, judged as being excellent ("AA") in the case of 5 or less, and judged as being poor ("C") in the case other than these.

Examples 377 to 419

Polymers were obtained by a method similar to Example 376 except that the compositional ratios of Tables 38 and 39 and the polymerization conditions of Tables 40 and 41 were used. The evaluation results of the polymers obtained in Examples 377 to 419 are shown in Tables 40 and 41.

In Examples 382 to 388 and 395 to 403, the polymers were prepared in sealed pressure-resistant bottles.

Example 420

In the preparation of the boron trihalide-trivalent phosphorus compound (BF3-3PCR-1), a method similar to Example 376 was performed except that 72% by mass of tri-n-octylphosphine and 28% by mass of a boron trifluoride-diethyl ether complex were used and the compositional ratio of Table 42 and the polymerization conditions of Table 44 were used.

Examples 421 to 463

Polymers were obtained by a method similar to Example 420 except that the compositional ratios of Tables 42 and 43 and the polymerization conditions of Tables 44 and 45 were used. The evaluation results of the polymers obtained in Examples 421 to 463 are shown in Tables 44 and 45.

In Examples 426 to 432 and 439 to 447, the polymers were prepared in sealed pressure-resistant bottles.

Example 464

In the preparation of the boron trihalide-ketone compound (BF3-MKCJ-1), a method similar to Example 376 was performed except that 41% by mass of cyclohexanone and 59% by mass of a boron trifluoride-diethyl ether complex were used and the compositional ratio of Table 46 and the polymerization conditions of Table 48 were used.

Examples 465 to 507

Polymers were obtained by a method similar to Example 464 except that the compositional ratios of Tables 46 and 47 and the polymerization conditions of Tables 48 and 49 were used. The evaluation results of the polymers obtained in Examples 465 to 507 are shown in Tables 48 and 49.

In Examples 470 to 476 and 483 to 491, the polymers were prepared in sealed pressure-resistant bottles.

Comparative Examples 57 to 90

The compositions of Comparative Examples 57 to 90 were prepared by a method similar to Example 376 above according to the composition of Table 50, and polymers were obtained according to the polymerization conditions of Table 51. The evaluation results of the polymers obtained in Comparative Examples 57 to 79 are shown in Table 51. Comparative Examples 80 to 90 yielded polymers during the preparation of compositions, and therefore, evaluation could not be performed.

In Comparative Examples 57 to 63 and 71 to 79, the polymers were prepared in sealed pressure-resistant bottles.

TABLE 38

| | Boron trihalide-ether compound | | Episulfide compound | | Additive compound | |
|---|---|---|---|---|---|---|
| | Name | % by mass | Name | % by mass | Name | % by mass |
| Example 376 | BF3-MECC-1 | 0.01 | EPI-14 | 99.99 | — | — |
| Example 377 | BF3-MECC-1 | 0.01 | EPI-14 | 99.99 | — | — |
| Example 378 | BF3-MECC-1 | 0.01 | EPI-14 | 99.99 | — | — |
| Example 379 | BF3-MECC-1 | 0.01 | EPI-14 | 99.99 | — | — |

TABLE 38-continued

| | Boron trihalide-ether compound | | Episulfide compound | | Additive compound | |
|---|---|---|---|---|---|---|
| | Name | % by mass | Name | % by mass | Name | % by mass |
| Example 380 | BF3-MECC-1 | 0.01 | EPI-14 | 99.99 | — | — |
| Example 381 | BF3-MECC-1 | 0.01 | EPI-14 | 99.99 | — | — |
| Example 382 | BF3-MECC-1 | 0.02 | EPI-1 | 99.98 | — | — |
| Example 383 | BF3-MECC-1 | 0.02 | EPI-2 | 99.98 | — | — |
| Example 384 | BF3-MECC-1 | 0.01 | EPI-3 | 99.99 | — | — |
| Example 385 | BF3-MECC-1 | 0.01 | EPI-4 | 99.99 | — | — |
| Example 386 | BF3-MECC-1 | 0.01 | EPI-5 | 99.99 | — | — |
| Example 387 | BF3-MECC-1 | 0.01 | EPI-6 | 99.99 | — | — |
| Example 388 | BF3-MECC-1 | 0.01 | EPI-7 | 99.99 | — | — |
| Example 389 | BF3-MECC-1 | 0.01 | EPI-8 | 99.99 | — | — |
| Example 390 | BF3-MECC-1 | 0.01 | EPI-9 | 99.99 | — | — |
| Example 391 | BF3-MECC-1 | 0.005 | EPI-10 | 99.995 | — | — |
| Example 392 | BF3-MECC-1 | 0.004 | EPI-11 | 99.996 | — | — |
| Example 393 | BF3-MECC-1 | 0.004 | EPI-12 | 99.996 | — | — |
| Example 394 | BF3-MECC-1 | 0.004 | EPI-13 | 99.996 | — | — |
| Example 395 | BF3-MECC-1 | 0.01 | EPI-20 | 99.99 | — | — |
| Example 396 | BF3-MECC-1 | 0.01 | EPI-21 | 99.99 | — | — |
| Example 397 | BF3-MECC-1 | 0.01 | EPI-22 | 99.99 | — | — |
| Example 398 | BF3-MECC-1 | 0.01 | EPI-23 | 99.99 | — | — |

TABLE 39

| | Boron trihalide-ether compound | | Episulfide compound | | Additive compound | |
|---|---|---|---|---|---|---|
| | Name | % by mass | Name | % by mass | Name | % by mass |
| Example 399 | BF3-MECC-1 | 0.01 | EPI-30 | 99.99 | — | — |
| Example 400 | BF3-MECC-1 | 0.01 | EPI-31 | 99.99 | — | — |
| Example 401 | BF3-MECC-1 | 0.01 | EPI-32 | 99.99 | — | — |
| Example 402 | BF3-MECC-1 | 0.01 | EPI-33 | 99.99 | — | — |
| Example 403 | BF3-MECC-1 | 0.01 | EPI-34 | 99.99 | — | — |
| Example 404 | BF3-MECC-1 | 0.3 | EPI-16 | 99.7 | — | — |
| Example 405 | BF3-MECC-1 | 0.3 | EPI-16 | 99.7 | — | — |
| Example 406 | BF3-MECC-1 | 0.3 | EPI-16 | 99.7 | — | — |
| Example 407 | BF3-MECC-1 | 0.3 | EPI-16 | 99.7 | — | — |
| Example 408 | BF3-MECC-1 | 0.3 | EPI-16 | 99.7 | — | — |
| Example 409 | BF3-MECC-1 | 0.3 | EPI-16 | 99.7 | — | — |
| Example 410 | BF3-MECC-1 | 0.1 | EPI-15 | 49.9 | DCM | 49.9 |
| Example 411 | BF3-MECC-1 | 0.06 | EPI-17 | 49.97 | DCM | 49.97 |
| Example 412 | BF3-MECC-1 | 0.05 | EPI-18 | 49.98 | DCM | 49.98 |
| Example 413 | BF3-MECC-1 | 0.04 | EPI-19 | 49.98 | DCM | 49.98 |
| Example 414 | BF3-MECC-1 | 0.4 | EPI-24 | 99.6 | — | — |
| Example 415 | BF3-MECC-1 | 0.5 | EPI-25 | 99.5 | — | — |
| Example 416 | BF3-MECC-1 | 0.3 | EPI-26 | 99.7 | — | — |
| Example 417 | BF3-MECC-1 | 0.3 | EPI-27 | 99.7 | — | — |
| Example 418 | BF3-MECC-1 | 0.3 | EPI-28 | 99.7 | — | — |
| Example 419 | BF3-MECC-1 | 0.3 | EPI-29 | 99.7 | — | — |

TABLE 40

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 376 | 50 | 24 | EA method | 98 | VA method | 0.00 | 1 | AA |
| Example 377 | 60 | 8 | EA method | 98 | VA method | 0.01 | 1 | AA |
| Example 378 | 70 | 2 | EA method | 98 | VA method | 0.07 | 1 | AA |
| Example 379 | 100 | 0.5 | EA method | 100 | VA method | 0.2 | 2 | AA |
| Example 380 | 120 | 0.2 | EA method | 100 | VA method | 0.6 | 6 | A |
| Example 381 | 140 | 0.1 | EA method | 100 | VA method | 1 | 9 | A |
| Example 382 | 70 | 2 | EA method | 92 | VA method | 2 | 9 | A |
| Example 383 | 70 | 2 | EA method | 94 | VA method | 0.8 | 7 | A |
| Example 384 | 70 | 2 | EA method | 95 | VA method | 0.8 | 7 | A |
| Example 385 | 70 | 2 | EA method | 96 | VA method | 0.6 | 6 | A |

TABLE 40-continued

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 386 | 70 | 2 | EA method | 97 | VA method | 0.3 | 2 | AA |
| Example 387 | 70 | 2 | EA method | 98 | VA method | 0.1 | 1 | AA |
| Example 388 | 70 | 2 | EA method | 99 | VA method | 0.2 | 2 | AA |
| Example 389 | 70 | 2 | EA method | 98 | VA method | 0.07 | 1 | AA |
| Example 390 | 70 | 2 | EA method | 98 | VA method | 0.07 | 1 | AA |
| Example 391 | 70 | 2 | EA method | 99 | VA method | 0.2 | 2 | AA |
| Example 392 | 70 | 2 | EA method | 98 | VA method | 0.1 | 2 | AA |
| Example 393 | 70 | 2 | EA method | 98 | VA method | 0.1 | 2 | AA |
| Example 394 | 70 | 2 | EA method | 98 | VA method | 0.1 | 2 | AA |
| Example 395 | 70 | 2 | EA method | 100 | VA method | 2 | 10 | A |
| Example 396 | 70 | 2 | EA method | 100 | VA method | 0.6 | 6 | A |
| Example 397 | 70 | 2 | EA method | 100 | VA method | 0.6 | 7 | A |
| Example 398 | 70 | 2 | EA method | 100 | VA method | 0.7 | 7 | A |

<Judgment> AA: Excellent, A: Good, C: Poor

TABLE 41

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 399 | 70 | 2 | EA method | 98 | VA method | 0.9 | 7 | A |
| Example 400 | 70 | 2 | EA method | 99 | VA method | 0.6 | 6 | A |
| Example 401 | 70 | 2 | EA method | 99 | VA method | 0.3 | 2 | AA |
| Example 402 | 70 | 2 | EA method | 98 | VA method | 0.1 | 1 | AA |
| Example 403 | 70 | 2 | EA method | 99 | VA method | 0.3 | 2 | AA |
| Example 404 | 80 | 100 | EB method | 99 | VB method | 0.0 | 1 | AA |
| Example 405 | 90 | 24 | EB method | 99 | VB method | 0.01 | 1 | AA |
| Example 406 | 100 | 4 | EB method | 99 | VB method | 0.07 | 1 | AA |
| Example 407 | 120 | 1 | EB method | 99 | VB method | 0.2 | 2 | AA |
| Example 408 | 140 | 0.5 | EB method | 99 | VB method | 0.8 | 7 | A |
| Example 409 | 160 | 0.1 | EB method | 99 | VB method | 2.0 | 10 | A |
| Example 410 | 100 | 4 | EB method | 99 | VB method | 0.07 | 1 | AA |
| Example 411 | 100 | 4 | EB method | 96 | VB method | 0.02 | 1 | AA |
| Example 412 | 100 | 4 | EB method | 94 | VB method | 0.02 | 1 | AA |
| Example 413 | 100 | 4 | EB method | 90 | VB method | 0.03 | 1 | AA |
| Example 414 | 100 | 4 | EB method | 100 | VB method | 0.2 | 2 | AA |
| Example 415 | 100 | 4 | EB method | 98 | VB method | 0.1 | 1 | AA |
| Example 416 | 100 | 4 | EB method | 99 | VB method | 0.05 | 1 | AA |
| Example 417 | 100 | 4 | EB method | 100 | VB method | 0.2 | 2 | AA |
| Example 418 | 100 | 4 | EB method | 99 | VB method | 0.05 | 1 | AA |
| Example 419 | 100 | 4 | EB method | 100 | VB method | 0.1 | 2 | AA |

<Judgment> AA: Excellent, A: Good, C: Poor

TABLE 42

| | Boron trihalide-trivalent phosphorus compound | | Episulfide compound | | Additive compound | |
|---|---|---|---|---|---|---|
| | Name | % by mass | Name | % by mass | Name | % by mass |
| Example 420 | BF3-3PCR-1 | 0.03 | EPI-14 | 99.97 | — | — |
| Example 421 | BF3-3PCR-1 | 0.03 | EPI-14 | 99.97 | — | — |
| Example 422 | BF3-3PCR-1 | 0.03 | EPI-14 | 99.97 | — | — |
| Example 423 | BF3-3PCR-1 | 0.03 | EPI-14 | 99.97 | — | — |
| Example 424 | BF3-3PCR-1 | 0.03 | EPI-14 | 99.97 | — | — |
| Example 425 | BF3-3PCR-1 | 0.03 | EPI-14 | 99.97 | — | — |
| Example 426 | BF3-3PCR-1 | 0.07 | EPI-1 | 99.93 | — | — |
| Example 427 | BF3-3PCR-1 | 0.06 | EPI-2 | 99.94 | — | — |
| Example 428 | BF3-3PCR-1 | 0.05 | EPI-3 | 99.95 | — | — |
| Example 429 | BF3-3PCR-1 | 0.04 | EPI-4 | 99.96 | — | — |
| Example 430 | BF3-3PCR-1 | 0.04 | EPI-5 | 99.96 | — | — |
| Example 431 | BF3-3PCR-1 | 0.03 | EPI-6 | 99.97 | — | — |

TABLE 42-continued

| | Boron trihalide-trivalent phosphorus compound | | Episulfide compound | | Additive compound | |
|---|---|---|---|---|---|---|
| | Name | % by mass | Name | % by mass | Name | % by mass |
| Example 432 | BF3-3PCR-1 | 0.03 | EPI-7 | 99.97 | — | — |
| Example 433 | BF3-3PCR-1 | 0.03 | EPI-8 | 99.97 | — | — |
| Example 434 | BF3-3PCR-1 | 0.02 | EPI-9 | 99.98 | — | — |
| Example 435 | BF3-3PCR-1 | 0.02 | EPI-10 | 99.98 | — | — |
| Example 436 | BF3-3PCR-1 | 0.02 | EPI-11 | 99.98 | — | — |
| Example 437 | BF3-3PCR-1 | 0.02 | EPI-12 | 99.98 | — | — |
| Example 438 | BF3-3PCR-1 | 0.01 | EPI-13 | 99.99 | — | — |
| Example 439 | BF3-3PCR-1 | 0.04 | EPI-20 | 99.96 | — | — |
| Example 440 | BF3-3PCR-1 | 0.04 | EPI-21 | 99.96 | — | — |
| Example 441 | BF3-3PCR-1 | 0.03 | EPI-22 | 99.97 | — | — |

TABLE 43

| | Boron trihalide-trivalent phosphorus compound | | Episulfide compound | | Additive compound | |
|---|---|---|---|---|---|---|
| | Name | % by mass | Name | % by mass | Name | % by mass |
| Example 442 | BF3-3PCR-1 | 0.03 | EPI-23 | 99.97 | — | — |
| Example 443 | BF3-3PCR-1 | 0.05 | EPI-30 | 99.95 | — | — |
| Example 444 | BF3-3PCR-1 | 0.04 | EPI-31 | 99.96 | — | — |
| Example 445 | BF3-3PCR-1 | 0.03 | EPI-32 | 99.97 | — | — |
| Example 446 | BF3-3PCR-1 | 0.03 | EPI-33 | 99.97 | — | — |
| Example 447 | BF3-3PCR-1 | 0.03 | EPI-34 | 99.97 | — | — |
| Example 448 | BF3-3PCR-1 | 1.0 | EPI-16 | 99.0 | — | — |
| Example 449 | BF3-3PCR-1 | 1.0 | EPI-16 | 99.0 | — | — |
| Example 450 | BF3-3PCR-1 | 1.0 | EPI-16 | 99.0 | — | — |
| Example 451 | BF3-3PCR-1 | 1.0 | EPI-16 | 99.0 | — | — |
| Example 452 | BF3-3PCR-1 | 1.0 | EPI-16 | 99.0 | — | — |
| Example 453 | BF3-3PCR-1 | 1.0 | EPI-16 | 99.0 | — | — |

TABLE 43-continued

| | Boron trihalide-trivalent phosphorus compound | | Episulfide compound | | Additive compound | |
|---|---|---|---|---|---|---|
| | Name | % by mass | Name | % by mass | Name | % by mass |
| Example 454 | BF3-3PCR-1 | 0.5 | EPI-15 | 49.7 | DCM | 49.7 |
| Example 455 | BF3-3PCR-1 | 0.2 | EPI-17 | 49.9 | DCM | 49.9 |
| Example 456 | BF3-3PCR-1 | 0.2 | EPI-18 | 49.9 | DCM | 49.9 |
| Example 457 | BF3-3PCR-1 | 0.2 | EPI-19 | 49.9 | DCM | 49.9 |
| Example 458 | BF3-3PCR-1 | 1 | EPI-24 | 99 | — | — |
| Example 459 | BF3-3PCR-1 | 2 | EPI-25 | 98 | — | — |
| Example 460 | BF3-3PCR-1 | 1 | EPI-26 | 99 | — | — |
| Example 461 | BF3-3PCR-1 | 1 | EPI-27 | 99 | — | — |
| Example 462 | BF3-3PCR-1 | 1 | EPI-28 | 99 | — | — |
| Example 463 | BF3-3PCR-1 | 1 | EPI-29 | 99 | — | — |

TABLE 44

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 420 | 50 | 24 | EA method | 99 | VA method | 0.00 | 1 | AA |
| Example 421 | 60 | 8 | EA method | 100 | VA method | 0.01 | 1 | AA |
| Example 422 | 70 | 2 | EA method | 100 | VA method | 0.1 | 1 | AA |
| Example 423 | 100 | 0.5 | EA method | 100 | VA method | 0.1 | 1 | AA |
| Example 424 | 120 | 0.2 | EA method | 100 | VA method | 0.3 | 2 | AA |
| Example 425 | 140 | 0.1 | EA method | 100 | VA method | 0.9 | 7 | A |
| Example 426 | 70 | 2 | EA method | 92 | VA method | 1 | 8 | A |
| Example 427 | 70 | 2 | EA method | 94 | VA method | 0.8 | 7 | A |
| Example 428 | 70 | 2 | EA method | 95 | VA method | 0.9 | 7 | A |
| Example 429 | 70 | 2 | EA method | 96 | VA method | 0.6 | 6 | A |
| Example 430 | 70 | 2 | EA method | 97 | VA method | 0.3 | 2 | AA |
| Example 431 | 70 | 2 | EA method | 98 | VA method | 0.1 | 1 | AA |
| Example 432 | 70 | 2 | EA method | 99 | VA method | 0.08 | 1 | AA |
| Example 433 | 70 | 2 | EA method | 100 | VA method | 0.1 | 1 | AA |
| Example 434 | 70 | 2 | EA method | 100 | VA method | 0.06 | 1 | AA |
| Example 435 | 70 | 2 | EA method | 99 | VA method | 0.05 | 1 | AA |
| Example 436 | 70 | 2 | EA method | 99 | VA method | 0.06 | 1 | AA |
| Example 437 | 70 | 2 | EA method | 100 | VA method | 0.04 | 1 | AA |
| Example 438 | 70 | 2 | EA method | 99 | VA method | 0.05 | 1 | AA |
| Example 439 | 70 | 2 | EA method | 99 | VA method | 1 | 8 | A |
| Example 440 | 70 | 2 | EA method | 100 | VA method | 0.4 | 5 | AA |
| Example 441 | 70 | 2 | EA method | 99 | VA method | 0.8 | 7 | A |

<Judgment> AA: Excellent, A: Good, C: Poor

TABLE 45

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 442 | 70 | 2 | EA method | 99 | VA method | 0.9 | 7 | A |
| Example 443 | 70 | 2 | EA method | 98 | VA method | 0.8 | 7 | A |
| Example 444 | 70 | 2 | EA method | 99 | VA method | 0.3 | 2 | AA |
| Example 445 | 70 | 2 | EA method | 99 | VA method | 0.09 | 1 | AA |
| Example 446 | 70 | 2 | EA method | 98 | VA method | 0.1 | 1 | AA |
| Example 447 | 70 | 2 | EA method | 99 | VA method | 0.2 | 2 | AA |
| Example 448 | 80 | 100 | EB method | 99 | VB method | 0.0 | 1 | AA |
| Example 449 | 90 | 24 | EB method | 100 | VB method | 0.01 | 1 | AA |
| Example 450 | 100 | 4 | EB method | 100 | VB method | 0.05 | 1 | AA |
| Example 451 | 120 | 1 | EB method | 100 | VB method | 0.1 | 1 | AA |
| Example 452 | 140 | 0.5 | EB method | 100 | VB method | 0.2 | 5 | AA |
| Example 453 | 160 | 0.1 | EB method | 100 | VB method | 1 | 8 | A |
| Example 454 | 100 | 4 | EB method | 100 | VB method | 0.04 | 1 | AA |
| Example 455 | 100 | 4 | EB method | 100 | VB method | 0.02 | 1 | AA |
| Example 456 | 100 | 4 | EB method | 93 | VB method | 0.02 | 1 | AA |

TABLE 45-continued

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 457 | 100 | 4 | EB method | 90 | VB method | 0.01 | 1 | AA |
| Example 458 | 100 | 4 | EB method | 100 | VB method | 0.1 | 1 | AA |
| Example 459 | 100 | 4 | EB method | 98 | VB method | 0.09 | 1 | AA |
| Example 460 | 100 | 4 | EB method | 99 | VB method | 0.05 | 1 | AA |
| Example 461 | 100 | 4 | EB method | 100 | VB method | 0.1 | 1 | AA |
| Example 462 | 100 | 4 | EB method | 99 | VB method | 0.04 | 1 | AA |
| Example 463 | 100 | 4 | EB method | 100 | VB method | 0.1 | 1 | AA |

<Judgment> AA: Excellent, A: Good, C: Poor

TABLE 46

| | Boron trihalide-ketone compound | | Episulfide compound | | Additive compound | |
|---|---|---|---|---|---|---|
| | Name | % by mass | Name | % by mass | Name | % by mass |
| Example 464 | BF3-MKCJ-1 | 0.01 | EPI-14 | 99.99 | — | — |
| Example 465 | BF3-MKCJ-1 | 0.01 | EPI-14 | 99.99 | — | — |
| Example 466 | BF3-MKCJ-1 | 0.01 | EPI-14 | 99.99 | — | — |
| Example 467 | BF3-MKCJ-1 | 0.01 | EPI-14 | 99.99 | — | — |
| Example 468 | BF3-MKCJ-1 | 0.01 | EPI-14 | 99.99 | — | — |
| Example 469 | BF3-MKCJ-1 | 0.01 | EPI-14 | 99.99 | — | — |
| Example 470 | BF3-MKCJ-1 | 0.03 | EPI-1 | 99.97 | — | — |
| Example 471 | BF3-MKCJ-1 | 0.02 | EPI-2 | 99.98 | — | — |
| Example 472 | BF3-MKCJ-1 | 0.02 | EPI-3 | 99.98 | — | — |
| Example 473 | BF3-MKCJ-1 | 0.02 | EPI-4 | 99.98 | — | — |
| Example 474 | BF3-MKCJ-1 | 0.01 | EPI-5 | 99.99 | — | — |
| Example 475 | BF3-MKCJ-1 | 0.01 | EPI-6 | 99.99 | — | — |
| Example 476 | BF3-MKCJ-1 | 0.01 | EPI-7 | 99.99 | — | — |
| Example 477 | BF3-MKCJ-1 | 0.01 | EPI-8 | 99.99 | — | — |
| Example 478 | BF3-MKCJ-1 | 0.01 | EPI-9 | 99.99 | — | — |
| Example 479 | BF3-MKCJ-1 | 0.01 | EPI-10 | 99.99 | — | — |
| Example 480 | BF3-MKCJ-1 | 0.01 | EPI-11 | 99.99 | — | — |
| Example 481 | BF3-MKCJ-1 | 0.01 | EPI-12 | 99.99 | — | — |
| Example 482 | BF3-MKCJ-1 | 0.01 | EPI-13 | 99.99 | — | — |
| Example 483 | BF3-MKCJ-1 | 0.02 | EPI-20 | 99.98 | — | — |
| Example 484 | BF3-MKCJ-1 | 0.01 | EPI-21 | 99.99 | — | — |
| Example 485 | BF3-MKCJ-1 | 0.01 | EPI-22 | 99.99 | — | — |

TABLE 47

| | Boron trihalide-ketone compound | | Episulfide compound | | Additive compound | |
|---|---|---|---|---|---|---|
| | Name | % by mass | Name | % by mass | Name | % by mass |
| Example 486 | BF3-MKCJ-1 | 0.01 | EPI-23 | 99.99 | — | — |
| Example 487 | BF3-MKCJ-1 | 0.02 | EPI-30 | 99.98 | — | — |
| Example 488 | BF3-MKCJ-1 | 0.01 | EPI-31 | 99.99 | — | — |
| Example 489 | BF3-MKCJ-1 | 0.01 | EPI-32 | 99.99 | — | — |
| Example 490 | BF3-MKCJ-1 | 0.01 | EPI-33 | 99.99 | — | — |
| Example 491 | BF3-MKCJ-1 | 0.01 | EPI-34 | 99.99 | — | — |
| Example 492 | BF3-MKCJ-1 | 0.4 | EPI-16 | 99.6 | — | — |
| Example 493 | BF3-MKCJ-1 | 0.4 | EPI-16 | 99.6 | — | — |
| Example 494 | BF3-MKCJ-1 | 0.4 | EPI-16 | 99.6 | — | — |
| Example 495 | BF3-MKCJ-1 | 0.4 | EPI-16 | 99.6 | — | — |
| Example 496 | BF3-MKCJ-1 | 0.4 | EPI-16 | 99.6 | — | — |
| Example 497 | BF3-MKCJ-1 | 0.4 | EPI-16 | 99.6 | — | — |
| Example 498 | BF3-MKCJ-1 | 0.2 | EPI-15 | 49.9 | DCM | 49.9 |
| Example 499 | BF3-MKCJ-1 | 0.08 | EPI-17 | 49.96 | DCM | 49.96 |
| Example 500 | BF3-MKCJ-1 | 0.07 | EPI-18 | 49.96 | DCM | 49.96 |
| Example 501 | BF3-MKCJ-1 | 0.06 | EPI-19 | 49.97 | DCM | 49.97 |
| Example 502 | BF3-MKCJ-1 | 0.6 | EPI-24 | 99.4 | — | — |
| Example 503 | BF3-MKCJ-1 | 0.8 | EPI-25 | 99.2 | — | — |
| Example 504 | BF3-MKCJ-1 | 0.4 | EPI-26 | 99.6 | — | — |
| Example 505 | BF3-MKCJ-1 | 0.4 | EPI-27 | 99.6 | — | — |
| Example 506 | BF3-MKCJ-1 | 0.4 | EPI-28 | 99.6 | — | — |
| Example 507 | BF3-MKCJ-1 | 0.4 | EPI-29 | 99.6 | — | — |

TABLE 48

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 464 | 50 | 24 | EA method | 96 | VA method | 0.00 | 1 | AA |
| Example 465 | 60 | 8 | EA method | 98 | VA method | 0.01 | 1 | AA |
| Example 466 | 70 | 2 | EA method | 98 | VA method | 0.2 | 2 | AA |
| Example 467 | 100 | 0.5 | EA method | 99 | VA method | 0.3 | 5 | AA |
| Example 468 | 120 | 0.2 | EA method | 100 | VA method | 0.9 | 7 | A |
| Example 469 | 140 | 0.1 | EA method | 100 | VA method | 2 | 10 | A |
| Example 470 | 70 | 2 | EA method | 92 | VA method | 2 | 9 | A |
| Example 471 | 70 | 2 | EA method | 94 | VA method | 0.8 | 7 | A |
| Example 472 | 70 | 2 | EA method | 95 | VA method | 0.7 | 7 | A |
| Example 473 | 70 | 2 | EA method | 96 | VA method | 0.6 | 6 | A |
| Example 474 | 70 | 2 | EA method | 97 | VA method | 0.4 | 2 | AA |
| Example 475 | 70 | 2 | EA method | 98 | VA method | 0.3 | 2 | AA |
| Example 476 | 70 | 2 | EA method | 98 | VA method | 0.3 | 2 | AA |
| Example 477 | 70 | 2 | EA method | 99 | VA method | 0.2 | 2 | AA |
| Example 478 | 70 | 2 | EA method | 98 | VA method | 0.2 | 2 | AA |
| Example 479 | 70 | 2 | EA method | 99 | VA method | 0.2 | 5 | AA |
| Example 480 | 70 | 2 | EA method | 99 | VA method | 0.6 | 6 | A |
| Example 481 | 70 | 2 | EA method | 98 | VA method | 0.6 | 6 | A |
| Example 482 | 70 | 2 | EA method | 99 | VA method | 0.6 | 6 | A |

TABLE 48-continued

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 483 | 70 | 2 | EA method | 99 | VA method | 2 | 9 | A |
| Example 484 | 70 | 2 | EA method | 99 | VA method | 0.6 | 6 | A |
| Example 485 | 70 | 2 | EA method | 99 | VA method | 0.6 | 7 | A |

<Judgment> AA: Excellent, A: Good, C: Poor

TABLE 49

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Example 486 | 70 | 2 | EA method | 99 | VA method | 0.8 | 7 | A |
| Example 487 | 70 | 2 | EA method | 98 | VA method | 0.9 | 7 | A |
| Example 488 | 70 | 2 | EA method | 99 | VA method | 0.4 | 2 | AA |
| Example 489 | 70 | 2 | EA method | 99 | VA method | 0.3 | 2 | AA |
| Example 490 | 70 | 2 | EA method | 98 | VA method | 0.3 | 2 | AA |
| Example 491 | 70 | 2 | EA method | 99 | VA method | 0.3 | 5 | AA |
| Example 492 | 80 | 100 | EB method | 99 | VB method | 0.0 | 1 | AA |
| Example 493 | 90 | 24 | EB method | 100 | VB method | 0.01 | 1 | AA |
| Example 494 | 100 | 4 | EB method | 100 | VB method | 0.08 | 1 | AA |
| Example 495 | 120 | 1 | EB method | 100 | VB method | 0.2 | 2 | AA |
| Example 496 | 140 | 0.5 | EB method | 100 | VB method | 1 | 8 | A |
| Example 497 | 160 | 0.1 | EB method | 100 | VB method | 2.0 | 10 | A |
| Example 498 | 100 | 4 | EB method | 100 | VB method | 0.08 | 1 | AA |
| Example 499 | 100 | 4 | EB method | 100 | VB method | 0.02 | 1 | AA |
| Example 500 | 100 | 4 | EB method | 94 | VB method | 0.02 | 1 | AA |
| Example 501 | 100 | 4 | EB method | 91 | VB method | 0.02 | 1 | AA |
| Example 502 | 100 | 4 | EB method | 100 | VB method | 0.2 | 2 | AA |
| Example 503 | 100 | 4 | EB method | 98 | VB method | 0.1 | 1 | AA |
| Example 504 | 100 | 4 | EB method | 99 | VB method | 0.06 | 1 | AA |
| Example 505 | 100 | 4 | EB method | 100 | VB method | 0.1 | 2 | AA |
| Example 506 | 100 | 4 | EB method | 99 | VB method | 0.06 | 1 | AA |
| Example 507 | 100 | 4 | EB method | 100 | VB method | 0.2 | 2 | AA |

<Judgment> AA: Excellent, A: Good, C: Poor

TABLE 50

| | Thermal polymerization promoter | | Episulfide compound | | Additive compound | |
|---|---|---|---|---|---|---|
| | Name | % by mass | Name | % by mass | Name | % by mass |
| Comparative Example 57 | BF3DEE | 0.02 | EPI-1 | 99.98 | — | — |
| Comparative Example 58 | BF3DEE | 0.02 | EPI-2 | 99.98 | — | — |
| Comparative Example 59 | BF3DEE | 0.02 | EPI-3 | 99.98 | — | — |
| Comparative Example 60 | BF3DEE | 0.01 | EPI-4 | 99.99 | — | — |
| Comparative Example 61 | BF3DEE | 0.01 | EPI-5 | 99.99 | — | — |
| Comparative Example 62 | BF3DEE | 0.01 | EPI-6 | 99.99 | — | — |
| Comparative Example 63 | BF3DEE | 0.01 | EPI-7 | 99.99 | — | — |
| Comparative Example 64 | BF3DEE | 0.01 | EPI-8 | 99.99 | — | — |
| Comparative Example 65 | BF3DEE | 0.01 | EPI-9 | 99.99 | — | — |
| Comparative Example 66 | BF3DEE | 0.01 | EPI-10 | 99.99 | — | — |
| Comparative Example 67 | BF3DEE | 0.01 | EPI-11 | 99.99 | — | — |

TABLE 50-continued

| | Thermal polymerization promoter | | Episulfide compound | | Additive compound | |
|---|---|---|---|---|---|---|
| | Name | % by mass | Name | % by mass | Name | % by mass |
| Comparative Example 68 | BF3DEE | 0.005 | EPI-12 | 99.995 | — | — |
| Comparative Example 69 | BF3DEE | 0.005 | EPI-13 | 99.995 | — | — |
| Comparative Example 70 | BF3DEE | 0.01 | EPI-14 | 99.99 | — | — |
| Comparative Example 71 | BF3DEE | 0.01 | EPI-20 | 99.99 | — | — |
| Comparative Example 72 | BF3DEE | 0.01 | EPI-21 | 99.99 | — | — |
| Comparative Example 73 | BF3DEE | 0.01 | EPI-22 | 99.99 | — | — |
| Comparative Example 74 | BF3DEE | 0.01 | EPI-23 | 99.99 | — | — |
| Comparative Example 75 | BF3DEE | 0.02 | EPI-30 | 99.98 | — | — |
| Comparative Example 76 | BF3DEE | 0.01 | EPI-31 | 99.99 | — | — |
| Comparative Example 77 | BF3DEE | 0.01 | EPI-32 | 99.99 | — | — |
| Comparative Example 78 | BF3DEE | 0.01 | EPI-33 | 99.99 | — | — |

TABLE 50-continued

| | Thermal polymerization promoter | | Episulfide compound | | Additive compound | |
|---|---|---|---|---|---|---|
| | Name | % by mass | Name | % by mass | Name | % by mass |
| Comparative Example 79 | BF3DEE | 0.01 | EPI-34 | 99.99 | — | — |
| Comparative Example 80 | BF3DEE | 0.3 | EPI-15 | 49.8 | DCM | 49.8 |
| Comparative Example 81 | BF3DEE | 0.6 | EPI-16 | 99.4 | — | — |
| Comparative Example 82 | BF3DEE | 0.1 | EPI-17 | 49.9 | DCM | 49.9 |
| Comparative Example 83 | BF3DEE | 0.1 | EPI-18 | 49.9 | DCM | 49.9 |
| Comparative Example 84 | BF3DEE | 0.1 | EPI-19 | 49.9 | DCM | 49.9 |
| Comparative Example 85 | BF3DEE | 1 | EPI-24 | 99 | — | — |
| Comparative Example 86 | BF3DEE | 1 | EPI-25 | 99 | — | — |
| Comparative Example 87 | BF3DEE | 0.7 | EPI-26 | 99.3 | — | — |
| Comparative Example 88 | BF3DEE | 0.7 | EPI-27 | 99.3 | — | — |
| Comparative Example 89 | BF3DEE | 0.7 | EPI-28 | 99.3 | — | — |
| Comparative Example 90 | BF3DEE | 0.7 | EPI-29 | 99.3 | — | — |

TABLE 51

| | Polymerization condition | | Rate of episulfide group reaction | | Content of vinyl bond | | Thermal discoloration resistance evaluation | |
|---|---|---|---|---|---|---|---|---|
| | (° C.) | (hr) | Measurement method | (%) | Measurement method | (%) | YI | Judgment |
| Comparative Example 57 | — | — | EA method | 100 | VA method | 6 | 30 | C |
| Comparative Example 58 | — | — | EA method | 100 | VA method | 5 | 27 | C |
| Comparative Example 59 | — | — | EA method | 100 | VA method | 5 | 24 | C |
| Comparative Example 60 | — | — | EA method | 100 | VA method | 4 | 20 | C |
| Comparative Example 61 | — | — | EA method | 100 | VA method | 3 | 16 | C |
| Comparative Example 62 | — | — | EA method | 100 | VA method | 3 | 18 | C |
| Comparative Example 63 | — | — | EA method | 100 | VA method | 3 | 14 | C |
| Comparative Example 64 | — | — | EA method | 100 | VA method | 3 | 16 | C |
| Comparative Example 65 | — | — | EA method | 100 | VA method | 3 | 18 | C |
| Comparative Example 66 | — | — | EA method | 100 | VA method | 3 | 16 | C |
| Comparative Example 67 | — | — | EA method | 100 | VA method | 3 | 15 | C |
| Comparative Example 68 | — | — | EA method | 100 | VA method | 4 | 19 | C |
| Comparative Example 69 | — | — | EA method | 100 | VA method | 3 | 18 | C |
| Comparative Example 70 | — | — | EA method | 100 | VA method | 3 | 15 | C |
| Comparative Example 71 | — | — | EA method | 100 | VA method | 7 | 40 | C |
| Comparative Example 72 | — | — | EA method | 100 | VA method | 7 | 37 | C |
| Comparative Example 73 | — | — | EA method | 100 | VA method | 6 | 34 | C |
| Comparative Example 74 | — | — | EA method | 100 | VA method | 7 | 45 | C |
| Comparative Example 75 | — | — | EA method | 100 | VA method | 4 | 20 | C |
| Comparative Example 76 | — | — | EA method | 100 | VA method | 3 | 16 | C |
| Comparative Example 77 | — | — | EA method | 100 | VA method | 3 | 16 | C |
| Comparative Example 78 | — | — | EA method | 100 | VA method | 4 | 20 | C |
| Comparative Example 79 | — | — | EA method | 100 | VA method | 3 | 18 | C |

<Judgment> AA: Excellent, A: Good, C: Poor

As shown in Tables 38 to 51, it was confirmed that: the polymer of the episulfide compound whose vinyl group content was 2% by mass or less according to the present embodiment was less discolored even when preserved for a long period under high temperature; and stability under high temperature was high.

Example 508

Preparation of Boron Trihalide-Ether Compound (BF3-MECC-1)

(1) Preparation: A water bath equipped with an immersion cooling and heating unit was placed on a magnetic stirrer, and water and a stirring bar were put therein. The immersion cooling and heating unit was activated, and the temperature of water was set to 20° C.

(2) A reaction container filled with nitrogen gas was placed in the water bath of (1), and 24% by mass of 1,4-dioxane and 76% by mass of a boron trifluoride-diethyl ether complex were added to the reaction container and stirred for 1 hour.

(3) A vacuum distillation apparatus was attached to the reaction container, and the pressure was gradually reduced, finally reduced to 2 kPa, and maintained for 4 hours.

(4) Analysis by $^{11}$B-NMR was conducted using the one obtained in (3) above to thereby confirm that a complex was formed.

<Preparation and Polymerization of Composition>

(5) Preparation was performed by procedures similar to (1) above.

(6) A reaction container filled with nitrogen gas was placed in the water bath of (5), and each starting material was added to the reaction container according to the compositional ratio of Table 52 and stirred to thereby prepare a composition.

(7) The composition prepared in (6) above was polymerized according to the polymerization conditions of Table 54 to thereby obtain a polymer.

(8) The rate of episulfide group reaction of the polymer obtained in (7) above was measured by the method of Table 54 to confirm that an episulfide group in the starting episulfide compound was polymerized.

(9) ICP measurement was performed using the polymer obtained in (7) above to determine the content of a boron atom in the polymer.

<Thermal Stability Evaluation of Polymer (Hereinafter, Referred to as a "TA Method"): The Case where the Starting Episulfide Compound of the Polymer has One Episulfide Group>

(10) The polymer obtained in (7) above was put in a vacuum dryer (manufactured by Tokyo RikaKikai Co., Ltd., VOS-451D; Small Oil Rotary Vacuum Pump GCD-201X manufactured by ULVAC KIKO, Inc. was used as a vacuum pump) and dried at 50° C. at 13 Pa for 24 hours.

(11) The polymer obtained in (10) above was transferred to a dried container made of glass, and the weight of the polymer was measured (hereinafter, referred to as "JGWS").

(12) The polymer was put in an incubator (manufactured by Espec Corp., IPHH-202), which was then filled with nitrogen gas, then the internal temperature was set to 150° C., and the polymer was preserved for 1000 hours.

(13) The weight of the polymer obtained in (12) above was measured (hereinafter, referred to as "JGWF").

(14) A change in the weight of the polymer (hereinafter, referred to as "JGW") was calculated according to the following formula:

$$JGW\ (\%)=100-JGWF/JGWS\times 100$$

(15) The thermal stability was judged as being good ("A") in the case where JGW was 5% or less, judged as being excellent ("AA") in the case of 2% or less, and judged as being poor ("C") in the case other than these. In the present Example, the thermal stability was judged as being good because JGW was 5%.

<Thermal Stability Evaluation of Polymer (Hereinafter, Referred to as a "TB Method"): The Case where the Starting Episulfide Compound of the Polymer has Two or More Episulfide Groups>

The TB method was performed similarly to the TA method except that the internal temperature of the incubator was set to 200° C.

Examples 509 to 557

Polymers were obtained by a method similar to Example 508 except that the compositional ratios of Tables 52 and 53 and the polymerization conditions of Tables 54 and 55 were used. The evaluation results of the polymers obtained in Examples 509 to 557 are shown in Tables 54 and 55.

In Examples 517 to 523 and 530 to 538, the polymers were prepared in sealed pressure-resistant bottles.

Example 558

In the preparation of the boron trihalide-trivalent phosphorus compound (BF3-3PCR-1), a method similar to Example 508 was performed except that 72% by mass of tri-n-octylphosphine and 28% by mass of a boron trifluoride-diethyl ether complex were used and the compositional ratio of Table 56 and the polymerization conditions of Table 58 were used.

Examples 559 to 607

Polymers were obtained by a method similar to Example 558 except that the compositional ratios of Tables 56 and 57 and the polymerization conditions of Tables 58 and 59 were used. The evaluation results of the polymers obtained in Examples 559 to 607 are shown in Tables 58 and 59.

In Examples 567 to 573 and 580 to 588, the polymers were prepared in sealed pressure-resistant bottles.

Example 608

In the preparation of the boron trihalide-ketone compound (BF3-MKCJ-1), a method similar to Example 508 was performed except that 41% by mass of cyclohexanone and 59% by mass of a boron trifluoride-diethyl ether complex were used and the compositional ratio of Table 60 and the polymerization conditions of Table 62 were used.

Examples 609 to 657

Polymers were obtained by a method similar to Example 608 except that the compositional ratios of Tables 60 and 61 and the polymerization conditions of Tables 62 and 63 were used. The evaluation results of the polymers obtained in Examples 609 to 657 are shown in Tables 62 and 63.

In Examples 617 to 623 and 630 to 638, the polymers were prepared in sealed pressure-resistant bottles.

Comparative Examples 91 to 127

The polymerizable compositions of Comparative Examples 91 to 127 were prepared by a method similar to Example 508 above according to the composition of Table 64, and polymers were obtained according to the polymerization conditions of Table 65.

The evaluation results of the polymers obtained in Comparative Examples 91 to 127 are shown in Table 65.

In Comparative Examples 91 to 97 and 105 to 113, the polymers were prepared in sealed pressure-resistant bottles.

TABLE 52

| | Boron trihalide-ether compound | | Episulfide compound | | Additive compound | |
|---|---|---|---|---|---|---|
| | Name | % by mass | Name | % by mass | Name | % by mass |
| Example 508 | BF3-MECC-1 | 6.3 | EPI-14 | 93.7 | — | — |
| Example 509 | BF3-MECC-1 | 3.3 | EPI-14 | 96.7 | — | — |
| Example 510 | BF3-MECC-1 | 1.3 | EPI-14 | 98.7 | — | — |
| Example 511 | BF3-MECC-1 | 0.7 | EPI-14 | 99.3 | — | — |
| Example 512 | BF3-MECC-1 | 0.3 | EPI-14 | 99.7 | — | — |
| Example 513 | BF3-MECC-1 | 0.07 | EPI-14 | 99.93 | — | — |
| Example 514 | BF3-MECC-1 | 0.01 | EPI-14 | 99.99 | — | — |
| Example 515 | BF3-MECC-1 | 0.003 | EPI-14 | 99.997 | — | — |
| Example 516 | BF3-MECC-1 | 0.001 | EPI-14 | 99.999 | — | — |
| Example 517 | BF3-MECC-1 | 0.02 | EPI-1 | 99.98 | — | — |
| Example 518 | BF3-MECC-1 | 0.02 | EPI-2 | 99.98 | — | — |
| Example 519 | BF3-MECC-1 | 0.01 | EPI-3 | 99.99 | — | — |
| Example 520 | BF3-MECC-1 | 0.01 | EPI-4 | 99.99 | — | — |
| Example 521 | BF3-MECC-1 | 0.01 | EPI-5 | 99.99 | — | — |
| Example 522 | BF3-MECC-1 | 0.01 | EPI-6 | 99.99 | — | — |
| Example 523 | BF3-MECC-1 | 0.01 | EPI-7 | 99.99 | — | — |
| Example 524 | BF3-MECC-1 | 0.01 | EPI-8 | 99.99 | — | — |
| Example 525 | BF3-MECC-1 | 0.01 | EPI-9 | 99.99 | — | — |
| Example 526 | BF3-MECC-1 | 0.005 | EPI-10 | 99.995 | — | — |
| Example 527 | BF3-MECC-1 | 0.005 | EPI-11 | 99.995 | — | — |
| Example 528 | BF3-MECC-1 | 0.005 | EPI-12 | 99.995 | — | — |
| Example 529 | BF3-MECC-1 | 0.005 | EPI-13 | 99.995 | — | — |
| Example 530 | BF3-MECC-1 | 0.01 | EPI-20 | 99.99 | — | — |
| Example 531 | BF3-MECC-1 | 0.01 | EPI-21 | 99.99 | — | — |
| Example 532 | BF3-MECC-1 | 0.01 | EPI-22 | 99.99 | — | — |

TABLE 53

| | Boron trihalide-ether compound | | Episulfide compound | | Additive compound | |
|---|---|---|---|---|---|---|
| | Name | % by mass | Name | % by mass | Name | % by mass |
| Example 533 | BF3-MECC-1 | 0.01 | EPI-23 | 99.99 | — | — |
| Example 534 | BF3-MECC-1 | 0.01 | EPI-30 | 99.99 | — | — |
| Example 535 | BF3-MECC-1 | 0.01 | EPI-31 | 99.99 | — | — |
| Example 536 | BF3-MECC-1 | 0.01 | EPI-32 | 99.99 | — | — |
| Example 537 | BF3-MECC-1 | 0.01 | EPI-33 | 99.99 | — | — |
| Example 538 | BF3-MECC-1 | 0.01 | EPI-34 | 99.99 | — | — |
| Example 539 | BF3-MECC-1 | 5 | EPI-16 | 95 | — | — |
| Example 540 | BF3-MECC-1 | 2 | EPI-16 | 98 | — | — |
| Example 541 | BF3-MECC-1 | 1 | EPI-16 | 99 | — | — |
| Example 542 | BF3-MECC-1 | 0.5 | EPI-16 | 99.5 | — | — |
| Example 543 | BF3-MECC-1 | 0.3 | EPI-16 | 99.7 | — | — |
| Example 544 | BF3-MECC-1 | 0.1 | EPI-16 | 99.9 | — | — |
| Example 545 | BF3-MECC-1 | 0.01 | EPI-16 | 99.99 | — | — |

TABLE 53-continued

| | Boron trihalide-ether compound | | Episulfide compound | | Additive compound | |
|---|---|---|---|---|---|---|
| | Name | % by mass | Name | % by mass | Name | % by mass |
| Example 546 | BF3-MECC-1 | 0.003 | EPI-16 | 99.997 | — | — |
| Example 547 | BF3-MECC-1 | 0.001 | EPI-16 | 99.999 | — | — |
| Example 548 | BF3-MECC-1 | 0.1 | EPI-15 | 49.9 | DCM | 49.9 |
| Example 549 | BF3-MECC-1 | 0.06 | EPI-17 | 49.97 | DCM | 49.97 |
| Example 550 | BF3-MECC-1 | 0.05 | EPI-18 | 49.98 | DCM | 49.98 |
| Example 551 | BF3-MECC-1 | 0.04 | EPI-19 | 49.98 | DCM | 49.98 |
| Example 552 | BF3-MECC-1 | 0.4 | EPI-24 | 99.6 | — | — |
| Example 553 | BF3-MECC-1 | 0.5 | EPI-25 | 99.5 | — | — |
| Example 554 | BF3-MECC-1 | 0.3 | EPI-26 | 99.7 | — | — |
| Example 555 | BF3-MECC-1 | 0.3 | EPI-27 | 99.7 | — | — |
| Example 556 | BF3-MECC-1 | 0.3 | EPI-28 | 99.7 | — | — |
| Example 557 | BF3-MECC-1 | 0.3 | EPI-29 | 99.7 | — | — |

TABLE 54

| | Polymerization condition | | Rate of episulfide group reaction | | Boron content | Thermal stability evaluation | | |
|---|---|---|---|---|---|---|---|---|
| | (° C.) | (hr) | Measurement method | (%) | ppm | Evaluation method | JGW | Judgment |
| Example 508 | 70 | 2 | EA method | 100 | 6100 | TA method | 5 | A |
| Example 509 | 70 | 2 | EA method | 100 | 3100 | TA method | 3 | A |
| Example 510 | 70 | 2 | EA method | 100 | 1300 | TA method | 1 | AA |
| Example 511 | 70 | 2 | EA method | 100 | 650 | TA method | 1 | AA |
| Example 512 | 70 | 2 | EA method | 99 | 320 | TA method | 1 | AA |
| Example 513 | 70 | 2 | EA method | 98 | 65 | TA method | 1 | AA |
| Example 514 | 70 | 2 | EA method | 98 | 7 | TA method | 2 | AA |
| Example 515 | 70 | 2 | EA method | 94 | 3 | TA method | 3 | A |
| Example 516 | 70 | 2 | EA method | 91 | 1 | TA method | 5 | A |
| Example 517 | 70 | 2 | EA method | 92 | 18 | TA method | 1 | AA |
| Example 518 | 70 | 2 | EA method | 94 | 15 | TA method | 1 | AA |
| Example 519 | 70 | 2 | EA method | 95 | 12 | TA method | 1 | AA |
| Example 520 | 70 | 2 | EA method | 96 | 11 | TA method | 1 | AA |
| Example 521 | 70 | 2 | EA method | 97 | 9 | TA method | 2 | AA |
| Example 522 | 70 | 2 | EA method | 98 | 8 | TA method | 2 | AA |
| Example 523 | 70 | 2 | EA method | 99 | 7 | TA method | 2 | AA |
| Example 524 | 70 | 2 | EA method | 98 | 6 | TA method | 2 | AA |
| Example 525 | 70 | 2 | EA method | 98 | 5 | TA method | 2 | AA |
| Example 526 | 70 | 2 | EA method | 99 | 5 | TA method | 2 | AA |
| Example 527 | 70 | 2 | EA method | 99 | 5 | TA method | 2 | AA |
| Example 528 | 70 | 2 | EA method | 100 | 5 | TA method | 2 | AA |
| Example 529 | 70 | 2 | EA method | 100 | 5 | TA method | 2 | AA |
| Example 530 | 70 | 2 | EA method | 100 | 11 | TA method | 1 | AA |
| Example 531 | 70 | 2 | EA method | 100 | 9 | TA method | 2 | AA |
| Example 532 | 70 | 2 | EA method | 100 | 8 | TA method | 2 | AA |

<Judgment> AA: Excellent, A: Good, C: Poor

TABLE 55

| | Polymerization condition | | Rate of episulfide group reaction | | Boron content | Thermal stability evaluation | | |
|---|---|---|---|---|---|---|---|---|
| | (° C.) | (hr) | Measurement method | (%) | ppm | Evaluation method | JGW | Judgment |
| Example 533 | 70 | 2 | EA method | 100 | 8 | TA method | 2 | AA |
| Example 534 | 70 | 2 | EA method | 98 | 13 | TA method | 1 | AA |
| Example 535 | 70 | 2 | EA method | 99 | 9 | TA method | 2 | AA |
| Example 536 | 70 | 2 | EA method | 99 | 8 | TA method | 2 | AA |
| Example 537 | 70 | 2 | EA method | 98 | 8 | TA method | 2 | AA |
| Example 538 | 70 | 2 | EA method | 99 | 7 | TA method | 2 | AA |
| Example 539 | 100 | 4 | EB method | 100 | 4700 | TB method | 4 | A |
| Example 540 | 100 | 4 | EB method | 100 | 2400 | TB method | 3 | A |
| Example 541 | 100 | 4 | EB method | 100 | 970 | TB method | 2 | AA |
| Example 542 | 100 | 4 | EB method | 100 | 490 | TB method | 1 | AA |
| Example 543 | 100 | 4 | EB method | 99 | 240 | TB method | 1 | AA |

TABLE 55-continued

| | Polymerization condition (° C.) | (hr) | Rate of episulfide group reaction Measurement method | (%) | Boron content ppm | Thermal stability evaluation Evaluation method | JGW | Judgment |
|---|---|---|---|---|---|---|---|---|
| Example 544 | 100 | 4 | EB method | 98 | 49 | TB method | 1 | AA |
| Example 545 | 100 | 4 | EB method | 98 | 5 | TB method | 2 | AA |
| Example 546 | 100 | 4 | EB method | 93 | 2 | TB method | 4 | A |
| Example 547 | 100 | 4 | EB method | 91 | 1 | TB method | 5 | A |
| Example 548 | 100 | 4 | EB method | 99 | 260 | TB method | 1 | AA |
| Example 549 | 100 | 4 | EB method | 96 | 110 | TB method | 1 | AA |
| Example 550 | 100 | 4 | EB method | 94 | 93 | TB method | 1 | AA |
| Example 551 | 100 | 4 | EB method | 90 | 80 | TB method | 1 | AA |
| Example 552 | 100 | 4 | EB method | 100 | 370 | TB method | 1 | AA |
| Example 553 | 100 | 4 | EB method | 98 | 500 | TB method | 1 | AA |
| Example 554 | 100 | 4 | EB method | 99 | 270 | TB method | 1 | AA |
| Example 555 | 100 | 4 | EB method | 100 | 260 | TB method | 1 | AA |
| Example 556 | 100 | 4 | EB method | 99 | 280 | TB method | 1 | AA |
| Example 557 | 100 | 4 | EB method | 100 | 270 | TB method | 1 | AA |

<Judgment> AA: Excellent, A: Good, C: Poor

TABLE 56

| | Boron trihalide-trivalent phosphorus compound Name | % by mass | Episulfide compound Name | % by mass | Additive compound Name | % by mass |
|---|---|---|---|---|---|---|
| Example 558 | BF3-3PCR-1 | 21 | EPI-14 | 79 | — | — |
| Example 559 | BF3-3PCR-1 | 12 | EPI-14 | 88 | — | — |
| Example 560 | BF3-3PCR-1 | 5 | EPI-14 | 95 | — | — |
| Example 561 | BF3-3PCR-1 | 3 | EPI-14 | 97 | — | — |
| Example 562 | BF3-3PCR-1 | 1 | EPI-14 | 99 | — | — |
| Example 563 | BF3-3PCR-1 | 0.3 | EPI-14 | 99.7 | — | — |
| Example 564 | BF3-3PCR-1 | 0.03 | EPI-14 | 99.97 | — | — |
| Example 565 | BF3-3PCR-1 | 0.01 | EPI-14 | 99.99 | — | — |
| Example 566 | BF3-3PCR-1 | 0.003 | EPI-14 | 99.997 | — | — |
| Example 567 | BF3-3PCR-1 | 0.07 | EPI-1 | 99.93 | — | — |
| Example 568 | BF3-3PCR-1 | 0.06 | EPI-2 | 99.94 | — | — |
| Example 569 | BF3-3PCR-1 | 0.05 | EPI-3 | 99.95 | — | — |
| Example 570 | BF3-3PCR-1 | 0.04 | EPI-4 | 99.96 | — | — |
| Example 571 | BF3-3PCR-1 | 0.04 | EPI-5 | 99.96 | — | — |
| Example 572 | BF3-3PCR-1 | 0.03 | EPI-6 | 99.97 | — | — |
| Example 573 | BF3-3PCR-1 | 0.03 | EPI-7 | 99.97 | — | — |
| Example 574 | BF3-3PCR-1 | 0.03 | EPI-8 | 99.97 | — | — |
| Example 575 | BF3-3PCR-1 | 0.02 | EPI-9 | 99.98 | — | — |
| Example 576 | BF3-3PCR-1 | 0.02 | EPI-10 | 99.98 | — | — |
| Example 577 | BF3-3PCR-1 | 0.02 | EPI-11 | 99.98 | — | — |
| Example 578 | BF3-3PCR-1 | 0.02 | EPI-12 | 99.98 | — | — |
| Example 579 | BF3-3PCR-1 | 0.01 | EPI-13 | 99.99 | — | — |
| Example 580 | BF3-3PCR-1 | 0.04 | EPI-20 | 99.96 | — | — |
| Example 581 | BF3-3PCR-1 | 0.04 | EPI-21 | 99.96 | — | — |
| Example 582 | BF3-3PCR-1 | 0.03 | EPI-22 | 99.97 | — | — |

TABLE 57

| | Boron trihalide-trivalent phosphorus compound Name | % by mass | Episulfide compound Name | % by mass | Additive compound Name | % by mass |
|---|---|---|---|---|---|---|
| Example 583 | BF3-3PCR-1 | 0.03 | EPI-23 | 99.97 | — | — |
| Example 584 | BF3-3PCR-1 | 0.05 | EPI-30 | 99.95 | — | — |
| Example 585 | BF3-3PCR-1 | 0.04 | EPI-31 | 99.96 | — | — |
| Example 586 | BF3-3PCR-1 | 0.03 | EPI-32 | 99.97 | — | — |
| Example 587 | BF3-3PCR-1 | 0.03 | EPI-33 | 99.97 | — | — |
| Example 588 | BF3-3PCR-1 | 0.03 | EPI-34 | 99.97 | — | — |
| Example 589 | BF3-3PCR-1 | 17 | EPI-16 | 83 | — | — |
| Example 590 | BF3-3PCR-1 | 9 | EPI-16 | 91 | — | — |
| Example 591 | BF3-3PCR-1 | 4 | EPI-16 | 96 | — | — |
| Example 592 | BF3-3PCR-1 | 2 | EPI-16 | 98 | — | — |
| Example 593 | BF3-3PCR-1 | 1 | EPI-16 | 99 | — | — |
| Example 594 | BF3-3PCR-1 | 0.2 | EPI-16 | 99.8 | — | — |
| Example 595 | BF3-3PCR-1 | 0.02 | EPI-16 | 99.98 | — | — |
| Example 596 | BF3-3PCR-1 | 0.01 | EPI-16 | 99.99 | — | — |
| Example 597 | BF3-3PCR-1 | 0.002 | EPI-16 | 99.998 | — | — |
| Example 598 | BF3-3PCR-1 | 0.5 | EPI-15 | 49.7 | DCM | 49.7 |
| Example 599 | BF3-3PCR-1 | 0.2 | EPI-17 | 49.9 | DCM | 49.9 |
| Example 600 | BF3-3PCR-1 | 0.2 | EPI-18 | 49.9 | DCM | 49.9 |
| Example 601 | BF3-3PCR-1 | 0.2 | EPI-19 | 49.9 | DCM | 49.9 |
| Example 602 | BF3-3PCR-1 | 1 | EPI-24 | 99 | — | — |
| Example 603 | BF3-3PCR-1 | 2 | EPI-25 | 98 | — | — |
| Example 604 | BF3-3PCR-1 | 1 | EPI-26 | 99 | — | — |
| Example 605 | BF3-3PCR-1 | 1 | EPI-27 | 99 | — | — |
| Example 606 | BF3-3PCR-1 | 1 | EPI-28 | 99 | — | — |
| Example 607 | BF3-3PCR-1 | 1 | EPI-29 | 99 | — | — |

TABLE 58

| | Polymerization condition (° C.) | (hr) | Rate of episulfide group reaction Measurement method | (%) | Boron content ppm | Thermal stability evaluation Evaluation method | JGW | Judgment |
|---|---|---|---|---|---|---|---|---|
| Example 558 | 70 | 2 | EA method | 100 | 5200 | TA method | 5 | A |
| Example 559 | 70 | 2 | EA method | 100 | 2900 | TA method | 3 | A |
| Example 560 | 70 | 2 | EA method | 100 | 1200 | TA method | 1 | AA |
| Example 561 | 70 | 2 | EA method | 100 | 630 | TA method | 1 | AA |
| Example 562 | 70 | 2 | EA method | 100 | 320 | TA method | 1 | AA |
| Example 563 | 70 | 2 | EA method | 100 | 65 | TA method | 1 | AA |
| Example 564 | 70 | 2 | EA method | 99 | 7 | TA method | 2 | AA |
| Example 565 | 70 | 2 | EA method | 93 | 3 | TA method | 3 | A |

TABLE 58-continued

| | Polymerization condition (° C.) | (hr) | Rate of episulfide group reaction Measurement method | (%) | Boron content ppm | Thermal stability evaluation Evaluation method | JGW | Judgment |
|---|---|---|---|---|---|---|---|---|
| Example 566 | 70 | 2 | EA method | 91 | 1 | TA method | 5 | A |
| Example 567 | 70 | 2 | EA method | 92 | 18 | TA method | 1 | AA |
| Example 568 | 70 | 2 | EA method | 94 | 15 | TA method | 1 | AA |
| Example 569 | 70 | 2 | EA method | 95 | 12 | TA method | 1 | AA |
| Example 570 | 70 | 2 | EA method | 96 | 11 | TA method | 1 | AA |
| Example 571 | 70 | 2 | EA method | 97 | 9 | TA method | 2 | AA |
| Example 572 | 70 | 2 | EA method | 98 | 8 | TA method | 2 | AA |
| Example 573 | 70 | 2 | EA method | 99 | 7 | TA method | 2 | AA |
| Example 574 | 70 | 2 | EA method | 100 | 6 | TA method | 2 | AA |
| Example 575 | 70 | 2 | EA method | 100 | 5 | TA method | 2 | AA |
| Example 576 | 70 | 2 | EA method | 99 | 5 | TA method | 2 | AA |
| Example 577 | 70 | 2 | EA method | 100 | 5 | TA method | 2 | AA |
| Example 578 | 70 | 2 | EA method | 100 | 5 | TA method | 2 | AA |
| Example 579 | 70 | 2 | EA method | 100 | 5 | TA method | 2 | AA |
| Example 580 | 70 | 2 | EA method | 99 | 11 | TA method | 1 | AA |
| Example 581 | 70 | 2 | EA method | 100 | 9 | TA method | 2 | AA |
| Example 582 | 70 | 2 | EA method | 99 | 8 | TA method | 2 | AA |

<Judgment>
AA: Excellent,
A: Good,
C: Poor

TABLE 59

| | Polymerization condition (° C.) | (hr) | Rate of episulfide group reaction Measurement method | (%) | Boron content ppm | Thermal stability evaluation Evaluation method | JGW | Judgment |
|---|---|---|---|---|---|---|---|---|
| Example 583 | 70 | 2 | EA method | 99 | 8 | TA method | 2 | AA |
| Example 584 | 70 | 2 | EA method | 98 | 13 | TA method | 1 | AA |
| Example 585 | 70 | 2 | EA method | 99 | 9 | TA method | 2 | AA |
| Example 586 | 70 | 2 | EA method | 99 | 8 | TA method | 2 | AA |
| Example 587 | 70 | 2 | EA method | 98 | 8 | TA method | 2 | AA |
| Example 588 | 70 | 2 | EA method | 99 | 7 | TA method | 2 | AA |
| Example 589 | 100 | 4 | EB method | 100 | 4100 | TB method | 4 | A |
| Example 590 | 100 | 4 | EB method | 100 | 2200 | TB method | 3 | A |
| Example 591 | 100 | 4 | EB method | 100 | 940 | TB method | 2 | AA |
| Example 592 | 100 | 4 | EB method | 100 | 480 | TB method | 1 | AA |
| Example 593 | 100 | 4 | EB method | 100 | 240 | TB method | 1 | AA |
| Example 594 | 100 | 4 | EB method | 99 | 49 | TB method | 1 | AA |
| Example 595 | 100 | 4 | EB method | 98 | 5 | TB method | 2 | AA |
| Example 596 | 100 | 4 | EB method | 93 | 2 | TB method | 4 | A |
| Example 597 | 100 | 4 | EB method | 91 | 1 | TB method | 5 | A |
| Example 598 | 100 | 4 | EB method | 100 | 260 | TB method | 1 | AA |
| Example 599 | 100 | 4 | EB method | 100 | 110 | TB method | 1 | AA |
| Example 600 | 100 | 4 | EB method | 93 | 93 | TB method | 1 | AA |
| Example 601 | 100 | 4 | EB method | 90 | 80 | TB method | 1 | AA |
| Example 602 | 100 | 4 | EB method | 100 | 360 | TB method | 1 | AA |
| Example 603 | 100 | 4 | EB method | 98 | 500 | TB method | 1 | AA |
| Example 604 | 100 | 4 | EB method | 99 | 270 | TB method | 1 | AA |
| Example 605 | 100 | 4 | EB method | 100 | 260 | TB method | 1 | AA |
| Example 606 | 100 | 4 | EB method | 99 | 280 | TB method | 1 | AA |
| Example 607 | 100 | 4 | EB method | 100 | 270 | TB method | 1 | AA |

<Judgment>
AA: Excellent,
A: Good,
C: Poor

TABLE 60

| | Boron trihalide-ketone compound Name | % by mass | Episulfide compound Name | % by mass | Additive compound Name | % by mass |
|---|---|---|---|---|---|---|
| Example 608 | BF3-MKCJ-1 | 9.1 | EPI-14 | 90.9 | — | — |
| Example 609 | BF3-MKCJ-1 | 4.8 | EPI-14 | 95.2 | — | — |

TABLE 60-continued

| | Boron trihalide-ketone compound Name | % by mass | Episulfide compound Name | % by mass | Additive compound Name | % by mass |
|---|---|---|---|---|---|---|
| Example 610 | BF3-MKCJ-1 | 2.0 | EPI-14 | 98.0 | — | — |
| Example 611 | BF3-MKCJ-1 | 1.0 | EPI-14 | 99.0 | — | — |

TABLE 60-continued

| | Boron trihalide-ketone compound | | Episulfide compound | | Additive compound | |
|---|---|---|---|---|---|---|
| | Name | % by mass | Name | % by mass | Name | % by mass |
| Example 612 | BF3-MKCJ-1 | 0.5 | EPI-14 | 99.5 | — | — |
| Example 613 | BF3-MKCJ-1 | 0.10 | EPI-14 | 99.90 | — | — |
| Example 614 | BF3-MKCJ-1 | 0.01 | EPI-14 | 99.99 | — | — |
| Example 615 | BF3-MKCJ-1 | 0.005 | EPI-14 | 99.995 | — | — |
| Example 616 | BF3-MKCJ-1 | 0.001 | EPI-14 | 99.999 | — | — |
| Example 617 | BF3-MKCJ-1 | 0.03 | EPI-1 | 99.97 | — | — |
| Example 618 | BF3-MKCJ-1 | 0.02 | EPI-2 | 99.98 | — | — |
| Example 619 | BF3-MKCJ-1 | 0.02 | EPI-3 | 99.98 | — | — |
| Example 620 | BF3-MKCJ-1 | 0.02 | EPI-4 | 99.98 | — | — |
| Example 621 | BF3-MKCJ-1 | 0.01 | EPI-5 | 99.99 | — | — |
| Example 622 | BF3-MKCJ-1 | 0.01 | EPI-6 | 99.99 | — | — |
| Example 623 | BF3-MKCJ-1 | 0.01 | EPI-7 | 99.99 | — | — |
| Example 624 | BF3-MKCJ-1 | 0.01 | EPI-8 | 99.99 | — | — |
| Example 625 | BF3-MKCJ-1 | 0.01 | EPI-9 | 99.99 | — | — |
| Example 626 | BF3-MKCJ-1 | 0.01 | EPI-10 | 99.99 | — | — |
| Example 627 | BF3-MKCJ-1 | 0.01 | EPI-11 | 99.99 | — | — |
| Example 628 | BF3-MKCJ-1 | 0.01 | EPI-12 | 99.99 | — | — |
| Example 629 | BF3-MKCJ-1 | 0.01 | EPI-13 | 99.99 | — | — |
| Example 630 | BF3-MKCJ-1 | 0.02 | EPI-20 | 99.98 | — | — |
| Example 631 | BF3-MKCJ-1 | 0.01 | EPI-21 | 99.99 | — | — |
| Example 632 | BF3-MKCJ-1 | 0.01 | EPI-22 | 99.99 | — | — |

TABLE 61

| | Boron trihalide-ketone compound | | Episulfide compound | | Additive compound | |
|---|---|---|---|---|---|---|
| | Name | % by mass | Name | % by mass | Name | % by mass |
| Example 633 | BF3-MKCJ-1 | 0.01 | EPI-23 | 99.99 | — | — |
| Example 634 | BF3-MKCJ-1 | 0.02 | EPI-30 | 99.98 | — | — |
| Example 635 | BF3-MKCJ-1 | 0.01 | EPI-31 | 99.99 | — | — |
| Example 636 | BF3-MKCJ-1 | 0.01 | EPI-32 | 99.99 | — | — |
| Example 637 | BF3-MKCJ-1 | 0.01 | EPI-33 | 99.99 | — | — |
| Example 638 | BF3-MKCJ-1 | 0.01 | EPI-34 | 99.99 | — | — |
| Example 639 | BF3-MKCJ-1 | 7 | EPI-16 | 93 | — | — |
| Example 640 | BF3-MKCJ-1 | 4 | EPI-16 | 96 | — | — |
| Example 641 | BF3-MKCJ-1 | 1 | EPI-16 | 99 | — | — |
| Example 642 | BF3-MKCJ-1 | 0.7 | EPI-16 | 99.3 | — | — |
| Example 643 | BF3-MKCJ-1 | 0.4 | EPI-16 | 99.6 | — | — |
| Example 644 | BF3-MKCJ-1 | 0.1 | EPI-16 | 99.9 | — | — |
| Example 645 | BF3-MKCJ-1 | 0.01 | EPI-16 | 99.99 | — | — |
| Example 646 | BF3-MKCJ-1 | 0.004 | EPI-16 | 99.996 | — | — |
| Example 647 | BF3-MKCJ-1 | 0.001 | EPI-16 | 99.999 | — | — |
| Example 648 | BF3-MKCJ-1 | 0.2 | EPI-15 | 49.9 | DCM | 49.9 |
| Example 649 | BF3-MKCJ-1 | 0.08 | EPI-17 | 49.96 | DCM | 49.96 |
| Example 650 | BF3-MKCJ-1 | 0.07 | EPI-18 | 49.96 | DCM | 49.96 |
| Example 651 | BF3-MKCJ-1 | 0.06 | EPI-19 | 49.97 | DCM | 49.97 |
| Example 652 | BF3-MKCJ-1 | 0.6 | EPI-24 | 99.4 | — | — |
| Example 653 | BF3-MKCJ-1 | 0.8 | EPI-25 | 99.2 | — | — |
| Example 654 | BF3-MKCJ-1 | 0.4 | EPI-26 | 99.6 | — | — |
| Example 655 | BF3-MKCJ-1 | 0.4 | EPI-27 | 99.6 | — | — |
| Example 656 | BF3-MKCJ-1 | 0.4 | EPI-28 | 99.6 | — | — |
| Example 657 | BF3-MKCJ-1 | 0.4 | EPI-29 | 99.6 | — | — |

TABLE 62

| | Polymerization condition | | Rate of episulfide group reaction | | Boron content | Thermal stability evaluation | | |
|---|---|---|---|---|---|---|---|---|
| | (° C.) | (hr) | Measurement method | (%) | ppm | Evaluation method | JGW | Judgment |
| Example 608 | 70 | 2 | EA method | 100 | 5900 | TA method | 5 | A |
| Example 609 | 70 | 2 | EA method | 100 | 3100 | TA method | 3 | A |
| Example 610 | 70 | 2 | EA method | 100 | 1300 | TA method | 1 | AA |
| Example 611 | 70 | 2 | EA method | 100 | 640 | TA method | 1 | AA |
| Example 612 | 70 | 2 | EA method | 100 | 320 | TA method | 1 | AA |
| Example 613 | 70 | 2 | EA method | 99 | 65 | TA method | 1 | AA |
| Example 614 | 70 | 2 | EA method | 96 | 7 | TA method | 2 | AA |
| Example 615 | 70 | 2 | EA method | 93 | 3 | TA method | 3 | A |
| Example 616 | 70 | 2 | EA method | 90 | 1 | TA method | 5 | A |
| Example 617 | 70 | 2 | EA method | 92 | 18 | TA method | 1 | AA |
| Example 618 | 70 | 2 | EA method | 94 | 15 | TA method | 1 | AA |
| Example 619 | 70 | 2 | EA method | 95 | 12 | TA method | 1 | AA |
| Example 620 | 70 | 2 | EA method | 96 | 11 | TA method | 1 | AA |
| Example 621 | 70 | 2 | EA method | 97 | 9 | TA method | 2 | AA |
| Example 622 | 70 | 2 | EA method | 98 | 8 | TA method | 2 | AA |
| Example 623 | 70 | 2 | EA method | 98 | 7 | TA method | 2 | AA |
| Example 624 | 70 | 2 | EA method | 99 | 6 | TA method | 2 | AA |
| Example 625 | 70 | 2 | EA method | 98 | 5 | TA method | 2 | AA |
| Example 626 | 70 | 2 | EA method | 99 | 5 | TA method | 2 | AA |
| Example 627 | 70 | 2 | EA method | 100 | 5 | TA method | 2 | AA |
| Example 628 | 70 | 2 | EA method | 100 | 5 | TA method | 2 | AA |
| Example 629 | 70 | 2 | EA method | 100 | 5 | TA method | 2 | AA |
| Example 630 | 70 | 2 | EA method | 99 | 11 | TA method | 1 | AA |
| Example 631 | 70 | 2 | EA method | 99 | 9 | TA method | 2 | AA |
| Example 632 | 70 | 2 | EA method | 99 | 8 | TA method | 2 | AA |

<Judgment>
AA: Excellent,
A: Good,
C: Poor

TABLE 63

| | Polymerization condition (° C.) | (hr) | Rate of episulfide group reaction Measurement method | (%) | Boron content ppm | Thermal stability evaluation Evaluation method | JGW | Judgment |
|---|---|---|---|---|---|---|---|---|
| Example 633 | 70 | 2 | EA method | 99 | 8 | TA method | 2 | AA |
| Example 634 | 70 | 2 | EA method | 98 | 13 | TA method | 1 | AA |
| Example 635 | 70 | 2 | EA method | 99 | 9 | TA method | 2 | AA |
| Example 636 | 70 | 2 | EA method | 99 | 8 | TA method | 2 | AA |
| Example 637 | 70 | 2 | EA method | 98 | 8 | TA method | 2 | AA |
| Example 638 | 70 | 2 | EA method | 99 | 7 | TA method | 2 | AA |
| Example 639 | 100 | 4 | EB method | 100 | 4500 | TB method | 4 | A |
| Example 640 | 100 | 4 | EB method | 100 | 2400 | TB method | 3 | A |
| Example 641 | 100 | 4 | EB method | 100 | 960 | TB method | 2 | AA |
| Example 642 | 100 | 4 | EB method | 100 | 490 | TB method | 1 | AA |
| Example 643 | 100 | 4 | EB method | 100 | 240 | TB method | 1 | AA |
| Example 644 | 100 | 4 | EB method | 99 | 49 | TB method | 1 | AA |
| Example 645 | 100 | 4 | EB method | 98 | 5 | TB method | 2 | AA |
| Example 646 | 100 | 4 | EB method | 94 | 2 | TB method | 4 | A |
| Example 647 | 100 | 4 | EB method | 92 | 1 | TB method | 5 | A |
| Example 648 | 100 | 4 | EB method | 100 | 260 | TB method | 1 | AA |
| Example 649 | 100 | 4 | EB method | 100 | 110 | TB method | 1 | AA |
| Example 650 | 100 | 4 | EB method | 94 | 93 | TB method | 1 | AA |
| Example 651 | 100 | 4 | EB method | 91 | 80 | TB method | 1 | AA |
| Example 652 | 100 | 4 | EB method | 100 | 370 | TB method | 1 | AA |
| Example 653 | 100 | 4 | EB method | 98 | 500 | TB method | 1 | AA |
| Example 654 | 100 | 4 | EB method | 99 | 270 | TB method | 1 | AA |
| Example 655 | 100 | 4 | EB method | 100 | 260 | TB method | 1 | AA |
| Example 656 | 100 | 4 | EB method | 99 | 280 | TB method | 1 | AA |
| Example 657 | 100 | 4 | EB method | 100 | 270 | TB method | 1 | AA |

<Judgment>
AA: Excellent,
A: Good,
C: Poor

TABLE 64

| | Thermal polymerization promoter Name | % by mass | Episulfide compound Name | % by mass | Additive compound Name | % by mass |
|---|---|---|---|---|---|---|
| Comparative Example 91 | SI100 | 0.03 | EPI-1 | 99.97 | — | — |
| Comparative Example 92 | SI100 | 0.03 | EPI-2 | 99.97 | — | — |
| Comparative Example 93 | SI100 | 0.03 | EPI-3 | 99.97 | — | — |
| Comparative Example 94 | SI100 | 0.03 | EPI-4 | 99.97 | — | — |
| Comparative Example 95 | SI100 | 0.03 | EPI-5 | 99.97 | — | — |
| Comparative Example 96 | SI100 | 0.03 | EPI-6 | 99.97 | — | — |
| Comparative Example 97 | SI100 | 0.03 | EPI-7 | 99.97 | — | — |
| Comparative Example 98 | SI100 | 0.03 | EPI-8 | 99.97 | — | — |
| Comparative Example 99 | SI100 | 0.03 | EPI-9 | 99.97 | — | — |
| Comparative Example 100 | SI100 | 0.03 | EPI-10 | 99.97 | — | — |
| Comparative Example 101 | SI100 | 0.03 | EPI-11 | 99.97 | — | — |
| Comparative Example 102 | SI100 | 0.03 | EPI-12 | 99.97 | — | — |
| Comparative Example 103 | SI100 | 0.03 | EPI-13 | 99.97 | — | — |
| Comparative Example 104 | SI100 | 0.03 | EPI-14 | 99.97 | — | — |
| Comparative Example 105 | SI100 | 0.03 | EPI-20 | 99.97 | — | — |
| Comparative Example 106 | SI100 | 0.03 | EPI-21 | 99.97 | — | — |
| Comparative Example 107 | SI100 | 0.03 | EPI-22 | 99.97 | — | — |
| Comparative Example 108 | SI100 | 0.03 | EPI-23 | 99.97 | — | — |

TABLE 64-continued

| | Thermal polymerization promoter Name | % by mass | Episulfide compound Name | % by mass | Additive compound Name | % by mass |
|---|---|---|---|---|---|---|
| Comparative Example 109 | SI100 | 0.03 | EPI-30 | 99.97 | — | — |
| Comparative Example 110 | SI100 | 0.03 | EPI-31 | 99.97 | — | — |
| Comparative Example 111 | SI100 | 0.03 | EPI-32 | 99.97 | — | — |
| Comparative Example 112 | SI100 | 0.03 | EPI-33 | 99.97 | — | — |
| Comparative Example 113 | SI100 | 0.03 | EPI-34 | 99.97 | — | — |
| Comparative Example 114 | SI100 | 0.02 | EPI-15 | 49.99 | DCM | 49.99 |
| Comparative Example 115 | SI100 | 0.03 | EPI-16 | 99.97 | — | — |
| Comparative Example 116 | SI100 | 0.02 | EPI-17 | 49.99 | DCM | 49.99 |
| Comparative Example 117 | SI100 | 0.02 | EPI-18 | 49.99 | DCM | 49.99 |
| Comparative Example 118 | SI100 | 0.02 | EPI-19 | 49.99 | DCM | 49.99 |
| Comparative Example 119 | SI100 | 0.03 | EPI-24 | 99.97 | — | — |
| Comparative Example 120 | SI100 | 0.03 | EPI-25 | 99.97 | — | — |
| Comparative Example 121 | SI100 | 0.03 | EPI-26 | 99.97 | — | — |
| Comparative Example 122 | SI100 | 0.03 | EPI-27 | 99.97 | — | — |
| Comparative Example 123 | SI100 | 0.03 | EPI-28 | 99.97 | — | — |
| Comparative Example 124 | SI100 | 0.03 | EPI-29 | 99.97 | — | — |

TABLE 65

| | Polymerization condition (° C.) | (hr) | Rate of episulfide group reaction Measurement method | (%) | Boron content ppm | Thermal stability evaluation Evaluation method | JGW | Judgment |
|---|---|---|---|---|---|---|---|---|
| Comparative Example 91 | — | — | EA method | 100 | 0 | TA method | 12 | C |
| Comparative Example 92 | — | — | EA method | 100 | 0 | TA method | 11 | C |
| Comparative Example 93 | — | — | EA method | 100 | 0 | TA method | 11 | C |

TABLE 65-continued

| | Polymerization condition | | Rate of episulfide group reaction | | Boron content | Thermal stability evaluation | | |
|---|---|---|---|---|---|---|---|---|
| | (° C.) | (hr) | Measurement method | (%) | ppm | Evaluation method | JGW | Judgment |
| Comparative Example 94 | — | — | EA method | 100 | 0 | TA method | 10 | C |
| Comparative Example 95 | — | — | EA method | 100 | 0 | TA method | 12 | C |
| Comparative Example 96 | — | — | EA method | 100 | 0 | TA method | 10 | C |
| Comparative Example 97 | — | — | EA method | 100 | 0 | TA method | 11 | C |
| Comparative Example 98 | — | — | EA method | 100 | 0 | TA method | 10 | C |
| Comparative Example 99 | — | — | EA method | 100 | 0 | TA method | 8 | C |
| Comparative Example 100 | — | — | EA method | 100 | 0 | TA method | 9 | C |
| Comparative Example 101 | — | — | EA method | 100 | 0 | TA method | 7 | C |
| Comparative Example 102 | — | — | EA method | 100 | 0 | TA method | 8 | C |
| Comparative Example 103 | — | — | EA method | 100 | 0 | TA method | 7 | C |
| Comparative Example 104 | — | — | EA method | 100 | 0 | TA method | 7 | C |
| Comparative Example 105 | — | — | EA method | 100 | 0 | TA method | 8 | C |
| Comparative Example 106 | — | — | EA method | 100 | 0 | TA method | 7 | C |
| Comparative Example 107 | — | — | EA method | 100 | 0 | TA method | 8 | C |
| Comparative Example 108 | — | — | EA method | 100 | 0 | TA method | 10 | C |
| Comparative Example 109 | — | — | EA method | 100 | 0 | TA method | 11 | C |
| Comparative Example 110 | — | — | EA method | 100 | 0 | TA method | 9 | C |
| Comparative Example 111 | — | — | EA method | 100 | 0 | TA method | 8 | C |
| Comparative Example 112 | — | — | EA method | 100 | 0 | TA method | 9 | C |
| Comparative Example 113 | — | — | EA method | 100 | 0 | TA method | 10 | C |
| Comparative Example 114 | — | — | EB method | 100 | 0 | TB method | 10 | C |
| Comparative Example 115 | — | — | EB method | 100 | 0 | TB method | 8 | C |
| Comparative Example 116 | — | — | EB method | 100 | 0 | TB method | 9 | C |
| Comparative Example 117 | — | — | EB method | 100 | 0 | TB method | 8 | C |
| Comparative Example 118 | — | — | EB method | 100 | 0 | TB method | 8 | C |
| Comparative Example 119 | — | — | EB method | 100 | 0 | TB method | 9 | C |
| Comparative Example 120 | — | — | EB method | 100 | 0 | TB method | 8 | C |
| Comparative Example 121 | — | — | EB method | 100 | 0 | TB method | 7 | C |
| Comparative Example 122 | — | — | EB method | 100 | 0 | TB method | 8 | C |
| Comparative Example 123 | — | — | EB method | 100 | 0 | TB method | 6 | C |
| Comparative Example 124 | — | — | EB method | 100 | 0 | TB method | 7 | C |

<Judgment>
AA: Excellent,
A: Good,
C: Poor

As shown in Tables 52 to 65, it was confirmed that: the polymer of the episulfide compound whose boron atom content was 1 to 6500 ppm according to the present embodiment was less volatilized even when preserved for a long period under high temperature; and stability under high temperature was high.

Example 658

Preparation of Boron Trihalide-Trivalent Phosphorus Compound (BF3-3PCR-1)

(1) Preparation: A water bath equipped with an immersion cooling and heating unit was placed on a magnetic stirrer, and water and a stirring bar were put therein. The immersion cooling and heating unit was activated, and the temperature of water was set to 20° C.

(2) A reaction container filled with nitrogen gas was placed in the water bath of (1), and 72% by mass of tri-n-octylphosphine and 28% by mass of a boron trifluoride-diethyl ether complex were added to the reaction container and stirred for 1 hour.

(3) A vacuum distillation apparatus was attached to the reaction container, and the pressure was gradually reduced, finally reduced to 2 kPa, and maintained for 4 hours.

(4) Analysis by $^{11}$B-NMR was conducted using the one obtained in (3) above to thereby confirm that a complex was formed.

<Preparation and Polymerization of Composition>

(5) Preparation was performed by procedures similar to (1) above.

(6) A reaction container filled with nitrogen gas was placed in the water bath of (5), and each starting material was added to the reaction container according to the compositional ratio of Table 34 and stirred to thereby prepare a composition.

(7) The composition prepared in (6) above was polymerized according to the polymerization conditions of Table 35 to thereby obtain a polymer.

(8) The rate of episulfide group reaction of the polymer obtained in (7) above was measured by the method of Table 35 to confirm that an episulfide group in the starting episulfide compound was polymerized.

(9) ICP measurement was performed using the polymer obtained in (7) above to determine the content of a phosphorus atom in the polymer.

<Weather Resistance Evaluation of Polymer: The Case where the Starting Episulfide Compound of the Polymer has One Episulfide Group>

(10) The polymer obtained in (7) above was dissolved in dichloromethane (manufactured by Wako Pure Chemical Industries, Ltd.) of the same weight thereas to obtain a polymer solution.

In this context, the compound used for dissolving the polymer is not particularly limited and may be one that can dissolve the polymer and can be removed in a later step.

(11) The polymer solution of (1) was added dropwise onto a square quartz glass plate (manufactured by GL Sciences Inc., size: 10 mm×10 mm, thickness: 1 mm) with both surfaces optically polished, and spread at approximately 41 μm using a bar coater (Dai-Ichi Rika Co., Ltd., wire coil number: No. 18).

(12) The quartz glass plate obtained in (11) above was put in a vacuum dryer (manufactured by Tokyo RikaKikai Co., Ltd., VOS-451D; Small Oil Rotary Vacuum Pump GCD-201X manufactured by ULVAC KIKO, Inc. was used as a vacuum pump) and dried at room temperature at 13 Pa for 24 hours.

In this context, the temperature and pressure for drying are not particularly limited, and conditions where volatiles contained in the polymer solution do not rapidly volatilize can be appropriately selected. In the present Example, the pressure was gradually reduced and finally set to 13 kPa.

(13) The quartz glass plate after the drying was subjected to a weather resistance test under the following conditions:

Weather resistance tester: "SX120" manufactured by Suga Test Instruments Co., Ltd.

Testing time: 5000 hours

Irradiance: 60 W/m2

Black panel temperature: 63° C.

Humidity: 50%

(14) The yellow index (hereinafter, referred to as "YI") of the polymer-coated portion present on the quartz glass plate obtained in

(13) above was measured using a spectrophotometric colorimeter (manufactured by Konica Minolta, Inc., CM-3600d). In the present Example, YI was 9.

(15) The weather resistance was judged as being good ("A") in the case where YI was 10 or less, judged as being excellent ("AA") in the case of 5 or less, and judged as being poor ("C") in the case other than these. In the present Example, the weather resistance was judged as being good because YI was 9.

<Thermal Discoloration Resistance Evaluation of Polymer: The Case where the Starting Episulfide Compound of the Polymer has Two or More Episulfide Groups>

(16) The composition prepared in (6) above was added dropwise onto a square quartz glass plate (manufactured by GL Sciences Inc., size: 10 mm×10 mm, thickness: 1 mm) with both surfaces optically polished, and spread at approximately 41 μm using a bar coater (Dai-Ichi Rika Co., Ltd., wire coil number: No. 18).

(17) The quartz glass plate obtained in (16) above was polymerized according to the polymerization conditions shown in the table to thereby obtain a polymer on the quartz glass.

(18) The quartz glass plate obtained in (17) above was subjected to a weather resistance test under the following conditions:

Weather resistance tester: "SX120" manufactured by Suga Test Instruments Co., Ltd.

Testing time: 5000 hours

Irradiance: 60 W/m2

Black panel temperature: 63° C.

Humidity: 50%

(19) The yellow index (hereinafter, referred to as "I") of the polymer-coated portion present on the quartz glass plate obtained in

(18) above was measured using a spectrophotometric colorimeter (manufactured by Konica Minolta, Inc., CM-3600d).

(20) The weather resistance was judged as being good ("A") in the case where YI was 10 or less, judged as being excellent ("A") in the case of 5 or less, and judged as being poor ("C") in the case other than these.

Examples 659 to 707

Polymers were obtained by a method similar to Example 658 except that the compositional ratios of Tables 66 and 67 and the polymerization conditions of Tables 68 and 69 were used. The evaluation results of the polymers obtained in Examples 659 to 707 are shown in Tables 68 and 69.

In Examples 667 to 673 and 680 to 688, the polymers were prepared in sealed pressure-resistant bottles.

Comparative Examples 125 to 158

The compositions of Comparative Examples 125 to 158 were prepared by a method similar to Example 658 above according to the composition of Table 70, and polymers were obtained according to the polymerization conditions of Table 71. The evaluation results of the polymers obtained in Comparative Examples 125 to 147 are shown in Table 71. Comparative Examples 148 to 158 yielded polymers during the preparation of compositions, and therefore, evaluation could not be performed.

In Comparative Examples 125 to 131 and 139 to 147, the polymers were prepared in sealed pressure-resistant bottles.

TABLE 66

| | Boron trihalide-trivalent phosphorus compound | | Episulfide compound | | Additive compound | |
|---|---|---|---|---|---|---|
| | Name | % by mass | Name | % by mass | Name | % by mass |
| Example 658 | BF3-3PCR-1 | 21 | EPI-14 | 79 | — | — |
| Example 659 | BF3-3PCR-1 | 12 | EPI-14 | 88 | — | — |
| Example 660 | BF3-3PCR-1 | 5 | EPI-14 | 95 | — | — |
| Example 661 | BF3-3PCR-1 | 3 | EPI-14 | 97 | — | — |
| Example 662 | BF3-3PCR-1 | 1 | EPI-14 | 99 | — | — |
| Example 663 | BF3-3PCR-1 | 0.3 | EPI-14 | 99.7 | — | — |
| Example 664 | BF3-3PCR-1 | 0.03 | EPI-14 | 99.97 | — | — |
| Example 665 | BF3-3PCR-1 | 0.01 | EPI-14 | 99.99 | — | — |
| Example 666 | BF3-3PCR-1 | 0.003 | EPI-14 | 99.997 | — | — |
| Example 667 | BF3-3PCR-1 | 0.07 | EPI-1 | 99.93 | — | — |
| Example 668 | BF3-3PCR-1 | 0.06 | EPI-2 | 99.94 | — | — |
| Example 669 | BF3-3PCR-1 | 0.05 | EPI-3 | 99.95 | — | — |
| Example 670 | BF3-3PCR-1 | 0.04 | EPI-4 | 99.96 | — | — |
| Example 671 | BF3-3PCR-1 | 0.04 | EPI-5 | 99.96 | — | — |
| Example 672 | BF3-3PCR-1 | 0.03 | EPI-6 | 99.97 | — | — |
| Example 673 | BF3-3PCR-1 | 0.03 | EPI-7 | 99.97 | — | — |
| Example 674 | BF3-3PCR-1 | 0.03 | EPI-8 | 99.97 | — | — |
| Example 675 | BF3-3PCR-1 | 0.02 | EPI-9 | 99.98 | — | — |
| Example 676 | BF3-3PCR-1 | 0.02 | EPI-10 | 99.98 | — | — |
| Example 677 | BF3-3PCR-1 | 0.02 | EPI-11 | 99.98 | — | — |
| Example 678 | BF3-3PCR-1 | 0.02 | EPI-12 | 99.98 | — | — |
| Example 679 | BF3-3PCR-1 | 0.01 | EPI-13 | 99.99 | — | — |
| Example 680 | BF3-3PCR-1 | 0.04 | EPI-20 | 99.96 | — | — |
| Example 681 | BF3-3PCR-1 | 0.04 | EPI-21 | 99.96 | — | — |
| Example 682 | BF3-3PCR-1 | 0.03 | EPI-22 | 99.97 | — | — |

TABLE 67

| | Boron trihalide-trivalent phosphorus compound | | Episulfide compound | | Additive compound | |
|---|---|---|---|---|---|---|
| | Name | % by mass | Name | % by mass | Name | % by mass |
| Example 683 | BF3-3PCR-1 | 0.03 | EPI-23 | 99.97 | — | — |
| Example 684 | BF3-3PCR-1 | 0.05 | EPI-30 | 99.95 | — | — |
| Example 685 | BF3-3PCR-1 | 0.04 | EPI-31 | 99.96 | — | — |
| Example 686 | BF3-3PCR-1 | 0.03 | EPI-32 | 99.97 | — | — |
| Example 687 | BF3-3PCR-1 | 0.03 | EPI-33 | 99.97 | — | — |
| Example 688 | BF3-3PCR-1 | 0.03 | EPI-34 | 99.97 | — | — |
| Example 689 | BF3-3PCR-1 | 17 | EPI-16 | 83 | — | — |
| Example 690 | BF3-3PCR-1 | 9 | EPI-16 | 91 | — | — |
| Example 691 | BF3-3PCR-1 | 4 | EPI-16 | 96 | — | — |
| Example 692 | BF3-3PCR-1 | 2 | EPI-16 | 98 | — | — |
| Example 693 | BF3-3PCR-1 | 1 | EPI-16 | 99 | — | — |
| Example 694 | BF3-3PCR-1 | 0.2 | EPI-16 | 99.8 | — | — |

TABLE 67-continued

| | Boron trihalide-trivalent phosphorus compound Name | % by mass | Episulfide compound Name | % by mass | Additive compound Name | % by mass |
|---|---|---|---|---|---|---|
| Example 695 | BF3-3PCR-1 | 0.02 | EPI-16 | 99.98 | — | — |
| Example 696 | BF3-3PCR-1 | 0.01 | EPI-16 | 99.99 | — | — |
| Example 697 | BF3-3PCR-1 | 0.002 | EPI-16 | 99.998 | — | — |
| Example 698 | BF3-3PCR-1 | 0.5 | EPI-15 | 49.7 | DCM | 49.7 |
| Example 699 | BF3-3PCR-1 | 0.2 | EPI-17 | 49.9 | DCM | 49.9 |
| Example 700 | BF3-3PCR-1 | 0.2 | EPI-18 | 49.9 | DCM | 49.9 |
| Example 701 | BF3-3PCR-1 | 0.2 | EPI-19 | 49.9 | DCM | 49.9 |

TABLE 67-continued

| | Boron trihalide-trivalent phosphorus compound Name | % by mass | Episulfide compound Name | % by mass | Additive compound Name | % by mass |
|---|---|---|---|---|---|---|
| Example 702 | BF3-3PCR-1 | 1 | EPI-24 | 99 | — | — |
| Example 703 | BF3-3PCR-1 | 2 | EPI-25 | 98 | — | — |
| Example 704 | BF3-3PCR-1 | 1 | EPI-26 | 99 | — | — |
| Example 705 | BF3-3PCR-1 | 1 | EPI-27 | 99 | — | — |
| Example 706 | BF3-3PCR-1 | 1 | EPI-28 | 99 | — | — |
| Example 707 | BF3-3PCR-1 | 1 | EPI-29 | 99 | — | — |

TABLE 68

| | Polymerization condition (° C.) | (hr) | Rate of episulfide group reaction Measurement method | (%) | Phosphorus content ppm | Thermal discoloration resistance evaluation YI | Judgment |
|---|---|---|---|---|---|---|---|
| Example 658 | 70 | 2 | EA method | 100 | 14000 | 9 | A |
| Example 659 | 70 | 2 | EA method | 100 | 8200 | 7 | A |
| Example 660 | 70 | 2 | EA method | 100 | 3500 | 4 | AA |
| Example 661 | 70 | 2 | EA method | 100 | 1800 | 2 | AA |
| Example 662 | 70 | 2 | EA method | 100 | 920 | 1 | AA |
| Example 663 | 70 | 2 | EA method | 100 | 190 | 2 | AA |
| Example 664 | 70 | 2 | EA method | 99 | 19 | 3 | AA |
| Example 665 | 70 | 2 | EA method | 93 | 9 | 6 | A |
| Example 666 | 70 | 2 | EA method | 91 | 2 | 9 | A |
| Example 667 | 70 | 2 | EA method | 92 | 51 | 2 | AA |
| Example 668 | 70 | 2 | EA method | 94 | 42 | 2 | AA |
| Example 669 | 70 | 2 | EA method | 95 | 35 | 2 | AA |
| Example 670 | 70 | 2 | EA method | 96 | 30 | 2 | AA |
| Example 671 | 70 | 2 | EA method | 97 | 27 | 3 | AA |
| Example 672 | 70 | 2 | EA method | 98 | 24 | 3 | AA |
| Example 673 | 70 | 2 | EA method | 99 | 21 | 3 | AA |
| Example 674 | 70 | 2 | EA method | 100 | 18 | 3 | AA |
| Example 675 | 70 | 2 | EA method | 100 | 15 | 4 | AA |
| Example 676 | 70 | 2 | EA method | 99 | 14 | 4 | AA |
| Example 677 | 70 | 2 | EA method | 100 | 12 | 4 | AA |
| Example 678 | 70 | 2 | EA method | 100 | 11 | 4 | AA |
| Example 679 | 70 | 2 | EA method | 100 | 10 | 5 | AA |
| Example 680 | 70 | 2 | EA method | 99 | 31 | 3 | AA |
| Example 681 | 70 | 2 | EA method | 100 | 27 | 3 | AA |
| Example 682 | 70 | 2 | EA method | 99 | 24 | 3 | AA |

<Judgment>
AA: Excellent,
A: Good,
C: Poor

TABLE 69

| | Polymerization condition (° C.) | (hr) | Rate of episulfide group reaction Measurement method | (%) | Phosphorus content ppm | Thermal discoloration resistance evaluation YI | Judgment |
|---|---|---|---|---|---|---|---|
| Example 683 | 70 | 2 | EA method | 99 | 22 | 3 | AA |
| Example 684 | 70 | 2 | EA method | 98 | 36 | 2 | AA |
| Example 685 | 70 | 2 | EA method | 99 | 27 | 3 | AA |
| Example 686 | 70 | 2 | EA method | 99 | 24 | 3 | AA |
| Example 687 | 70 | 2 | EA method | 98 | 22 | 3 | AA |
| Example 688 | 70 | 2 | EA method | 99 | 20 | 3 | AA |
| Example 689 | 100 | 4 | EB method | 100 | 12000 | 8 | A |
| Example 690 | 100 | 4 | EB method | 100 | 6400 | 6 | A |
| Example 691 | 100 | 4 | EB method | 100 | 2700 | 4 | AA |
| Example 692 | 100 | 4 | EB method | 100 | 1400 | 2 | AA |
| Example 693 | 100 | 4 | EB method | 100 | 700 | 1 | AA |
| Example 694 | 100 | 4 | EB method | 99 | 140 | 2 | AA |
| Example 695 | 100 | 4 | EB method | 98 | 14 | 2 | AA |

TABLE 69-continued

| | Polymerization condition (° C.) | (hr) | Rate of episulfide group reaction Measurement method | (%) | Phosphorus content ppm | Thermal discoloration resistance evaluation YI | Judgment |
|---|---|---|---|---|---|---|---|
| Example 696 | 100 | 4 | EB method | 93 | 7 | 7 | A |
| Example 697 | 100 | 4 | EB method | 91 | 1 | 10 | A |
| Example 698 | 100 | 4 | EB method | 100 | 750 | 1 | AA |
| Example 699 | 100 | 4 | EB method | 100 | 310 | 2 | AA |
| Example 700 | 100 | 4 | EB method | 93 | 270 | 2 | AA |
| Example 701 | 100 | 4 | EB method | 90 | 230 | 2 | AA |
| Example 702 | 100 | 4 | EB method | 100 | 1000 | 1 | AA |
| Example 703 | 100 | 4 | EB method | 98 | 1400 | 2 | AA |
| Example 704 | 100 | 4 | EB method | 99 | 780 | 1 | AA |
| Example 705 | 100 | 4 | EB method | 100 | 740 | 1 | AA |
| Example 706 | 100 | 4 | EB method | 99 | 800 | 1 | AA |
| Example 707 | 100 | 4 | EB method | 100 | 770 | 1 | AA |

<Judgment>
AA: Excellent,
A: Good,
C: Poor

TABLE 70

| | Thermal polymerization promoter Name | % by mass | Episulfide compound Name | % by mass | Additive compound Name | % by mass |
|---|---|---|---|---|---|---|
| Comparative Example 125 | BF3DEE | 0.02 | EPI-1 | 99.98 | — | — |
| Comparative Example 126 | BF3DEE | 0.02 | EPI-2 | 99.98 | — | — |
| Comparative Example 127 | BF3DEE | 0.02 | EPI-3 | 99.98 | — | — |
| Comparative Example 128 | BF3DEE | 0.01 | EPI-4 | 99.99 | — | — |
| Comparative Example 129 | BF3DEE | 0.01 | EPI-5 | 99.99 | — | — |
| Comparative Example 130 | BF3DEE | 0.01 | EPI-6 | 99.99 | — | — |
| Comparative Example 131 | BF3DEE | 0.01 | EPI-7 | 99.99 | — | — |
| Comparative Example 132 | BF3DEE | 0.01 | EPI-8 | 99.99 | — | — |
| Comparative Example 133 | BF3DEE | 0.01 | EPI-9 | 99.99 | — | — |
| Comparative Example 134 | BF3DEE | 0.01 | EPI-10 | 99.99 | — | — |
| Comparative Example 135 | BF3DEE | 0.01 | EPI-11 | 99.99 | — | — |
| Comparative Example 136 | BF3DEE | 0.005 | EPI-12 | 99.995 | — | — |
| Comparative Example 137 | BF3DEE | 0.005 | EPI-13 | 99.995 | — | — |
| Comparative Example 138 | BF3DEE | 0.01 | EPI-14 | 99.99 | — | — |
| Comparative Example 139 | BF3DEE | 0.01 | EPI-20 | 99.99 | — | — |
| Comparative Example 140 | BF3DEE | 0.01 | EPI-21 | 99.99 | — | — |
| Comparative Example 141 | BF3DEE | 0.01 | EPI-22 | 99.99 | — | — |
| Comparative Example 142 | BF3DEE | 0.01 | EPI-23 | 99.99 | — | — |
| Comparative Example 143 | BF3DEE | 0.02 | EPI-30 | 99.98 | — | — |
| Comparative Example 144 | BF3DEE | 0.01 | EPI-31 | 99.99 | — | — |
| Comparative Example 145 | BF3DEE | 0.01 | EPI-32 | 99.99 | — | — |
| Comparative Example 146 | BF3DEE | 0.01 | EPI-33 | 99.99 | — | — |
| Comparative Example 147 | BF3DEE | 0.01 | EPI-34 | 99.99 | — | — |
| Comparative Example 148 | BF3DEE | 0.3 | EPI-15 | 49.8 | DCM | 49.8 |
| Comparative Example 149 | BF3DEE | 0.6 | EPI-16 | 99.4 | — | — |
| Comparative Example 150 | BF3DEE | 0.1 | EPI-17 | 49.9 | DCM | 49.9 |
| Comparative Example 151 | BF3DEE | 0.1 | EPI-18 | 49.9 | DCM | 49.9 |
| Comparative Example 152 | BF3DEE | 0.1 | EPI-19 | 49.9 | DCM | 49.9 |
| Comparative Example 153 | BF3DEE | 1 | EPI-24 | 99 | — | — |
| Comparative Example 154 | BF3DEE | 1 | EPI-25 | 99 | — | — |
| Comparative Example 155 | BF3DEE | 0.7 | EPI-26 | 99.3 | — | — |
| Comparative Example 156 | BF3DEE | 0.7 | EPI-27 | 99.3 | — | — |
| Comparative Example 157 | BF3DEE | 0.7 | EPI-28 | 99.3 | — | — |
| Comparative Example 158 | BF3DEE | 0.7 | EPI-29 | 99.3 | — | — |

TABLE 71

| | Polymerization condition | | Rate of episulfide group reaction | | Phosphorus content | Thermal discoloration resistance evaluation | |
|---|---|---|---|---|---|---|---|
| | (° C.) | (hr) | Measurement method | (%) | ppm | YI | Judgment |
| Comparative Example 125 | — | — | EA method | 100 | 0 | 39 | C |
| Comparative Example 126 | — | — | EA method | 100 | 0 | 34 | C |
| Comparative Example 127 | — | — | EA method | 100 | 0 | 33 | C |
| Comparative Example 128 | — | — | EA method | 100 | 0 | 27 | C |
| Comparative Example 129 | — | — | EA method | 100 | 0 | 21 | C |
| Comparative Example 130 | — | — | EA method | 100 | 0 | 25 | C |
| Comparative Example 131 | — | — | EA method | 100 | 0 | 19 | C |
| Comparative Example 132 | — | — | EA method | 100 | 0 | 21 | C |
| Comparative Example 133 | — | — | EA method | 100 | 0 | 22 | C |
| Comparative Example 134 | — | — | EA method | 100 | 0 | 22 | C |
| Comparative Example 135 | — | — | EA method | 100 | 0 | 21 | C |
| Comparative Example 136 | — | — | EA method | 100 | 0 | 27 | C |
| Comparative Example 137 | — | — | EA method | 100 | 0 | 26 | C |
| Comparative Example 138 | — | — | EA method | 100 | 0 | 23 | C |
| Comparative Example 139 | — | — | EA method | 100 | 0 | 48 | C |
| Comparative Example 140 | — | — | EA method | 100 | 0 | 50 | C |
| Comparative Example 141 | — | — | EA method | 100 | 0 | 44 | C |
| Comparative Example 142 | — | — | EA method | 100 | 0 | 56 | C |
| Comparative Example 143 | — | — | EA method | 100 | 0 | 25 | C |
| Comparative Example 144 | — | — | EA method | 100 | 0 | 23 | C |
| Comparative Example 145 | — | — | EA method | 100 | 0 | 24 | C |
| Comparative Example 146 | — | — | EA method | 100 | 0 | 27 | C |
| Comparative Example 147 | — | — | EA method | 100 | 0 | 26 | C |

<Judgment>
AA: Excellent,
A: Good,
C: Poor

As shown in Tables 66 to 71, it was confirmed that: the polymer of an episulfide compound whose phosphorus atom content was 1 to 14000 ppm according to the present embodiment was less discolored even when exposed to light similar to sunlight for a long period; and stability against the light was high.

Example 708

Preparation of Boron Trihalide-Ether Compound (BF3-MECC-1)

(1) Preparation: A water bath equipped with an immersion cooling and heating unit was placed on a magnetic stirrer, and water and a stirring bar were put therein. The immersion cooling and heating unit was activated, and the temperature of water was set to 20° C.
(2) A reaction container filled with nitrogen gas was placed in the water bath of (1), and 24% by mass of 1,4-dioxane and 76% by mass of a boron trifluoride-diethyl ether complex were added to the reaction container and stirred for 1 hour.
(3) A vacuum distillation apparatus was attached to the reaction container, and the pressure was gradually reduced, finally reduced to 2 kPa, and maintained for 4 hours.
(4) Analysis by $^{11}$B-NMR was conducted using the one obtained in (3) above to thereby confirm that a complex was formed.

<Preparation and Polymerization of Composition>

(5) Preparation was performed by procedures similar to (1) above.
(6) A reaction container filled with nitrogen gas was placed in the water bath of (5), and each starting material was added to the reaction container according to the compositional ratio of Table 72 and stirred to thereby prepare a composition.
(7) The composition prepared in (6) above was polymerized according to the polymerization conditions of Table 77 to thereby obtain a polymer.

In this context, the mixing index γ was calculated according to the following formula (19):

$$\text{Index } \gamma = \alpha d/\alpha t \times 100 \qquad (19)$$

wherein
αd: molar number (mol) of the chain transfer agent
αt: molar number (mol) of episulfide group(s) contained in the episulfide compound (C)
(8) The rate of episulfide group reaction of the polymer obtained in (7) above was measured by the method of Table 77 to confirm that an episulfide group in the starting episulfide compound was polymerized.

<Thermal Stability Evaluation of Polymer (Hereinafter, Referred to as a "RA Method"): The Case where the Starting Episulfide Compound of the Polymer has One Episulfide Group>

(9) The polymer obtained in (7) above was put in a vacuum dryer (manufactured by Tokyo RikaKikai Co., Ltd., VOS-451D; Small Oil Rotary Vacuum Pump GCD-201X manufactured by ULVAC KIKO, Inc. was used as a vacuum pump) and dried at 50° C. at 13 Pa for 24 hours.
(10) The polymer obtained in (9) above was transferred to a dried container made of glass, and the weight of the polymer was measured (hereinafter, referred to as "RGWS").
(11) The polymer was put in an incubator (manufactured by Espec Corp., IPHH-202), which was then filled with nitrogen gas, then the internal temperature was set to 180° C., and the polymer was preserved for 1000 hours.
(12) The weight of the polymer obtained in (11) above was measured (hereinafter, referred to as "RGWF").
(13) A change in the weight of the polymer (hereinafter, referred to as "RGW") was calculated according to the following formula:

$$\text{RGW } (\%) = 100 - \text{RGWF}/\text{RGWS} \times 100$$

(14) The thermal stability was judged as being good ("A") in the case where RGW was 5% or less, judged as being excellent ("AA") in the case of 2% or less, and judged as being poor ("C") in the case other than these. In the present Example, the thermal stability was judged as being excellent because RGW was 1%.

<Thermal Stability Evaluation of Polymer (Hereinafter, Referred to as a "RB Method"): The Case where the Starting Episulfide Compound of the Polymer has Two or More Episulfide Groups>

The RB method was performed similarly to the TA method except that the internal temperature of the incubator was set to 250° C.

Examples 709 to 860

Polymers were obtained by a method similar to Example 708 except that the compositional ratios of Tables 72 to 76 and the polymerization conditions of Tables 77 to 81 were used. The evaluation results of the polymers obtained in Examples 709 to 860 are shown in Tables 77 to 81.

In Examples 738 to 744, 751 to 765, 772 to 786, and 793 to 800, the polymers were prepared in sealed pressure-resistant bottles.

Example 861

In the preparation of the boron trihalide-trivalent phosphorus compound (BF3-3PCR-1), a method similar to Example 708 was performed except that 72% by mass of tri-n-octylphosphine and 28% by mass of a boron trifluoride-diethyl ether complex were used and the compositional ratio of Table 82 and the polymerization conditions of Table 87 were used.

Examples 862 to 1013

Polymers were obtained by a method similar to Example 708 except that the compositional ratios of Tables 82 to 86 and the polymerization conditions of Tables 87 to 91 were used. The evaluation results of the polymers obtained in Examples 862 to 1013 are shown in Tables 87 to 91.

In Examples 891 to 897, 904 to 918, 925 to 939, and 946 to 953, the polymers were prepared in sealed pressure-resistant bottles.

Example 1014

In the preparation of the boron trihalide-ketone compound (BF3-MKCJ-1), a method similar to Example 708 was performed except that 41% by mass of cyclohexanone and 59% by mass of a boron trifluoride-diethyl ether complex were used and the compositional ratio of Table 92 and the polymerization conditions of Table 97 were used.

Examples 1015 to 1166

Polymers were obtained by a method similar to Example 708 except that the compositional ratios of Tables 92 to 96 and the polymerization conditions of Tables 97 to 101 were used. The evaluation results of the polymers obtained in Examples 1015 to 1166 are shown in Tables 97 to 101.

In Examples 1044 to 1050, 1057 to 1071, 1078 to 1092, and 1099 to 1106, the polymers were prepared in sealed pressure-resistant bottles.

TABLE 72

| | Boron trihalide-ether compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 708 | BF3-MECC-1 | 0.07 | EPI-14 | 99.49 | — | — | CTRA | 0.44 |
| Example 709 | BF3-MECC-1 | 0.06 | EPI-14 | 95.67 | — | — | CTRB | 4.27 |
| Example 710 | BF3-MECC-1 | 0.07 | EPI-14 | 97.75 | — | — | CTRB | 2.18 |
| Example 711 | BF3-MECC-1 | 0.07 | EPI-14 | 99.05 | — | — | CTRB | 0.88 |
| Example 712 | BF3-MECC-1 | 0.07 | EPI-14 | 99.49 | — | — | CTRB | 0.44 |
| Example 713 | BF3-MECC-1 | 0.07 | EPI-14 | 99.89 | — | — | CTRB | 0.04 |
| Example 714 | BF3-MECC-1 | 0.07 | EPI-14 | 99.91 | — | — | CTRB | 0.02 |
| Example 715 | BF3-MECC-1 | 0.07 | EPI-14 | 99.93 | — | — | CTRB | 0.00 |
| Example 716 | BF3-MECC-1 | 0.07 | EPI-14 | 99.56 | — | — | CTRC | 0.37 |
| Example 717 | BF3-MECC-1 | 0.07 | EPI-14 | 99.48 | — | — | CTRD | 0.46 |
| Example 718 | BF3-MECC-1 | 0.07 | EPI-14 | 99.39 | — | — | CTRE | 0.54 |
| Example 719 | BF3-MECC-1 | 0.06 | EPI-14 | 95.02 | — | — | CTRF | 4.92 |
| Example 720 | BF3-MECC-1 | 0.07 | EPI-14 | 97.41 | — | — | CTRF | 2.52 |
| Example 721 | BF3-MECC-1 | 0.07 | EPI-14 | 98.91 | — | — | CTRF | 1.02 |
| Example 722 | BF3-MECC-1 | 0.07 | EPI-14 | 99.42 | — | — | CTRF | 0.51 |
| Example 723 | BF3-MECC-1 | 0.07 | EPI-14 | 99.88 | — | — | CTRF | 0.05 |
| Example 724 | BF3-MECC-1 | 0.07 | EPI-14 | 99.91 | — | — | CTRF | 0.03 |
| Example 725 | BF3-MECC-1 | 0.07 | EPI-14 | 99.93 | — | — | CTRF | 0.01 |
| Example 726 | BF3-MECC-1 | 0.07 | EPI-14 | 99.33 | — | — | CTRG | 0.60 |
| Example 727 | BF3-MECC-1 | 0.06 | EPI-14 | 94.91 | — | — | CTRH | 5.03 |
| Example 728 | BF3-MECC-1 | 0.07 | EPI-14 | 97.36 | — | — | CTRH | 2.58 |
| Example 729 | BF3-MECC-1 | 0.07 | EPI-14 | 98.89 | — | — | CTRH | 1.05 |
| Example 730 | BF3-MECC-1 | 0.07 | EPI-14 | 99.41 | — | — | CTRH | 0.53 |
| Example 731 | BF3-MECC-1 | 0.07 | EPI-14 | 99.88 | — | — | CTRH | 0.05 |
| Example 732 | BF3-MECC-1 | 0.07 | EPI-14 | 99.91 | — | — | CTRH | 0.03 |
| Example 733 | BF3-MECC-1 | 0.07 | EPI-14 | 99.93 | — | — | CTRH | 0.01 |
| Example 734 | BF3-MECC-1 | 0.07 | EPI-14 | 99.32 | — | — | CTRI | 0.61 |
| Example 735 | BF3-MECC-1 | 0.07 | EPI-14 | 99.32 | — | — | CTRJ | 0.61 |
| Example 736 | BF3-MECC-1 | 0.07 | EPI-14 | 98.61 | — | — | CTRK | 1.32 |
| Example 737 | BF3-MECC-1 | 0.07 | EPI-14 | 98.18 | — | — | CTRL | 1.75 |
| Example 738 | BF3-MECC-1 | 0.2 | EPI-1 | 98.6 | — | — | CTRB | 1.2 |
| Example 739 | BF3-MECC-1 | 0.1 | EPI-2 | 98.9 | — | — | CTRB | 1.0 |
| Example 740 | BF3-MECC-1 | 0.1 | EPI-3 | 99.0 | — | — | CTRB | 0.8 |
| Example 741 | BF3-MECC-1 | 0.1 | EPI-4 | 99.2 | — | — | CTRB | 0.7 |
| Example 742 | BF3-MECC-1 | 0.1 | EPI-5 | 99.3 | — | — | CTRB | 0.6 |
| Example 743 | BF3-MECC-1 | 0.09 | EPI-6 | 99.35 | — | — | CTRB | 0.57 |

TABLE 73

| | Boron trihalide-ether compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 744 | BF3-MECC-1 | 0.08 | EPI-7 | 99.41 | — | — | CTRB | 0.51 |
| Example 745 | BF3-MECC-1 | 0.06 | EPI-8 | 99.51 | — | — | CTRB | 0.43 |
| Example 746 | BF3-MECC-1 | 0.06 | EPI-9 | 99.58 | — | — | CTRB | 0.37 |
| Example 747 | BF3-MECC-1 | 0.05 | EPI-10 | 99.63 | — | — | CTRB | 0.32 |
| Example 748 | BF3-MECC-1 | 0.04 | EPI-11 | 99.67 | — | — | CTRB | 0.29 |
| Example 749 | BF3-MECC-1 | 0.04 | EPI-12 | 99.70 | — | — | CTRB | 0.26 |
| Example 750 | BF3-MECC-1 | 0.04 | EPI-13 | 99.73 | — | — | CTRB | 0.24 |
| Example 751 | BF3-MECC-1 | 0.1 | EPI-20 | 99.2 | — | — | CTRB | 0.7 |
| Example 752 | BF3-MECC-1 | 0.1 | EPI-21 | 99.3 | — | — | CTRB | 0.6 |
| Example 753 | BF3-MECC-1 | 0.09 | EPI-22 | 99.34 | — | — | CTRB | 0.57 |
| Example 754 | BF3-MECC-1 | 0.08 | EPI-23 | 99.40 | — | — | CTRB | 0.52 |
| Example 755 | BF3-MECC-1 | 0.1 | EPI-30 | 99.0 | — | — | CTRB | 0.9 |
| Example 756 | BF3-MECC-1 | 0.1 | EPI-31 | 99.3 | — | — | CTRB | 0.6 |
| Example 757 | BF3-MECC-1 | 0.09 | EPI-32 | 99.35 | — | — | CTRB | 0.57 |
| Example 758 | BF3-MECC-1 | 0.08 | EPI-34 | 99.40 | — | — | CTRB | 0.53 |
| Example 759 | BF3-MECC-1 | 0.2 | EPI-1 | 98.4 | — | — | CTRF | 1.4 |
| Example 760 | BF3-MECC-1 | 0.1 | EPI-2 | 98.7 | — | — | CTRF | 1.1 |
| Example 761 | BF3-MECC-1 | 0.1 | EPI-3 | 98.9 | — | — | CTRF | 1.0 |
| Example 762 | BF3-MECC-1 | 0.1 | EPI-4 | 99.1 | — | — | CTRF | 0.8 |
| Example 763 | BF3-MECC-1 | 0.1 | EPI-5 | 99.2 | — | — | CTRF | 0.7 |
| Example 764 | BF3-MECC-1 | 0.09 | EPI-6 | 99.26 | — | — | CTRF | 0.66 |
| Example 765 | BF3-MECC-1 | 0.08 | EPI-7 | 99.33 | — | — | CTRF | 0.59 |
| Example 766 | BF3-MECC-1 | 0.06 | EPI-8 | 99.44 | — | — | CTRF | 0.50 |
| Example 767 | BF3-MECC-1 | 0.06 | EPI-9 | 99.52 | — | — | CTRF | 0.43 |
| Example 768 | BF3-MECC-1 | 0.05 | EPI-10 | 99.58 | — | — | CTRF | 0.38 |
| Example 769 | BF3-MECC-1 | 0.04 | EPI-11 | 99.62 | — | — | CTRF | 0.33 |
| Example 770 | BF3-MECC-1 | 0.04 | EPI-12 | 99.66 | — | — | CTRF | 0.30 |
| Example 771 | BF3-MECC-1 | 0.04 | EPI-13 | 99.69 | — | — | CTRF | 0.27 |
| Example 772 | BF3-MECC-1 | 0.1 | EPI-20 | 99.0 | — | — | CTRF | 0.9 |
| Example 773 | BF3-MECC-1 | 0.1 | EPI-21 | 99.2 | — | — | CTRF | 0.7 |
| Example 774 | BF3-MECC-1 | 0.09 | EPI-22 | 99.25 | — | — | CTRF | 0.67 |
| Example 775 | BF3-MECC-1 | 0.08 | EPI-23 | 99.32 | — | — | CTRF | 0.60 |
| Example 776 | BF3-MECC-1 | 0.1 | EPI-30 | 98.9 | — | — | CTRF | 1.0 |
| Example 777 | BF3-MECC-1 | 0.1 | EPI-31 | 99.2 | — | — | CTRF | 0.7 |
| Example 778 | BF3-MECC-1 | 0.09 | EPI-32 | 99.26 | — | — | CTRF | 0.66 |
| Example 779 | BF3-MECC-1 | 0.08 | EPI-34 | 99.31 | — | — | CTRF | 0.61 |

TABLE 74

| | Boron trihalide-ether compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 780 | BF3-MECC-1 | 0.2 | EPI-1 | 98.4 | — | — | CTRH | 1.4 |
| Example 781 | BF3-MECC-1 | 0.1 | EPI-2 | 98.7 | — | — | CTRH | 1.2 |
| Example 782 | BF3-MECC-1 | 0.1 | EPI-3 | 98.9 | — | — | CTRH | 1.0 |
| Example 783 | BF3-MECC-1 | 0.1 | EPI-4 | 99.0 | — | — | CTRH | 0.9 |
| Example 784 | BF3-MECC-1 | 0.1 | EPI-5 | 99.2 | — | — | CTRH | 0.8 |
| Example 785 | BF3-MECC-1 | 0.09 | EPI-6 | 99.24 | — | — | CTRH | 0.67 |
| Example 786 | BF3-MECC-1 | 0.08 | EPI-7 | 99.32 | — | — | CTRH | 0.61 |
| Example 787 | BF3-MECC-1 | 0.06 | EPI-8 | 99.43 | — | — | CTRH | 0.51 |
| Example 788 | BF3-MECC-1 | 0.06 | EPI-9 | 99.51 | — | — | CTRH | 0.44 |
| Example 789 | BF3-MECC-1 | 0.05 | EPI-10 | 99.57 | — | — | CTRH | 0.38 |
| Example 790 | BF3-MECC-1 | 0.04 | EPI-11 | 99.61 | — | — | CTRH | 0.34 |
| Example 791 | BF3-MECC-1 | 0.04 | EPI-12 | 99.65 | — | — | CTRH | 0.31 |
| Example 792 | BF3-MECC-1 | 0.04 | EPI-13 | 99.68 | — | — | CTRH | 0.28 |
| Example 793 | BF3-MECC-1 | 0.1 | EPI-20 | 99.0 | — | — | CTRH | 0.9 |
| Example 794 | BF3-MECC-1 | 0.1 | EPI-21 | 99.1 | — | — | CTRH | 0.8 |
| Example 795 | BF3-MECC-1 | 0.09 | EPI-22 | 99.23 | — | — | CTRH | 0.68 |
| Example 796 | BF3-MECC-1 | 0.08 | EPI-23 | 99.31 | — | — | CTRH | 0.61 |
| Example 797 | BF3-MECC-1 | 0.1 | EPI-30 | 98.9 | — | — | CTRH | 1.0 |
| Example 798 | BF3-MECC-1 | 0.1 | EPI-31 | 99.1 | — | — | CTRH | 0.8 |
| Example 799 | BF3-MECC-1 | 0.09 | EPI-32 | 99.24 | — | — | CTRH | 0.67 |
| Example 800 | BF3-MECC-1 | 0.08 | EPI-34 | 99.30 | — | — | CTRH | 0.62 |
| Example 801 | BF3-MECC-1 | 0.4 | EPI-16 | 99.3 | — | — | CTRA | 0.3 |
| Example 802 | BF3-MECC-1 | 0.4 | EPI-16 | 96.4 | — | — | CTRB | 3.2 |
| Example 803 | BF3-MECC-1 | 0.4 | EPI-16 | 98.0 | — | — | CTRB | 1.6 |
| Example 804 | BF3-MECC-1 | 0.4 | EPI-16 | 98.9 | — | — | CTRB | 0.7 |
| Example 805 | BF3-MECC-1 | 0.4 | EPI-16 | 99.3 | — | — | CTRB | 0.3 |
| Example 806 | BF3-MECC-1 | 0.40 | EPI-16 | 99.56 | — | — | CTRB | 0.03 |
| Example 807 | BF3-MECC-1 | 0.40 | EPI-16 | 99.58 | — | — | CTRB | 0.02 |

TABLE 74-continued

| | Boron trihalide-ether compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 808 | BF3-MECC-1 | 0.403 | EPI-16 | 99.593 | — | — | CTRB | 0.003 |
| Example 809 | BF3-MECC-1 | 0.4 | EPI-16 | 99.3 | — | — | CTRC | 0.3 |
| Example 810 | BF3-MECC-1 | 0.4 | EPI-16 | 99.3 | — | — | CTRD | 0.3 |
| Example 811 | BF3-MECC-1 | 0.4 | EPI-16 | 99.2 | — | — | CTRE | 0.4 |
| Example 812 | BF3-MECC-1 | 0.4 | EPI-16 | 95.9 | — | — | CTRF | 3.7 |
| Example 813 | BF3-MECC-1 | 0.4 | EPI-16 | 97.7 | — | — | CTRF | 1.9 |
| Example 814 | BF3-MECC-1 | 0.4 | EPI-16 | 98.8 | — | — | CTRF | 0.8 |
| Example 815 | BF3-MECC-1 | 0.4 | EPI-16 | 99.2 | — | — | CTRF | 0.4 |

TABLE 75

| | Boron trihalide-ether compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 816 | BF3-MECC-1 | 0.40 | EPI-16 | 99.56 | — | — | CTRF | 0.04 |
| Example 817 | BF3-MECC-1 | 0.40 | EPI-16 | 99.58 | — | — | CTRF | 0.02 |
| Example 818 | BF3-MECC-1 | 0.403 | EPI-16 | 99.593 | — | — | CTRF | 0.004 |
| Example 819 | BF3-MECC-1 | 0.4 | EPI-16 | 99.1 | — | — | CTRG | 0.4 |
| Example 820 | BF3-MECC-1 | 0.4 | EPI-16 | 95.8 | — | — | CTRH | 3.8 |
| Example 821 | BF3-MECC-1 | 0.4 | EPI-16 | 97.7 | — | — | CTRH | 1.9 |
| Example 822 | BF3-MECC-1 | 0.4 | EPI-16 | 98.8 | — | — | CTRH | 0.8 |
| Example 823 | BF3-MECC-1 | 0.4 | EPI-16 | 99.2 | — | — | CTRH | 0.4 |
| Example 824 | BF3-MECC-1 | 0.40 | EPI-16 | 99.56 | — | — | CTRH | 0.04 |
| Example 825 | BF3-MECC-1 | 0.40 | EPI-16 | 99.58 | — | — | CTRH | 0.02 |
| Example 826 | BF3-MECC-1 | 0.403 | EPI-16 | 99.593 | — | — | CTRH | 0.004 |
| Example 827 | BF3-MECC-1 | 0.4 | EPI-16 | 99.1 | — | — | CTRI | 0.5 |
| Example 828 | BF3-MECC-1 | 0.4 | EPI-16 | 99.1 | — | — | CTRJ | 0.5 |
| Example 829 | BF3-MECC-1 | 0.4 | EPI-16 | 98.6 | — | — | CTRK | 1.0 |
| Example 830 | BF3-MECC-1 | 0.4 | EPI-16 | 98.3 | — | — | CTRL | 1.3 |
| Example 831 | BF3-MECC-1 | 0.2 | EPI-15 | 49.8 | DCM | 49.8 | CTRB | 0.2 |
| Example 832 | BF3-MECC-1 | 0.2 | EPI-17 | 99.7 | — | — | CTRB | 0.1 |
| Example 833 | BF3-MECC-1 | 0.08 | EPI-18 | 49.93 | DCM | 49.93 | CTRB | 0.06 |
| Example 834 | BF3-MECC-1 | 0.07 | EPI-19 | 49.94 | DCM | 49.94 | CTRB | 0.06 |
| Example 835 | BF3-MECC-1 | 0.3 | EPI-24 | 49.7 | DCM | 49.7 | CTRB | 0.3 |
| Example 836 | BF3-MECC-1 | 0.8 | EPI-25 | 98.5 | — | — | CTRB | 0.7 |
| Example 837 | BF3-MECC-1 | 0.4 | EPI-26 | 99.2 | — | — | CTRB | 0.4 |
| Example 838 | BF3-MECC-1 | 0.4 | EPI-27 | 99.2 | — | — | CTRB | 0.4 |
| Example 839 | BF3-MECC-1 | 0.5 | EPI-28 | 99.1 | — | — | CTRB | 0.4 |
| Example 840 | BF3-MECC-1 | 0.4 | EPI-29 | 99.2 | — | — | CTRB | 0.4 |
| Example 841 | BF3-MECC-1 | 0.2 | EPI-15 | 49.8 | DCM | 49.8 | CTRF | 0.2 |
| Example 842 | BF3-MECC-1 | 0.2 | EPI-17 | 99.6 | — | — | CTRF | 0.2 |
| Example 843 | BF3-MECC-1 | 0.08 | EPI-18 | 49.92 | DCM | 49.92 | CTRF | 0.07 |
| Example 844 | BF3-MECC-1 | 0.07 | EPI-19 | 49.93 | DCM | 49.93 | CTRF | 0.06 |
| Example 845 | BF3-MECC-1 | 0.3 | EPI-24 | 49.7 | DCM | 49.7 | CTRF | 0.3 |
| Example 846 | BF3-MECC-1 | 0.8 | EPI-25 | 98.4 | — | — | CTRF | 0.8 |
| Example 847 | BF3-MECC-1 | 0.4 | EPI-26 | 99.1 | — | — | CTRF | 0.4 |
| Example 848 | BF3-MECC-1 | 0.4 | EPI-27 | 99.2 | — | — | CTRF | 0.4 |
| Example 849 | BF3-MECC-1 | 0.5 | EPI-28 | 99.1 | — | — | CTRF | 0.4 |
| Example 850 | BF3-MECC-1 | 0.4 | EPI-29 | 99.1 | — | — | CTRF | 0.4 |
| Example 851 | BF3-MECC-1 | 0.2 | EPI-15 | 49.8 | DCM | 49.8 | CTRH | 0.2 |

TABLE 76

| | Boron trihalide-ether compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 852 | BF3-MECC-1 | 0.2 | EPI-17 | 99.6 | — | — | CTRH | 0.2 |
| Example 853 | BF3-MECC-1 | 0.08 | EPI-18 | 49.92 | DCM | 49.92 | CTRH | 0.08 |
| Example 854 | BF3-MECC-1 | 0.07 | EPI-19 | 49.93 | DCM | 49.93 | CTRH | 0.07 |
| Example 855 | BF3-MECC-1 | 0.3 | EPI-24 | 49.7 | DCM | 49.7 | CTRH | 0.3 |
| Example 856 | BF3-MECC-1 | 0.8 | EPI-25 | 98.4 | — | — | CTRH | 0.8 |
| Example 857 | BF3-MECC-1 | 0.4 | EPI-26 | 99.1 | — | — | CTRH | 0.4 |
| Example 858 | BF3-MECC-1 | 0.4 | EPI-27 | 99.2 | — | — | CTRH | 0.4 |
| Example 859 | BF3-MECC-1 | 0.5 | EPI-28 | 99.1 | — | — | CTRH | 0.5 |
| Example 860 | BF3-MECC-1 | 0.4 | EPI-29 | 99.1 | — | — | CTRH | 0.4 |

TABLE 77

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 708 | 166 | 1 | 0.1 | 1 | 70 | 4 | EA method | 100 | RA method | 1 | AA |
| Example 709 | 166 | 1 | 0.1 | 10 | 70 | 4 | EA method | 98 | RA method | 5 | A |
| Example 710 | 166 | 1 | 0.1 | 5 | 70 | 4 | EA method | 99 | RA method | 3 | A |
| Example 711 | 166 | 1 | 0.1 | 2 | 70 | 4 | EA method | 100 | RA method | 2 | AA |
| Example 712 | 166 | 1 | 0.1 | 1 | 70 | 4 | EA method | 100 | RA method | 1 | AA |
| Example 713 | 166 | 1 | 0.1 | 0.10 | 70 | 4 | EA method | 100 | RA method | 1 | AA |
| Example 714 | 166 | 1 | 0.1 | 0.05 | 70 | 4 | EA method | 100 | RA method | 3 | A |
| Example 715 | 166 | 1 | 0.1 | 0.01 | 70 | 4 | EA method | 100 | RA method | 4 | A |
| Example 716 | 166 | 1 | 0.1 | 1 | 70 | 4 | EA method | 100 | RA method | 1 | AA |
| Example 717 | 166 | 1 | 0.1 | 1 | 70 | 4 | EA method | 100 | RA method | 1 | AA |
| Example 718 | 166 | 1 | 0.1 | 1 | 70 | 4 | EA method | 100 | RA method | 1 | AA |
| Example 719 | 166 | 1 | 0.1 | 10 | 70 | 4 | EA method | 92 | RA method | 5 | A |
| Example 720 | 166 | 1 | 0.1 | 5 | 70 | 4 | EA method | 95 | RA method | 4 | A |
| Example 721 | 166 | 1 | 0.1 | 2 | 70 | 4 | EA method | 98 | RA method | 2 | AA |
| Example 722 | 166 | 1 | 0.1 | 1 | 70 | 4 | EA method | 100 | RA method | 1 | AA |
| Example 723 | 166 | 1 | 0.1 | 0.1 | 70 | 4 | EA method | 100 | RA method | 1 | AA |
| Example 724 | 166 | 1 | 0.1 | 0.05 | 70 | 4 | EA method | 100 | RA method | 3 | A |
| Example 725 | 166 | 1 | 0.1 | 0.01 | 70 | 4 | EA method | 100 | RA method | 4 | A |
| Example 726 | 166 | 1 | 0.1 | 1 | 70 | 4 | EA method | 100 | RA method | 1 | AA |
| Example 727 | 166 | 1 | 0.1 | 10 | 70 | 4 | EA method | 93 | RA method | 4 | A |
| Example 728 | 166 | 1 | 0.1 | 5 | 70 | 4 | EA method | 96 | RA method | 3 | A |
| Example 729 | 166 | 1 | 0.1 | 2 | 70 | 4 | EA method | 99 | RA method | 2 | AA |
| Example 730 | 166 | 1 | 0.1 | 1 | 70 | 4 | EA method | 100 | RA method | 1 | AA |
| Example 731 | 166 | 1 | 0.1 | 0.1 | 70 | 4 | EA method | 100 | RA method | 1 | AA |
| Example 732 | 166 | 1 | 0.1 | 0.05 | 70 | 4 | EA method | 100 | RA method | 3 | A |
| Example 733 | 166 | 1 | 0.1 | 0.01 | 70 | 4 | EA method | 100 | RA method | 4 | A |
| Example 734 | 166 | 1 | 0.1 | 1 | 70 | 4 | EA method | 100 | RA method | 1 | AA |
| Example 735 | 166 | 1 | 0.1 | 1 | 70 | 4 | EA method | 100 | RA method | 1 | AA |
| Example 736 | 166 | 1 | 0.1 | 1 | 70 | 4 | EA method | 100 | RA method | 1 | AA |
| Example 737 | 166 | 1 | 0.1 | 1 | 70 | 4 | EA method | 100 | RA method | 1 | AA |
| Example 738 | 60 | 1 | 0.1 | 1 | 70 | 4 | EA method | 100 | RA method | 1 | AA |
| Example 739 | 74 | 1 | 0.1 | 1 | 70 | 4 | EA method | 100 | RA method | 1 | AA |
| Example 740 | 88 | 1 | 0.1 | 1 | 70 | 4 | EA method | 100 | RA method | 1 | AA |
| Example 741 | 102 | 1 | 0.1 | 1 | 70 | 4 | EA method | 100 | RA method | 1 | AA |
| Example 742 | 116 | 1 | 0.1 | 1 | 70 | 4 | EA method | 100 | RA method | 1 | AA |
| Example 743 | 130 | 1 | 0.1 | 1 | 70 | 4 | EA method | 100 | RA method | 1 | AA |

<Judgment>
AA. Excellent,
A: Good,
C: Poor

TABLE 78

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 744 | 144 | 1 | 0.1 | 1 | 70 | 4 | EA method | 100 | RA method | 1 | AA |
| Example 745 | 172 | 1 | 0.1 | 1 | 70 | 4 | EA method | 100 | RA method | 1 | AA |
| Example 746 | 200 | 1 | 0.1 | 1 | 80 | 4 | EA method | 100 | RA method | 1 | AA |
| Example 747 | 228 | 1 | 0.1 | 1 | 80 | 4 | EA method | 100 | RA method | 1 | AA |
| Example 748 | 256 | 1 | 0.1 | 1 | 80 | 4 | EA method | 100 | RA method | 1 | AA |
| Example 749 | 285 | 1 | 0.1 | 1 | 80 | 4 | EA method | 100 | RA method | 1 | AA |
| Example 750 | 313 | 1 | 0.1 | 1 | 80 | 4 | EA method | 100 | RA method | 1 | AA |
| Example 751 | 100 | 1 | 0.1 | 1 | 70 | 4 | EA method | 100 | RA method | 1 | AA |
| Example 752 | 114 | 1 | 0.1 | 1 | 70 | 4 | EA method | 100 | RA method | 1 | AA |
| Example 753 | 128 | 1 | 0.1 | 1 | 70 | 4 | EA method | 100 | RA method | 1 | AA |
| Example 754 | 142 | 1 | 0.1 | 1 | 70 | 4 | EA method | 100 | RA; method | 1 | AA |
| Example 755 | 86 | 1 | 0.1 | 1 | 70 | 4 | EA method | 100 | RA method | 1 | AA |
| Example 756 | 114 | 1 | 0.1 | 1 | 70 | 4 | EA method | 100 | RA method | 1 | AA |
| Example 757 | 130 | 1 | 0.1 | 1 | 70 | 4 | EA method | 100 | RA method | 1 | AA |
| Example 758 | 140 | 1 | 0.1 | 1 | 70 | 4 | EA method | 100 | RA method | 1 | AA |
| Example 759 | 60 | 1 | 0.1 | 1 | 70 | 4 | EA method | 100 | RA method | 1 | AA |
| Example 760 | 74 | 1 | 0.1 | 1 | 70 | 4 | EA method | 100 | RA method | 1 | AA |
| Example 761 | 88 | 1 | 0.1 | 1 | 70 | 4 | EA method | 100 | RA method | 1 | AA |
| Example 762 | 102 | 1 | 0.1 | 1 | 70 | 4 | EA method | 100 | RA method | 1 | AA |
| Example 763 | 116 | 1 | 0.1 | 1 | 70 | 4 | EA method | 100 | RA method | 1 | AA |
| Example 764 | 130 | 1 | 0.1 | 1 | 70 | 4 | EA method | 100 | RA method | 1 | AA |
| Example 765 | 144 | 1 | 0.1 | 1 | 70 | 4 | EA method | 100 | RA method | 1 | AA |
| Example 766 | 172 | 1 | 0.1 | 1 | 70 | 4 | EA method | 100 | RA method | 1 | AA |
| Example 767 | 200 | 1 | 0.1 | 1 | 80 | 4 | EA method | 100 | RA method | 1 | AA |

TABLE 78-continued

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 768 | 228 | 1 | 0.1 | 1 | 80 | 4 | EA method | 100 | RA method | 1 | AA |
| Example 769 | 256 | 1 | 0.1 | 1 | 80 | 4 | EA method | 100 | RA method | 1 | AA |
| Example 770 | 285 | 1 | 0.1 | 1 | 80 | 4 | EA method | 100 | RA method | 1 | AA |
| Example 771 | 313 | 1 | 0.1 | 1 | 80 | 4 | EA method | 100 | RA method | 1 | AA |
| Example 772 | 100 | 1 | 0.1 | 1 | 70 | 4 | EA method | 100 | RA method | 1 | AA |
| Example 773 | 114 | 1 | 0.1 | 1 | 70 | 4 | EA method | 100 | RA method | 1 | AA |
| Example 774 | 128 | 1 | 0.1 | 1 | 70 | 4 | EA method | 100 | RA method | 1 | AA |
| Example 775 | 142 | 1 | 0.1 | 1 | 70 | 4 | EA method | 100 | RA method | 1 | AA |
| Example 776 | 86 | 1 | 0.1 | 1 | 70 | 4 | EA method | 100 | RA method | 1 | AA |
| Example 777 | 114 | 1 | 0.1 | 1 | 70 | 4 | EA method | 100 | RA method | 1 | AA |
| Example 778 | 130 | 1 | 0.1 | 1 | 70 | 4 | EA method | 100 | RA method | 1 | AA |
| Example 779 | 140 | 1 | 0.1 | 1 | 70 | 4 | EA method | 100 | RA method | 1 | AA |

<Judgment>
AA: Excellent,
A: Good,
C: Poor

TABLE 79

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 780 | 60 | 1 | 0.1 | 1 | 70 | 4 | EA method | 100 | RA method | 1 | AA |
| Example 781 | 74 | 1 | 0.1 | 1 | 70 | 4 | EA method | 100 | RA method | 1 | AA |
| Example 782 | 88 | 1 | 0.1 | 1 | 70 | 4 | EA method | 100 | RA method | 1 | AA |
| Example 783 | 102 | 1 | 0.1 | 1 | 70 | 4 | EA method | 100 | RA method | 1 | AA |
| Example 784 | 116 | 1 | 0.1 | 1 | 70 | 4 | EA method | 100 | RA method | 1 | AA |
| Example 785 | 130 | 1 | 0.1 | 1 | 70 | 4 | EA method | 100 | RA method | 1 | AA |
| Example 786 | 144 | 1 | 0.1 | 1 | 70 | 4 | EA method | 100 | RA method | 1 | AA |
| Example 787 | 172 | 1 | 0.1 | 1 | 70 | 4 | EA method | 100 | RA method | 1 | AA |
| Example 788 | 200 | 1 | 0.1 | 1 | 80 | 4 | EA method | 100 | RA method | 1 | AA |
| Example 789 | 228 | 1 | 0.1 | 1 | 80 | 4 | EA method | 100 | RA method | 1 | AA |
| Example 790 | 256 | 1 | 0.1 | 1 | 80 | 4 | EA method | 100 | RA method | 1 | AA |
| Example 791 | 285 | 1 | 0.1 | 1 | 80 | 4 | EA method | 100 | RA method | 1 | AA |
| Example 792 | 313 | 1 | 0.1 | 1 | 80 | 4 | EA method | 100 | RA method | 1 | AA |
| Example 793 | 100 | 1 | 0.1 | 1 | 70 | 4 | EA method | 100 | RA method | 1 | AA |
| Example 794 | 114 | 1 | 0.1 | 1 | 70 | 4 | EA method | 100 | RA method | 1 | AA |
| Example 795 | 128 | 1 | 0.1 | 1 | 70 | 4 | EA method | 100 | RA method | 1 | AA |
| Example 796 | 142 | 1 | 0.1 | 1 | 70 | 4 | EA method | 100 | RA method | 1 | AA |
| Example 797 | 86 | 1 | 0.1 | 1 | 70 | 4 | EA method | 100 | RA method | 1 | AA |
| Example 798 | 114 | 1 | 0.1 | 1 | 70 | 4 | EA method | 100 | RA method | 1 | AA |
| Example 799 | 130 | 1 | 0.1 | 1 | 70 | 4 | EA method | 100 | RA method | 1 | AA |
| Example 800 | 140 | 1 | 0.1 | 1 | 70 | 4 | EA method | 100 | RA method | 1 | AA |
| Example 801 | 221 | 1 | 0.8 | 1 | 100 | 6 | EB method | 100 | RB method | 1 | AA |
| Example 802 | 221 | 1 | 0.8 | 10 | 100 | 6 | EB method | 99 | RB method | 5 | A |
| Example 803 | 221 | 1 | 0.8 | 5 | 100 | 6 | EB method | 99 | RB method | 3 | A |
| Example 804 | 221 | 1 | 0.8 | 2 | 100 | 6 | EB method | 100 | RB method | 2 | AA |
| Example 805 | 221 | 1 | 0.8 | 1 | 100 | 6 | EB method | 100 | RB method | 1 | AA |
| Example 806 | 221 | 1 | 0.8 | 0.1 | 100 | 6 | EB method | 100 | RB method | 1 | AA |
| Example 807 | 221 | 1 | 0.8 | 0.05 | 100 | 6 | EB method | 100 | RB method | 3 | A |
| Example 808 | 221 | 1 | 0.8 | 0.01 | 100 | 6 | EB method | 100 | RB method | 4 | A |
| Example 809 | 221 | 1 | 0.8 | 1 | 100 | 6 | EB method | 100 | RB method | 1 | AA |
| Example 810 | 221 | 1 | 0.8 | 1 | 100 | 6 | EB method | 100 | RB method | 1 | AA |
| Example 811 | 221 | 1 | 0.8 | 1 | 100 | 6 | EB method | 100 | RB method | 1 | AA |
| Example 812 | 221 | 1 | 0.8 | 10 | 100 | 6 | EB method | 93 | RB method | 5 | A |
| Example 813 | 221 | 1 | 0.8 | 5 | 100 | 6 | EB method | 96 | RB method | 4 | A |
| Example 814 | 221 | 1 | 0.8 | 2 | 100 | 6 | EB method | 99 | RB method | 2 | AA |
| Example 815 | 221 | 1 | 0.8 | 1 | 100 | 6 | EB method | 100 | RB method | 1 | AA |

<Judgment>
AA: Excellent,
A: Good,
C: Poor

TABLE 80

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 816 | 221 | 1 | 0.8 | 0.1 | 100 | 6 | EB method | 100 | RB method | 1 | AA |
| Example 817 | 221 | 1 | 0.8 | 0.05 | 100 | 6 | EB method | 100 | RB method | 3 | A |
| Example 818 | 221 | 1 | 0.8 | 0.01 | 100 | 6 | EB method | 100 | RB method | 4 | A |
| Example 819 | 221 | 1 | 0.8 | 1 | 100 | 6 | EB method | 100 | RB method | 1 | AA |
| Example 820 | 221 | 1 | 0.8 | 10 | 100 | 6 | EB method | 93 | RB method | 4 | A |
| Example 821 | 221 | 1 | 0.8 | 5 | 100 | 6 | EB method | 96 | RB method | 3 | A |
| Example 822 | 221 | 1 | 0.8 | 2 | 100 | 6 | EB method | 98 | RB method | 2 | AA |
| Example 823 | 221 | 1 | 0.8 | 1 | 100 | 6 | EB method | 100 | RB method | 1 | AA |
| Example 824 | 221 | 1 | 0.8 | 0.1 | 100 | 6 | EB method | 100 | RB method | 1 | AA |
| Example 825 | 221 | 1 | 0.8 | 0.05 | 100 | 6 | EB method | 100 | RB method | 3 | A |
| Example 826 | 221 | 1 | 0.8 | 0.01 | 100 | 6 | EB method | 100 | RB method | 4 | A |
| Example 827 | 221 | 1 | 0.8 | 1 | 100 | 6 | EB method | 100 | RB method | 1 | AA |
| Example 828 | 221 | 1 | 0.8 | 1 | 100 | 6 | EB method | 100 | RB method | 1 | AA |
| Example 829 | 221 | 1 | 0.8 | 1 | 100 | 6 | EB method | 100 | RB method | 1 | AA |
| Example 830 | 221 | 1 | 0.8 | 1 | 100 | 6 | EB method | 100 | RB method | 1 | AA |
| Example 831 | 205 | 1 | 0.8 | 1 | 100 | 6 | EB method | 100 | RB method | 1 | AA |
| Example 832 | 498 | 1 | 0.8 | 1 | 100 | 6 | EB method | 100 | RB method | 1 | AA |
| Example 833 | 578 | 1 | 0.8 | 1 | 100 | 6 | EB method | 100 | RB method | 1 | AA |
| Example 834 | 671 | 1 | 0.8 | 1 | 100 | 6 | EB method | 100 | RB method | 1 | AA |
| Example 835 | 147 | 1 | 0.8 | 1 | 100 | 6 | EB method | 100 | RB method | 1 | AA |
| Example 836 | 107 | 1 | 0.8 | 1 | 100 | 6 | EB method | 100 | RB method | 1 | AA |
| Example 837 | 197 | 1 | 0.8 | 1 | 100 | 6 | EB method | 100 | RB method | 1 | AA |
| Example 838 | 207 | 1 | 0.8 | 1 | 100 | 6 | EB method | 100 | RB method | 1 | AA |
| Example 839 | 190 | 1 | 0.8 | 1 | 100 | 6 | EB method | 100 | RB method | 1 | AA |
| Example 840 | 200 | 1 | 0.8 | 1 | 100 | 6 | EB method | 100 | RB method | 1 | AA |
| Example 841 | 205 | 1 | 0.8 | 1 | 100 | 6 | EB method | 100 | RB method | 1 | AA |
| Example 842 | 498 | 1 | 0.8 | 1 | 100 | 6 | EB method | 100 | RB method | 1 | AA |
| Example 843 | 578 | 1 | 0.8 | 1 | 100 | 6 | EB method | 100 | RB method | 1 | AA |
| Example 844 | 671 | 1 | 0.8 | 1 | 100 | 6 | EB method | 100 | RB method | 1 | AA |
| Example 845 | 147 | 1 | 0.8 | 1 | 100 | 6 | EB method | 100 | RB method | 1 | AA |
| Example 846 | 107 | 1 | 0.8 | 1 | 100 | 6 | EB method | 100 | RB method | 1 | AA |
| Example 847 | 197 | 1 | 0.8 | 1 | 100 | 6 | EB method | 100 | RB method | 1 | AA |
| Example 848 | 207 | 1 | 0.8 | 1 | 100 | 6 | EB method | 100 | RB method | 1 | AA |
| Example 849 | 190 | 1 | 0.8 | 1 | 100 | 6 | EB method | 100 | RB method | 1 | AA |
| Example 850 | 200 | 1 | 0.8 | 1 | 100 | 6 | EB method | 100 | RB method | 1 | AA |
| Example 851 | 205 | 1 | 0.8 | 1 | 100 | 6 | EB method | 100 | RB method | 1 | AA |

<Judgment>
AA: Excellent,
A: Good,
C: Poor

TABLE 81

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 852 | 498 | 1 | 0.8 | 1 | 100 | 6 | EB method | 100 | RB method | 1 | AA |
| Example 853 | 578 | 1 | 0.8 | 1 | 100 | 6 | EB method | 100 | RB method | 1 | AA |
| Example 854 | 671 | 1 | 0.8 | 1 | 100 | 6 | EB method | 100 | RB method | 1 | AA |
| Example 855 | 147 | 1 | 0.8 | 1 | 100 | 6 | EB method | 100 | RB method | 1 | AA |
| Example 856 | 107 | 1 | 0.8 | 1 | 100 | 6 | EB method | 100 | RB method | 1 | AA |
| Example 857 | 197 | 1 | 0.8 | 1 | 100 | 6 | EB method | 100 | RB method | 1 | AA |
| Example 858 | 207 | 1 | 0.8 | 1 | 100 | 6 | EB method | 100 | RB method | 1 | AA |
| Example 859 | 190 | 1 | 0.8 | 1 | 100 | 6 | EB method | 100 | RB method | 1 | AA |
| Example 860 | 200 | 1 | 0.8 | 1 | 100 | 6 | EB method | 100 | RB method | 1 | AA |

<Judgment>
AA: Excellent,
A: Good,
C: Poor

TABLE 82

| | Boron trihalide-trivalent phosphorus compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 861 | BF3-3PCR-1 | 0.3 | EPI-14 | 99.3 | — | — | CTRA | 0.4 |
| Example 862 | BF3-3PCR-1 | 0.3 | EPI-14 | 95.5 | — | — | CTRB | 4.3 |
| Example 863 | BF3-3PCR-1 | 0.3 | EPI-14 | 97.6 | — | — | CTRB | 2.2 |
| Example 864 | BF3-3PCR-1 | 0.3 | EPI-14 | 98.9 | — | — | CTRB | 0.9 |
| Example 865 | BF3-3PCR-1 | 0.3 | EPI-14 | 99.3 | — | — | CTRB | 0.4 |
| Example 866 | BF3-3PCR-1 | 0.26 | EPI-14 | 99.69 | — | — | CTRB | 0.04 |
| Example 867 | BF3-3PCR-1 | 0.26 | EPI-14 | 99.71 | — | — | CTRB | 0.02 |
| Example 868 | BF3-3PCR-1 | 0.263 | EPI-14 | 99.733 | — | — | CTRB | 0.004 |
| Example 869 | BF3-3PCR-1 | 0.3 | EPI-14 | 99.4 | — | — | CTRC | 0.4 |
| Example 870 | BF3-3PCR-1 | 0.3 | EPI-14 | 99.3 | — | — | CTRD | 0.5 |
| Example 871 | BF3-3PCR-1 | 0.3 | EPI-14 | 99.2 | — | — | CTRE | 0.5 |
| Example 872 | BF3-3PCR-1 | 0.3 | EPI-14 | 94.8 | — | — | CTRF | 4.9 |
| Example 873 | BF3-3PCR-1 | 0.3 | EPI-14 | 97.2 | — | — | CTRF | 2.5 |
| Example 874 | BF3-3PCR-1 | 0.3 | EPI-14 | 98.7 | — | — | CTRF | 1.0 |
| Example 875 | BF3-3PCR-1 | 0.3 | EPI-14 | 99.2 | — | — | CTRF | 0.5 |
| Example 876 | BF3-3PCR-1 | 0.26 | EPI-14 | 99.69 | — | — | CTRF | 0.05 |
| Example 877 | BF3-3PCR-1 | 0.26 | EPI-14 | 99.71 | — | — | CTRF | 0.03 |
| Example 878 | BF3-3PCR-1 | 0.26 | EPI-14 | 99.73 | — | — | CTRF | 0.01 |
| Example 879 | BF3-3PCR-1 | 0.3 | EPI-14 | 99.1 | — | — | CTRG | 0.6 |
| Example 880 | BF3-3PCR-1 | 0.2 | EPI-14 | 94.7 | — | — | CTRH | 5.0 |
| Example 881 | BF3-3PCR-1 | 0.3 | EPI-14 | 97.2 | — | — | CTRH | 2.6 |
| Example 882 | BF3-3PCR-1 | 0.3 | EPI-14 | 98.7 | — | — | CTRH | 1.0 |
| Example 883 | BF3-3PCR-1 | 0.3 | EPI-14 | 99.2 | — | — | CTRH | 0.5 |
| Example 884 | BF3-3PCR-1 | 0.26 | EPI-14 | 99.68 | — | — | CTRH | 0.05 |
| Example 885 | BF3-3PCR-1 | 0.26 | EPI-14 | 99.71 | — | — | CTRH | 0.03 |
| Example 886 | BF3-3PCR-1 | 0.26 | EPI-14 | 99.73 | — | — | CTRH | 0.01 |
| Example 887 | BF3-3PCR-1 | 0.3 | EPI-14 | 99.1 | — | — | CTRI | 0.6 |
| Example 888 | BF3-3PCR-1 | 0.3 | EPI-14 | 99.1 | — | — | CTRJ | 0.6 |
| Example 889 | BF3-3PCR-1 | 0.3 | EPI-14 | 98.4 | — | — | CTRK | 1.3 |
| Example 890 | BF3-3PCR-1 | 0.3 | EPI-14 | 98.0 | — | — | CTRL | 1.7 |
| Example 891 | BF3-3PCR-1 | 0.7 | EPI-1 | 98.1 | — | — | CTRB | 1.2 |
| Example 892 | BF3-3PCR-1 | 0.6 | EPI-2 | 98.4 | — | — | CTRB | 1.0 |
| Example 893 | BF3-3PCR-1 | 0.5 | EPI-3 | 98.7 | — | — | CTRB | 0.8 |
| Example 894 | BF3-3PCR-1 | 0.4 | EPI-4 | 98.9 | — | — | CTRB | 0.7 |
| Example 895 | BF3-3PCR-1 | 0.4 | EPI-5 | 99.0 | — | — | CTRB | 0.6 |
| Example 896 | BF3-3PCR-1 | 0.3 | EPI-6 | 99.1 | — | — | CTRB | 0.6 |

TABLE 83

| | Boron trihalide-trivalent phosphorus compound | | Episultide compound | | Additive compound | | Chain transfer agent | |
|---|---|---|---|---|---|---|---|---|
| | Name | % by mass | Name | % by mass | Name | % by mass | Name | % by mass |
| Example 897 | BF3-3PCR-1 | 0.3 | EPI-7 | 99.2 | — | — | CTRB | 0.5 |
| Example 898 | BF3-3PCR-1 | 0.3 | EPI-8 | 99.3 | — | — | CTRB | 0.4 |
| Example 899 | BF3-3PCR-1 | 0.2 | EPI-9 | 99.4 | — | — | CTRB | 0.4 |
| Example 900 | BF3-3PCR-1 | 0.2 | EPI-10 | 99.5 | — | — | CTRB | 0.3 |
| Example 901 | BF3-3PCR-1 | 0.2 | EPI-11 | 99.5 | — | — | CTRB | 0.3 |
| Example 902 | BF3-3PCR-1 | 0.2 | EPI-12 | 99.6 | — | — | CTRB | 0.3 |
| Example 903 | BF3-3PCR-1 | 0.1 | EPI-13 | 99.6 | — | — | CTRB | 0.2 |
| Example 904 | BF3-3PCR-1 | 0.4 | EPI-20 | 98.8 | — | — | CTRB | 0.7 |
| Example 905 | BF3-3PCR-1 | 0.4 | EPI-21 | 99.0 | — | — | CTRB | 0.6 |
| Example 906 | BF3-3PCR-1 | 0.3 | EPI-22 | 99.1 | — | — | CTRB | 0.6 |
| Example 907 | BF3-3PCR-1 | 0.3 | EPI-23 | 99.2 | — | — | CTRB | 0.5 |
| Example 908 | BF3-3PCR-1 | 0.5 | EPI-30 | 98.6 | — | — | CTRB | 0.8 |
| Example 909 | BF3-3PCR-1 | 0.4 | EPI-31 | 99.0 | — | — | CTRB | 0.6 |
| Example 910 | BF3-3PCR-1 | 0.3 | EPI-32 | 99.1 | — | — | CTRB | 0.6 |
| Example 911 | BF3-3PCR-1 | 0.3 | EPI-34 | 99.2 | — | — | CTRB | 0.5 |
| Example 912 | BF3-3PCR-1 | 0.7 | EPI-1 | 97.9 | — | — | CTRF | 1.4 |
| Example 913 | BF3-3PCR-1 | 0.6 | EPI-2 | 98.3 | — | — | CTRF | 1.1 |
| Example 914 | BF3-3PCR-1 | 0.5 | EPI-3 | 98.5 | — | — | CTRF | 1.0 |
| Example 915 | BF3-3PCR-1 | 0.4 | EPI-4 | 98.7 | — | — | CTRF | 0.8 |
| Example 916 | BF3-3PCR-1 | 0.4 | EPI-5 | 98.9 | — | — | CTRF | 0.7 |
| Example 917 | BF3-3PCR-1 | 0.3 | EPI-6 | 99.0 | — | — | CTRF | 0.7 |
| Example 918 | BF3-3PCR-1 | 0.3 | EPI-7 | 99.1 | — | — | CTRF | 0.6 |
| Example 919 | BF3-3PCR-1 | 0.3 | EPI-8 | 99.3 | — | — | CTRF | 0.5 |
| Example 920 | BF3-3PCR-1 | 0.2 | EPI-9 | 99.4 | — | — | CTRF | 0.4 |
| Example 921 | BF3-3PCR-1 | 0.2 | EPI-10 | 99.4 | — | — | CTRF | 0.4 |
| Example 922 | BF3-3PCR-1 | 0.2 | EPI-11 | 99.5 | — | — | CTRF | 0.3 |

TABLE 83-continued

| | Boron trihalide-trivalent phosphorus compound | | Episultide compound | | Additive compound | | Chain transfer agent | |
|---|---|---|---|---|---|---|---|---|
| | Name | % by mass | Name | % by mass | Name | % by mass | Name | % by mass |
| Example 923 | BF3-3PCR-1 | 0.2 | EPI-12 | 99.5 | — | — | CTRF | 0.3 |
| Example 924 | BF3-3PCR-1 | 0.1 | EPI-13 | 99.6 | — | — | CTRF | 0.3 |
| Example 925 | BF3-3PCR-1 | 0.4 | EPI-20 | 98.7 | — | — | CTRF | 0.8 |
| Example 926 | BF3-3PCR-1 | 0.4 | EPI-21 | 98.9 | — | — | CTRF | 0.7 |
| Example 927 | BF3-3PCR-1 | 0.3 | EPI-22 | 99.0 | — | — | CTRF | 0.7 |
| Example 928 | BF3-3PCR-1 | 0.3 | EPI-23 | 99.1 | — | — | CTRF | 0.6 |
| Example 929 | BF3-3PCR-1 | 0.5 | EPI-30 | 98.5 | — | — | CTRF | 1.0 |
| Example 930 | BF3-3PCR-1 | 0.4 | EPI-31 | 98.9 | — | — | CTRF | 0.7 |
| Example 931 | BF3-3PCR-1 | 0.3 | EPI-32 | 99.0 | — | — | CTRF | 0.7 |
| Example 932 | BF3-3PCR-1 | 0.3 | EPI-34 | 99.1 | — | — | CTRF | 0.6 |

TABLE 84

| | Boron trihalide-trivalent phosphorus compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 933 | BF3-3PCR-1 | 0.7 | EPI-1 | 97.9 | — | — | CTRH | 1.4 |
| Example 934 | BF3-3PCR-1 | 0.6 | EPI-2 | 98.3 | — | — | CTRH | 1.2 |
| Example 935 | BF3-3PCR-1 | 0.5 | EPI-3 | 98.5 | — | — | CTRH | 1.0 |
| Example 936 | BF3-3PCR-1 | 0.4 | EPI-4 | 98.7 | — | — | CTRH | 0.9 |
| Example 937 | BF3-3PCR-1 | 0.4 | EPI-5 | 98.9 | — | — | CTRH | 0.7 |
| Example 938 | BF3-3PCR-1 | 0.3 | EPI-6 | 99.0 | — | — | CTRH | 0.7 |
| Example 939 | BF3-3PCR-1 | 0.3 | EPI-7 | 99.1 | — | — | CTRH | 0.6 |
| Example 940 | BF3-3PCR-1 | 0.3 | EPI-8 | 99.2 | — | — | CTRH | 0.5 |
| Example 941 | BF3-3PCR-1 | 0.2 | EPI-9 | 99.3 | — | — | CTRH | 0.4 |
| Example 942 | BF3-3PCR-1 | 0.2 | EPI-10 | 99.4 | — | — | CTRH | 0.4 |
| Example 943 | BF3-3PCR-1 | 0.2 | EPI-11 | 99.5 | — | — | CTRH | 0.3 |
| Example 944 | BF3-3PCR-1 | 0.2 | EPI-12 | 99.5 | — | — | CTRH | 0.3 |
| Example 945 | BF3-3PCR-1 | 0.1 | EPI-13 | 99.6 | — | — | CTRH | 0.3 |
| Example 946 | BF3-3PCR-1 | 0.4 | EPI-20 | 98.7 | — | — | CTRH | 0.9 |
| Example 947 | BF3-3PCR-1 | 0.4 | EPI-21 | 98.9 | — | — | CTRH | 0.8 |
| Example 948 | BF3-3PCR-1 | 0.3 | EPI-22 | 99.0 | — | — | CTRH | 0.7 |
| Example 949 | BF3-3PCR-1 | 0.3 | EPI-23 | 99.1 | — | — | CTRH | 0.6 |
| Example 950 | BF3-3PCR-1 | 0.5 | EPI-30 | 98.5 | — | — | CTRH | 1.0 |
| Example 951 | BF3-3PCR-1 | 0.4 | EPI-31 | 98.9 | — | — | CTRH | 0.8 |
| Example 952 | BF3-3PCR-1 | 0.3 | EPI-32 | 99.0 | — | — | CTRH | 0.7 |
| Example 953 | BF3-3PCR-1 | 0.3 | EPI-34 | 99.1 | — | — | CTRH | 0.6 |
| Example 954 | BF3-3PCR-1 | 1.6 | EPI-16 | 98.1 | — | — | CTRA | 0.3 |
| Example 955 | BF3-3PCR-1 | 2 | EPI-16 | 95 | — | — | CTRB | 3 |
| Example 956 | BF3-3PCR-1 | 2 | EPI-16 | 97 | — | — | CTRB | 2 |
| Example 957 | BF3-3PCR-1 | 1.6 | EPI-16 | 97.8 | — | — | CTRB | 0.7 |
| Example 958 | BF3-3PCR-1 | 1.6 | EPI-16 | 98.1 | — | — | CTRB | 0.3 |
| Example 959 | BF3-3PCR-1 | 1.56 | EPI-16 | 98.41 | — | — | CTRB | 0.03 |
| Example 960 | BF3-3PCR-1 | 1.56 | EPI-16 | 98.42 | — | — | CTRB | 0.02 |
| Example 961 | BF3-3PCR-1 | 1.562 | EPI-16 | 98.435 | — | — | CTRB | 0.003 |
| Example 962 | BF3-3PCR-1 | 1.6 | EPI-16 | 98.2 | — | — | CTRC | 0.3 |
| Example 963 | BF3-3PCR-1 | 1.6 | EPI-16 | 98.1 | — | — | CTRD | 0.3 |
| Example 964 | BF3-3PCR-1 | 1.6 | EPI-16 | 98.0 | — | — | CTRE | 0.4 |
| Example 965 | BF3-3PCR-1 | 2 | EPI-16 | 95 | — | — | CTRF | 4 |
| Example 966 | BF3-3PCR-1 | 2 | EPI-16 | 97 | — | — | CTRF | 2 |
| Example 967 | BF3-3PCR-1 | 1.5 | EPI-16 | 97.7 | — | — | CTRF | 0.8 |
| Example 968 | BF3-3PCR-1 | 1.6 | EPI-16 | 98.1 | — | — | CTRF | 0.4 |

TABLE 85

| | Boron trihalide-trivalent phosphorus compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 969 | BF3-3PCR-1 | 1.56 | EPI-16 | 98.40 | — | — | CTRF | 0.04 |
| Example 970 | BF3-3PCR-1 | 1.56 | EPI-16 | 98.42 | — | — | CTRF | 0.02 |
| Example 971 | BF3-3PCR-1 | 1.562 | EPI-16 | 98.434 | — | — | CTRF | 0.004 |
| Example 972 | BF3-3PCR-1 | 1.55 | EPI-16 | 98.00 | — | — | CTRG | 0.44 |
| Example 973 | BF3-3PCR-1 | 2 | EPI-16 | 95 | — | — | CTRH | 4 |

TABLE 85-continued

| | Boron trihalide-trivalent phosphorus compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 974 | BF3-3PCR-1 | 2 | EPI-16 | 97 | — | — | CTRH | 2 |
| Example 975 | BF3-3PCR-1 | 1.5 | EPI-16 | 97.7 | — | — | CTRH | 0.8 |
| Example 976 | BF3-3PCR-1 | 1.6 | EPI-16 | 98.1 | — | — | CTRH | 0.4 |
| Example 977 | BF3-3PCR-1 | 1.56 | EPI-16 | 98.40 | — | — | CTRH | 0.04 |
| Example 978 | BF3-3PCR-1 | 1.56 | EPI-16 | 98.42 | — | — | CTRH | 0.02 |
| Example 979 | BF3-3PCR-1 | 1.562 | EPI-16 | 98.434 | — | — | CTRH | 0.004 |
| Example 980 | BF3-3PCR-1 | 1.6 | EPI-16 | 98.0 | — | — | CTRI | 0.5 |
| Example 981 | BF3-3PCR-1 | 1.6 | EPI-16 | 98.0 | — | — | CTRJ | 0.5 |
| Example 982 | BF3-3PCR-1 | 1.5 | EPI-16 | 97.5 | — | — | CTRK | 1.0 |
| Example 983 | BF3-3PCR-1 | 1.5 | EPI-16 | 97.2 | — | — | CTRL | 1.3 |
| Example 984 | BF3-3PCR-1 | 0.8 | EPI-15 | 49.5 | DCM | 49.5 | CTRB | 0.2 |
| Example 985 | BF3-3PCR-1 | 0.7 | EPI-17 | 99.2 | — | — | CTRB | 0.1 |
| Example 986 | BF3-3PCR-1 | 0.30 | EPI-18 | 49.82 | DCM | 49.82 | CTRB | 0.06 |
| Example 987 | BF3-3PCR-1 | 0.26 | EPI-19 | 49.84 | DCM | 49.84 | CTRB | 0.06 |
| Example 988 | BF3-3PCR-1 | 1.2 | EPI-24 | 49.3 | DCM | 49.3 | CTRB | 0.2 |
| Example 989 | BF3-3PCR-1 | 3.2 | EPI-25 | 96.2 | — | — | CTRB | 0.7 |
| Example 990 | BF3-3PCR-1 | 1.7 | EPI-26 | 97.9 | — | — | CTRB | 0.4 |
| Example 991 | BF3-3PCR-1 | 1.7 | EPI-27 | 98.0 | — | — | CTRB | 0.4 |
| Example 992 | BF3-3PCR-1 | 1.8 | EPI-28 | 97.8 | — | — | CTRB | 0.4 |
| Example 993 | BF3-3PCR-1 | 1.7 | EPI-29 | 97.9 | — | — | CTRB | 0.4 |
| Example 994 | BF3-3PCR-1 | 0.8 | EPI-15 | 49.5 | DCM | 49.5 | CTRF | 0.2 |
| Example 995 | BF3-3PCR-1 | 0.7 | EPI-17 | 99.1 | — | — | CTRF | 0.2 |
| Example 996 | BF3-3PCR-1 | 0.30 | EPI-18 | 49.81 | DCM | 49.81 | CTRF | 0.07 |
| Example 997 | BF3-3PCR-1 | 0.26 | EPI-19 | 49.84 | DCM | 49.84 | CTRF | 0.06 |
| Example 998 | BF3-3PCR-1 | 1.2 | EPI-24 | 49.3 | DCM | 49.3 | CTRF | 0.3 |
| Example 999 | BF3-3PCR-1 | 3.1 | EPI-25 | 96.1 | — | — | CTRF | 0.8 |
| Example 1000 | BF3-3PCR-1 | 1.7 | EPI-26 | 97.8 | — | — | CTRF | 0.4 |
| Example 1001 | BF3-3PCR-1 | 1.7 | EPI-27 | 97.9 | — | — | CTRF | 0.4 |
| Example 1002 | BF3-3PCR-1 | 1.8 | EPI-28 | 97.8 | — | — | CTRF | 0.4 |
| Example 1003 | BF3-3PCR-1 | 1.7 | EPI-29 | 97.9 | — | — | CTRF | 0.4 |
| Example 1004 | BF3-3PCR-1 | 0.8 | EPI-15 | 49.5 | DCM | 49.5 | CTRH | 0.2 |

TABLE 86

| | Boron trihalide-trivalent phosphorus compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 1005 | BF3-3PCR-1 | 0.7 | EPI-17 | 99.1 | — | — | CTRH | 0.2 |
| Example 1006 | BF3-3PCR-1 | 0.30 | EPI-18 | 49.81 | DCM | 49.81 | CTRH | 0.08 |
| Example 1007 | BF3-3PCR-1 | 0.3 | EPI-19 | 49.8 | DCM | 49.8 | CTRH | 0.1 |
| Example 1008 | BF3-3PCR-1 | 1.2 | EPI-24 | 49.3 | DCM | 49.3 | CTRH | 0.3 |
| Example 1009 | BF3-3PCR-1 | 3.1 | EPI-25 | 96.1 | — | — | CTRH | 0.8 |
| Example 1010 | BF3-3PCR-1 | 1.7 | EPI-26 | 97.8 | — | — | CTRH | 0.4 |
| Example 1011 | BF3-3PCR-1 | 1.7 | EPI-27 | 97.9 | — | — | CTRH | 0.4 |
| Example 1012 | BF3-3PCR-1 | 1.8 | EPI-28 | 97.7 | — | — | CTRH | 0.5 |
| Example 1013 | BF3-3PCR-1 | 1.7 | EPI-29 | 97.9 | — | — | CTRH | 0.4 |

TABLE 87

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 861 | 166 | 1 | 0.1 | 1 | 70 | 4 | EA method | 100 | RA method | 1 | AA |
| Example 862 | 166 | 1 | 0.1 | 10 | 70 | 4 | EA method | 98 | RA method | 4 | A |
| Example 863 | 166 | 1 | 0.1 | 5 | 70 | 4 | EA method | 99 | RA method | 3 | A |
| Example 864 | 166 | 1 | 0.1 | 2 | 70 | 4 | EA method | 100 | RA method | 2 | AA |
| Example 865 | 166 | 1 | 0.1 | 1 | 70 | 4 | EA method | 100 | RA method | 1 | AA |
| Example 866 | 166 | 1 | 0.1 | 0.10 | 70 | 4 | EA method | 100 | RA method | 1 | AA |
| Example 867 | 166 | 1 | 0.1 | 0.05 | 70 | 4 | EA method | 100 | RA method | 3 | A |
| Example 868 | 166 | 1 | 0.1 | 0.01 | 70 | 4 | EA method | 100 | RA method | 4 | A |
| Example 869 | 166 | 1 | 0.1 | 1 | 70 | 4 | EA method | 100 | RA method | 1 | AA |
| Example 870 | 166 | 1 | 0.1 | 1 | 70 | 4 | EA method | 100 | RA method | 1 | AA |
| Example 871 | 166 | 1 | 0.1 | 1 | 70 | 4 | EA method | 100 | RA method | 1 | AA |
| Example 872 | 166 | 1 | 0.1 | 10 | 70 | 4 | EA method | 93 | RA method | 5 | A |
| Example 873 | 166 | 1 | 0.1 | 5 | 70 | 4 | EA method | 96 | RA method | 3 | A |

TABLE 87-continued

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 874 | 166 | 1 | 0.1 | 2 | 70 | 4 | EA method | 99 | RA method | 2 | AA |
| Example 875 | 166 | 1 | 0.1 | 1 | 70 | 4 | EA method | 100 | RA method | 1 | AA |
| Example 876 | 166 | 1 | 0.1 | 0.1 | 70 | 4 | EA method | 100 | RA method | 1 | AA |
| Example 877 | 166 | 1 | 0.1 | 0.05 | 70 | 4 | EA method | 100 | RA method | 3 | A |
| Example 878 | 166 | 1 | 0.1 | 0.01 | 70 | 4 | EA method | 100 | RA method | 4 | A |
| Example 879 | 166 | 1 | 0.1 | 1 | 70 | 4 | EA method | 100 | RA method | 1 | AA |
| Example 880 | 166 | 1 | 0.1 | 10 | 70 | 4 | EA method | 93 | RA method | 5 | A |
| Example 881 | 166 | 1 | 0.1 | 5 | 70 | 4 | EA method | 97 | RA method | 3 | A |
| Example 882 | 166 | 1 | 0.1 | 2 | 70 | 4 | EA method | 99 | RA method | 2 | AA |
| Example 883 | 166 | 1 | 0.1 | 1 | 70 | 4 | EA method | 100 | RA method | 1 | AA |
| Example 884 | 166 | 1 | 0.1 | 0.1 | 70 | 4 | EA method | 100 | RA method | 1 | AA |
| Example 885 | 166 | 1 | 0.1 | 0.05 | 70 | 4 | EA method | 100 | RA method | 3 | A |
| Example 886 | 166 | 1 | 0.1 | 0.01 | 70 | 4 | EA method | 100 | RA method | 4 | A |
| Example 887 | 166 | 1 | 0.1 | 1 | 70 | 4 | EA method | 100 | RA method | 1 | AA |
| Example 888 | 166 | 1 | 0.1 | 1 | 70 | 4 | EA method | 100 | RA method | 1 | AA |
| Example 889 | 166 | 1 | 0.1 | 1 | 70 | 4 | EA method | 100 | RA method | 1 | AA |
| Example 890 | 166 | 1 | 0.1 | 1 | 70 | 4 | EA method | 100 | RA method | 1 | AA |
| Example 891 | 60 | 1 | 0.1 | 1 | 70 | 4 | EA method | 100 | RA method | 1 | AA |
| Example 892 | 74 | 1 | 0.1 | 1 | 70 | 4 | EA method | 100 | RA method | 1 | AA |
| Example 893 | 88 | 1 | 0.1 | 1 | 70 | 4 | EA method | 100 | RA method | 1 | AA |
| Example 894 | 102 | 1 | 0.1 | 1 | 70 | 4 | EA method | 100 | RA method | 1 | AA |
| Example 895 | 116 | 1 | 0.1 | 1 | 70 | 4 | EA method | 100 | RA method | 1 | AA |
| Example 896 | 130 | 1 | 0.1 | 1 | 70 | 4 | EA method | 100 | RA method | 1 | AA |

<Judgment> AA: Excellent, A: Good, C: Poor

TABLE 88

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 897 | 144 | 1 | 0.1 | 1 | 70 | 4 | EA method | 100 | RA method | 1 | AA |
| Example 898 | 172 | 1 | 0.1 | 1 | 70 | 4 | EA method | 100 | RA method | 1 | AA |
| Example 899 | 200 | 1 | 0.1 | 1 | 80 | 4 | EA method | 100 | RA method | 1 | AA |
| Example 900 | 228 | 1 | 0.1 | 1 | 80 | 4 | EA method | 100 | RA method | 1 | AA |
| Example 901 | 256 | 1 | 0.1 | 1 | 80 | 4 | EA method | 100 | RA method | 1 | AA |
| Example 902 | 285 | 1 | 0.1 | 1 | 80 | 4 | EA method | 100 | RA method | 1 | AA |
| Example 903 | 313 | 1 | 0.1 | 1 | 80 | 4 | EA method | 100 | RA method | 1 | AA |
| Example 904 | 100 | 1 | 0.1 | 1 | 70 | 4 | EA method | 100 | RA method | 1 | AA |
| Example 905 | 114 | 1 | 0.1 | 1 | 70 | 4 | EA method | 100 | RA method | 1 | AA |
| Example 906 | 128 | 1 | 0.1 | 1 | 70 | 4 | EA method | 100 | RA method | 1 | AA |
| Example 907 | 142 | 1 | 0.1 | 1 | 70 | 4 | EA method | 100 | RA method | 1 | AA |
| Example 908 | 86 | 1 | 0.1 | 1 | 70 | 4 | EA method | 100 | RA method | 1 | AA |
| Example 909 | 114 | 1 | 0.1 | 1 | 70 | 4 | EA method | 100 | RA method | 1 | AA |
| Example 910 | 130 | 1 | 0.1 | 1 | 70 | 4 | EA method | 100 | RA method | 1 | AA |
| Example 911 | 140 | 1 | 0.1 | 1 | 70 | 4 | EA method | 100 | RA method | 1 | AA |
| Example 912 | 60 | 1 | 0.1 | 1 | 70 | 4 | EA method | 100 | RA method | 1 | AA |
| Example 913 | 74 | 1 | 0.1 | 1 | 70 | 4 | EA method | 100 | RA method | 1 | AA |
| Example 914 | 88 | 1 | 0.1 | 1 | 70 | 4 | EA method | 100 | RA method | 1 | AA |
| Example 915 | 102 | 1 | 0.1 | 1 | 70 | 4 | EA method | 100 | RA method | 1 | AA |
| Example 916 | 116 | 1 | 0.1 | 1 | 70 | 4 | EA method | 100 | RA method | 1 | AA |
| Example 917 | 130 | 1 | 0.1 | 1 | 70 | 4 | EA method | 100 | RA method | 1 | AA |
| Example 918 | 144 | 1 | 0.1 | 1 | 70 | 4 | EA method | 100 | RA method | 1 | AA |
| Example 919 | 172 | 1 | 0.1 | 1 | 70 | 4 | EA method | 100 | RA method | 1 | AA |
| Example 920 | 200 | 1 | 0.1 | 1 | 80 | 4 | EA method | 100 | RA method | 1 | AA |
| Example 921 | 228 | 1 | 0.1 | 1 | 80 | 4 | EA method | 100 | RA method | 1 | AA |
| Example 922 | 256 | 1 | 0.1 | 1 | 80 | 4 | EA method | 100 | RA method | 1 | AA |
| Example 923 | 285 | 1 | 0.1 | 1 | 80 | 4 | EA method | 100 | RA method | 1 | AA |
| Example 924 | 313 | 1 | 0.1 | 1 | 80 | 4 | EA method | 100 | RA method | 1 | AA |
| Example 925 | 100 | 1 | 0.1 | 1 | 70 | 4 | EA method | 100 | RA method | 1 | AA |
| Example 926 | 114 | 1 | 0.1 | 1 | 70 | 4 | EA method | 100 | RA method | 1 | AA |
| Example 927 | 128 | 1 | 0.1 | 1 | 70 | 4 | EA method | 100 | RA method | 1 | AA |
| Example 928 | 142 | 1 | 0.1 | 1 | 70 | 4 | EA method | 100 | RA method | 1 | AA |
| Example 929 | 86 | 1 | 0.1 | 1 | 70 | 4 | EA method | 100 | RA method | 1 | AA |
| Example 930 | 114 | 1 | 0.1 | 1 | 70 | 4 | EA method | 100 | RA method | 1 | AA |
| Example 931 | 130 | 1 | 0.1 | 1 | 70 | 4 | EA method | 100 | RA method | 1 | AA |
| Example 932 | 140 | 1 | 0.1 | 1 | 70 | 4 | EA method | 100 | RA method | 1 | AA |

<Judgment> AA: Excellent, A: Good, C: Poor

TABLE 89

| | WPT (g/mol) | α | β | γ | Polymerization condition (° C.) | (hr) | Rate of episulfide group reaction Measurement method | (%) | Thermal stability evaluation Evaluation method | RGW | Judgment |
|---|---|---|---|---|---|---|---|---|---|---|---|
| Example 933 | 60 | 1 | 0.1 | 1 | 70 | 4 | EA method | 100 | RA method | 1 | AA |
| Example 934 | 74 | 1 | 0.1 | 1 | 70 | 4 | EA method | 100 | RA method | 1 | AA |
| Example 935 | 88 | 1 | 0.1 | 1 | 70 | 4 | EA method | 100 | RA method | 1 | AA |
| Example 936 | 102 | 1 | 0.1 | 1 | 70 | 4 | EA method | 100 | RA method | 1 | AA |
| Example 937 | 116 | 1 | 0.1 | 1 | 70 | 4 | EA method | 100 | RA method | 1 | AA |
| Example 938 | 130 | 1 | 0.1 | 1 | 70 | 4 | EA method | 100 | RA method | 1 | AA |
| Example 939 | 144 | 1 | 0.1 | 1 | 70 | 4 | EA method | 100 | RA method | 1 | AA |
| Example 940 | 172 | 1 | 0.1 | 1 | 70 | 4 | EA method | 100 | RA method | 1 | AA |
| Example 941 | 200 | 1 | 0.1 | 1 | 80 | 4 | EA method | 100 | RA method | 1 | AA |
| Example 942 | 228 | 1 | 0.1 | 1 | 80 | 4 | EA method | 100 | RA method | 1 | AA |
| Example 943 | 256 | 1 | 0.1 | 1 | 80 | 4 | EA method | 100 | RA method | 1 | AA |
| Example 944 | 285 | 1 | 0.1 | 1 | 80 | 4 | EA method | 100 | RA method | 1 | AA |
| Example 945 | 313 | 1 | 0.1 | 1 | 80 | 4 | EA method | 100 | RA method | 1 | AA |
| Example 946 | 100 | 1 | 0.1 | 1 | 70 | 4 | EA method | 100 | RA method | 1 | AA |
| Example 947 | 114 | 1 | 0.1 | 1 | 70 | 4 | EA method | 100 | RA method | 1 | AA |
| Example 948 | 128 | 1 | 0.1 | 1 | 70 | 4 | EA method | 100 | RA method | 1 | AA |
| Example 949 | 142 | 1 | 0.1 | 1 | 70 | 4 | EA method | 100 | RA method | 1 | AA |
| Example 950 | 86 | 1 | 0.1 | 1 | 70 | 4 | EA method | 100 | RA method | 1 | AA |
| Example 951 | 114 | 1 | 0.1 | 1 | 70 | 4 | EA method | 100 | RA method | 1 | AA |
| Example 952 | 130 | 1 | 0.1 | 1 | 70 | 4 | EA method | 100 | RA method | 1 | AA |
| Example 953 | 140 | 1 | 0.1 | 1 | 70 | 4 | EA method | 100 | RA method | 1 | AA |
| Example 954 | 221 | 1 | 0.8 | 1 | 100 | 6 | EB method | 100 | RB method | 1 | AA |
| Example 955 | 221 | 1 | 0.8 | 10 | 100 | 6 | EB method | 99 | RB method | 4 | A |
| Example 956 | 221 | 1 | 0.8 | 5 | 100 | 6 | EB method | 100 | RB method | 3 | A |
| Example 957 | 221 | 1 | 0.8 | 2 | 100 | 6 | EB method | 100 | RB method | 2 | AA |
| Example 958 | 221 | 1 | 0.8 | 1 | 100 | 6 | EB method | 100 | RB method | 1 | AA |
| Example 959 | 221 | 1 | 0.8 | 0.1 | 100 | 6 | EB method | 100 | RB method | 1 | AA |
| Example 960 | 221 | 1 | 0.8 | 0.05 | 100 | 6 | EB method | 100 | RB method | 3 | A |
| Example 961 | 221 | 1 | 0.8 | 0.01 | 100 | 6 | EB method | 100 | RB method | 4 | A |
| Example 962 | 221 | 1 | 0.8 | 1 | 100 | 6 | EB method | 100 | RB method | 1 | AA |
| Example 963 | 221 | 1 | 0.8 | 1 | 100 | 6 | EB method | 100 | RB method | 1 | AA |
| Example 964 | 221 | 1 | 0.8 | 1 | 100 | 6 | EB method | 100 | RB method | 1 | AA |
| Example 965 | 221 | 1 | 0.8 | 10 | 100 | 6 | EB method | 93 | RB method | 5 | A |
| Example 966 | 221 | 1 | 0.8 | 5 | 100 | 6 | EB method | 97 | RB method | 3 | A |
| Example 967 | 221 | 1 | 0.8 | 2 | 100 | 6 | EB method | 99 | RB method | 2 | AA |
| Example 968 | 221 | 1 | 0.8 | 1 | 100 | 6 | EB method | 100 | RB method | 1 | AA |

<Judgment> AA: Excellent, A: Good, C: Poor

TABLE 90

| | WPT (g/mol) | α | β | γ | Polymerization condition (° C.) | (hr) | Rate of episulfide group reaction Measurement method | (%) | Thermal stability evaluation Evaluation method | RGW | Judgment |
|---|---|---|---|---|---|---|---|---|---|---|---|
| Example 969 | 221 | 1 | 0.8 | 0.1 | 100 | 6 | EB method | 100 | RB method | 1 | AA |
| Example 970 | 221 | 1 | 0.8 | 0.05 | 100 | 6 | EB method | 100 | RB method | 3 | A |
| Example 971 | 221 | 1 | 0.8 | 0.01 | 100 | 6 | EB method | 100 | RB method | 4 | A |
| Example 972 | 221 | 1 | 0.8 | 1 | 100 | 6 | EB method | 100 | RB method | 1 | AA |
| Example 973 | 221 | 1 | 0.8 | 10 | 100 | 6 | EB method | 92 | RB method | 5 | A |
| Example 974 | 221 | 1 | 0.8 | 5 | 100 | 6 | EB method | 96 | RB method | 3 | A |
| Example 975 | 221 | 1 | 0.8 | 2 | 100 | 6 | EB method | 98 | RB method | 2 | AA |
| Example 976 | 221 | 1 | 0.8 | 1 | 100 | 6 | EB method | 100 | RB method | 1 | AA |
| Example 977 | 221 | 1 | 0.8 | 0.1 | 100 | 6 | EB method | 100 | RB method | 1 | AA |
| Example 978 | 221 | 1 | 0.8 | 0.05 | 100 | 6 | EB method | 100 | RB method | 3 | A |
| Example 979 | 221 | 1 | 0.8 | 0.01 | 100 | 6 | EB method | 100 | RB method | 4 | A |
| Example 980 | 221 | 1 | 0.8 | 1 | 100 | 6 | EB method | 100 | RB method | 1 | AA |
| Example 981 | 221 | 1 | 0.8 | 1 | 100 | 6 | EB method | 100 | RB method | 1 | AA |
| Example 982 | 221 | 1 | 0.8 | 1 | 100 | 6 | EB method | 100 | RB method | 1 | AA |
| Example 983 | 221 | 1 | 0.8 | 1 | 100 | 6 | EB method | 100 | RB method | 1 | AA |
| Example 984 | 205 | 1 | 0.8 | 1 | 100 | 6 | EB method | 100 | RB method | 1 | AA |
| Example 985 | 498 | 1 | 0.8 | 1 | 100 | 6 | EB method | 100 | RB method | 1 | AA |
| Example 986 | 578 | 1 | 0.8 | 1 | 100 | 6 | EB method | 100 | RB method | 1 | AA |
| Example 987 | 671 | 1 | 0.8 | 1 | 100 | 6 | EB method | 100 | RB method | 1 | AA |
| Example 988 | 147 | 1 | 0.8 | 1 | 100 | 6 | EB method | 100 | RB method | 1 | AA |
| Example 989 | 107 | 1 | 0.8 | 1 | 100 | 6 | EB method | 100 | RB method | 1 | AA |
| Example 990 | 197 | 1 | 0.8 | 1 | 100 | 6 | EB method | 100 | RB method | 1 | AA |
| Example 991 | 207 | 1 | 0.8 | 1 | 100 | 6 | EB method | 100 | RB method | 1 | AA |
| Example 992 | 190 | 1 | 0.8 | 1 | 100 | 6 | EB method | 100 | RB method | 1 | AA |
| Example 993 | 200 | 1 | 0.8 | 1 | 100 | 6 | EB method | 100 | RB method | 1 | AA |
| Example 994 | 205 | 1 | 0.8 | 1 | 100 | 6 | EB method | 100 | RB method | 1 | AA |
| Example 995 | 498 | 1 | 0.8 | 1 | 100 | 6 | EB method | 100 | RB method | 1 | AA |
| Example 996 | 578 | 1 | 0.8 | 1 | 100 | 6 | EB method | 100 | RB method | 1 | AA |
| Example 997 | 671 | 1 | 0.8 | 1 | 100 | 6 | EB method | 100 | RB method | 1 | AA |

TABLE 90-continued

| | WPT (g/mol) | α | β | γ | Polymerization condition (° C.) | Polymerization condition (hr) | Rate of episulfide group reaction Measurement method | Rate of episulfide group reaction (%) | Thermal stability evaluation Evaluation method | RGW | Judgment |
|---|---|---|---|---|---|---|---|---|---|---|---|
| Example 998 | 147 | 1 | 0.8 | 1 | 100 | 6 | EB method | 100 | RB method | 1 | AA |
| Example 999 | 107 | 1 | 0.8 | 1 | 100 | 6 | EB method | 100 | RB method | 1 | AA |
| Example 1000 | 197 | 1 | 0.8 | 1 | 100 | 6 | EB method | 100 | RB method | 1 | AA |
| Example 1001 | 207 | 1 | 0.8 | 1 | 100 | 6 | EB method | 100 | RB method | 1 | AA |
| Example 1002 | 190 | 1 | 0.8 | 1 | 100 | 6 | EB method | 100 | RB method | 1 | AA |
| Example 1003 | 200 | 1 | 0.8 | 1 | 100 | 6 | EB method | 100 | RB method | 1 | AA |
| Example 1004 | 205 | 1 | 0.8 | 1 | 100 | 6 | EB method | 100 | RB method | 1 | AA |

<Judgment> AA: Excellent, A: Good, C: Poor

TABLE 91

| | WPT (g/mol) | α | β | γ | Polymerization condition (° C.) | Polymerization condition (hr) | Rate of episulfide group reaction Measurement method | Rate of episulfide group reaction (%) | Thermal stability evaluation Evaluation method | RGW | Judgment |
|---|---|---|---|---|---|---|---|---|---|---|---|
| Example 1005 | 498 | 1 | 0.8 | 1 | 100 | 6 | EB method | 100 | RB method | 1 | AA |
| Example 1006 | 578 | 1 | 0.8 | 1 | 100 | 6 | EB method | 100 | RB method | 1 | AA |
| Example 1007 | 671 | 1 | 0.8 | 1 | 100 | 6 | EB method | 100 | RB method | 1 | AA |
| Example 1008 | 147 | 1 | 0.8 | 1 | 100 | 6 | EB method | 100 | RB method | 1 | AA |
| Example 1009 | 107 | 1 | 0.8 | 1 | 100 | 6 | EB method | 100 | RB method | 1 | AA |
| Example 1010 | 197 | 1 | 0.8 | 1 | 100 | 6 | EB method | 100 | RB method | 1 | AA |
| Example 1011 | 207 | 1 | 0.8 | 1 | 100 | 6 | EB method | 100 | RB method | 1 | AA |
| Example 1012 | 190 | 1 | 0.8 | 1 | 100 | 6 | EB method | 100 | RB method | 1 | AA |
| Example 1013 | 200 | 1 | 0.8 | 1 | 100 | 6 | EB method | 100 | RB method | 1 | AA |

<Judgment> AA: Excellent, A: Good, C: Poor

TABLE 92

| | Boron trihalide-ketone compound Name | % by mass | Episulfide compound Name | % by mass | Additive compound Name | % by mass | Chain transfer agent Name | % by mass |
|---|---|---|---|---|---|---|---|---|
| Example 1014 | BF3-MKCJ-1 | 0.1 | EPI-14 | 99.5 | — | — | CTRA | 0.4 |
| Example 1015 | BF3-MKCJ-1 | 0.1 | EPI-14 | 95.6 | — | — | CTRB | 4.3 |
| Example 1016 | BF3-MKCJ-1 | 0.1 | EPI-14 | 97.7 | — | — | CTRB | 2.2 |
| Example 1017 | BF3-MKCJ-1 | 0.1 | EPI-14 | 99.0 | — | — | CTRB | 0.9 |
| Example 1018 | BF3-MKCJ-1 | 0.1 | EPI-14 | 99.5 | — | — | CTRB | 0.4 |
| Example 1019 | BF3-MKCJ-1 | 0.10 | EPI-14 | 99.86 | — | — | CTRB | 0.04 |
| Example 1020 | BF3-MKCJ-1 | 0.10 | EPI-14 | 99.88 | — | — | CTRB | 0.02 |
| Example 1021 | BF3-MKCJ-1 | 0.100 | EPI-14 | 99.896 | — | — | CTRB | 0.004 |
| Example 1022 | BF3-MKCJ-1 | 0.1 | EPI-14 | 99.5 | — | — | CTRC | 0.4 |
| Example 1023 | BF3-MKCJ-1 | 0.1 | EPI-14 | 99.4 | — | — | CTRD | 0.5 |
| Example 1024 | BF3-MKCJ-1 | 0.1 | EPI-14 | 99.4 | — | — | CTRE | 0.5 |
| Example 1025 | BF3-MKCJ-1 | 0.1 | EPI-14 | 95.0 | — | — | CTRF | 4.9 |
| Example 1026 | BF3-MKCJ-1 | 0.1 | EPI-14 | 97.4 | — | — | CTRF | 2.5 |
| Example 1027 | BF3-MKCJ-1 | 0.1 | EPI-14 | 98.9 | — | — | CTRF | 1.0 |
| Example 1028 | BF3-MKCJ-1 | 0.1 | EPI-14 | 99.4 | — | — | CTRF | 0.5 |
| Example 1029 | BF3-MKCJ-1 | 0.1 | EPI-14 | 99.8 | — | — | CTRF | 0.1 |
| Example 1030 | BF3-MKCJ-1 | 0.10 | EPI-14 | 99.87 | — | — | CTRF | 0.03 |
| Example 1031 | BF3-MKCJ-1 | 0.10 | EPI-14 | 99.90 | — | — | CTRF | 0.01 |
| Example 1032 | BF3-MKCJ-1 | 0.1 | EPI-14 | 99.3 | — | — | CTRG | 0.6 |
| Example 1033 | BF3-MKCJ-1 | 0.1 | EPI-14 | 94.9 | — | — | CTRH | 5.0 |
| Example 1034 | BF3-MKCJ-1 | 0.1 | EPI-14 | 97.3 | — | — | CTRH | 2.6 |
| Example 1035 | BF3-MKCJ-1 | 0.1 | EPI-14 | 98.9 | — | — | CTRH | 1.0 |
| Example 1036 | BF3-MKCJ-1 | 0.1 | EPI-14 | 99.4 | — | — | CTRH | 0.5 |
| Example 1037 | BF3-MKCJ-1 | 0.1 | EPI-14 | 99.8 | — | — | CTRH | 0.1 |
| Example 1038 | BF3-MKCJ-1 | 0.10 | EPI-14 | 99.87 | — | — | CTRH | 0.03 |
| Example 1039 | BF3-MKCJ-1 | 0.10 | EPI-14 | 99.89 | — | — | CTRH | 0.01 |
| Example 1040 | BF3-MKCJ-1 | 0.1 | EPI-14 | 99.3 | — | — | CTRI | 0.6 |
| Example 1041 | BF3-MKCJ-1 | 0.1 | EPI-14 | 99.3 | — | — | CTRJ | 0.6 |
| Example 1042 | BF3-MKCJ-1 | 0.1 | EPI-14 | 98.6 | — | — | CTRK | 1.3 |
| Example 1043 | BF3-MKCJ-1 | 0.1 | EPI-14 | 98.2 | — | — | CTRL | 1.8 |
| Example 1044 | BF3-MKCJ-1 | 0.3 | EPI-1 | 98.5 | — | — | CTRB | 1.2 |
| Example 1045 | BF3-MKCJ-1 | 0.2 | EPI-2 | 98.8 | — | — | CTRB | 1.0 |
| Example 1046 | BF3-MKCJ-1 | 0.2 | EPI-3 | 99.0 | — | — | CTRB | 0.8 |
| Example 1047 | BF3-MKCJ-1 | 0.2 | EPI-4 | 99.1 | — | — | CTRB | 0.7 |
| Example 1048 | BF3-MKCJ-1 | 0.1 | EPI-5 | 99.2 | — | — | CTRB | 0.6 |
| Example 1049 | BF3-MKCJ-1 | 0.1 | EPI-6 | 99.3 | — | — | CTRB | 0.6 |

TABLE 93

| | Boron trihalide-ketone compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 1050 | BF3-MKCJ-1 | 0.1 | EPI-7 | 99.4 | — | — | CTRB | 0.5 |
| Example 1051 | BF3-MKCJ-1 | 0.1 | EPI-8 | 99.5 | — | — | CTRB | 0.4 |
| Example 1052 | BF3-MKCJ-1 | 0.1 | EPI-9 | 99.5 | — | — | CTRB | 0.4 |
| Example 1053 | BF3-MKCJ-1 | 0.1 | EPI-10 | 99.6 | — | — | CTRB | 0.3 |
| Example 1054 | BF3-MKCJ-1 | 0.1 | EPI-11 | 99.6 | — | — | CTRB | 0.3 |
| Example 1055 | BF3-MKCJ-1 | 0.1 | EPI-12 | 99.7 | — | — | CTRB | 0.3 |
| Example 1056 | BF3-MKCJ-1 | 0.1 | EPI-13 | 99.7 | — | — | CTRB | 0.2 |
| Example 1057 | BF3-MKCJ-1 | 0.2 | EPI-20 | 99.1 | — | — | CTRB | 0.7 |
| Example 1058 | BF3-MKCJ-1 | 0.1 | EPI-21 | 99.2 | — | — | CTRB | 0.6 |
| Example 1059 | BF3-MKCJ-1 | 0.1 | EPI-22 | 99.3 | — | — | CTRB | 0.6 |
| Example 1060 | BF3-MKCJ-1 | 0.1 | EPI-23 | 99.4 | — | — | CTRB | 0.5 |
| Example 1061 | BF3-MKCJ-1 | 0.2 | EPI-30 | 99.0 | — | — | CTRB | 0.9 |
| Example 1062 | BF3-MKCJ-1 | 0.1 | EPI-31 | 99.2 | — | — | CTRB | 0.6 |
| Example 1063 | BF3-MKCJ-1 | 0.1 | EPI-32 | 99.3 | — | — | CTRB | 0.6 |
| Example 1064 | BF3-MKCJ-1 | 0.1 | EPI-34 | 99.4 | — | — | CTRB | 0.5 |
| Example 1065 | BF3-MKCJ-1 | 0.3 | EPI-1 | 98.3 | — | — | CTRF | 1.4 |
| Example 1066 | BF3-MKCJ-1 | 0.2 | EPI-2 | 98.6 | — | — | CTRP | 1.1 |
| Example 1067 | BF3-MKCJ-1 | 0.2 | EPI-3 | 98.8 | — | — | CTRF | 1.0 |
| Example 1068 | BF3-MKCJ-1 | 0.2 | EPI-4 | 99.0 | — | — | CTRF | 0.8 |
| Example 1069 | BF3-MKCJ-1 | 0.1 | EPI-5 | 99.1 | — | — | CTRF | 0.7 |
| Example 1070 | BF3-MKCJ-1 | 0.1 | EPI-6 | 99.2 | — | — | CTRF | 0.7 |
| Example 1071 | BF3-MKCJ-1 | 0.1 | EPI-7 | 99.3 | — | — | CTRF | 0.6 |
| Example 1072 | BF3-MKCJ-1 | 0.1 | EPI-8 | 99.4 | — | — | CTRF | 0.5 |
| Example 1073 | BF3-MKCJ-1 | 0.1 | EPI-9 | 99.5 | — | — | CTRF | 0.4 |
| Example 1074 | BF3-MKCJ-1 | 0.1 | EPI-10 | 99.6 | — | — | CTRF | 0.4 |
| Example 1075 | BF3-MKCJ-1 | 0.1 | EPI-11 | 99.6 | — | — | CTRF | 0.3 |
| Example 1076 | BF3-MKCJ-1 | 0.1 | EPI-12 | 99.6 | — | — | CTRF | 0.3 |
| Example 1077 | BF3-MKCJ-1 | 0.1 | EPI-13 | 99.7 | — | — | CTRF | 0.3 |
| Example 1078 | BF3-MKCJ-1 | 0.2 | EPI-20 | 99.0 | — | — | CTRF | 0.9 |
| Example 1079 | BF3-MKCJ-1 | 0.1 | EPI-21 | 99.1 | — | — | CTRF | 0.7 |
| Example 1080 | BF3-MKCJ-1 | 0.1 | EPI-22 | 99.2 | — | — | CTRF | 0.7 |
| Example 1081 | BF3-MKCJ-1 | 0.1 | EPI-23 | 99.3 | — | — | CTRF | 0.6 |
| Example 1082 | BF3-MKCJ-1 | 0.2 | EPI-30 | 98.8 | — | — | CTRF | 1.0 |
| Example 1083 | BF3-MKCJ-1 | 0.1 | EPI-31 | 99.1 | — | — | CTRF | 0.7 |
| Example 1084 | BF3-MKCJ-1 | 0.1 | EPI-32 | 99.2 | — | — | CTRF | 0.7 |
| Example 1085 | BF3-MKCJ-1 | 0.1 | EPI-34 | 99.3 | — | — | CTRF | 0.6 |

TABLE 94

| | Boron trihalide-ketone compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 1086 | BF3-MKCJ-1 | 0.3 | EPI-1 | 98.3 | — | — | CTRH | 1.4 |
| Example 1087 | BF3-MKCJ-1 | 0.2 | EPI-2 | 98.6 | — | — | CTRH | 1.2 |
| Example 1088 | BF3-MKCJ-1 | 0.2 | EPI-3 | 98.8 | — | — | CTRH | 1.0 |
| Example 1089 | BF3-MKCJ-1 | 0.2 | EPI-4 | 99.0 | — | — | CTRH | 0.9 |
| Example 1090 | BF3-MKCJ-1 | 0.1 | EPI-5 | 99.1 | — | — | CTRH | 0.8 |
| Example 1091 | BF3-MKCJ-1 | 0.1 | EPI-6 | 99.2 | — | — | CTRH | 0.7 |
| Example 1092 | BF3-MKCJ-1 | 0.1 | EPI-7 | 99.3 | — | — | CTRH | 0.6 |
| Example 1093 | BF3-MKCJ-1 | 0.1 | EPI-8 | 99.4 | — | — | CTRH | 0.5 |
| Example 1094 | BF3-MKCJ-1 | 0.1 | EPI-9 | 99.5 | — | — | CTRH | 0.4 |
| Example 1095 | BF3-MKCJ-1 | 0.1 | EPI-10 | 99.5 | — | — | CTRH | 0.4 |
| Example 1096 | BF3-MKCJ-1 | 0.1 | EPI-11 | 99.6 | — | — | CTRH | 0.3 |
| Example 1097 | BF3-MKCJ-1 | 0.1 | EPI-12 | 99.6 | — | — | CTRH | 0.3 |
| Example 1098 | BF3-MKCJ-1 | 0.1 | EPI-13 | 99.7 | — | — | CTRH | 0.3 |
| Example 1099 | BF3-MKCJ-1 | 0.2 | EPI-20 | 99.0 | — | — | CTRH | 0.9 |
| Example 1100 | BF3-MKCJ-1 | 0.1 | EPI-21 | 99.1 | — | — | CTRH | 0.8 |
| Example 1101 | BF3-MKCJ-1 | 0.1 | EPI-22 | 99.2 | — | — | CTRH | 0.7 |
| Example 1102 | BF3-MKCJ-1 | 0.1 | EPI-23 | 99.3 | — | — | CTRH | 0.6 |
| Example 1103 | BF3-MKCJ-1 | 0.2 | EPI-30 | 98.8 | — | — | CTRH | 1.0 |
| Example 1104 | BF3-MKCJ-1 | 0.1 | EPI-31 | 99.1 | — | — | CTRH | 0.8 |
| Example 1105 | BF3-MKCJ-1 | 0.1 | EPI-32 | 99.2 | — | — | CTRH | 0.7 |
| Example 1106 | BF3-MKCJ-1 | 0.1 | EPI-34 | 99.3 | — | — | CTRH | 0.6 |
| Example 1107 | BF3-MKCJ-1 | 0.6 | EPI-16 | 99.1 | — | — | CTRA | 0.3 |
| Example 1108 | BF3-MKCJ-1 | 0.6 | EPI-16 | 96.2 | — | — | CTRB | 3.2 |
| Example 1109 | BF3-MKCJ-1 | 0.6 | EPI-16 | 97.8 | — | — | CTRB | 1.6 |
| Example 1110 | BF3-MKCJ-1 | 0.6 | EPI-16 | 98.7 | — | — | CTRB | 0.7 |
| Example 1111 | BF3-MKCJ-1 | 0.6 | EPI-16 | 99.1 | — | — | CTRB | 0.3 |
| Example 1112 | BF3-MKCJ-1 | 0.60 | EPI-16 | 99.37 | — | — | CTRB | 0.03 |
| Example 1113 | BF3-MKCJ-1 | 0.60 | EPI-16 | 99.39 | — | — | CTRB | 0.02 |
| Example 1114 | BF3-MKCJ-1 | 0.597 | EPI-16 | 99.400 | — | — | CTRB | 0.003 |
| Example 1115 | BF3-MKCJ-1 | 0.6 | EPI-16 | 99.1 | — | — | CTRC | 0.3 |

TABLE 94-continued

| | Boron trihalide-ketone compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 1116 | BF3-MKCJ-1 | 0.6 | EPI-16 | 99.1 | — | — | CTRD | 0.3 |
| Example 1117 | BF3-MKCJ-1 | 0.6 | EPI-16 | 99.0 | — | — | CTRE | 0.4 |
| Example 1118 | BF3-MKCJ-1 | 0.6 | EPI-16 | 95.7 | — | — | CTRF | 3.7 |
| Example 1119 | BF3-MKCJ-1 | 0.6 | EPI-16 | 97.5 | — | — | CTRF | 1.9 |
| Example 1120 | BF3-MKCJ-1 | 0.6 | EPI-16 | 98.6 | — | — | CTRF | 0.8 |
| Example 1121 | BF3-MKCJ-1 | 0.6 | EPI-16 | 99.0 | — | — | CTRF | 0.4 |

TABLE 95

| | Boron trihalide-ketone compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 1122 | BF3-MKCJ-1 | 0.60 | EPI-16 | 99.36 | — | — | CTRF | 0.04 |
| Example 1123 | BF3-MKCJ-1 | 0.60 | EPI-16 | 99.38 | — | — | CTRF | 0.02 |
| Example 1124 | BF3-MKCJ-1 | 0.597 | EPI-16 | 99.399 | — | — | CTRF | 0.004 |
| Example 1125 | BF3-MKCJ-1 | 0.6 | EPI-16 | 99.0 | — | — | CTRG | 0.4 |
| Example 1126 | BF3-MKCJ-1 | 0.6 | EPI-16 | 95.6 | — | — | CTRH | 3.8 |
| Example 1127 | BF3-MKCJ-1 | 0.6 | EPI-16 | 97.5 | — | — | CTRH | 1.9 |
| Example 1128 | BF3-MKCJ-1 | 0.6 | EPI-16 | 98.6 | — | — | CTRH | 0.8 |
| Example 1129 | BF3-MKCJ-1 | 0.6 | EPI-16 | 99.0 | — | — | CTRH | 0.4 |
| Example 1130 | BF3-MKCJ-1 | 0.60 | EPI-16 | 99.36 | — | — | CTRH | 0.04 |
| Example 1131 | BF3-MKCJ-1 | 0.60 | EPI-16 | 99.38 | — | — | CTRH | 0.02 |
| Example 1132 | BF3-MKCJ-1 | 0.6 | EPI-16 | 99.4 | — | — | CTRH | 0.00 |
| Example 1133 | BF3-MKCJ-1 | 0.6 | EPI-16 | 98.9 | — | — | CTRI | 0.5 |
| Example 1134 | BF3-MKCJ-1 | 0.6 | EPI-16 | 98.9 | — | — | CTRJ | 0.5 |
| Example 1135 | BF3-MKCJ-1 | 0.6 | EPI-16 | 98.4 | — | — | CTRK | 1.0 |
| Example 1136 | BF3-MKCJ-1 | 0.6 | EPI-16 | 98.1 | — | — | CTRL | 1.3 |
| Example 1137 | BF3-MKCJ-1 | 0.3 | EPI-15 | 49.7 | DCM | 49.7 | CTRB | 0.2 |
| Example 1138 | BF3-MKCJ-1 | 0.3 | EPI-17 | 99.6 | — | — | CTRB | 0.1 |
| Example 1139 | BF3-MKCJ-1 | 0.1 | EPI-18 | 49.9 | DCM | 49.9 | CTRB | 0.1 |
| Example 1140 | BF3-MKCJ-1 | 0.1 | EPI-19 | 49.9 | DCM | 49.9 | CTRB | 0.1 |
| Example 1141 | BF3-MKCJ-1 | 0.4 | EPI-24 | 49.7 | DCM | 49.7 | CTRB | 0.3 |
| Example 1142 | BF3-MKCJ-1 | 1.2 | EPI-25 | 98.1 | — | — | CTRB | 0.7 |
| Example 1143 | BF3-MKCJ-1 | 0.7 | EPI-26 | 99.0 | — | — | CTRB | 0.4 |
| Example 1144 | BF3-MKCJ-1 | 0.6 | EPI-27 | 99.0 | — | — | CTRB | 0.4 |
| Example 1145 | BF3-MKCJ-1 | 0.7 | EPI-28 | 98.9 | — | — | CTRB | 0.4 |
| Example 1146 | BF3-MKCJ-1 | 0.7 | EPI-29 | 99.0 | — | — | CTRB | 0.4 |
| Example 1147 | BF3-MKCJ-1 | 0.3 | EPI-15 | 49.7 | DCM | 49.7 | CTRF | 0.2 |
| Example 1148 | BF3-MKCJ-1 | 0.3 | EPI-17 | 99.6 | — | — | CTRF | 0.2 |
| Example 1149 | BF3-MKCJ-1 | 0.1 | EPI-18 | 49.9 | DCM | 49.9 | CTRF | 0.1 |
| Example 1150 | BF3-MKCJ-1 | 0.1 | EPI-19 | 49.9 | DCM | 49.9 | CTRF | 0.1 |
| Example 1151 | BF3-MKCJ-1 | 0.4 | EPI-24 | 49.6 | DCM | 49.6 | CTRF | 0.3 |
| Example 1152 | BF3-MKCJ-1 | 1.2 | EPI-25 | 98.0 | — | — | CTRF | 0.8 |
| Example 1153 | BF3-MKCJ-1 | 0.7 | EPI-26 | 98.9 | — | — | CTRF | 0.4 |
| Example 1154 | BF3-MKCJ-1 | 0.6 | EPI-27 | 99.0 | — | — | CTRF | 0.4 |
| Example 1155 | BF3-MKCJ-1 | 0.7 | EPI-28 | 98.9 | — | — | CTRF | 0.4 |
| Example 1156 | BF3-MKCJ-1 | 0.7 | EPI-29 | 98.9 | — | — | CTRF | 0.4 |
| Example 1157 | BF3-MKCJ-1 | 0.3 | EPI-15 | 49.7 | DCM | 49.7 | CTRH | 0.2 |

TABLE 96

| | Boron trihalide-ketone compound | | Episulfide compound | | Additive compound | | Chain transfer agent | |
|---|---|---|---|---|---|---|---|---|
| | Name | % by mass | Name | % by mass | Name | % by mass | Name | % by mass |
| Example 1158 | BF3-MKCJ-1 | 0.3 | EPI-17 | 99.6 | — | — | CTRH | 0.2 |
| Example 1159 | BF3-MKCJ-1 | 0.1 | EPI-18 | 49.9 | DCM | 49.9 | CTRH | 0.1 |
| Example 1160 | BF3-MKCJ-1 | 0.1 | EPI-19 | 49.9 | DCM | 49.9 | CTRH | 0.1 |
| Example 1161 | BF3-MKCJ-1 | 0.4 | EPI-24 | 49.6 | DCM | 49.6 | CTRH | 0.3 |
| Example 1162 | BF3-MKCJ-1 | 1.2 | EPI-25 | 98.0 | — | — | CTRH | 0.8 |
| Example 1163 | BF3-MKCJ-1 | 0.7 | EPI-26 | 98.9 | — | — | CTRH | 0.4 |
| Example 1164 | BF3-MKCJ-1 | 0.6 | EPI-27 | 98.9 | — | — | CTRH | 0.4 |
| Example 1165 | BF3-MKCJ-1 | 0.7 | EPI-28 | 98.9 | — | — | CTRH | 0.5 |
| Example 1166 | BF3-MKCJ-1 | 0.7 | EPI-29 | 98.9 | — | — | CTRH | 0.4 |

TABLE 97

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 1014 | 166 | 1 | 0.1 | 1 | 70 | 4 | EA method | 100 | RA method | 1 | AA |
| Example 1015 | 166 | 1 | 0.1 | 10 | 70 | 4 | EA method | 98 | RA method | 5 | A |
| Example 1016 | 166 | 1 | 0.1 | 5 | 70 | 4 | EA method | 99 | RA method | 4 | A |
| Example 1017 | 166 | 1 | 0.1 | 2 | 70 | 4 | EA method | 100 | RA method | 2 | AA |
| Example 1018 | 166 | 1 | 0.1 | 1 | 70 | 4 | EA method | 100 | RA method | 1 | AA |
| Example 1019 | 166 | 1 | 0.1 | 0.10 | 70 | 4 | EA method | 100 | RA method | 1 | AA |
| Example 1020 | 166 | 1 | 0.1 | 0.05 | 70 | 4 | EA method | 100 | RA method | 3 | A |
| Example 1021 | 166 | 1 | 0.1 | 0.01 | 70 | 4 | EA method | 100 | RA method | 4 | A |
| Example 1022 | 166 | 1 | 0.1 | 1 | 70 | 4 | EA method | 100 | RA method | 1 | AA |
| Example 1023 | 166 | 1 | 0.1 | 1 | 70 | 4 | EA method | 100 | RA method | 1 | AA |
| Example 1024 | 166 | 1 | 0.1 | 1 | 70 | 4 | EA method | 100 | RA method | 1 | AA |
| Example 1025 | 166 | 1 | 0.1 | 10 | 70 | 4 | EA method | 93 | RA method | 5 | A |
| Example 1026 | 166 | 1 | 0.1 | 5 | 70 | 4 | EA method | 96 | RA method | 4 | A |
| Example 1027 | 166 | 1 | 0.1 | 2 | 70 | 4 | EA method | 99 | RA method | 2 | AA |
| Example 1028 | 166 | 1 | 0.1 | 1 | 70 | 4 | EA method | 100 | RA method | 1 | AA |
| Example 1029 | 166 | 1 | 0.1 | 0.1 | 70 | 4 | EA method | 100 | RA method | 1 | AA |
| Example 1030 | 166 | 1 | 0.1 | 0.05 | 70 | 4 | EA method | 100 | RA method | 3 | A |
| Example 1031 | 166 | 1 | 0.1 | 0.01 | 70 | 4 | EA method | 100 | RA method | 4 | A |
| Example 1032 | 166 | 1 | 0.1 | 1 | 70 | 4 | EA method | 100 | RA method | 1 | AA |
| Example 1033 | 166 | 1 | 0.1 | 10 | 70 | 4 | EA method | 94 | RA method | 5 | A |
| Example 1034 | 166 | 1 | 0.1 | 5 | 70 | 4 | EA method | 98 | RA method | 3 | A |
| Example 1035 | 166 | 1 | 0.1 | 2 | 70 | 4 | EA method | 100 | RA method | 2 | AA |
| Example 1036 | 166 | 1 | 0.1 | 1 | 70 | 4 | EA method | 100 | RA method | 1 | AA |
| Example 1037 | 166 | 1 | 0.1 | 0.1 | 70 | 4 | EA method | 100 | RA method | 1 | AA |
| Example 1038 | 166 | 1 | 0.1 | 0.05 | 70 | 4 | EA method | 100 | RA method | 3 | A |
| Example 1039 | 166 | 1 | 0.1 | 0.01 | 70 | 4 | EA method | 100 | RA method | 4 | A |
| Example 1040 | 166 | 1 | 0.1 | 1 | 70 | 4 | EA method | 100 | RA method | 1 | AA |
| Example 1041 | 166 | 1 | 0.1 | 1 | 70 | 4 | EA method | 100 | RA method | 1 | AA |
| Example 1042 | 166 | 1 | 0.1 | 1 | 70 | 4 | EA method | 100 | RA method | 1 | AA |
| Example 1043 | 166 | 1 | 0.1 | 1 | 70 | 4 | EA method | 100 | RA method | 1 | AA |
| Example 1044 | 60 | 1 | 0.1 | 1 | 70 | 4 | EA method | 100 | RA method | 1 | AA |
| Example 1045 | 74 | 1 | 0.1 | 1 | 70 | 4 | EA method | 100 | RA method | 1 | AA |
| Example 1046 | 88 | 1 | 0.1 | 1 | 70 | 4 | EA method | 100 | RA method | 1 | AA |
| Example 1047 | 102 | 1 | 0.1 | 1 | 70 | 4 | EA method | 100 | RA method | 1 | AA |
| Example 1048 | 116 | 1 | 0.1 | 1 | 70 | 4 | EA method | 100 | RA method | 1 | AA |
| Example 1049 | 130 | 1 | 0.1 | 1 | 70 | 4 | EA method | 100 | RA method | 1 | AA |

<Judgment> AA: Excellent, A: Good, C: Poor

TABLE 98

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 1050 | 144 | 1 | 0.1 | 1 | 70 | 4 | EA method | 100 | RA method | 1 | AA |
| Example 1051 | 172 | 1 | 0.1 | 1 | 70 | 4 | EA method | 100 | RA method | 1 | AA |
| Example 1052 | 200 | 1 | 0.1 | 1 | 80 | 4 | EA method | 100 | RA method | 1 | AA |
| Example 1053 | 228 | 1 | 0.1 | 1 | 80 | 4 | EA method | 100 | RA method | 1 | AA |
| Example 1054 | 256 | 1 | 0.1 | 1 | 80 | 4 | EA method | 100 | RA method | 1 | AA |
| Example 1055 | 285 | 1 | 0.1 | 1 | 80 | 4 | EA method | 100 | RA method | 1 | AA |
| Example 1056 | 313 | 1 | 0.1 | 1 | 80 | 4 | EA method | 100 | RA method | 1 | AA |
| Example 1057 | 100 | 1 | 0.1 | 1 | 70 | 4 | EA method | 100 | RA method | 1 | AA |
| Example 1058 | 114 | 1 | 0.1 | 1 | 70 | 4 | EA method | 100 | RA method | 1 | AA |
| Example 1059 | 128 | 1 | 0.1 | 1 | 70 | 4 | EA method | 100 | RA method | 1 | AA |
| Example 1060 | 142 | 1 | 0.1 | 1 | 70 | 4 | EA method | 100 | RA method | 1 | AA |
| Example 1061 | 86 | 1 | 0.1 | 1 | 70 | 4 | EA method | 100 | RA method | 1 | AA |
| Example 1062 | 114 | 1 | 0.1 | 1 | 70 | 4 | EA method | 100 | RA method | 1 | AA |
| Example 1063 | 130 | 1 | 0.1 | 1 | 70 | 4 | EA method | 100 | RA method | 1 | AA |
| Example 1064 | 140 | 1 | 0.1 | 1 | 70 | 4 | EA method | 100 | RA method | 1 | AA |
| Example 1065 | 60 | 1 | 0.1 | 1 | 70 | 4 | EA method | 100 | RA method | 1 | AA |
| Example 1066 | 74 | 1 | 0.1 | 1 | 70 | 4 | EA method | 100 | RA method | 1 | AA |
| Example 1067 | 88 | 1 | 0.1 | 1 | 70 | 4 | EA method | 100 | RA method | 1 | AA |
| Example 1068 | 102 | 1 | 0.1 | 1 | 70 | 4 | EA method | 100 | RA method | 1 | AA |
| Example 1069 | 116 | 1 | 0.1 | 1 | 70 | 4 | EA method | 100 | RA method | 1 | AA |
| Example 1070 | 130 | 1 | 0.1 | 1 | 70 | 4 | EA method | 100 | RA method | 1 | AA |
| Example 1071 | 144 | 1 | 0.1 | 1 | 70 | 4 | EA method | 100 | RA method | 1 | AA |
| Example 1072 | 172 | 1 | 0.1 | 1 | 70 | 4 | EA method | 100 | RA method | 1 | AA |
| Example 1073 | 200 | 1 | 0.1 | 1 | 80 | 4 | EA method | 100 | RA method | 1 | AA |
| Example 1074 | 228 | 1 | 0.1 | 1 | 80 | 4 | EA method | 100 | RA method | 1 | AA |
| Example 1075 | 256 | 1 | 0.1 | 1 | 80 | 4 | EA method | 100 | RA method | 1 | AA |
| Example 1076 | 285 | 1 | 0.1 | 1 | 80 | 4 | EA method | 100 | RA method | 1 | AA |
| Example 1077 | 313 | 1 | 0.1 | 1 | 80 | 4 | EA method | 100 | RA method | 1 | AA |
| Example 1078 | 100 | 1 | 0.1 | 1 | 70 | 4 | EA method | 100 | RA method | 1 | AA |

TABLE 98-continued

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 1079 | 114 | 1 | 0.1 | 1 | 70 | 4 | EA method | 100 | RA method | 1 | AA |
| Example 1080 | 128 | 1 | 0.1 | 1 | 70 | 4 | EA method | 100 | RA method | 1 | AA |
| Example 1081 | 142 | 1 | 0.1 | 1 | 70 | 4 | EA method | 100 | RA method | 1 | AA |
| Example 1082 | 86 | 1 | 0.1 | 1 | 70 | 4 | EA method | 100 | RA method | 1 | AA |
| Example 1083 | 114 | 1 | 0.1 | 1 | 70 | 4 | EA method | 100 | RA method | 1 | AA |
| Example 1084 | 130 | 1 | 0.1 | 1 | 70 | 4 | EA method | 100 | RA method | 1 | AA |
| Example 1085 | 140 | 1 | 0.1 | 1 | 70 | 4 | EA method | 100 | RA method | 1 | AA |

<Judgment> AA: Excellent, A: Good, C: Poor

TABLE 99

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 1086 | 60 | 1 | 0.1 | 1 | 70 | 4 | EA method | 100 | RA method | 1 | AA |
| Example 1087 | 74 | 1 | 0.1 | 1 | 70 | 4 | EA method | 100 | RA method | 1 | AA |
| Example 1088 | 88 | 1 | 0.1 | 1 | 70 | 4 | EA method | 100 | RA method | 1 | AA |
| Example 1089 | 102 | 1 | 0.1 | 1 | 70 | 4 | EA method | 100 | RA method | 1 | AA |
| Example 1090 | 116 | 1 | 0.1 | 1 | 70 | 4 | EA method | 100 | RA method | 1 | AA |
| Example 1091 | 130 | 1 | 0.1 | 1 | 70 | 4 | EA method | 100 | RA method | 1 | AA |
| Example 1092 | 144 | 1 | 0.1 | 1 | 70 | 4 | EA method | 100 | RA method | 1 | AA |
| Example 1093 | 172 | 1 | 0.1 | 1 | 70 | 4 | EA method | 100 | RA method | 1 | AA |
| Example 1094 | 200 | 1 | 0.1 | 1 | 80 | 4 | EA method | 100 | RA method | 1 | AA |
| Example 1095 | 228 | 1 | 0.1 | 1 | 80 | 4 | EA method | 100 | RA method | 1 | AA |
| Example 1096 | 256 | 1 | 0.1 | 1 | 80 | 4 | EA method | 100 | RA method | 1 | AA |
| Example 1097 | 285 | 1 | 0.1 | 1 | 80 | 4 | EA method | 100 | RA method | 1 | AA |
| Example 1098 | 313 | 1 | 0.1 | 1 | 80 | 4 | EA method | 100 | RA method | 1 | AA |
| Example 1099 | 100 | 1 | 0.1 | 1 | 70 | 4 | EA method | 100 | RA method | 1 | AA |
| Example 1100 | 114 | 1 | 0.1 | 1 | 70 | 4 | EA method | 100 | RA method | 1 | AA |
| Example 1101 | 128 | 1 | 0.1 | 1 | 70 | 4 | EA method | 100 | RA method | 1 | AA |
| Example 1102 | 142 | 1 | 0.1 | 1 | 70 | 4 | EA method | 100 | RA method | 1 | AA |
| Example 1103 | 86 | 1 | 0.1 | 1 | 70 | 4 | EA method | 100 | RA method | 1 | AA |
| Example 1104 | 114 | 1 | 0.1 | 1 | 70 | 4 | EA method | 100 | RA method | 1 | AA |
| Example 1105 | 130 | 1 | 0.1 | 1 | 70 | 4 | EA method | 100 | RA method | 1 | AA |
| Example 1106 | 140 | 1 | 0.1 | 1 | 70 | 4 | EA method | 100 | RA method | 1 | AA |
| Example 1107 | 221 | 1 | 0.8 | 1 | 100 | 6 | EB method | 100 | RB method | 1 | AA |
| Example 1108 | 221 | 1 | 0.8 | 10 | 100 | 6 | EB method | 99 | RB method | 5 | A |
| Example 1109 | 221 | 1 | 0.8 | 5 | 100 | 6 | EB method | 100 | RB method | 4 | A |
| Example 1110 | 221 | 1 | 0.8 | 2 | 100 | 6 | EB method | 100 | RB method | 2 | AA |
| Example 1111 | 221 | 1 | 0.8 | 1 | 100 | 6 | EB method | 100 | RB method | 1 | AA |
| Example 1112 | 221 | 1 | 0.8 | 0.1 | 100 | 6 | EB method | 100 | RB method | 1 | AA |
| Example 1113 | 221 | 1 | 0.8 | 0.05 | 100 | 6 | EB method | 100 | RB method | 3 | A |
| Example 1114 | 221 | 1 | 0.8 | 0.01 | 100 | 6 | EB method | 100 | RB method | 4 | A |
| Example 1115 | 221 | 1 | 0.8 | 1 | 100 | 6 | EB method | 100 | RB method | 1 | AA |
| Example 1116 | 221 | 1 | 0.8 | 1 | 100 | 6 | EB method | 100 | RB method | 1 | AA |
| Example 1117 | 221 | 1 | 0.8 | 1 | 100 | 6 | EB method | 100 | RB method | 1 | AA |
| Example 1118 | 221 | 1 | 0.8 | 10 | 100 | 6 | EB method | 94 | RB method | 5 | A |
| Example 1119 | 221 | 1 | 0.8 | 5 | 100 | 6 | EB method | 98 | RB method | 4 | A |
| Example 1120 | 221 | 1 | 0.8 | 2 | 100 | 6 | EB method | 99 | RB method | 2 | AA |
| Example 1121 | 221 | 1 | 0.8 | 1 | 100 | 6 | EB method | 100 | RB method | 1 | AA |

<Judgment> AA: Excellent, A: Good, C: Poor

TABLE 100

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 1122 | 221 | 1 | 0.8 | 0.1 | 100 | 6 | EB method | 100 | RB method | 1 | AA |
| Example 1123 | 221 | 1 | 0.8 | 0.05 | 100 | 6 | EB method | 100 | RB method | 3 | A |
| Example 1124 | 221 | 1 | 0.8 | 0.01 | 100 | 6 | EB method | 100 | RB method | 4 | A |
| Example 1125 | 221 | 1 | 0.8 | 1 | 100 | 6 | EB method | 100 | RB method | 1 | AA |
| Example 1126 | 221 | 1 | 0.8 | 10 | 100 | 6 | EB method | 94 | RB method | 5 | A |
| Example 1127 | 221 | 1 | 0.8 | 5 | 100 | 6 | EB method | 97 | RB method | 3 | A |
| Example 1128 | 221 | 1 | 0.8 | 2 | 100 | 6 | EB method | 100 | RB method | 2 | AA |
| Example 1129 | 221 | 1 | 0.8 | 1 | 100 | 6 | EB method | 100 | RB method | 1 | AA |
| Example 1130 | 221 | 1 | 0.8 | 0.1 | 100 | 6 | EB method | 100 | RB method | 1 | AA |
| Example 1131 | 221 | 1 | 0.8 | 0.05 | 100 | 6 | EB method | 100 | RB method | 3 | A |
| Example 1132 | 221 | 1 | 0.8 | 0.01 | 100 | 6 | EB method | 100 | RB method | 4 | A |
| Example 1133 | 221 | 1 | 0.8 | 1 | 100 | 6 | EB method | 100 | RB method | 1 | AA |

TABLE 100-continued

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 1134 | 221 | 1 | 0.8 | 1 | 100 | 6 | EB method | 100 | RB method | 1 | AA |
| Example 1135 | 221 | 1 | 0.8 | 1 | 100 | 6 | EB method | 100 | RB method | 1 | AA |
| Example 1136 | 221 | 1 | 0.8 | 1 | 100 | 6 | EB method | 100 | RB method | 1 | AA |
| Example 1137 | 205 | 1 | 0.8 | 1 | 100 | 6 | EB method | 100 | RB method | 1 | AA |
| Example 1138 | 498 | 1 | 0.8 | 1 | 100 | 6 | EB method | 100 | RB method | 1 | AA |
| Example 1139 | 578 | 1 | 0.8 | 1 | 100 | 6 | EB method | 100 | RB method | 1 | AA |
| Example 1140 | 671 | 1 | 0.8 | 1 | 100 | 6 | EB method | 100 | RB method | 1 | AA |
| Example 1141 | 147 | 1 | 0.8 | 1 | 100 | 6 | EB method | 100 | RB method | 1 | AA |
| Example 1142 | 107 | 1 | 0.8 | 1 | 100 | 6 | EB method | 100 | RB method | 1 | AA |
| Example 1143 | 197 | 1 | 0.8 | 1 | 100 | 6 | EB method | 100 | RB method | 1 | AA |
| Example 1144 | 207 | 1 | 0.8 | 1 | 100 | 6 | EB method | 100 | RB method | 1 | AA |
| Example 1145 | 190 | 1 | 0.8 | 1 | 100 | 6 | EB method | 100 | RB method | 1 | AA |
| Example 1146 | 200 | 1 | 0.8 | 1 | 100 | 6 | EB method | 100 | RB method | 1 | AA |
| Example 1147 | 205 | 1 | 0.8 | 1 | 100 | 6 | EB method | 100 | RB method | 1 | AA |
| Example 1148 | 498 | 1 | 0.8 | 1 | 100 | 6 | EB method | 100 | RB method | 1 | AA |
| Example 1149 | 578 | 1 | 0.8 | 1 | 100 | 6 | EB method | 100 | RB method | 1 | AA |
| Example 1150 | 671 | 1 | 0.8 | 1 | 100 | 6 | EB method | 100 | RB method | 1 | AA |
| Example 1151 | 147 | 1 | 0.8 | 1 | 100 | 6 | EB method | 100 | RB method | 1 | AA |
| Example 1152 | 107 | 1 | 0.8 | 1 | 100 | 6 | EB method | 100 | RB method | 1 | AA |
| Example 1153 | 197 | 1 | 0.8 | 1 | 100 | 6 | EB method | 100 | RB method | 1 | AA |
| Example 1154 | 207 | 1 | 0.8 | 1 | 100 | 6 | EB method | 100 | RB method | 1 | AA |
| Example 1155 | 190 | 1 | 0.8 | 1 | 100 | 6 | EB method | 100 | RB method | 1 | AA |
| Example 1156 | 200 | 1 | 0.8 | 1 | 100 | 6 | EB method | 100 | RB method | 1 | AA |
| Example 1157 | 205 | 1 | 0.8 | 1 | 100 | 6 | EB method | 100 | RB method | 1 | AA |

<Judgment> AA: Excellent, A: Good, C: Poor

TABLE 101

| | WPT | | | | Polymerization condition | | Rate of episulfide group reaction | | Thermal stability evaluation | | |
|---|---|---|---|---|---|---|---|---|---|---|---|
| | (g/mol) | α | β | γ | (° C.) | (hr) | Measurement method | (%) | Evaluation method | RGW | Judgment |
| Example 1158 | 498 | 1 | 0.8 | 1 | 100 | 6 | EB method | 100 | RB method | 1 | AA |
| Example 1159 | 578 | 1 | 0.8 | 1 | 100 | 6 | EB method | 100 | RB method | 1 | AA |
| Example 1160 | 671 | 1 | 0.8 | 1 | 100 | 6 | EB method | 100 | RB method | 1 | AA |
| Example 1161 | 147 | 1 | 0.8 | 1 | 100 | 6 | EB method | 100 | RB method | 1 | AA |
| Example 1162 | 107 | 1 | 0.8 | 1 | 100 | 6 | EB method | 100 | RB method | 1 | AA |
| Example 1163 | 197 | 1 | 0.8 | 1 | 100 | 6 | EB method | 100 | RB method | 1 | AA |
| Example 1164 | 207 | 1 | 0.8 | 1 | 100 | 6 | EB method | 100 | RB method | 1 | AA |
| Example 1165 | 190 | 1 | 0.8 | 1 | 100 | 6 | EB method | 100 | RB method | 1 | AA |
| Example 1166 | 200 | 1 | 0.8 | 1 | 100 | 6 | EB method | 100 | RB method | 1 | AA |

<Judgment> AA: Excellent, A: Good, C: Poor

As shown in Tables 77 to 81, 87 to 91, and 97 to 101, it was confirmed that: the polymer and cured product obtained by polymerizing the composition comprising (A) at least one compound selected from the group consisting of an ether compound having two or more ether groups, a trivalent phosphorus compound, and a ketone compound, the boron trihalide (B), the episulfide compound (C), and the chain transfer agent (D) according to the present embodiment were less volatilized even when preserved for a long period under high temperature; and stability under high temperature was high.

INDUSTRIAL APPLICABILITY

The composition of the present embodiment and the polymer or cured product prepared by polymerizing the composition have industrial applicability as electronic materials (casting and circuit units of insulators, interchange transformers, switching devices, etc., packages for various types of components, peripheral materials for IC/LED/semiconductor [sealants, lens materials, substrate materials, die bond materials, chip coating materials, laminate plates, optical fibers, optical waveguides, optical filters, adhesives for electronic components, coating materials, sealing materials, insulating materials, photoresists, encapsulation materials, potting materials, light transmissive layers or interlayer insulating layers for optical disks, light guide plates, antireflection films, etc.], rotating machine coils for power generators, motors, etc., winding impregnation, printed circuit boards, laminate plates, insulating boards, medium-sized insulators, coils, connectors, terminals, various types of cases, electric components, etc.), paints (corrosion-resistant paints, maintenance, ship coating, corrosion-resistant linings, primers for automobiles/home electric appliances, drink/beer cans, exterior lacquers, extruded tube coating, general corrosion-proof coating, maintenance coating, lacquers for wooden products, electrodeposition primers for automobiles, other industrial electrodeposition coatings, interior lacquers for drink/beer cans, coil coating, internal coating for drums/cans, acid-proof linings, wire enamels, insulating paints, primers for automobiles, decorative and anti-proof coating for various types of metallic products, internal and external coating of pipes, insulating coating of electric components, etc.), composite materials (pipes/tanks for chemical plants, aircraft materials, automobile members, various types of sports goods, carbon fiber composite materials, aramid fiber composite materials, etc.), civil engineering and construction materials (floor materials, pavement materials, membranes, anti-slip and thin surfacing, concrete joints/raising, anchor installation and bonding, precast concrete connection, tile bonding, repair of cracks in concrete structures, base grouting/leveling, corrosion-proof/water-proof coating of water and sewerage facilities, corrosion-resistant multilayer linings for tanks, corrosion-proof coating of iron structures, mastic coating of the exterior walls of architectural structures, etc.), adhesives (adhesives for materials of the same type or different types such as metals/glass/ceramics/cement concrete/wood/plastics, adhesives for assembly of automobiles/railroad vehicles/aircrafts, etc., adhesives for composite panel manufacturing for prehab, etc.: including one-component types, two-component types, and sheet types), aircraft/automobile/plastic molding tooling (press types, resin types such as stretched dies and matched dies, molds for vacuum molding/blow molding, master models, patterns for castings, multilayer tooling, various types of tools for examination, etc.), modifiers/stabilizers (resin processing of fibers, stabilizers for polyvinyl chloride, adhesives for synthetic rubbers, etc.), and rubber modifiers (vulcanizing agent, vulcanization promoters, etc.).

The invention claimed is:

1. A composition comprising:

(A) at least one compound selected from the group consisting of an ether compound having two or more ether groups, a trivalent phosphorus compound and a ketone compound, (B) a boron trihalide, and (C) an episulfide compound wherein the at least one of the compound (A) and at least a portion of the boron trihalide (B) form a complex.

2. The composition according to claim 1, wherein the number of ether groups in the ether compound is 2 to 8.

3. The composition according to claim 1, wherein the number of carbon atoms in the ether compound is 3 to 50.

4. The composition according to claim 1, wherein the trivalent phosphorus compound is a compound represented by the following formula (1):

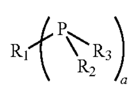

(1)

wherein a represents a number of 1 or more, $R_1$ represents a linear, branched or cyclic aliphatic hydrocarbon group having 1 to 33 carbon atoms, a substituted or unsubstituted aromatic hydrocarbon group, or a substituted or unsubstituted metallocenyl group, $R_2$ and $R_3$ each independently represent a linear, branched or cyclic aliphatic hydrocarbon group having 1 to 33 carbon atoms or a substituted or unsubstituted aromatic hydrocarbon group, $R_1$ and $R_2$, $R_1$ and $R_3$, or $R_2$ and $R_3$ may be linked together, and in the case where a is 2 or more, a plurality of $R_2$ and $R_3$ groups present may be the same or different and the $R_2$ groups or the $R_3$ groups may be linked together.

5. The composition according to claim 4, wherein in the formula (1), a is 1, all of $R_1$, $R_2$, and $R_3$ are aromatic hydrocarbon groups, and at least one of $R_1$, $R_2$, and $R_3$ is a substituted aromatic hydrocarbon group.

6. The composition according to claim 4, wherein the number of carbon atoms in the trivalent phosphorus compound is 4 to 52.

7. The composition according to claim 4, wherein in the formula (1), a is 1 to 4.

8. The composition according to claim 1, wherein the ketone compound is a compound represented by the following formula (2), (3) or (4):

(2)

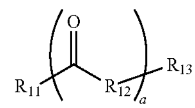

(3)

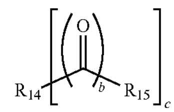

(4)

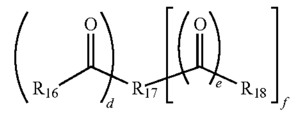

wherein a, c, d, and f each independently represent a number of 1 or more, b and e each independently represent a number of 2 or more, $R_{11}$ and $R_{12}$ each independently represent a linear, branched, or cyclic aliphatic hydrocarbon group having 1 to 20 carbon atoms or a substituted or unsubstituted aromatic hydrocarbon group, $R_{13}$ represents a hydrogen atom, a linear, branched or cyclic aliphatic having 1 to 20 carbon atoms, or a substituted or unsubstituted aromatic hydrocarbon group, $R_{11}$, $R_{12}$, and $R_{13}$ may be linked to each other, $R_{14}$ and $R_{15}$ each independently represent a linear, branched or cyclic aliphatic hydrocarbon group having 1 to 20 carbon atoms or a substituted or unsubstituted aromatic hydrocarbon group, the $R_{15}$ groups may be the same or different, $R_{14}$, $R_{15}$, and the $R_{15}$ groups may be linked to each other, $R_{16}$, $R_{17}$, and $R_{18}$ each independently represent a linear, branched, or cyclic aliphatic hydrocarbon group having 1 to 20 carbon atoms or a substituted or unsubstituted aromatic hydrocarbon group, the $R_{16}$ groups and the $R_{18}$ groups may be the same or different, and $R_{16}$, $R_{17}$, or $R_{18}$ and $R_{16}$ or $R_{18}$ may be linked to each other.

9. The composition according to claim 8, wherein when a in the formula (2) is 2, the number of carbon atoms between two ketone groups is 2 to 20.

10. The composition according to claim 8, wherein the number of carbon atoms in the ketone compound is 3 to 31.

11. The composition according to claim 8, wherein the number of ketone group(s) in the ketone compound is 1 to 8.

12. The composition according to claim 1, wherein an index α which is expressed in the following formula (5) and represents a ratio between the at least one compound (A) selected from the group consisting of an ether compound having two or more ether groups, a trivalent phosphorus compound and a ketone compound, and the boron trihalide (B) is 1 to 1000:

$$\text{Index } \alpha=(\alpha e+\alpha p+\alpha k)/\alpha b \tag{5}$$

αe: molar number (mol) of ether groups in the ether compound

αp: molar number (mol) of trivalent phosphorus atom(s) contained in the trivalent phosphorus compound αk: molar number (mol) of ketone group(s) in the ketone compound αb: molar number (mol) of the boron trihalide.

13. The composition according to claim 12, wherein αp/αb is 10 or less.

14. The composition according to claim 1, wherein the boron trihalide is at least one selected from the group consisting of boron trifluoride, boron trichloride, and boron tribromide.

15. The composition according to claim 1, wherein the episulfide compound is a compound having only a 3-membered cyclic thioether structure as a polymerizable functional group.

16. The composition according to claim 1, wherein a ratio between a molar number (mol) of the boron trihalide and a molar number (mol) of episulfide group(s) contained in the episulfide compound is 1:10 to 1:100000.

17. The composition according to claim 1, wherein an episulfide equivalent of the episulfide compound is 65 to 700 g/mol.

18. The composition according to claim 1, wherein the episulfide compound has a partial structure represented by the following formula (6), (7), (8) or (9):

(6)

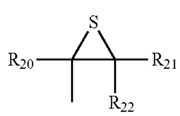

(7)

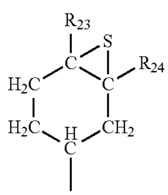

-continued (8)

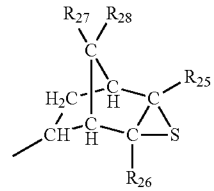

(9)

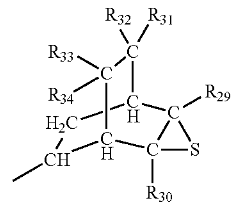

wherein $R_{20}$, $R_{21}$, $R_{22}$, $R_{23}$, $R_{24}$, $R_{23}$, $R_{26}$, $R_{27}$, $R_{28}$, $R_{29}$, $R_{30}$, $R_{31}$, $R_{32}$, $R_{33}$, and $R_{34}$ each independently represent a hydrogen atom, a linear, branched, or cyclic aliphatic hydrocarbon group having 1 to 20 carbon atoms, or a substituted or unsubstituted aromatic hydrocarbon group.

19. A polymer formed by polymerizing the episulfide compound in the composition according to claim 1.

20. A method for producing a polymer, comprising polymerizing the episulfide compound in the composition according to claim 1 by heating and/or energy line irradiation.

* * * * *